US012621575B2

(12) United States Patent
Rivard et al.

(10) Patent No.: US 12,621,575 B2
(45) Date of Patent: *May 5, 2026

(54) SYSTEMS AND METHODS FOR GENERATING A HIGH-DYNAMIC RANGE (HDR) PIXEL STREAM

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/025,772

(22) Filed: Jan. 16, 2025

(65) Prior Publication Data

US 2025/0159357 A1     May 15, 2025

Related U.S. Application Data

(63) Continuation of application No. 18/930,887, filed on Oct. 29, 2024, which is a continuation-in-part of application No. 18/646,581, filed on Apr. 25, 2024, which is a continuation of application No. 17/321,166, filed on May 14, 2021, now Pat. No. 12,003,864, which is a continuation of application (Continued)

(51) Int. Cl.
| | |
|---|---|
| *H04N 23/741* | (2023.01) |
| *G06T 5/50* | (2006.01) |
| *H04N 23/68* | (2023.01) |
| *H04N 23/72* | (2023.01) |
| *H04N 23/76* | (2023.01) |

(52) U.S. Cl.
CPC ............. *H04N 23/741* (2023.01); *G06T 5/50* (2013.01); *H04N 23/6811* (2023.01); *H04N 23/72* (2023.01); *H04N 23/76* (2023.01); *G06T 2207/20208* (2013.01); *G06T 2207/20221* (2013.01)

(58) Field of Classification Search
CPC .. H04N 23/741; H04N 23/6811; H04N 23/72; H04N 23/76; H04N 25/585; G06T 5/50; G06T 2207/20208; G06T 2207/20221
See application file for complete search history.

(56) References Cited

U.S. PATENT DOCUMENTS

| | | | | |
|---|---|---|---|---|
| 2011/0317005 A1* | 12/2011 | Atkinson | ................ | G01S 17/89 |
| | | | | 348/E5.09 |
| 2013/0147979 A1* | 6/2013 | McMahon | ............. | H04N 25/44 |
| | | | | 348/218.1 |

OTHER PUBLICATIONS

List of References Considered by Examiner in Parent U.S. Appl. No. 18/930,887, filed Oct. 29, 2024 & Issued as U.S. Pat. No. 12,401,911 on Aug. 26, 2025, 341 pages.

* cited by examiner

*Primary Examiner* — Kelly L Jerabek
(74) *Attorney, Agent, or Firm* — Zilka-Kotab, P.C.

(57) ABSTRACT

A system, method, and computer program product are provided for high-dynamic range images. In use, a first pixel attribute of a first pixel is received and a second pixel attribute of a second pixel is received. Next, a scalar based on the first pixel attribute and the second pixel attribute is identified. Finally, the first pixel and the second pixel are blended, based on the scalar, wherein the first pixel is brighter than the second pixel. Additional systems, methods, and computer program products are also presented.

337 Claims, 80 Drawing Sheets

Related U.S. Application Data

No. 16/857,016, filed on Apr. 23, 2020, now Pat. No. 11,025,831, which is a continuation of application No. 16/519,244, filed on Jul. 23, 2019, now Pat. No. 10,652,478, which is a continuation of application No. 15/891,251, filed on Feb. 7, 2018, now Pat. No. 10,382,702, which is a continuation of application No. 14/823,993, filed on Aug. 11, 2015, now Pat. No. 9,918,017, which is a continuation-in-part of application No. 14/536,524, filed on Nov. 7, 2014, now Pat. No. 9,160,936.

315

(Front View)

336

Digital Camera
302

330

Wireless
Mobile Device
376

Forward-Facing
Direction

User-Facing
Direction 336     330

330     331

312

Display
Unit
312

(Back View)     (Side View)     (Front View)

900

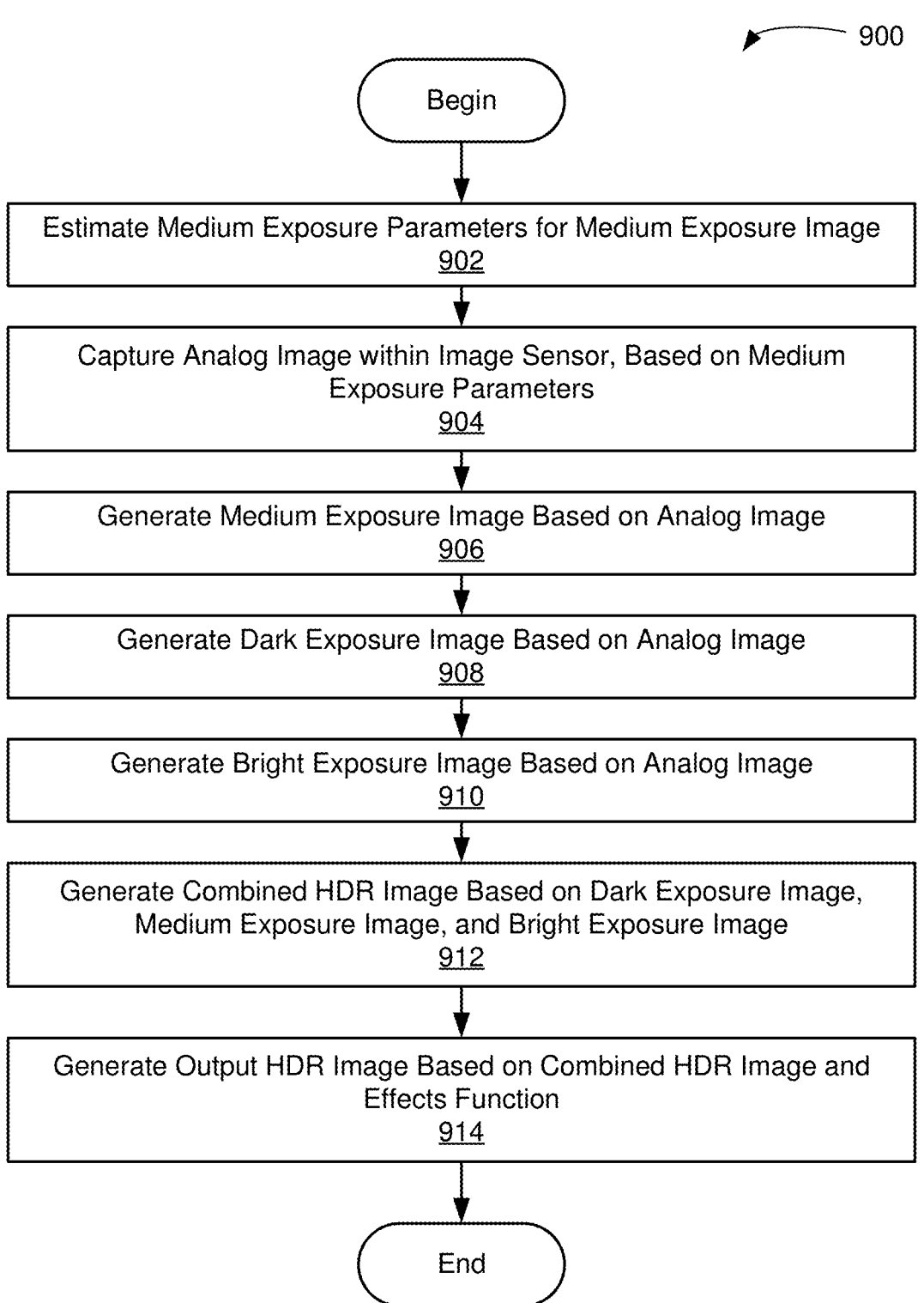

Begin

Estimate Medium Exposure Parameters for Medium Exposure Image
902

Capture Analog Image within Image Sensor, Based on Medium Exposure Parameters
904

Generate Medium Exposure Image Based on Analog Image
906

Generate Dark Exposure Image Based on Analog Image
908

Generate Bright Exposure Image Based on Analog Image
910

Generate Combined HDR Image Based on Dark Exposure Image, Medium Exposure Image, and Bright Exposure Image
912

Generate Output HDR Image Based on Combined HDR Image and Effects Function
914

End

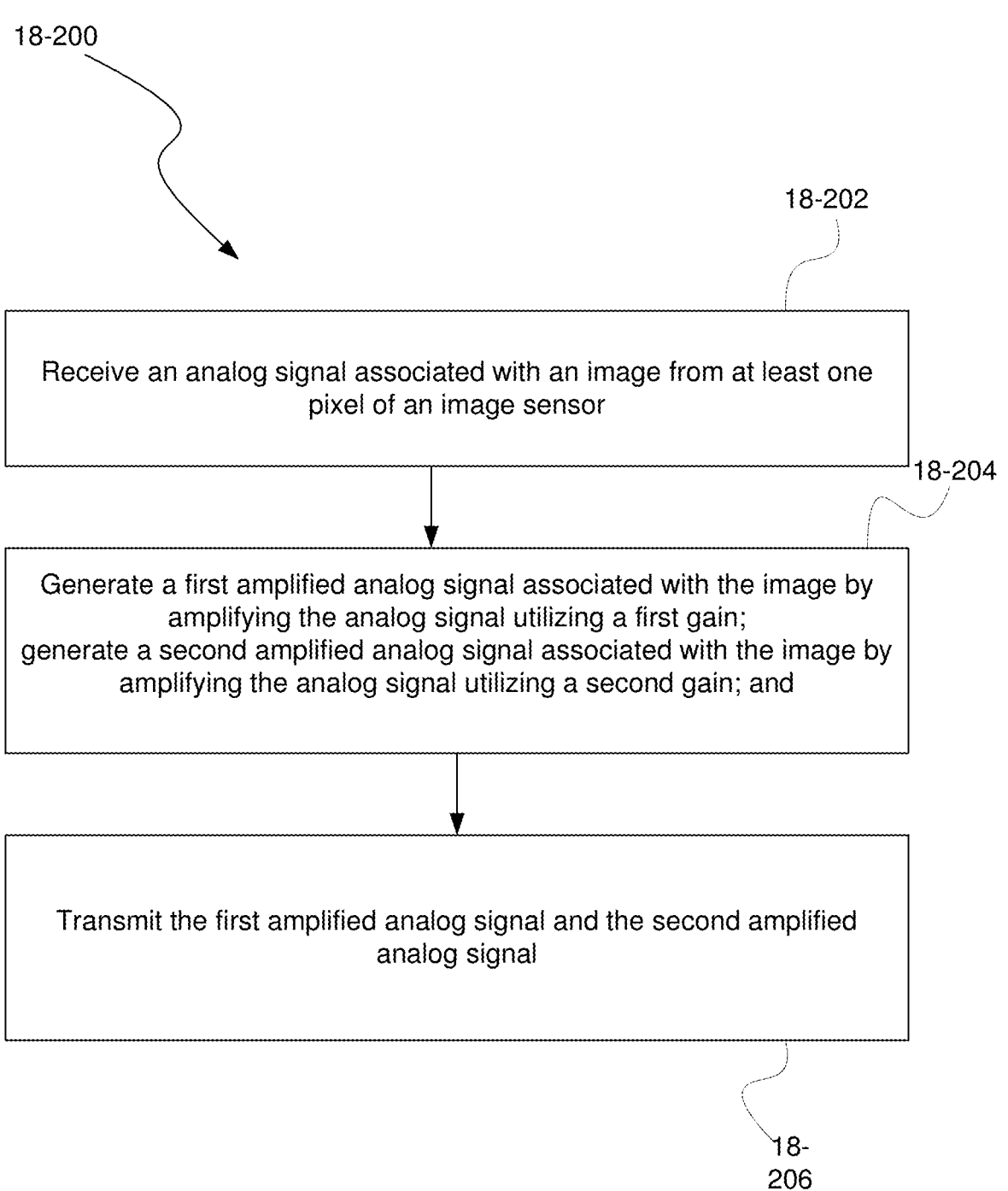

18-200

18-202

Receive an analog signal associated with an image from at least one pixel of an image sensor 18-204

Generate a first amplified analog signal associated with the image by amplifying the analog signal utilizing a first gain;
generate a second amplified analog signal associated with the image by amplifying the analog signal utilizing a second gain; and Transmit the first amplified analog signal and the second amplified analog signal 18-206

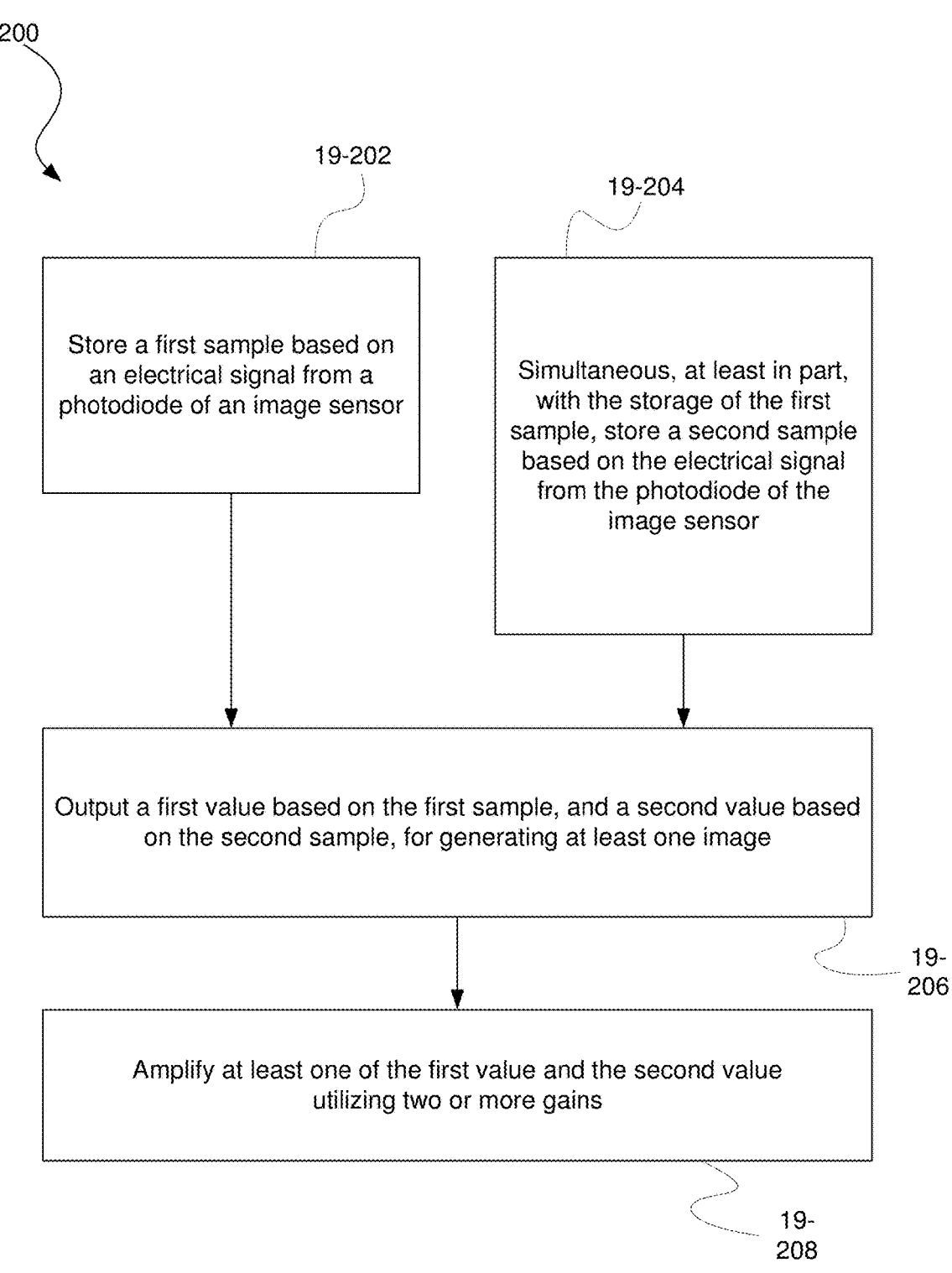

19-200

19-202

19-204

Store a first sample based on an electrical signal from a photodiode of an image sensor Simultaneous, at least in part, with the storage of the first sample, store a second sample based on the electrical signal from the photodiode of the image sensor Output a first value based on the first sample, and a second value based on the second sample, for generating at least one image 19-206

Amplify at least one of the first value and the second value utilizing two or more gains 19-208

Figure 19-2

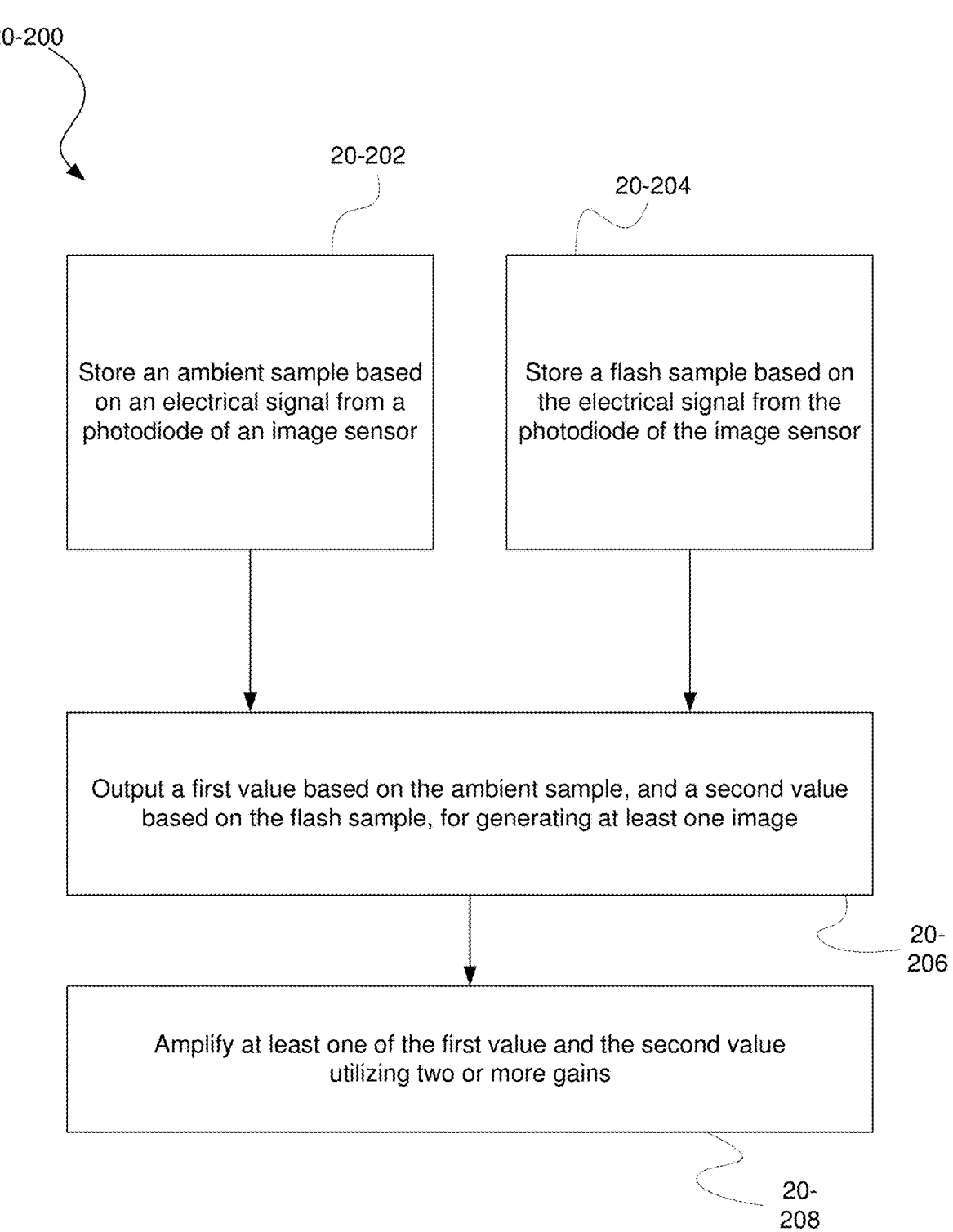

20-200

20-202

20-204

Store an ambient sample based on an electrical signal from a photodiode of an image sensor Store a flash sample based on the electrical signal from the photodiode of the image sensor Output a first value based on the ambient sample, and a second value based on the flash sample, for generating at least one image 20-206

Amplify at least one of the first value and the second value utilizing two or more gains 20-208

Figure 20-2

Analog Storage Plane 21-806

21-802

Analog Storage Plane 21-846

21-842

Blend Operation
22-270

Strobe Image 22-310

H-res

V-res

Ambient Image 22-320

H-res

V-res

Strobe
Pixel
22-312

Ambient
Pixel
22-322

Blend Function 22-330

Blended Pixel
322-32

V-res

H-res

Blended Image 22-280

22-
600

Receive Trigger Command
22-610

Sample Strobe Image and Ambient Image
22-612

Generate Blended Image
from Strobe Image and Ambient Image
22-614

Present Blended Image, Strobe Image, and
Ambient Image in Adjustment Tool
22-616

Save Adjusted Image
22-690

22-700

Receive Strobe Image and Ambient Image
22-710

Generate Blended Image from Strobe Image
and Ambient Image
22-712

Save Blended Image
22-790

22-702

Receive Strobe Image and Ambient Image
22-720

Generate Color Corrected Strobe Image from
Strobe Image and Ambient Image
22-722

Generate Blended Image from Color
Corrected Strobe Image and Ambient Image
22-724

Save Blended Image
22-792

23-100

23-102

Receive pixel stream including at least two exposures per pixel from a plurality of pixels of an image sensor 23-104

Generate a high dynamic range (HDR) pixel stream by performing HDR mixing on the received pixel stream Output the HDR pixel stream 23-106

23-200

23-208

SYSTEMS AND METHODS FOR GENERATING A HIGH-DYNAMIC RANGE (HDR) PIXEL STREAM

RELATED APPLICATIONS

The present application is a continuation of U.S. patent Ser. No. 18/930,887 filed Oct. 29, 2024, which is a continuation in part, by virtue of the removal of subject matter (that was either expressly disclosed or incorporated by reference in one or more priority applications), with the purpose of claiming priority to and including herewith the full express and incorporated disclosure of U.S. patent application Ser. No. 14/536,524, now U.S. Pat. No. 9,160,936, entitled "SYSTEMS AND METHODS FOR GENERATING A HIGH-DYNAMIC RANGE (HDR) PIXEL STREAM," filed Nov. 7, 2014, which, at the time of the aforementioned Nov. 7, 2014 filing, included (either expressly or by incorporation) a combination of the following applications, which are all incorporated herein by reference in their entirety for all purposes:

U.S. patent application Ser. No. 14/534,079, now U.S. Pat. No. 9,137,455, entitled "IMAGE SENSOR APPARATUS AND METHOD FOR OBTAINING MULTIPLE EXPOSURES WITH ZERO INTERFRAME TIME," filed Nov. 5, 2014, now U.S. Pat. No. 9,137,455 (which incorporated by reference U.S. patent application Ser. No. 13/999,678, now U.S. Pat. No. 9,807,322, filed Mar. 14, 2014, entitled "SYSTEMS AND METHODS FOR DIGITAL IMAGE SENSOR);

U.S. patent application Ser. No. 14/534,068, now U.S. Pat. No. 9,167,174, entitled "SYSTEMS AND METHODS FOR HIGH-DYNAMIC RANGE IMAGES," filed on Nov. 5, 2014;

U.S. patent application Ser. No. 14/534,089, now U.S. Pat. No. 9,167,169, entitled "IMAGE SENSOR APPARATUS AND METHOD FOR SIMULTANEOUSLY CAPTURING MULTIPLE IMAGES," filed Nov. 5, 2014;

U.S. patent application Ser. No. 14/535,274, now U.S. Pat. No. 9,154,708, entitled "IMAGE SENSOR APPARATUS AND METHOD FOR SIMULTANEOUSLY CAPTURING FLASH AND AMBIENT ILLUMINATED IMAGES," filed Nov. 6, 2014;

U.S. patent application Ser. No. 14/535,279, now U.S. Pat. No. 9,179,085, entitled "IMAGE SENSOR APPARATUS AND METHOD FOR OBTAINING LOW-NOISE, HIGH-SPEED CAPTURES OF A PHOTOGRAPHIC SCENE" filed Nov. 6, 2014; and U.S. patent application Ser. No. 13/573,252, now U.S. Pat. No. 8,976,264, entitled "COLOR BALANCE IN DIGITAL PHOTOGRAPHY," filed Sep. 4, 2012.

To accomplish the above, U.S. patent Ser. No. 18/930,887 is a continuation in part of, and claims priority to, U.S. patent application Ser. No. 18/646,581, entitled "IMAGE SENSOR APPARATUS AND METHOD FOR OBTAINING MULTIPLE EXPOSURES WITH ZERO INTERFRAME TIME," filed Apr. 25, 2024, which in turn is a continuation of, and claims priority to U.S. patent application Ser. No. 17/321,166, entitled, "IMAGE SENSOR APPARATUS AND METHOD FOR OBTAINING MULTIPLE EXPOSURES WITH ZERO INTERFRAME TIME," filed May 14, 2021, now U.S. Pat. No. 12,003,864, which in turn is a continuation of, and claims priority to U.S. patent application Ser. No. 16/857,016, entitled "IMAGE SENSOR APPARATUS AND METHOD FOR OBTAINING MULTIPLE EXPOSURES WITH ZERO INTER- FRAME TIME," filed Apr. 23, 2020, now U.S. Pat. No. 11,025,831, which in turn is a continuation of, and claims priority to U.S. patent application Ser. No. 16/519,244, entitled "IMAGE SENSOR APPARATUS AND METHOD FOR OBTAINING MULTIPLE EXPOSURES WITH ZERO INTERFRAME TIME," filed Jul. 23, 2019, now U.S. Pat. No. 10,652,478, which in turn is a continuation of, and claims priority to U.S. patent application Ser. No. 15/891, 251, entitled "IMAGE SENSOR APPARATUS AND METHOD FOR OBTAINING MULTIPLE EXPOSURES WITH ZERO INTERFRAME TIME," filed Feb. 7, 2018, which in turn, is a continuation of, and claims priority to U.S. patent application Ser. No. 14/823,993, entitled "IMAGE SENSOR APPARATUS AND METHOD FOR OBTAINING MULTIPLE EXPOSURES WITH ZERO INTERFRAME TIME," filed Aug. 11, 2015, now U.S. Pat. No. 9,918,017.

Additionally, U.S. patent application Ser. No. 14/823,993 is a continuation-in-part of, and claims priority to U.S. patent application Ser. No. 14/536,524, now U.S. Pat. No. 9,160,936, entitled "SYSTEMS AND METHODS FOR GENERATING A HIGH-DYNAMIC RANGE (HDR) PIXEL STREAM," filed Nov. 7, 2014, which is herein incorporated by reference in its entirety for all purposes.

FIELD OF THE INVENTION

The present invention relates to digital photographic systems, and more particularly to systems and methods for high-dynamic range images.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is metered differently, and then merging the multiple captures to create an image with a larger dynamic range.

SUMMARY

A system, method, and computer program product are provided for high-dynamic range images. In use, a first pixel attribute of a first pixel is received and a second pixel attribute of a second pixel is received. Next, a scalar based on the first pixel attribute and the second pixel attribute is identified. Finally, the first pixel and the second pixel are blended, based on the scalar, wherein the first pixel is brighter than the second pixel. Additional systems, methods, and computer program products are also presented.

BRIEF DESCRIPTION OF THE DRAWINGS

FIG. 9 illustrates a method for generating a HDR pixel based on combined HDR pixel and an effects function, in accordance with another embodiment.

FIG. 18-1 illustrates an exemplary system for obtaining multiple exposures with zero interframe time, in accordance with one possible embodiment.

FIG. 18-2 illustrates an exemplary method carried out for obtaining multiple exposures with zero interframe time, in accordance with one embodiment.

FIGS. 18-3A-18-3E illustrate systems for converting optical scene information to an electronic representation of a photographic scene, in accordance with other embodiments.

FIG. 18-4 illustrates a system for converting analog pixel data to digital pixel data, in accordance with an embodiment.

FIG. 18-5 illustrates a system for converting analog pixel data of an analog signal to digital pixel data, in accordance with another embodiment.

FIG. 18-6 illustrates various timing configurations for amplifying analog signals, in accordance with other embodiments.

FIG. 18-7 illustrates a system for converting in parallel analog pixel data to multiple signals of digital pixel data, in accordance with one embodiment.

FIG. 18-8 illustrates a message sequence for generating a combined image utilizing a network, according to another embodiment.

FIG. 19-1 illustrates an exemplary system for simultaneously capturing multiple images.

FIG. 19-2 illustrates an exemplary method carried out for simultaneously capturing multiple images.

FIG. 19-3 illustrates a circuit diagram for a photosensitive cell, according to one embodiment.

FIG. 19-4 illustrates a system for converting analog pixel data of more than one analog signal to digital pixel data, in accordance with another embodiment.

FIG. 20-1 illustrates an exemplary system for simultaneously capturing flash and ambient illuminated images, in accordance with an embodiment.

FIG. 20-2 illustrates an exemplary method carried out for simultaneously capturing flash and ambient illuminated images, in accordance with an embodiment.

FIG. 20-3 illustrates a system for converting analog pixel data of more than one analog signal to digital pixel data, in accordance with another embodiment.

FIG. 20-4A illustrates a user interface system for generating a combined image, according to an embodiment.

FIG. 20-4B illustrates another user interface system for generating a combined image, according to one embodiment.

FIG. 20-4C illustrates user interface (UI) systems displaying combined images with differing levels of strobe exposure, according to an embodiment.

FIG. 21-1 illustrates an exemplary system for obtaining low-noise, high-speed captures of a photographic scene, in accordance with one embodiment.

FIG. 21-2 illustrates an exemplary system for obtaining low-noise, high-speed captures of a photographic scene, in accordance with another embodiment.

FIG. 21-3A illustrates a circuit diagram for a photosensitive cell, according to one embodiment.

FIG. 21-3B illustrates a circuit diagram for another photosensitive cell, according to another embodiment.

FIG. 21-3C illustrates a circuit diagram for a plurality of communicatively coupled photosensitive cells, according to yet another embodiment.

FIG. 21-4 illustrates implementations of different analog storage planes, in accordance with another embodiment.

FIG. 21-5 illustrates a system for converting analog pixel data of an analog signal to digital pixel data, in accordance with another embodiment.

FIG. 22-1B illustrates a second data flow process for generating a blended image based on at least an ambient image and a strobe image, according to one embodiment of the present invention;

FIG. 22-1C illustrates a third data flow process for generating a blended image based on at least an ambient image and a strobe image, according to one embodiment of the present invention;

FIG. 22-1D illustrates a fourth data flow process for generating a blended image based on at least an ambient image and a strobe image, according to one embodiment of the present invention;

FIG. 22-2A illustrates an image blend operation for blending a strobe image with an ambient image to generate a blended image, according to one embodiment of the present invention;

FIG. 22-2B illustrates a blend function for blending pixels associated with a strobe image and an ambient image, according to one embodiment of the present invention;

FIG. 22-2C illustrates a blend surface for blending two pixels, according to one embodiment of the present invention;

FIG. 22-2D illustrates a blend surface for blending two pixels, according to another embodiment of the present invention;

FIG. 22-2E illustrates an image blend operation for blending a strobe image with an ambient image to generate a blended image, according to one embodiment of the present invention;

FIG. 22-3A illustrates a patch-level analysis process for generating a patch correction array, according to one embodiment of the present invention;

FIG. 22-3B illustrates a frame-level analysis process for generating frame-level characterization data, according to one embodiment of the present invention;

FIG. 22-4A illustrates a data flow process for correcting strobe pixel color, according to one embodiment of the present invention;

FIG. 22-4B illustrates a chromatic attractor function, according to one embodiment of the present invention;

FIG. 22-5 is a flow diagram of method steps for generating an adjusted digital photograph, according to one embodiment of the present invention;

FIG. 22-6A is a flow diagram of method steps for blending a strobe image with an ambient image to generate a blended image, according to a first embodiment of the present invention;

FIG. 22-6B is a flow diagram of method steps for blending a strobe image with an ambient image to generate a blended image, according to a second embodiment of the present invention;

FIG. 22-7A is a flow diagram of method steps for blending a strobe image with an ambient image to generate a blended image, according to a third embodiment of the present invention;

FIG. 22-7B is a flow diagram of method steps for blending a strobe image with an ambient image to generate a blended image, according to a fourth embodiment of the present invention;

FIG. 23-1 illustrates an exemplary method for generating a high dynamic range (HDR) pixel stream, in accordance with an embodiment.

FIG. 23-2 illustrates a system for generating a HDR pixel stream, in accordance with another embodiment.

FIG. 23-3 illustrates a system for receiving a pixel stream and outputting a HDR pixel stream, in accordance with another embodiment.

FIG. 24-1A illustrates a flow chart of a method for generating an image stack comprising two or more images of a photographic scene, in accordance with one embodiment;

FIG. 24-1B illustrates a flow chart of a method for generating an image stack comprising an ambient image and a strobe image of a photographic scene, in accordance with one embodiment;

FIG. 24-2 illustrates a block diagram of image sensor, according to one embodiment of the present disclosure;

FIG. 24-3 is a circuit diagram for a photo-sensitive cell within a pixel implemented using complementary-symmetry metal-oxide semiconductor devices, according to one embodiment;

FIG. 24-4A is a circuit diagram for a first photo-sensitive cell, according to one embodiment;

FIG. 24-4B is a circuit diagram for a second photo-sensitive cell, according to one embodiment;

FIG. 24-4C is a circuit diagram for a third photo-sensitive cell, according to one embodiment;

FIG. 24-4D depicts exemplary physical layout for a pixel comprising four photo-sensitive cells, according to one embodiment;

FIG. 24-5A illustrates exemplary timing for controlling cells within a pixel array to sequentially capture an ambient image and a strobe image illuminated by a strobe unit, according to one embodiment of the present disclosure;

FIG. 24-5B illustrates exemplary timing for controlling cells within a pixel array to concurrently capture an ambient image and an image illuminated by a strobe unit, according to one embodiment of the present disclosure;

FIG. 24-5C illustrates exemplary timing for controlling cells within a pixel array to concurrently capture two ambient images having different exposures, according to one embodiment of the present disclosure;

FIG. 24-5D illustrates exemplary timing for controlling cells within a pixel array to concurrently capture two ambient images having different exposures, according to one embodiment of the present disclosure;

FIG. 24-5E illustrates exemplary timing for controlling cells within a pixel array to concurrently capture four ambient images, each having different exposure times, according to one embodiment of the present disclosure; and FIG. 24-5F illustrates exemplary timing for controlling cells within a pixel array to concurrently capture three ambient images having different exposures and subsequently capture a strobe image, according to one embodiment of the present disclosure.

DETAILED DESCRIPTION

Figure 1:
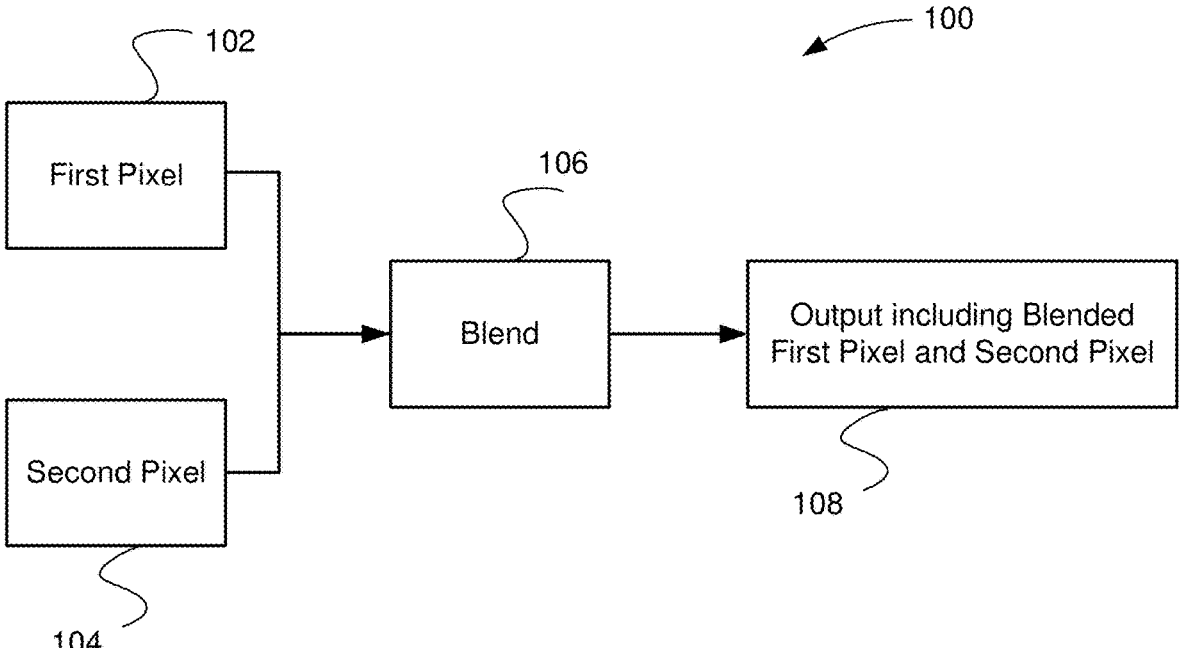
FIG. 1 illustrates an exemplary system for outputting a blended brighter and a darker pixel, in accordance with one possible embodiment.

FIG. 1 illustrates an exemplary system 100 for outputting a blended brighter and a darker pixel, in accordance with one possible embodiment. As an option, the system 100 may be implemented in the context of any of the Figures. Of course, however, the system 100 may be carried out in any desired environment. Further, the aforementioned definitions may equally apply to the description below.

As shown, the system 100 includes a first pixel 102 and a second pixel 104. In one embodiment, the first pixel may be associated with a brighter pixel, and the second pixel may be associated with a darker pixel. In the context of the present description, a brighter pixel includes any pixel that is brighter than a corresponding darker pixel, and a darker pixel includes any pixel that is darker than a corresponding brighter pixel. A brighter pixel may be associated with an image having brighter overall exposure, and a corresponding darker pixel may be associated with an image having a darker overall exposure. In various embodiments, brighter and darker pixels may be computed by combining other corresponding pixels based on intensity, exposure, color attributes, saturation, and/or any other image or pixel parameter.

In one embodiment, a brighter pixel and a darker pixel may be associated with a brighter pixel attribute and a darker pixel attribute, respectively. In various embodiments, a pixel attribute (e.g. for a brighter pixel attribute, for a darker pixel attribute, etc.) may include an intensity, a saturation, a hue, a color space value (e.g. EGB, YCbCr, YUV, etc.), a brightness, an RGB color, a luminance, a chrominance, and/or any other feature which may be associated with a pixel in some manner.

Additionally, the first pixel 102 and the second pixel 104 are inputs to a blend process 106. In one embodiment, the blending may be based on one or more features associated with the pixels. For example, blending may include a spatial positioning feature wherein the pixel of the brighter pixel is aligned with a corresponding pixel of the darker pixel. Of course, any other relevant techniques known in the art may be used to align corresponding pixels on more than one image.

In other embodiments, various techniques to blend may be used, including taking an average of two or more pixel points, summing and normalizing a color attribute associated with each pixel point (e.g. a summation of a red/green/blue component in a RGB color space, etc.), determining a RGB (or any color space) vector length which may then be normalized, using an average pixel point in combination with a brighter pixel or a darker pixel, and/or using any other combination to blend two or more pixel points. In one embodiment, blending may occur independent of any color values or color spaces. In another embodiment, blending may include mixing two or more pixel points. In a specific embodiment, blending may include an OpenGL (or any vector rendering application) Mix operation whereby the operation linearly interpolates between two input values.

In one embodiment, blending may occur automatically or may be based on user input. For example, in some embodiments, the blending may occur automatically based on one or more set targets, including, for example, a set exposure point, a set focus value, a set temperature (e.g. Kelvin scale, etc.), a predetermined white point value, a predetermined color saturation value, a predetermined normalizing value (e.g. for color space characteristics, etc.), a predetermined levels value, a predetermined curves value, a set black point, a set white point, a set median value point, and/or any other feature of the pixel or image which may be used as a basis for blending. In other embodiments, features associated with the camera may be used as a basis for determining one or more automatic values. For example, a camera may include metadata associated with the pixels, including the ISO value, an exposure value, an aperture value, a histogram distribution, a geo positioning coordinate, an identification of the camera, an identification of the lens, an identification of the user of the camera, the time of day, and/or any other value which may be associated with the camera. In one embodiment, the metadata associated with the pixels may be used to set one or more automatic points for automatically blending.

In one embodiment, such automatic features may be inputted or based, at least in part, on cloud-based input or feedback. For example, a user may develop a set of batch rules or a package of image settings which should be applied to future images. Such settings can be saved to the cloud and/or to any other memory device which can subsequently be accessed by the camera device or module. As an example, a user may use a mobile device for taking and editing photos. Based on such past actions taken (e.g. with respect to editing the pixels or images, etc.), the user may save such actions as a package to be used for future images or pixels received. In other embodiments, the mobile device may recognize and track such actions taken by the user and may prompt the user to save the actions as a package to be applied for future received images or pixels.

In other embodiments, a package of actions or settings may also be associated with third party users. For example, such packages may be received from an online repository (e.g. associated with users on a photo sharing site, etc.), or may be transferred device-to-device (e.g. Bluetooth, NFC, Wifi, Wifi-direct, etc.). In one embodiment, a package of actions or settings may be device specific. For example, a specific device may be known to overexpose images or tint images and the package of actions or settings may be used to correct a deficiency associated with the device, camera, or lens. In other embodiments, known settings or actions may be improved upon. For example, the user may wish to create a black and white to mimic an Ansel Adams type photograph. A collection of settings or actions may be applied which is based on the specific device receiving the pixels or images (e.g. correct for deficiencies in the device, etc.), feedback from the community on how to achieve the best looking Ansel Adams look (e.g. cloud based feedback, etc.), and/or any other information which may be used to create the Ansel Adams type photograph.

In a separate embodiment, the blending may occur based on user input. For example, a number of user interface elements may be displayed to the user on a display, including an element for controlling overall color of the image (e.g. sepia, graytone, black and white, etc.), a package of target points to create a feel (e.g. a Polaroid feel package would have higher exposure with greater contrast, an intense feel package which would increase the saturation levels, etc.), one or more selective colors of an image (e.g. only display one or more colors such as red, blue, yellow, etc.), a saturation level, an exposure level, an ISO value, a black point, a white point, a levels value, a curves value, and/or any other point which may be associated with the image or pixel. In various embodiments, a user interface element may be used to control multiple values or points (e.g. one sliding element controls a package of settings, etc.), or may also be used to allow the user to control each and every element associated with the image or pixel.

Of course, in other embodiments, the blending may occur based on one or more automatic settings and on user input. For example, pixels or images may be blended first using one or more automatic settings, after which the user can then modify specific elements associated with the image. In other embodiments, any combination of automatic or manual settings may be applied to the blending.

In various embodiments, the blending may include mixing one or more pixels. In other embodiments, the blending may be based on a row of pixels (i.e. blending occurs row by row, etc.), by an entire image of pixels (e.g. all rows and columns of pixels, etc.), and/or in any manner associated with the pixels.

In one embodiment, the blend between two or more pixels may include applying an alpha blend. Of course, in other embodiments, any process for combining two or more pixels may be used to create a final resulting image.

As shown, after the blend process, an output 108 includes a blended first pixel and a second pixel. In one embodiment, the output may include a blended brighter and darker pixel. Additionally, the first pixel may be brighter than the second pixel.

In one embodiment, the blending of a brighter pixel and a darker pixel may result in a high dynamic range (HDR) pixel as an output. In other embodiments, the output may include a brighter pixel blended with a medium pixel to provide a first resulting pixel. The brighter pixel may be characterized by a brighter pixel attribute and the medium pixel may be characterized by a medium pixel attribute. The blend operation between the brighter pixel and the medium pixel may be based on a scalar result from a first mix value function that receives the brighter pixel attribute and the medium pixel attribute. In a further embodiment, the output may include a medium pixel blended with a darker pixel to provide a second resulting pixel. The darker pixel may be characterized by a darker pixel attribute. The blend operation between the medium pixel and the darker pixel may be based on a scalar result from a second mix value function that receives the medium pixel attribute and the darker pixel attribute. Further, in one embodiment, a scalar may be identified based on a mix value function that receives as inputs the first (e.g. brighter, etc.) pixel attribute and the second (e.g. darker, etc.) pixel attribute. The scalar may provide a blending weight between two different pixels (e.g. between brighter and medium, or between medium and darker). Lastly, in one embodiment, a mix value function (e.g. the first mix value function and the second mix value function) may include a flat region, a transition region, and a saturation region corresponding to thresholds associated with the inputs.

In one embodiment, the output may be based on a mix value surface associated with two or more pixels. For example, in one embodiment, a blending may create an intermediary value which is then used to output a final value associated with two or more pixels. In such an embodiment, the intermediary value (e.g. between two or more pixels, etc.) may be used to compute a value associated with a three-dimensional (3D) surface. The resulting pixel may be associated with the value computed using the intermediary value. Of course, in a variety of embodiments, the output may be associated with any type of functions, and any number of dimensions or inputs.

Figure 2:
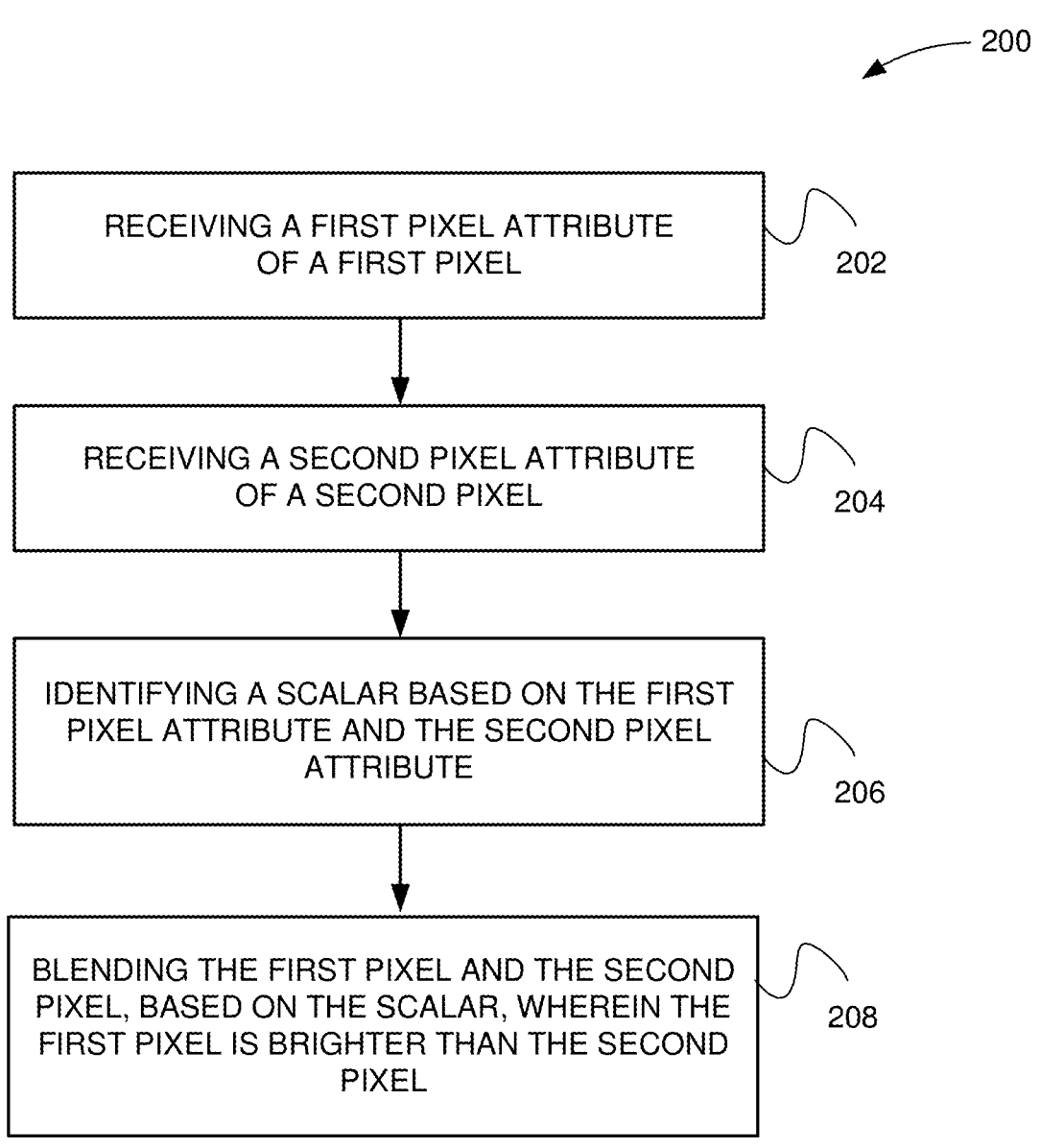
FIG. 2 illustrates a method for blending a brighter pixel and a darker pixel, in accordance with one embodiment.

FIG. 2 illustrates a method 200 for blending a brighter pixel and a darker pixel, in accordance with one embodiment. As an option, the method 200 may be implemented in the context of any of the Figures. Of course, however, the method 200 may be carried out in any desired environment. Further, the aforementioned definitions may equally apply to the description below.

As shown, a first pixel attribute of a first pixel is received. See operation 202. Additionally, a second pixel attribute of a second pixel is received. See operation 204. In one embodiment, the first pixel attribute may correspond with a brighter pixel attribute, the first pixel may correspond with a brighter pixel, the second pixel attribute may correspond with a darker pixel attribute, and the second pixel may correspond with a darker pixel.

In one embodiment, a brighter pixel attribute and a darker pixel attribute each may include an intensity. In one embodiment, the intensity may correspond to a first value of a numeric range (e.g. 0.0 to 1.0) for the first pixel, and a second value of the numeric range for the second pixel. In other embodiments, a first (e.g. brighter, etc.) pixel attribute and a second (e.g. darker, etc.) pixel attribute each may include a saturation, a hue, a color space value (e.g. EGB, YCbCr, YUV, etc.), a brightness, hue, an RGB color, a luminance, a chrominance, and/or any other feature which may be associated with a pixel in some manner.

In another embodiment, a medium pixel attribute of a medium pixel that may be darker than a brighter pixel and brighter than a darker pixel, may be received. In another embodiment, a dark exposure parameter and a bright exposure parameter may be estimated, wherein the bright exposure parameter may be used for receiving the first (e.g. brighter, etc.) pixel attribute of the first (e.g. brighter, etc.) pixel, and the second (e.g. dark, etc.) exposure parameter may be used for receiving the second (e.g. darker, etc.) pixel attribute of the darker pixel. Further, in another embodiment, the dark exposure parameter and the bright exposure parameter may be associated with an exposure time. Still yet, in one embodiment, a medium exposure parameter may be estimated, wherein the medium exposure parameter is used for receiving a medium pixel attribute of a medium pixel.

In an additional embodiment, a medium pixel attribute of a medium pixel may be received, wherein a brighter pixel is associated with a first value, a darker pixel is associated with a second value, and a medium pixel is associated with a third value, the third value being in between the first value and the second value. Additionally, a first resulting pixel may include a first HDR pixel, and a second resulting pixel may include a second HDR pixel, such that the combined pixel may be generated by combining the first HDR pixel and the second HDR pixel based on a predetermined function to generate the combined pixel which may include a third HDR pixel.

As shown, a scalar is identified based on the first pixel attribute and the second pixel attribute. See operation 206.

In various embodiments, the scalar may be identified by generating, selecting, interpolating, and/or any other operation which may result in a scalar. In a further embodiment, the scalar may be identified utilizing one or more polynomials.

In one embodiment, a first one of the polynomials may have a first order that may be different than a second order of a second one of the polynomials. In another embodiment, a first polynomial of the plurality of polynomials may be a function of the first (e.g. brighter, etc.) pixel attribute and a second polynomial of the plurality of polynomials may be a function of the second (e.g. darker, etc.) pixel attribute. Still yet, in another embodiment, a first one of the polynomials may be a function of a brighter pixel attribute and may have a first order that may be less than a second order of a second one of the polynomials that may be a function of the darker pixel attribute. Additionally, in one embodiment, the first polynomial may be at least one of a higher order, an equal order, or a lower order relative to the second polynomial.

As shown, blending the first pixel and the second pixel may be based on the scalar, wherein the first pixel is brighter than the second pixel. See operation 208.

In another embodiment, a scalar may be identified based on either a polynomial of the form $z=(1-(1-(1-x)^\wedge A))^*((1-(1-y)^\wedge C)^\wedge D)$ or a polynomial of the form $z=((1-(1-x)^\wedge A)^\wedge B)^*((1-(1-y)^\wedge C)^\wedge D)$, where z corresponds to the scalar, x corresponds to the second (e.g. darker, etc.) pixel attribute, y corresponds to the (e.g. brighter, etc.) first pixel attribute, and A, B, C, D correspond to arbitrary constants.

In one embodiment, the blending of a first (e.g. brighter, etc.) pixel and a second (e.g. darker, etc.) pixel may result in a high dynamic range (HDR) pixel as an output. In other embodiments, the blending may include identifying a first scalar based on the brighter pixel attribute and the medium pixel attribute, the first scalar being used for blending the brighter pixel and the medium pixel to provide a first resulting pixel. Additionally, in one embodiment, a second scalar based on the medium pixel attribute and the darker pixel attribute, the second scalar being used for blending the medium pixel and the darker pixel to provide a second resulting pixel.

In one embodiment, a third pixel attribute of a third pixel may be received. Additionally, a second scalar based on the second pixel attribute and the third pixel attribute may be identified. Further, based on the second scalar, the second pixel and the third pixel may be blended. Still yet, a first resulting pixel based on the blending of the first pixel and the second pixel may be generated, and a second resulting pixel based on the blending of the second pixel and the third pixel may be generated.

Additionally, in various embodiments, the first resulting pixel and the second resulting pixel are combined resulting in a combined pixel. Further, in one embodiment, the combined pixel may be processed based on an input associated with an intensity, a saturation, a hue, a color space value (e.g. RGB, YCbCr, YUV, etc.), a brightness, an RGB color, a luminance, a chrominance, and/or any other feature associated with the combined pixel. In a further embodiment, the combined pixel may be processed based on a saturation input or level mapping input.

In one embodiment, level mapping (or any input) may be performed on at least one pixel subject to the blending. In various embodiments, the level mapping (or any input) may occur in response to user input (e.g. selection of an input and/or a value associated with an input, etc.). Of course, the level mapping (or any input) may occur automatically based on a default value or setting, feedback from a cloud-based source (e.g. cloud source best settings for a photo effect, etc.), feedback from a local device (e.g. based on past photos taken by the user and analyzed the user's system, based on photos taken by others including the user within a set geographic proximity, etc.), and/or any other setting or value associated with an automatic action. In one embodiment, the level mapping may comprise an equalization operation, such as an equalization technique known in the art as contrast limited adaptive histogram equalization (CLAHE).

In some embodiments, one or more user interfaces and user interface elements may be used to receive a user input. For example, in one embodiment, a first indicia corresponding to at least one brighter point and a second indicia corresponding to at least one brighter point may be displayed, and the user input may be further capable of including manipulation of at least one of the first indicia or the second indicia. Additionally, in one embodiment, third indicia corresponding to at least one medium point may be displayed, and the user input may be further capable of including manipulation of the third indicia.

In another embodiment, a first one of the polynomials may be a function of a first pixel attribute, and a second one of the polynomials may be a function of a second pixel attribute, and the resulting pixel may be a product of the first and second polynomials. Still yet, in one embodiment, the resulting pixel may be a product of the first and second polynomials in combination with a strength function.

Additionally, in one embodiment, a strength function and/or coefficient may control a function operating on two or more pixels, including the blending (e.g. mixing, etc.) of the two or more pixels. For example, in various embodiments, the strength function may be used to control the blending of the two or more pixels, including providing no HDR effect (e.g. ev0, etc.), a full HDR effect, or even an amplification of the HDR effect. In this manner, the strength function may control the resulting pixel based on the first and second polynomials.

In another embodiment, the blending may include at one or more stages in the blending process. For example, in one embodiment, the first polynomial may be based on a single pixel attribute and the second polynomial may be based on a second single pixel attribute, and blending may include taking an average based on the first and second polynomials. In another embodiment, the first polynomial and the second polynomial may be based on an average of many pixel attributes (e.g. multiple exposures, multiple saturations, etc.), and the blending may include taking an average based on the first and second polynomials.

Of course, in one embodiment, the polynomials may be associated with a surface diagram. For example, in one embodiment, an x value may be associated with a polynomial associated with the first pixel attribute (or a plurality of pixel attributes), and a y value may be associated with a polynomial associated with the second pixel attribute (or a plurality of pixel attributes). Further, in another embodiment, a z value may be associated with a strength function. In one embodiment, a resulting pixel value may be determined by blending the x value and y value based on the z value, as determined by the surface diagram.

In an alternative embodiment, a resulting pixel value may be selected from a table that embodies the surface diagram. In another embodiment, a first value associated with a first polynomial and a second value associated with a second polynomial may each be used to select a corresponding value from a table, and the two values may be used to interpolate a resulting pixel.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
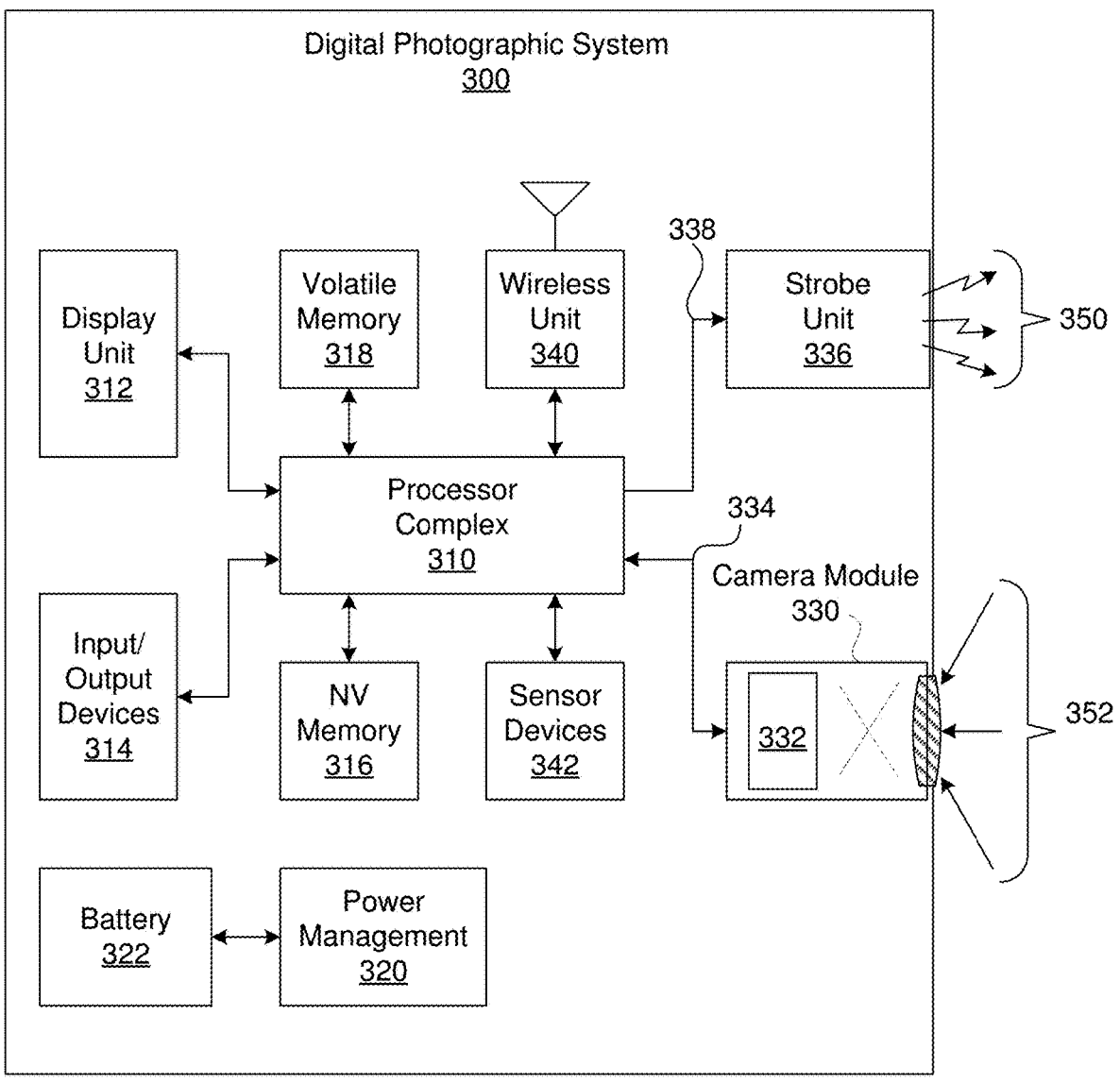
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
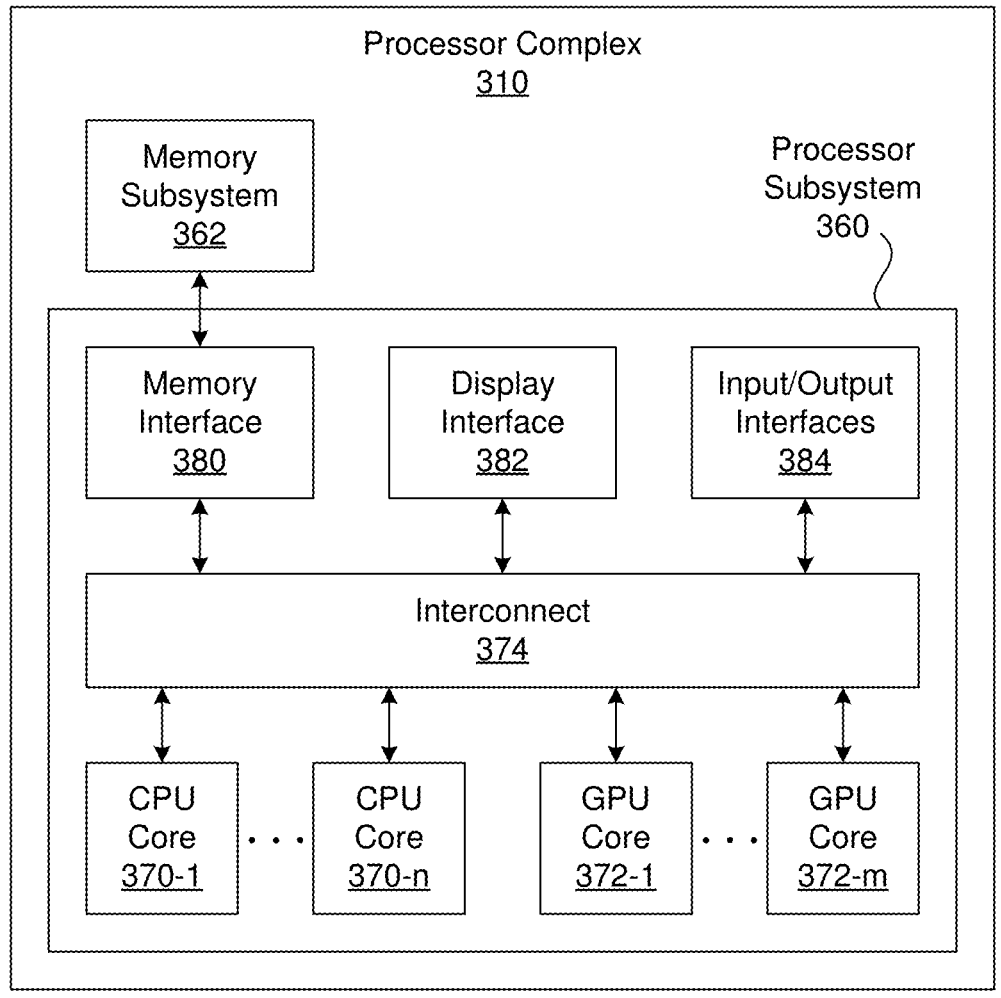
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
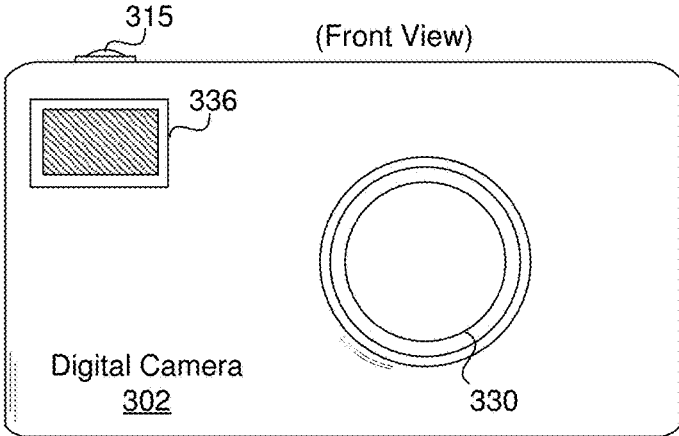
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
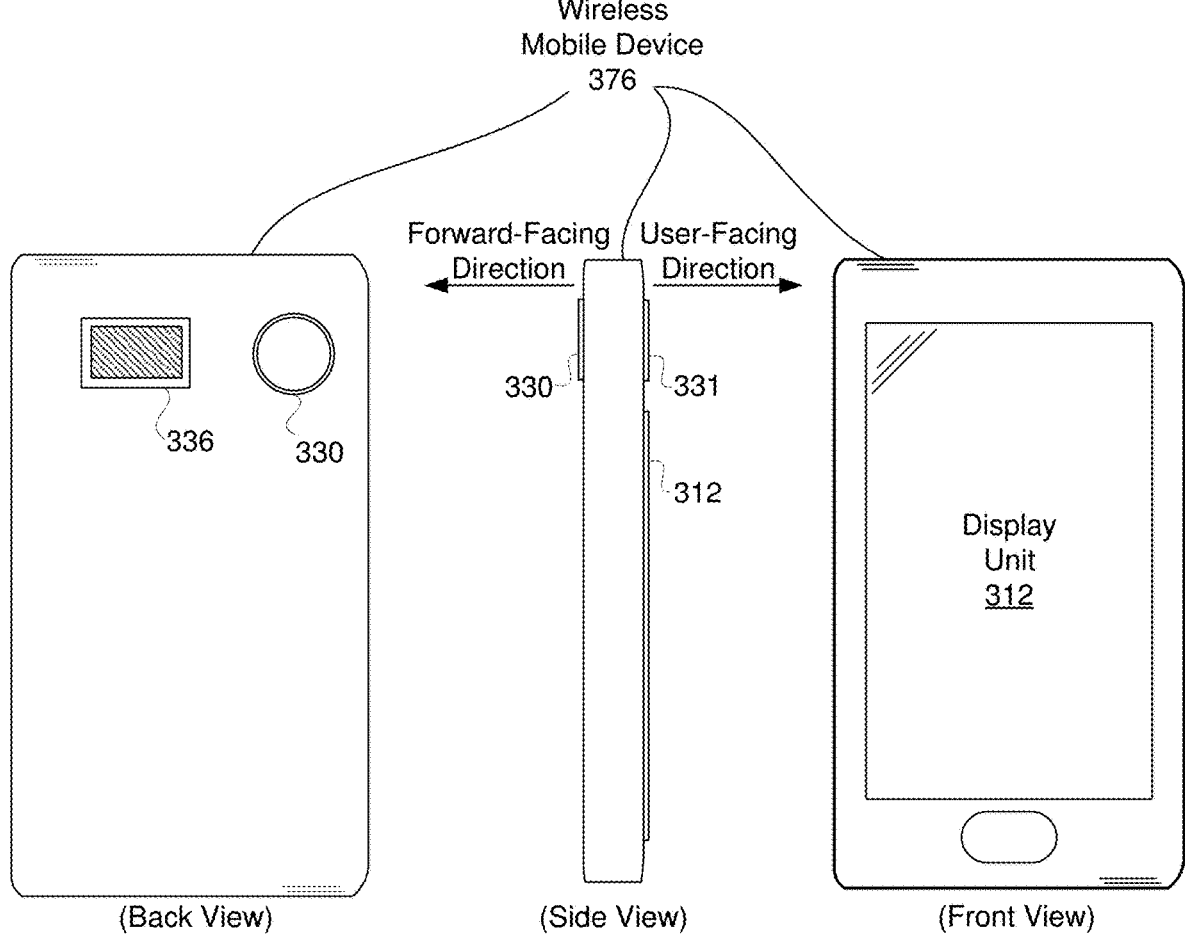
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
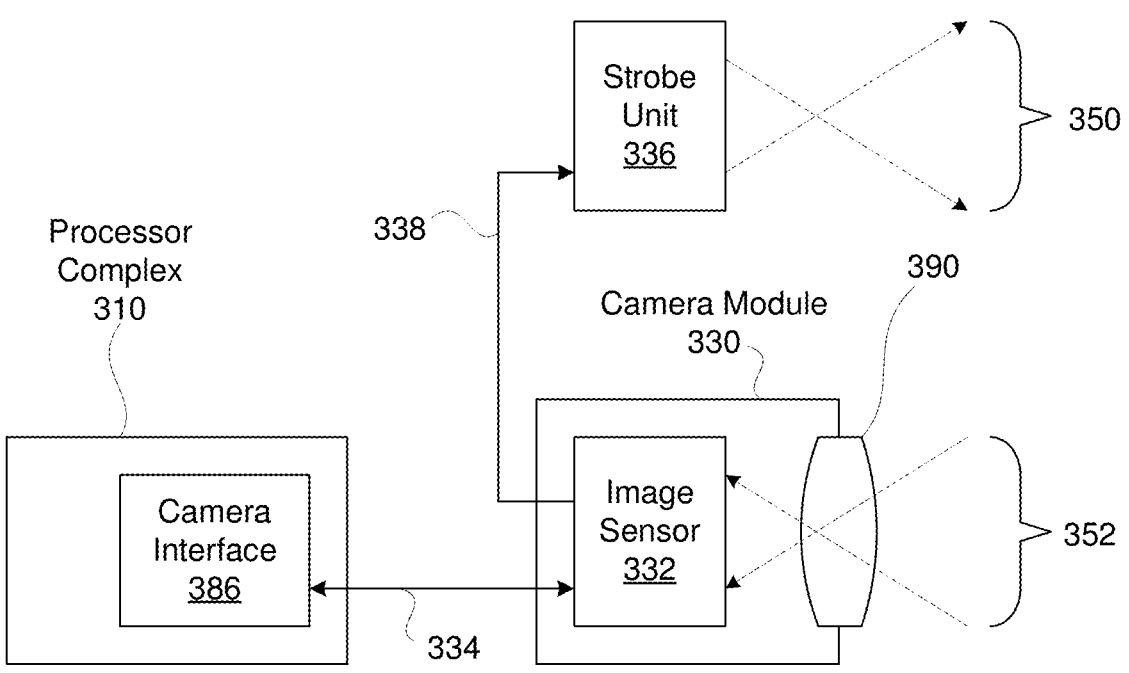
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
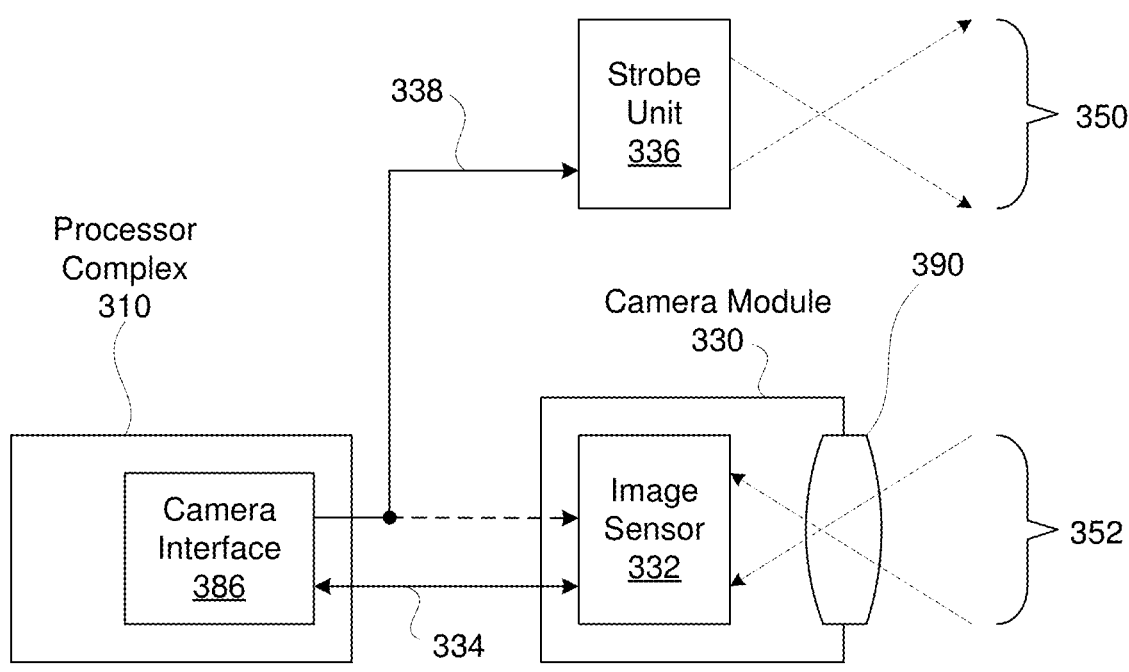
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
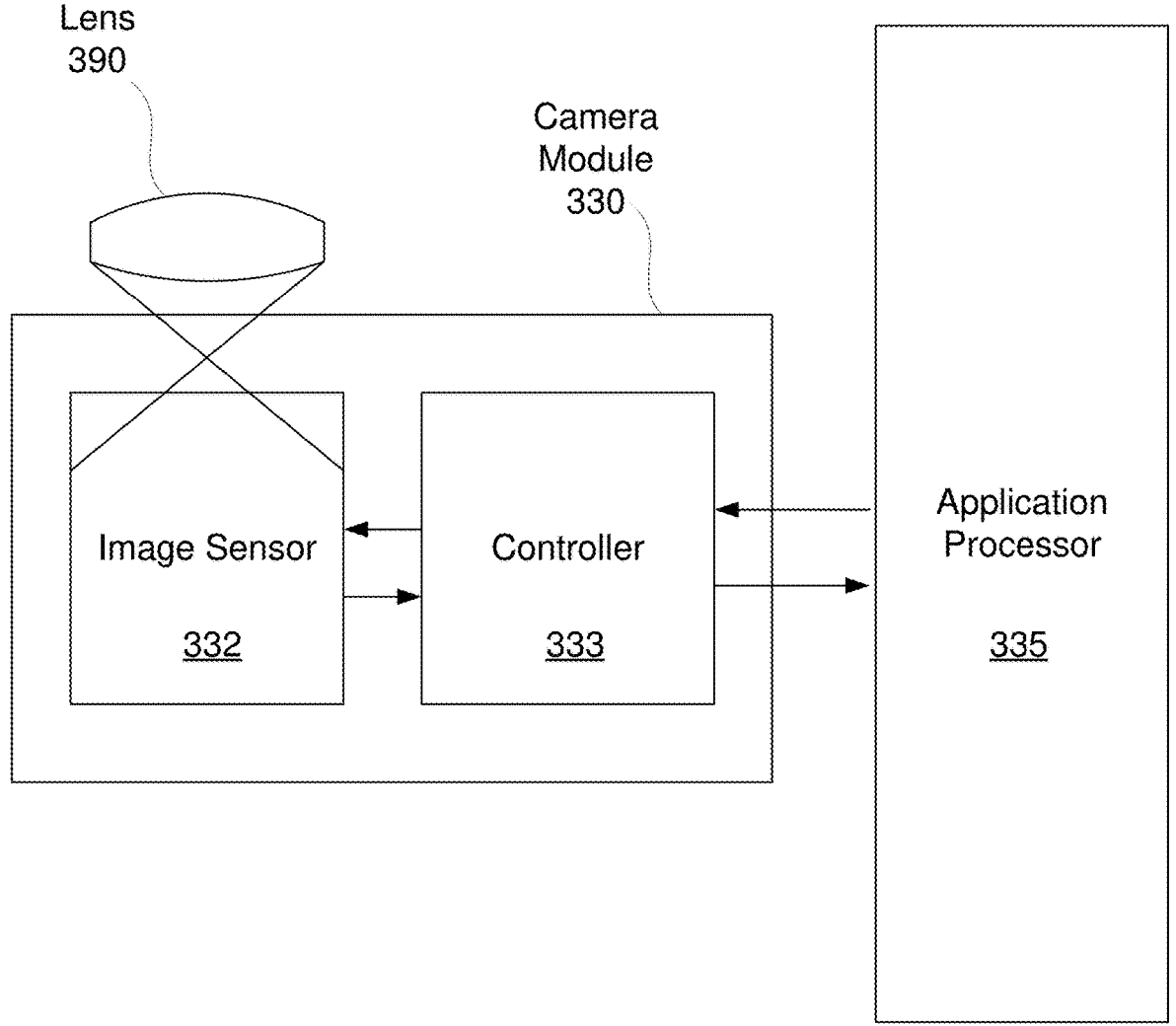
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
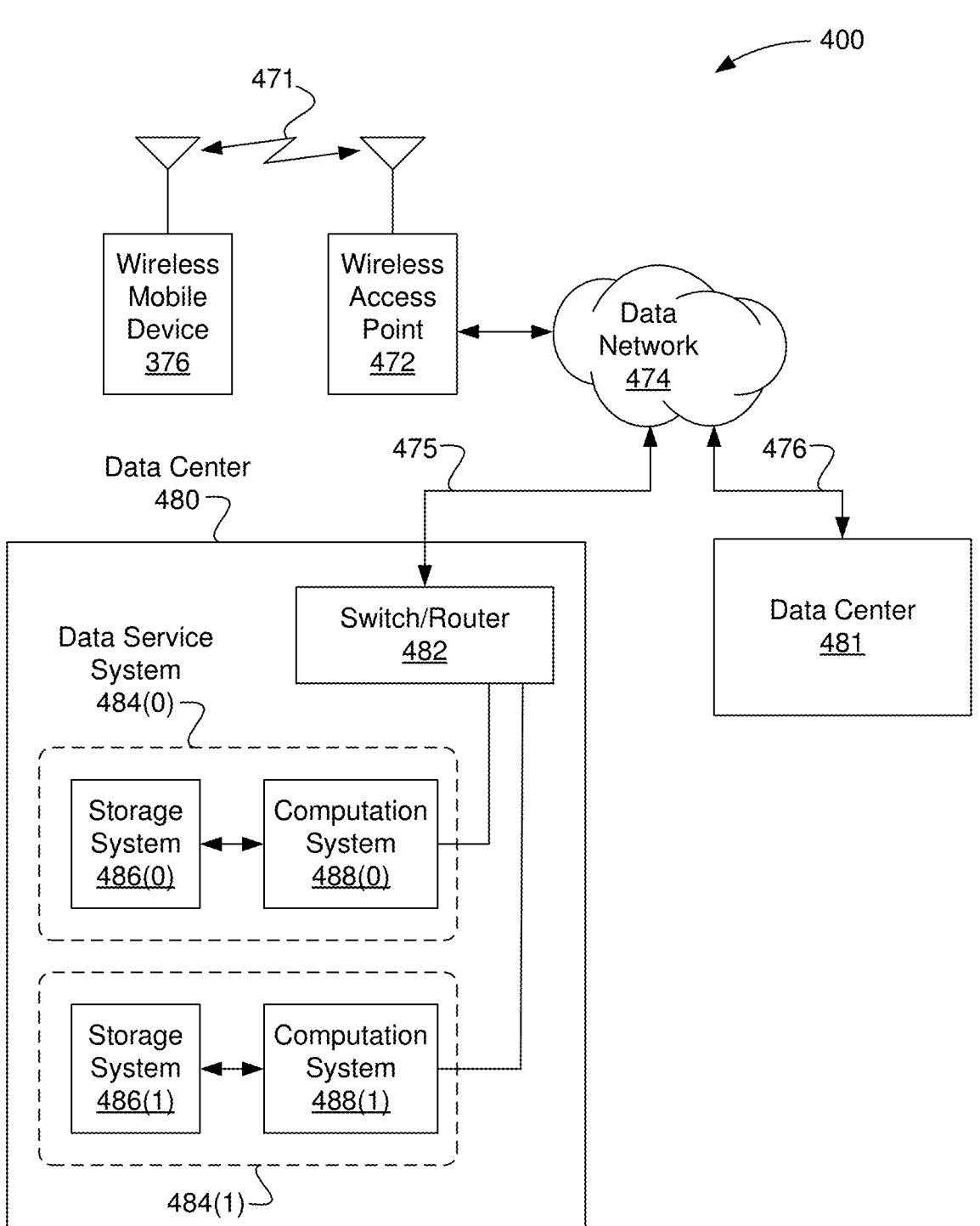
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices.

In such embodiments, digital image data may be transmitted between the two wireless mobile devices without having to send the digital image data to a data center 480.

Figure 5:
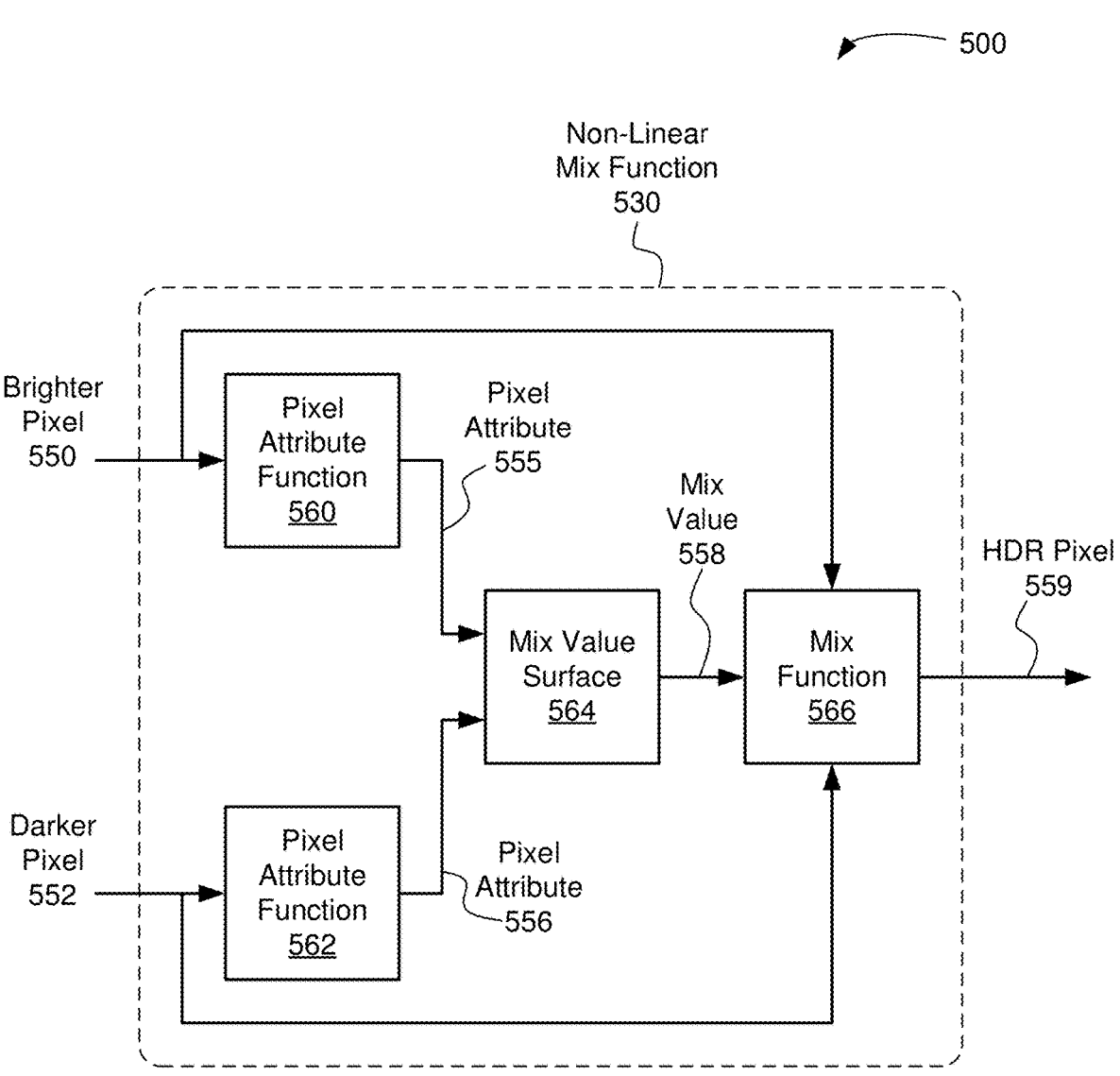
FIG. 5 illustrates a system for outputting a HDR pixel, in accordance with another embodiment.

FIG. 5 shows a system 500 for outputting a HDR pixel, in accordance with one embodiment. As an option, the system 500 may be implemented in the context of the any of the Figures. Of course, however, the system 500 may be carried out in any desired environment. Further, the aforementioned definitions may equally apply to the description below.

As shown, the system 500 includes a non-linear mix function 530. In one embodiment, the non-linear mix function 530 includes receiving a brighter pixel 550 and a darker pixel 552. In one embodiment, the brighter pixel 550 and the darker pixel 552 may be blended via a mix function 566, resulting in a HDR pixel 559.

In one embodiment, the mix function 566 may include any function which is capable of combining two input values (e.g. pixels, etc.). The mix function 566 may define a linear blend operation for generating a vec3 value associated with HDR pixel 559 by blending a vec3 value associated with the brighter pixel 550 and a vec3 value associated with the darker pixel 552 based on mix value 558. For example the mix function 566 may implement the well-known OpenGL mix function. In other examples, the mix function may include normalizing a weighted sum of values for two different pixels, summing and normalizing vectors (e.g. RGB, etc.) associated with the input pixels, computing a weighted average for the two input pixels, and/or applying any other function which may combine in some manner the brighter pixel and the darker pixel. In one embodiment, mix value 558 may range from 0 to 1, and mix function 566 mixes darker pixel 552 and brighter pixel 550 based on the mix value 558. In another embodiment, the mix value 558 ranges from 0 to an arbitrarily large value, however the mix function 566 is configured to respond to mix values greater than 1 as though such values are equal to 1. Further still, the mix value may be a scalar.

In one embodiment, a mix value function may include a product of two polynomials and may include a strength coefficient. In a specific example, the mix value function is implemented as mix value surface 564, which operates to generate mix value 558. One exemplary mix value function is illustrated below in Equation 1:

$$z = p1(x) * p2(y) * s \qquad \text{(Eq. 1)}$$

where:

z is resulting mix value for first and second pixels;

p1 is a first polynomial in x, where x may be a pixel attribute for first (darker) pixel;

p2 is a second polynomial in y, where y may be a pixel attribute for second (lighter) pixel; and s is a strength coefficient (s==0: no mixing, s==1.0: nominal mixing, s>1.0: exaggerated mixing).

In Equation 1, the strength coefficient (s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1 - (1 - (1 - x)^\wedge A)^\wedge B) * ((1 - (1 - y)^\wedge C)^\wedge D) * s \qquad \text{(Eq. 2)}$$

As shown, p1(x) of Equation 1 may be implemented in Equations 2 as the term $(1-(1-(1-x)^\wedge A)^\wedge B)$, while p2(y) of Equation 2 may be implemented as the term $((1-(1-y)^\wedge C)^\wedge D)$. In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to generate a mix value for a combination of an "EV0" pixel (e.g. a pixel from an image having an EV0 exposure), an "EV−" pixel (e.g. a pixel from an image having an exposure of EV−1, EV−2, or EV−3, etc.), and an "EV+" pixel (e.g. a pixel from an image having an exposure of EV+1, EV+2, or EV+3, etc.). Further, in another embodiment, Equation 2 may be used to generate mix values for pixels associated with images having a bright exposure, median exposure, and/or dark exposure in any combination.

Figure 10A:
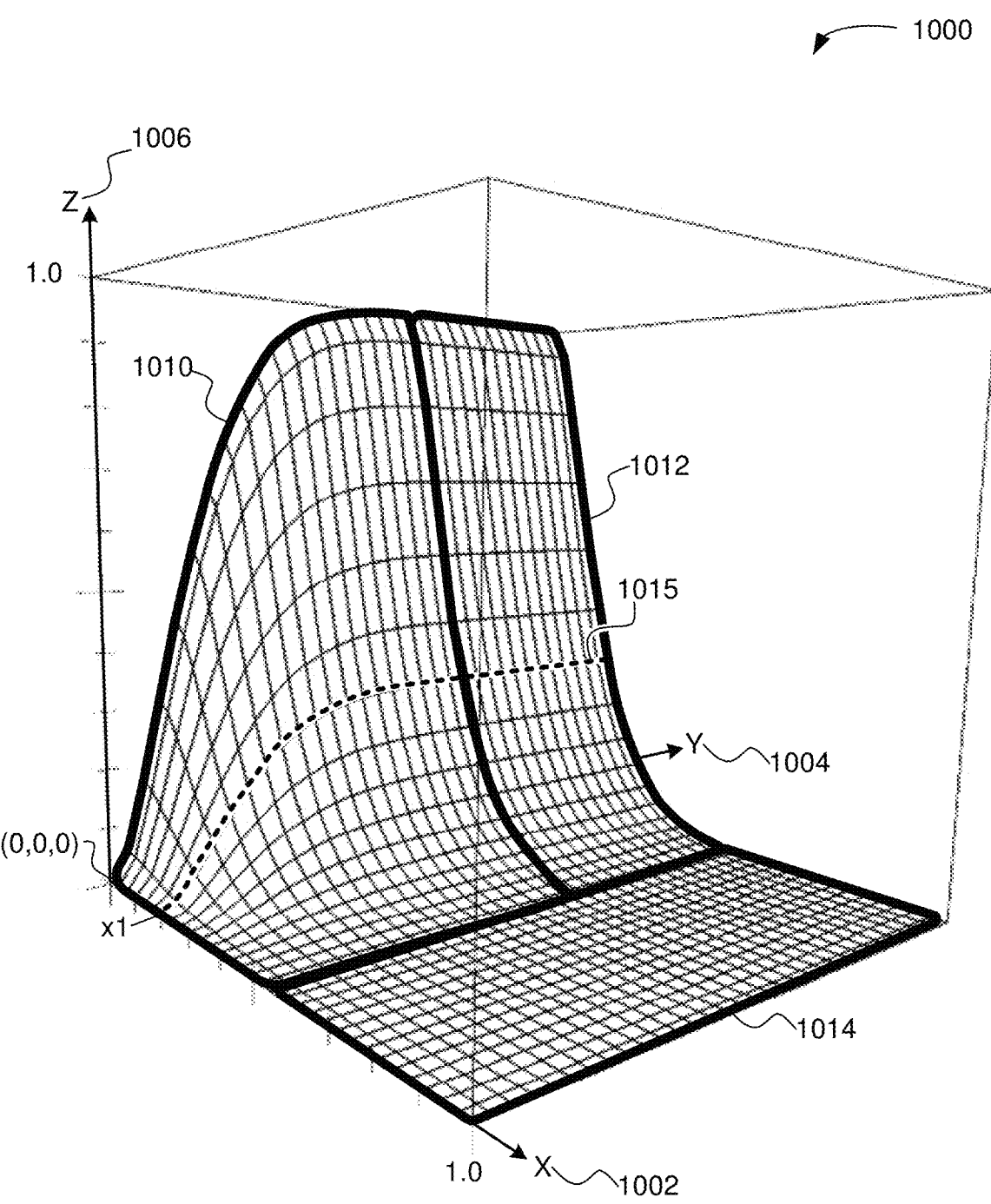
FIG. 10A illustrates a surface diagram, in accordance with another embodiment.
Figure 10B:
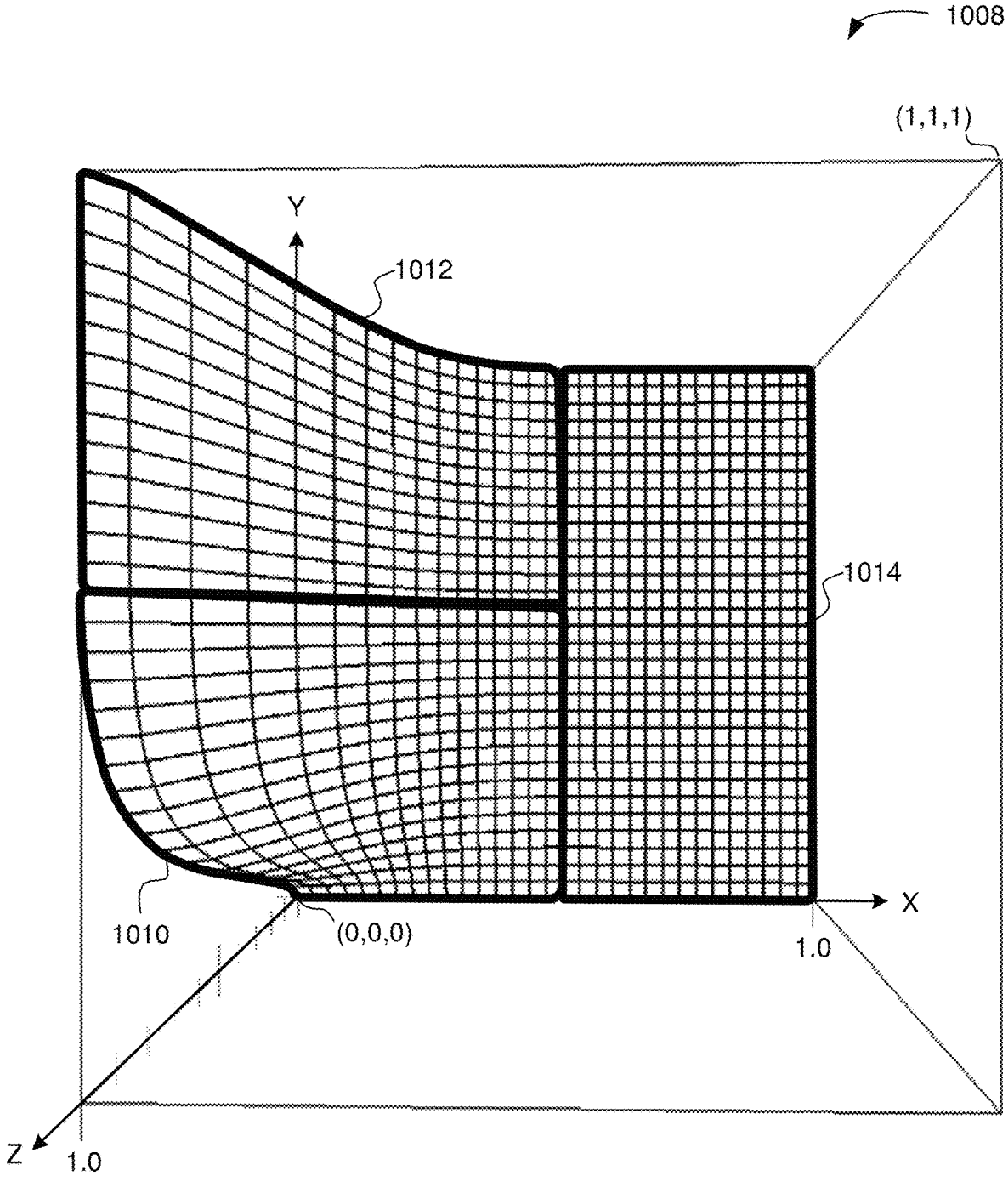
FIG. 10B illustrates a surface diagram, in accordance with another embodiment.

In another embodiment, when z=0, the darker pixel may be given full weight, and when z=1, the brighter pixel may be given full weight. In one embodiment, Equation 2 may correspond with the surface diagrams as shown in FIGS. 10A and 10B.

In another specific embodiment, a mix function may include a specific polynomial form:

$$z = ((1 - (1 - x)^\wedge A)^\wedge B) * ((1 - (1 - y)^\wedge C)^\wedge D) * s \qquad \text{(Eq. 3)}$$

As shown, p1(x) of Equation 1 may be implemented in Equations 3 as the term $((1-(1-x)^\wedge A)^\wedge B)$, while p2(y) of Equation 3 may be implemented as the term $((1-(1-y)^\wedge C)^\wedge D)$. In one embodiment, Equation 3 may include the following coefficients: A=8, B=2, C=2, and D=2. Of course, in other embodiments, other coefficient values may be used to optimize the mixing. In another embodiment, Equation 3 may be used to generate a mix value for an "EV0" pixel, and an "EV−" pixel (e.g., EV−1, EV−2, or EV−3) pixel. Further, in another embodiment, Equation 3 may be used to generate mix values for pixels associated with images having a bright exposure, median exposure, and/or dark exposure in any combination.

Figure 11A:
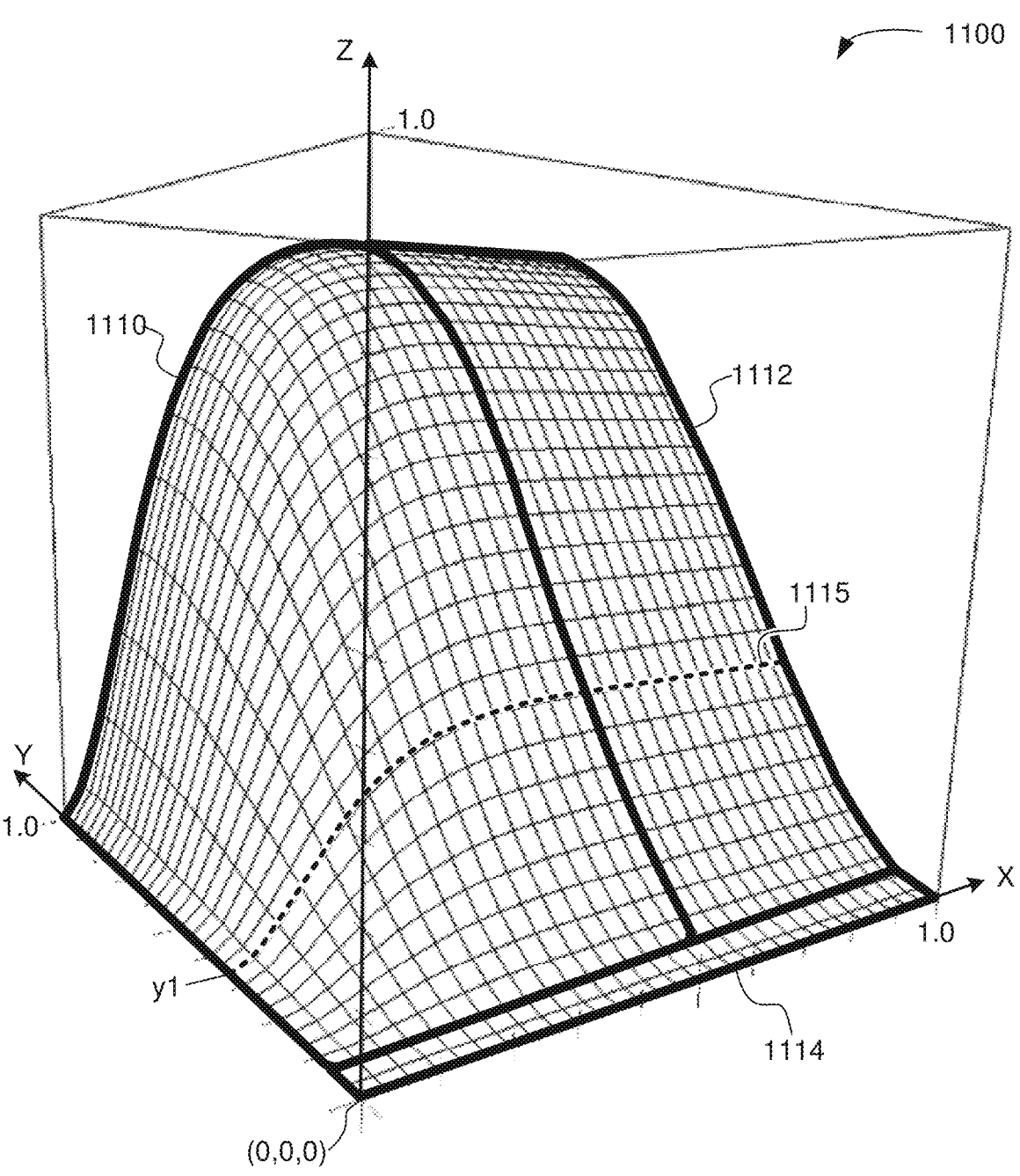
FIG. 11A illustrates a surface diagram, in accordance with another embodiment.
Figure 11B:
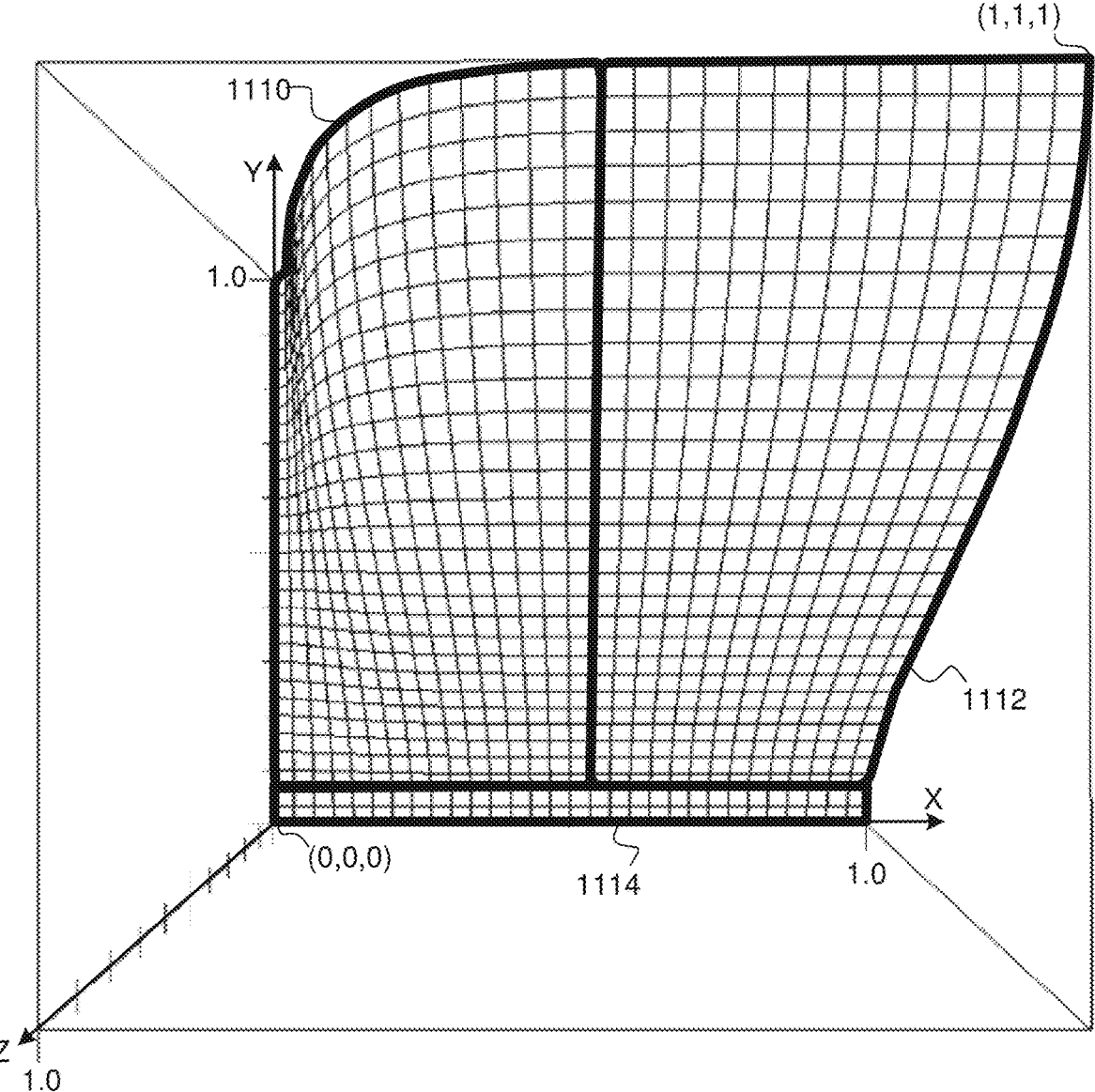
FIG. 11B illustrates a surface diagram, in accordance with another embodiment.

In another embodiment, when z=0, the brighter pixel may be given full weight, and when z=1, the darker pixel may be given full weight. In one embodiment, Equation 3 may correspond with the surface diagrams as shown in FIGS. 11A and 11B.

In another embodiment, the brighter pixel 550 may be received by a pixel attribute function 560, and the darker pixel 552 may be received a pixel attribute function 562. In various embodiments, the pixel attribute function 560 and/or 562 may include any function which is capable of determining an attribute associated with the input pixel (e.g. brighter pixel, darker pixel, etc.). For example, in various embodiments, the pixel attribute function 560 and/or 562 may include determining an intensity, a saturation, a hue, a color space value (e.g. EGB, YCbCr, YUV, etc.), an RGB blend, a brightness, an RGB color, a luminance, a chrominance, and/or any other feature which may be associated with a pixel in some manner.

In response to the pixel attribute function 560, a pixel attribute 555 associated with brighter pixel 550 results and is inputted into a mix value function, such as mix value surface 564. Additionally, in response to the pixel attribute function 562, a pixel attribute 556 associated with darker pixel 552 results and is inputted into the mix value function.

In one embodiment, a given mix value function may be associated with a surface diagram. For example, in one embodiment, an x value may be associated with a polynomial associated with the first pixel attribute (or a plurality of pixel attributes), and a y value may be associated with a polynomial associated with the second pixel attribute (or a plurality of pixel attributes). Further, in another embodiment, a strength function may be used to scale the mix value calculated by the mix value function. In one embodiment, the mix value may include a scalar.

In one embodiment, the mix value 558 determined by the mix value function may be selected from a table that embodies the surface diagram. In another embodiment, a first value associated with a first polynomial and a second value associated with a second polynomial may each be used to select a corresponding value from a table, and the two or more values may be used to interpolate a mix value. In other words, at least a portion of the mix value function may be implemented as a table (e.g. lookup table) indexed in x and y to determine a value of z. Each value of z may be directly represented in the table or interpolated from sample points comprising the table. Accordingly, a scalar may be identified by at least one of generating, selecting, and interpolating.

As shown, a mix value 558 results from the mix value surface 564 and is inputted into the mix function 566, described previously.

HDR Pixel 559 may be generated based on the brighter pixel 550 and the darker pixel 552, in accordance with various embodiments described herein.

Figure 6:
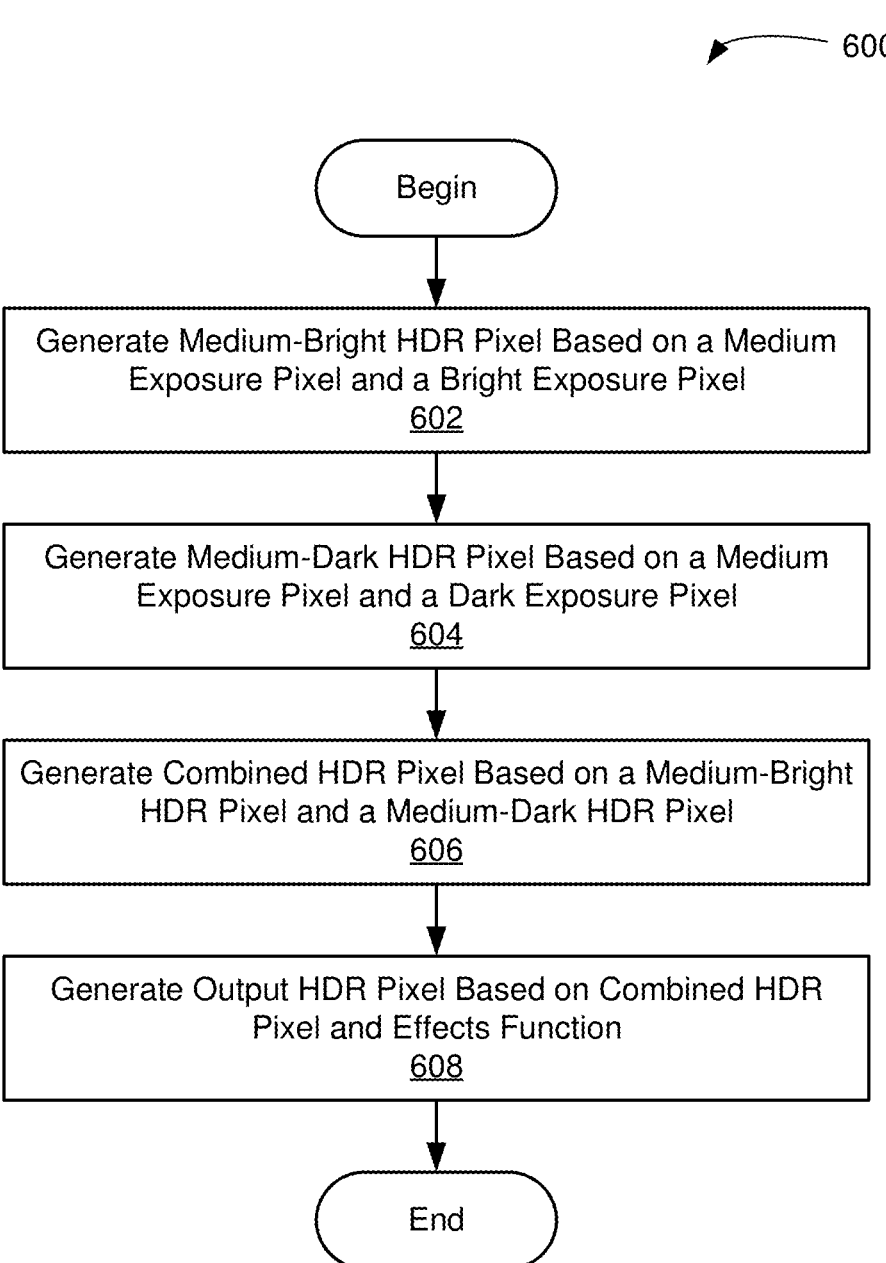
FIG. 6 illustrates a method for generating a HDR pixel based on combined HDR pixel and an effects function, in accordance with another embodiment.

FIG. 6 illustrates a method 600 for generating a HDR pixel based on combined HDR pixel and effects function, in accordance with another embodiment. As an option, the method 600 may be implemented in the context of the details of any of the Figures. Of course, however, the method 600 may be carried out in any desired environment. Further, the aforementioned definitions may equally apply to the description below.

As shown, in one embodiment, a medium-bright HDR pixel may be generated based on a medium exposure pixel and a bright exposure pixel. See operation 602. Additionally, a medium-dark HDR pixel may be generated based on a medium exposure pixel and a dark exposure pixel. See operation 604. For example, in one embodiment, a medium exposure pixel may include an EV0 exposure and a bright exposure pixel may include an EV+1 exposure, and medium-bright HDR pixel may be a blend between the EV0 exposure pixel and the EV+1 exposure pixel. Of course, a bright exposure pixel may include an exposure greater (e.g. in any amount, etc.) than the medium exposure value.

In another embodiment, a medium exposure pixel may include an EV0 exposure and a dark exposure pixel may include an EV−1 exposure, and a medium-dark HDR pixel may be a blend between the EV0 exposure and the EV−1 exposure. Of course, a dark exposure pixel may include an exposure (e.g. in any amount, etc.) less than the medium exposure value.

As shown, a combined HDR pixel may be generated based on a medium-bright HDR pixel and a medium-dark HDR pixel. See operation 606. In another embodiment, the combined HDR pixel may be generated based on multiple medium-bright HDR pixels and multiple medium-dark HDR pixels.

In a separate embodiment, a second combined HDR pixel may be based on the combined HDR pixel and a medium-bright HDR pixel, or may be based on the combined HDR pixel and a medium-dark HDR pixel. In a further embodiment, a third combined HDR pixel may be based on a first combined HDR pixel, a second combined HDR pixel, a medium-bright HDR pixel, a medium-dark HDR pixel, and/or any combination thereof.

Further, as shown, an output HDR pixel may be generated based on a combined HDR pixel and an effects function. See operation 608. For example in one embodiment, an effect function may include a function to alter an intensity, a saturation, a hue, a color space value (e.g. EGB, YCbCr, YUV, etc.), a RGB blend, a brightness, an RGB color, a luminance, a chrominance, a contrast, an attribute levels function, and/or an attribute curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the output HDR pixel in some manner.

Figure 7:
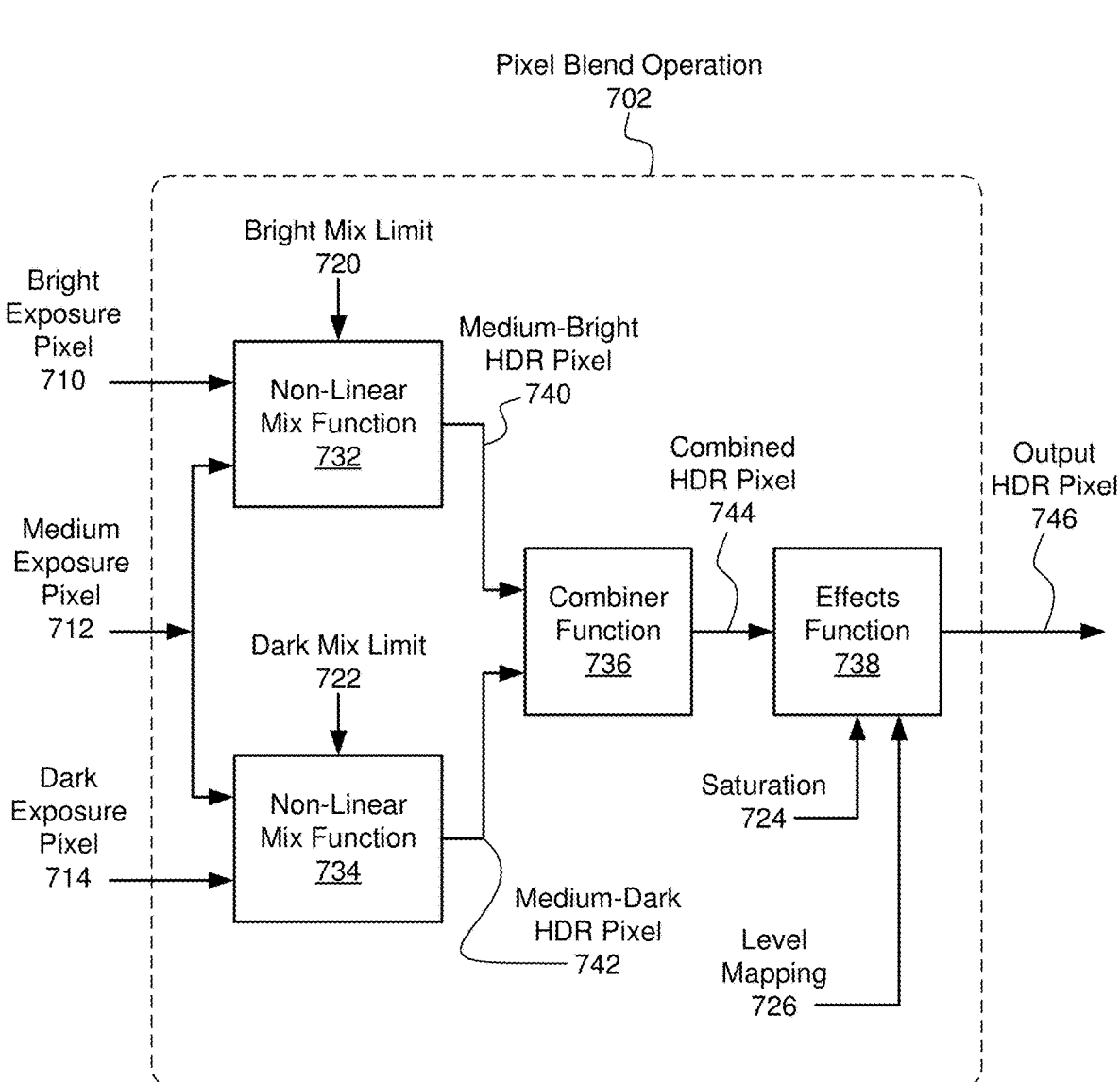
FIG. 7 illustrates a system for outputting a HDR pixel, in accordance with another embodiment.

FIG. 7 illustrates a system 700 for outputting a HDR pixel, in accordance with another embodiment. As an option, the system 700 may be implemented in the context of the details of any of the Figures. Of course, however, the system 700 may be carried out in any desired environment. Further, the aforementioned definitions may equally apply to the description below.

In one embodiment, the system 700 may include a pixel blend operation 702. In one embodiment, the pixel blend operation 702 may include receiving a bright exposure pixel 710 and a medium exposure pixel 712 at a non-linear mix function 732. In another embodiment, the non-linear mix function 732 may operate in a manner consistent with non-linear mix function 530 of FIG. 5. In another embodiment, the pixel blend operation 702 may include receiving a dark exposure pixel 714 and a medium exposure pixel 712 at a non-linear mix function 734. In another embodiment, the non-linear mix function 734 may operate in a manner consistent with item 530 of FIG. 5.

In various embodiments, the non-linear mix function 732 and/or 734 may receive an input from a bright mix limit 720 or dark mix limit 722, respectively. In one embodiment, the bright mix limit 720 and/or the dark mix limit 722 may include an automatic or manual setting. For example, in some embodiments, the mix limit may be set by predefined settings (e.g. optimized settings, etc.). In one embodiment, each mix limit may be predefined to optimize the mix function. In another embodiment, the manual settings may include receiving a user input. For example, in one embodiment, the user input may correspond with a slider setting on a sliding user interface. Each mix limit may correspond to a respective strength coefficient, described above in conjunction with Equations 1-3.

For example, in one embodiment, a mix value function may include a product of two polynomials and may include a strength coefficient. In a specific example, the mix value function is implemented as mix value surface 564, which operates to generate mix value 558. One exemplary mix value function is illustrated below in Equation 1:

$$z = p1\,(x) * p2\,(y) * s \qquad \text{(Eq. 1)}$$

where:

z is resulting mix value for first and second pixels;

p1 is a first polynomial in x, where x may be a pixel attribute for first (darker) pixel;

p2 is a second polynomial in y, where y may be a pixel attribute for second (lighter) pixel; and s is a strength coefficient (s==0: no mixing, s==1.0: nominal mixing, s>1.0: exaggerated mixing).

In Equation 1, the strength coefficient (s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1 - (1 - (1 - x)^\wedge A)^\wedge B) * ((1 - (1 - y)^\wedge C)^\wedge D) * s \qquad \text{(Eq. 2)}$$

As shown, p1(x) of Equation 1 may be implemented in Equations 2 as the term $(1-(1-(1-x)^\wedge A)^\wedge B)$, while p2(y) of Equation 2 may be implemented as the term $((1-(1-y)^\wedge C) ^\wedge D)$. In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to generate a mix value for a combination of an "EV0" pixel (e.g. a pixel from an image having an EV0 exposure), an "EV−" pixel (e.g. a pixel from an image having an exposure of EV−1, EV−2, or EV−3, etc.), and an "EV+" pixel (e.g. a pixel from an image having an exposure of EV+1, EV+2, or EV+3, etc.). Further, in another embodiment, Equation 2 may be used to generate mix values for pixels associated with images having a bright exposure, median exposure, and/or dark exposure in any combination.

In another embodiment, when z=0, the darker pixel may be given full weight, and when z=1, the brighter pixel may be given full weight. In one embodiment, Equation 2 may correspond with the surface diagrams as shown in FIGS. 10A and 10B.

In another specific embodiment, a mix function may include a specific polynomial form:

$$z = ((1 - (1 - x)^\wedge A)^\wedge B) * ((1 - (1 - y)^\wedge C)^\wedge D) * s \qquad \text{(Eq. 3)}$$

As shown, p1(x) of Equation 1 may be implemented in Equations 3 as the term $((1-(1-x)^\wedge A)\ B)$, while p2(y) of Equation 3 may be implemented as the term $((1-(1-y)^\wedge C) ^\wedge D)$. In one embodiment, Equation 3 may include the following coefficients: A=8, B=2, C=2, and D=2. Of course, in other embodiments, other coefficient values may be used to optimize the mixing. In another embodiment, Equation 3 may be used to generate a mix value for an "EV0" pixel, and an "EV−" pixel (e.g., EV−1, EV−2, or EV−3) pixel. Further, in another embodiment, Equation 3 may be used to generate mix values for pixels associated with images having a bright exposure, median exposure, and/or dark exposure in any combination.

In another embodiment, when z=0, the brighter pixel may be given full weight, and when z=1, the darker pixel may be given full weight. In one embodiment, Equation 3 may correspond with the surface diagrams as shown in FIGS. 11A and 11B.

As shown, in one embodiment, the non-linear mix function 732 results in a medium-bright HDR pixel 740. In another embodiment, the non-linear mix function 734 results in a medium-dark HDR pixel 742. In one embodiment, the medium-bright HDR pixel 740 and the medium-dark HDR pixel 742 are inputted into a combiner function 736. In another embodiment, the combiner function 736 blends the medium-bright HDR pixel 740 and the medium-dark HDR pixel 742.

In various embodiments, the combiner function 736 may include taking an average of two or more pixel values, summing and normalizing a color attribute associated with each pixel value (e.g. a summation of a red/green/blue component in a RGB color space, etc.), determining a RGB (or any color space) vector length which may then be normalized, using an average pixel value in combination with a brighter pixel or a darker pixel, and/or using any other combination to blend the medium-bright HDR pixel 740 and the medium-dark HDR pixel 742.

In one embodiment, the combiner function 736 results in a combined HDR pixel 744. In various embodiments, the combined HDR pixel 744 may include any type of blend associated with the medium-bright pixel 740 and the medium-dark HDR pixel 742. For example, in some embodiments, the combined HDR pixel may include a resulting pixel with no HDR effect applied, whereas in other embodiments, any amount of HDR or even amplification may be applied and be reflected in the resulting combined HDR pixel.

In various embodiments, the combined HDR pixel 744 is inputted into an effects function 738. In one embodiment, the effects function 738 may receive a saturation parameter 724, level mapping parameters 726, and/or any other function parameter which may cause the effects function 738 to modify the combined HDR pixel 744 in some manner. Of course, in other embodiments, the effects function 738 may include a function to alter an intensity, a hue, a color space value (e.g. EGB, YCbCr, YUV, etc.), a brightness, an RGB color, a luminance, a chrominance, a contrast, and/or a curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the combined HDR pixel 744 in some manner. In some embodiments, output HDR pixel 746 may be generated by effects function 738. Alternatively, effects function 738 may be configured to have no effect and output HDR pixel 746 is equivalent to combined HDR pixel 744. In one embodiment, the effects function 738 implements equalization, such as an equalization technique known in the art as contrast limited adaptive histogram equalization (CLAHE).

In some embodiments, and in the alternative, the combined HDR pixel 744 may have no effects applied. After passing through an effects function 738, an output HDR pixel 746 results.

Figure 8:
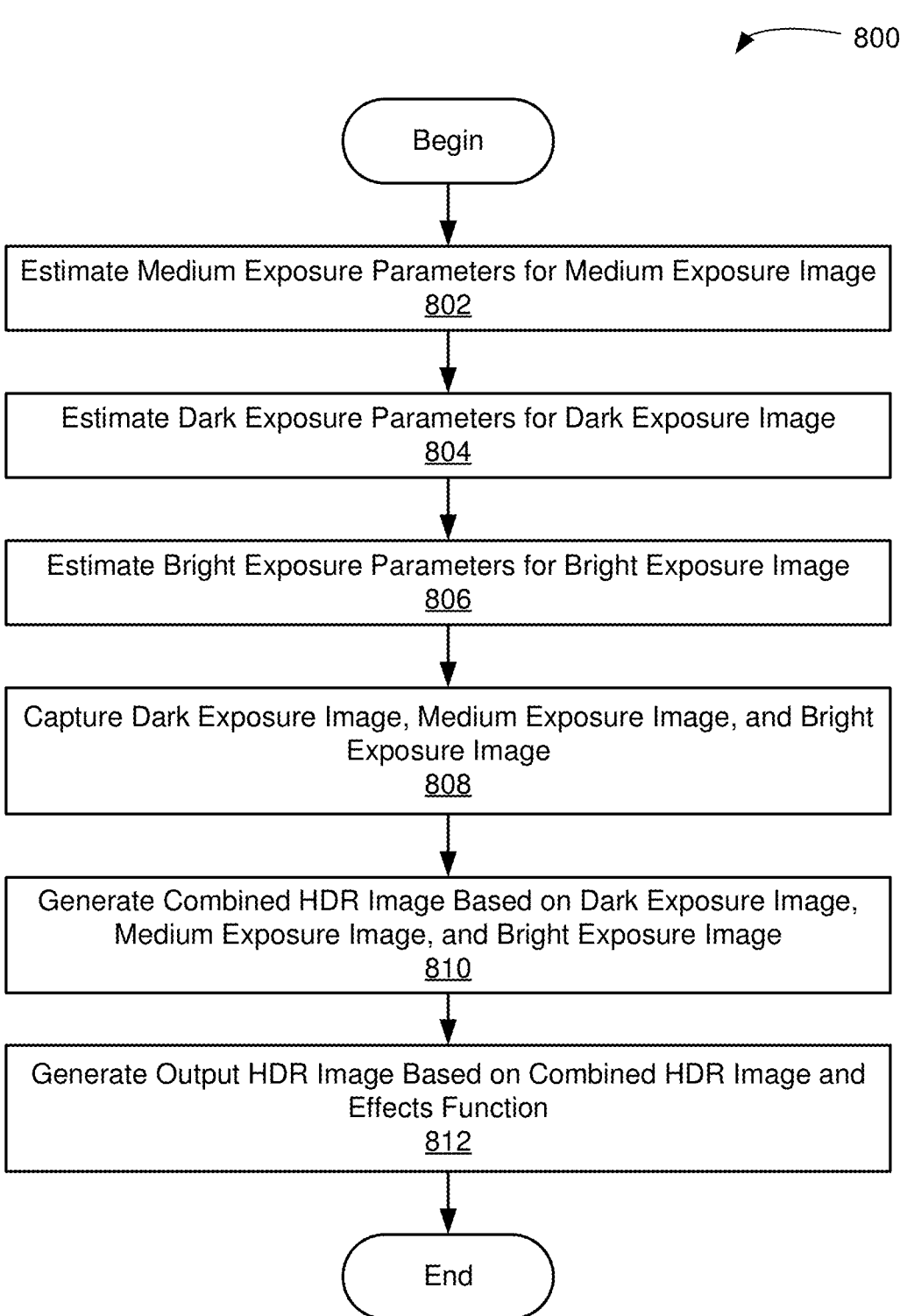
FIG. 8 illustrates a method for generating a HDR pixel based on combined HDR pixel and an effects function, in accordance with another embodiment.

FIG. 8 illustrates a method 800 for generating a HDR pixel based on a combined HDR pixel and an effects function, in accordance with another embodiment. As an option, the method 800 may be implemented in the context of the details of any of the Figures. Of course, however, the method 800 may be carried out in any desired environment. Further, the aforementioned definitions may equally apply to the description below.

In one embodiment, a medium exposure parameter may be estimated for a medium exposure image. See operation 802. Additionally, a dark exposure parameter is estimated for a dark exposure image (see operation 804) and a bright exposure parameter is estimated for a bright exposure image (see operation 806).

In various embodiments, an exposure parameter (e.g. associated with medium exposure, dark exposure, or bright exposure, etc.) may include an ISO, an exposure time, an exposure value, an aperture, and/or any other parameter which may affect image capture time. In one embodiment, the capture time may include the amount of time that the image sensor is exposed to optical information presented by a corresponding camera lens.

In one embodiment, estimating a medium exposure parameter, a dark exposure parameter, and/or a bright exposure parameter may include metering an image associated with a photographic scene. For example, in various embodiments, the brightness of light within a lens' field of view may be determined. Further, the metering of the image may include a spot metering (e.g. narrow area of coverage, etc.), an average metering (e.g. metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency.

As shown, a dark exposure image, a medium exposure image, and a bright exposure image are captured. See operation 808. In various embodiments, capturing an image (e.g. a dark exposure image, a medium exposure image, a bright exposure image, etc.) may include committing the image (e.g. as seen through the corresponding camera lens, etc.) to an image processor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a combined HDR image may be generated based on a dark exposure image, a medium exposure image, and a bright exposure image. See operation 810. In various embodiments, the combined HDR image may be generated in a manner consistent with combined HDR pixel 744 in FIG. 7. Further, in one embodiment, an output HDR image may be generated based on a combined HDR image comprising combined HDR pixel 744 and an effects function. See operation 812. In various embodiments, the output HDR image may be generated in a manner consistent with Output HDR Pixel 746 in FIG. 7.

FIG. 9 illustrates a method 900 for generating a HDR pixel based on combined HDR pixel and an effects function, in accordance with another embodiment. As an option, the method 900 may be implemented in the context of the details of any of the Figures. Of course, however, the method 900 may be carried out in any desired environment. Further, the aforementioned definitions may equally apply to the description below.

In one embodiment, a medium exposure parameter may be estimated for medium exposure image. See operation 902. In various embodiments, the medium exposure parameter may include an ISO, an exposure time, an exposure value, an aperture, and/or any other parameter which may affect the capture time. In one embodiment, the capture time may include the amount of time that the image sensor is exposed to optical information presented by a corresponding camera lens. In one embodiment, estimating a medium exposure parameter may include metering the image. For example, in various embodiments, the brightness of light within a lens' field of view may be determined. Further, the metering of the image may include a spot metering (e.g. narrow area of coverage, etc.), an average metering (e.g.

metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency. Additionally, in one embodiment, the metering for a medium exposure image may include an image at EV0. Of course, however, in other embodiments, the metering may include an image at any shutter stop and/or exposure value.

As shown, in one embodiment, an analog image may be captured within an image sensor based on medium exposure parameters. See operation 904. In various embodiments, capturing the analog image may include committing the image (e.g. as seen through the corresponding camera lens, etc.) to an image sensor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a medium exposure image may be generated based on an analog image. See operation 906. Additionally, a dark exposure image may be generated based on an analog image (see operation 908), and a brighter exposure image may be generated based on an analog image (see operation 910). In various embodiments, generating an exposure image (e.g. medium, dark, bright, etc.) may include applying an ISO or film speed to the analog image. Of course, in another embodiment, any function which may alter the analog image's sensitivity to light may be applied. In one embodiment, the same analog image may be sampled repeatedly to generate multiple images (e.g. medium exposure image, dark exposure image, bright exposure image, etc.). For example, in one embodiment, the current stored within the circuitry may be used multiple times.

Additionally, in one embodiment, a combined HDR image may be generated based on a dark exposure image, a medium exposure image, and a bright exposure image. See operation 912. In various embodiments, the combined HDR image may be generated in a manner consistent with Combined HDR Pixel 744 in FIG. 7. Further, in one embodiment, an output HDR image may be generated based on a combined HDR image and an effects function. See operation 914. In various embodiments, the output HDR image may be generated in a manner consistent with Output HDR Pixel 746 in FIG. 7.

FIG. 10A illustrates a surface diagram 1000, in accordance with another embodiment. As an option, the surface diagram 1000 may be implemented in the context of the details of any of the Figures. Of course, however, the surface diagram 1000 may be carried out in any desired environment. Further, the aforementioned definitions may equally apply to the description below.

In one embodiment, surface diagram 1000 depicts a surface associated with Equation 2 for determining a mix value for two pixels, based on two pixel attributes for the two pixels. As shown, the surface diagram 1000 is illustrated within a unit cube having an x axis 1002, a y axis 1004, and a z axis 1006. As described in Equation 2, variable "x" is associated with an attribute for a first (e.g. darker) pixel, and variable "y" is associated with an attribute for a second (e.g. lighter) pixel. For example, each attribute may represent an intensity value ranging from 0 to 1 along a respective x and y axis of the unit cube. An attribute for the first pixel may correspond to pixel attribute 556 of FIG. 5, while an attribute for the second pixel may correspond to pixel attribute 555. As described in Equation 2, variable "z" is associated with the mix value, such as mix value 558, for generating a HDR pixel, such as HDR pixel 559, from the two pixels. A mix value of 0 (e.g. z=0) may result in a HDR pixel that is substantially identical to the first pixel, while a mix value of 1 (e.g. z=1) may result in a HDR pixel that is substantially identical to the second pixel.

As shown, surface diagram 1000 includes a flat region 1014, a transition region 1010, and a saturation region 1012. The transition region 1010 is associated with x values below an x threshold and y values below a y threshold. The transition region 1010 is generally characterized as having monotonically increasing z values for corresponding monotonically increasing x and y values. The flat region 1014 is associated with x values above the x threshold. The flat region 1014 is characterized as having substantially constant z values independent of corresponding x and y values. The saturation region 1012 is associated with x values below the x threshold and above the y threshold. The saturation region 1012 is characterized as having z values that are a function of corresponding x values while being relatively independent of y values. For example, with x=x1, line 1015 shows z monotonically increasing through the transition region 1010, and further shows z remaining substantially constant within the saturation region 1012. In one embodiment mix value surface 564 implements surface diagram 1000. In another embodiment, non-linear mix function 732 of FIG. 7 implements surface diagram 1000. In yet another embodiment, non-linear mix function 734 of FIG. 7 implements surface diagram 1000.

FIG. 10B illustrates a surface diagram 1008, in accordance with another embodiment. As an option, the surface diagram 1008 may be implemented in the context of the details of any of the Figures. Of course, however, the surface diagram 1008 may be implemented in any desired environment. Further, the aforementioned definitions may equally apply to the description below.

In one embodiment, the surface diagram 1008 provides a separate view (e.g. top down view, etc.) of surface diagram 1000 of FIG. 10A. Additionally, the description relating to FIG. 10A may be applied to FIG. 10B as well.

FIG. 11A illustrates a surface diagram 1100, in accordance with another embodiment. As an option, the surface diagram 1100 may be implemented in the context of the details of any of the Figures. Of course, however, the surface diagram 1100 may be implemented in any desired environment. Further, the aforementioned definitions may equally apply to the description below.

In one embodiment, surface diagram 1100 depicts a surface associated with Equation 3 for determining a mix value for two pixels, based on two pixel attributes for the two pixels. As described in Equation 3, variable "x" is associated with an attribute for a first (e.g. darker) pixel, and variable "y" is associated with an attribute for a second (e.g. lighter) pixel. The flat region 1114 may correspond in general character to flat region 1014 of FIG. 10A. Transition region 1110 may correspond in general character to transition region 1010. Saturation region 1112 may correspond in general character to saturation region 1012. While each region of surface diagram 1100 may correspond in general character to similar regions for surface diagram 1000, the size of corresponding regions may vary between surface diagram 1100 and surface diagram 1000. For example, the x threshold associated with surface diagram 1100 is larger than the x threshold associated with surface diagram 1000, leading to a generally smaller flat region 1114. As shown, the surface diagram 1100 may include a flat region 1114, a transition region 1110, and a saturation region 1112.

FIG. 11B illustrates a surface diagram 1102, in accordance with another embodiment. As an option, the surface diagram 1102 may be implemented in the context of the details of any of the Figures. Of course, however, the surface diagram 1102 may be implemented in any desired environment. Further, the aforementioned definitions may equally apply to the description below.

In one embodiment, the surface diagram 1102 provides a separate view (e.g. top down view, etc.) of surface diagram 1100 of FIG. 11A. Additionally, in various embodiments, the description relating to FIG. 11A and FIG. 10A may be applied to FIG. 11B as well.

Figure 12:
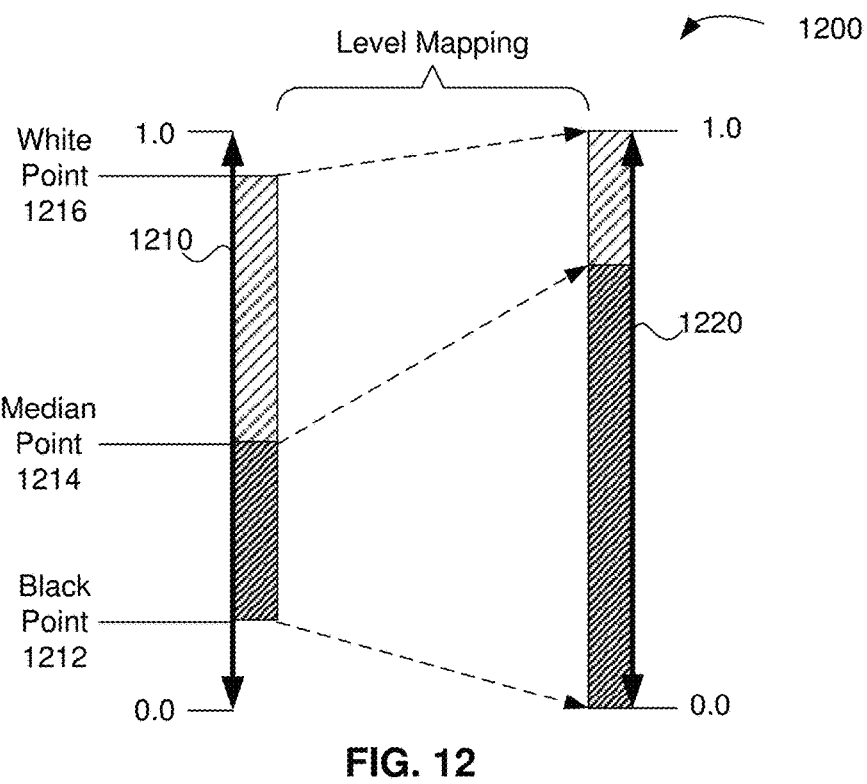
FIG. 12 illustrates a levels mapping diagram, in accordance with another embodiment.

FIG. 12 illustrates a levels mapping function 1200, in accordance with another embodiment. As an option, the levels mapping function 1200 may be implemented in the context of the details of any of the Figures. Of course, however, the levels mapping function 1200 may be carried out in any desired environment. Further, the aforementioned definitions may equally apply to the description below.

In various embodiments, the levels mapping function 1200 maps an input range 1210 to an output range 1220. More specifically, a white point 1216 may be mapped to a new white point in the output range 1220, a median point 1214 may be mapped to a new median point in the output range 1220, and a black point 1212 may be mapped to a new black point in the output range 1220. In one embodiment, the input range 1210 may be associated with an input image and the output range 1220 may be associated with a mapped image. In one embodiment, levels mapping may include an adjustment of intensity levels of an image based on a black point, a white point, a mid point, a median point, or any other arbitrary mapping function.

In certain embodiments, the white point, median point, black point, or any combination thereof, may be mapped based on an automatic detection of corresponding points or manually by a user. For example, in one embodiment, it may be determined that an object in the input image corresponds with a black point (or a white point, or a median point, etc.), such as through object recognition. For example, it may be determined that a logo is present in an image, and accordingly, set a color point (e.g. white, median, black, etc.) based off of an identified object. In other embodiments, the automatic settings may be associated with one or more settings associated with a camera device. For example, in some embodiments, the camera device may correct for a lens deficiency, a processor deficiency, and/or any other deficiency associated with the camera device by applying, at least in part, a set of one or more settings to the levels mapping.

Figure 13:
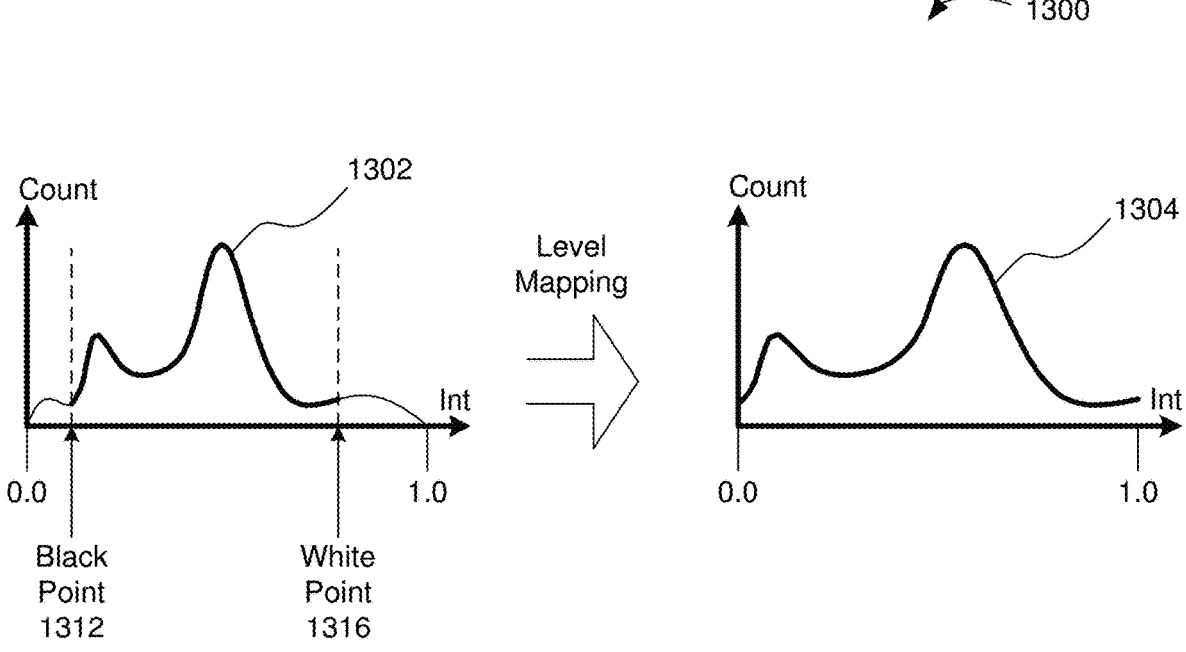
FIG. 13 illustrates a levels mapping diagram, in accordance with another embodiment.

FIG. 13 illustrates a levels mapping function 1300, in accordance with another embodiment. As an option, the levels mapping function 1300 may be implemented in the context of the details of any of the Figures. Of course, however, the levels mapping function 1300 may be carried out in any desired environment. Further, the aforementioned definitions may equally apply to the description below.

In one embodiment, a histogram 1302 may be associated with the input image of FIG. 12. In some embodiments, the histogram 1302 may include statistics for identifying a black point 1312 and a white point 1316. As indicated with respect to FIG. 12, the setting of the color points (e.g. black, white, etc.) may be based on user input (or another manual input, etc.) or on an automatic setting.

Based on the setting of a new black point and a new white point, a new mapped image may be created from the input image. The mapped image may be associated with a new histogram 1304. In one embodiment, after applying the new level mapping to the input image, the new level mapping (e.g. as visualized on the histogram, etc.) may be further modified as desired. For example, in one embodiment, a black point and white point may be automatically selected (e.g. based on optimized settings, etc.). After applying the black point and white point, the user may desire to further refine (or reset) the black point or white point. Of course, in such an embodiment, any color point may be set by the user.

In one embodiment, the white point (or any color point, etc.) may be controlled directly by a user. For example, a slider associated with a white point (or any color point, etc.) may directly control the white point of the pixel or image. In another embodiment, a slider associated with an image may control several settings, including an automatic adjustment to both black and white points (or any color point, etc.) to optimize the resulting pixel or image.

Figure 14:
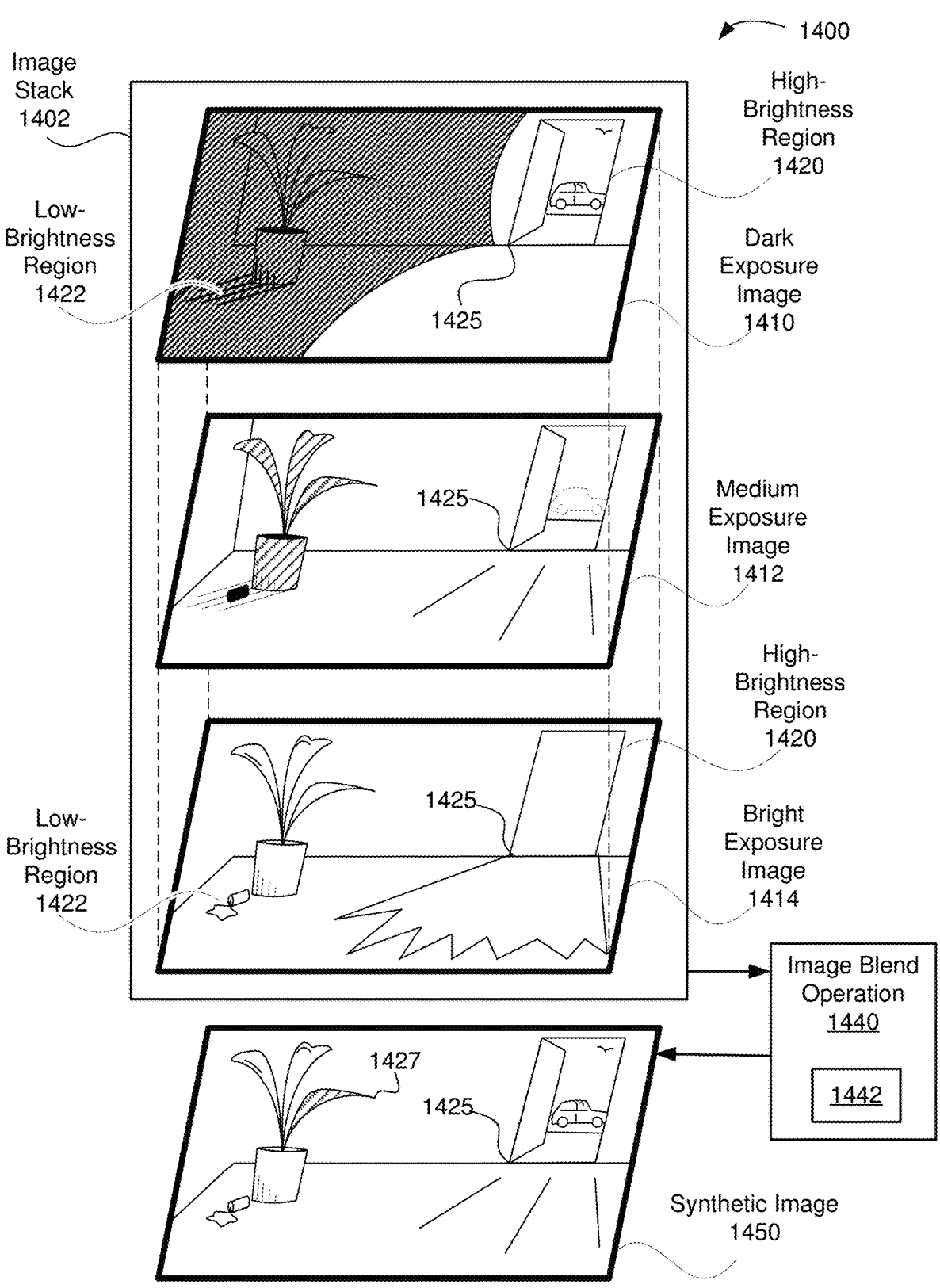
FIG. 14 illustrates an image synthesis operation, in accordance with another embodiment.

FIG. 14 illustrates an image synthesis operation 1400, in accordance with another embodiment. As an option, the image synthesis operation 1400 may be implemented in the context of the details of any of the Figures. Of course, however, the image synthesis operation 1400 may be carried out in any desired environment. Further, the aforementioned definitions may equally apply to the description below.

As shown, an image blend operation 1440 comprising the image synthesis operation 1400 may generate a synthetic image 1450 from an image stack 1402, according to one embodiment of the present invention. Additionally, in various embodiments, the image stack 1402 may include images 1410, 1412, and 1414 of a scene, which may comprise a high brightness region 1420 and a low brightness region 1422. In such an embodiment, medium exposure image 1412 is exposed according to overall scene brightness, thereby generally capturing scene detail.

In another embodiment, medium exposure image 1412 may also potentially capture some detail within high brightness region 1420 and some detail within low brightness region 1422. Additionally, dark exposure image 1410 may be exposed to capture image detail within high brightness region 1420. In one embodiment, in order to capture high brightness detail within the scene, image 1410 may be exposed according to an exposure offset from medium exposure image 1412.

In a separate embodiment, dark exposure image 1410 may be exposed according to local intensity conditions for one or more of the brightest regions in the scene. In such an embodiment, dark exposure image 1410 may be exposed according to high brightness region 1420, to the exclusion of other regions in the scene having lower overall brightness. Similarly, bright exposure image 1414 is exposed to capture image detail within low brightness region 1422. Additionally, in one embodiment, in order to capture low brightness detail within the scene, bright exposure image 1414 may be exposed according to an exposure offset from medium exposure image 1412. Alternatively, bright exposure image 1414 may be exposed according to local intensity conditions for one or more of the darkest regions of the scene.

As shown, in one embodiment, an image blend operation 1440 may generate synthetic image 1450 from image stack 1402. Additionally, in another embodiment, synthetic image 1450 may include overall image detail, as well as image detail from high brightness region 1420 and low brightness region 1422. Further, in another embodiment, image blend operation 1440 may implement any technically feasible operation for blending an image stack. For example, in one embodiment, any high dynamic range (HDR) blending technique may be implemented to perform image blend operation 1440, including but not limited to bilateral filtering, global range compression and blending, local range compression and blending, and/or any other technique which may blend the one or more images. In one embodiment, image blend operation 1440 includes a pixel blend operation 1442. The pixel blend operation 1442 may generate a pixel within synthetic image 1450 based on values for corresponding pixels received from at least two images of images 1410, 1412, and 1414. In one embodiment, pixel blend operation 1442 comprises pixel blend operation 702 of FIG. 7.

In one embodiment, in order to properly perform a blend operation, all of the images (e.g. dark exposure image, medium exposure image, bright exposure image, etc.) may need to be aligned so that visible detail in each image is positioned in the same location in each image. For example, feature 1425 in each image should be located in the same position for the purpose of blending the images 1410, 1412, 1414 to generate synthetic image 1450. In certain embodiments, at least two images of images 1410, 1412, 1414 are generated from a single analog image, as described in conjunction with method 900 of FIG. 9, thereby substantially eliminating any alignment processing needed prior to blending the images 1410, 1412, 1414.

Figure 15:
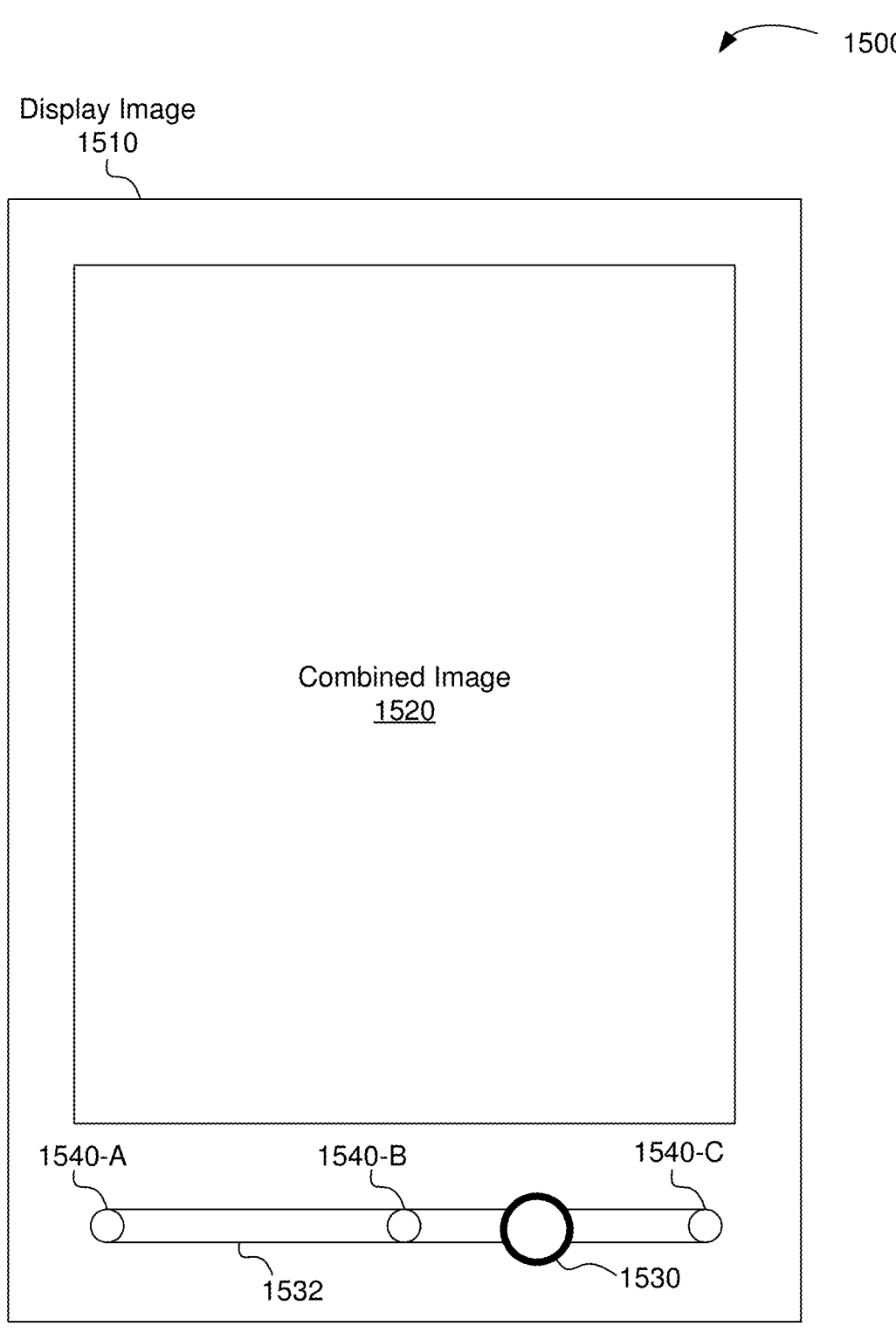
FIG. 15 illustrates a user interface (UI) system for generating a combined image, in accordance with another embodiment.

FIG. 15 illustrates a user interface (UI) system 1500 for generating a combined image 1520, according to one embodiment. As an option, the UI system 1500 may be implemented in the context of the details of any of the Figures disclosed herein. Of course, however, the UI system 1500 may be carried out in any desired environment. Further, the aforementioned definitions may equally apply to the description below.

In one embodiment, a combined image 1520 comprises a combination of at least two related digital images. In one embodiment, the combined image 1520 comprises, without limitation, a combined rendering of a first digital image and a second digital image. In another embodiment, the digital images used to compute the combined image 1520 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 1500 presents a display image 1510 that includes, without limitation, a combined image 1520, a slider control 1530 configured to move along track 1532, and two or more indication points 1540, which may each include a visual marker displayed within display image 1510.

In one embodiment, the UI system 1500 is generated by an adjustment tool executing within a processor complex 310 of a digital photographic system 300, and the display image 1510 is displayed on display unit 312. In one embodiment, at least two digital images, such as the at least two related digital images, comprise source images for generating the combined image 1520. The at least two digital images may reside within NV memory 316, volatile memory 318, memory subsystem 362, or any combination thereof. In another embodiment, the UI system 1500 is generated by an adjustment tool executing within a computer system, such as a laptop computer or a desktop computer. The at least two digital images may be transmitted to the computer system or may be generated by an attached camera device. In yet another embodiment, the UI system 1500 may be generated by a cloud-based server computer system, which may download the at least two digital images to a client browser, which may execute combining operations described below. In another embodiment, the UI system 1500 is generated by a cloud-based server computer system, which receives the at least two digital images from a digital photographic system in a mobile device, and which may execute the combining operations described below in conjunction with generating combined image 1520.

The slider control 1530 may be configured to move between two end points corresponding to indication points 1540-A and 1540-C. One or more indication points, such as indication point 1540-B may be positioned between the two end points. Each indication point 1540 may be associated with a specific version of combined image 1520, or a specific combination of the at least two digital images. For example, the indication point 1540-A may be associated with a first digital image generated utilizing a first gain, and the indication point 1540-C may be associated with a second digital image generated utilizing a second gain, where both of the first digital image and the second digital image are generated from a same analog signal of a single captured photographic scene. In one embodiment, when the slider control 1530 is positioned directly over the indication point 1540-A, only the first digital image may be displayed as the combined image 1520 in the display image 1510, and similarly when the slider control 1530 is positioned directly over the indication point 1540-C, only the second digital image may be displayed as the combined image 1520 in the display image 1510.

In one embodiment, indication point 1540-B may be associated with a blending of the first digital image and the second digital image. For example, when the slider control 1530 is positioned at the indication point 1540-B, the combined image 1520 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 1520 or used to generate combined image 1520. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 1530 is positioned at the indication point 1540-A, the first digital image is displayed as the combined image 1520, and when the slider control 1530 is positioned at the indication point 1540-C, the second digital image is displayed as the combined image 1520; furthermore, when slider control 1530 is positioned at indication point 1540-B, a blended image is displayed as the combined image 1520. In such an embodiment, when the slider control 1530 is positioned between the indication point 1540-A and the indication point 1540-C, a mix (e.g. blend) weight may be calculated for the first digital image and the second digital image. For the first digital image, the mix weight may be calculated as having a value of 0.0 when the slider control 1530 is at indication point 1540-C and a value of 1.0 when slider control 1530 is at indication point 1540-A, with a range of mix weight values between 0.0 and 1.0 located between the indication points 1540-C and 1540-A, respectively. Referencing the mix operation instead to the second digital image, the mix weight may be calculated as having a value of 0.0 when the slider control 1530 is at indication point 1540-A and a value of 1.0 when slider control 1530 is at indication point 1540-C, with a range of mix weight values between 0.0 and 1.0 located between the indication points 1540-A and 1540-C, respectively.

A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 1520 corresponding to an arbitrary position of the slider control 1530. The adjustment tool implementing the UI system 1500 may receive a command to save the combined image 1520 via any technically feasible gesture or technique. For example, the adjustment tool may be configured to save the combined image 1520 when a user gestures within the area occupied by combined image 1520. Alternatively, the adjustment tool may save the combined image 1520 when a user presses, but does not otherwise move the slider control 1530. In another implementation, the adjustment tool may save the combined image 1520 when a user gestures, such as by pressing a UI element (not shown), such as a save button, dedicated to receive a save command.

To this end, a slider control may be used to determine a contribution of two or more digital images to generate a final computed image, such as combined image 1520. Persons skilled in the art will recognize that the above system of mix weights and mix operations may be generalized to include two or more indication points, associated with two or more related images. Such related images may comprise, without limitation, any number of digital images that have been generated using a same analog signal to have different brightness values, which may have zero interframe time.

Furthermore, a different continuous position UI control, such as a rotating knob, may be implemented rather than the slider 1530 to provide mix weight input or color adjustment input from the user.

Of course, in other embodiments, other user interfaces may be used to receive input relating to selecting one or more points of interest (e.g. for focus, for metering, etc.), adjusting one or more parameters associated with the image (e.g. white balance, saturation, exposure, etc.), and/or any other input which may affect the image in some manner.

Figure 16:
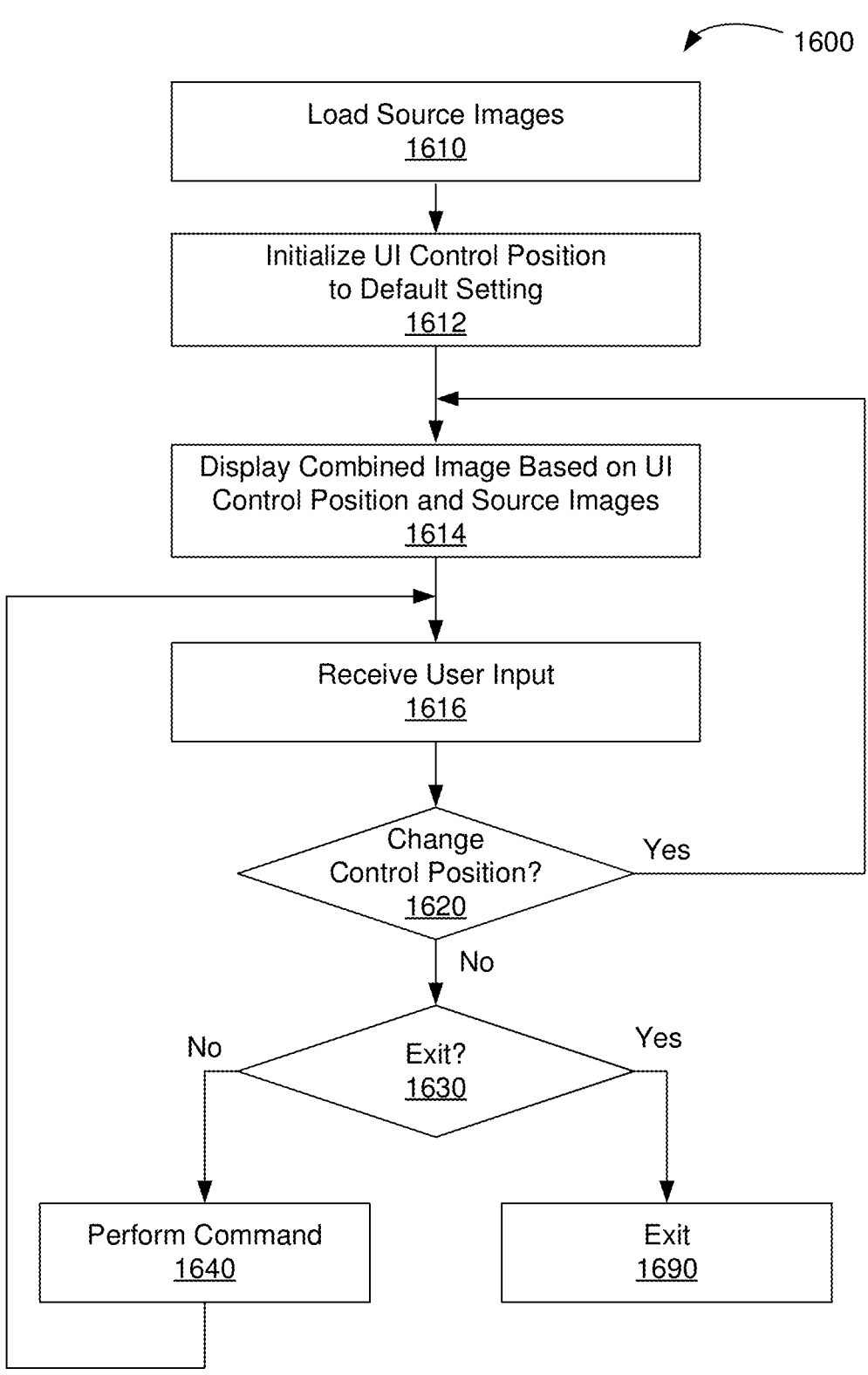
FIG. 16 is a flow diagram of method for generating a combined image, in accordance with another embodiment.

FIG. 16 is a flow diagram of method 1600 for generating a combined image, according to one embodiment. As an option, the method 1600 may be implemented in the context of the details of any of the Figures disclosed herein. Of course, however, the method 1600 may be carried out in any desired environment. Further, the aforementioned definitions may equally apply to the description below.

The method 1600 begins in step 1610, where an adjustment tool executing within a processor complex, such as processor complex 310, loads at least two related source images, such as the first digital image and the second digital image described in the context of FIG. 15. In step 1612, the adjustment tool initializes a position for a UI control, such as slider control 1530 of FIG. 15, to a default setting. In one embodiment, the default setting comprises an end point, such as indication point 1540-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1614, the adjustment tool generates and displays a combined image, such as combined image 1520 of FIG. 15, based on a position of the UI control and the at least two related source images. In one embodiment, generating the combined image comprises mixing the at least two related source images as described previously in FIG. 15. In step 1616, the adjustment tool receives user input. The user input may include, without limitation, a UI gesture such as a selection gesture or click gesture within display image 1510. If, in step 1620, the user input should change the position of the UI control, then the adjustment tool changes the position of the UI control and the method proceeds back to step 1614. Otherwise, the method proceeds to step 1630.

If, in step 1630, the user input does not comprise a command to exit, then the method proceeds to step 1640, where the adjustment tool performs a command associated with the user input. In one embodiment, the command comprises a save command and the adjustment tool then saves the combined image, which is generated according to a position of the UI control. The method then proceeds back to step 1616.

Returning to step 1630, if the user input comprises a command to exit, then the method terminates in step 1690, where the adjustment tool exits, thereby terminating execution.

In summary, a technique is disclosed for generating a new digital photograph that beneficially blends a first digital image and a second digital image, where the first digital image and the second digital image are both based on a single analog signal received from an image sensor. The first digital image may be blended with the second digital image based on a function that implements any technically feasible blend technique. An adjustment tool may implement a user interface technique that enables a user to select and save the new digital photograph from a gradation of parameters for combining related images.

One advantage of the disclosed embodiments is that a digital photograph may be selectively generated based on user input using two or more different exposures of a single capture of a photographic scene. Accordingly, the digital photograph generated based on the user input may have a greater dynamic range than any of the individual exposures. Further, the generation of an HDR image using two or more different exposures with zero interframe time allows for the rapid generation of HDR images without motion artifacts.

Figure 17A:
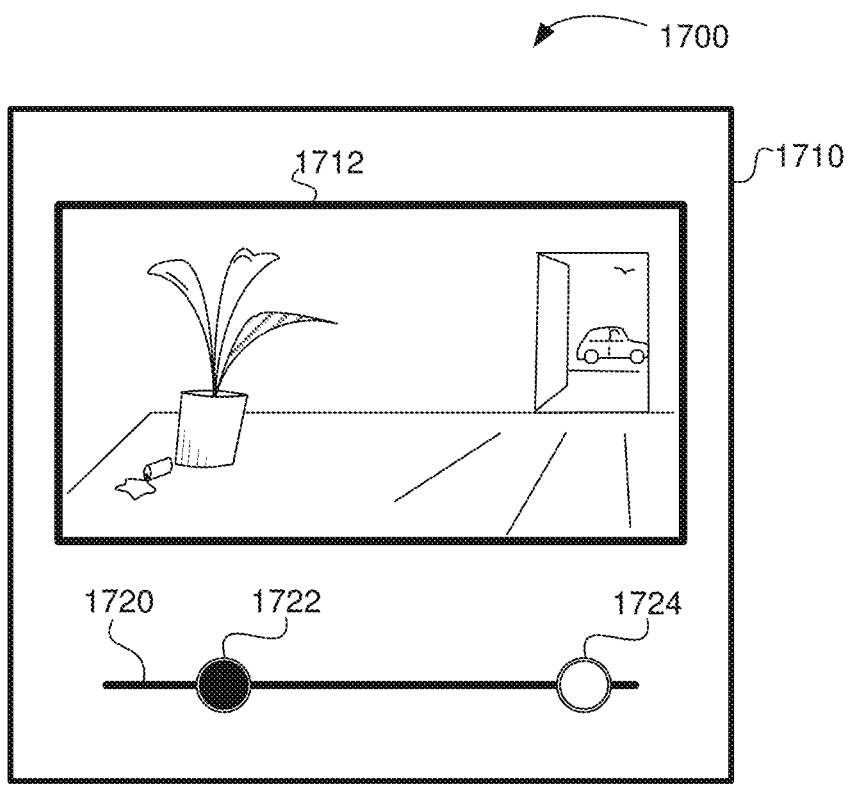
FIG. 17A illustrates a user interface (UI) system for adjusting a white point and a black point, in accordance with another embodiment.

FIG. 17A illustrates a user interface (UI) system 1700 for adjusting a white point and a black point, in accordance with another embodiment. As an option, the UI system 1700 may be implemented in the context of the details of any of the Figures. Of course, however, the UI system 1700 may be carried out in any desired environment. Further, the aforementioned definitions may equally apply to the description below.

As shown, in one embodiment, a slider bar 1720 may include a black point slider 1722 and a white point slider 1724. In various embodiments, the white point slider and the black point slider may be adjusted as desired by the user. Additionally, in another embodiment, the white point slider and the black point may be automatically adjusted. For example, in one embodiment, the black point slider may correspond with a darkest detected point in the image. Additionally, in one embodiment, the white point slider may correspond with the brightest detected point in the image. In one embodiment, the black point slider and the white point slider may each determine a corresponding black point and white point for remapping an input image to generate a resulting image 1712, such as through levels mapping function 1200 of FIG. 12. In other embodiments, the black point slider and the white point slider may bend or reshape a levels mapping curve that maps input range 1210 to output range 1220. As shown, the resulting image 1712, the slider bar 1720, and the sliders 1722, 1724 may be rendered within an application window 1710.

In some embodiments, the white point and the black point may be based on a histogram. For example, in one embodiment, the white point and black point may reflect high and low percentage thresholds associated with the histogram.

In one embodiment, a user may move the white point slider and the black point slider back and forth independently to adjust the black point and white point of the resulting image 1712. In another embodiment, touching the black point slider 1722 may allow the user to drag and drop the black point on a specific point on the image. In like manner, touching the white point slider 1724 may allow the user to drag and drop the white point on a specific point on the image. Of course, in other embodiments, the user may interact with the white point and the black point (or any other point) in any manner such that the user may select and/or adjust the white point and the black point (or any other point).

Figure 17B:
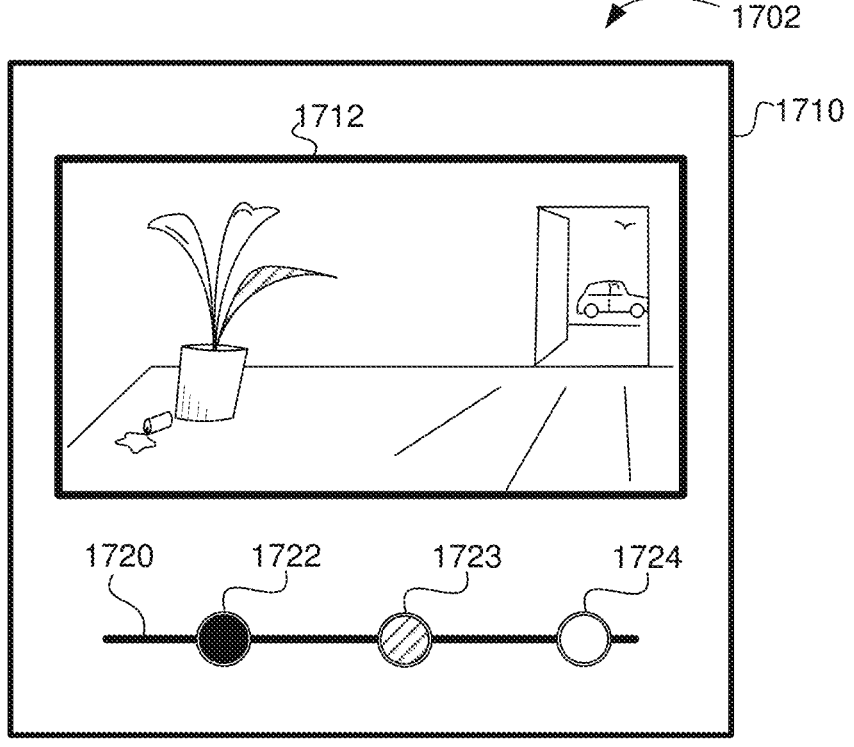
FIG. 17B illustrates a user interface (UI) system for adjusting a white point, median point, and a black point, in accordance with another embodiment.

FIG. 17B illustrates a user interface (UI) system 1702 for adjusting a white point, median point, and a black point, in accordance with another embodiment. As an option, the UI system 1702 may be implemented in the context of the details of any of the Figures. Of course, however, the UI system 1702 may be carried out in any desired environment. Further, the aforementioned definitions may equally apply to the description below.

As shown, in one embodiment, a slider bar 1720 may include a white point slider 1722, a median point slider 1723, and a white point slider 1724. In one embodiment, UI system 1702 is configured to operate substantially identically to UI system 1700, with the addition of median point slider 1723 and corresponding median point levels adjustment within an associated levels adjustment function. The median point may be adjusted manually by the user by moving the median point slider 1723 or automatically based on, for example, information within an input image.

Still yet, in various embodiments, one or more of the techniques disclosed herein may be applied to a variety of markets and/or products. For example, although the techniques have been disclosed in reference to a still photo capture, they may be applied to televisions, video capture, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1, 18:
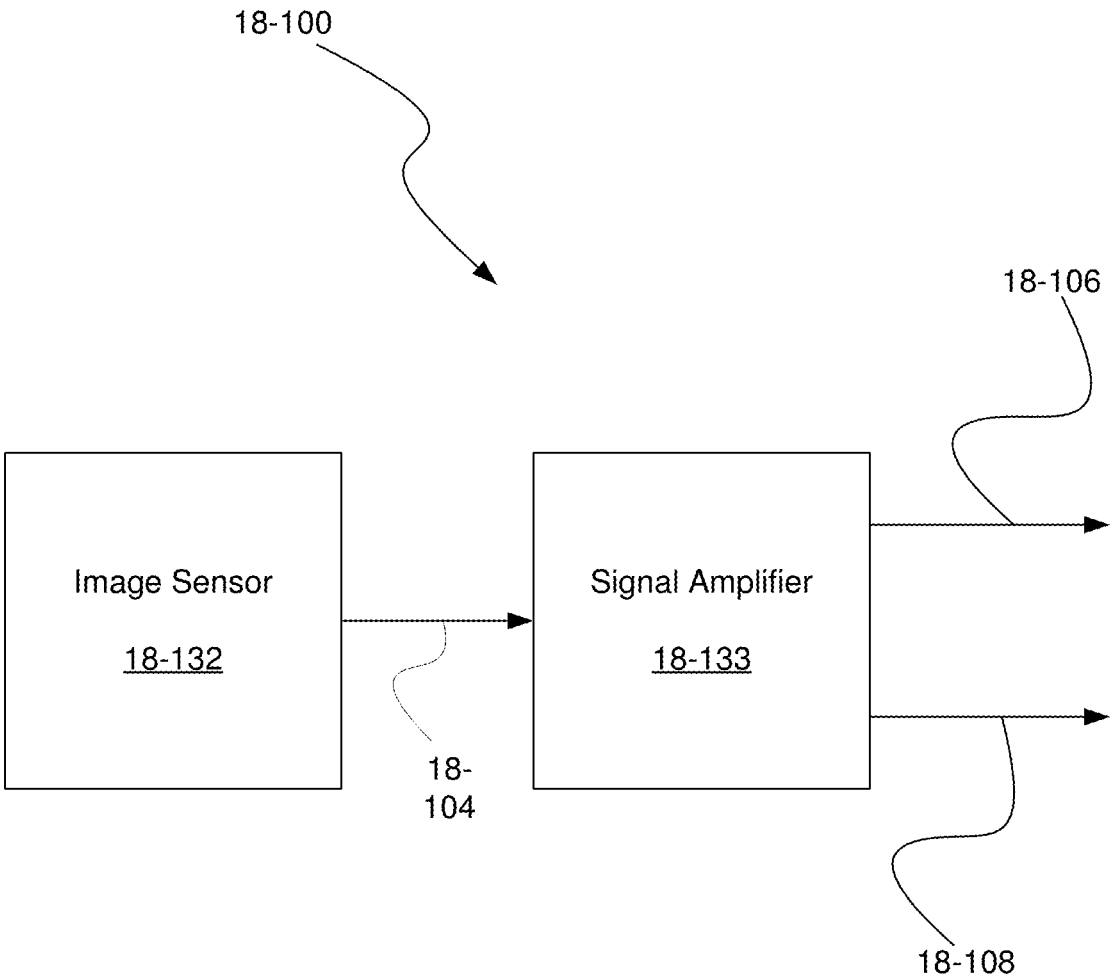
Figures 3A, 18:
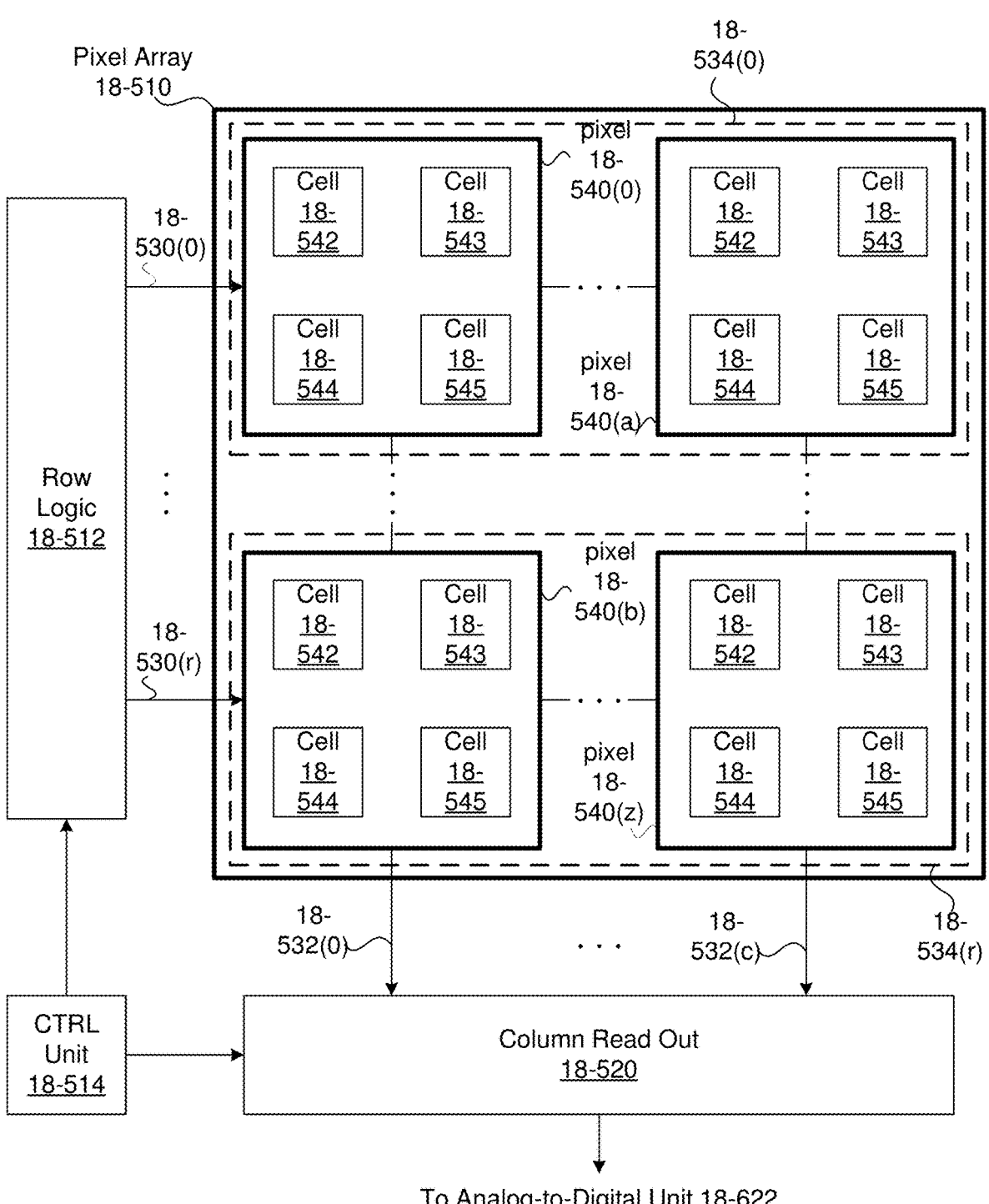
Figure 18:
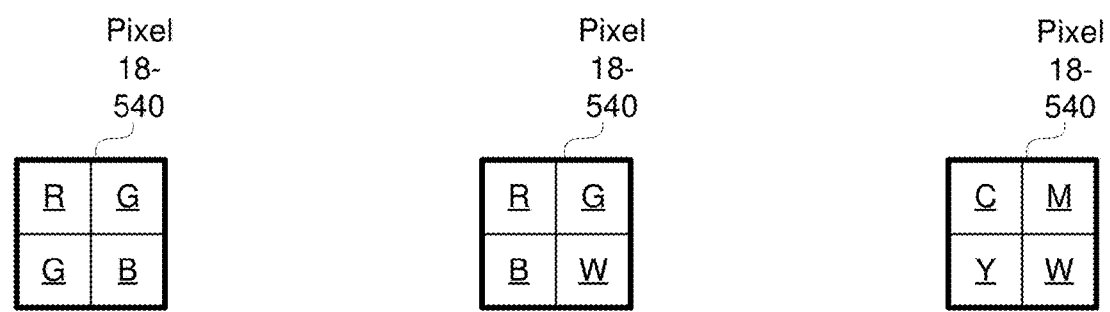
Figure 3E:
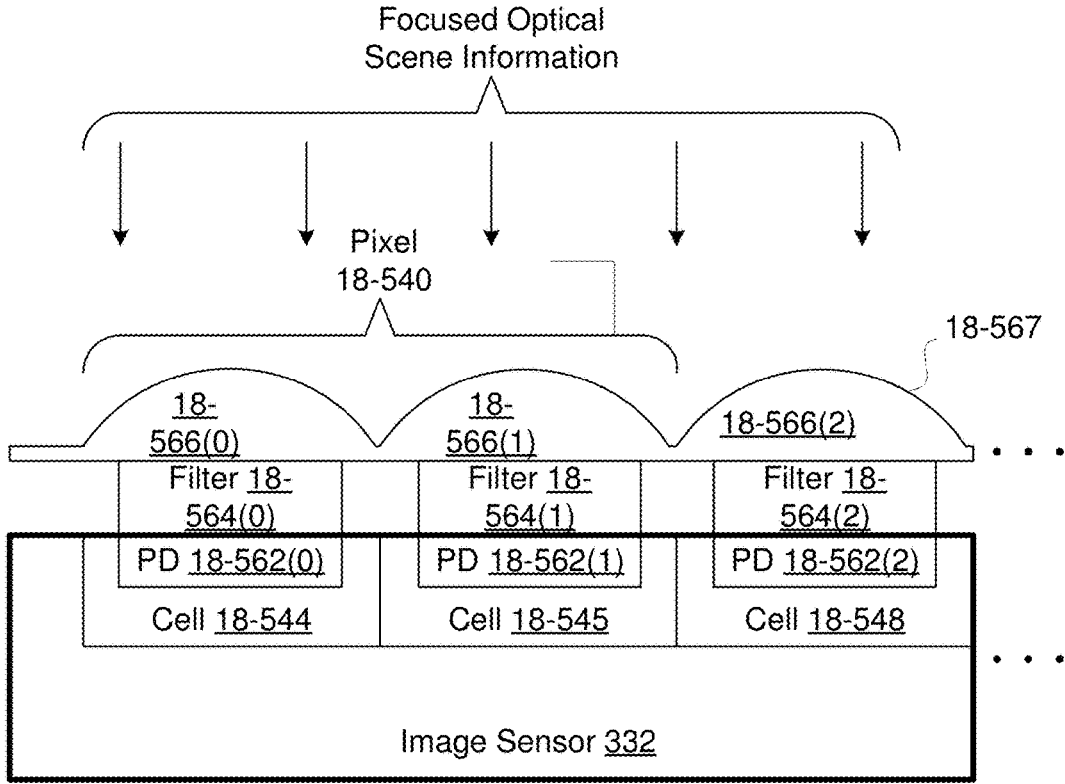
Figures 4, 18:
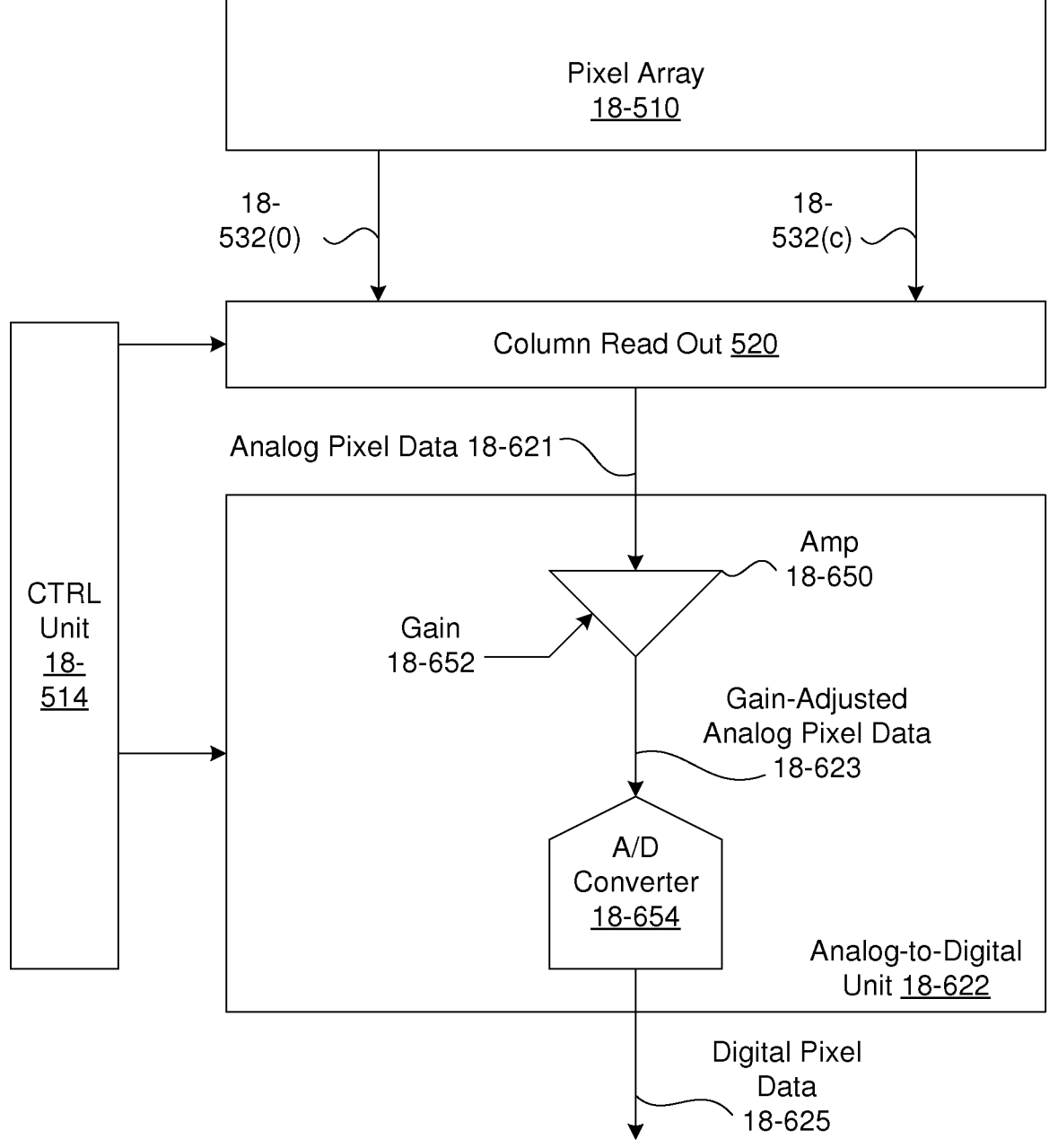
Figures 5, 18:
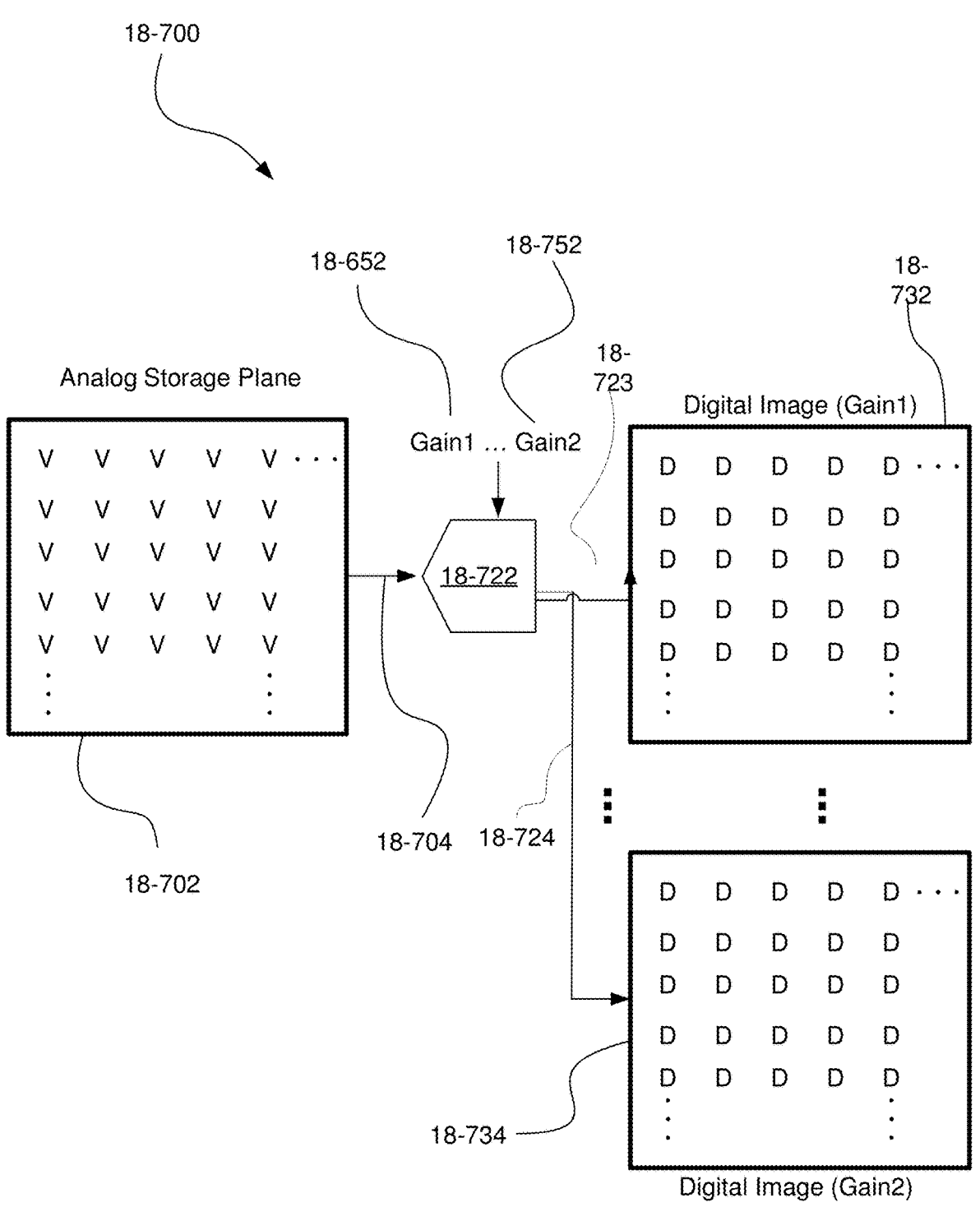
Figures 6, 18:
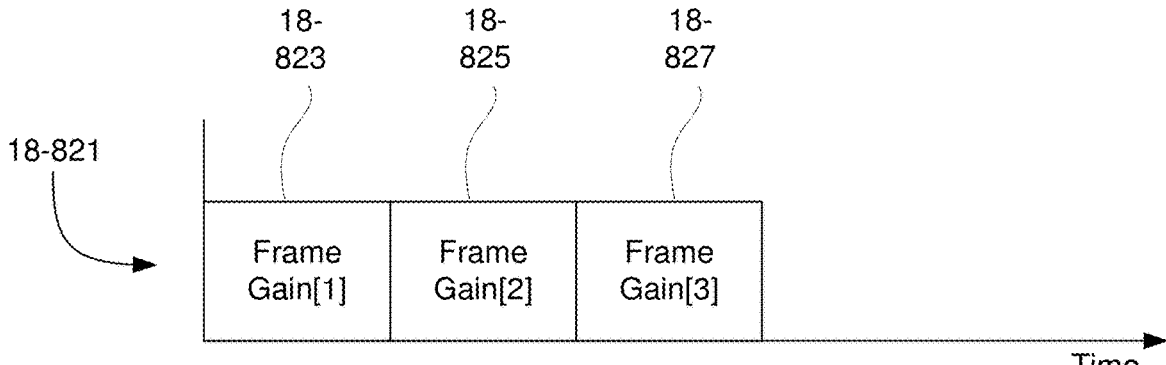
Figures 7, 18:
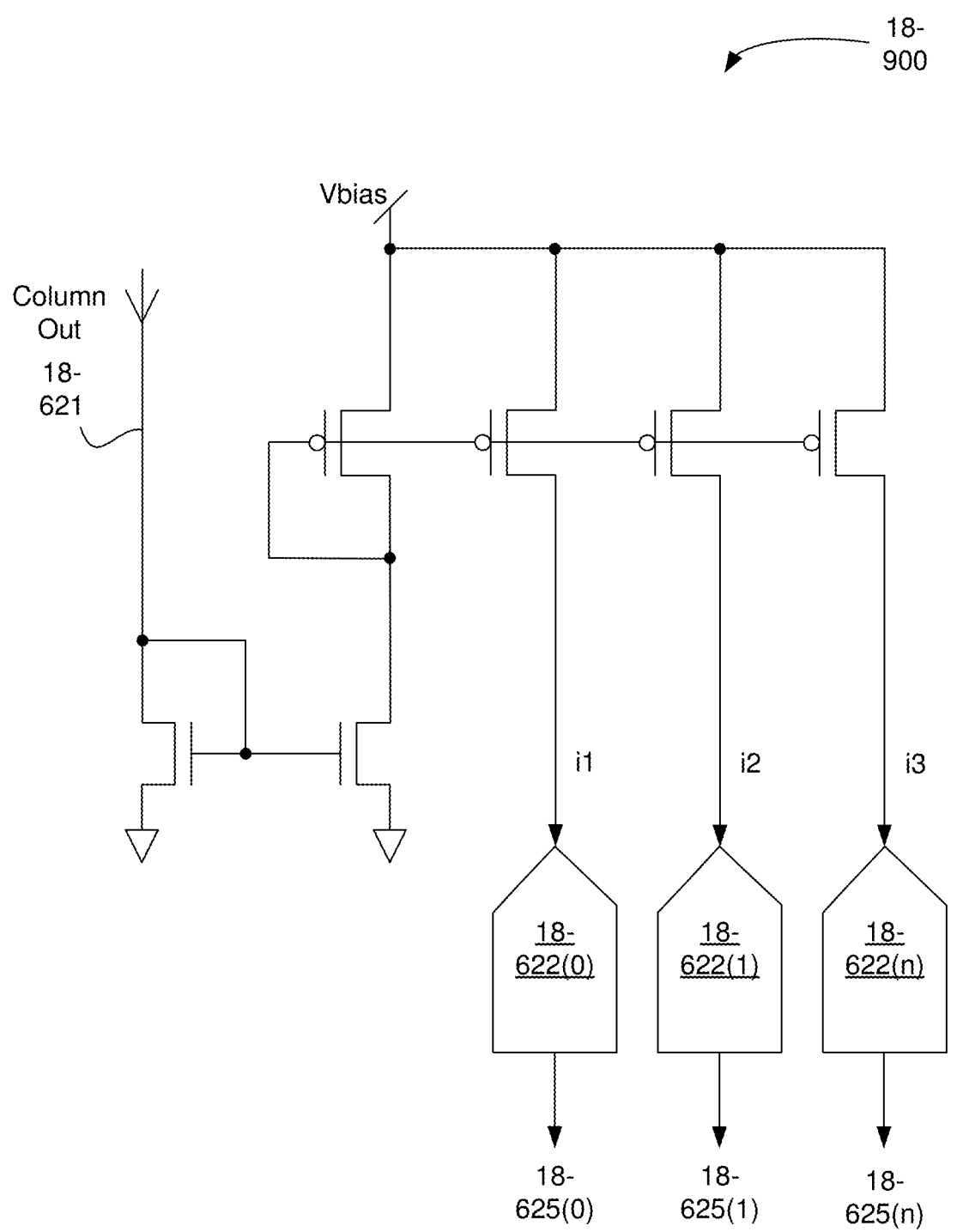
Figures 8, 18:
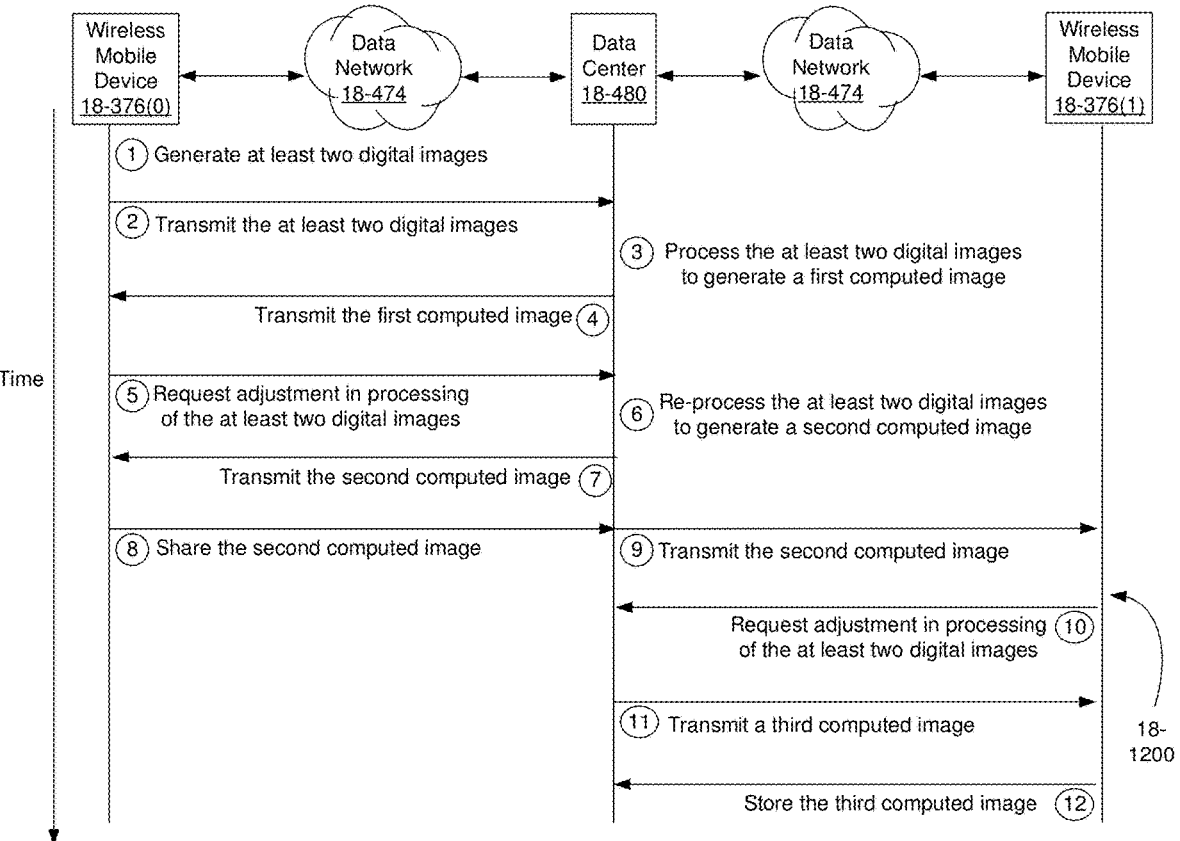

FIG. 18-1 illustrates a system 18-100 for obtaining multiple exposures with zero interframe time, in accordance with one possible embodiment. As an option, the system 18-100 may be implemented in the context of any of the Figures disclosed herein. Of course, however, the system 18-100 may be implemented in any desired environment. Further, the aforementioned definitions may equally apply to the description below.

As shown, a signal amplifier 18-133 receives an analog signal 18-104 from an image sensor 18-132. In response to receiving the analog signal 18-104, the signal amplifier 18-133 amplifies the analog signal 18-104 utilizing a first gain, and transmits a first amplified analog signal 18-106. Further, in response to receiving the analog signal 18-104, the signal amplifier 18-133 also amplifies the analog signal 18-104 utilizing a second gain, and transmits a second amplified analog signal 18-108.

In one specific embodiment, the analog signal 18-106 and the analog signal 18-108 are transmitted on a common electrical interconnect. In alternative embodiments, the analog signal 18-106 and the analog signal 18-108 are transmitted on different electrical interconnects.

In one embodiment, the analog signal 18-104 generated by image sensor 18-132 includes an electronic representation of an optical image that has been focused on the image sensor 18-132. In such an embodiment, the optical image may be focused on the image sensor 18-132 by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene.

In one embodiment, the image sensor 18-132 may comprise a complementary metal oxide semiconductor (CMOS) image sensor, or charge-coupled device (CCD) image sensor, or any other technically feasible form of image sensor.

In an embodiment, the signal amplifier 18-133 may include a transimpedance amplifier (TIA), which may be dynamically configured, such as by digital gain values, to provide a selected gain to the analog signal 18-104. For example, a TIA could be configured to apply a first gain to the analog signal. The same TIA could then be configured to subsequently apply a second gain to the analog signal. In other embodiments, the gain may be specified to the signal amplifier 18-133 as a digital value. Further, the specified gain value may be based on a specified sensitivity or ISO. The specified sensitivity may be specified by a user of a photographic system, or instead may be set by software or hardware of the photographic system, or some combination of the foregoing working in concert.

In one embodiment, the signal amplifier 18-133 includes a single amplifier. In such an embodiment, the amplified analog signals 18-106 and 18-108 are transmitted or output in sequence. For example, in one embodiment, the output may occur through a common electrical interconnect. For example, the amplified analog signal 18-106 may first be transmitted, and then the amplified analog signal 18-108 may subsequently be transmitted. In another embodiment, the signal amplifier 18-133 may include a plurality of amplifiers. In such an embodiment, the amplifier 18-133 may transmit the amplified analog signal 18-106 in parallel with the amplified analog signal 18-108. To this end, the analog signal 18-106 may be amplified utilizing the first gain in serial with the amplification of the analog signal 18-108 utilizing the second gain, or the analog signal 18-106 may be amplified utilizing the first gain in parallel with the amplification of the analog signal 18-108 utilizing the second gain. In one embodiment, the amplified analog signals 18-106 and 18-108 each include gain-adjusted analog pixel data.

Each instance of gain-adjusted analog pixel data may be converted to digital pixel data by subsequent processes and/or hardware. For example, the amplified analog signal 18-106 may subsequently be converted to a first digital signal comprising a first set of digital pixel data representative of the optical image that has been focused on the image sensor 18-132. Further, the amplified analog signal 18-108 may subsequently or concurrently be converted to a second digital signal comprising a second set of digital pixel data representative of the optical image that has been focused on the image sensor 18-132. In one embodiment, any differences between the first set of digital pixel data and the second set of digital pixel data are a function of a difference between the first gain and the second gain applied by the signal amplifier 18-133. Further, each set of digital pixel data may include a digital image of the photographic scene. Thus, the amplified analog signals 18-106 and 18-108 may be used to generate two different digital images of the photographic scene. Furthermore, in one embodiment, each of the two different digital images may represent a different exposure level.

FIG. 18-2 illustrates a method 18-200 for obtaining multiple exposures with zero interframe time, in accordance with one embodiment. As an option, the method 18-200 may be carried out in the context of any of the Figures disclosed herein. Of course, however, the method 18-200 may be carried out in any desired environment. Further, the aforementioned definitions may equally apply to the description below.

As shown in operation 18-202, an analog signal associated with an image is received from at least one pixel of an image sensor. In the context of the present embodiment, the analog signal may include analog pixel data for at least one pixel of an image sensor. In one embodiment, the analog signal may include analog pixel data for every pixel of an image sensor. In another embodiment, each pixel of an image sensor may include a plurality of photodiodes. In such an embodiment, the analog pixel data received in the analog signal may include an analog value for each photodiode of each pixel of the image sensor. Each analog value may be representative of a light intensity measured at the photodiode associated with the analog value. Accordingly, an analog signal may be a set of spatially discrete intensity samples, each represented by continuous analog values, and analog pixel data may be analog signal values associated with one or more given pixels.

Additionally, as shown in operation 18-204, a first amplified analog signal associated with the image is generated by amplifying the analog signal utilizing a first gain, and a second amplified analog signal associated with the image is generated by amplifying the analog signal utilizing a second gain. Accordingly, the analog signal is amplified utilizing both the first gain and the second gain, resulting in the first amplified analog signal and the second amplified analog signal, respectively. In one embodiment, the first amplified analog signal may include first gain-adjusted analog pixel data. In such an embodiment, the second amplified analog signal may include second gain-adjusted analog pixel data. In accordance with one embodiment, the analog signal may be amplified utilizing the first gain simultaneously with the amplification of the analog signal utilizing the second gain. In another embodiment, the analog signal may be amplified utilizing the first gain during a period of time other than when the analog signal is amplified utilizing the second gain. For example, the first gain and the second gain may be applied to the analog signal in sequence. In one embodiment, a sequence for applying the gains to the analog signal may be predetermined.

Further, as shown in operation 18-206, the first amplified analog signal and the second amplified analog signal are both transmitted, such that multiple amplified analog signals are transmitted based on the analog signal associated with the image. In the context of one embodiment, the first amplified analog signal and the second amplified analog signal are transmitted in sequence. For example, the first amplified analog signal may be transmitted prior to the second amplified analog signal. In another embodiment, the first amplified analog signal and the second amplified signal may be transmitted in parallel.

The embodiments disclosed herein advantageously enable a camera module to sample images comprising an image stack with lower (e.g. at or near zero, etc.) inter-sample time (e.g. interframe, etc.) than conventional techniques. In certain embodiments, images comprising the image stack are effectively sampled during overlapping time intervals, which may reduce inter-sample time to zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 18-3A illustrates a system for capturing optical scene information for conversion to an electronic representation of a photographic scene, in accordance with one embodiment. As an option, the system of FIG. 18-3A may be implemented in the context of the details of any of the Figures.

As shown in FIG. 18-3A, a pixel array 18-510 is in communication with row logic 18-512 and a column read out circuit 18-520. Further, the row logic 18-512 and the column read out circuit 18-520 are both in communication with a control unit 18-514. Still further, the pixel array 18-510 is shown to include a plurality of pixels 18-540, where each pixel 18-540 may include four cells, cells 18-542-18-545. In the context of the present description, the pixel array 18-510 may be included in an image sensor, such as image sensor 132 or image sensor 332 of camera module 330.

As shown, the pixel array 18-510 includes a 2-dimensional array of the pixels 18-540. For example, in one embodiment, the pixel array 18-510 may be built to comprise 4,000 pixels 18-540 in a first dimension, and 3,000 pixels 18-540 in a second dimension, for a total of 12,000,000 pixels 18-540 in the pixel array 18-510, which may be referred to as a 12 megapixel pixel array. Further, as noted above, each pixel 18-540 is shown to include four cells 18-542-18-545. In one embodiment, cell 18-542 may be associated with (e.g. selectively sensitive to, etc.) a first color of light, cell 18-543 may be associated with a second color of light, cell 18-544 may be associated with a third color of light, and cell 18-545 may be associated with a fourth color of light. In one embodiment, each of the first color of light, second color of light, third color of light, and fourth color of light are different colors of light, such that each of the cells 18-542-18-545 may be associated with different colors of light. In another embodiment, at least two cells of the cells 18-542-18-545 may be associated with a same color of light. For example, the cell 18-543 and the cell 18-544 may be associated with the same color of light.

Further, each of the cells 18-542-18-545 may be capable of storing an analog value. In one embodiment, each of the cells 18-542-18-545 may be associated with a capacitor for storing a charge that corresponds to an accumulated exposure during an exposure time. In such an embodiment, asserting a row select signal to circuitry of a given cell may cause the cell to perform a read operation, which may include, without limitation, generating and transmitting a current that is a function of the stored charge of the capacitor associated with the cell. In one embodiment, prior to a readout operation, current received at the capacitor from an associated photodiode may cause the capacitor, which has been previously charged, to discharge at a rate that is proportional to an incident light intensity detected at the photodiode. The remaining charge of the capacitor of the cell may then be read using the row select signal, where the current transmitted from the cell is an analog value that reflects the remaining charge on the capacitor. To this end, an analog value received from a cell during a readout operation may reflect an accumulated intensity of light detected at a photodiode. The charge stored on a given capacitor, as well as any corresponding representations of the charge, such as the transmitted current, may be referred to herein as a type of analog pixel data. Of course, analog pixel data may include a set of spatially discrete intensity samples, each represented by continuous analog values.

Still further, the row logic 18-512 and the column read out circuit 18-520 may work in concert under the control of the control unit 18-514 to read a plurality of cells 18-542-18-545 of a plurality of pixels 18-540. For example, the control unit 18-514 may cause the row logic 18-512 to assert a row select signal comprising row control signals 18-530 associated with a given row of pixels 18-540 to enable analog pixel data associated with the row of pixels to be read. As shown in FIG. 18-3A, this may include the row logic 18-512 asserting one or more row select signals comprising row control signals 18-530(0) associated with a row 18-534(0) that includes pixel 18-540(0) and pixel 18-540(a). In response to the row select signal being asserted, each pixel 18-540 on row 18-534(0) transmits at least one analog value based on charges stored within the cells 18-542-18-545 of the pixel 18-540. In certain embodiments, cell 18-542 and cell 18-543 are configured to transmit corresponding analog values in response to a first row select signal, while cell 18-544 and cell 18-545 are configured to transmit corresponding analog values in response to a second row select signal.

In one embodiment, analog values for a complete row of pixels 18-540 comprising each row 18-534(0) through 18-534(r) may be transmitted in sequence to column read out circuit 18-520 through column signals 18-532. In one embodiment, analog values for a complete row or pixels or cells within a complete row of pixels may be transmitted simultaneously. For example, in response to row select signals comprising row control signals 18-530(0) being asserted, the pixel 18-540(0) may respond by transmitting at least one analog value from the cells 18-542-18-545 of the pixel 18-540(0) to the column read out circuit 18-520 through one or more signal paths comprising column signals 18-532(0); and simultaneously, the pixel 18-540(a) will also transmit at least one analog value from the cells 18-542-18-545 of the pixel 18-540(a) to the column read out circuit 18-520 through one or more signal paths comprising column signals 18-532(c). Of course, one or more analog values may be received at the column read out circuit 18-520 from one or more other pixels 18-540 concurrently to receiving the at least one analog value from pixel 18-540(0) and concurrently receiving the at least one analog value from the pixel 18-540(a). Together, a set of analog values received from the pixels 18-540 comprising row 18-534(0) may be referred to as an analog signal, and this analog signal may be based on an optical image focused on the pixel array 18-510. An analog signal may be a set of spatially discrete intensity samples, each represented by continuous analog values.

Further, after reading the pixels 18-540 comprising row 18-534(0), the row logic 18-512 may select a second row of pixels 18-540 to be read. For example, the row logic 18-512 may assert one or more row select signals comprising row control signals 18-530(r) associated with a row of pixels 18-540 that includes pixel 18-540(b) and pixel 18-540(z). As a result, the column read out circuit 18-520 may receive a corresponding set of analog values associated with pixels 18-540 comprising row 18-534(r).

The column read out circuit 18-520 may serve as a multiplexer to select and forward one or more received analog values to an analog-to-digital converter circuit, such as analog-to-digital unit 18-622 of FIG. 18-4. The column read out circuit 18-520 may forward the received analog values in a predefined order or sequence. In one embodiment, row logic 18-512 asserts one or more row selection signals comprising row control signals 18-530, causing a corresponding row of pixels to transmit analog values through column signals 18-532. The column read out circuit 18-520 receives the analog values and sequentially selects and forwards one or more of the analog values at a time to the analog-to-digital unit 18-622. Selection of rows by row logic 18-512 and selection of columns by column read out circuit 18-620 may be directed by control unit 18-514. In one embodiment, rows 18-534 are sequentially selected to be read, starting with row 18-534(0) and ending with row 18-534(r), and analog values associated with sequential columns are transmitted to the analog-to-digital unit 18-622. In other embodiments, other selection patterns may be implemented to read analog values stored in pixels 18-540.

Further, the analog values forwarded by the column read out circuit 18-520 may comprise analog pixel data, which may later be amplified and then converted to digital pixel data for generating one or more digital images based on an optical image focused on the pixel array 18-510.

FIGS. 18-3B-18-3D illustrate three optional pixel configurations, according to one or more embodiments. As an option, these pixel configurations may be implemented in the context of the details of any of the Figures disclosed herein. Of course, however, these pixel configurations may be implemented in any desired environment. By way of a specific example, any of the pixels 18-540 of FIGS. 18-3B-18-3D may operate as one or more of the pixels 18-540 of the pixel array 18-510.

As shown in FIG. 18-3B, a pixel 18-540 is illustrated to include a first cell (R) for measuring red light intensity, second and third cells (G) for measuring green light intensity, and a fourth cell (B) for measuring blue light intensity, in accordance with one embodiment. As shown in FIG. 18-3C, a pixel 18-540 is illustrated to include a first cell (R) for measuring red light intensity, a second cell (G) for measuring green light intensity, a third cell (B) for measuring blue light intensity, and a fourth cell (W) for measuring white light intensity, in accordance with another embodiment. As shown in FIG. 18-3D, a pixel 18-540 is illustrated to include a first cell (C) for measuring cyan light intensity, a second cell (M) for measuring magenta light intensity, a third cell (Y) for measuring yellow light intensity, and a fourth cell (W) for measuring white light intensity, in accordance with yet another embodiment.

Of course, while pixels 18-540 are each shown to include four cells, a pixel 18-540 may be configured to include fewer or more cells for measuring light intensity. Still further, in another embodiment, while certain of the cells of pixel 18-540 are shown to be configured to measure a single peak wavelength of light, or white light, the cells of pixel 18-540 may be configured to measure any wavelength, range of wavelengths of light, or plurality of wavelengths of light.

Referring now to FIG. 18-3E, a system is shown for capturing optical scene information focused as an optical image on an image sensor 332, in accordance with one embodiment. As an option, the system of FIG. 18-3E may be implemented in the context of the details of any of the Figures. Of course, however, the system of FIG. 18-3E may be carried out in any desired environment. Further, the aforementioned definitions may equally apply to the description below.

As shown in FIG. 18-3E, an image sensor 332 is shown to include a first cell 18-544, a second cell 18-545, and a third cell 18-548. Further, each of the cells 18-544-548 is shown to include a photodiode 18-562. Still further, upon each of the photodiodes 18-562 is a corresponding filter 18-564, and upon each of the filters 18-564 is a corresponding microlens 18-566. For example, the cell 18-544 is shown to include photodiode 18-562(0), upon which is filter 18-564(0), and upon which is microlens 18-566(0). Similarly, the cell 18-545 is shown to include photodiode 18-562(1), upon which is filter 18-564(1), and upon which is microlens 18-566(1). Still yet, as shown in FIG. 18-3E, pixel 18-540 is shown to include each of cells 18-544 and 18-545, photodiodes 18-562(0) and 18-562(1), filters 18-564(0) and 18-564(1), and microlenses 18-566(0) and 18-566(1).

In one embodiment, each of the microlenses 18-566 may be any lens with a diameter of less than 50 microns. However, in other embodiments each of the microlenses 18-566 may have a diameter greater than or equal to 50 microns. In one embodiment, each of the microlenses 18-566 may include a spherical convex surface for focusing and concentrating received light on a supporting substrate beneath the microlens 18-566. For example, as shown in FIG. 18-3E, the microlens 18-566(0) focuses and concentrates received light on the filter 18-564(0). In one embodiment, a microlens array 18-567 may include microlenses 18-566, each corresponding in placement to photodiodes 18-562 within cells 18-544 of image sensor 332.

In the context of the present description, the photodiodes 18-562 may comprise any semiconductor diode that generates a potential difference, or changes its electrical resistance, in response to photon absorption. Accordingly, the photodiodes 18-562 may be used to detect or measure light intensity. Further, each of the filters 18-564 may be optical filters for selectively transmitting light of one or more predetermined wavelengths. For example, the filter 18-564 (0) may be configured to selectively transmit substantially only green light received from the corresponding microlens 18-566(0), and the filter 18-564(1) may be configured to selectively transmit substantially only blue light received from the microlens 18-566(1). Together, the filters 18-564 and microlenses 18-566 may be operative to focus selected wavelengths of incident light on a plane. In one embodiment, the plane may be a 2-dimensional grid of photodiodes 18-562 on a surface of the image sensor 332. Further, each photodiode 18-562 receives one or more predetermined wavelengths of light, depending on its associated filter. In one embodiment, each photodiode 18-562 receives only one of red, blue, or green wavelengths of filtered light. As shown with respect to FIGS. 18-3B-18-3D, it is contemplated that a photodiode may be configured to detect wavelengths of light other than only red, green, or blue. For example, in the context of FIGS. 18-3C-18-3D specifically, a photodiode may be configured to detect white, cyan, magenta, yellow, or non-visible light such as infrared or ultraviolet light.

To this end, each coupling of a cell, photodiode, filter, and microlens may be operative to receive light, focus and filter the received light to isolate one or more predetermined wavelengths of light, and then measure, detect, or otherwise quantify an intensity of light received at the one or more predetermined wavelengths. The measured or detected light may then be represented as an analog value stored within a cell. For example, in one embodiment, the analog value may be stored within the cell utilizing a capacitor, as discussed in more detail above. Further, the analog value stored within the cell may be output from the cell based on a selection signal, such as a row selection signal, which may be received from row logic 18-512. Further still, the analog value transmitted from a single cell may comprise one analog value in a plurality of analog values of an analog signal, where each of the analog values is output by a different cell. Accordingly, the analog signal may comprise a plurality of analog pixel data values from a plurality of cells. In one embodiment, the analog signal may comprise analog pixel data values for an entire image of a photographic scene. In another embodiment, the analog signal may comprise analog pixel data values for a subset of the entire image of the photographic scene. For example, the analog signal may comprise analog pixel data values for a row of pixels of the image of the photographic scene. In the context of FIGS. 18-3A-18-3E, the row 18-534(0) of the pixels 18-540 of the pixel array 18-510 may be one such row of pixels of the image of the photographic scene.

FIG. 18-4 illustrates a system for converting analog pixel data to digital pixel data, in accordance with an embodiment. As an option, the system of FIG. 18-4 may be implemented in the context of the details of any of the Figures disclosed herein. Of course, however, the system of FIG. 18-4 may be implemented in any desired environment. Further, the aforementioned definitions may equally apply to the description below.

As shown in FIG. 18-4, analog pixel data 18-621 is received from column read out circuit 18-520 at analog-to-digital unit 18-622 under the control of control unit 18-514. The analog pixel data 18-621 may be received within an analog signal, as noted hereinabove. Further, the analog-todigital unit 18-622 generates digital pixel data 18-625 based on the received analog pixel data 18-621.

More specifically, and as shown in FIG. 18-4, the analog-to-digital unit 18-622 includes an amplifier 18-650 and an analog-to-digital converter 18-654. In one embodiment, the amplifier 18-650 receives both the analog pixel data 18-621 and a gain 18-652, and applies the gain 18-652 to the analog pixel data 18-621 to generate gain-adjusted analog pixel data 18-623. The gain-adjusted analog pixel data 18-623 is transmitted from the amplifier 18-650 to the analog-to-digital converter 18-654. The analog-to-digital converter 18-654 receives the gain-adjusted analog pixel data 18-623, and converts the gain-adjusted analog pixel data 18-623 to the digital pixel data 18-625, which is then transmitted from the analog-to-digital converter 18-654. In other embodiments, the amplifier 18-650 may be implemented within the column read out circuit 520 instead of within the analog-to-digital unit 18-622. The analog-to-digital converter 18-654 may convert the gain-adjusted analog pixel data 18-623 to the digital pixel data 18-625 using any technically feasible analog-to-digital conversion system.

In an embodiment, the gain-adjusted analog pixel data 18-623 results from the application of the gain 18-652 to the analog pixel data 18-621. In one embodiment, the gain 18-652 may be selected by the analog-to-digital unit 18-622. In another embodiment, the gain 18-652 may be selected by the control unit 18-514, and then supplied from the control unit 18-514 to the analog-to-digital unit 18-622 for application to the analog pixel data 18-621.

It should be noted, in one embodiment, that a consequence of applying the gain 18-652 to the analog pixel data 18-621 is that analog noise may appear in the gain-adjusted analog pixel data 18-623. If the amplifier 18-650 imparts a significantly large gain to the analog pixel data 18-621 in order to obtain highly sensitive data from of the pixel array 18-510, then a significant amount of noise may be expected within the gain-adjusted analog pixel data 18-623. In one embodiment, the detrimental effects of such noise may be reduced by capturing the optical scene information at a reduced overall exposure. In such an embodiment, the application of the gain 18-652 to the analog pixel data 18-621 may result in gain-adjusted analog pixel data with proper exposure and reduced noise.

In one embodiment, the amplifier 18-650 may be a transimpedance amplifier (TIA). Furthermore, the gain 18-652 may be specified by a digital value. In one embodiment, the digital value specifying the gain 18-652 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 18-652 may be associated with an ISO. In the field of photography, the ISO system is a well-established standard for specifying light sensitivity. In one embodiment, the amplifier 18-650 receives a digital value specifying the gain 18-652 to be applied to the analog pixel data 18-621. In another embodiment, there may be a mapping from conventional ISO values to digital gain values that may be provided as the gain 18-652 to the amplifier 18-650. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 18-650 for application as the gain 18-652. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 18-623 may include brightness corrected pixel data, where the brightness is corrected based on a specified ISO. In another embodiment, the gain-adjusted analog pixel data 18-623 for an image may include pixels having a brightness in the image as if the image had been sampled at a certain ISO.

In accordance with an embodiment, the digital pixel data 18-625 may comprise a plurality of digital values representing pixels of an image captured using the pixel array 18-510.

FIG. 18-5 illustrates a system 18-700 for converting analog pixel data of an analog signal to digital pixel data, in accordance with an embodiment. As an option, the system 18-700 may be implemented in the context of the details of any of the Figures disclosed herein. Of course, however, the system 18-700 may be implemented in any desired environment. Further, the aforementioned definitions may equally apply to the description below.

The system 18-700 is shown in FIG. 18-5 to include an analog storage plane 18-702, an analog-to-digital unit 18-722, a first digital image 18-732, and a second digital image 18-734. Additionally, in one embodiment, analog values may each be depicted as a "V" within the analog storage plane 18-702 and corresponding digital values may each be depicted as a "D" within first digital image 18-732 and second digital image 18-734.

In the context of the present description, the analog storage plane 18-702 may comprise any collection of one or more analog values. In one embodiment, the analog storage plane 18-702 may comprise one or more analog pixel values. In some embodiments, the analog storage plane 18-702 may comprise at least one analog pixel value for each pixel of a row or line of a pixel array. Still yet, in another embodiment, the analog storage plane 18-702 may comprise at least one analog pixel value for each pixel of an entirety of a pixel array, which may be referred to as a frame. In one embodiment, the analog storage plane 18-702 may comprise an analog value for each cell of a pixel. In yet another embodiment, the analog storage plane 18-702 may comprise an analog value for each cell of each pixel of a row or line of a pixel array. In another embodiment, the analog storage plane 18-702 may comprise an analog value for each cell of each pixel of multiple lines or rows of a pixel array. For example, the analog storage plane 18-702 may comprise an analog value for each cell of each pixel of every line or row of a pixel array.

Further, the analog values of the analog storage plane 18-702 are output as analog pixel data 18-704 to the analog-to-digital unit 18-722. In one embodiment, the analog-to-digital unit 18-722 may be substantially identical to the analog-to-digital unit 18-622 described within the context of FIG. 18-4. For example, the analog-to-digital unit 18-722 may comprise at least one amplifier and at least one analog-to-digital converter, where the amplifier is operative to receive a gain value and utilize the gain value to gain-adjust analog pixel data received at the analog-to-digital unit 18-722. Further, in such an embodiment, the amplifier may transmit gain-adjusted analog pixel data to an analog-to-digital converter, which then generates digital pixel data from the gain-adjusted analog pixel data.

In the context of the system 18-700 of FIG. 18-5, the analog-to-digital unit 18-722 receives the analog pixel data

18-704, and applies at least two different gains to the analog pixel data 18-704 to generate at least a first gain-adjusted analog pixel data and a second gain-adjusted analog pixel data. Further, the analog-to-digital unit 18-722 converts each generated gain-adjusted analog pixel data to digital pixel data, and then outputs at least two digital outputs. To this end, the analog-to-digital unit 18-722 provides a different digital output corresponding to each gain applied to the analog pixel data 18-704. With respect to FIG. 18-5 specifically, the analog-to-digital unit 18-722 is shown to generate a first digital signal comprising first digital pixel data 18-723 corresponding to a first gain 18-652, and a second digital signal comprising second digital pixel data 18-724 corresponding to a second gain 18-752.

In one embodiment, the analog-to-digital unit 18-722 applies in sequence the at least two gains to the analog values. For example, the analog-to-digital unit 18-722 first applies the first gain 18-652 to the analog pixel data 18-704, and then subsequently applies the second gain 18-752 to the same analog pixel data 18-704. In other embodiments, the analog-to-digital unit 18-722 may apply in parallel the at least two gains to the analog values. For example, the analog-to-digital unit 18-722 may apply the first gain 652 to the analog pixel data 18-704 in parallel with the application of the second gain 18-752 to the analog pixel data 18-704. To this end, as a result of applying the at least two gains, the analog pixel data 18-704 is amplified utilizing at least the first gain 18-652 and the second gain 18-752.

In accordance with one embodiment, the at least two gains may be determined using any technically feasible technique based on an exposure of a photographic scene, metering data, user input, detected ambient light, a strobe control, or any combination of the foregoing. For example, a first gain of the at least two gains may be determined such that half of the digital values from the analog storage plane 18-702 are converted to digital values above a specified threshold (e.g., a threshold of 0.5 in a range of 0.0 to 1.0) for the dynamic range associated with digital values comprising the first digital image 18-732, which can be characterized as having an "EV0" exposure. Continuing the example, a second gain of the at least two gains may be determined as being twice that of the first gain to generate a second digital image 18-734 characterized as having an "EV+1" exposure.

In one embodiment, the analog-to-digital unit 18-722 converts in sequence the first gain-adjusted analog pixel data to the first digital pixel data 18-723, and the second gain-adjusted analog pixel data to the second digital pixel data 18-724. For example, the analog-to-digital unit 18-722 first converts the first gain-adjusted analog pixel data to the first digital pixel data 18-723, and then subsequently converts the second gain-adjusted analog pixel data to the second digital pixel data 18-724. In other embodiments, the analog-to-digital unit 18-722 may perform such conversions in parallel, such that the first digital pixel data 18-723 is generated in parallel with the second digital pixel data 18-724.

Still further, as shown in FIG. 18-5, the first digital pixel data 18-723 is used to provide the first digital image 18-732. Similarly, the second digital pixel data 18-724 is used to provide the second digital image 18-734. The first digital image 18-732 and the second digital image 18-734 are both based upon the same analog pixel data 18-704, however the first digital image 18-732 may differ from the second digital image 18-734 as a function of a difference between the first gain 18-652 (used to generate the first digital image 18-732) and the second gain 18-752 (used to generate the second digital image 18-752). Specifically, the digital image generated using the largest gain of the at least two gains may be visually perceived as the brightest or more exposed. Conversely, the digital image generated using the smallest gain of the at least two gains may be visually perceived as the darkest and less exposed. To this end, a first light sensitivity value may be associated with the first digital pixel data 18-723, and a second light sensitivity value may be associated with the second digital pixel data 18-724. Further, because each of the gains may be associated with a different light sensitivity value, the first digital image or first digital signal may be associated with a first light sensitivity value, and the second digital image or second digital signal may be associated with a second light sensitivity value.

It should be noted that while a controlled application of gain to the analog pixel data may greatly aid in HDR image generation, an application of too great of gain may result in a digital image that is visually perceived as being noisy, over-exposed, and/or blown-out. In one embodiment, application of two stops of gain to the analog pixel data may impart visually perceptible noise for darker portions of a photographic scene, and visually imperceptible noise for brighter portions of the photographic scene. In another embodiment, a digital photographic device may be configured to provide an analog storage plane of analog pixel data for a captured photographic scene, and then perform at least two analog-to-digital samplings of the same analog pixel data using the analog-to-digital unit 18-722. To this end, a digital image may be generated for each sampling of the at least two samplings, where each digital image is obtained at a different exposure despite all the digital images being generated from the same analog sampling of a single optical image focused on an image sensor.

In one embodiment, an initial exposure parameter may be selected by a user or by a metering algorithm of a digital photographic device. The initial exposure parameter may be selected based on user input or software selecting particular capture variables. Such capture variables may include, for example, ISO, aperture, and shutter speed. An image sensor may then capture a single exposure of a photographic scene at the initial exposure parameter, and populate an analog storage plane with analog values corresponding to an optical image focused on the image sensor. Next, a first digital image may be obtained utilizing a first gain in accordance with the above systems and methods. For example, if the digital photographic device is configured such that the initial exposure parameter includes a selection of ISO 400, the first gain utilized to obtain the first digital image may be mapped to, or otherwise associated with, ISO 400. This first digital image may be referred to as an exposure or image obtained at exposure value 0 (EV0). Further at least one more digital image may be obtained utilizing a second gain in accordance with the above systems and methods. For example, the same analog pixel data used to generate the first digital image may be processed utilizing a second gain to generate a second digital image.

In one embodiment, at least two digital images may be generated using the same analog pixel data and blended to generate an HDR image. The at least two digital images generated using the same analog signal may be blended by blending a first digital signal and a second digital signal. Because the at least two digital images are generated using the same analog pixel data, there may be zero interframe time between the at least two digital images. As a result of having zero interframe time between at least two digital images of a same photographic scene, an HDR image may be generated without motion blur or other artifacts typical of HDR photographs.

In another embodiment, the second gain may be selected based on the first gain. For example, the second gain may be selected on the basis of it being one stop away from the first gain. More specifically, if the first gain is mapped to or associated with ISO 400, then one stop down from ISO 400 provides a gain associated with ISO 200, and one stop up from ISO 400 provides a gain associated with ISO 800. In such an embodiment, a digital image generated utilizing the gain associated with ISO 200 may be referred to as an exposure or image obtained at exposure value −1 (EV−1), and a digital image generated utilizing the gain associated with ISO 800 may be referred to as an exposure or image obtained at exposure value+1 (EV+1).

Still further, if a more significant difference in exposures is desired between digital images generated utilizing the same analog signal, then the second gain may be selected on the basis of it being two stops away from the first gain. For example, if the first gain is mapped to or associated with ISO 400, then two stops down from ISO 400 provides a gain associated with ISO 100, and two stops up from ISO 400 provides a gain associated with ISO 1600. In such an embodiment, a digital image generated utilizing the gain associated with ISO 100 may be referred to as an exposure or image obtained at exposure value −2 (EV−2), and a digital image generated utilizing the gain associated with ISO 1600 may be referred to as an exposure or image obtained at exposure value+2 (EV+2).

In one embodiment, an ISO and exposure of the EV0 image may be selected according to a preference to generate darker or more saturated digital images. In such an embodiment, the intention may be to avoid blowing out or overexposing what will be the brightest digital image, which is the digital image generated utilizing the greatest gain. In another embodiment, an EV−1 digital image or EV−2 digital image may be a first generated digital image. Subsequent to generating the EV−1 or EV−2 digital image, an increase in gain at an analog-to-digital unit may be utilized to generate an EV0 digital image, and then a second increase in gain at the analog-to-digital unit may be utilized to generate an EV+1 or EV+2 digital image. In one embodiment, the initial exposure parameter corresponds to an EV−N digital image and subsequent gains are used to obtain an EV0 digital image, an EV+M digital image, or any combination thereof, where N and M are values ranging from 0 to −10.

In one embodiment, an EV−2 digital image, an EV0 digital image, and an EV+2 digital image may be generated in parallel by implementing three analog-to-digital units. Such an implementation may be also capable of simultaneously generating all of an EV−1 digital image, an EV0 digital image, and an EV+1 digital image. Similarly, any combination of exposures may be generated in parallel from two or more analog-to-digital units, three or more analog-to-digital units, or an arbitrary number of analog-to-digital units.

FIG. 18-6 illustrates various timing configurations for amplifying analog signals, in accordance with various embodiments. As an option, the timing configurations of FIG. 18-6 may be implemented in the context of the details of any of the Figures disclosed herein. Of course, however, the timing configurations of FIG. 18-6 may be carried out in any desired environment. Further, the aforementioned definitions may equally apply to the description below.

Specifically, as shown in FIG. 18-6, per pixel timing configuration 18-801 is shown to amplify analog signals on a pixel-by-pixel basis. Further, per line timing configuration 18-811 is shown to amplify analog signals on a line-by-line basis. Finally, per frame timing configuration 18-821 is shown to amplify analog signals on a frame-by-frame basis. Each amplified analog signal associated with analog pixel data may be converted to a corresponding digital signal value.

In systems that implement per pixel timing configuration 18-801, an analog signal containing analog pixel data may be received at an analog-to-digital unit. Further, the analog pixel data may include individual analog pixel values. In such an embodiment, a first analog pixel value associated with a first pixel may be identified within the analog signal and selected. Next, each of a first gain 18-803, a second gain 18-805, and a third gain 18-807 may be applied in sequence or concurrently to the same first analog pixel value. In some embodiments less than or more than three different gains may be applied to a selected analog pixel value. For example, in some embodiments applying only two different gains to the same analog pixel value may be sufficient for generating a satisfactory HDR image. In one embodiment, after applying each of the first gain 18-803, the second gain 18-805, and the third gain 18-807, a second analog pixel value associated with a second pixel may be identified within the analog signal and selected. The second pixel may be a neighboring pixel of the first pixel. For example, the second pixel may be in a same row as the first pixel and located adjacent to the first pixel on a pixel array of an image sensor. Next, each of the first gain 18-803, the second gain 18-805, and the third gain 18-807 may be applied in sequence or concurrently to the same second analog pixel value. To this end, in the per pixel timing configuration 18-801, a plurality of sequential analog pixel values may be identified within an analog signal, and a set of at least two gains are applied to each pixel in the analog signal on a pixel-by-pixel basis.

Further, in systems that implement the per pixel timing configuration 18-801, a control unit may select a next gain to be applied after each pixel is amplified using a previously selected gain. In another embodiment, a control unit may control an amplifier to cycle through a set of predetermined gains that will be applied to a first analog pixel value, such a first analog pixel data value comprising analog pixel data 18-704, associated with a first pixel so that each gain in the set may be used to amplify the first analog pixel data before applying the set of predetermined gains to a second analog pixel data that subsequently arrives at the amplifier. In one embodiment, and as shown in the context of FIG. 18-6, this may include selecting a first gain, applying the first gain to a received first analog pixel value, selecting a second gain, applying the second gain to the received first analog pixel value, selecting a third gain, applying the third selected gain to the received first analog pixel value, and then receiving a second analog pixel value and applying the three selected gains to the second pixel value in the same order as applied to the first pixel value. In one embodiment, each analog pixel value may be read a plurality of times. In general, an analog storage plane may be utilized to hold the analog pixel values of the pixels for reading.

In systems that implement per line timing configuration 18-811, an analog signal containing analog pixel data may be received at an analog-to-digital unit. Further, the analog pixel data may include individual analog pixel values. In one embodiment, a first line of analog pixel values associated with a first line of pixels of a pixel array may be identified within the analog signal and selected. Next, each of a first gain 18-813, a second gain 18-815, and a third gain 18-817 may be applied in sequence or concurrently to the same first line of analog pixel values. In some embodiments less than or more than three different gains may be applied to a selected line of analog pixel values. For example, in some embodiments applying only two different gains to the same line of analog pixel values may be sufficient for generating a satisfactory HDR image. In one embodiment, after applying each of the first gain 18-813, the second gain 18-815, and the third gain 18-817, a second line of analog pixel values associated with a second line of pixels may be identified within the analog signal and selected. The second line of pixels may be a neighboring line of the first line of pixels. For example, the second line of pixels may be located immediately above or immediately below the first line of pixels in a pixel array of an image sensor. Next, each of the first gain 18-813, the second gain 18-815, and the third gain 18-817 may be applied in sequence or concurrently to the same second line of analog pixel values. To this end, in the per line timing configuration 18-811, a plurality of sequential lines of analog pixel values are identified within an analog signal, and a set of at least two gains are applied to each line of analog pixel values in the analog signal on a line-by-line basis.

Further, in systems that implement the per line timing configuration 18-811, a control unit may select a next gain to be applied after each line is amplified using a previously selected gain. In another embodiment, a control unit may control an amplifier to cycle through a set of predetermined gains that will be applied to a line so that each gain in the set is used to amplify a first line of analog pixel values before applying the set of predetermined gains to a second line of analog pixel values that arrives at the amplifier subsequent to the first line of analog pixel values. In one embodiment, and as shown in the context of FIG. 18-6, this may include selecting a first gain, applying the first gain to a received first line of analog pixel values, selecting a second gain, applying the second gain to the received first line of analog pixel values, selecting a third gain, applying the third selected gain to the received first line of analog pixel values, and then receiving a second line of analog pixel values and applying the three selected gains to the second line of analog pixel values in the same order as applied to the first line of analog pixel values. In one embodiment, each line of analog pixel values may be read a plurality of times. In another embodiment, an analog storage plane may be utilized to hold the analog pixel data values of one or more lines for reading.

In systems that implement per frame timing configuration 18-821, an analog signal that contains a plurality of analog pixel data values comprising analog pixel values may be received at an analog-to-digital unit. In such an embodiment, a first frame of analog pixel values associated with a first frame of pixels may be identified within the analog signal and selected. Next, each of a first gain 18-823, a second gain 18-825, and a third gain 18-827 may be applied in sequence or concurrently to the same first frame of analog pixel values. In some embodiments less than or more than three different gains may be applied to a selected frame of analog pixel values. For example, in some embodiments applying only two different gains to the same frame of analog pixel values may be sufficient for generating a satisfactory HDR image.

In one embodiment, after applying each of the first gain 18-823, the second gain 18-825, and the third gain 18-827, a second frame of analog pixel values associated with a second frame of pixels may be identified within the analog signal and selected. The second frame of pixels may be a next frame in a sequence of frames that capture video data associated with a photographic scene. For example, a digital photographic system may be operative to capture 30 frames per second of video data. In such digital photographic systems, the first frame of pixels may be one frame of said thirty frames, and the second frame of pixels may be a second frame of said thirty frames. Further still, each of the first gain 18-823, the second gain 18-825, and the third gain 18-827 may be applied in sequence to the analog pixel values of the second frame. To this end, in the per frame timing configuration 18-821, a plurality of sequential frames of analog pixel values may be identified within an analog signal, and a set of at least two gains are applied to each frame of analog pixel values on a frame-by-frame basis.

Further, in systems that implement the per frame timing configuration 18-821, a control unit may select a next gain to be applied after each frame is amplified using a previously selected gain. In another embodiment, a control unit may control an amplifier to cycle through a set of predetermined gains that will be applied to a frame so that each gain is used to amplify a analog pixel values associated with the first frame before applying the set of predetermined gains to analog pixel values associated with a second frame that subsequently arrive at the amplifier. In one embodiment, and as shown in the context of FIG. 18-6, this may include selecting a first gain, applying the first gain to analog pixel values associated with the first frame, selecting a second gain, applying the second gain to analog pixel values associated with the first frame, selecting a third gain, and applying the third gain to analog pixel values associated with the first frame. In another embodiment, analog pixel values associated with a second frame may be received following the application of all three selected gains to analog pixel values associated with the first frame, and the three selected gains may then be applied to analog pixel values associated with the second frame in the same order as applied to the first frame.

In yet another embodiment, selected gains applied to the first frame may be different than selected gains applied to the second frame, such as may be the case when the second frame includes different content and illumination than the first frame. In general, an analog storage plane may be utilized to hold the analog pixel data values of one or more frames for reading.

In certain embodiments, an analog-to-digital unit is assigned for each different gain and the analog-to-digital units are configured to operate concurrently. Resulting digital values may be interleaved for output or may be output in parallel. For example, analog pixel data for a given row may be amplified according to gain 18-803 and converted to corresponding digital values by a first analog-to-digital unit, while, concurrently, the analog pixel data for the row may be amplified according to gain 18-805 and converted to corresponding digital values by a second analog-to-digital unit. Furthermore, and concurrently, the analog pixel data for the row may be amplified according to gain 18-807 and converted to corresponding digital values by a third analog-to-digital unit. Digital values from the first through third analog-to-digital units may be output as sets of pixels, with each pixel in a set of pixels corresponding to one of the three gains 18-803, 18-805, 18-807. Similarly, output data values may be organized as lines having different gain values, with each line comprising pixels with a gain corresponding to one of the three gains 18-803, 18-805, 18-807.

FIG. 18-7 illustrates a system 18-900 for converting in parallel analog pixel data to multiple signals of digital pixel data, in accordance with one embodiment. As an option, the system 18-900 may be implemented in the context of the details of any of the Figures disclosed herein. Of course, however, the system 18-900 may be implemented in any desired environment. Further, the aforementioned definitions may equally apply to the description below.

In the context of FIG. 18-7, the system 18-900 is shown to receive as input analog pixel data 18-621. The analog pixel data 18-621 may be received within an analog signal, as noted hereinabove. Further, the analog-to-digital units 18-622 may be configured to generate digital pixel data 18-625 based on the received analog pixel data 18-621.

As shown in FIG. 18-7, the system 18-900 is configured to mirror the current of the analog pixel data 18-621 such that each of analog-to-digital unit 18-622(0), analog-to-digital unit 18-622(1), and analog-to-digital unit 18-622(n) receive a scaled copy of the analog pixel data 18-621. In one embodiment, each of the analog-to-digital unit 18-622(0), the analog-to-digital unit 18-622(1), and the analog-to-digital unit 18-622(n) may be configured to apply a unique gain to the analog pixel data 18-621. Each scaled copy may be scaled according to physical dimensions for the transistors comprising system 18-900, which comprises a structure known in the art as a current mirror. As shown, each current $i1$, $i2$, $i3$ may be generated in an arbitrary ratio relative to input current $Iin$, based on the physical dimensions. For example, currents $i1$, $i2$, $i3$ may be generated in a ratio of 1:1:1, 1:2:4, 0.5:1:2, or any other technically feasible ratio relative to $Iin$.

In an embodiment, the unique gains may be configured at each of the analog-to-digital units 18-622 by a controller. By way of a specific example, the analog-to-digital unit 18-622(0) may be configured to apply a gain of 1.0 to the analog pixel data 18-621, the analog-to-digital unit 18-622(1) may be configured to apply a gain of 2.0 to the analog pixel data 18-621, and the analog-to-digital unit 18-622(n) may be configured to apply a gain of 4.0 to the analog pixel data 18-621. Accordingly, while the same analog pixel data 18-621 may be input transmitted to each of the analog-to-digital unit 18-622(0), the analog-to-digital unit 18-622(1), and the analog-to-digital unit 18-622(n), each of digital pixel data 18-625(0), digital pixel data 18-625(1), and digital pixel data 18-625(n) may include different digital values based on the different gains applied within the analog-to-digital units 18-622, and thereby provide unique exposure representations of the same photographic scene.

In the embodiment described above, where the analog-to-digital unit 18-622(0) may be configured to apply a gain of 1.0, the analog-to-digital unit 18-622(1) may be configured to apply a gain of 2.0, and the analog-to-digital unit 18-622(n) may be configured to apply a gain of 4.0, the digital pixel data 18-625(0) may provide the least exposed corresponding digital image. Conversely, the digital pixel data 18-625(n) may provide the most exposed digital image. In another embodiment, the digital pixel data 18-625(0) may be utilized for generating an EV−1 digital image, the digital pixel data 18-625(1) may be utilized for generating an EV0 digital image, and the digital pixel data 18-625(n) may be utilized for generating an EV+2 image. In another embodiment, system 18-900 is configured to generate currents $i1$, $i2$, and $i3$ in a ratio of 2:1:4, and each analog-to-digital unit 18-622 may be configured to apply a gain of 1.0, which results in corresponding digital images having exposure values of EV−1, EV0, and EV+1 respectively. In such an embodiment, further differences in exposure value may be achieved by applying non-unit gain within one or more analog-to-digital unit 18-622.

While the system 18-900 is illustrated to include three analog-to-digital units 18-622, it is contemplated that multiple digital images may be generated by similar systems with more or less than three analog-to-digital units 18-622.

For example, a system with two analog-to-digital units 18-622 may be implemented for simultaneously generating two exposures of a photographic scene with zero interframe time in a manner similar to that described above with respect to system 18-900. In one embodiment, the two analog-to-digital units 18-622 may be configured to generate two exposures each, for a total of four different exposures relative to one frame of analog pixel data.

FIG. 18-8 illustrates a message sequence 18-1200 for generating a combined image utilizing a network, according to one embodiment. As an option, the message sequence 18-1200 may be implemented in the context of the details of any of the Figures disclosed herein. Of course, however, the message sequence 18-1200 may be carried out in any desired environment. Further, the aforementioned definitions may equally apply to the description below.

As shown in FIG. 18-8, a wireless mobile device 18-376 (0) generates at least two digital images. In one embodiment, the at least two digital images may be generated by amplifying an analog signal with at least two gains, where each generated digital image corresponds to digital output of an applied gain. As described previously, at least two different gains may be applied by one or more amplifiers to an analog signal containing analog pixel data in order to generate gain-adjusted analog pixel data. Further, the gain-adjusted analog pixel data may then be converted to the at least two digital images utilizing at least one analog-to-digital converter, where each of the digital images provides a different exposure of a same photographic scene. For example, in one embodiment, the at least two digital images may include an EV−1 exposure of the photographic scene and an EV+1 exposure of the photographic scene. In another embodiment, the at least two digital images may include an EV−2 exposure of the photographic scene, an EV0 exposure of the photographic scene, and an EV+2 exposure of the photographic scene.

Referring again to FIG. 18-8, the at least two digital images are transmitted from the wireless mobile device 18-376(0) to a data center 18-480 by way of a data network 18-474. The at least two digital images may be transmitted by the wireless mobile device 18-376(0) to the data center 18-480 using any technically feasible network communication method.

Further, in one embodiment, the data center 18-480 may then process the at least two digital images to generate a first computed image. The processing of the at least two digital images may include any processing of the at least two digital images that blends or merges at least a portion of each of the at least two digital images to generate the first computed image. To this end, the first digital image and the second digital image may be combined remotely from the wireless mobile device 18-376(0). For example, the processing of the at least two digital images may include an any type of blending operation, including but not limited to, an HDR image combining operation. In one embodiment, the processing of the at least two digital images may include any computations that produce a first computed image having a greater dynamic range than any one of the digital images received at the data center 18-480. Accordingly, in one embodiment, the first computed image generated by the data center 18-480 may be an HDR image. In other embodiments, the first computed image generated by the data center 18-480 may be at least a portion of an HDR image.

After generating the first computed image, the data center 18-480 may then transmit the first computed image to the wireless mobile device 18-376(0). In one embodiment, the transmission of the at least two digital images from the wireless mobile device 18-376(0), and the receipt of the first computed image at the wireless device 18-376(0), may occur without any intervention or instruction being received from a user of the wireless mobile device 18-376(0). For example, in one embodiment, the wireless mobile device 18-376(0) may transmit the at least two digital images to the data center 18-480 immediately after capturing a photographic scene and generating the at least two digital images utilizing an analog signal representative of the photographic scene. The photographic scene may be captured based on a user input or selection of an electronic shutter control, or pressing of a manual shutter button, on the wireless mobile device 18-376(0). Further, in response to receiving the at least two digital images, the data center 18-480 may generate an HDR image based on the at least two digital images, and transmit the HDR image to the wireless mobile device 18-376(0). The wireless mobile device 18-376(0) may then display the received HDR image. Accordingly, a user of the wireless mobile device 18-376(0) may view on the display of the wireless mobile device 18-376(0) an HDR image computed by the data center 18-480. Thus, even though the wireless mobile device 18-376(0) does not perform any HDR image processing, the user may view on the wireless mobile device 18-376(0) the newly computed HDR image substantially instantaneously after capturing the photographic scene and generating the at least two digital images on which the HDR image is based.

As shown in FIG. 18-8, the wireless mobile device 18-376(0) requests adjustment in processing of the at least two digital images. In one embodiment, upon receiving the first computed image from the data center 18-480, the wireless mobile device 18-376(0) may display the first computed image in a UI system, such as the UI system 1500 of FIG. 15. In such an embodiment, the user may control a slider control, such as the slider control 1530, to adjust the processing of the at least two digital images transmitted to the data center 18-480. For example, user manipulation of a slider control may result in commands being transmitted to the data center 18-480. In one embodiment, the commands transmitted to the data center 18-480 may include mix weights for use in adjusting the processing of the at least two digital images. In other embodiments, the request to adjust processing of the at least two digital images includes any instructions from the wireless mobile device 18-376(0) that the data center 18-480 may use to again process the at least two digital images and generate a second computed image.

As shown in FIG. 18-8, upon receiving the request to adjust processing, the data center 18-480 re-processes the at least two digital images to generate a second computed image. In one embodiment, the data center 18-480 may re-process the at least two digital images using parameters received from the wireless mobile device 18-376(0). In such an embodiment, the parameters may be provided as input with the at least two digital images to an HDR processing algorithm that executes at the data center 18-480. After generating the second computed image, the second computed image may be then transmitted from the data center 18-480 to the wireless mobile device 18-376(0) for display to the user.

Referring again to FIG. 18-8, the wireless mobile device 18-376(0) shares the second computed image with another wireless mobile device 18-376(1). In one embodiment, the wireless mobile device 18-376(0) may share any computed image received from the data center 18-480 with the other wireless mobile device 18-376(1). For example, the wireless mobile device 18-376(0) may share the first computed image received from the data center 18-480. As shown in FIG.

18-8, the data center 18-480 communicates with the wireless mobile device 18-376(0) and the wireless mobile device 18-376(1) over the same data network 18-474. Of course, in other embodiments the wireless mobile device 18-376(0) may communicate with the data center 18-480 via a network different than a network utilized by the data center 18-480 and the wireless mobile device 18-376(1) for communication.

In another embodiment, the wireless mobile device 18-376(0) may share a computed image with the other wireless mobile device 18-376(1) by transmitting a sharing request to data center 18-480. For example, the wireless mobile device 18-376(0) may request that the data center 18-480 forward the second computed to the other wireless mobile device 18-376(1). In response to receiving the sharing request, the data center 18-480 may then transmit the second computed image to the wireless mobile device 18-376(1). In an embodiment, transmitting the second computed image to the other wireless mobile device 18-376(1) may include sending a URL at which the other wireless mobile device 18-376(1) may access the second computed image.

Still further, as shown in FIG. 18-8, after receiving the second computed image, the other wireless mobile device 18-376(1) may send to the data center 18-480 a request to adjust processing of the at least two digital images. For example, the other wireless mobile device 18-376(1) may display the second computed image in a UI system, such as the UI system 1500 of FIG. 15. A user of the other wireless mobile device 18-376(1) may manipulate UI controls to adjust the processing of the at least two digital images transmitted to the data center 18-480 by the wireless mobile device 18-376(0). For example, user manipulation of a slider control at the other wireless mobile device 18-376(1) may result in commands being generated and transmitted to data center 18-480 for processing. In an embodiment, the request to adjust the processing of the at least two digital images sent from the other wireless mobile device 18-376(1) includes the commands generated based on the user manipulation of the slider control at the other wireless mobile device 18-376 (1). In other embodiments, the request to adjust processing of the at least two digital images includes any instructions from the wireless mobile device 18-376(1) that the data center 18-480 may use to again process the at least two digital images and generate a third computed image.

As shown in FIG. 18-8, upon receiving the request to adjust processing, the data center 18-480 re-processes the at least two digital images to generate a third computed image. In one embodiment, the data center 18-480 may re-process the at least two digital images using mix weights received from the wireless mobile device 18-376(1). In such an embodiment, the mix weights received from the wireless mobile device 18-376(1) may be provided as input with the at least two digital images to an HDR processing algorithm that executes at the data center 18-480. After generating the third computed image, the third computed image is then transmitted from the data center 18-480 to the wireless mobile device 18-376(1) for display. Still further, after receiving the third computed image, the wireless mobile device 18-376(1) may send to the data center 18-480 a request to store the third computed image. In another embodiment, other wireless mobile devices 18-376 in communication with the data center 18-480 may request storage of a computed image. For example, in the context of FIG. 18-8, the wireless mobile device 18-376(0) may at any time request storage of the first computed image or the second computed image.

In response to receiving a request to store a computed image, the data center 18-480 may store the computed image for later retrieval. For example, the stored computed image may be stored such that the computed image may be later retrieved without re-applying the processing that was applied to generate the computed image. In one embodiment, the data center 18-480 may store computed images within a storage system 18-486 local to the data center 18-480. In other embodiments, the data center 18-480 may store computed images within hardware devices not local to the data center 18-480, such as a data center 18-481. In such embodiments, the data center 18-480 may transmit the computed images over the data network 18-474 for storage.

Still further, in some embodiments, a computed image may be stored with a reference to the at least two digital images utilized to generate the computed image. For example, the computed image may be associated with the at least two digital images utilized to generate the computed image, such as through a URL served by data center 18-480 or 18-481. By linking the stored computed image to the at least two digital images, any user or device with access to the computed image may also be given the opportunity to subsequently adjust the processing applied to the at least two digital images, and thereby generate a new computed image.

To this end, users of wireless mobile devices 18-376 may leverage processing capabilities of a data center 18-480 accessible via a data network 18-474 to generate an HDR image utilizing digital images that other wireless mobile devices 18-376 have captured and subsequently provided access to. For example, digital signals comprising digital images may be transferred over a network for being combined remotely, and the combined digital signals may result in at least a portion of a HDR image. Still further, a user may be able to adjust a blending of two or more digital images to generate a new HDR photograph without relying on their wireless mobile device 18-376 to perform the processing or computation necessary to generate the new HDR photograph. Subsequently, the user's device may receive at least a portion of a HDR image resulting from a combination of two or more digital signals. Accordingly, the user's wireless mobile device 18-376 may conserve power by offloading HDR processing to a data center. Further, the user may be able to effectively capture HDR photographs despite not having a wireless mobile device 18-376 capable of performing high-power processing tasks associated with HDR image generation. Finally, the user may be able to obtain an HDR photograph generated using an algorithm determined to be best for a photographic scene without having to select the HDR algorithm himself or herself and without having installed software that implements such an HDR algorithm on their wireless mobile device 18-376. For example, the user may rely on the data center 18-480 to identify and to select a best HDR algorithm for a particular photographic scene.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1, 19:
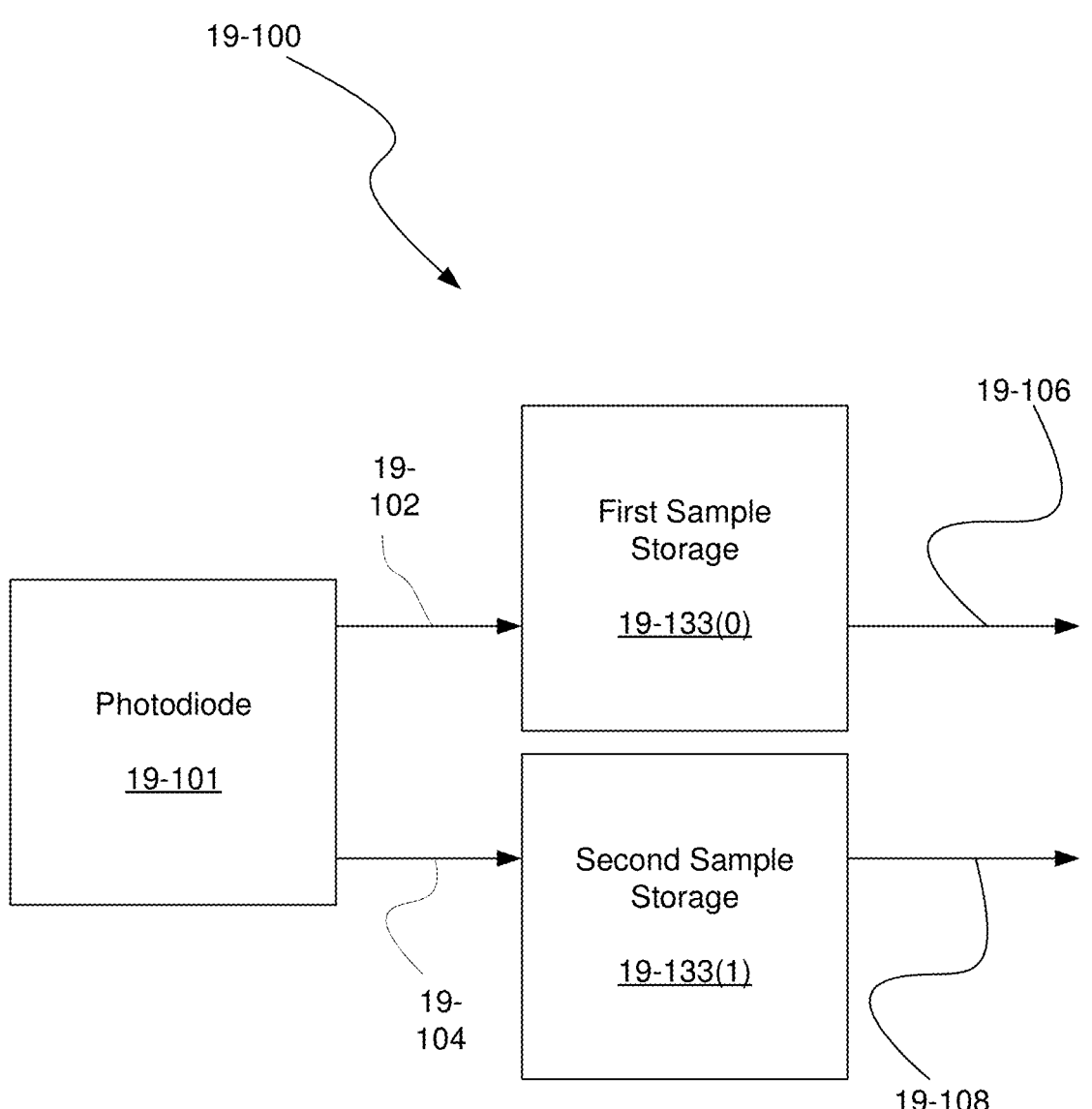

FIG. 19-1 illustrates a system 19-100 for simultaneously capturing multiple images, in accordance with one possible embodiment. As an option, the system 19-100 may be implemented in the context of any of the Figures disclosed herein. Of course, however, the system 19-100 may be implemented in any desired environment. Further, the afore-mentioned definitions may equally apply to the description below.

As shown in FIG. 19-1, the system 19-100 includes a first input 19-102 that is provided to a first sample storage node 19-133(0) based on a photodiode 19-101, and a second input 19-104 provided simultaneously, at least in part, to a second sample storage node 19-133(1) based on the photodiode 19-101. Accordingly, based on the input 19-102 to the first sample storage node 19-133(0) and the input 19-104 to the second sample storage node 19-133(1), a first sample is stored to the first sample storage node 19-133(0) simultaneously, at least in part, with storage of a second sample to the second sample storage node 19-133(1). In one embodiment, simultaneous storage of the first sample during a first time duration and storing the second sample during a second time duration includes storing the first sample and the second sample at least partially contemporaneously. In one embodiment, an entirety of the first sample may be stored simultaneously with storage of at least a portion of the second sample. For example, storage of the second sample may occur during an entirety of the storing of the first sample; however, because storage of the second sample may occur over a greater period of time than storage of the first sample, storage of the first sample may occur during only a portion of the storing of the second sample. In an embodi-ment, storage of the first sample and the second sample may be started at the same time.

While the following discussion describes an image sensor apparatus and method for simultaneously capturing multiple images using one or more photodiodes of an image sensor, any photo-sensing electrical element or photosensor may be used or implemented.

In one embodiment, the photodiode 19-101 may comprise any semiconductor diode that generates a potential differ-ence, current, or changes its electrical resistance, in response to photon absorption. Accordingly, the photodiode 19-101 may be used to detect or measure a light intensity. Further, the input 19-102 and the input 19-104 received at sample storage nodes 19-133(0) and 19-133(1), respectively, may be based on the light intensity detected or measured by the photodiode 19-101. In such an embodiment, the first sample stored at the first sample storage node 19-133(0) may be based on a first exposure time to light at the photodiode 19-101, and the second sample stored at the second sample storage node 19-133(1) may be based on a second exposure time to the light at the photodiode 19-101.

In one embodiment, the first input 19-102 may include an electrical signal from the photodiode 19-101 that is received at the first sample storage node 19-133(0), and the second input 19-104 may include an electrical signal from the photodiode 19-101 that is received at the second sample storage node 19-133(1). For example, the first input 19-102 may include a current that is received at the first sample storage node 19-133(0), and the second input 19-104 may include a current that is received at the second sample storage node 19-133(1). In another embodiment, the first input 19-102 and the second input 19-104 may be transmit-ted, at least partially, on a shared electrical interconnect. In other embodiments, the first input 19-102 and the second input 19-104 may be transmitted on different electrical interconnects. In some embodiments, the input 19-102 may be the same as the input 19-104. For example, the input 19-102 and the input 19-104 may each include the same current. In other embodiments, the input 19-102 may include a first current, and the input 19-104 may include a second current that is different than the first current. In yet other embodiments, the first input 19-102 may include any input from which the first sample storage node 19-133(0) may be operative to store a first sample, and the second input 19-104 may include any input from which the second sample storage node 19-133(1) may be operative to store a second sample.

In one embodiment, the first input 19-102 and the second input 19-104 may include an electronic representation of a portion of an optical image that has been focused on an image sensor that includes the photodiode 19-101. In such an embodiment, the optical image may be focused on the image sensor by a lens. The electronic representation of the optical image may comprise spatial color intensity informa-tion, which may include different color intensity samples (e.g. red, green, and blue light, etc.). In other embodiments, the spatial color intensity information may also include samples for white light. In one embodiment, the optical image may be an optical image of a photographic scene. In some embodiments, the photodiode 19-101 may be a single photodiode of an array of photodiodes of an image sensor. Such an image sensor may comprise a complementary metal oxide semiconductor (CMOS) image sensor, or charge-coupled device (CCD) image sensor, or any other techni-cally feasible form of image sensor. In other embodiments, photodiode 19-101 may include two or more photodiodes.

In one embodiment, each sample storage node 19-133 includes a charge storing device for storing a sample, and the stored sample may be a function of a light intensity detected at the photodiode 19-101. For example, each sample storage node 19-133 may include a capacitor for storing a charge as a sample. In such an embodiment, each capacitor stores a charge that corresponds to an accumulated exposure during an exposure time or sample time. For example, current received at each capacitor from an associated photodiode may cause the capacitor, which has been previously charged, to discharge at a rate that is proportional to an incident light intensity detected at the photodiode. The remaining charge of each capacitor may be subsequently output from the capacitor as a value. For example, the remaining charge of each capacitor may be output as an analog value that is a function of the remaining charge on the capacitor.

To this end, an analog value received from a capacitor may be a function of an accumulated intensity of light detected at an associated photodiode. In some embodiments, each sample storage node 19-133 may include circuitry operable for receiving input based on a photodiode. For example, such circuitry may include one or more transistors. The one or more transistors may be configured for rendering the sample storage node 19-133 responsive to various con-trol signals, such as sample, reset, and row select signals received from one or more controlling devices or compo-nents. In other embodiments, each sample storage node 19-133 may include any device for storing any sample or value that is a function of a light intensity detected at the photodiode 19-101.

Further, as shown in FIG. 19-1, the first sample storage node 19-133(0) outputs first value 19-106, and the second sample storage node 19-133(1) outputs second value 19-108. In one embodiment, the first sample storage node 19-133(0) outputs the first value 19-106 based on the first sample stored at the first sample storage node 19-133(0), and the second sample storage node 19-133(1) outputs the second value 19-108 based on the second sample stored at the second sample storage node 19-133(1).

In some embodiments, the first sample storage node 19-133(0) outputs the first value 19-106 based on a charge stored at the first sample storage node 19-133(0), and the second sample storage node 19-133(1) outputs the second value 19-108 based on a second charge stored at the second sample storage node 19-133(1). The first value 19-106 may be output serially with the second value 19-108, such that one value is output prior to the other value; or the first value 19-106 may be output in parallel with the output of the second value 19-108. In various embodiments, the first value 19-106 may include a first analog value, and the second value 19-108 may include a second analog value. Each of these values may include a current, which may be output for inclusion in an analog signal that includes at least one analog value associated with each photodiode of a photodiode array. In such embodiments, the first analog value 19-106 may be included in a first analog signal, and the second analog value 19-108 may be included in a second analog signal that is different than the first analog signal. In other words, a first analog signal may be generated to include an analog value associated with each photodiode of a photodiode array, and a second analog signal may also be generated to include a different analog value associated with each of the photo-diodes of the photodiode array. An analog signal may be a set of spatially discrete intensity samples, each represented by continuous analog values.

To this end, a single photodiode array may be utilized to generate a plurality of analog signals. The plurality of analog signal may be generated concurrently or in parallel. Further, the plurality of analog signals may each be amplified utilizing two or more gains, and each amplified analog signal may be converted to one or more digital signals such that two or more digital signals may be generated in total, where each digital signal may include a digital image. Accordingly, due to the partially contemporaneous storage of the first sample and the second sample, a single photodiode array may be utilized to concurrently generate multiple digital signals or digital images, where each digital signal is associated with a different exposure time or sample time of the same photographic scene. In such an embodiment, multiple digital signals having different exposure characteristics may be simultaneously generated for a single photographic scene. Such a collection of digital signals or digital images may be referred to as an image stack.

In certain embodiments, an analog signal comprises a plurality of distinct analog signals, and a signal amplifier comprises a corresponding set of distinct signal amplifier circuits. For example, each pixel within a row of pixels of an image sensor may have an associated distinct analog signal within an analog signal, and each distinct analog signal may have a corresponding distinct signal amplifier circuit. Further, two or more amplified analog signals may each include gain-adjusted analog pixel data representative of a common analog value from at least one pixel of an image sensor. For example, for a given pixel of an image sensor, a given analog value may be output in an analog signal, and then, after signal amplification operations, the given analog value is represented by a first amplified value in a first amplified analog signal, and by a second amplified value in a second amplified analog signal. Analog pixel data may be analog signal values associated with one or more given pixels.

FIG. 19-2 illustrates a method 19-200 for simultaneously capturing multiple images, in accordance with one embodiment. As an option, the method 19-200 may be carried out in the context of any of the Figures disclosed herein. Of course, however, the method 19-200 may be carried out in any desired environment. Further, the aforementioned definitions may equally apply to the description below.

As shown in operation 19-202, a first sample is stored based on an electrical signal from a photodiode of an image sensor. Further, simultaneous, at least in part, with the storage of the first sample, a second sample is stored based on the electrical signal from the photodiode of the image sensor at operation 19-204. As noted above, the photodiode of the image sensor may comprise any semiconductor diode that generates a potential difference, or changes its electrical resistance, in response to photon absorption. Accordingly, the photodiode may be used to detect or measure light intensity, and the electrical signal from the photodiode may include a photodiode current.

In some embodiments, each sample may include an electronic representation of a portion of an optical image that has been focused on an image sensor that includes the photodiode. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. The photodiode may be a single photo-todiode of an array of photodiodes of the image sensor. Such an image sensor may comprise a complementary metal oxide semiconductor (CMOS) image sensor, or charge-coupled device (CCD) image sensor, or any other technically feasible form of image sensor In the context of one embodiment, each of the samples may be stored by storing energy. For example, each of the samples may include a charged stored on a capacitor. In such an embodiment, the first sample may include a first charge stored at a first capacitor, and the second sample may include a second charge stored at a second capacitor. In one embodiment, the first sample may be different than the second sample. For example, the first sample may include a first charge stored at a first capacitor, and the second sample may include a second charge stored at a second capacitor that is different than the first charge. In one embodiment, the first sample may be different than the second sample due to different sample times. For example, the first sample may be stored by charging or discharging a first capacitor for a first period of time, and the second sample may be stored by charging or discharging a second capacitor for a second period of time, where the first capacitor and the second capacitor may be substantially identical and charged or discharged at a substantially identical rate. Further, the second capacitor may be charged or discharged simultaneously, at least in part, with the charging or discharging of the first capacitor.

In another embodiment, the first sample may be different than the second sample due to, at least partially, different storage characteristics. For example, the first sample may be stored by charging or discharging a first capacitor for a period of time, and the second sample may be stored by charging or discharging a second capacitor for the same period of time, where the first capacitor and the second capacitor may have different storage characteristics and/or be charged or discharged at different rates. More specifically, the first capacitor may have a different capacitance than the second capacitor. Of course, the second capacitor may be charged or discharged simultaneously, at least in part, with the charging or discharging of the first capacitor.

Additionally, as shown at operation 19-206, after storage of the first sample and the second sample, a first value is output based on the first sample, and a second value is output based on the second sample, for generating at least one image. In the context of one embodiment, the first value and the second value are transmitted or output in sequence. For example, the first value may be transmitted prior to the second value. In another embodiment, the first value and the second value may be transmitted in parallel.

In one embodiment, each output value may comprise an analog value. For example, each output value may include a current representative of the associated stored sample. More specifically, the first value may include a current value representative of the stored first sample, and the second value may include a current value representative of the stored second sample. In one embodiment, the first value is output for inclusion in a first analog signal, and the second value is output for inclusion in a second analog signal different than the first analog signal. Further, each value may be output in a manner such that it is combined with other values output based on other stored samples, where the other stored samples are stored responsive to other electrical signals received from other photodiodes of an image sensor. For example, the first value may be combined in a first analog signal with values output based on other samples, where the other samples were stored based on electrical signals received from photodiodes that neighbor the photodiode from which the electrical signal utilized for storing the first sample was received. Similarly, the second value may be combined in a second analog signal with values output based on other samples, where the other samples were stored based on electrical signals received from the same photodiodes that neighbor the photodiode from which the electrical signal utilized for storing the second sample was received.

Finally, at operation 19-208, at least one of the first value and the second value are amplified utilizing two or more gains. In one embodiment, where each output value comprises an analog value, amplifying at least one of the first value and the second value may result in at least two amplified analog values. In another embodiment, where the first value is output for inclusion in a first analog signal, and the second value is output for inclusion in a second analog signal different than the first analog signal, one of the first analog signal or the second analog signal may be amplified utilizing the two or more gains. For example, a first analog signal that includes the first value may be amplified with a first gain and a second gain, such that the first value is amplified with the first gain and the second gain. Of course, more than two analog signals may be amplified using two or more gains. In one embodiment, each amplified analog signal may be converted to a digital signal comprising a digital image.

To this end, an array of photodiodes may be utilized to generate a first analog signal based on a first set of samples captured at a first exposure time or sample time, and a second analog signal based on a second set of samples captured at a second exposure time or sample time, where the first set of samples and the second set of samples may be two different sets of samples of the same photographic scene. Further, each analog signal may include an analog value generated based on each photodiode of each pixel of an image sensor. Each analog value may be representative of a light intensity measured at the photodiode associated with the analog value. Accordingly, an analog signal may be a set of spatially discrete intensity samples, each represented by continuous analog values, and analog pixel data may be analog signal values associated with one or more given pixels. Still further, each analog signal may undergo subsequent processing, such as amplification, which may facilitate conversion of the analog signal into one or more digital signals, each including digital pixel data, which may each comprise a digital image.

The embodiments disclosed herein may advantageously enable a camera module to sample images comprising an image stack with lower (e.g. at or near zero, etc.) inter-sample time (e.g. interframe, etc.) than conventional techniques. In certain embodiments, images comprising the image stack are effectively sampled or captured simultaneously, which may reduce inter-sample time to zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figures 3, 19:
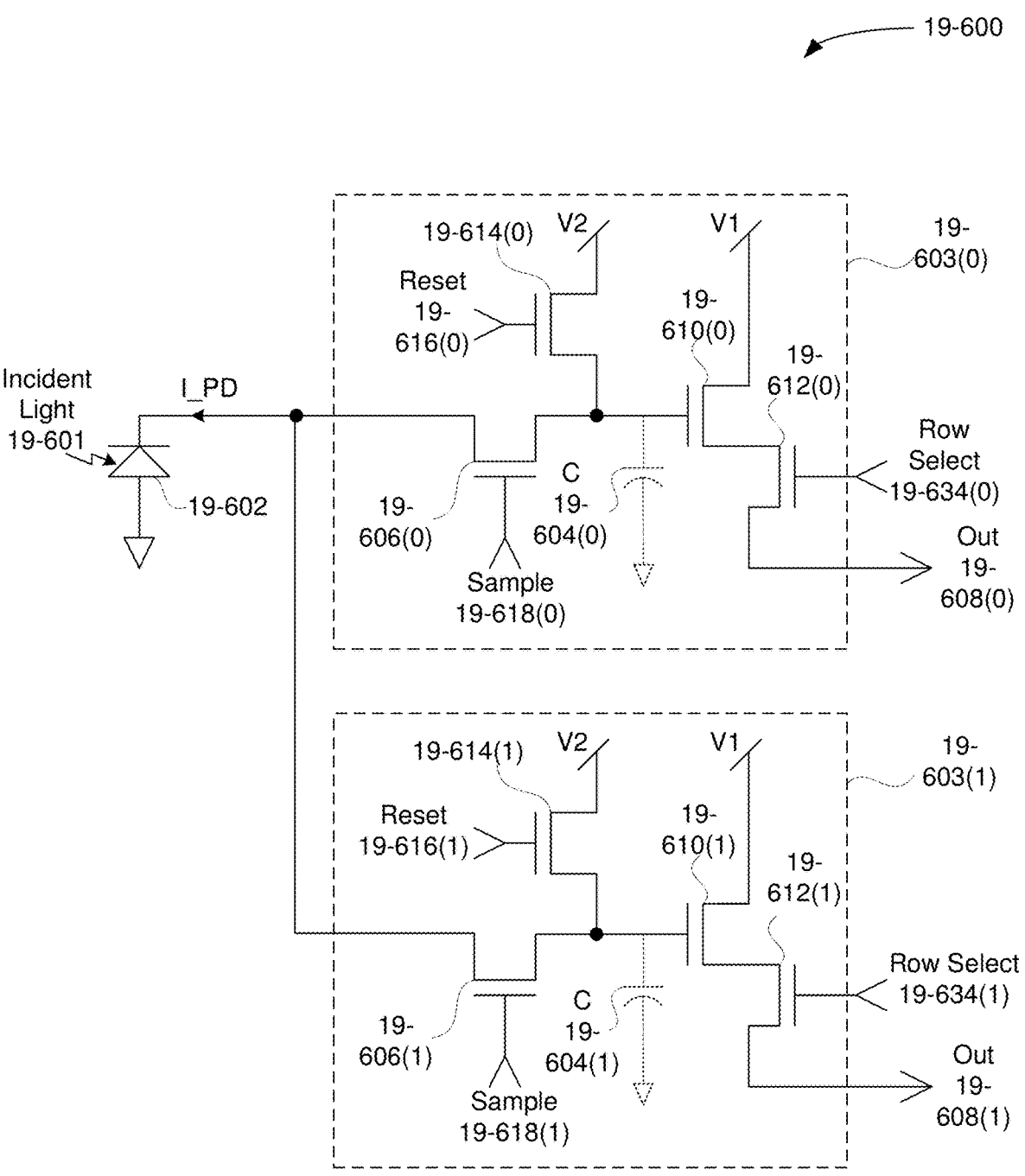
Figures 4, 19:
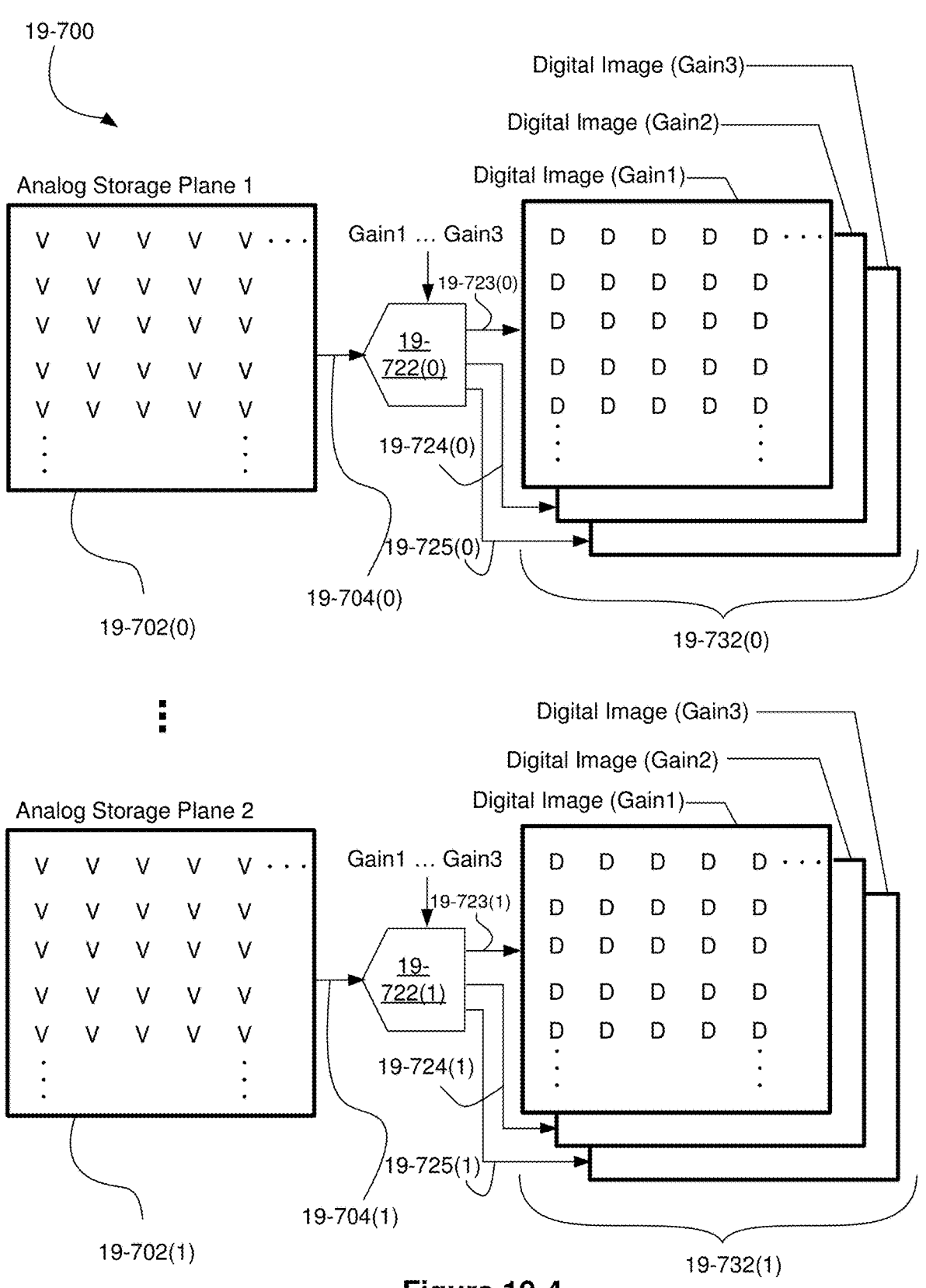

FIG. 19-3 illustrates a circuit diagram for a photosensitive cell 19-600, in accordance with one possible embodiment. As an option, the cell 19-600 may be implemented in the context of any of the Figures disclosed herein. Of course, however, the system 19-600 may be implemented in any desired environment. Further, the aforementioned definitions may equally apply to the description below.

As shown in FIG. 19-3, a photosensitive cell 19-600 includes a photodiode 19-602 coupled to a first analog sampling circuit 19-603(0) and a second analog sampling circuit 19-603(1). The photodiode 19-602 may be implemented as the photodiode 19-101 described within the context of FIG. 19-1, or any of the photodiodes 18-562 of FIG. 18-3E. Further, an analog sampling circuit 19-603 may be implemented as a sample storage node 19-133 described within the context of FIG. 19-1. In one embodiment, a unique instance of photosensitive cell 19-600 may be implemented as each of cells 18-542-18-545 comprising a pixel 18-540 within the context of FIGS. 18-3A-18-3E.

As shown, the photosensitive cell 19-600 comprises two analog sampling circuits 19-603, and a photodiode 19-602. The two analog sampling circuits 19-603 include a first analog sampling circuit 19-603(0) which is coupled to a second analog sampling circuit 19-603(1). As shown in FIG. 19-3, the first analog sampling circuit 19-603(0) comprises transistors 19-606(0), 19-610(0), 19-612(0), 19-614(0), and a capacitor 19-604(0); and the second analog sampling circuit 19-603(1) comprises transistors 19-606(1), 19-610(1), 19-612(1), 19-614(1), and a capacitor 19-604(1). In one embodiment, each of the transistors 19-606, 19-610, 19-612, and 19-614 may be a field-effect transistor.

The photodiode 19-602 may be operable to measure or detect incident light 19-601 of a photographic scene. In one embodiment, the incident light 19-601 may include ambient light of the photographic scene. In another embodiment, the incident light 19-601 may include light from a strobe unit utilized to illuminate the photographic scene. Of course, the incident light 19-601 may include any light received at and measured by the photodiode 19-602. Further still, and as discussed above, the incident light 19-601 may be concentrated on the photodiode 19-602 by a microlens, and the photodiode 19-602 may be one photodiode of a photodiode array that is configured to include a plurality of photodiodes arranged on a two-dimensional plane.

In one embodiment, the analog sampling circuits 19-603 may be substantially identical. For example, the first analog sampling circuit 19-603(0) and the second analog sampling circuit 19-603(1) may each include corresponding transistors, capacitors, and interconnects configured in a substantially identical manner. Of course, in other embodiments, the first analog sampling circuit 19-603(0) and the second analog sampling circuit 19-603(1) may include circuitry, transistors, capacitors, interconnects and/or any other components or component parameters (e.g. capacitance value of each capacitor 19-604) which may be specific to just one of the analog sampling circuits 19-603.

In one embodiment, each capacitor 19-604 may include one node of a capacitor comprising gate capacitance for a transistor 19-610 and diffusion capacitance for transistors 19-606 and 19-614. The capacitor 19-604 may also be coupled to additional circuit elements (not shown) such as, without limitation, a distinct capacitive structure, such as a metal-oxide stack, a poly capacitor, a trench capacitor, or any other technically feasible capacitor structures.

With respect to analog sampling circuit 19-603(0), when reset 19-616(0) is active (low), transistor 19-614(0) provides a path from voltage source V2 to capacitor 19-604(0), causing capacitor 19-604(0) to charge to the potential of V2. When sample signal 19-618(0) is active, transistor 19-606(0) provides a path for capacitor 19-604(0) to discharge in proportion to a photodiode current (I_PD) generated by the photodiode 19-602 in response to the incident light 19-601. In this way, photodiode current I_PD is integrated for a first exposure time when the sample signal 19-618(0) is active, resulting in a corresponding first voltage on the capacitor 19-604(0). This first voltage on the capacitor 19-604(0) may also be referred to as a first sample. When row select 19-634(0) is active, transistor 19-612(0) provides a path for a first output current from V1 to output 19-608(0). The first output current is generated by transistor 19-610(0) in response to the first voltage on the capacitor 19-604(0). When the row select 19-634(0) is active, the output current at the output 19-608(0) may therefore be proportional to the integrated intensity of the incident light 19-601 during the first exposure time. In one embodiment, sample signal 19-618(0) is asserted substantially simultaneously over substantially all photo sensitive cells 19-600 comprising an image sensor to implement a global shutter for all first samples within the image sensor.

With respect to analog sampling circuit 19-603(1), when reset 19-616(1) is active (low), transistor 19-614(1) provides a path from voltage source V2 to capacitor 19-604(1), causing capacitor 19-604(1) to charge to the potential of V2. When sample signal 19-618(1) is active, transistor 19-606(1) provides a path for capacitor 19-604(1) to discharge in proportion to a photodiode current (I_PD) generated by the photodiode 19-602 in response to the incident light 19-601. In this way, photodiode current I_PD is integrated for a second exposure time when the sample signal 19-618(1) is active, resulting in a corresponding second voltage on the capacitor 19-604(1). This second voltage on the capacitor 19-604(1) may also be referred to as a second sample. When row select 19-634(1) is active, transistor 19-612(1) provides a path for a second output current from V1 to output 19-608(1). The second output current is generated by transistor 19-610(1) in response to the second voltage on the capacitor 19-604(1). When the row select 19-634(1) is active, the output current at the output 19-608(1) may therefore be proportional to the integrated intensity of the incident light 19-601 during the second exposure time. In one embodiment, sample signal 19-618(1) is asserted substantially simultaneously over substantially all photo sensitive cells 19-600 comprising an image sensor to implement a global shutter for all second samples within the image sensor.

To this end, by controlling the first exposure time and the second exposure time such that the first exposure time is different than the second exposure time, the capacitor 19-604(0) may store a first voltage or sample, and the capacitor 19-604(1) may store a second voltage or sample different than the first voltage or sample, in response to a same photodiode current I_PD being generated by the photodiode 19-602. In one embodiment, the first exposure time and the second exposure time begin at the same time, overlap in time, and end at different times. Accordingly, each of the analog sampling circuits 19-603 may be operable to store an analog value corresponding to a different exposure. As a benefit of having two different exposure times, in situations where a photodiode 19-602 is exposed to a sufficient threshold of incident light 19-601, a first capacitor 19-604(0) may provide a blown out, or over-exposed image portion, and a second capacitor 19-604(1) of the same cell 19-600 may provide an analog value suitable for generating a digital image. Thus, for each cell 19-600, a first capacitor 19-604 may more effectively capture darker image content than another capacitor 19-604 of the same cell 19-600.

In other embodiments, it may be desirable to use more than two analog sampling circuits for the purpose of storing more than two voltages or samples. For example, an embodiment with three or more analog sampling circuits could be implemented such that each analog sampling circuit concurrently samples for a different exposure time the same photodiode current I_PD being generated by a photodiode. In such an embodiment, three or more voltages or samples could be obtained. To this end, a current I_PD generated by the photodiode 19-602 may be split over a number of analog sampling circuits 19-603 coupled to the photodiode 19-602 at any given time. Consequently, exposure sensitivity may vary as a function of the number of analog sampling circuits 19-603 that are coupled to the photodiode 19-602 at any given time, and the amount of capacitance that is associated with each analog sampling circuit 19-603. Such variation may need to be accounted for in determining an exposure time or sample time for each analog sampling circuit 19-603.

In various embodiments, capacitor 19-604(0) may be substantially identical to capacitor 19-604(1). For example, the capacitors 19-604(0) and 19-604(1) may have substantially identical capacitance values. In such embodiments, the photodiode current I_PD may be split evenly between the capacitors 19-604(0) and 19-604(1) during a first portion of time where the capacitors are discharged at a substantially identical rage. The photodiode current may be subsequently directed to one selected capacitor of the capacitors 19-604(0) and 19-604(1) during a second portion of time in which the selected capacitor discharges at twice the rate associated with the first portion of time. In one embodiment, to obtain different voltages or samples between the capacitors 19-604(0) and 19-604(1), a sample signal 19-618 of one of the analog sampling circuits may be activated for a longer or shorter period of time than a sample signal 19-618 is activated for any other analog sampling circuits 19-603 receiving at least a portion of photodiode current I_PD.

In an embodiment, an activation of a sample signal 19-618 of one analog sampling circuit 19-603 may be configured to be controlled based on an activation of another sample signal 19-618 of another analog sampling circuit 19-603 in the same cell 19-600. For example, the sample signal 19-618(0) of the first analog sampling circuit 19-603 (0) may be activated for a period of time that is controlled to be at a ratio of 2:1 with respect to an activation period for the sample signal 19-618(1) of the second analog sampling circuit 19-603(1). By way of a more specific example, a controlled ratio of 2:1 may result in the sample signal 19-618(0) being activated for a period of 1/30 of a second when the sample signal 19-618(1) has been selected to be activated for a period of 1/60 of a second. Of course activation or exposure times for each sample signal 19-618 may be controlled to be for other periods of time, such as for 1 second, 1/120 of a second, 1/1000 of a second, etc., or for other ratios, such as 0.5:1, 1.2:1, 1.5:1, 3:1, etc. In one embodiment, a period of activation of at least one of the sample signals 19-618 may be controlled by software executing on a digital photographic system, such as digital photographic system 300, or by a user, such as a user interacting with a "manual mode" of a digital camera. For example, a period of activation of at least one of the sample signals 19-618 may be controlled based on a user selection of a shutter speed. To achieve a 2:1 exposure, a 3:1 exposure time may be needed due to current splitting during a portion of the overall exposure process.

In other embodiments, the capacitors 19-604(0) and 19-604(1) may have different capacitance values. In one embodiment, the capacitors 19-604(0) and 19-604(1) may have different capacitance values for the purpose of rendering one of the analog sampling circuits 19-603 more or less sensitive to the current I_PD from the photodiode 19-602 than other analog sampling circuits 19-603 of the same cell 19-600. For example, a capacitor 19-604 with a significantly larger capacitance than other capacitors 19-604 of the same cell 19-600 may be less likely to fully discharge when capturing photographic scenes having significant amounts of incident light 19-601. In such embodiments, any difference in stored voltages or samples between the capacitors 19-604 (0) and 19-604(1) may be a function of the different capacitance values in conjunction with different activation times of the sample signals 19-618.

In an embodiment, sample signal 19-618(0) and sample signal 19-618(1) may be asserted to an active state independently. In another embodiment, the sample signal 19-618(0) and the sample signal 19-618(1) are asserted to an active state simultaneously, and one is deactivated at an earlier time than the other, to generate images that are sampled substantially simultaneously for a portion of time, but with each having a different effective exposure time or sample time. Whenever both the sample signal 19-618(0) and the sample signal 19-618(1) are asserted simultaneously, photodiode current I_PD may be divided between discharging capacitor 19-604(0) and discharging capacitor 19-604(1).

In one embodiment, the photosensitive cell 19-600 may be configured such that the first analog sampling circuit 19-603(0) and the second analog sampling circuit 19-603(1) share at least one shared component. In various embodiments, the at least one shared component may include a photodiode 19-602 of an image sensor. In other embodiments, the at least one shared component may include a reset, such that the first analog sampling circuit 19-603(0) and the second analog sampling circuit 19-603(1) may be reset concurrently utilizing the shared reset. In the context of FIG. 19-3, the photosensitive cell 19-600 may include a shared reset between the analog sampling circuits 19-603(0) and 19-603(1). For example, reset 19-616(0) may be coupled to reset 19-616(1), and both may be asserted together such that the reset 19-616(0) is the same signal as the reset 19-616(1), which may be used to simultaneously reset both of the first analog sampling circuit 19-603(0) and the second analog sampling circuit 19-603(1). After reset, the first analog sampling circuit 19-603(0) and the second analog sampling circuit 19-603(1) may be asserted to sample together.

In another embodiment, a sample signal 19-618(0) for the first analog sampling circuit 19-603(0) may be independent of a sample signal 19-618(1) for the second analog sampling circuit 19-603(1). In one embodiment, a row select 19-634 (0) for the first analog sampling circuit 19-603(0) may be independent of a row select 19-634(1) for the second analog sampling circuit 19-603(1). In other embodiments, the row select 19-634(0) for the first analog sampling circuit 19-603 (0) may include a row select signal that is shared with the row select 19-634(1) for the second analog sampling circuit 19-603(1). In yet another embodiment, output signal at output 19-608(0) of the first analog sampling circuit 19-603 (0) may be independent of output signal at output 19-608(1) of the second analog sampling circuit 19-603(1). In another embodiment, the output signal of the first analog sampling circuit 19-603(0) may utilize an output shared with the output signal of the second analog sampling circuit 19-603 (1). In embodiments sharing an output, it may be necessary for the row select 19-634(0) of the first analog sampling circuit 19-603(0) to be independent of the row select 19-634 (1) of the second analog sampling circuit 19-603(1). In embodiments sharing a row select signal, it may be necessary for a line of the output 19-608(0) of the first analog sampling circuit 19-603(0) to be independent of a line of the output 19-608(1) of the second analog sampling circuit 19-603(1).

In one embodiment, a column signal 18-532 of FIG. 18-3A may comprise one output signal of a plurality of independent output signals of the outputs 19-608(0) and 19-608(1). Further, a row control signal 18-530 of FIG. 18-3A may comprise one of independent row select signals of the row selects 19-634(0) and 19-634(1), which may be shared for a given row of pixels. In embodiments of cell 19-600 that implement a shared row select signal, the row select 19-634(0) may be coupled to the row select 19-634(1), and both may be asserted together simultaneously.

In an embodiment, a given row of pixels may include one or more rows of cells, where each row of cells includes multiple instances of the photosensitive cell 19-600, such that each row of cells includes multiple pairs of analog sampling circuits 19-603(0) and 19-603(1). For example, a given row of cells may include a plurality of first analog sampling circuits 19-603(0), and may further include a different second analog sampling circuit 19-603(1) paired to each of the first analog sampling circuits 19-603(0). In one embodiment, the plurality of first analog sampling circuits 19-603(0) may be driven independently from the plurality of second analog sampling circuits 19-603(1). In another embodiment, the plurality of first analog sampling circuits 19-603(0) may be driven in parallel with the plurality of second analog sampling circuits 19-603(1). For example, each output 19-608(0) of each of the first analog sampling circuits 19-603(0) of the given row of cells may be driven in parallel through one set of column signals 18-532. Further, each output 19-608(1) of each of the second analog sampling circuits 19-603(1) of the given row of cells may be driven in parallel through a second, parallel, set of column signals 18-532.

To this end, the photosensitive cell 19-600 may be utilized to simultaneously, at least in part, generate and store both of a first sample and a second sample based on the incident light 19-601. Specifically, the first sample may be captured and stored on a first capacitor during a first exposure time, and the second sample may be simultaneously, at least in part, captured and stored on a second capacitor during a second exposure time. Further, an output current signal corresponding to the first sample of the two different samples may be coupled to output 19-608(0) when row select 19-634(0) is activated, and an output current signal corresponding to the second sample of the two different samples may be coupled to output 19-608(1) when row select 19-634(1) is activated.

In one embodiment, the first value may be included in a first analog signal containing first analog pixel data for a plurality of pixels at the first exposure time, and the second value may be included in a second analog signal containing second analog pixel data for the plurality of pixels at the second exposure time. Further, the first analog signal may be utilized to generate a first stack of one or more digital images, and the second analog signal may be utilized to generate a second stack of one or more digital images. Any differences between the first stack of images and the second stack of images may be based on, at least in part, a difference between the first exposure time and the second exposure time. Accordingly, an array of photosensitive cells 19-600 may be utilized for simultaneously capturing multiple digital images.

In one embodiment, a unique instance of analog pixel data 19-621 may include, as an ordered set of individual analog values, all analog values output from all corresponding analog sampling circuits or sample storage nodes. For example, in the context of the foregoing figures, each cell of cells 18-542-18-545 of a plurality of pixels 18-540 of a pixel array 18-510 may include both a first analog sampling circuit 19-603(0) and a second analog sampling circuit 19-603(1). Thus, the pixel array 18-510 may include a plurality of first analog sampling circuits 19-603(0) and also include a plurality of second analog sampling circuits 19-603(1). In other words, the pixel array 18-510 may include a first analog sampling circuit 19-603(0) for each cell, and also include a second analog sampling circuit 19-603(1) for each cell. In an embodiment, a first instance of analog pixel data 19-621 may be received containing a discrete analog value from each analog sampling circuit of a plurality of first analog sampling circuits 19-603(0), and a second instance of analog pixel data 19-621 may be received containing a discrete analog value from each analog sampling circuit of a plurality of second analog sampling circuits 19-603(1). Thus, in embodiments where cells of a pixel array include two or more analog sampling circuits, the pixel array may output two or more discrete analog signals, where each analog signal includes a unique instance of analog pixel data 19-621.

In some embodiments, only a subset of the cells of a pixel array may include two or more analog sampling circuits. For example, not every cell may include both a first analog sampling circuit 19-603(0) and a second analog sampling circuit 19-603(1).

With continuing reference to FIG. 18-4, the analog-to-digital unit 18-622 includes an amplifier 18-650 and an analog-to-digital converter 18-654. In one embodiment, the amplifier 18-650 receives an instance of analog pixel data 18-621 and a gain 18-652, and applies the gain 18-652 to the analog pixel data 18-621 to generate gain-adjusted analog pixel data 18-623. The gain-adjusted analog pixel data 18-623 is transmitted from the amplifier 18-650 to the analog-to-digital converter 18-654. The analog-to-digital converter 18-654 receives the gain-adjusted analog pixel data 18-623, and converts the gain-adjusted analog pixel data 18-623 to the digital pixel data 18-625, which is then transmitted from the analog-to-digital converter 18-654. In other embodiments, the amplifier 18-650 may be implemented within the column read out circuit 18-520 instead of within the analog-to-digital unit 18-622. The analog-to-digital converter 18-654 may convert the gain-adjusted analog pixel data 18-623 to the digital pixel data 18-625 using any technically feasible analog-to-digital conversion technique.

In an embodiment, the gain-adjusted analog pixel data 18-623 results from the application of the gain 18-652 to the analog pixel data 18-621. In one embodiment, the gain 18-652 may be selected by the analog-to-digital unit 18-622. In another embodiment, the gain 18-652 may be selected by the control unit 18-514, and then supplied from the control unit 18-514 to the analog-to-digital unit 18-622 for application to the analog pixel data 18-621.

It should be noted, in one embodiment, that a consequence of applying the gain 18-652 to the analog pixel data 18-621 is that analog noise may appear in the gain-adjusted analog pixel data 18-623. If the amplifier 18-650 imparts a significantly large gain to the analog pixel data 18-621 in order to obtain highly sensitive data from of the pixel array 18-510, then a significant amount of noise may be expected within the gain-adjusted analog pixel data 18-623. In one embodiment, the detrimental effects of such noise may be reduced by capturing the optical scene information at a reduced overall exposure. In such an embodiment, the application of the gain 18-652 to the analog pixel data 18-621 may result in gain-adjusted analog pixel data with proper exposure and reduced noise.

In one embodiment, the amplifier 18-650 may be a transimpedance amplifier (TIA). Furthermore, the gain 18-652 may be specified by a digital value. In one embodiment, the digital value specifying the gain 18-652 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 18-652 may be associated with an ISO. In the field of photography, the ISO system is a well-established standard for specifying light sensitivity. In one embodiment, the amplifier 18-650 receives a digital value specifying the gain 18-652 to be applied to the analog pixel data 18-621. In another embodiment, there may be a mapping from conventional ISO values to digital gain values that may be provided as the gain 18-652 to the amplifier 18-650. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 18-650 for application as the gain 18-652. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 18-623 may include brightness corrected pixel data, where the brightness is corrected based on a specified ISO. In another embodiment, the gain-adjusted analog pixel data 18-623 for an image may include pixels having a brightness in the image as if the image had been sampled at a certain ISO.

In accordance with an embodiment, the digital pixel data 18-625 may comprise a plurality of digital values representing pixels of an image captured using the pixel array 18-510.

In one embodiment, an instance of digital pixel data 18-625 may be output for each instance of analog pixel data 18-621 received. Thus, where a pixel array 18-510 includes a plurality of first analog sampling circuits 19-603(0) and also includes a plurality of second analog sampling circuits 19-603(1), then a first instance of analog pixel data 18-621 may be received containing a discrete analog value from each of the first analog sampling circuits 19-603(0) and a second instance of analog pixel data 18-621 may be received containing a discrete analog value from each of the second analog sampling circuits 19-603(1). In such an embodiment, a first instance of digital pixel data 18-625 may be output based on the first instance of analog pixel data 18-621, and a second instance of digital pixel data 18-625 may be output based on the second instance of analog pixel data 18-621.

Further, the first instance of digital pixel data 18-625 may include a plurality of digital values representing pixels of a first image captured using the plurality of first analog sampling circuits 19-603(0) of the pixel array 18-510, and the second instance of digital pixel data 18-625 may include a plurality of digital values representing pixels of a second image captured using the plurality of second analog sampling circuits 19-603(1) of the pixel array 18-510. Where the first instance of digital pixel data 18-625 and the second instance of digital pixel data 18-625 are generated utilizing the same gain 18-652, then any differences between the instances of digital pixel data may be a function of a difference between the exposure time of the plurality of first analog sampling circuits 19-603(0) and the exposure time of the plurality of second analog sampling circuits 19-603(1).

In some embodiments, two or more gains 18-652 may be applied to an instance of analog pixel data 18-621, such that two or more instances of digital pixel data 18-625 may be output for each instance of analog pixel data 18-621. For example, two or more gains may be applied to both of a first instance of analog pixel data 18-621 and a second instance of analog pixel data 18-621. In such an embodiment, the first instance of analog pixel data 18-621 may contain a discrete analog value from each of a plurality of first analog sampling circuits 19-603(0) of a pixel array 18-510, and the second instance of analog pixel data 18-621 may contain a discrete analog value from each of a plurality of second analog sampling circuits 19-603(1) of the pixel array 18-510. Thus, four or more instances of digital pixel data 18-625 associated with four or more corresponding digital images may be generated from a single capture by the pixel array 18-510 of a photographic scene.

FIG. 19-4 illustrates a system 19-700 for converting analog pixel data of an analog signal to digital pixel data, in accordance with an embodiment. As an option, the system 19-700 may be implemented in the context of the details of any of the Figures disclosed herein. Of course, however, the system 19-700 may be implemented in any desired environment. Further, the aforementioned definitions may equally apply to the description below.

The system 19-700 is shown in FIG. 19-4 to include a first analog storage plane 19-702(0), a first analog-to-digital unit 19-722(0), and a first digital image stack 19-732(0), and is shown to further include a second analog storage plane 19-702(1), a second analog-to-digital unit 19-722(1), and a second digital image stack 19-732(1). Accordingly, the system 19-700 is shown to include at least two analog storage planes 19-702(0) and 19-702(1). As illustrated in FIG. 19-4, a plurality of analog values are each depicted as a "V" within each of the analog storage planes 19-702, and corresponding digital values are each depicted as a "D" within digital images of each of the image stacks 19-732.

In the context of certain embodiments, each analog storage plane 19-702 may comprise any collection of one or more analog values. In some embodiments, each analog storage plane 19-702 may comprise at least one analog pixel value for each pixel of a row or line of a pixel array. Still yet, in another embodiment, each analog storage plane 19-702 may comprise at least one analog pixel value for each pixel of an entirety of a pixel array, which may be referred to as a frame. For example, each analog storage plane 19-702 may comprise an analog pixel value, or more generally, an analog value for each cell of each pixel of every line or row of a pixel array.

Further, the analog values of each analog storage plane 19-702 are output as analog pixel data 19-704 to a corresponding analog-to-digital unit 19-722. For example, the analog values of analog storage plane 19-702(0) are output as analog pixel data 19-704(0) to analog-to-digital unit 19-722(0), and the analog values of analog storage plane 19-702(1) are output as analog pixel data 19-704(1) to analog-to-digital unit 19-722(1). In one embodiment, each analog-to-digital unit 19-722 may be substantially identical to the analog-to-digital unit 18-622 described within the context of FIG. 18-4. For example, each analog-to-digital unit 19-722 may comprise at least one amplifier and at least one analog-to-digital converter, where the amplifier is operative to receive a gain value and utilize the gain value to gain-adjust analog pixel data received at the analog-to-digital unit 19-722. Further, in such an embodiment, the amplifier may transmit gain-adjusted analog pixel data to an analog-to-digital converter, which then generates digital pixel data from the gain-adjusted analog pixel data. To this end, an analog-to-digital conversion may be performed on the contents of each of two or more different analog storage planes 19-702.

In the context of the system 19-700 of FIG. 19-4, each analog-to-digital unit 19-722 receives corresponding analog pixel data 19-704, and applies at least two different gains to the received analog pixel data 19-704 to generate at least a first gain-adjusted analog pixel data and a second gain-adjusted analog pixel data. For example, the analog-to-digital unit 19-722(0) receives analog pixel data 19-704(0), and applies at least two different gains to the analog pixel data 19-704(0) to generate at least a first gain-adjusted analog pixel data and a second gain-adjusted analog pixel data based on the analog pixel data 19-704(0); and the analog-to-digital unit 19-722(1) receives analog pixel data 19-704(1), and applies at least two different gains to the analog pixel data 19-704(1) to generate at least a first gain-adjusted analog pixel data and a second gain-adjusted analog pixel data based on the analog pixel data 19-704(1).

Further, each analog-to-digital unit 19-722 converts each generated gain-adjusted analog pixel data to digital pixel data, and then outputs at least two digital outputs. In one embodiment, each analog-to-digital unit 19-722 provides a different digital output corresponding to each gain applied to the received analog pixel data 19-704. With respect to FIG. 19-4 specifically, the analog-to-digital unit 19-722(0) is shown to generate a first digital signal comprising first digital pixel data 19-723(0) corresponding to a first gain (Gain1), a second digital signal comprising second digital pixel data 19-724(0) corresponding to a second gain (Gain2), and a third digital signal comprising third digital pixel data 19-725(0) corresponding to a third gain (Gain3). Similarly, the analog-to-digital unit 19-722(1) is shown to generate a first digital signal comprising first digital pixel data 19-723(1) corresponding to a first gain (Gain1), a second digital signal comprising second digital pixel data 19-724(1) corresponding to a second gain (Gain2), and a third digital signal comprising third digital pixel data 19-725 (1) corresponding to a third gain (Gain3). Each instance of each digital pixel data may comprise a digital image, such that each digital signal comprises a digital image.

Accordingly, as a result of the analog-to-digital unit 19-722(0) applying each of Gain1, Gain2, and Gain3 to the analog pixel data 19-704(0), and thereby generating first digital pixel data 19-723(0), second digital pixel data 19-724 (0), and third digital pixel data 19-725(0), the analog-to-digital unit 19-722(0) generates a stack of digital images, also referred to as an image stack 19-732(0). Similarly, as a result of the analog-to-digital unit 19-722(1) applying each of Gain1, Gain2, and Gain3 to the analog pixel data 19-704 (1), and thereby generating first digital pixel data 19-723(1), second digital pixel data 19-724(1), and third digital pixel data 19-725(1), the analog-to-digital unit 19-722(1) generates a second stack of digital images, also referred to as an image stack 19-732(1).

In one embodiment, each analog-to-digital unit 19-722 applies in sequence at least two gains to the analog values. For example, within the context of FIG. 19-4, the analog-to-digital unit 19-722(0) first applies Gain1 to the analog pixel data 19-704(0), then subsequently applies Gain2 to the same analog pixel data 19-704(0), and then subsequently applies Gain3 to the same analog pixel data 19-704(0). In other embodiments, each analog-to-digital unit 19-722 may apply in parallel at least two gains to the analog values. For example, an analog-to-digital unit may apply Gain1 to received analog pixel data in parallel with application of Gain2 and Gain3 to the analog pixel data. To this end, each instance of analog pixel data 19-704 is amplified utilizing at least two gains.

In one embodiment, the gains applied to the analog pixel data 19-704(0) at the analog-to-digital unit 19-722(0) may be the same as the gains applied to the analog pixel data 19-704(1) at the analog-to-digital unit 19-722(1). By way of a specific example, the Gain1 applied by both of the analog-to-digital unit 19-722(0) and the analog-to-digital unit 19-722(1) may be a gain of 19-1.0, the Gain2 applied by both of the analog-to-digital unit 19-722(0) and the analog-to-digital unit 19-722(1) may be a gain of 19-2.0, and the Gain3 applied by both of the analog-to-digital unit 19-722 (0) and the analog-to-digital unit 19-722(1) may be a gain of 4.0. In another embodiment, one or more of the gains applied to the analog pixel data 19-704(0) at the analog-to-digital unit 19-722(0) may be different from the gains applied to the analog pixel data 19-704(1) at the analog-to-digital unit 19-722(1). For example, the Gain1 applied at the analog-to-digital unit 19-722(0) may be a gain of 19-1.0, and the Gain1 applied at the analog-to-digital unit 19-722(1) may be a gain of 19-2.0. Accordingly, the gains applied at each analog-to-digital unit 19-722 may be selected dependently or independently of the gains applied at other analog-to-digital units 19-722 within system 19-700.

In accordance with one embodiment, the at least two gains may be determined using any technically feasible technique based on an exposure of a photographic scene, metering data, user input, detected ambient light, a strobe control, or any combination of the foregoing. For example, a first gain of the at least two gains may be determined such that half of the digital values from an analog storage plane 19-702 are converted to digital values above a specified threshold (e.g., a threshold of 0.5 in a range of 0.0 to 19-1.0) for the dynamic range associated with digital values comprising a first digital image of an image stack 19-732, which can be characterized as having an "EV0" exposure. Continuing the example, a second gain of the at least two gains may be determined as being twice that of the first gain to generate a second digital image of the image stack 19-732 characterized as having an "EV+1" exposure. Further still, a third gain of the at least two gains may be determined as being half that of the first gain to generate a third digital image of the image stack 19-732 characterized as having an "EV−1" exposure.

In one embodiment, an analog-to-digital unit 19-722 converts in sequence a first instance of the gain-adjusted analog pixel data to the first digital pixel data 19-723, a second instance of the gain-adjusted analog pixel data to the second digital pixel data 19-724, and a third instance of the gain-adjusted analog pixel data to the third digital pixel data 19-725. For example, an analog-to-digital unit 19-722 may first convert a first instance of the gain-adjusted analog pixel data to first digital pixel data 19-723, then subsequently convert a second instance of the gain-adjusted analog pixel data to second digital pixel data 19-724, and then subsequently convert a third instance of the gain-adjusted analog pixel data to third digital pixel data 19-725. In other embodiments, an analog-to-digital unit 19-722 may perform such conversions in parallel, such that one or more of a first digital pixel data 19-723, a second digital pixel data 19-724, and a third digital pixel data 19-725 are generated in parallel.

Still further, as shown in FIG. 19-4, each first digital pixel data 19-723 provides a first digital image. Similarly, each second digital pixel data 19-724 provides a second digital image, and each third digital pixel data 19-725 provides a third digital image. Together, each set of digital images produced using the analog values of a single analog storage plane 19-702 comprises an image stack 19-732. For example, image stack 19-732(0) comprises digital images produced using analog values of the analog storage plane 19-702(0), and image stack 19-732(1) comprises the digital images produced using the analog values of the analog storage plane 19-702(1).

As illustrated in FIG. 19-4, all digital images of an image stack 19-732 may be based upon a same analog pixel data 19-704. However, each digital image of an image stack 19-732 may differ from other digital images in the image stack 19-732 as a function of a difference between the gains used to generate the two digital images. Specifically, a digital image generated using the largest gain of at least two gains may be visually perceived as the brightest or more exposed of the digital images of the image stack 19-732. Conversely, a digital image generated using the smallest gain of the at least two gains may be visually perceived as the darkest and less exposed than other digital images of the image stack 19-732. To this end, a first light sensitivity value may be associated with first digital pixel data 19-723, a second light sensitivity value may be associated with second digital pixel data 19-724, and a third light sensitivity value may be associated with third digital pixel data 19-725. Further, because each of the gains may be associated with a different light sensitivity value, a first digital image or first digital signal may be associated with a first light sensitivity value, a second digital image or second digital signal may be associated with a second light sensitivity value, and a third digital image or third digital signal may be associated with a third light sensitivity value.

It should be noted that while a controlled application of gain to the analog pixel data may greatly aid in HDR image generation, an application of too great of gain may result in a digital image that is visually perceived as being noisy, over-exposed, and/or blown-out. In one embodiment, application of two stops of gain to the analog pixel data may impart visually perceptible noise for darker portions of a photographic scene, and visually imperceptible noise for brighter portions of the photographic scene. In another embodiment, a digital photographic device may be configured to provide an analog storage plane for analog pixel data of a captured photographic scene, and then perform at least two analog-to-digital samplings of the same analog pixel data using an analog-to-digital unit 19-722. To this end, a digital image may be generated for each sampling of the at least two samplings, where each digital image is obtained at a different exposure despite all the digital images being generated from the same analog sampling of a single optical image focused on an image sensor.

In one embodiment, an initial exposure parameter may be selected by a user or by a metering algorithm of a digital photographic device. The initial exposure parameter may be selected based on user input or software selecting particular capture variables. Such capture variables may include, for example, ISO, aperture, and shutter speed. An image sensor may then capture a photographic scene at the initial exposure parameter, and populate a first analog storage plane with a first plurality of analog values corresponding to an optical image focused on the image sensor. Simultaneous, at least in part, with populating the first analog storage plane, a second analog storage plane may be populated with a second plurality of analog values corresponding to the optical image focused on the image sensor. In the context of the foregoing Figures, a first analog storage plane 19-702(0) may be populated with a plurality of analog values output from a plurality of first analog sampling circuits 19-603(0) of a pixel array 18-510, and a second analog storage plane 19-702(1) may be populated with a plurality of analog values output from a plurality of second analog sampling circuits 19-603(1) of the pixel array 18-510.

In other words, in an embodiment where each photosensitive cell includes two analog sampling circuits, then two analog storage planes may be configured such that a first of the analog storage planes stores a first analog value output from one of the analog sampling circuits of a cell, and a second of the analog storage planes stores a second analog value output from the other analog sampling circuit of the same cell. In this configuration, each of the analog storage planes may store at least one analog value received from a pixel of a pixel array or image sensor.

Further, each of the analog storage planes may receive and store different analog values for a given pixel of the pixel array or image sensor. For example, an analog value received for a given pixel and stored in a first analog storage plane may be output based on a first sample captured during a first exposure time, and a corresponding analog value received for the given pixel and stored in a second analog storage plane may be output based on a second sample captured during a second exposure time that is different than the first exposure time. Accordingly, in one embodiment, substantially all analog values stored in a first analog storage plane may be based on samples obtained during a first exposure time, and substantially all analog values stored in a second analog storage plane may be based on samples obtained during a second exposure time that is different than the first exposure time.

In the context of the present description, a "single exposure" of a photographic scene at an initial exposure parameter may include simultaneously, at least in part, capturing the photographic scene using two or more sets of analog sampling circuits, where each set of analog sampling circuits may be configured to operate at different exposure times. During capture of the photographic scene using the two or more sets of analog sampling circuits, the photographic scene may be illuminated by ambient light or may be illuminated using a strobe unit. Further, after capturing the photographic scene using the two or more sets of analog sampling circuits, two or more analog storage planes (e.g., one storage plane for each set of analog sampling circuits) may be populated with analog values corresponding to an optical image focused on an image sensor. Next, one or more digital images of a first image stack may be obtained by applying one or more gains to the analog values of a first analog storage plane in accordance with the above systems and methods. Further, one or more digital images of a second image stack may be obtained by applying one or more gains to the analog values of a second analog storage plane in accordance with the above systems and methods.

To this end, one or more image stacks 19-732 may be generated based on a single exposure of a photographic scene. In one embodiment, each digital image of a particular image stack 19-732 may be generated based on a common exposure time or sample time, but be generated utilizing a unique gain. In such an embodiment, each of the image stacks 19-732 of the single exposure of a photographic scene may be generated based on different sample times.

In one embodiment, a first digital image of an image stack 19-732 may be obtained utilizing a first gain in accordance with the above systems and methods. For example, if a digital photographic device is configured such that initial exposure parameter includes a selection of ISO 400, the first gain utilized to obtain the first digital image may be mapped to, or otherwise associated with, ISO 400. This first digital image may be referred to as an exposure or image obtained at exposure value 0 (EV0). Further one more digital images may be obtained utilizing a second gain in accordance with the above systems and methods. For example, the same analog pixel data used to generate the first digital image may be processed utilizing a second gain to generate a second digital image. Still further, one or more digital images may be obtained utilizing a second analog storage plane in accordance with the above systems and methods. For example, second analog pixel data may be used to generate a second digital image, where the second analog pixel data is different from the analog pixel data used to generate the first digital image. Specifically, the analog pixel data used to generate the first digital image may have been captured using a first sample time, and the second analog pixel data may have been captured using a second sample time different than the first sample time. Specifically, the analog pixel data used to generate the first digital image may have been captured during a first exposure time, and the second analog pixel data may have been captured during a second exposure time different than the first exposure time.

To this end, at least two digital images may be generated utilizing different analog pixel data, and then blended to generate an HDR image. The at least two digital images may be blended by blending a first digital signal and a second digital signal. Where the at least two digital images are generated using different analog pixel data captured during a single exposure of a photographic scene, then there may be approximately, or near, zero interframe time between the at least two digital images. As a result of having zero, or near zero, interframe time between at least two digital images of a same photographic scene, an HDR image may be generated, in one possible embodiment, without motion blur or other artifacts typical of HDR photographs.

In one embodiment, after selecting a first gain for generating a first digital image of an image stack 19-732, a second gain may be selected based on the first gain. For example, the second gain may be selected on the basis of it being one stop away from the first gain. More specifically, if the first gain is mapped to or associated with ISO 400, then one stop down from ISO 400 provides a gain associated with ISO 200, and one stop up from ISO 400 provides a gain associated with ISO 800. In such an embodiment, a digital image generated utilizing the gain associated with ISO 200 may be referred to as an exposure or image obtained at exposure value –1 (EV–1), and a digital image generated utilizing the gain associated with ISO 800 may be referred to as an exposure or image obtained at exposure value+1 (EV+1).

Still further, if a more significant difference in exposures is desired between digital images generated utilizing the same analog signal, then the second gain may be selected on the basis of it being two stops away from the first gain. For example, if the first gain is mapped to or associated with ISO 400, then two stops down from ISO 400 provides a gain associated with ISO 100, and two stops up from ISO 400 provides a gain associated with ISO 1600. In such an embodiment, a digital image generated utilizing the gain associated with ISO 100 may be referred to as an exposure or image obtained at exposure value –2 (EV–2), and a digital image generated utilizing the gain associated with ISO 1600 may be referred to as an exposure or image obtained at exposure value+2 (EV+2).

In one embodiment, an ISO and exposure of the EV0 image may be selected according to a preference to generate darker digital images. In such an embodiment, the intention may be to avoid blowing out or overexposing what will be the brightest digital image, which is the digital image generated utilizing the greatest gain. In another embodiment, an EV–1 digital image or EV–2 digital image may be a first generated digital image. Subsequent to generating the EV–1 or EV–2 digital image, an increase in gain at an analog-to-digital unit may be utilized to generate an EV0 digital image, and then a second increase in gain at the analog-to-digital unit may be utilized to generate an EV+1 or EV+2 digital image. In one embodiment, the initial exposure parameter corresponds to an EV–N digital image and subsequent gains are used to obtain an EV0 digital image, an EV+M digital image, or any combination thereof, where N and M are values ranging from 0 to –10.

In one embodiment, three digital images having three different exposures (e.g. an EV–2 digital image, an EV0 digital image, and an EV+2 digital image) may be generated in parallel by implementing three analog-to-digital units. Each analog-to-digital unit may be configured to convert one or more analog signal values to corresponding digital signal values. Such an implementation may be also capable of simultaneously generating all of an EV–1 digital image, an EV0 digital image, and an EV+1 digital image. Similarly, in other embodiments, any combination of exposures may be generated in parallel from two or more analog-to-digital units, three or more analog-to-digital units, or an arbitrary number of analog-to-digital units. In other embodiments, a set of analog-to-digital units may be configured to each operate on either of two or more different analog storage planes.

In one embodiment, a combined image 1520 comprises a combination of at least two related digital images. In one embodiment, the combined image 1020 comprises, without limitation, a combined rendering of at least two digital images, such as two or more of the digital images of an image stack 19-732(0) and an image stack 19-732(1) of FIG.

19-4. In another embodiment, the digital images used to compute the combined image 1520 may be generated by amplifying each of a first analog signal and a second analog signal with at least two different gains, where each analog signal includes optical scene information captured based on an optical image focused on an image sensor. In yet another embodiment, each analog signal may be amplified using the at least two different gains on a pixel-by-pixel, line-by-line, or frame-by-frame basis.

In other embodiments, in addition to the indication point 1540-B, there may exist a plurality of additional indication points along the track 1532 between the indication points 1540-A and 1540-C. The additional indication points may be associated with additional digital images. For example, a first image stack 19-732 may be generated to include each of a digital image at EV–1 exposure, a digital image at EV0 exposure, and a digital image at EV+1 exposure. Said image stack 19-732 may be associated with a first analog storage plane captured at a first exposure time, such as the image stack 19-732(0) of FIG. 19-4. Thus, a first image stack may include a plurality of digital images all associated with a first exposure time, where each digital image is associated with a different ISO. Further, a second image stack 19-732 may also be generated to include each of a digital image at EV–1 exposure, a digital image at EV0 exposure, and a digital image at EV+1 exposure. However, the second image stack 19-732 may be associated with a second analog storage plane captured at a second exposure time different than the first exposure time, such as the image stack 19-732(1) of FIG. 19-4. Thus, a second image stack may include a second plurality of digital images all associated with a second exposure time, where each digital image is associated with a different ISO. After analog-to-digital units 19-722(0) and 19-722(1) generate the respective image stacks 19-732, the digital pixel data output by the analog-to-digital units 19-722(0) and 19-722(1) may be arranged together into a single sequence of digital images of increasing or decreasing exposure. In the context of the instant description, no two digital signals of the two image stacks may be associated with a same ISO+ exposure time combination, thus each digital image or instance of digital pixel data may be considered as having a unique effective exposure.

In the context of the foregoing figures, arranging the digital images or instances of digital pixel data output by the analog-to-digital units 19-722(0) and 19-722(1) into a single sequence of digital images of increasing or decreasing exposure may be performed according to overall exposure. For example, the single sequence of digital images may combine gain and exposure time to determine an effective exposure. The digital pixel data may be rapidly organized to obtain a single sequence of digital images of increasing effective exposure, such as, for example: 19-723(0), 19-723(1), 19-724(0), 19-724(1), 19-725(0), and 19-725(1). Of course, any sorting of the digital images or digital pixel data based on effective exposure level will depend on an order of application of the gains and generation of the digital signals 19-723-725.

In one embodiment, exposure times and gains may be selected or predetermined for generating a number of adequately different effective exposures. For example, where three gains are to be applied, then each gain may be selected to be two exposure stops away from a nearest selected gain. Further, where multiple exposure times are to be used, then a first exposure time may be selected to be one exposure stop away from a second exposure time. In such an embodiment, selection of three gains separated two exposure stops, and two exposure times separated by one exposure stop, may ensure generation of six digital images, each having a unique effective exposure.

With continuing reference to the digital images of multiple image stacks sorted in a sequence of increasing exposure, each of the digital images may then be associated with indication points along the track 1532 of the UI system 1500. For example, the digital images may be sorted or sequenced along the track 1532 in the order of increasing effective exposure noted previously: 19-723(0), 19-723(1), 19-724(0), 19-724(1), 19-725(0), and 19-725(1). In such an embodiment, the slider control 1530 may then be positioned at any point along the track 1532 that is between two digital images generated based on two different analog storage planes. As a result, two digital images generated based on two different analog storage planes may then be blended to generate a combined image 1520.

For example, the slider control 1530 may be positioned at an indication point that may be equally associated with digital pixel data 19-724(0) and digital pixel data 19-724(1). As a result, the digital pixel data 19-724(0), which may include a first digital image generated from a first analog signal captured during a first sample time and amplified utilizing a gain, may be blended with the digital pixel data 19-724(1), which may include a second digital image generated from a second analog signal captured during a second sample time and amplified utilizing the same gain, to generate a combined image 1520.

Still further, as another example, the slider control 1530 may be positioned at an indication point that may be equally associated with digital pixel data 19-724(1) and digital pixel data 19-725(0). As a result, the digital pixel data 19-724(1), which may include a first digital image generated from a first analog signal captured during a first sample time and amplified utilizing a first gain, may be blended with the digital pixel data 19-725(0), which may include a second digital image generated from a second analog signal captured during a second sample time and amplified utilizing a different gain, to generate a combined image 1520.

Thus, as a result of the slider control 1530 positioning, two or more digital signals may be blended, and the blended digital signals may be generated utilizing analog values from different analog storage planes. As a further benefit of sorting effective exposures along a slider, and then allowing blend operations based on slider control position, each pair of neighboring digital images may include a higher noise digital image and a lower noise digital image. For example, where two neighboring digital signals are amplified utilizing a same gain, the digital signal generated from an analog signal captured with a lower sample time may have less noise. Similarly, where two neighboring digital signals are amplified utilizing different gains, the digital signal generated from an analog signal amplified with a lower gain value may have less noise. Thus, when digital signals are sorted based on effective exposure along a slider, a blend operation of two or more digital signals may serve to reduce the noise apparent in at least one of the digital signals.

Of course, any two or more effective exposures may be blended based on the indication point of the slider control 1530 to generate a combined image 1520 in the UI system 1500.

One advantage of the present invention is that a digital photograph may be selectively generated based on user input using two or more different images generated from a single exposure of a photographic scene. Accordingly, the digital photograph generated based on the user input may have a greater dynamic range than any of the individual images. Further, the generation of an HDR image using two or more different images with zero, or near zero, interframe time allows for the rapid generation of HDR images without motion artifacts.

Additionally, when there is any motion within a photographic scene, or a capturing device experiences any jitter during capture, any interframe time between exposures may result in a motion blur within a final merged HDR photograph. Such blur can be significantly exaggerated as interframe time increases. This problem renders current HDR photography an ineffective solution for capturing clear images in any circumstance other than a highly static scene.

Further, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1, 20:
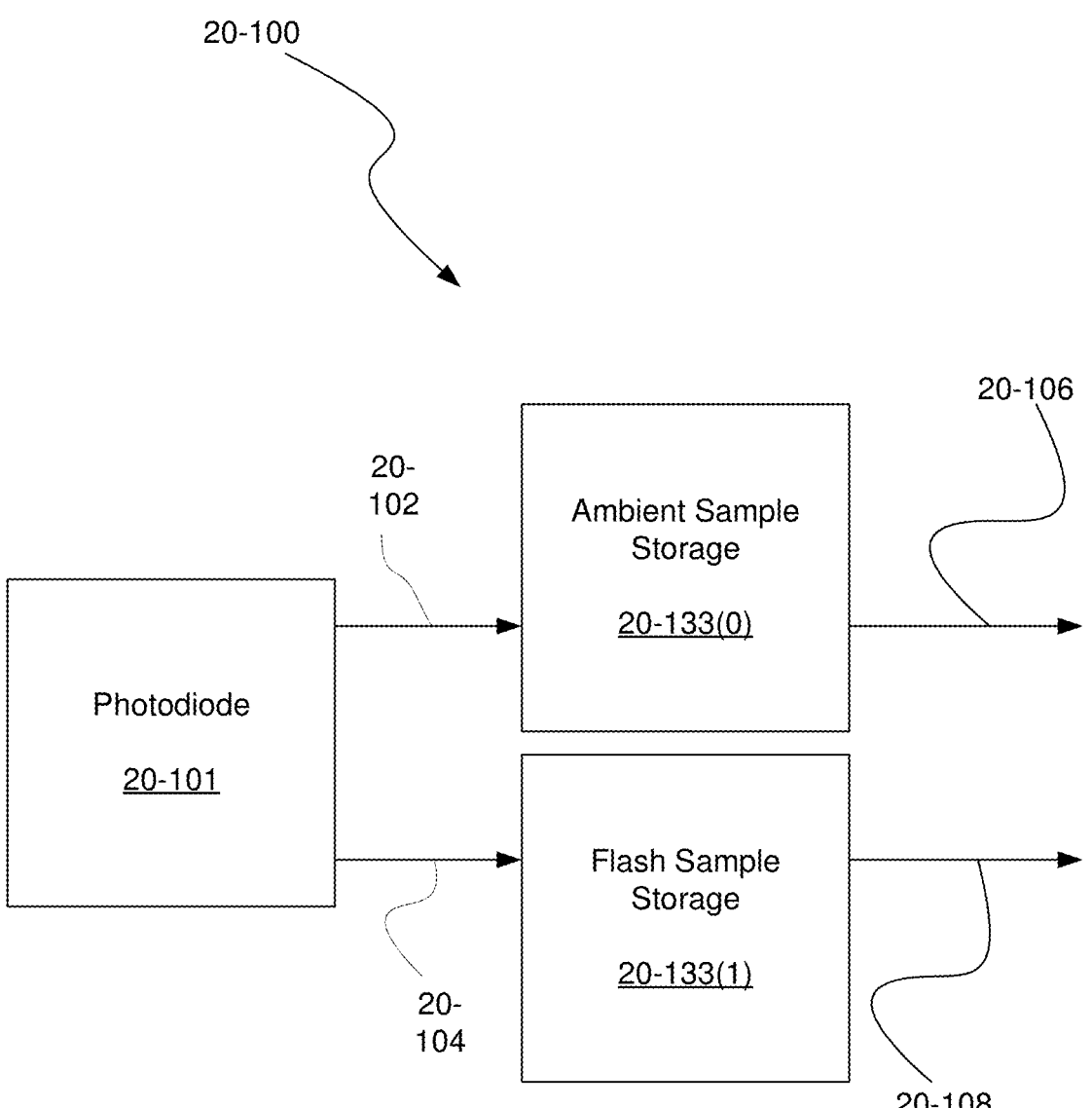
Figures 3, 20:
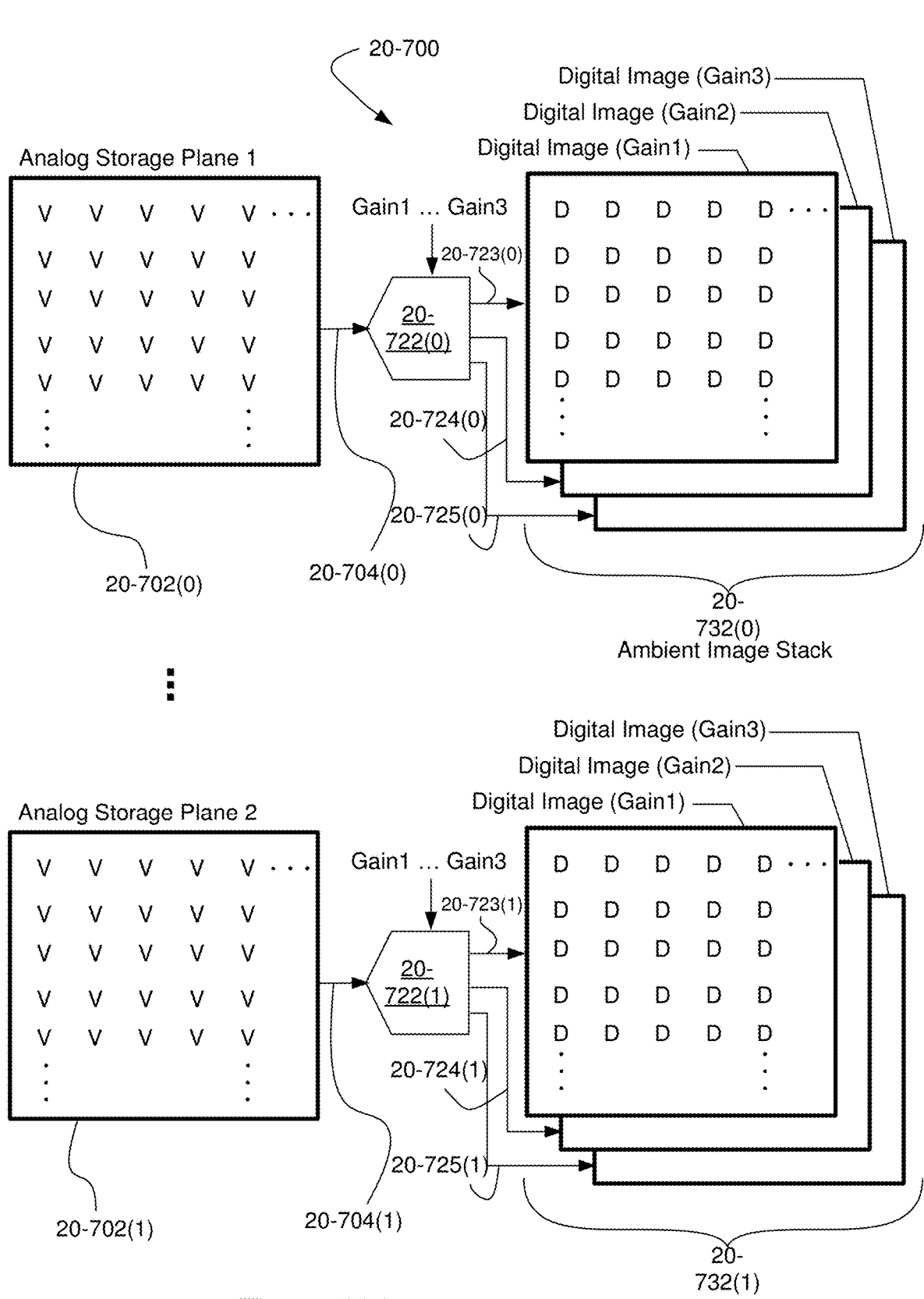

FIG. 20-1 illustrates a system 20-100 for capturing flash and ambient illuminated images, in accordance with one possible embodiment. As an option, the system 20-100 may be implemented in the context of any of the Figures disclosed herein. Of course, however, the system 20-100 may be implemented in any desired environment. Further, the aforementioned definitions may equally apply to the description below.

As shown in FIG. 20-1, the system 20-100 includes a first input 20-102 that is provided to an ambient sample storage node 20-133(0) based on a photodiode 20-101, and a second input 20-104 provided to a flash sample storage node 20-133(1) based on the photodiode 20-101. Based on the input 20-102 to the ambient sample storage node 20-133(0) and the input 20-104 to the flash sample storage node 20-133(1), an ambient sample is stored to the ambient sample storage node 20-133(0) sequentially, at least in part, with storage of a flash sample to the flash sample storage node 20-133(1). In one embodiment, simultaneous storage of the ambient sample and the flash sample includes storing the ambient sample and the second sample at least partially sequentially.

In one embodiment, the input 20-104 may be provided to the flash sample storage node 20-133(1) after the input 20-102 is provided to the ambient sample storage node 20-133(0). In such an embodiment, the process of storing the flash sample may occur after the process of storing the ambient sample. In other words, storing the ambient sample may occur during a first time duration, and storing the flash sample may occur during a second time duration that begins after the first time duration. The second time duration may begin nearly simultaneously with the conclusion of the first time duration.

While the following discussion describes an image sensor apparatus and method for simultaneously capturing multiple images using one or more photodiodes of an image sensor, any photo-sensing electrical element or photosensor may be used or implemented.

In one embodiment, the photodiode 20-101 may comprise any semiconductor diode that generates a potential difference, current, or changes its electrical resistance, in response to photon absorption. Accordingly, the photodiode 20-101 may be used to detect or measure a light intensity. Further, the input 20-102 and the input 20-104 received at sample storage nodes 20-133(0) and 20-133(1), respectively, may be based on the light intensity detected or measured by the photodiode 20-101. In such an embodiment, the ambient sample stored at the ambient sample storage node 20-133(0) may be based on a first exposure time to light at the photodiode 20-101, and the second sample stored at the flash sample storage node 20-133(1) may be based on a second exposure time to the light at the photodiode 20-101. The second exposure time may begin concurrently, or near concurrently, with the conclusion of the conclusion of the first exposure time.

In one embodiment, a rapid rise in scene illumination may occur after completion of the first exposure time, and during the second exposure time while input 20-104 is being received at the flash sample storage node 20-133(1). The rapid rise in scene illumination may be due to activation of a flash or strobe, or any other near instantaneous illumination. As a result of the rapid rise in scene illumination after the first exposure time, the light intensity detected or measured by the photodiode 20-101 during the second exposure time may be greater than the light intensity detected or measured by the photodiode 20-101 during the first exposure time. Accordingly, the second exposure time may be configured or selected based on an anticipated light intensity.

In one embodiment, the first input 20-102 may include an electrical signal from the photodiode 20-101 that is received at the ambient sample storage node 20-133(0), and the second input 20-104 may include an electrical signal from the photodiode 20-101 that is received at the flash sample storage node 20-133(1). For example, the first input 20-102 may include a current that is received at the ambient sample storage node 20-133(0), and the second input 20-104 may include a current that is received at the flash sample storage node 20-133(1). In another embodiment, the first input 20-102 and the second input 20-104 may be transmitted, at least partially, on a shared electrical interconnect. In other embodiments, the first input 20-102 and the second input 20-104 may be transmitted on different electrical interconnects. In some embodiments, the input 20-102 may include a first current, and the input 20-104 may include a second current that is different than the first current. The first current and the second current may each be a function of incident light intensity measured or detected by the photodiode 20-101. In yet other embodiments, the first input 20-102 may include any input from which the ambient sample storage node 20-133(0) may be operative to store an ambient sample, and the second input 20-104 may include any input from which the flash sample storage node 20-133(1) may be operative to store a flash sample.

In one embodiment, the first input 20-102 and the second input 20-104 may include an electronic representation of a portion of an optical image that has been focused on an image sensor that includes the photodiode 20-101. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. In some embodiments, the photodiode 20-101 may be a single photodiode of an array of photodiodes of an image sensor. Such an image sensor may comprise a complementary metal oxide semiconductor (CMOS) image sensor, or charge-coupled device (CCD) image sensor, or any other technically feasible form of image sensor. In other embodiments, photodiode 20-101 may include two or more photodiodes.

In one embodiment, each sample storage node 20-133 includes a charge storing device for storing a sample, and the stored sample may be a function of a light intensity detected at the photodiode 20-101. For example, each sample storage node 20-133 may include a capacitor for storing a charge as a sample. In such an embodiment, each capacitor stores a charge that corresponds to an accumulated exposure during an exposure time or sample time. For example, current received at each capacitor from an associated photodiode may cause the capacitor, which has been previously charged, to discharge at a rate that is proportional to an incident light intensity detected at the photodiode. The remaining charge of each capacitor may be subsequently output from the capacitor as a value. For example, the remaining charge of each capacitor may be output as an analog value that is a function of the remaining charge on the capacitor.

To this end, an analog value received from a capacitor may be a function of an accumulated intensity of light detected at an associated photodiode. In some embodiments, each sample storage node 20-133 may include circuitry operable for receiving input based on a photodiode. For example, such circuitry may include one or more transistors. The one or more transistors may be configured for rendering the sample storage node 20-133 responsive to various control signals, such as sample, reset, and row select signals received from one or more controlling devices or components. In other embodiments, each sample storage node 20-133 may include any device for storing any sample or value that is a function of a light intensity detected at the photodiode 20-101.

Further, as shown in FIG. 20-1, the ambient sample storage node 20-133(0) outputs first value 20-106, and the flash sample storage node 20-133(1) outputs second value 20-108. In one embodiment, the ambient sample storage node 20-133(0) outputs the first value 20-106 based on the ambient sample stored at the ambient sample storage node 20-133(0), and the flash sample storage node 20-133(1) outputs the second value 20-108 based on the flash sample stored at the flash sample storage node 20-133(1). An ambient sample may include any value stored at an ambient sample storage node 20-133(0) due to input 20-102 from the photodiode 20-101 during an exposure time in which the photodiode 20-101 measures or detects ambient light. A flash sample may include any value stored at a flash storage node 20-133(1) due to input 20-104 from the photodiode 20-101 during an exposure time in which the photodiode 20-101 measures or detects flash or strobe illumination.

In some embodiments, the ambient sample storage node 20-133(0) outputs the first value 20-106 based on a charge stored at the ambient sample storage node 20-133(0), and the flash sample storage node 20-133(1) outputs the second value 20-108 based on a second charge stored at the flash sample storage node 20-133(1). The first value 20-106 may be output serially with the second value 20-108, such that one value is output prior to the other value; or the first value 20-106 may be output in parallel with the output of the second value 20-108. In various embodiments, the first value 20-106 may include a first analog value, and the second value 20-108 may include a second analog value. Each of these values may include a current, which may be output for inclusion in an analog signal that includes at least one analog value associated with each photodiode of a photodiode array. In such embodiments, the first analog value 20-106 may be included in an ambient analog signal, and the second analog value 20-108 may be included in a flash analog signal that is different than the ambient analog signal. In other words, an ambient analog signal may be generated to include an analog value associated with each photodiode of a photodiode array, and a flash analog signal may also be generated to include a different analog value associated with each of the photodiodes of the photodiode array. In such an embodiment, the analog values of the ambient analog signal would be sampled during a first exposure time in which the associated photodiodes were exposed to ambient light, and the analog values of the flash analog signal would be sampled during a second exposure time in which the associated photodiode were exposed to strobe or flash illumination.

To this end, a single photodiode array may be utilized to generate a plurality of analog signals. The plurality of analog signals may be generated concurrently or in parallel. Further, the plurality of analog signals may each be amplified utilizing two or more gains, and each amplified analog signal may converted to one or more digital signals such that two or more digital signals may be generated, where each digital signal may include a digital image. Accordingly, due to the contemporaneous storage of the ambient sample and the flash sample, a single photodiode array may be utilized to concurrently generate multiple digital signals or digital images, where at least one of the digital signals is associated with an ambient exposure photographic scene, and at least one of the digital signals is associated with a flash or strobe illuminated exposure of the same photographic scene. In such an embodiment, multiple digital signals having different exposure characteristics may be substantially simultaneously generated for a single photographic scene captured at ambient illumination. Such a collection of digital signals or digital images may be referred to as an ambient image stack. Further, multiple digital signals having different exposure characteristics may be substantially simultaneously generated for the single photographic scene captured with strobe or flash illumination. Such a collection of digital signals or digital images may be referred to as a flash image stack.

In certain embodiments, an analog signal comprises a plurality of distinct analog signals, and a signal amplifier comprises a corresponding set of distinct signal amplifier circuits. For example, each pixel within a row of pixels of an image sensor may have an associated distinct analog signal within an analog signal, and each distinct analog signal may have a corresponding distinct signal amplifier circuit. Further, two or more amplified analog signals may each include gain-adjusted analog pixel data representative of a common analog value from at least one pixel of an image sensor. For example, for a given pixel of an image sensor, a given analog value may be output in an analog signal, and then, after signal amplification operations, the given analog value is represented by a first amplified value in a first amplified analog signal, and by a second amplified value in a second amplified analog signal. Analog pixel data may be analog signal values associated with one or more given pixels.

In various embodiments, the digital images of the ambient image stack and the flash image stack may be combined or blended to generate one or more new blended images having a greater dynamic range than any of the individual images. Further, the digital images of the ambient image stack and the flash image stack may be combined or blended for controlling a flash contribution in the one or more new blended images.

FIG. 20-2 illustrates a method 20-200 for capturing flash and ambient illuminated images, in accordance with one embodiment. As an option, the method 20-200 may be carried out in the context of any of the Figures disclosed herein. Of course, however, the method 20-200 may be carried out in any desired environment. Further, the aforementioned definitions may equally apply to the description below.

As shown in operation 20-202, an ambient sample is stored based on an electrical signal from a photodiode of an image sensor. Further, sequentially, at least in part, with the storage of the ambient sample, a flash sample is stored based on the electrical signal from the photodiode of the image sensor at operation 20-204. As noted above, the photodiode of the image sensor may comprise any semiconductor diode that generates a potential difference, or changes its electrical resistance, in response to photon absorption. Accordingly, the photodiode may be used to detect or measure light intensity, and the electrical signal from the photodiode may include a photodiode current that varies as a function of the light intensity.

In some embodiments, each sample may include an electronic representation of a portion of an optical image that has been focused on an image sensor that includes the photodiode. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. The photodiode may be a single photodiode of an array of photodiodes of the image sensor. Such an image sensor may comprise a complementary metal oxide semiconductor (CMOS) image sensor, or charge-coupled device (CCD) image sensor, or any other technically feasible form of image sensor In the context of one embodiment, each of the samples may be stored by storing energy. For example, each of the samples may include a charged stored on a capacitor. In such an embodiment, the ambient sample may include a first charge stored at a first capacitor, and the flash sample may include a second charge stored at a second capacitor. In one embodiment, the ambient sample may be different than the flash sample. For example, the ambient sample may include a first charge stored at a first capacitor, and the flash sample may include a second charge stored at a second capacitor that is different than the first charge.

In one embodiment, the ambient sample may be different than the flash sample due to being sampled at different sample times. For example, the ambient sample may be stored by charging or discharging a first capacitor during a first sample time, and the flash sample may be stored by charging or discharging a second capacitor during a second sample time, where the first capacitor and the second capacitor may be substantially identical and charged or discharged at a substantially identical rate for a given photodiode current. The second sample time may be contemporaneously, or near contemporaneously, with a conclusion of the first sample time, such that the second capacitor may be charged or discharged after the charging or discharging of the first capacitor has completed.

In another embodiment, the ambient sample may be different than the flash sample due to, at least partially, different storage characteristics. For example, the ambient sample may be stored by charging or discharging a first capacitor for a period of time, and the flash sample may be stored by charging or discharging a second capacitor for the same period of time, where the first capacitor and the second capacitor may have different storage characteristics and/or be charged or discharged at different rates. More specifically, the first capacitor may have a different capacitance than the second capacitor.

In another embodiment, the ambient sample may be different than the flash sample due to a flash or strobe illumination that occurs during the second exposure time, and that provides different illumination characteristics than the ambient illumination of the first exposure time. For example, the ambient sample may be stored by charging or discharging a first capacitor for a period of time of ambient illumination, and the flash sample may be stored by charging or discharging a second capacitor for a period of time of flash illumination. Due to the differences in illumination between the first exposure time and the second exposure time, the second capacitor may be charged or discharged faster than the first capacitor due to the increased light intensity associated with the flash illumination of the second exposure time.

Additionally, as shown at operation 20-206, after storage of the ambient sample and the flash sample, a first value is output based on the ambient sample, and a second value is output based on the flash sample, for generating at least one image. In the context of one embodiment, the first value and the second value are transmitted or output in sequence. For example, the first value may be transmitted prior to the second value. In another embodiment, the first value and the second value may be transmitted in parallel.

In one embodiment, each output value may comprise an analog value. For example, each output value may include a current representative of the associated stored sample, such as an ambient sample or a flash sample. More specifically, the first value may include a current value representative of the stored ambient sample, and the second value may include a current value representative of the stored flash sample. In one embodiment, the first value is output for inclusion in an ambient analog signal, and the second value is output for inclusion in a flash analog signal different than the ambient analog signal. Further, each value may be output in a manner such that it is combined with other values output based on other stored samples, where the other stored samples are stored responsive to other electrical signals received from other photodiodes of an image sensor. For example, the first value may be combined in an ambient analog signal with values output based on other ambient samples, where the other ambient samples were stored based on electrical signals received from photodiodes that neighbor the photodiode from which the electrical signal utilized for storing the ambient sample was received. Similarly, the second value may be combined in a flash analog signal with values output based on other flash samples, where the other flash samples were stored based on electrical signals received from the same photodiodes that neighbor the photodiode from which the electrical signal utilized for storing the flash sample was received.

Finally, at operation 20-208, at least one of the first value and the second value are amplified utilizing two or more gains. In one embodiment, where each output value comprises an analog value, amplifying at least one of the first value and the second value may result in at least two amplified analog values. In another embodiment, where the first value is output for inclusion in an ambient analog signal, and the second value is output for inclusion in a flash analog signal different than the ambient analog signal, one of the ambient analog signal or the flash analog signal may be amplified utilizing two or more gains each. For example, an ambient analog signal that includes the first value may be amplified with a first gain and a second gain, such that the first value is amplified with the first gain and the second gain. Amplifying the ambient analog signal with the first gain may result in a first amplified ambient analog signal, and amplifying the ambient analog signal with the second gain may result in a second amplified ambient analog signal. Of course, more than two analog signals may be amplified using two or more gains. In one embodiment, each amplified analog signal may be converted to a digital signal comprising a digital image.

To this end, an array of photodiodes may be utilized to generate an ambient analog signal based on a set of ambient samples captured at a first exposure time or sample time and illuminated with ambient light, and a flash analog signal based on a set of flash samples captured at a second exposure time or sample time and illuminated with flash or strobe illumination, where the set of ambient samples and the set of flash samples may be two different sets of samples of the same photographic scene. Further, each analog signal may include an analog value generated based on each photodiode of each pixel of an image sensor. Each analog value may be representative of a light intensity measured at the photodiode associated with the analog value. Accordingly, an analog signal may be a set of spatially discrete intensity samples, each represented by continuous analog values, and analog pixel data may be analog signal values associated with one or more given pixels. Still further, each analog signal may undergo subsequent processing, such as amplification, which may facilitate conversion of the analog signal into one or more digital signals, each including digital pixel data, which may each comprise a digital image.

The embodiments disclosed herein may advantageously enable a camera module to sample images comprising an image stack with lower (e.g. at or near zero, etc.) inter-sample time (e.g. interframe, etc.) than conventional techniques. In certain embodiments, images comprising an analog image stack or a flash image stack are effectively sampled or captured simultaneously, or near simultaneously, which may reduce inter-sample time to zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, the first exposure time and the second exposure time do not overlap in time. For example, a controller may be configured to control the second exposure time such that it begins contemporaneously, or near contemporaneously, with a conclusion of the first exposure time. In such an embodiment, the sample signal 19-618(1) may be activated as the sample signal 19-618(0) is deactivated.

As a benefit of having two different exposure conditions, in situations where a photodiode 19-602 is exposed to a sufficient threshold of incident light 19-601, a first capacitor 19-604(0) may provide an analog value suitable for generating a digital image, and a second capacitor 19-604(1) of the same cell 19-600 may provide a "blown out" or over exposed image portion due to excessive flash illumination. Thus, for each cell 19-600, a first capacitor 19-604 may more effectively capture darker image content than another capacitor 19-604 of the same cell 19-600. This may be useful, for example, in situations where strobe or flash illumination over-exposes foreground objects in a digital image of a photographic scene, or under-exposes background objects in the digital image of the photographic scene. In such an example, an image captured during another exposure time utilizing ambient illumination may help correct any over-exposed or under-exposed objects. Similarly, in situations where ambient light is unable to sufficiently illuminate particular elements of a photographic scene, and these elements appear dark or difficult to see in an associated digital image, an image captured during another exposure time utilizing strobe or flash illumination may help correct any under-exposed portions of the image.

In various embodiments, capacitor 19-604(0) may be substantially identical to capacitor 19-604(1). For example, the capacitors 19-604(0) and 19-604(1) may have substantially identical capacitance values. In one embodiment, a sample signal 19-618 of one of the analog sampling circuits may be activated for a longer or shorter period of time than a sample signal 19-618 is activated for any other analog sampling circuits 19-603.

As noted above, the sample signal 19-618(0) of the first analog sampling circuit 19-603(0) may be activated for a first exposure time, and a sample signal 19-618(1) of the second analog sampling circuit 19-603(1) may be activated for a second exposure time. In one embodiment, the first exposure time and/or the second exposure time may be determined based on an exposure setting selected by a user, by software, or by some combination of user and software. For example, the first exposure time may be selected based on a 1/60 second shutter time selected by a user of a camera. In response, the second exposure time may be selected based on the first exposure time. In one embodiment, the user's selected 1/60 second shutter time may be selected for an ambient image, and a metering algorithm may then evaluate the photographic scene to determine an optimal second exposure time for a flash or strobe capture. The second exposure time for the flash or strobe capture may be selected based on incident light metered during the evaluation of the photographic scene. Of course, in other embodiments, a user selection may be used to select the second exposure time, and then the first exposure time for an ambient capture may be selected according to the selected second exposure time. In yet other embodiments, the first exposure time may be selected independent of the second exposure time.

In other embodiments, the capacitors 19-604(0) and 19-604(1) may have different capacitance values. In one embodiment, the capacitors 19-604(0) and 19-604(1) may have different capacitance values for the purpose of rendering one of the analog sampling circuits 19-603 more or less sensitive to the current I_PD from the photodiode 19-602 than other analog sampling circuits 19-603 of the same cell 19-600. For example, a capacitor 19-604 with a significantly larger capacitance than other capacitors 19-604 of the same cell 19-600 may be less likely to fully discharge when capturing photographic scenes having significant amounts of incident light 19-601. In such embodiments, any difference in stored voltages or samples between the capacitors 19-604(0) and 19-604(1) may be a function of the different capacitance values, in conjunction with different activation times of the sample signals 19-618 and different incident light measurements during the respective exposure times.

In one embodiment, the photosensitive cell 19-600 may be configured such that the first analog sampling circuit 19-603(0) and the second analog sampling circuit 19-603(1) share at least one shared component. In various embodiments, the at least one shared component may include a photodiode 19-602 of an image sensor. In other embodiments, the at least one shared component may include a reset, such that the first analog sampling circuit 19-603(0) and the second analog sampling circuit 19-603(1) may be reset concurrently utilizing the shared reset. In the context of FIG. 19-3, the photosensitive cell 19-600 may include a shared reset between the analog sampling circuits 19-603(0) and 19-603(1). For example, reset 19-616(0) may be coupled to reset 19-616(1), and both may be asserted together such that the reset 19-616(0) is the same signal as the reset 19-616(1), which may be used to simultaneously reset both of the first analog sampling circuit 19-603(0) and the second analog sampling circuit 19-603(1). After reset, the first analog sampling circuit 19-603(0) and the second analog sampling circuit 19-603(1) may be asserted to sample independently.

To this end, the photosensitive cell 19-600 may be utilized to simultaneously store both of an ambient sample and a flash sample based on the incident light 19-601. Specifically, the ambient sample may be captured and stored on a first capacitor during a first exposure time, and the flash sample may be captured and stored on a second capacitor during a second exposure time. Further, during this second exposure time, a strobe may be activated for temporarily increasing illumination of a photographic scene, and increasing the incident light measured at one or more photodiodes of an image sensor during the second exposure time.

In one embodiment, a unique instance of analog pixel data 18-621 may include, as an ordered set of individual analog values, all analog values output from all corresponding analog sampling circuits or sample storage nodes. For example, in the context of the foregoing figures, each cell of cells 18-542-18-545 of a plurality of pixels 18-540 of a pixel array 18-510 may include both a first analog sampling circuit 18-603(0) and a second analog sampling circuit 18-603(1). Thus, the pixel array 18-510 may include a plurality of first analog sampling circuits 18-603(0) and also include a plurality of second analog sampling circuits 18-603(1). In other words, the pixel array 18-510 may include a first analog sampling circuit 18-603(0) for each cell, and also include a second analog sampling circuit 18-603(1) for each cell. In an embodiment, a first instance of analog pixel data 18-621 may be received containing a discrete analog value from each analog sampling circuit of a plurality of first analog sampling circuits 18-603(0), and a second instance of analog pixel data 18-621 may be received containing a discrete analog value from each analog sampling circuit of a plurality of second analog sampling circuits 18-603(1). Thus, in embodiments where cells of a pixel array include two or more analog sampling circuits, the pixel array may output two or more discrete analog signals, where each analog signal includes a unique instance of analog pixel data 18-621.

Further, each of the first analog sampling circuits 19-603 (0) may sample a photodiode current during a first exposure time, during which a photographic scene is illuminated with ambient light; and each of the second sampling circuits 19-603(1) may sample the photodiode current during a second exposure time, during which the photographic scene is illuminated with a strobe or flash. Accordingly, a first analog signal, or ambient analog signal, may include analog values representative of the photographic scene when illuminated with ambient light; and a second analog signal, or flash analog signal, may include analog values representative of the photographic scene when illuminated with the strobe or flash.

In some embodiments, only a subset of the cells of a pixel array may include two or more analog sampling circuits. For example, not every cell may include both a first analog sampling circuit 19-603(0) and a second analog sampling circuit 19-603(1).

FIG. 20-3 illustrates a system 20-700 for converting analog pixel data of an analog signal to digital pixel data, in accordance with an embodiment. As an option, the system 20-700 may be implemented in the context of the details of any of the Figures disclosed herein. Of course, however, the system 20-700 may be implemented in any desired environment. Further, the aforementioned definitions may equally apply to the description below.

The system 20-700 is shown in FIG. 20-3 to include a first analog storage plane 20-702(0), a first analog-to-digital unit 20-722(0), and an ambient digital image stack 20-732(0), and is shown to further include a second analog storage plane 20-702(1), a second analog-to-digital unit 20-722(1), and a flash digital image stack 20-732(1). Accordingly, the system 20-700 is shown to include at least two analog storage planes 20-702(0) and 20-702(1). As illustrated in FIG. 20-3, a plurality of analog values are each depicted as a "V" within each of the analog storage planes 20-702, and corresponding digital values are each depicted as a "D" within digital images of each of the image stacks 20-732. In one embodiment, all of the analog values of the first analog storage plane 20-702(0) are captured during a first exposure time, during which a photographic scene was illuminated with ambient light; and all of the analog values of the second analog storage plane 20-702(1) are captured during a second exposure time, during which the photographic scene was illuminated using a strobe or flash.

In the context of certain embodiments, each analog storage plane 20-702 may comprise any collection of one or more analog values. In some embodiments, each analog storage plane 20-702 may comprise at least one analog pixel value for each pixel of a row or line of a pixel array. Still yet, in another embodiment, each analog storage plane 20-702 may comprise at least one analog pixel value for each pixel of an entirety of a pixel array, which may be referred to as a frame. For example, each analog storage plane 20-702 may comprise an analog pixel value, or more generally, an analog value for each cell of each pixel of every line or row of a pixel array.

Further, the analog values of each analog storage plane 20-702 are output as analog pixel data 20-704 to a corresponding analog-to-digital unit 20-722. For example, the analog values of analog storage plane 20-702(0) are output as analog pixel data 20-704(0) to analog-to-digital unit 20-722(0), and the analog values of analog storage plane 20-702(1) are output as analog pixel data 20-704(1) to analog-to-digital unit 20-722(1). In one embodiment, each analog-to-digital unit 20-722 may be substantially identical to the analog-to-digital unit 18-622 described within the context of FIG. 18-4. For example, each analog-to-digital unit 20-722 may comprise at least one amplifier and at least one analog-to-digital converter, where the amplifier is operative to receive a gain value and utilize the gain value to gain-adjust analog pixel data received at the analog-to-digital unit 20-722. Further, in such an embodiment, the amplifier may transmit gain-adjusted analog pixel data to an analog-to-digital converter, which then generates digital pixel data from the gain-adjusted analog pixel data. To this end, an analog-to-digital conversion may be performed on the contents of each of two or more different analog storage planes 20-702.

In the context of the system 20-700 of FIG. 20-3, each analog-to-digital unit 20-722 receives corresponding analog pixel data 20-704, and applies at least two different gains to the received analog pixel data 20-704 to generate at least a first gain-adjusted analog pixel data and a second gain-adjusted analog pixel data. For example, the analog-to-digital unit 20-722(0) receives analog pixel data 20-704(0), and applies at least two different gains to the analog pixel data 20-704(0) to generate at least a first gain-adjusted analog pixel data and a second gain-adjusted analog pixel data based on the analog pixel data 20-704(0); and the analog-to-digital unit 20-722(1) receives analog pixel data 20-704(1), and applies at least two different gains to the analog pixel data 20-704(1) to generate at least a first gain-adjusted analog pixel data and a second gain-adjusted analog pixel data based on the analog pixel data 20-704(1).

Further, each analog-to-digital unit 20-722 converts each generated gain-adjusted analog pixel data to digital pixel data, and then outputs at least two digital outputs. In one embodiment, each analog-to-digital unit 20-722 provides a different digital output corresponding to each gain applied to the received analog pixel data 20-704. With respect to FIG. 20-3 specifically, the analog-to-digital unit 20-722(0) is shown to generate a first digital signal comprising first digital pixel data 20-723(0) corresponding to a first gain (Gain1), a second digital signal comprising second digital pixel data 20-724(0) corresponding to a second gain (Gain2), and a third digital signal comprising third digital pixel data 20-725(0) corresponding to a third gain (Gain3). Similarly, the analog-to-digital unit 20-722(1) is shown to generate a first digital signal comprising first digital pixel data 20-723(1) corresponding to a first gain (Gain1), a second digital signal comprising second digital pixel data 20-724(1) corresponding to a second gain (Gain2), and a third digital signal comprising third digital pixel data 20-725 (1) corresponding to a third gain (Gain3). Each instance of each digital pixel data may comprise a digital image, such that each digital signal comprises a digital image.

Accordingly, as a result of the analog-to-digital unit 20-722(0) applying each of Gain1, Gain2, and Gain3 to the analog pixel data 20-704(0), and thereby generating first digital pixel data 20-723(0), second digital pixel data 20-724 (0), and third digital pixel data 20-725(0), the analog-to-digital unit 20-722(0) generates a stack of digital images, also referred to as an ambient image stack 20-732(0). Similarly, as a result of the analog-to-digital unit 20-722(1) applying each of Gain1, Gain2, and Gain3 to the analog pixel data 20-704(1), and thereby generating first digital pixel data 20-723(1), second digital pixel data 20-724(1), and third digital pixel data 20-725(1), the analog-to-digital unit 20-722(1) generates a second stack of digital images, also referred to as a flash image stack 20-732(1). Each of the digital images of the ambient image stack 20-732(0) may be a digital image of the photographic scene captured with ambient illumination during a first exposure time. Each of the digital images of the flash image stack 20-732(1) may be a digital image of the photographic scene captured with strobe or flash illumination during a second exposure time.

In one embodiment, each analog-to-digital unit 20-722 applies in sequence at least two gains to the analog values. For example, within the context of FIG. 20-3, the analog-to-digital unit 20-722(0) first applies Gain1 to the analog pixel data 20-704(0), then subsequently applies Gain2 to the same analog pixel data 20-704(0), and then subsequently applies Gain3 to the same analog pixel data 20-704(0). In other embodiments, each analog-to-digital unit 20-722 may apply in parallel at least two gains to the analog values. For example, an analog-to-digital unit may apply Gain1 to received analog pixel data in parallel with application of Gain2 and Gain3 to the analog pixel data. To this end, each instance of analog pixel data 20-704 is amplified utilizing at least two gains.

In one embodiment, the gains applied to the analog pixel data 20-704(0) at the analog-to-digital unit 20-722(0) may be the same as the gains applied to the analog pixel data 20-704(1) at the analog-to-digital unit 20-722(1). By way of a specific example, the Gain1 applied by both of the analog-to-digital unit 20-722(0) and the analog-to-digital unit 20-722(1) may be a gain of 1.0, the Gain2 applied by both of the analog-to-digital unit 20-722(0) and the analog-to-digital unit 20-722(1) may be a gain of 2.0, and the Gain3 applied by both of the analog-to-digital unit 20-722(0) and the analog-to-digital unit 20-722(1) may be a gain of 4.0. In another embodiment, one or more of the gains applied to the analog pixel data 20-704(0) at the analog-to-digital unit 20-722(0) may be different from the gains applied to the analog pixel data 20-704(1) at the analog-to-digital unit 20-722(1). For example, the Gain1 applied at the analog-to-digital unit 20-722(0) may be a gain of 1.0, and the Gain1 applied at the analog-to-digital unit 20-722(1) may be a gain of 2.0. Accordingly, the gains applied at each analog-to-digital unit 20-722 may be selected dependently or independently of the gains applied at other analog-to-digital units 20-722 within system 20-700.

In accordance with one embodiment, the at least two gains may be determined using any technically feasible technique based on an exposure of a photographic scene, metering data, user input, detected ambient light, a strobe control, or any combination of the foregoing. For example, a first gain of the at least two gains may be determined such that half of the digital values from an analog storage plane 20-702 are converted to digital values above a specified threshold (e.g., a threshold of 0.5 in a range of 0.0 to 1.0) for the dynamic range associated with digital values comprising a first digital image of an image stack 20-732, which can be characterized as having an "EV0" exposure. Continuing the example, a second gain of the at least two gains may be determined as being twice that of the first gain to generate a second digital image of the image stack 20-732 characterized as having an "EV+1" exposure. Further still, a third gain of the at least two gains may be determined as being half that of the first gain to generate a third digital image of the image stack 20-732 characterized as having an "EV−1" exposure.

In one embodiment, an analog-to-digital unit 20-722 converts in sequence a first instance of the gain-adjusted analog pixel data to the first digital pixel data 20-723, a second instance of the gain-adjusted analog pixel data to the second digital pixel data 20-724, and a third instance of the gain-adjusted analog pixel data to the third digital pixel data 20-725. For example, an analog-to-digital unit 20-722 may first convert a first instance of the gain-adjusted analog pixel data to first digital pixel data 20-723, then subsequently convert a second instance of the gain-adjusted analog pixel data to second digital pixel data 20-724, and then subsequently convert a third instance of the gain-adjusted analog pixel data to third digital pixel data 20-725. In other embodiments, an analog-to-digital unit 20-722 may perform such conversions in parallel, such that one or more of a first digital pixel data 20-723, a second digital pixel data 20-724, and a third digital pixel data 20-725 are generated in parallel.

Still further, as shown in FIG. 20-3, each first digital pixel data 20-723 provides a first digital image. Similarly, each second digital pixel data 20-724 provides a second digital image, and each third digital pixel data 20-725 provides a third digital image. Together, each set of digital images produced using the analog values of a single analog storage plane 20-702 comprises an image stack 20-732. For example, ambient image stack 20-732(0) comprises digital images produced using analog values of the analog storage plane 20-702(0), and flash image stack 20-732(1) comprises the digital images produced using the analog values of the analog storage plane 20-702(1). As noted previously, each of the digital images of the ambient image stack 20-732(0) may be a digital image of the photographic scene captured with ambient illumination during a first exposure time. Similarly, each of the digital images of the flash image stack 20-732(1) may be a digital image of the photographic scene captured with strobe or flash illumination during a second exposure time.

As illustrated in FIG. 20-3, all digital images of an image stack 20-732 may be based upon a same analog pixel data 20-704. However, each digital image of an image stack 20-732 may differ from other digital images in the image stack 20-732 as a function of a difference between the gains used to generate the two digital images. Specifically, a digital image generated using the largest gain of at least two gains may be visually perceived as the brightest or more exposed of the digital images of the image stack 20-732. Conversely, a digital image generated using the smallest gain of the at least two gains may be visually perceived as the darkest and less exposed than other digital images of the image stack 20-732. To this end, a first light sensitivity value may be associated with first digital pixel data 20-723, a second light sensitivity value may be associated with second digital pixel data 20-724, and a third light sensitivity value may be associated with third digital pixel data 20-725. Further, because each of the gains may be associated with a different light sensitivity value, a first digital image or first digital signal may be associated with a first light sensitivity value, a second digital image or second digital signal may be associated with a second light sensitivity value, and a third digital image or third digital signal may be associated with a third light sensitivity value. In one embodiment, one or more digital images of an image stack may be blended, resulting in a blended image associated with a blended light sensitivity.

It should be noted that while a controlled application of gain to the analog pixel data may greatly aid in HDR image generation, an application of too great of gain may result in a digital image that is visually perceived as being noisy, over-exposed, and/or blown-out. In one embodiment, application of two stops of gain to the analog pixel data may impart visually perceptible noise for darker portions of a photographic scene, and visually imperceptible noise for brighter portions of the photographic scene. In another embodiment, a digital photographic device may be configured to provide an analog storage plane for analog pixel data of a captured photographic scene, and then perform at least two analog-to-digital samplings of the same analog pixel data using an analog-to-digital unit 20-722. To this end, a digital image may be generated for each sampling of the at least two samplings, where each digital image is obtained at a different exposure despite all the digital images being generated from the same analog sampling of a single optical image focused on an image sensor.

In one embodiment, an initial exposure parameter may be selected by a user or by a metering algorithm of a digital photographic device. The initial exposure parameter may be selected based on user input or software selecting particular capture variables. Such capture variables may include, for example, ISO, aperture, and shutter speed. An image sensor may then capture a photographic scene at the initial exposure parameter during a first exposure time, and populate a first analog storage plane with a first plurality of analog values corresponding to an optical image focused on the image sensor. Next, during a second exposure time, a second analog storage plane may be populated with a second plurality of analog values corresponding to the optical image focused on the image sensor. During the second exposure time, a strobe or flash unit may be utilized to illuminate at least a portion of the photographic scene. In the context of the foregoing Figures, a first analog storage plane 20-702(0) comprising a plurality of first analog sampling circuits 19-603(0) may be populated with a plurality of analog values associated with an ambient capture, and a second analog storage plane 20-702(1) comprising a plurality of second analog sampling circuits 19-603(1) may be populated with a plurality of analog values associated with a flash or strobe capture.

In other words, in an embodiment where each photosensitive cell includes two analog sampling circuits, then two analog storage planes may be configured such that a first of the analog storage planes stores a first analog value output from one of the analog sampling circuits of a cell, and a second of the analog storage planes stores a second analog value output from the other analog sampling circuit of the same cell.

Further, each of the analog storage planes may receive and store different analog values for a given pixel of the pixel array or image sensor. For example, an analog value received for a given pixel and stored in a first analog storage plane may be output based on an ambient sample captured during a first exposure time, and a corresponding analog value received for the given pixel and stored in a second analog storage plane may be output based on a flash sample captured during a second exposure time that is different than the first exposure time. Accordingly, in one embodiment, substantially all analog values stored in a first analog storage plane may be based on samples obtained during a first exposure time, and substantially all analog values stored in a second analog storage plane may be based on samples obtained during a second exposure time that is different than the first exposure time.

In the context of the present description, a "single exposure" of a photographic scene may include simultaneously, at least in part, storing analog values representative of the photographic scene using two or more sets of analog sampling circuits, where each set of analog sampling circuits may be configured to operate at different exposure times. During capture of the photographic scene using the two or more sets of analog sampling circuits, the photographic scene may be illuminated by ambient light during a first exposure time, and by a flash or strobe unit during a second exposure time. Further, after capturing the photographic scene using the two or more sets of analog sampling circuits, two or more analog storage planes (e.g., one storage plane for each set of analog sampling circuits) may be populated with analog values corresponding to an optical image focused on an image sensor. Next, one or more digital images of an ambient image stack may be obtained by applying one or more gains to the analog values of the first analog storage plane captured during the first exposure time, in accordance with the above systems and methods. Further, one or more digital images of a flash image stack may be obtained by applying one or more gains to the analog values of the second analog storage plane captured during the second exposure time, in accordance with the above systems and methods.

To this end, one or more image stacks 20-732 may be generated based on a single exposure of a photographic scene.

In one embodiment, a first digital image of an image stack 20-732 may be obtained utilizing a first gain in accordance with the above systems and methods. For example, if a digital photographic device is configured such that initial exposure parameter includes a selection of ISO 400, the first gain utilized to obtain the first digital image may be mapped to, or otherwise associated with, ISO 400. This first digital image may be referred to as an exposure or image obtained at exposure value 0 (EV0). Further one more digital images may be obtained utilizing a second gain in accordance with the above systems and methods. For example, the same analog pixel data used to generate the first digital image may be processed utilizing a second gain to generate a second digital image. Still further, one or more digital images may be obtained utilizing a second analog storage plane in accordance with the above systems and methods. For example, second analog pixel data may be used to generate a second digital image, where the second analog pixel data is different from the analog pixel data used to generate the first digital image. Specifically, the analog pixel data used to generate the first digital image may have been captured during a first exposure time, and the second analog pixel data may have been captured during a second exposure time different than the first exposure time.

To this end, at least two digital images may be generated utilizing different analog pixel data, and then blended to generate an HDR image. The at least two digital images may be blended by blending a first digital signal and a second digital signal. Where the at least two digital images are generated using different analog pixel data captured during a single exposure of a photographic scene, then there may be approximately, or near, zero interframe time between the at least two digital images. As a result of having zero, or near zero, interframe time between at least two digital images of a same photographic scene, an HDR image may be generated, in one possible embodiment, without motion blur or other artifacts typical of HDR photographs.

In one embodiment, after selecting a first gain for generating a first digital image of an image stack 20-732, a second gain may be selected based on the first gain. For example, the second gain may be selected on the basis of it being one stop away from the first gain. More specifically, if the first gain is mapped to or associated with ISO 400, then one stop down from ISO 400 provides a gain associated with ISO 200, and one stop up from ISO 400 provides a gain associated with ISO 800. In such an embodiment, a digital image generated utilizing the gain associated with ISO 200 may be referred to as an exposure or image obtained at exposure value −1 (EV−1), and a digital image generated utilizing the gain associated with ISO 800 may be referred to as an exposure or image obtained at exposure value+1 (EV+1).

Still further, if a more significant difference in exposures is desired between digital images generated utilizing the same analog signal, then the second gain may be selected on the basis of it being two stops away from the first gain. For example, if the first gain is mapped to or associated with ISO 400, then two stops down from ISO 400 provides a gain associated with ISO 100, and two stops up from ISO 400 provides a gain associated with ISO 1600. In such an embodiment, a digital image generated utilizing the gain associated with ISO 100 may be referred to as an exposure or image obtained at exposure value –2 (EV–2), and a digital image generated utilizing the gain associated with ISO 1600 may be referred to as an exposure or image obtained at exposure value+2 (EV+2).

In one embodiment, an ISO and exposure of the EV0 image may be selected according to a preference to generate darker digital images. In such an embodiment, the intention may be to avoid blowing out or overexposing what will be the brightest digital image, which is the digital image generated utilizing the greatest gain. In another embodiment, an EV–1 digital image or EV–2 digital image may be a first generated digital image. Subsequent to generating the EV–1 or EV–2 digital image, an increase in gain at an analog-to-digital unit may be utilized to generate an EV0 digital image, and then a second increase in gain at the analog-to-digital unit may be utilized to generate an EV+1 or EV+2 digital image. In one embodiment, the initial exposure parameter corresponds to an EV–N digital image and subsequent gains are used to obtain an EV0 digital image, an EV+M digital image, or any combination thereof, where N and M are values ranging from 0 to –10.

In one embodiment, three digital images having three different exposures (e.g. an EV–2 digital image, an EV0 digital image, and an EV+2 digital image) may be generated in parallel by implementing three analog-to-digital units. Each analog-to-digital unit may be configured to convert one or more analog signal values to corresponding digital signal values. Such an implementation may be also capable of simultaneously generating all of an EV–1 digital image, an EV0 digital image, and an EV+1 digital image. Similarly, in other embodiments, any combination of exposures may be generated in parallel from two or more analog-to-digital units, three or more analog-to-digital units, or an arbitrary number of analog-to-digital units. In other embodiments, a set of analog-to-digital units may be configured to each operate on either of two or more different analog storage planes.

In some embodiments, a set of gains may be selected for application to the analog pixel data 18-621 based on whether the analog pixel data is associated with an ambient capture or a flash capture. For example, if the analog pixel data 18-621 comprises a plurality of values from an analog storage plane associated with ambient sample storage, a first set of gains may be selected for amplifying the values of the analog storage plane associated with the ambient sample storage. Further, a second set of gains may be selected for amplifying values of an analog storage plane associated with the flash sample storage.

A plurality of first analog sampling circuits 19-603(0) may comprise the analog storage plane used for the ambient sample storage, and a plurality of second analog sampling circuits 19-603(1) may comprise the analog storage plane used for the flash sample storage. Either set of gains may be preselected based on exposure settings. For example, a first set of gains may be preselected for exposure settings associated with a flash capture, and a second set of gains may be preselected for exposure settings associated with an ambient capture. Each set of gains may be preselected based on any feasible exposure settings, such as, for example, ISO, aperture, shutter speed, white balance, and exposure. One set of gains may include gain values that are greater than each of their counterparts in the other set of gains. For example, a first set of gains selected for application to each ambient sample may include gain values of 0.5, 1.0, and 2.0, and a second set of gains selected for application to each flash sample may include gain values of 1.0, 2.0, and 4.0.

Figures 4A, 20:
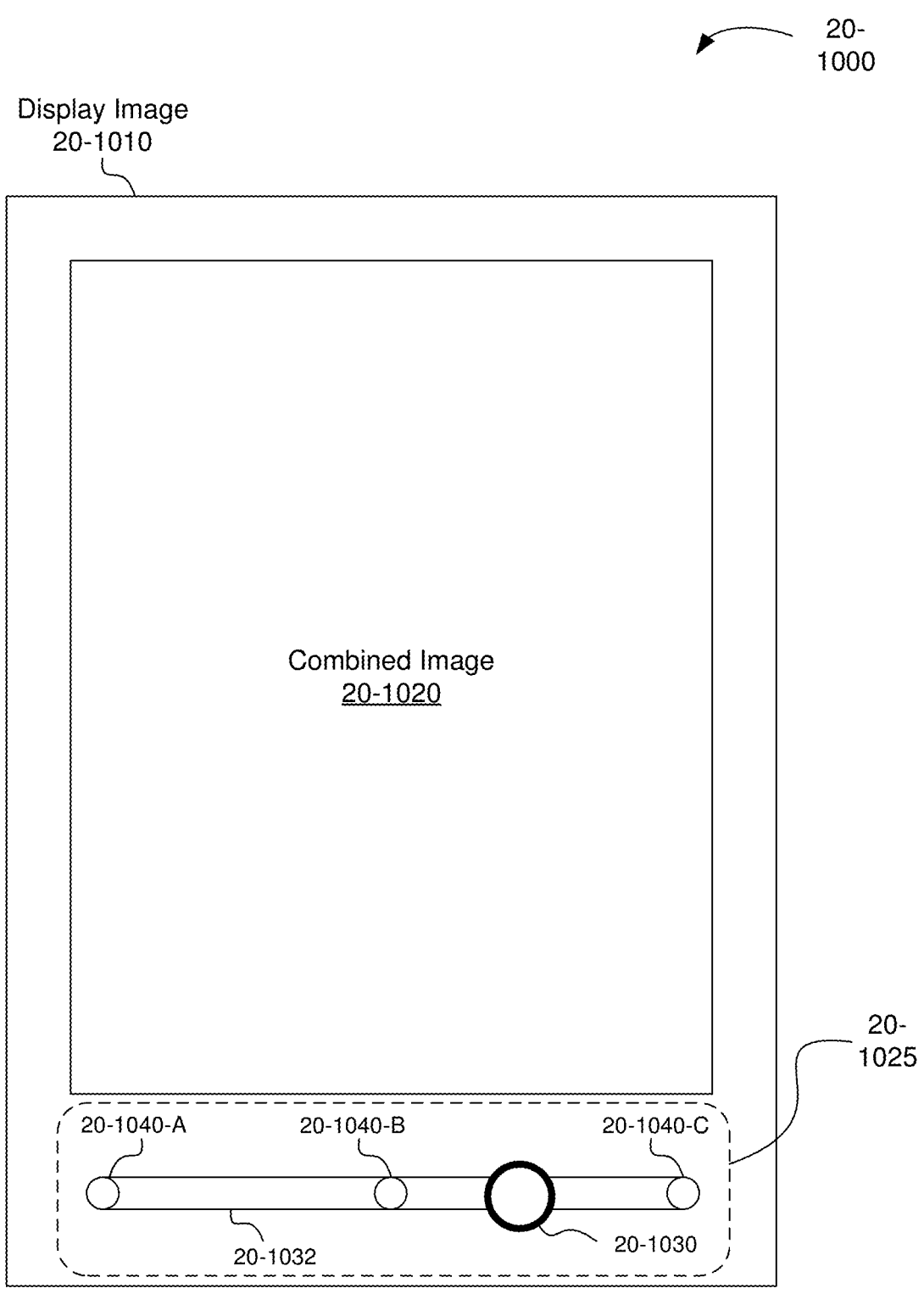

FIG. 20-4A illustrates a user interface (UI) system 20-1000 for generating a combined image 20-1020, according to one embodiment. As an option, the UI system 20-1000 may be implemented in the context of the details of any of the Figures disclosed herein. Of course, however, the UI system 20-1000 may be implemented in any desired environment. Further, the aforementioned definitions may equally apply to the description below.

In one embodiment, a combined image 20-1020 comprises a combination of at least two related digital images. For example the combined image 20-1020 may comprise, without limitation, a combined rendering of at least two digital images, such as two or more of the digital images of an ambient image stack 20-732(0) and a flash image stack 20-732(1) of FIG. 20-3. In another embodiment, the digital images used to compute the combined image 20-1020 may be generated by amplifying each of an ambient analog signal and a flash analog signal with at least two different gains, where each analog signal includes optical scene information captured based on an optical image focused on an image sensor. In yet another embodiment, each analog signal may be amplified using the at least two different gains on a pixel-by-pixel, line-by-line, or frame-by-frame basis.

In one embodiment, the UI system 20-1000 presents a display image 20-1010 that includes, without limitation, a combined image 20-1020, and a control region 20-1025, which in FIG. 20-4A is shown to include a slider control 20-1030 configured to move along track 20-1032, and two or more indication points 20-1040, which may each include a visual marker displayed within display image 20-1010.

In one embodiment, the UI system 20-1000 is generated by an adjustment tool executing within a processor complex 310 of a digital photographic system 300, and the display image 20-1010 is displayed on display unit 312. In one embodiment, at least two digital images comprise source images for generating the combined image 20-1020. The at least two digital images may reside within NV memory 316, volatile memory 318, memory subsystem 362, or any combination thereof. In another embodiment, the UI system 20-1000 is generated by an adjustment tool executing within a computer system, such as a laptop computer or a desktop computer. The at least two digital images may be transmitted to the computer system or may be generated by an attached camera device. In yet another embodiment, the UI system 20-1000 may be generated by a cloud-based server computer system, which may download the at least two digital images to a client browser, which may execute combining operations described below. In another embodiment, the UI system 20-1000 is generated by a cloud-based server computer system, which receives the at least two digital images from a digital photographic system in a mobile device, and which may execute the combining operations described below in conjunction with generating combined image 20-1020.

The slider control 20-1030 may be configured to move between two end points corresponding to indication points 20-1040-A and 20-1040-C. One or more indication points, such as indication point 20-1040-B may be positioned between the two end points. Of course, in other embodiment, the control region 20-1025 may include other configurations of indication points 20-1040 between the two end points. For example, the control region 20-1025 may include more or less than one indication point.

Each indication point 20-1040 may be associated with a specific rendering of a combined image 20-1020, or a specific combination of two or more digital images. For example, the indication point 20-1040-A may be associated with a first digital image generated from an ambient analog signal captured during a first exposure time, and amplified utilizing a first gain; and the indication point 20-1040-C may be associated with a second digital image generated from a flash analog signal captured during a second exposure time, and amplified utilizing a second gain. Both the first digital image and the second digital image may be from a single exposure, as described hereinabove. Further, the first digital image may include an ambient capture of the single exposure, and the second digital image may include a flash capture of the single exposure. In one embodiment, the first gain and the second gain may be the same gain. In another embodiment, when the slider control 20-1030 is positioned directly over the indication point 20-1040-A, only the first digital image may be displayed as the combined image 20-1020 in the display image 20-1010, and similarly when the slider control 20-1030 is positioned directly over the indication point 20-1040-C, only the second digital image may be displayed as the combined image 20-1020 in the display image 20-1010.

In one embodiment, indication point 20-1040-B may be associated with a blending of the first digital image and the second digital image. Further, the first digital image may be an ambient digital image, and the second digital image may be a flash digital image. Thus, when the slider control 20-1030 is positioned at the indication point 20-1040-B, the combined image 20-1020 may be a blend of the ambient digital image and the flash digital image. In one embodiment, blending of the ambient digital image and the flash digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. In one embodiment, a blending of the first digital image and the second digital image may allow for control of a flash contribution within the combined image. Thus, a blending of the first digital image and the second digital image may provide a new computed image that may be displayed as combined image 20-1020 or used to generate combined image 20-1020. To this end, a first digital signal and a second digital signal may be combined, resulting in at least a portion of a combined image. Further, one of the first digital signal and the second digital signal may be further combined with at least a portion of another digital image or digital signal. In one embodiment, the other digital image may include another combined image, which may include an HDR image.

In one embodiment, when the slider control 20-1030 is positioned at the indication point 20-1040-A, the first digital image is displayed as the combined image 20-1020, and when the slider control 20-1030 is positioned at the indication point 20-1040-C, the second digital image is displayed as the combined image 20-1020; furthermore, when slider control 20-1030 is positioned at indication point 20-1040-B, a blended image is displayed as the combined image 20-1020. In such an embodiment, when the slider control

20-1030 is positioned between the indication point 20-1040-A and the indication point 20-1040-C, a mix (e.g. blend) weight may be calculated for the first digital image and the second digital image. For the first digital image, the mix weight may be calculated as having a value of 0.0 when the slider control 20-1030 is at indication point 20-1040-C and a value of 1.0 when slider control 20-1030 is at indication point 20-1040-A, with a range of mix weight values between 0.0 and 1.0 located between the indication points 20-1040-C and 20-1040-A, respectively. For the second digital image, the mix weight may be calculated as having a value of 0.0 when the slider control 20-1030 is at indication point 20-1040-A and a value of 1.0 when slider control 20-1030 is at indication point 20-1040-C, with a range of mix weight values between 0.0 and 1.0 located between the indication points 20-1040-A and 20-1040-C, respectively.

In another embodiment, the indication point 20-1040-A may be associated with a first combination of images, and the indication point 20-1040-C may be associated with a second combination of images. Each combination of images may include an independent blend of images. For example, the indication point 20-1040-A may be associated with a blending of the digital images of ambient image stack 20-732(0) of FIG. 20-3, and the indication point 20-1040-C may be associated with a blending of the digital images of flash image stack 20-732(1). In other words, the indication point 20-1040-A may be associated with a blended ambient digital image or blended ambient digital signal, and the indication point 20-1040-C may be associated with a blended flash digital image or blended flash digital signal. In such an embodiment, when the slider control 20-1030 is positioned at the indication point 20-1040-A, the blended ambient digital image is displayed as the combined image 20-1020, and when the slider control 20-1030 is positioned at the indication point 20-1040-C, the blended flash digital image is displayed as the combined image 20-1020. Each of the blended ambient digital image and the blended flash digital image may be associated with unique light sensitivities.

Further, when slider control 20-1030 is positioned at indication point 20-1040-B, the blended ambient digital image may be blended with the blended flash digital image to generate a new blended image. The new blended image may be associated with yet another unique light sensitivity, and may offer a balance of proper background exposure due to the blending of ambient images, with a properly lit foreground subject due to the blending of flash images. In such an embodiment, when the slider control 20-1030 is positioned between the indication point 20-1040-A and the indication point 20-1040-C, a mix (e.g. blend) weight may be calculated for the blended ambient digital image and the blended flash digital image. For the blended ambient digital image, the mix weight may be calculated as having a value of 0.0 when the slider control 20-1030 is at indication point 20-1040-C and a value of 1.0 when slider control 20-1030 is at indication point 20-1040-A, with a range of mix weight values between 0.0 and 1.0 located between the indication points 20-1040-C and 20-1040-A, respectively. For the blended flash digital image, the mix weight may be calculated as having a value of 0.0 when the slider control 20-1030 is at indication point 20-1040-A and a value of 1.0 when slider control 20-1030 is at indication point 20-1040-C, with a range of mix weight values between 0.0 and 1.0 located between the indication points 20-1040-A and 20-1040-C, respectively.

Figures 4B, 20:
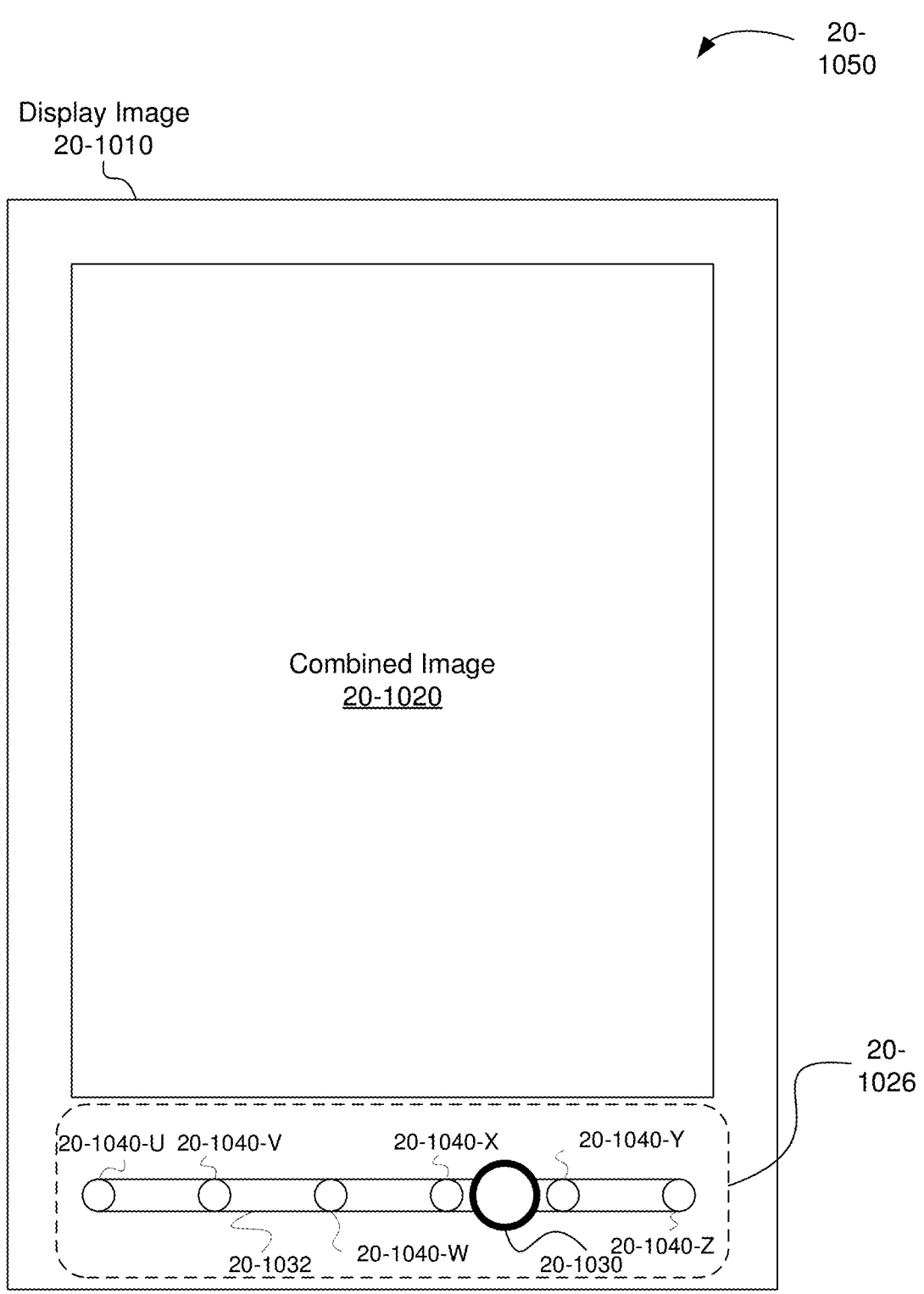

FIG. 20-4B illustrates a user interface (UI) system 20-1050 for generating a combined image 20-1020, according to one embodiment. As an option, the UI system 20-1050 may be implemented in the context of the details of any of the Figures disclosed herein. Of course, however, the UI system 20-1050 may be implemented in any desired environment. Further, the aforementioned definitions may equally apply to the description below.

As shown in FIG. 20-4B, the UI system 20-1050 may be substantially identical to the UI system 20-1000 of FIG. 20-4A, with exception of the control region 20-1025 of UI system 20-1000 and control region 20-1026 of UI system 20-1050. The control region 20-1026 of UI system 20-1050 is shown to include six indication points 20-1040-U, 20-1040-V, 20-1040-W, 20-1040-X, 20-1040-Y, and 20-1040-Z. The indication points 20-1040-U and 20-1040-Z may be representative of end points, similar to the indication points 20-1040-A and 20-1040-C, respectively, of UI system 20-1000. Further, the control region 20-1026 of UI system 20-1050 is shown to include a plurality of indication points 20-1040—such as indication points 20-1040-V, 20-1040-W, 20-1040-X, and 20-1040-Y—disposed between the two end points along track 20-1032. Each of the indication points may be associated with one or more digital images of image stacks 20-732.

For example, an ambient image stack 20-732 may be generated to include each of an ambient digital image at EV−1 exposure, an ambient digital image at EV0 exposure, and an ambient digital image at EV+1 exposure. Said ambient image stack 20-732 may be associated with a first analog storage plane captured at a first exposure time, such as the ambient image stack 20-732(0) of FIG. 20-3. Thus, an ambient image stack may include a plurality of digital images all associated with a first exposure time during an ambient capture, where each digital image is associated with a different ISO or light sensitivity. Further, a flash image stack 20-732 may also be generated to include each of a flash digital image at EV−1 exposure, a flash digital image at EV0 exposure, and a flash digital image at EV+1 exposure. However, the flash image stack 20-732 may be associated with a second analog storage plane captured at a second exposure time during which a strobe or flash was activated, such as the flash image stack 20-732(1) of FIG. 20-3. Thus, a flash image stack may include a second plurality of digital images all associated with a second exposure time during which a strobe or flash was activated, where each flash digital image is associated with a different ISO or light sensitivity.

After analog-to-digital units 20-722(0) and 20-722(1) generate the respective image stacks 20-732, the digital pixel data output by the analog-to-digital units 20-722(0) and 20-722(1) may be arranged together into a single sequence of digital images of increasing or decreasing exposure. In one embodiment, no two digital signals of the two image stacks may be associated with a same ISO+ exposure time combination, such that each digital image or instance of digital pixel data may be considered as having a unique effective exposure.

In one embodiment, and in the context of the foregoing figures, each of the indication points 20-1040-U, 20-1040-V, and 20-1040-W may be associated with digital images of an image stack 20-732, and each of the indication points 20-1040-X, 20-1040-Y, and 20-1040-Z may be associated with digital images of another image stack 20-732. For example, each the indication points 20-1040-U, 20-1040-V, and 20-1040-W may be associated with a different ambient digital image or ambient digital signal. Similarly, each of the indication points 20-1040-X, 20-1040-Y, and 20-1040-Z may be associated with a different flash digital image or flash digital signal. In such an embodiment, as the slider 20-1030 is moved from left to right along the track 20-1032, exposure and flash contribution of the combined image 20-1020 may appear to be adjusted or changed. Of course, when the slider 20-1030 is between two indication points along the track 20-1032, the combined image 20-1032 may be a combination of any two or more images of the two image stacks 20-732.

In another embodiment, the digital images or instances of digital pixel data output by the analog-to-digital units 20-722(0) and 20-722(1) may be arranged into a single sequence of digital images of increasing or decreasing exposure. In such an embodiment, the sequence may alternate between ambient and flash digital images. For example, for each of the digital images, gain and exposure time may be combined to determine an effective exposure of the digital image. The digital pixel data may be rapidly organized to obtain a single sequence of digital images of increasing effective exposure, such as, for example: 20-723(0), 20-723(1), 20-724(0), 20-724(1), 20-725(0), and 20-725(1). In such an organization, the sequence of digital images may alternate between flash digital images and ambient digital images. Of course, any sorting of the digital images or digital pixel data based on effective exposure level will depend on an order of application of the gains and generation of the digital signals 20-723-20-725.

In one embodiment, exposure times and gains may be selected or predetermined for generating a number of adequately different effective exposures. For example, where three gains are to be applied, then each gain may be selected to be two exposure stops away from a nearest selected gain. Further, a first exposure time may be selected to be one exposure stop away from a second exposure time. In such an embodiment, selection of three gains separated by two exposure stops, and two exposure times separated by one exposure stop, may ensure generation of six digital images, each having a unique effective exposure.

In another embodiment, exposure times and gains may be selected or predetermined for generating corresponding images of similar exposures between the ambient image stack and the flash image stack. For example, a first digital image of an ambient image stack may be generated utilizing an exposure time and gain combination that corresponds to an exposure time and gain combination utilized to generate a first digital image of a flash image stack. This may be done so that the first digital image of the ambient image stack has a similar effective exposure to that of the first digital image of the flash image stack, which may assist in adjusting a flash contribution in a combined image generated by blending the two digital images.

With continuing reference to the digital images of multiple image stacks sorted in a sequence of increasing exposure, each of the digital images may then be associated with indication points along the track 20-1032 of the UI system 20-1050. For example, the digital images may be sorted or sequenced along the track 20-1032 in the order of increasing effective exposure noted previously (20-723(0), 20-723(1), 20-724(0), 20-724(1), 20-725(0), and 20-725(1)) at indication points 20-1040-U, 20-1040-V, 20-1040-W, 20-1040-X, 20-1040-Y, and 20-1040-Z, respectively.

In such an embodiment, the slider control 20-1030 may then be positioned at any point along the track 20-1032 that is between two digital images generated based on two different analog storage planes, where each analog storage plane is associated with a different scene illumination. As a result, a digital image generated based on an analog storage plane associated with ambient illumination may then be blended with a digital image generated based on an analog storage plane associated with flash illumination to generate a combined image 20-1020. In this way, one or more images captured with ambient illumination may be blended with one or more images captured with flash illumination.

For example, the slider control 20-1030 may be positioned at an indication point that may be equally associated with digital pixel data 20-724(0) and digital pixel data 20-724(1). As a result, the digital pixel data 20-724(0), which may include a first digital image generated from an ambient analog signal captured during a first exposure time with ambient illumination and amplified utilizing a gain, may be blended with the digital pixel data 20-724(1), which may include a second digital image generated from a flash analog signal captured during a second exposure time with flash illumination and amplified utilizing the same gain, to generate a combined image 20-1020.

Still further, as another example, the slider control 20-1030 may be positioned at an indication point that may be equally associated with digital pixel data 20-724(1) and digital pixel data 20-725(0). As a result, the digital pixel data 20-724(1), which may include a first digital image generated from an ambient analog signal captured during a first exposure time with ambient illumination and amplified utilizing a first gain, may be blended with the digital pixel data 20-725(0), which may include a second digital image generated from a flash analog signal captured during a second exposure time with flash illumination and amplified utilizing a different gain, to generate a combined image 20-1020.

Thus, as a result of the slider control 20-1030 positioning, two or more digital signals may be blended, and the blended digital signals may be generated utilizing analog values from different analog storage planes. As a further benefit of sorting effective exposures along a slider, and then allowing blend operations based on slider control position, each pair of neighboring digital images may include a higher noise digital image and a lower noise digital image. For example, where two neighboring digital signals are amplified utilizing a same gain, the digital signal generated from an analog signal captured with a lower exposure time may have less noise. Similarly, where two neighboring digital signals are amplified utilizing different gains, the digital signal generated from an analog signal amplified with a lower gain value may have less noise. Thus, when digital signals are sorted based on effective exposure along a slider, a blend operation of two or more digital signals may serve to reduce the noise apparent in at least one of the digital signals.

Of course, any two or more effective exposures may be blended based on the indication point of the slider control 20-1030 to generate a combined image 20-1020 in the UI system 20-1050.

In one embodiment, a mix operation may be applied to a first digital image and a second digital image based upon at least one mix weight value associated with at least one of the first digital image and the second digital image. In one embodiment, a mix weight of 1.0 gives complete mix weight to a digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

A system of mix weights and mix operations provides a UI tool for viewing a first digital image, a second digital image, and a blended image as a gradual progression from the first digital image to the second digital image. In one embodiment, a user may save a combined image 20-1020 corresponding to an arbitrary position of the slider control 20-1030. The adjustment tool implementing the UI system 20-1000 may receive a command to save the combined image 20-1020 via any technically feasible gesture or technique. For example, the adjustment tool may be configured to save the combined image 20-1020 when a user gestures within the area occupied by combined image 20-1020. Alternatively, the adjustment tool may save the combined image 20-1020 when a user presses, but does not otherwise move the slider control 20-1030. In another implementation, the adjustment tool may save the combined image 20-1020 when a user gestures, such as by pressing a UI element (not shown), such as a save button, dedicated to receive a save command.

To this end, a slider control may be used to determine a contribution of two or more digital images to generate a final computed image, such as combined image 20-1020. Persons skilled in the art will recognize that the above system of mix weights and mix operations may be generalized to include two or more indication points, associated with two or more related images. Such related images may comprise, without limitation, any number of digital images that have been generated from two or more analog storage planes, and which may have zero, or near zero, interframe time.

Furthermore, a different continuous position UI control, such as a rotating knob, may be implemented rather than the slider 20-1030.

Figures 4C, 20:
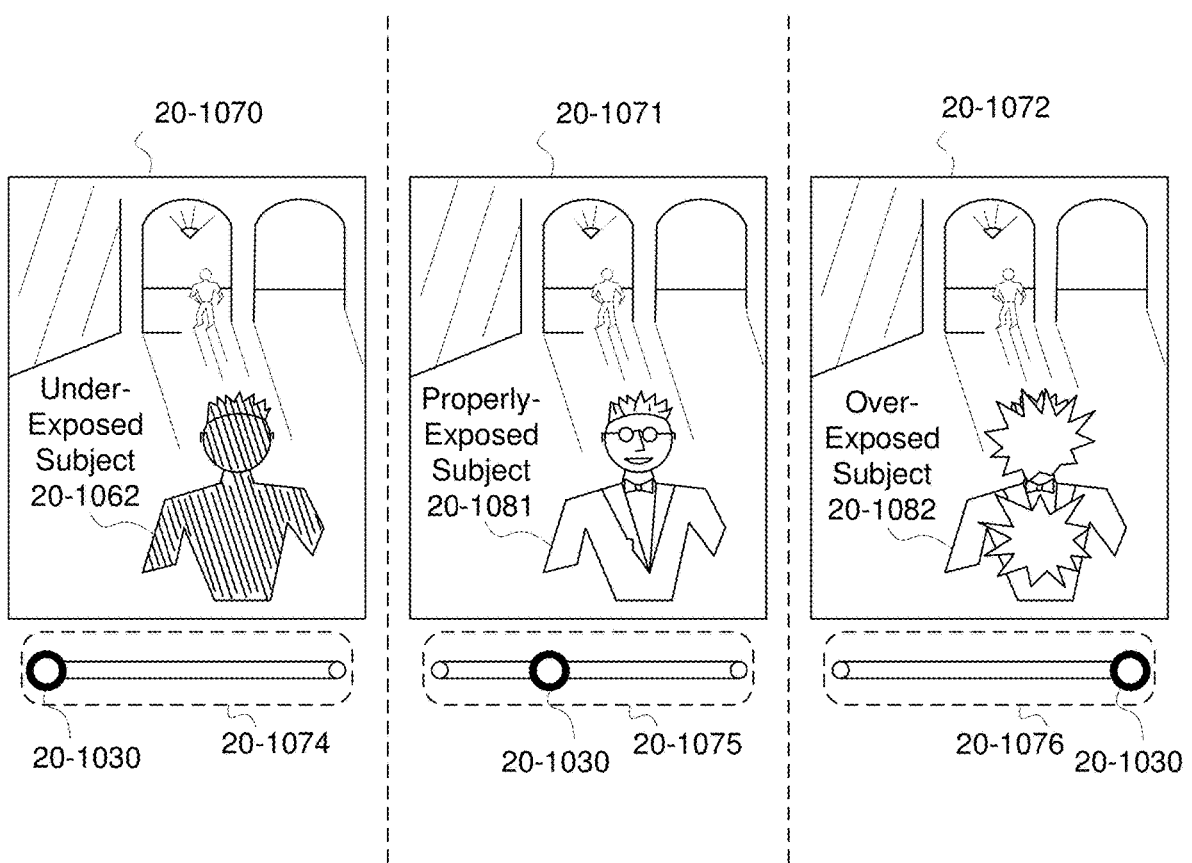

FIG. 20-4C illustrates user interface (UI) systems displaying combined images 20-1070-20-1072 with differing levels of strobe exposure, according to one embodiment. As an option, the UI systems of FIG. 20-4C may be implemented in the context of the details of any of the Figures disclosed herein. Of course, however, the UI systems be implemented in any desired environment. Further, the aforementioned definitions may equally apply to the description below.

As shown in FIG. 20-4C, a blended image may be blended from two or more images based on a position of slider control 20-1030. As shown, the slider control 20-1030 is configured to select one or more source images for input to a blending operation, where the source images are associated with increasing strobe intensity as the slider control 20-1030 moves from left to right.

For example, based on the position of slider control 20-1030 in control region 20-1074, first blended image 20-1070 may be generated utilizing one or more source images captured without strobe or flash illumination. As a specific example, the first blended image 20-1070 may be generated utilizing one or more images captured using only ambient illumination. The one or more images captured using only ambient illumination may comprise an image stack 20-732, such as the ambient image stack 20-732(0). As shown, the first blended image 20-1070 includes an under-exposed subject 20-1062. Further, based on the position of slider control 20-1030 in control region 20-1076, third blended image 20-1072 may be generated utilizing one or more source images captured using strobe or flash illumination. The one or more source images associated with the position of slider control 20-1030 in the control region 20-1076 may comprise an image stack 20-732, such as the flash image stack 20-732(1). As shown, the third blended image 20-1072 includes an over-exposed subject 20-1082

By manipulating the slider control 20-1030, a user may be able to adjust the contribution of the source images used to generate the blended image. Or, in other words, the user may be able to adjust the blending of one or more images. For example, the user may be able to adjust or increase a flash contribution from the one or more source images captured using strobe or flash illumination. As illustrated in FIG. 20-4C, when a user positions the slider control 20-1030 along a track away from track end points, as shown in control region 20-1075, a flash contribution from the one or more source images captured using strobe or flash illumination may be blended with the one or more source images captured using ambient illumination. This may result in the generation of second blended image 20-1071, which includes a properly exposed subject 20-1081. To this end, by blending digital images captured in ambient lighting conditions with digital images of the same photographic scene captured with strobe or flash illumination, novel digital images may be generated. Further, a flash contribution of the digital images captured with strobe or flash illumination may be adjustable by a user to ensure that both foreground subjects and background objects are properly exposed.

A determination of appropriate strobe intensity may be subjective, and embodiments disclosed herein advantageously enable a user to subjectively select a final combined image having a desired strobe intensity after a digital image has been captured. In practice, a user is able to capture what is apparently a single photograph by asserting a single shutter-release. The single shutter-release may cause capture of a set of ambient samples to a first analog storage plane during a first exposure time, and capture of a set of flash samples to a second analog storage plane during a second exposure time that immediately follows the first exposure time. The ambient samples may comprise an ambient analog signal that is then used to generate multiple digital images of an ambient image stack. Further, the flash samples may comprise a flash analog signal that is then used to generate multiple digital images of a flash image stack. By blending two or more images of the ambient image stack and the flash image stack, the user may thereby identify a final combined image with desired strobe intensity. Further, both the ambient image stack and the flash image stack may be stored, such that the user can select the final combined image at a later time.

In other embodiments, two or more slider controls may be presented in a UI system. For example, in one embodiment, a first slider control may be associated with digital images of an ambient image stack, and a second slider control may be associated with digital images of a flash image stack. By manipulating the slider controls independently, a user may control a blending of ambient digital images independently from blending of flash digital images. Such an embodiment may allow a user to first select a blending of images from the ambient image stack that provides a preferred exposure of background objects. Next, the user may then select a flash contribution. For example, the user may select a blending of images from the flash image stack that provides a preferred exposure of foreground objects. Thus, by allowing for independent selection of ambient contribution and flash contribution, a final blended or combined image may include properly exposed foreground objects as well as properly exposed background objects.

In another embodiment, a desired exposure for one or more given regions of a blended image may be identified by a user selecting another region of the blended image. For example, the other region selected by the user may be currently displayed at a proper exposure within a UI system while the one or more given regions are currently under-exposed or over-exposed. In response to the user's selection of the other region, a blending of source images from an ambient image stack and a flash image stack may be identified to provide the proper exposure at the one or more given regions of the blended image. The blended image may then be updated to reflect the identified blending of source images that provides the proper exposure at the one or more given regions.

In another embodiment, images of a given image stack may be blended before performing any blending operations with images of a different image stack. For example, two or more ambient digital images or ambient digital signals, each with a unique light sensitivity, may be blended to generate a blended ambient digital image with a blended ambient light sensitivity. Further, the blended ambient digital image may then be subsequently blended with one or more flash digital images or flash digital signals. The blending with the one or more flash digital images may be in response to user input. In another embodiment, two or more flash digital images may be blended to generate a blended flash digital image with a blended flash light sensitivity, and the blended flash digital image may then be blended with the blended ambient digital image.

As another example, two or more flash digital images or flash digital signals, each with a unique light sensitivity, may be blended to generate a blended flash digital image with a blended flash light sensitivity. Further, the blended flash digital image may then be subsequently blended with one or more ambient digital images or ambient digital signals. The blending with the one or more ambient digital images may be in response to user input. In another embodiment, two or more ambient digital images may be blended to generate a blended ambient digital image with a blended ambient light sensitivity, and the blended ambient digital image may then be blended with the blended flash digital image.

In one embodiment, the ambient image stack may include digital images at different effective exposures than the digital images of the flash image stack. This may be due to application of different gain values for generating each of the ambient image stack and the flash image stack. For example, a particular gain value may be selected for application to an ambient analog signal, but not for application to a corresponding flash analog signal.

As shown in FIG. 18-8, a wireless mobile device 18-376 (0) generates at least two digital images. In one embodiment, the at least two digital images may be generated by amplifying analog values of two or more analog storage planes, where each generated digital image may correspond to digital output of an applied gain. In one embodiment, a first digital image may include an EV−1 exposure of a photographic scene, and a second digital image may include an EV+1 exposure of the photographic scene. In another embodiment, the at least two digital images may include an EV−2 exposure of a photographic scene, an EV0 exposure of the photographic scene, and an EV+2 exposure of the photographic scene. In yet another embodiment, the at least two digital images may comprise one or more image stacks. For example, the at least two digital images may comprise an ambient image stack and/or a flash image stack.

With respect to FIG. 18-8, user manipulation of the slider control may adjust a flash contribution of one or more source images captured with strobe or flash illumination.

One advantage of the present invention is that a digital photograph may be selectively generated based on user input using two or more different images generated from a single exposure of a photographic scene. Accordingly, the digital photograph generated based on the user input may have a greater dynamic range than any of the individual images. Additionally, a user may selectively adjust a flash contribution of the different images to the generated digital photograph. Further, the generation of an HDR image using two or more different images with zero, or near zero, interframe time allows for the rapid generation of HDR images without motion artifacts.

Additionally, when there is any motion within a photographic scene, or a capturing device experiences any jitter during capture, any interframe time between exposures may result in a motion blur within a final merged HDR photograph. Such blur can be significantly exaggerated as interframe time increases. This problem renders current HDR photography an ineffective solution for capturing clear images in any circumstance other than a highly static scene. Further, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 21:
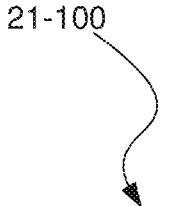
Figure 1:
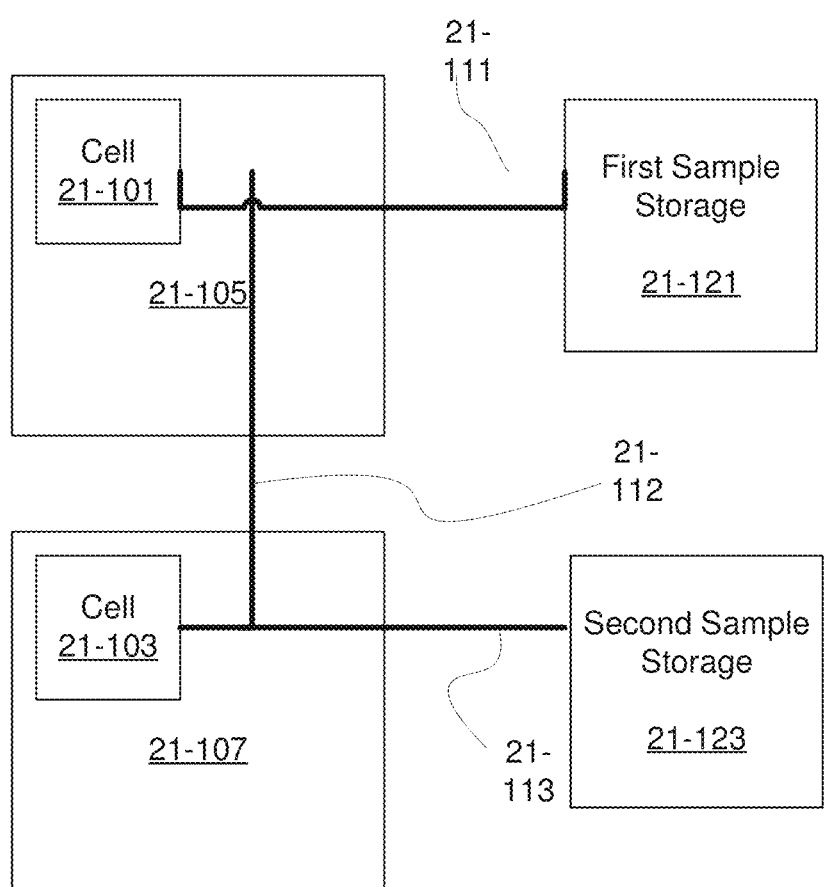
Figures 2, 21:
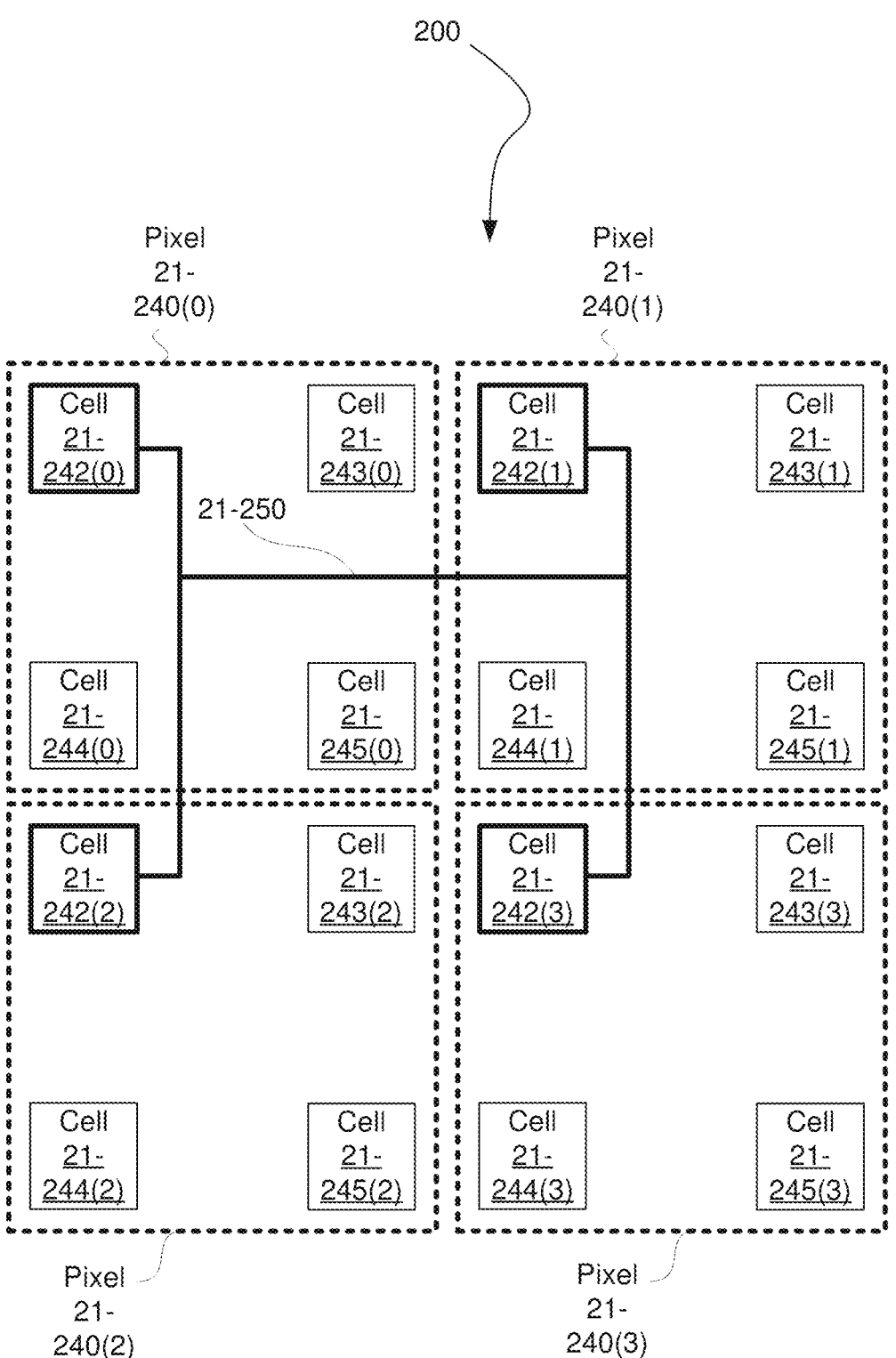
Figures 3A, 21:
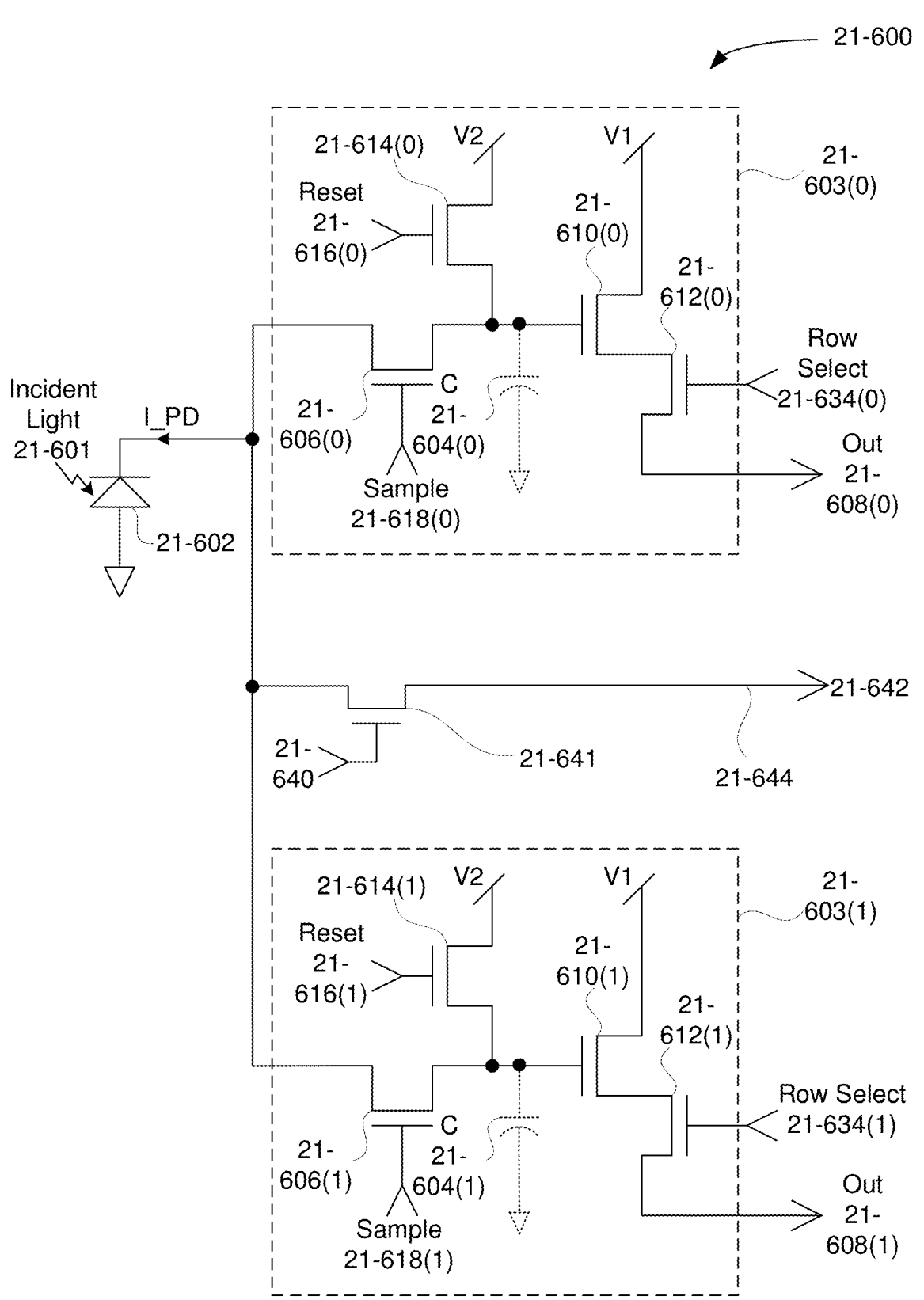
Figures 3B, 21:
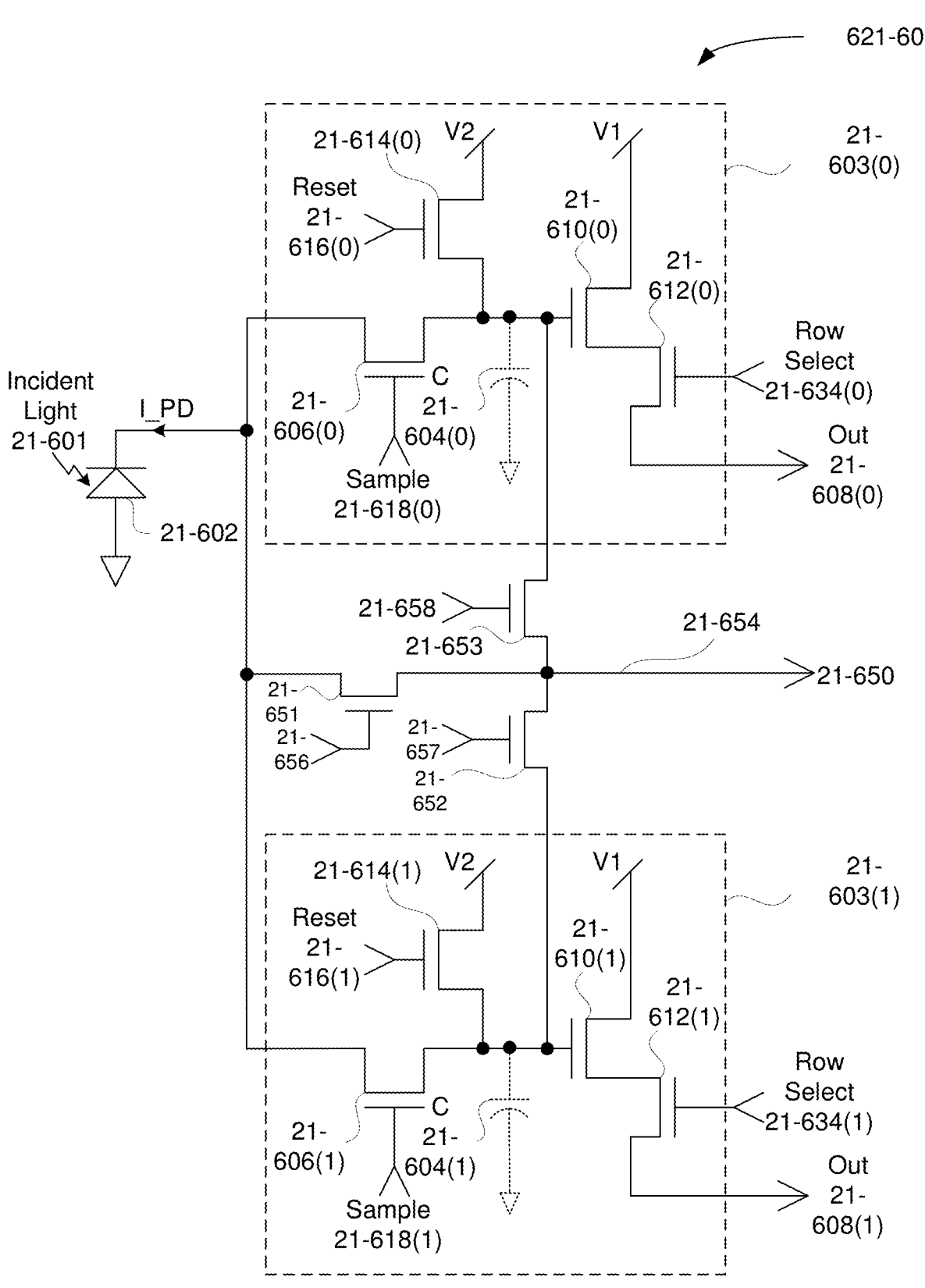
Figures 3C, 21:
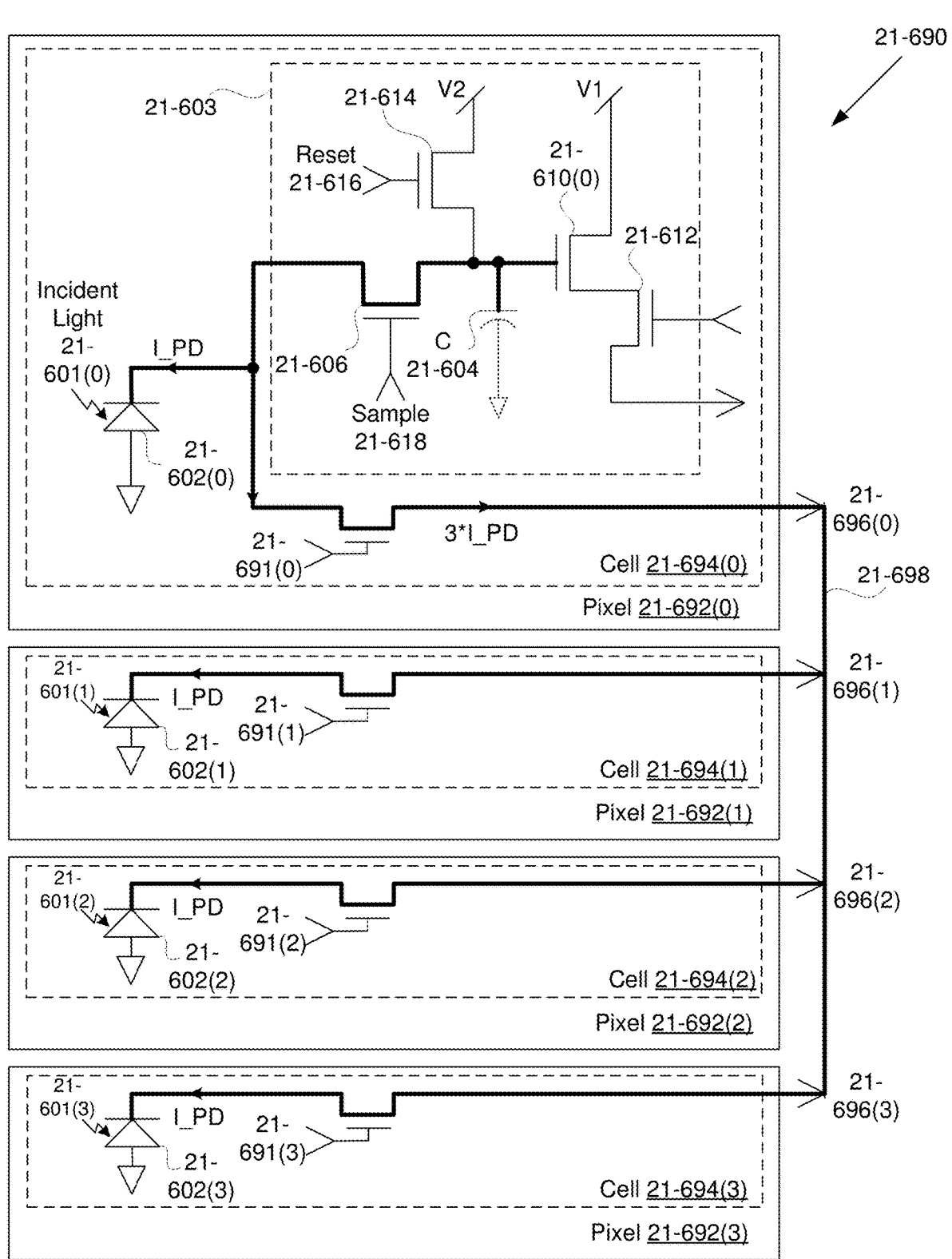
Figure 21:
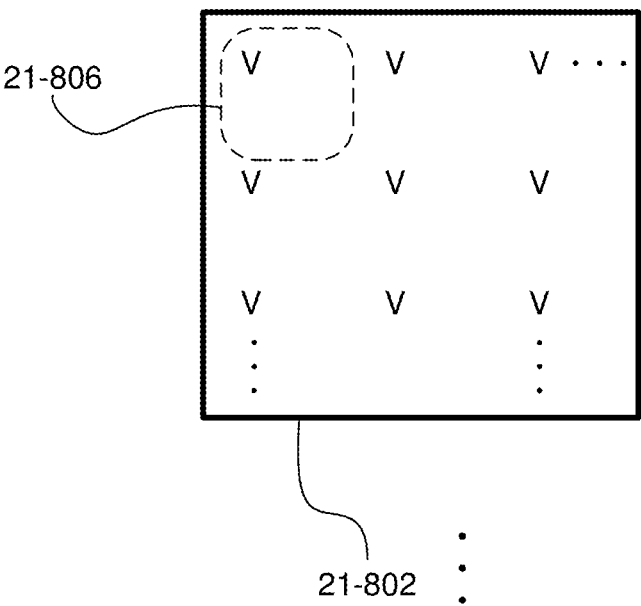
Figure 4:
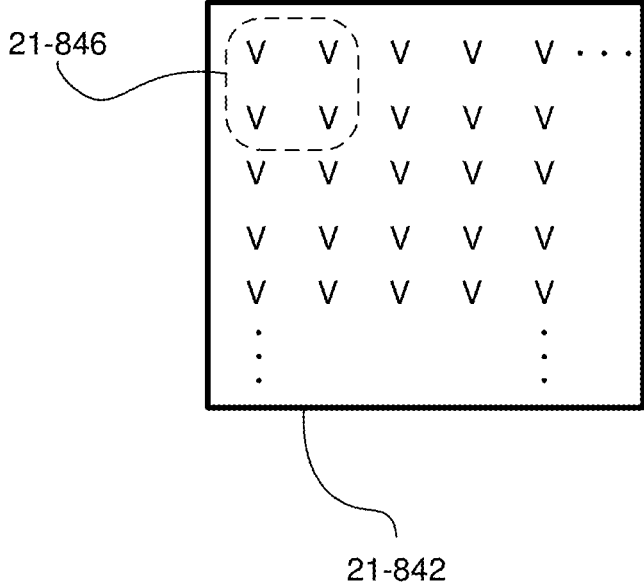
Figures 5, 21:
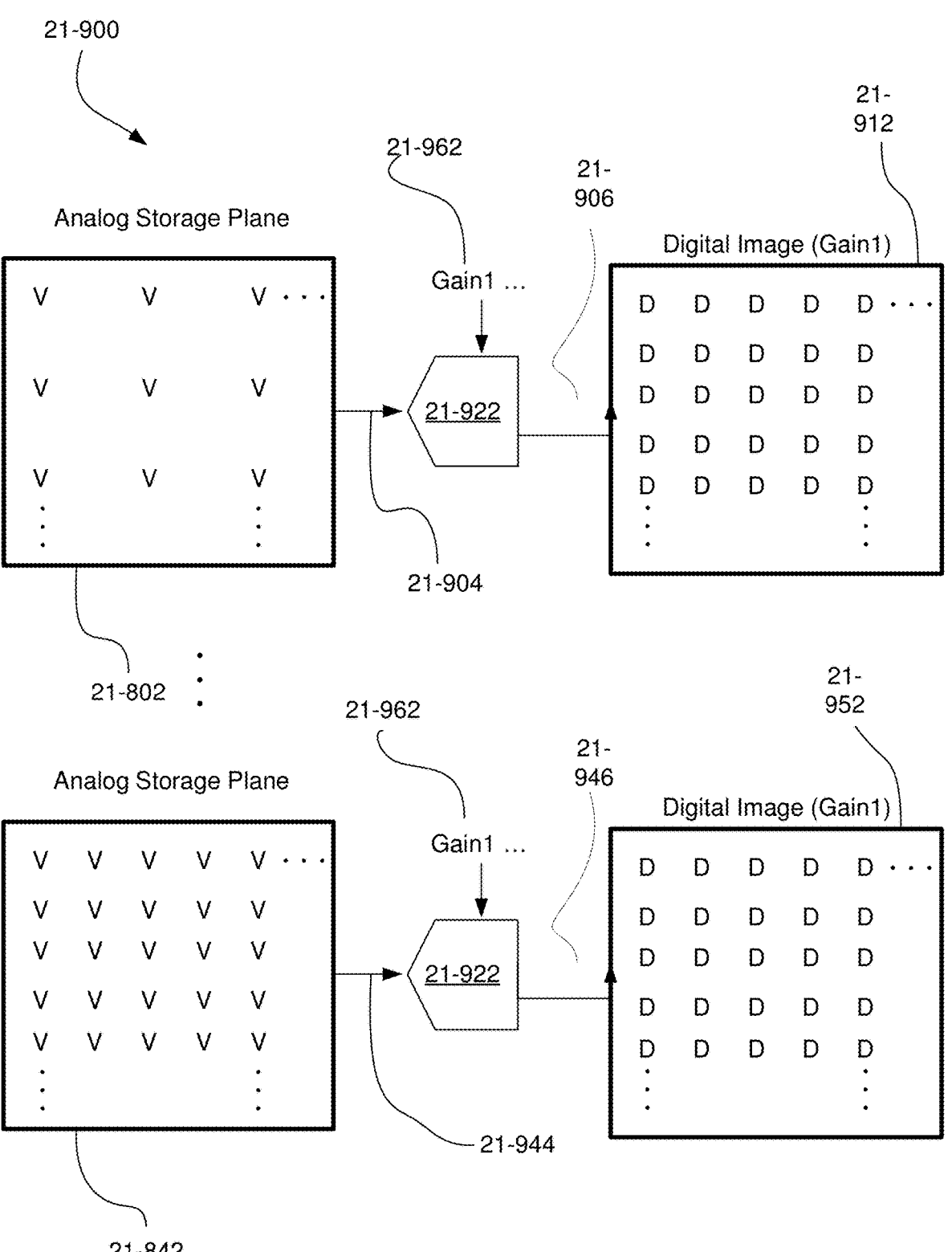

FIG. 21-1 illustrates a system 21-100 for obtaining low-noise, high-speed captures of a photographic scene, in accordance with one embodiment. As an option, the system 21-100 may be implemented in the context of any of the Figures disclosed herein. Of course, however, the system 21-100 may be implemented in any desired environment. Further, the aforementioned definitions may equally apply to the description below.

As shown in FIG. 21-1, the system 21-100 includes a first pixel 21-105, a second pixel 21-107, a first sample storage node 21-121, and a second sample storage node 21-123. Further, the first pixel 21-105 is shown to include a first cell 21-101, and the second pixel 21-107 is shown to include a second cell 21-103. In one embodiment, each pixel may include one or more cells. For example, in some embodiments, each pixel may include four cells. Further, each of the cells may include a photodiode, photosensor, or any photo-sensing electrical element. A photodiode may comprise any semiconductor diode that generates a potential difference, current, or changes its electrical resistance, in response to photon absorption. Accordingly, a photodiode may be used to detect or measure a light intensity.

Referring again to FIG. 21-1, the first cell 21-101 and first sample storage node 21-121 are in communication via interconnect 21-111, the second cell 21-103 and the second sample storage node 21-123 are in communication via interconnect 21-113, and the first cell 21-101 and the second cell 21-103 are in communication via interconnect 21-112.

Each of the interconnects 21-111-21-113 may carry an electrical signal from one or more cells to a sample storage node. For example, the interconnect 21-111 may carry an electrical signal from the cell 21-101 to the first sample storage node 21-121. The interconnect 21-113 may carry an electrical signal from the cell 21-103 to the second sample storage node 21-123. Further, the interconnect 21-112 may carry an electrical signal from the cell 21-103 to the first sample storage node 21-121, or may carry an electrical signal from the cell 21-101 to the second sample storage node 21-123. In such embodiments, the interconnect 21-112 may enable a communicative coupling between the first cell 21-101 and the second cell 21-103. Further, in some embodiments, the interconnect 21-112 may be operable to be selectively enabled or disabled. In such embodiments, the interconnect 21-112 may be selectively enabled or disable using one or more transistors and/or control signals.

In one embodiment, each electrical signal carried by the interconnects 21-111-113 may include a photodiode current. For example, each of the cells 21-101 and 21-103 may include a photodiode. Each of the photodiodes of the cells 21-101 and 21-103 may generate a photodiode current which is communicated from the cells 21-101 and 21-103 via the interconnects 21-111-113 to one or more of the sample storage nodes 21-121 and 21-123. In configurations where the interconnect 21-112 is disabled, the interconnect 21-113 may communicate a photodiode current from the cell 21-103 to the second sample storage node 21-123, and, similarly, the interconnect 21-111 may communicate a photodiode current from the cell 21-101 to the first sample storage node 21-121. However, in configurations where the interconnect 21-112 is enabled, both the cell 21-101 and the cell 21-103 may communicate a photodiode current to the first sample storage node 21-121 and the second sample storage node 21-123.

Of course, each sample storage node may be operative to receive any electrical signal from one or more communicatively coupled cells, and then store a sample based upon the received electrical signal. In some embodiments, each sample storage node may be configured to store two or more samples. For example, the first sample storage node 21-121 may store a first sample based on a photodiode current from the cell 21-101, and may separately store a second sample based on, at least in part, a photodiode current from the cell 21-103.

In one embodiment, each sample storage node includes a charge storing device for storing a sample, and the sample stored at a given storage node may be a function of a light intensity detected at one or more associated photodiodes. For example, the first sample storage node 21-121 may store a sample as a function of a received photodiode current, which is generated based on a light intensity detected at a photodiode of the cell 21-101. Further, the second sample storage node 21-123 may store a sample as a function of a received photodiode current, which is generated based on a light intensity detected at a photodiode of the cell 21-103. As yet another example, when the interconnect 21-112 is enabled, the first sample storage node 21-121 may receive a photodiode current from each of the cells 21-101 and 21-103, and the first sample storage node 21-121 may thereby store a sample as a function of both the light intensity detected at the photodiode of the cell 21-101 and the light intensity detected at the photodiode of the cell 21-103.

In one embodiment, each sample storage node may include a capacitor for storing a charge as a sample. In such an embodiment, each capacitor stores a charge that corresponds to an accumulated exposure during an exposure time or sample time. For example, current received at each capacitor from one or more associated photodiodes may cause the capacitor, which has been previously charged, to discharge at a rate that is proportional to incident light intensity detected at the one or more photodiodes. The remaining charge of each capacitor may be referred to as a value or analog value, and may be subsequently output from the capacitor. For example, the remaining charge of each capacitor may be output as an analog value that is a function of the remaining charge on the capacitor. In one embodiment, via the interconnect 21-112, the cell 21-101 may be communicatively coupled to one or more capacitors of the first sample storage node 21-121, and the cell 21-103 may also be communicatively coupled to one or more capacitors of the first sample storage node 21-121.

In some embodiments, each sample storage node may include circuitry operable for receiving input based on one or more photodiodes. For example, such circuitry may include one or more transistors. The one or more transistors may be configured for rendering the sample storage node responsive to various control signals, such as sample, reset, and row select signals received from one or more controlling devices or components. In other embodiments, each sample storage node may include any device for storing any sample or value that is a function of a light intensity detected at one or more associated photodiode. In some embodiments, the interconnect 21-112 may be selectively enabled or disabled using one or more associated transistors. Accordingly, the cell 21-101 and the cell 21-103 may be in communication utilizing a communicative coupling that includes at least one transistor. In embodiments where each of the pixels 21-105 and 21-107 include additional cells (not shown), the additional cells may not be communicatively coupled to the cells 21-101 and 21-103 via the interconnect 21-112.

In various embodiments, the pixels 21-105 and 21-107 may be two pixels of an array of pixels of an image sensor. Each value stored at a sample storage node may include an electronic representation of a portion of an optical image that has been focused on the image sensor that includes the pixels 21-105 and 21-107. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. Such an image sensor may comprise a complementary metal oxide semiconductor (CMOS) image sensor, or charge-coupled device (CCD) image sensor, or any other technically feasible form of image sensor.

FIG. 21-2 illustrates a system 21-200 for obtaining low-noise, high-speed captures of a photographic scene, in accordance with another embodiment. As an option, the system 21-200 may be implemented in the context of any of the Figures disclosed herein. Of course, however, the system 21-200 may be implemented in any desired environment. Further, the aforementioned definitions may equally apply to the description below.

As shown in FIG. 21-2, the system 21-200 includes a plurality of pixels 21-240. Specifically, the system 21-200 is shown to include pixels 21-240(0), 21-240(1), 21-240(2), and 21-240(3). Each of the pixels 21-240 may be substantially identical with respect to composition and configuration. Further, each of the pixels 21-240 may be a single pixel of an array of pixels comprising an image sensor. To this end, each of the pixels 21-240 may comprise hardware that renders the pixel operable to detect or measure various wavelengths of light, and convert the measured light into one or more electrical signals for rendering or generating one or more digital images. Each of the pixels 21-240 may be substantially identical to the pixel 21-105 or the pixel 21-107 of FIG. 21-1.

Further, each of the pixels 21-240 is shown to include a cell 21-242, a cell 21-243, a cell 21-244 and a cell 21-245. In one embodiment, each of the cells 21-242-245 includes a photodiode operative to detect and measure one or more peak wavelengths of light. For example, each of the cells 21-242 may be operative to detect and measure red light, each of the cells 21-243 and 21-244 may be operative to detect and measure green light, and each of the cells 21-245 may be operative to detect and measure blue light. In other embodiments, a photodiode may be configured to detect wavelengths of light other than only red, green, or blue. For example, a photodiode may be configured to detect white, cyan, magenta, yellow, or non-visible light such as infrared or ultraviolet light. Any communicatively coupled cells may be configured to detect a same peak wavelength of light.

In various embodiments, each of the cells 21-242-21-245 may generate an electrical signal in response to detecting and measuring its associated one or more peak wavelengths of light. In one embodiment, each electrical signal may include a photodiode current. A given cell may generate a photodiode current which is sampled by a sample storage node for a selected sample time or exposure time, and the sample storage node may store an analog value based on the sampling of the photodiode current. Of course, as noted previously, each sample storage node may be capable of concurrently storing more than one analog value.

As shown in FIG. 21-2, each of the cells 21-242 are communicatively coupled via an interconnect 21-250. In one embodiment, the interconnect 21-250 may be enabled or disabled using one or more control signals. When the interconnect 21-250 is enabled, the interconnect may carry a combined electrical signal. The combined electrical signal may comprise a combination of electrical signals output from each of the cells 21-242. For example, the combined electrical signal may comprise a combined photodiode current, where the combined photodiode current includes photodiode current received from photodiodes of each of the cells 21-242. Thus, enabling the interconnect 21-250 may serve to increase a combined photodiode current generated based on one or more peak wavelengths of light. In some embodiments, the combined photodiode current may be used to more rapidly store an analog value at a sample storage node than if a photodiode current generated by only a single cell was used to store the analog value. To this end, the interconnect 21-250 may be enabled to render the pixels 21-240 of an image sensor more sensitive to incident light. Increasing the sensitivity of an image sensor may allow for more rapid capture of digital images in low light conditions, capture of digital images with reduced noise, and/or capture of brighter or better exposed digital images in a given exposure time.

The embodiments disclosed herein may advantageously enable a camera module to sample images to have less noise, less blur, and greater exposure in low-light conditions than conventional techniques. In certain embodiments, images may be effectively sampled or captured simultaneously, which may reduce inter-sample time to, or near, zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 21-3A illustrates a circuit diagram for a photosensitive cell 21-600, in accordance with one possible embodiment. As an option, the cell 21-600 may be implemented in the context of any of the Figures disclosed herein. Of course, however, the cell 21-600 may be implemented in any desired environment. Further, the aforementioned definitions may equally apply to the description below.

As shown in FIG. 21-3A, a photosensitive cell 21-600 includes a photodiode 21-602 coupled to a first analog sampling circuit 21-603(0) and a second analog sampling circuit 21-603(1). The photodiode 21-602 may be implemented as a photodiode of a cell 21-101 described within the context of FIG. 21-1, or any of the photodiodes 18-562 of FIG. 18-3E. In one embodiment, a unique instance of a photosensitive cell 21-600 may be implemented as any of cells 21-242-21-245 within the context of FIG. 21-2, or any of cells 18-542-18-545 within the context of FIGS. 18-3A-18-5E. Further, the first analog sampling circuit 21-603(0) and the second analog sampling circuit 21-603(1) may separately, or in combination, comprise a sample storage node, such as one of the sample storage nodes 21-121 or 21-123 of FIG. 21-1.

As shown, the photosensitive cell 21-600 comprises two analog sampling circuits 21-603, and a photodiode 21-602. The two analog sampling circuits 21-603 include a first analog sampling circuit 21-603(0) which is coupled to a second analog sampling circuit 21-603(1). As shown in FIG. 21-3A, the first analog sampling circuit 21-603(0) comprises transistors 21-606(0), 21-610(0), 21-612(0), 21-614(0), and a capacitor 21-604(0); and the second analog sampling circuit 21-603(1) comprises transistors 21-606(1), 21-610 (1), 21-612(1), 21-614(1), and a capacitor 21-604(1). In one embodiment, each of the transistors 21-606, 21-610, 21-612, and 21-614 may be a field-effect transistor.

The photodiode 21-602 may be operable to measure or detect incident light 21-601 of a photographic scene. In one embodiment, the incident light 21-601 may include ambient light of the photographic scene. In another embodiment, the incident light 21-601 may include light from a strobe unit utilized to illuminate the photographic scene. Of course, the incident light 21-601 may include any light received at and measured by the photodiode 21-602. Further still, and as discussed above, the incident light 21-601 may be concentrated on the photodiode 21-602 by a microlens, and the photodiode 21-602 may be one photodiode of a photodiode array that is configured to include a plurality of photodiodes arranged on a two-dimensional plane.

In one embodiment, the analog sampling circuits 21-603 may be substantially identical. For example, the first analog sampling circuit 21-603(0) and the second analog sampling circuit 21-603(1) may each include corresponding transistors, capacitors, and interconnects configured in a substantially identical manner. Of course, in other embodiments, the first analog sampling circuit 21-603(0) and the second analog sampling circuit 21-603(1) may include circuitry, transistors, capacitors, interconnects and/or any other components or component parameters (e.g. capacitance value of each capacitor 21-604) which may be specific to just one of the analog sampling circuits 21-603.

In one embodiment, each capacitor 21-604 may include one node of a capacitor comprising gate capacitance for a transistor 21-610 and diffusion capacitance for transistors 21-606 and 21-614. The capacitor 21-604 may also be coupled to additional circuit elements (not shown) such as, without limitation, a distinct capacitive structure, such as a metal-oxide stack, a poly capacitor, a trench capacitor, or any other technically feasible capacitor structures.

The cell 21-600 is further shown to include an interconnect 21-644 between the analog sampling circuit 21-603(0) and the analog sampling circuit 21-603(1). The interconnect 21-644 includes a transistor 21-641, which comprises a gate 21-640 and a source 21-642. A drain of the transistor 21-641 is coupled to each of the analog sampling circuit 21-603(0) and the analog sampling circuit 21-603(1). When the gate 21-640 is turned off, the cell 21-600 may operate in isolation. When operating in isolation, the cell 21-600 may operate in a manner whereby the photodiode 21-602 is sampled by one or both of the analog sampling circuits 21-603 of the cell 21-600. For example, the photodiode 21-602 may be sampled by the analog sampling circuit 21-603(0) and the analog sampling circuit 21-603(1) in a concurrent manner, or the photodiode 21-602 may be sampled by the analog sampling circuit 21-603(0) and the analog sampling circuit 21-603(1) in a sequential manner. In alternative embodiments, the drain terminal of transistor 21-641 is coupled to interconnect 21-644 and the source terminal of transistor 21-641 is coupled to the sampling circuits 21-603 and the photodiode 21-602.

With respect to analog sampling circuit 21-603(0), when reset 21-616(0) is active (low), transistor 21-614(0) provides a path from voltage source V2 to capacitor 21-604(0), causing capacitor 21-604(0) to charge to the potential of V2. When sample signal 21-618(0) is active, transistor 21-606 (0) provides a path for capacitor 21-604(0) to discharge in proportion to a photodiode current (I_PD) generated by the photodiode 21-602 in response to the incident light 21-601. In this way, photodiode current I_PD is integrated for a first exposure time when the sample signal 21-618(0) is active, resulting in a corresponding first voltage on the capacitor 21-604(0). This first voltage on the capacitor 21-604(0) may also be referred to as a first sample. When row select 21-634(0) is active, transistor 21-612(0) provides a path for a first output current from V1 to output 21-608(0). The first output current is generated by transistor 21-610(0) in response to the first voltage on the capacitor 21-604(0). When the row select 21-634(0) is active, the output current at the output 21-608(0) may therefore be proportional to the integrated intensity of the incident light 21-601 during the first exposure time.

With respect to analog sampling circuit 21-603(1), when reset 21-616(1) is active (low), transistor 21-614(1) provides a path from voltage source V2 to capacitor 21-604(1), causing capacitor 21-604(1) to charge to the potential of V2. When sample signal 21-618(1) is active, transistor 21-606 (1) provides a path for capacitor 21-604(1) to discharge in proportion to a photodiode current (I_PD) generated by the photodiode 21-602 in response to the incident light 21-601. In this way, photodiode current I_PD is integrated for a second exposure time when the sample signal 21-618(1) is active, resulting in a corresponding second voltage on the capacitor 21-604(1). This second voltage on the capacitor 21-604(1) may also be referred to as a second sample. When row select 21-634(1) is active, transistor 21-612(1) provides a path for a second output current from V1 to output

21-608(1). The second output current is generated by transistor 21-610(1) in response to the second voltage on the capacitor 21-604(1). When the row select 21-634(1) is active, the output current at the output 21-608(1) may therefore be proportional to the integrated intensity of the incident light 21-601 during the second exposure time.

As noted above, when the cell 21-600 is operating in an isolation mode, the photodiode current I_PD of the photodiode 21-602 may be sampled by one of the analog sampling circuits 21-603 of the cell 21-600; or may be sampled by both of the analog sampling circuits 21-603 of the cell 21-600, either concurrently or sequentially. When both the sample signal 21-618(0) and the sample signal 21-618(1) are activated simultaneously, the photodiode current I_PD of the photodiode 21-602 may be sampled by both analog sampling circuits 21-603 concurrently, such that the first exposure time and the second exposure time are, at least partially, overlapping.

When the sample signal 21-618(0) and the sample signal 21-618(1) are activated sequentially, the photodiode current I_PD of the photodiode 21-602 may be sampled by the analog sampling circuits 21-603 sequentially, such that the first exposure time and the second exposure time do not overlap.

In various embodiments, when the gate 21-640 is turned on, the cell 21-600 may be thereby communicatively coupled to one or more other instances of cell 21-600 of other pixels via the interconnect 21-644. In one embodiment, when two or more cells 21-600 are coupled together, the two or more corresponding instances of photodiode 21-602 may collectively provide a shared photodiode current on the interconnect 21-644. In such an embodiment, one or more analog sampling circuits 21-603 of the two instances of cell 21-600 may sample the shared photodiode current. For example, in one embodiment, a single sample signal 21-618(0) may be activated such that a single analog sampling circuit 21-603 samples the shared photodiode current. In another embodiment two instances of a sample signal 21-618(0), each associated with a different cell 21-600, may be activated to sample the shared photodiode current, such that two analog sampling circuits 21-603 of two different cells 21-600 sample the shared photodiode current. In yet another embodiment, both of a sample signal 21-618(0) and 21-618(1) of a single cell 21-600 may be activated to sample the shared photodiode current, such that two analog sampling circuits 21-603(0) and 21-603(1) of one of the cells 21-600 sample the shared photodiode current, and neither of the analog sampling circuits 21-603 of the other cell 21-600 sample the shared photodiode current.

In a specific example, two instances of cell 21-600 may be coupled via the interconnect 21-644. Each instance of the cell 21-600 may include a photodiode 21-602 and two analog sampling circuits 21-603. In such an example, the two photodiodes 21-602 may be configured to provide a shared photodiode current to one, two, three, or all four of the analog sampling circuits 21-603 via the interconnect 21-644. If the two photodiodes 21-602 detect substantially identical quantities of light, then the shared photodiode current may be twice the magnitude that any single photodiode current would be from a single one of the photodiodes 21-602. Thus, this shared photodiode current may otherwise be referred to as a 2× photodiode current. If only one analog sampling circuit 21-603 is activated to sample the 2× photodiode current, the analog sampling circuit 21-603 may effectively sample the 2× photodiode current twice as fast for a given exposure level as the analog sampling circuit

21-603 would sample a photodiode current received from a single photodiode 21-602. Further, if only one analog sampling circuit 21-603 is activated to sample the 2× photodiode current, the analog sampling circuit 21-603 may be able to obtain a sample twice as bright as the analog sampling circuit 21-603 would obtain by sampling a photodiode current received from a single photodiode 21-602 for a same exposure time. However, in such an embodiment, because only a single analog sampling circuit 21-603 of the two cells 21-600 actively samples the 2× photodiode current, one of the cells 21-600 does not store any analog value representative of the 2× photodiode current. Accordingly, when a 2× photodiode current is sampled by only a subset of corresponding analog sampling circuits 21-603, image resolution may be reduced in order to increase a sampling speed or sampling sensitivity.

In one embodiment, communicatively coupled cells 21-600 may be located in a same row of pixels of an image sensor. In such an embodiment, sampling with only a subset of communicatively coupled analog sampling circuits 21-603 may reduce an effective horizontal resolution of the image sensor by ½. In another embodiment, communicatively coupled cells 21-600 may be located in a same column of pixels of an image sensor. In such an embodiment, sampling with only a subset of communicatively coupled analog sampling circuits 21-603 may reduce an effective vertical resolution of the image sensor by ½.

In another embodiment, an analog sampling circuit 21-603 of each of the two cells 21-600 may be simultaneously activated to concurrently sample the 2× photodiode current. In such an embodiment, because the 2× photodiode current is shared by two analog sampling circuits 21-603, sampling speed and sampling sensitivity may not be improved in comparison to a single analog sampling circuit 21-603 sampling a photodiode current of a single photodiode 21-602. However, by sharing the 2× photodiode current over the interconnect 21-644 between the two cells 21-600, and then sampling the 2× photodiode current using an analog sampling circuit 21-603 in each of the cells 21-600, the analog values sampled by each of the analog sampling circuits 21-603 may be effectively averaged, thereby reducing the effects of any noise present in a photodiode current output by either of the coupled photodiodes 21-602.

In yet another example, two instances of cell 21-600 may be coupled via the interconnect 21-644. Each instance of the cell 21-600 may include a photodiode 21-602 and two analog sampling circuits 21-603. In such an example, the two photodiodes 21-602 may be configured to provide a shared photodiode current to one, two, three, or all four of the analog sampling circuits 21-603 via the interconnect 21-644. If the two photodiodes 21-602 detect substantially identical quantities of light, then the shared photodiode current may be twice the magnitude that any single photodiode current would be from a single one of the photodiodes 21-602. Thus, this shared photodiode current may otherwise be referred to as a 2× photodiode current. Two analog sampling circuits 21-603 of one of the cells 21-600 may be simultaneously activated to concurrently sample the 2× photodiode current in a manner similar to that described hereinabove with respect to the analog sampling circuits 21-603(0) and 21-603(1) sampling the photodiode current I_PD of the photodiode 21-602 in isolation. In such an embodiment, two analog storage planes may be populated with analog values at a rate that is 2× faster than if the analog sampling circuits 21-603(0) and 21-603(1) received a photodiode current from a single photodiode 21-602.

In another embodiment including two instances of cell 21-600 coupled via interconnect 21-644 for sharing a 2× photodiode current, such that four analog sampling circuits 21-603 may be simultaneously activated for a single exposure. In such an embodiment, the four analog sampling circuits 21-603 may concurrently sample the 2× photodiode current in a manner similar to that described hereinabove with respect to the analog sampling circuits 21-603(0) and 21-603(1) sampling the photodiode current I_PD of the photodiode 21-602 in isolation. In such an embodiment, the four analog sampling circuits 21-603 may be disabled sequentially, such that each of the four analog sampling circuits 21-603 stores a unique analog value representative of the 2× photodiode current. Thereafter, each analog value may be output in a different analog signal, and each analog signal may be amplified and converted to a digital signal comprising a digital image.

Thus, in addition to the 2× photodiode current serving to reduce noise in any final digital image, four different digital images may be generated for the single exposure, each with a different effective exposure and light sensitivity. These four digital images may comprise, and be processed as, an image stack. In other embodiments, the four analog sampling circuits 21-603 may be activated and deactivated together for sampling the 2× photodiode current, such that each of the analog sampling circuits 21-603 store a substantially identical analog value. In yet other embodiments, the four analog sampling circuits 21-603 may be activated and deactivated in a sequence for sampling the 2× photodiode current, such that no two analog sampling circuits 21-603 are actively sampling at any given moment.

Of course, while the above examples and embodiments have been described for simplicity in the context of two instances of a cell 21-600 being communicatively coupled via interconnect 21-644, more than two instances of a cell 21-600 may be communicatively coupled via the interconnect 21-644. For example, four instances of a cell 21-600 may be communicatively coupled via an interconnect 21-644. In such an example, eight different analog sampling circuits 21-603 may be addressable, in any sequence or combination, for sampling a 4× photodiode current shared between the four instances of cell 21-600. Thus, as an option, a single analog sampling circuit 21-603 may be able to sample the 4× photodiode current at a rate 4× faster than the analog sampling circuit 21-603 would be able to sample a photodiode current received from a single photodiode 21-602.

For example, an analog value stored by sampling a 4× photodiode current at a $\frac{1}{120}$ second exposure time may be substantially identical to an analog value stored by sampling a 1× photodiode current at a $\frac{1}{30}$ second exposure time. By reducing an exposure time required to sample a given analog value under a given illumination, blur may be reduced within a final digital image. Thus, sampling a shared photodiode current may effectively increase the ISO, or light sensitivity, at which a given photographic scene is sampled without increasing the noise associated with applying a greater gain.

As another option, the single analog sampling circuit 21-603 may be able to obtain, for a given exposure time, a sample 4× brighter than a sample obtained by sampling a photodiode current received from a single photodiode. Sampling a 4× photodiode current may allow for much more rapid sampling of a photographic scene, which may serve to reduce any blur present in a final digital image, to more quickly capture a photographic scene (e.g., ¼ exposure time), to increase the brightness or exposure of a final digital image, or any combination of the foregoing. Of course, sampling a 4× photodiode current with a single analog sampling circuit 21-603 may result in an analog storage plane having ¼ the resolution of an analog storage plane in which each cell 21-600 generates a sample. In another embodiment, where four instances of a cell 21-600 may be communicatively coupled via an interconnect 21-644, up to eight separate exposures may be captured by sequentially sampling the 4× photodiode current with each of the eight analog sampling circuits 21-603. In one embodiment, each cell includes one or more analog sampling circuits 21-603.

FIG. 21-3B illustrates a circuit diagram for a photosensitive cell 21-660, in accordance with one possible embodiment. As an option, the cell 21-660 may be implemented in the context of any of the Figures disclosed herein. Of course, however, the cell 21-660 may be implemented in any desired environment. Further, the aforementioned definitions may equally apply to the description below.

As shown, the photosensitive cell 21-660 comprises a photodiode 21-602 that is substantially identical to the photodiode 21-602 of cell 21-600, a first analog sampling circuit 21-603(0) that is substantially identical to the first analog sampling circuit 21-603(0) of cell 21-600, a second analog sampling circuit 21-603(1) that is substantially identical to the second analog sampling circuit 21-603(1) of cell 21-600, and an interconnect 21-654. The interconnect 21-654 is shown to comprise three transistors 21-651-653, and a source 21-650. Each of the transistors 21-651, 21-652, and 21-653, include a gate 21-656, 21-657, and 21-658, respectively. The cell 21-660 may operate in substantially the same manner as the cell 21-600 of FIG. 21-3A, however the cell 21-660 includes only two pass gates from photodiodes 21-602 of other cells 21-660 coupled via the interconnect 21-654, whereas the cell 21-600 includes three pass gates from the photodiodes 21-602 of other cells 21-600 coupled via the interconnect 21-644.

FIG. 21-3C illustrates a circuit diagram for a system 21-690 including plurality of communicatively coupled photosensitive cells 21-694, in accordance with one possible embodiment. As an option, the system 21-690 may be implemented in the context of any of the Figures disclosed herein. Of course, however, the system 21-690 may be implemented in any desired environment. Further, the aforementioned definitions may equally apply to the description below.

As illustrated in FIG. 21-3C, the system 21-690 is shown to include four pixels 21-692, where each of the pixels 21-692 includes a respective cell 21-694, and a set of related cells 21-694 are communicatively coupled via interconnect 21-698. Each of the pixels 21-692 may be implemented as a pixel 21-240 of FIG. 21-2, each of the cells 21-694 may be implemented as a cell 21-242 of FIG. 21-2, and the interconnect 21-698 may be implemented as the interconnect 21-250 of FIG. 21-2. Further, the interconnect 21-698 is shown to include multiple instances of a source 21-696, and multiple instances of a gate 21-691. Also, each cell 21-694 may include an analog sampling circuit 21-603 coupled to a photodiode 21-602 for measuring or detecting incident light 21-601. The analog sampling circuit 21-603 may be substantially identical to either of the analog sampling circuits 21-603(0) and 21-603(1) disclosed in the context of FIG. 21-3A.

When all instances of the gate 21-691 are turned on, each of the cells 21-694 may be thereby communicatively coupled to each of the other cells 21-694 of the other pixels 21-692 via the interconnect 21-698. As a result, a shared photodiode current may be generated. As shown in FIG.

21-3C, each of the cells 21-694(1), 21-694(2), and 21-694 (3) output a substantially similar photodiode current I_PD on the interconnect 21-698. The photodiode current I_PD generated by each of the cells 21-694(1), 21-694(2), and 21-694(3) may be generated by the respective photodiodes 21-602(1), 21-602(2), and 21-602(3). The photodiode current from the cells 21-694(1), 21-694(2), and 21-694(3) may combine on the interconnect 21-698 to form a combined photodiode current of 3*I_PD, or a 3× photodiode current.

When sample signal 21-618 of analog sampling circuit 21-603 is asserted, the 3× photodiode combines with the photodiode current I_PD of photodiode 21-602(0), and a 4× photodiode current may be sampled by the analog sampling circuit 21-603. Thus, a sample may be stored to capacitor 21-604 of analog sampling circuit 21-603 of cell 21-694(0) at a rate 4× faster than if the single photodiode 21-602(0) generated the photodiode current I_PD sampled by the analog sampling circuit 21-603. As an option, the 4× photodiode current may be sampled for a same given exposure time that a 1× photodiode current would be sampled for, which may significantly increase or decrease a value of the analog value stored in the analog sampling circuit 21-603. For example, an analog value stored from sampling the 4× photodiode current for the given exposure time may be associated with a final digital pixel value that is effectively 4× brighter than an analog value stored from sampling a 1× photodiode current for the given exposure time.

When all instances of the gate 21-691 are turned off, each of the cells 21-694 may be uncoupled from the other cells 21-694 of the other pixels 21-692. When the cells 21-694 are uncoupled, each of the cells 21-694 may operate in isolation as discussed previously, for example with respect to FIG. 21-3A. For example, when operating in isolation, analog sampling circuit 21-603 may only sample, under the control of sample signal 21-618, a photodiode current I_PD from a respective photodiode 21-602(0).

In one embodiment, pixels 21-692 within an image sensor each include a cell 21-694 configured to be sensitive to red light (a "red cell"), a cell 21-694 configured to be sensitive to green light (a "green cell"), and a cell 21-694 configured to be sensitive to blue light (a "blue cell"). Furthermore, sets of two or more pixels 21-692 may be configured as described above in FIGS. 21-6A-6C to switch into a photodiode current sharing mode, whereby red cells within each set of pixels share photodiode current, green cells within each set of pixels share photodiode current, and blue cells within each set of pixels share photodiode current. In certain embodiments, the pixels 21-692 also each include a cell 21-694 configured to be sensitive to white light (a "white cell"), whereby each white cell may operate independently with respect to photodiode current while the red cells, green cells, and blue cells operate in a shared photodiode current mode. All other manufacturing parameters being equal, each white cell may be more sensitive (e.g., three times more sensitive) to incident light than any of the red cells, green cells, or blue cells, and, consequently, a white cell may require less exposure time or gain to generate a comparable intensity signal level. In such an embodiment, the resolution of color information (from the red cells, green cells, and blue cells) may be reduced to gain greater sensitivity and better noise performance, while the resolution of pure intensity information (from the white cells) may be kept at full sensor resolution without significantly sacrificing sensitivity or noise performance with respect to intensity information. For example, a 4K pixel by 4K pixel image sensor may be configured to operate as a 2K pixel by 2K pixel image sensor with respect to color, thereby improving color sensitivity by a factor of 4×, while, at the same time, being able to simultaneously capture a 4K pixel by 4K pixel intensity plane from the white cells. In such a configuration, the quarter resolution color information provided by the red cells, green cells, and blue cells may be fused with full resolution intensity information provided by the white cells. To this end, a full 4K by 4K resolution color image may be generated by the image sensor, with better overall sensitivity and noise performance than a comparable conventional image sensor.

FIG. 21-4 illustrates implementations of different analog storage planes, in accordance with another embodiment. As an option, the analog storage planes of FIG. 21-4 may be implemented in the context of the details of any of the Figures disclosed herein. Of course, however, the analog storage planes of FIG. 21-4 may be implemented in any desired environment. Further, the aforementioned definitions may equally apply to the description below.

FIG. 21-4 is illustrated to include a first analog storage plane 21-802 and a second analog storage plane 21-842. A plurality of analog values are each depicted as a "V" within the analog storage planes 21-802 and 21-842. In the context of certain embodiments, each analog storage plane may comprise any collection of one or more analog values. In some embodiments, an analog storage plane may be capable of storing at least one analog pixel value for each pixel of a row or line of a pixel array. In one embodiment, an analog storage plane may cable of storing an analog value for each cell of each pixel of a plurality of pixels of a pixel array. Still yet, in another embodiment, an analog storage plane may be capable of storing at least one analog pixel value for each pixel of an entirety of a pixel array, which may be referred to as a frame. For example, an analog storage plane may be capable of storing an analog value for each cell of each pixel of every line or row of a pixel array.

In one embodiment, the analog storage plane 21-842 may be representative of a portion of an image sensor in which an analog sampling circuit of each cell has been activated to sample a corresponding photodiode current. In other words, for a given region of an image sensor, all cells include an analog sampling circuit that samples a corresponding photodiode current, and stores an analog value as a result of the sampling operation. As a result, the analog storage plane 21-842 includes a greater analog value density 21-846 than an analog value density 21-806 of the analog storage plane 21-802.

In one embodiment, the analog storage plane 21-802 may be representative of a portion of an image sensor in which only one-quarter of the cells include analog sampling circuits activated to sample a corresponding photodiode current. In other words, for a given region of an image sensor, only one-quarter of the cells include an analog sampling circuit that samples a corresponding photodiode current, and stores an analog value as a result of the sampling operation. The analog value density 21-806 of the analog storage plane 21-802 may result from a configuration, as discussed above, wherein four neighboring cells are communicatively coupled via an interconnect such that a 4× photodiode current is sampled by a single analog sampling circuit of one of the four cells, and the remaining analog sampling circuits of the other three cells are not activated to sample.

FIG. 21-5 illustrates a system 21-900 for converting analog pixel data of an analog signal to digital pixel data, in accordance with another embodiment. As an option, the system 21-900 may be implemented in the context of the details of any of the Figures disclosed herein. Of course, however, the system 21-900 may be implemented in any desired environment. Further, the aforementioned definitions may equally apply to the description below.

The system 21-900 is shown in FIG. 21-5 to include a first analog storage plane 21-802, an analog-to-digital unit 21-922, a first digital image 21-912, a second analog storage plane 21-842, and a second digital image 21-952. As illustrated in FIG. 21-5, a plurality of analog values are each depicted as a "V" within each of the analog storage planes 21-802 and 21-842, and corresponding digital values are each depicted as a "D" within digital images 21-912 and 21-952, respectively.

As noted above, each analog storage plane 21-802 and 21-842 may comprise any collection of one or more analog values. In one embodiment, a given analog storage plane may comprise an analog value for each analog storage circuit 21-603 that receives an active sample signal 21-618, and thereby samples a photodiode current, during an associated exposure time.

In some embodiments, an analog storage plane may include analog values for only a subset of all the analog storage circuits 21-603 of an image sensor. This may occur, for example, when analog storage circuits 21-603 of only odd or even rows of pixels are activated to sample during a given exposure time. Similarly, this may occur when analog storage circuits 21-603 of only odd or even columns of pixels are activated to sample during a given exposure. As another example, this may occur when two or more photosensitive cells are communicatively coupled, such as by an interconnect 21-644, in a manner that distributes a shared photodiode current, such as a 2× or 4× photodiode current, between the communicatively coupled cells. In such an embodiment, only a subset of analog sampling circuits 21-603 of the communicatively coupled cells may be activated by a sample signal 21-618 to sample the shared photodiode current during a given exposure time. Any analog sampling circuits 21-603 activated by a sample signal 21-618 during the given exposure time may sample the shared photodiode current, and store an analog value to the analog storage plane associated with the exposure time. However, the analog storage plane associated with the exposure time would not include any analog values associated with the analog sampling circuits 21-603 that are not activated by a sample signal 21-618 during the exposure time.

Thus, an analog value density of a given analog storage plane may depend on a subset of analog sampling circuits 21-603 activated to sample photodiode current during a given exposure associated with the analog storage plane. Specifically, a greater analog value density may be obtained, such as for the more dense analog storage plane 21-842, when a sample signal 21-618 is activated for an analog sampling circuit 21-603 in each of a plurality of neighboring cells of an image sensor during a given exposure time. Conversely, a decreased analog value density may be obtained, such as for the less dense analog storage plane 21-802, when a sample signal 21-618 is activated for only a subset of neighboring cells of an image sensor during a given exposure time.

Returning now to FIG. 21-5, the analog values of the less dense analog storage plane 21-802 are output as analog pixel data 21-904 to the analog-to-digital unit 21-922. Further, the analog values of the more dense analog storage plane 21-842 are separately output as analog pixel data 21-944 to the analog-to-digital unit 21-922. In one embodiment, the analog-to-digital unit 21-922 may be substantially identical to the analog-to-digital unit 18-622 described within the context of FIG. 18-4. For example, the analog-to-digital unit 21-922 may comprise at least one amplifier and at least one analog-to-digital converter, where the amplifier is operative to receive a gain value and utilize the gain value to gain-adjust analog pixel data received at the analog-to-digital unit 21-922. Further, in such an embodiment, the amplifier may transmit gain-adjusted analog pixel data to an analog-to-digital converter, which then generates digital pixel data from the gain-adjusted analog pixel data. To this end, an analog-to-digital conversion may be performed on the contents of each of two or more different analog storage planes 21-802 and 21-842.

In one embodiment, the analog-to-digital unit 21-922 applies at least two different gains to each instance of received analog pixel data. For example, the analog-to-digital unit 21-922 may receive analog pixel data 21-904, and apply at least two different gains to the analog pixel data 21-904 to generate at least a first gain-adjusted analog pixel data and a second gain-adjusted analog pixel data based on the analog pixel data 21-904; and the analog-to-digital unit 21-922 may receive analog pixel data 21-944, and then apply at least two different gains to the analog pixel data 21-944 to generate at least a first gain-adjusted analog pixel data and a second gain-adjusted analog pixel data based on the analog pixel data 21-944.

Further, the analog-to-digital unit 21-922 may convert each instance of gain-adjusted analog pixel data to digital pixel data, and then output a corresponding digital signal. With respect to FIG. 21-5 specifically, the analog-to-digital unit 21-922 is shown to generate a first digital signal comprising first digital pixel data 21-906 corresponding to application of Gain1 to analog pixel data 21-904; and a second digital signal comprising second digital pixel data 21-946 corresponding to application of Gain1 to analog pixel data 21-944. Each instance of digital pixel data may comprise a digital image, such that the first digital pixel data 21-906 comprises a digital image 21-912, and the second digital pixel data 21-946 comprises a digital image 21-952. In other words, a first digital image 21-912 may be generated based on the analog values of the less dense analog storage plane 21-802, and a second digital image 21-952 may be generated based on the analog values of the more dense analog storage plane 21-842.

Of course, in other embodiments, the analog-to-digital unit 21-922 may apply a plurality of gains to each instance of analog pixel data, to thereby generate an image stack based on each analog storage plane 21-802 and 21-842. Each image stack may be manipulated as set forth in those applications, or as set forth below.

In some embodiments, the digital image 21-952 may have a greater resolution than the digital image 21-912. In other words, a greater number of pixels may comprise digital image 21-952 than a number of pixels that comprise digital image 21-912. This may be because the digital image 21-912 was generated from the less dense analog storage plane 21-802 that included, in one example, only one-quarter the number of sampled analog values of more dense analog storage plane 21-842. In other embodiments, the digital image 21-952 may have the same resolution as the digital image 21-912. In such an embodiment, a plurality of digital pixel data values may be generated to make up for the reduced number of sampled analog values in the less dense analog storage plane 21-802. For example, the plurality of digital pixel data values may be generated by interpolation to increase the resolution of the digital image 21-912.

In one embodiment, the digital image 21-912 generated from the less dense analog storage plane 21-802 may be used to improve the digital image 21-952 generated from the more dense analog storage plane 21-842. As a specific non-limiting example, each of the less dense analog storage plane 21-802 and the more dense analog storage plane 21-842 may be storage analog values for a single exposure of a photographic scene. In the context of the present description, a "single exposure" of a photographic scene may include simultaneously, at least in part, capturing the photographic scene using two or more sets of analog sampling circuits, where each set of analog sampling circuits may be configured to operate at different exposure times. Further, the single exposure may be further broken up into multiple discrete exposure times or samples times, where the exposure times or samples times may occur sequentially, partially simultaneously, or in some combination of sequentially and partially simultaneously.

During capture of the single exposure of the photographic scene using the two or more sets of analog sampling circuits, some cells of the capturing image sensor may be communicatively coupled to one or more other cells. For example, cells of an image sensor may be communicatively coupled as shown in FIG. 21-2, such that each cell is coupled to three other cells associated with a same peak wavelength of light. Therefore, during the single exposure, each of the communicatively coupled cells may receive a 4× photodiode current.

During a first sample time of the single exposure, a first analog sampling circuit in each of the four cells may receive an active sample signal, which causes the first analog sampling circuit in each of the four cells to sample the 4× photodiode current for the first sample time. The more dense analog storage plane 21-842 may be representative of the analog values stored during such a sample operation. Further, a second analog sampling circuit in each of the four cells may be controlled to separately sample the 4× photodiode current. As one option, during a second sample time after the first sample time, only a single second analog sampling circuit of the four coupled cells may receive an active sample signal, which causes the single analog sampling circuit to sample the 4× photodiode current for the second sample time. The less dense analog storage plane 21-802 may be representative of the analog values stored during such a sample operation.

As a result, analog values stored during the second sample time of the single exposure are sampled with an increased sensitivity, but a decreased resolution, in comparison to the analog values stored during the first sample time. In situations involving a low-light photographic scene, the increased light sensitivity associated with the second sample time may generate a better exposed and/or less noisy digital image, such as the digital image 21-912. However, the digital image 21-952 may have a desired final image resolution or image size. Thus, in some embodiments, the digital image 21-912 may be blended or mixed or combined with digital image 21-952 to reduce the noise and improve the exposure of the digital image 21-952. For example, a digital image with one-half vertical or one-half horizontal resolution may be blended with a digital image at full resolution. In another embodiment any combination of digital images at one-half vertical resolution, one-half horizontal resolution, and full resolution may be blended.

In some embodiments, a first exposure time (or first sample time) and a second exposure time (or second sample time) are each captured using an ambient illumination of the photographic scene. In other embodiments, the first exposure time (or first sample time) and the second exposure time (or second sample time) are each captured using a flash or strobe illumination of the photographic scene. In yet other embodiments, the first exposure time (or first sample time) may be captured using an ambient illumination of the photographic scene, and the second exposure time (or second sample time) may be captured using a flash or strobe illumination of the photographic scene.

In embodiments in which the first exposure time is captured using an ambient illumination, and the second exposure time is captured using flash or strobe illumination, analog values stored during the first exposure time may be stored to an analog storage plane at a higher density than the analog values stored during the second exposure time. This may effectively increase the ISO or sensitivity of the capture of the photographic scene at ambient illumination. Subsequently, the photographic scene may then be captured at full resolution using the strobe or flash illumination. The lower resolution ambient capture and the full resolution strobe or flash capture may then be merged to create a combined image that includes detail not found in either of the individual captures.

One advantage of the present invention is that a digital photograph may be selectively generated based on user input using two or more different images generated from a single exposure of a photographic scene. Accordingly, the digital photograph generated based on the user input may have a greater dynamic range than any of the individual images. Further, the generation of an HDR image using two or more different images with zero, or near zero, interframe time allows for the rapid generation of HDR images without motion artifacts.

When there is any motion within a photographic scene, or a capturing device experiences any jitter during capture, any interframe time between exposures may result in a motion blur within a final merged HDR photograph. Such blur can be significantly exaggerated as interframe time increases. This problem renders current HDR photography an ineffective solution for capturing clear images in any circumstance other than a highly static scene. Further, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1A, 22:
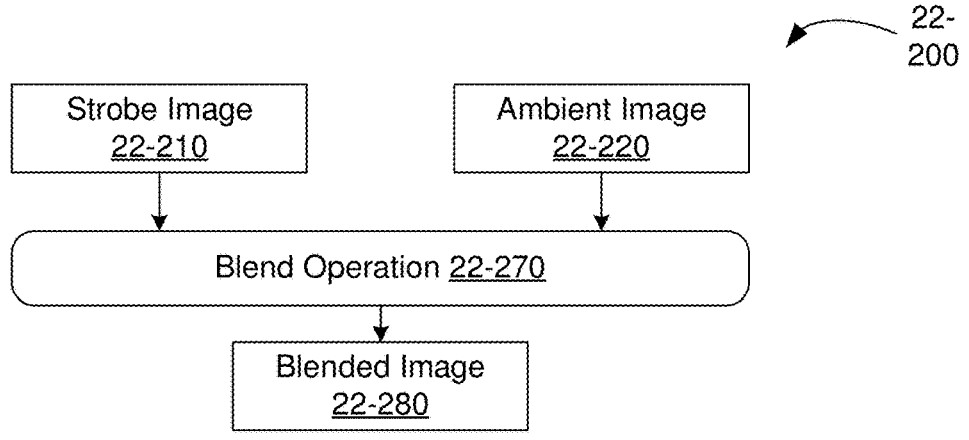
FIG. 22-1A illustrates a first data flow process for generating a blended image based on at least an ambient image and a strobe image, according to one embodiment of the present invention.

FIG. 22-1A illustrates a first data flow process 22-200 for generating a blended image 22-280 based on at least an ambient image 22-220 and a strobe image 22-210, according to one embodiment of the present invention. A strobe image 22-210 comprises a digital photograph sampled by camera unit 22-130 while strobe unit 22-136 is actively emitting strobe illumination 22-150. Ambient image 22-220 comprises a digital photograph sampled by camera unit 22-130 while strobe unit 22-136 is inactive and substantially not emitting strobe illumination 22-150.

In one embodiment, ambient image 22-220 is generated according to a prevailing ambient white balance for a scene being photographed. The prevailing ambient white balance may be computed using the well-known gray world model, an illuminator matching model, or any other technically feasible technique. Strobe image 22-210 should be generated according to an expected white balance for strobe illumination 22-150, emitted by strobe unit 22-136. Blend operation 22-270, discussed in greater detail below, blends strobe image 22-210 and ambient image 22-220 to generate a blended image 22-280 via preferential selection of image data from strobe image 22-210 in regions of greater intensity compared to corresponding regions of ambient image 22-220.

In one embodiment, data flow process 22-200 is performed by processor complex 22-110 within digital photographic system 22-100, and blend operation 22-270 is performed by at least one GPU core 22-172, one CPU core 22-170, or any combination thereof.

Figures 1B, 22:
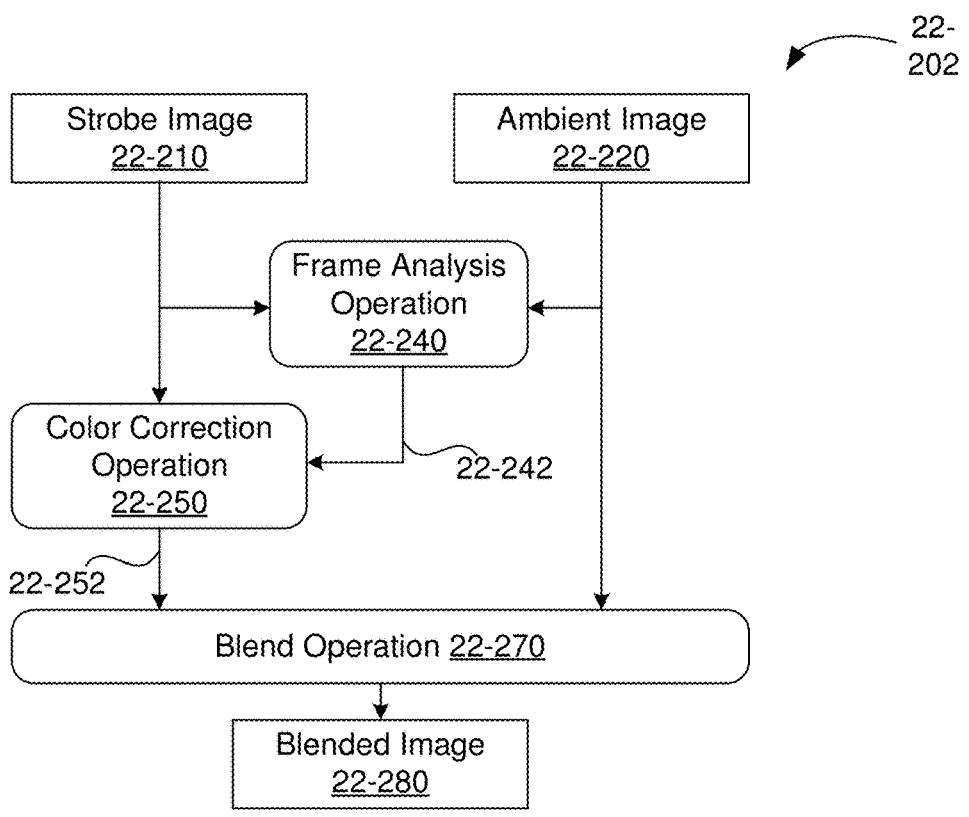

FIG. 22-1B illustrates a second data flow process 22-202 for generating a blended image 22-280 based on at least an ambient image 22-220 and a strobe image 22-210, according to one embodiment of the present invention. Strobe image 22-210 comprises a digital photograph sampled by camera unit 22-130 while strobe unit 22-136 is actively emitting strobe illumination 22-150. Ambient image 22-220 comprises a digital photograph sampled by camera unit 22-130 while strobe unit 22-136 is inactive and substantially not emitting strobe illumination 22-150.

In one embodiment, ambient image 22-220 is generated according to a prevailing ambient white balance for a scene being photographed. The prevailing ambient white balance may be computed using the well-known gray world model, an illuminator matching model, or any other technically feasible technique. In certain embodiments, strobe image 22-210 is generated according to the prevailing ambient white balance. In an alternative embodiment ambient image 22-220 is generated according to a prevailing ambient white balance, and strobe image 22-210 is generated according to an expected white balance for strobe illumination 22-150, emitted by strobe unit 22-136. In other embodiments, ambient image 22-220 and strobe image 22-210 comprise raw image data, having no white balance operation applied to either. Blended image 22-280 may be subjected to arbitrary white balance operations, as is common practice with raw image data, while advantageously retaining color consistency between regions dominated by ambient illumination and regions dominated by strobe illumination.

As a consequence of color balance differences between ambient illumination, which may dominate certain portions of strobe image 22-210 and strobe illumination 22-150, which may dominate other portions of strobe image 22-210, strobe image 22-210 may include color information in certain regions that is discordant with color information for the same regions in ambient image 22-220. Frame analysis operation 22-240 and color correction operation 22-250 together serve to reconcile discordant color information within strobe image 22-210. Frame analysis operation 22-240 generates color correction data 22-242, described in greater detail below, for adjusting color within strobe image 22-210 to converge spatial color characteristics of strobe image 22-210 to corresponding spatial color characteristics of ambient image 22-220. Color correction operation 22-250 receives color correction data 22-242 and performs spatial color adjustments to generate corrected strobe image data

22-252 from strobe image 22-210. Blend operation 22-270, discussed in greater detail below, blends corrected strobe image data 22-252 with ambient image 22-220 to generate blended image 22-280. Color correction data 22-242 may be generated to completion prior to color correction operation 22-250 being performed. Alternatively, certain portions of color correction data 22-242, such as spatial correction factors, may be generated as needed.

In one embodiment, data flow process 22-202 is performed by processor complex 22-110 within digital photographic system 22-100. In certain implementations, blend operation 22-270 and color correction operation 22-250 are performed by at least one GPU core 22-172, at least one CPU core 22-170, or a combination thereof. Portions of frame analysis operation 22-240 may be performed by at least one GPU core 22-172, one CPU core 22-170, or any combination thereof. Frame analysis operation 22-240 and color correction operation 22-250 are discussed in greater detail below.

Figures 1C, 22:
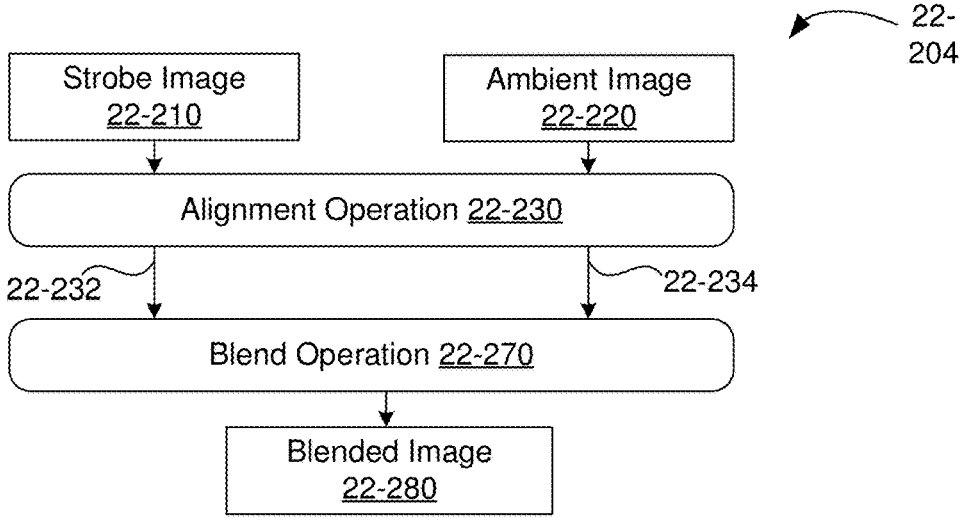

FIG. 22-1C illustrates a third data flow process 22-204 for generating a blended image 22-280 based on at least an ambient image 22-220 and a strobe image 22-210, according to one embodiment of the present invention. Strobe image 22-210 comprises a digital photograph sampled by camera unit 22-130 while strobe unit 22-136 is actively emitting strobe illumination 22-150. Ambient image 22-220 comprises a digital photograph sampled by camera unit 22-130 while strobe unit 22-136 is inactive and substantially not emitting strobe illumination 22-150.

In one embodiment, ambient image 22-220 is generated according to a prevailing ambient white balance for a scene being photographed. The prevailing ambient white balance may be computed using the well-known gray world model, an illuminator matching model, or any other technically feasible technique. Strobe image 22-210 should be generated according to an expected white balance for strobe illumination 22-150, emitted by strobe unit 22-136.

In certain common settings, camera unit 22-130 is packed into a hand-held device, which may be subject to a degree of involuntary random movement or "shake" while being held in a user's hand. In these settings, when the hand-held device sequentially samples two images, such as strobe image 22-210 and ambient image 22-220, the effect of shake may cause misalignment between the two images. The two images should be aligned prior to blend operation 22-270, discussed in greater detail below. Alignment operation 22-230 generates an aligned strobe image 22-232 from strobe image 22-210 and an aligned ambient image 22-234 from ambient image 22-220. Alignment operation 22-230 may implement any technically feasible technique for aligning images or sub-regions.

In one embodiment, alignment operation 22-230 comprises an operation to detect point pairs between strobe image 22-210 and ambient image 22-220, an operation to estimate an affine or related transform needed to substantially align the point pairs. Alignment may then be achieved by executing an operation to resample strobe image 22-210 according to the affine transform thereby aligning strobe image 22-210 to ambient image 22-220, or by executing an operation to resample ambient image 22-220 according to the affine transform thereby aligning ambient image 22-220 to strobe image 22-210. Aligned images typically overlap substantially with each other, but may also have non-overlapping regions. Image information may be discarded from non-overlapping regions during an alignment operation. Such discarded image information should be limited to relatively narrow boundary regions. In certain embodiments, resampled images are normalized to their original size via a scaling operation performed by one or more GPU cores 22-172.

In one embodiment, the point pairs are detected using a technique known in the art as a Harris affine detector. The operation to estimate an affine transform may compute a substantially optimal affine transform between the detected point pairs, comprising pairs of reference points and offset points. In one implementation, estimating the affine transform comprises computing a transform solution that minimizes a sum of distances between each reference point and each offset point subjected to the transform. Persons skilled in the art will recognize that these and other techniques may be implemented for performing the alignment operation 22-230 without departing the scope and spirit of the present invention.

In one embodiment, data flow process 22-204 is performed by processor complex 22-110 within digital photographic system 22-100. In certain implementations, blend operation 22-270 and resampling operations are performed by at least one GPU core.

Figures 1D, 22:
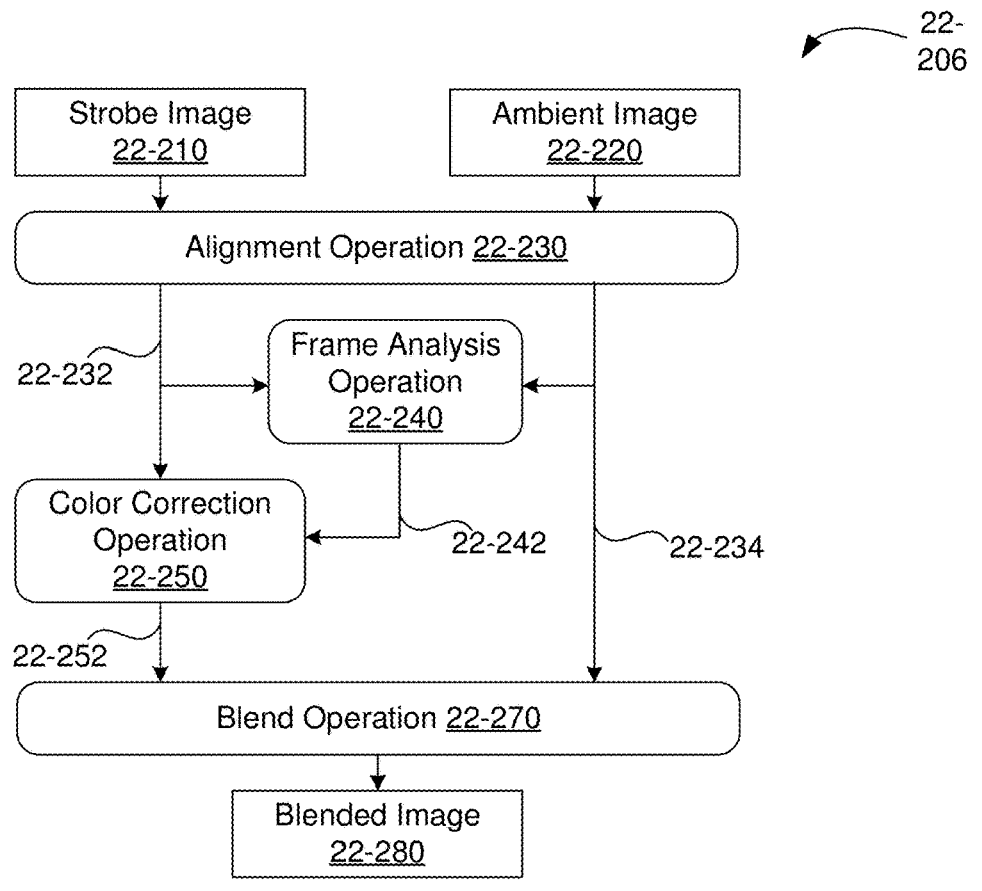

FIG. 22-1D illustrates a fourth data flow process 22-206 for generating a blended image 22-280 based on at least an ambient image 22-220 and a strobe image 22-210, according to one embodiment of the present invention. Strobe image 22-210 comprises a digital photograph sampled by camera unit 22-130 while strobe unit 22-136 is actively emitting strobe illumination 22-150. Ambient image 22-220 comprises a digital photograph sampled by camera unit 22-130 while strobe unit 22-136 is inactive and substantially not emitting strobe illumination 22-150.

In one embodiment, ambient image 22-220 is generated according to a prevailing ambient white balance for a scene being photographed. The prevailing ambient white balance may be computed using the well-known gray world model, an illuminator matching model, or any other technically feasible technique. In certain embodiments, strobe image 22-210 is generated according to the prevailing ambient white balance. In an alternative embodiment ambient image 22-220 is generated according to a prevailing ambient white balance, and strobe image 22-210 is generated according to an expected white balance for strobe illumination 22-150, emitted by strobe unit 22-136. In other embodiments, ambient image 22-220 and strobe image 22-210 comprise raw image data, having no white balance operation applied to either. Blended image 22-280 may be subjected to arbitrary white balance operations, as is common practice with raw image data, while advantageously retaining color consistency between regions dominated by ambient illumination and regions dominated by strobe illumination.

Alignment operation 22-230, discussed previously in FIG. 22-1C, generates an aligned strobe image 22-232 from strobe image 22-210 and an aligned ambient image 22-234 from ambient image 22-220. Alignment operation 22-230 may implement any technically feasible technique for aligning images.

Frame analysis operation 22-240 and color correction operation 22-250, both discussed previously in FIG. 22-1B, operate together to generate corrected strobe image data 22-252 from aligned strobe image 22-232. Blend operation 22-270, discussed in greater detail below, blends corrected strobe image data 22-252 with ambient image 22-220 to generate blended image 22-280.

Color correction data 22-242 may be generated to completion prior to color correction operation 22-250 being performed. Alternatively, certain portions of color correction data 22-242, such as spatial correction factors, may be generated as needed. In one embodiment, data flow process 22-206 is performed by processor complex 22-110 within digital photographic system 22-100.

While frame analysis operation 22-240 is shown operating on aligned strobe image 22-232 and aligned ambient image 22-234, certain global correction factors may be computed from strobe image 22-210 and ambient image 22-220. For example, in one embodiment, a frame level color correction factor, discussed below, may be computed from strobe image 22-210 and ambient image 22-220. In such an embodiment the frame level color correction may be advantageously computed in parallel with alignment operation 22-230, reducing overall time required to generate blended image 22-280.

In certain embodiments, strobe image 22-210 and ambient image 22-220 are partitioned into two or more tiles and color correction operation 22-250, blend operation 22-270, and resampling operations comprising alignment operation 22-230 are performed on a per tile basis before being combined into blended image 22-280. Persons skilled in the art will recognize that tiling may advantageously enable finer grain scheduling of computational tasks among CPU cores 22-170 and GPU cores 22-172. Furthermore, tiling enables GPU cores 22-172 to advantageously operate on images having higher resolution in one or more dimensions than native two-dimensional surface support may allow for the GPU cores. For example, certain generations of GPU core are only configured to operate on 2048 by 2048 pixel images, but popular mobile devices include camera resolution of more than 2048 in one dimension and less than 2048 in another dimension. In such a system, two tiles may be used to partition strobe image 22-210 and ambient image 22-220 into two tiles each, thereby enabling a GPU having a resolution limitation of 2048 by 2048 to operate on the images. In one embodiment, a first tile of blended image 22-280 is computed to completion before a second tile for blended image 22-280 is computed, thereby reducing peak system memory required by processor complex 22-110.

Figures 2A, 22:
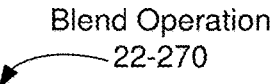

FIG. 22-2A illustrates image blend operation 22-270, according to one embodiment of the present invention. A strobe image 22-310 and an ambient image 22-320 of the same horizontal resolution (H-res) and vertical resolution (V-res) are combined via blend function 22-330 to generate blended image 22-280 having the same horizontal resolution and vertical resolution. In alternative embodiments, strobe image 22-310 or ambient image 22-320, or both images may be scaled to an arbitrary resolution defined by blended image 22-280 for processing by blend function 22-330. Blend function 22-330 is described in greater detail below in FIGS. 22-2B-22-2D.

As shown, strobe pixel 22-312 and ambient pixel 22-322 are blended by blend function 22-330 to generate blended pixel 22-332, stored in blended image 22-280. Strobe pixel 22-312, ambient pixel 22-322, and blended pixel 22-332 are located in substantially identical locations in each respective image.

In one embodiment, strobe image 22-310 corresponds to strobe image 22-210 of FIG. 22-1A and ambient image 22-320 corresponds to ambient image 22-220. In another embodiment, strobe image 22-310 corresponds to corrected strobe image data 22-252 of FIG. 22-1B and ambient image 22-320 corresponds to ambient image 22-220. In yet another embodiment, strobe image 22-310 corresponds to aligned strobe image 22-232 of FIG. 22-1C and ambient image 22-320 corresponds to aligned ambient image 22-234. In still yet another embodiment, strobe image 22-310 corresponds to corrected strobe image data 22-252 of FIG. 22-1D, and ambient image 22-320 corresponds to aligned ambient image 22-234.

Blend operation 22-270 may be performed by one or more CPU cores 22-170, one or more GPU cores 22-172, or any combination thereof. In one embodiment, blend function 22-330 is associated with a fragment shader, configured to execute within one or more GPU cores 22-172.

Figures 2B, 22:
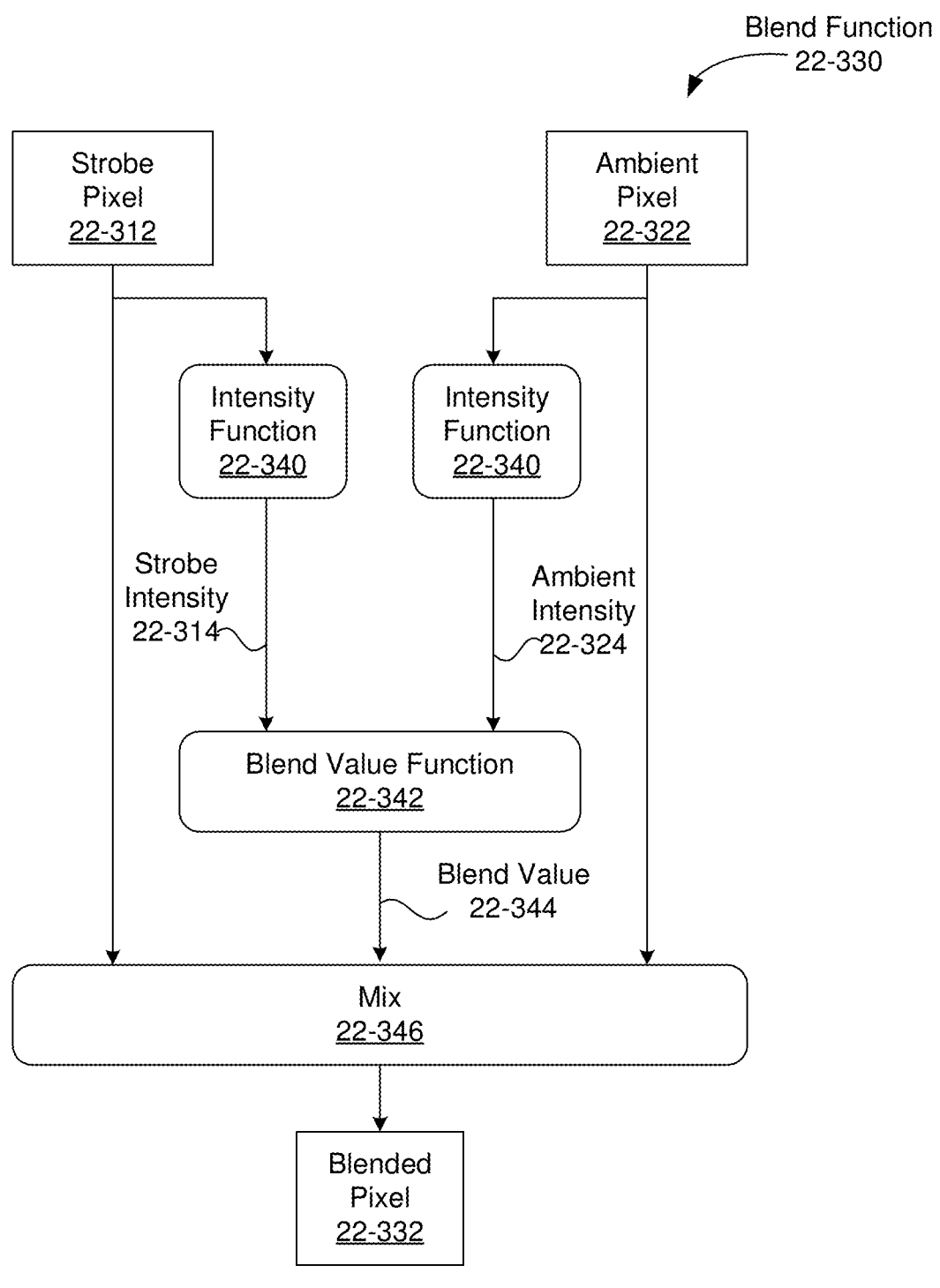

FIG. 22-2B illustrates blend function 22-330 of FIG. 22-2A for blending pixels associated with a strobe image and an ambient image, according to one embodiment of the present invention. As shown, a strobe pixel 22-312 from strobe image 22-310 and an ambient pixel 22-322 from ambient image 22-320 are blended to generate a blended pixel 22-332 associated with blended image 22-280.

Strobe intensity 22-314 is calculated for strobe pixel 22-312 by intensity function 22-340. Similarly, ambient intensity 22-324 is calculated by intensity function 22-340 for ambient pixel 22-322. In one embodiment, intensity function 22-340 implements Equation 22-1, where Cr, Cg, Cb are contribution constants and Red, Green, and Blue represent color intensity values for an associated pixel:

$$\text{Intensity} = Cr * \text{Red} + Cg * \text{Green} + Cb * \text{Blue} \qquad \text{(Eq. 22-1)}$$

A sum of the contribution constants should be equal to a maximum range value for Intensity. For example, if Intensity is defined to range from 0.0 to 1.0, then Cr+Cg+Cb=1.0. In one embodiment Cr–Cg=Cb=%.

Blend value function 22-342 receives strobe intensity 22-314 and ambient intensity 22-324 and generates a blend value 22-344. Blend value function 22-342 is described in greater detail in FIGS. 22-2D and 22-2C. In one embodiment, blend value 22-344 controls a linear mix operation 22-346 between strobe pixel 22-312 and ambient pixel 22-322 to generate blended pixel 22-332. Linear mix operation 22-346 receives Red, Green, and Blue values for strobe pixel 22-312 and ambient pixel 22-322. Linear mix operation 22-346 receives blend value 22-344, which determines how much strobe pixel 22-312 versus how much ambient pixel 22-322 will be represented in blended pixel 22-332. In one embodiment, linear mix operation 22-346 is defined by Equation 22-2, where Out corresponds to blended pixel 22-332, Blend corresponds to blend value 22-344, "A" corresponds to a color vector comprising ambient pixel 22-322, and "B" corresponds to a color vector comprising strobe pixel 22-312.

$$\text{Out} = (\text{Blend} * B) + (1.0 - \text{Blend}) * A \qquad \text{(Eq. 22-2)}$$

When blend value 22-344 is equal to 1.0, blended pixel 22-332 is entirely determined by strobe pixel 22-312. When blend value 22-344 is equal to 0.0, blended pixel 22-332 is entirely determined by ambient pixel 22-322. When blend value 22-344 is equal to 0.5, blended pixel 22-332 represents a per component average between strobe pixel 22-312 and ambient pixel 22-322.

Figures 2C, 22:
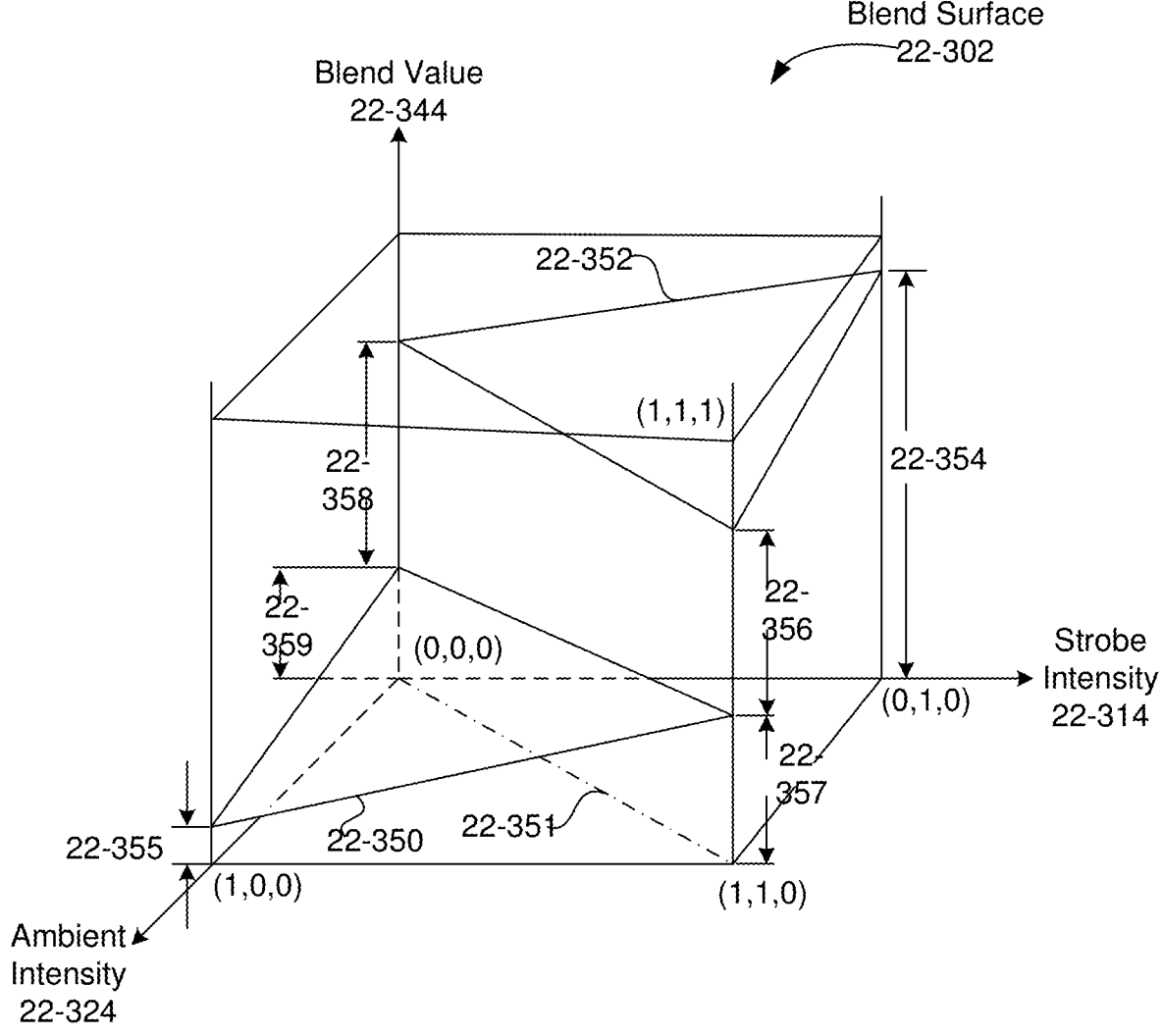

FIG. 22-2C illustrates a blend surface 22-302 for blending two pixels, according to one embodiment of the present invention. In one embodiment, blend surface 22-302 defines blend value function 22-342 of FIG. 22-2B. Blend surface 22-302 comprises a strobe dominant region 22-352 and an ambient dominant region 22-350 within a coordinate system defined by an axis for each of ambient intensity 22-324, strobe intensity 22-314, and blend value 22-344. Blend surface 22-302 is defined within a volume where ambient intensity 22-324, strobe intensity 22-314, and blend value 22-344 may range from 0.0 to 1.0. Persons skilled in the art will recognize that a range of 0.0 to 1.0 is arbitrary and other numeric ranges may be implemented without departing the scope and spirit of the present invention.

When ambient intensity 22-324 is larger than strobe intensity 22-314, blend value 22-344 may be defined by ambient dominant region 22-350. Otherwise, when strobe intensity 22-314 is larger than ambient intensity 22-324, blend value 22-344 may be defined by strobe dominant region 22-352. Diagonal 22-351 delineates a boundary between ambient dominant region 22-350 and strobe dominant region 22-352, where ambient intensity 22-324 is equal to strobe intensity 22-314. As shown, a discontinuity of blend value 22-344 in blend surface 22-302 is implemented along diagonal 22-351, separating ambient dominant region 22-350 and strobe dominant region 22-352.

For simplicity, a particular blend value 22-344 for blend surface 22-302 will be described herein as having a height above a plane that intersects three points including points at (1,0,0), (0,1,0), and the origin (0,0,0). In one embodiment, ambient dominant region 22-350 has a height 22-359 at the origin and strobe dominant region 22-352 has a height 22-358 above height 22-359. Similarly, ambient dominant region 22-350 has a height 22-357 above the plane at location (1,1), and strobe dominant region 22-352 has a height 22-356 above height 22-357 at location (1,1). Ambient dominant region 22-350 has a height 22-355 at location (1,0) and strobe dominant region 22-352 has a height of 354 at location (0,1).

In one embodiment, height 22-355 is greater than 0.0, and height 22-354 is less than 1.0. Furthermore, height 22-357 and height 22-359 are greater than 0.0 and height 22-356 and height 22-358 are each greater than 0.25. In certain embodiments, height 22-355 is not equal to height 22-359 or height 22-357. Furthermore, height 22-354 is not equal to the sum of height 22-356 and height 22-357, nor is height 22-354 equal to the sum of height 22-358 and height 22-359.

The height of a particular point within blend surface 22-302 defines blend value 22-344, which then determines how much strobe pixel 22-312 and ambient pixel 22-322 each contribute to blended pixel 22-332. For example, at location (0,1), where ambient intensity is 0.0 and strobe intensity is 1.0, the height of blend surface 22-302 is given as height 22-354, which sets blend value 22-344 to a value for height 22-354. This value is used as blend value 22-344 in mix operation 22-346 to mix strobe pixel 22-312 and ambient pixel 22-322. At (0,1), strobe pixel 22-312 dominates the value of blended pixel 22-332, with a remaining, small portion of blended pixel 22-322 contributed by ambient pixel 22-322. Similarly, at (1,0), ambient pixel 22-322 dominates the value of blended pixel 22-332, with a remaining, small portion of blended pixel 22-322 contributed by strobe pixel 22-312.

Figures 2D, 22:
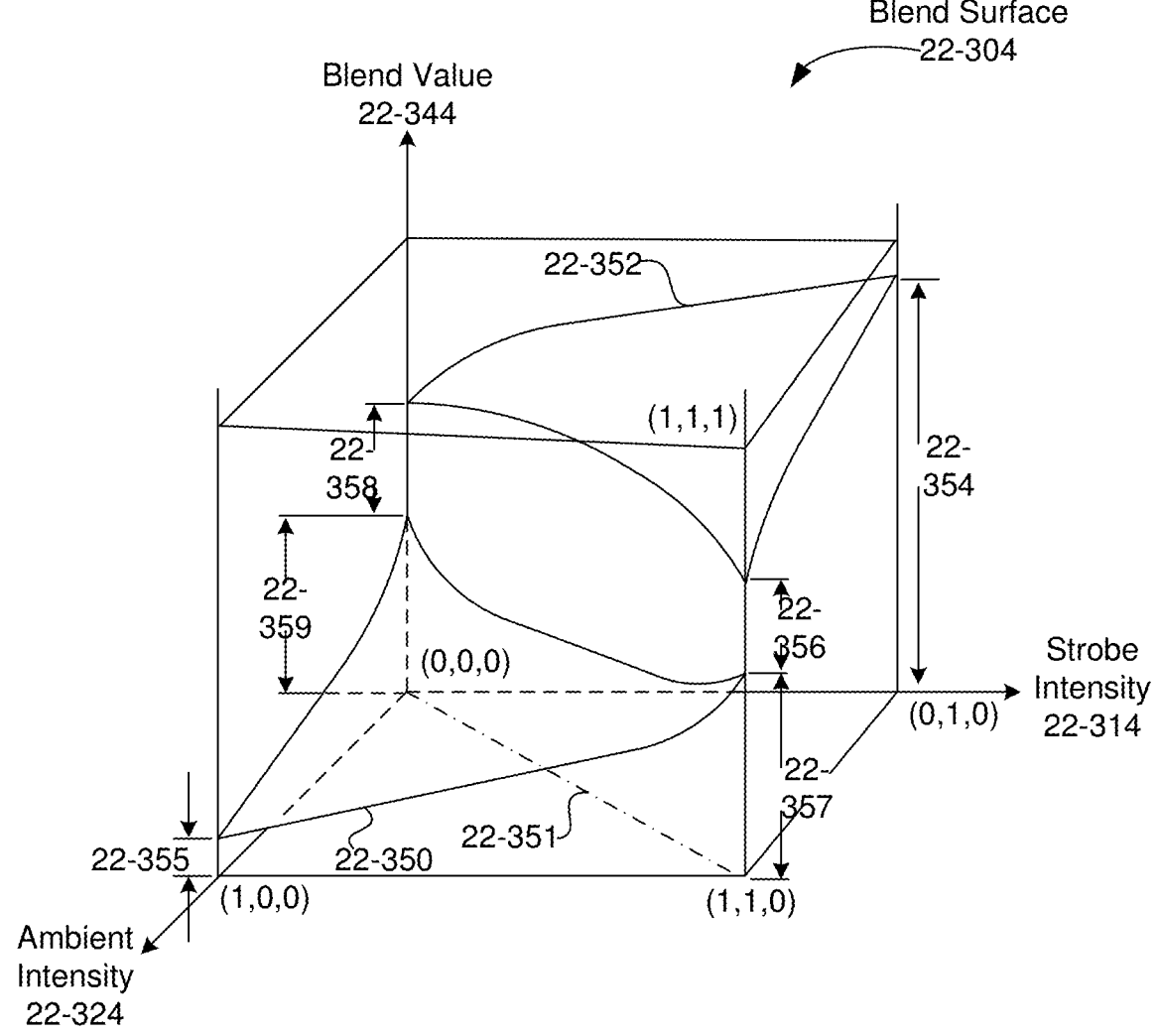

Ambient dominant region 22-350 and strobe dominant region 22-352 are illustrated herein as being planar sections for simplicity. However, as shown in FIG. 22-2D, certain curvature may be added, for example, to provide smoother transitions, such as along at least portions of diagonal 22-351, where strobe pixel 22-312 and ambient pixel 22-322 have similar intensity. A gradient, such as a table top or a wall in a given scene, may include a number of pixels that cluster along diagonal 22-351. These pixels may look more natural if the height difference between ambient dominant region 22-350 and strobe dominant region 22-352 along diagonal 22-351 is reduced compared to a planar section. A discontinuity along diagonal 22-351 is generally needed to distinguish pixels that should be strobe dominant versus pixels that should be ambient dominant. A given quantization of strobe intensity 22-314 and ambient intensity 22-324 may require a certain bias along diagonal 22-351, so that either ambient dominant region 22-350 or strobe dominant region 22-352 comprises a larger area within the plane than the other.

FIG. 22-2D illustrates a blend surface 22-304 for blending two pixels, according to another embodiment of the present invention. Blend surface 22-304 comprises a strobe dominant region 22-352 and an ambient dominant region 22-350 within a coordinate system defined by an axis for each of ambient intensity 22-324, strobe intensity 22-314, and blend value 22-344. Blend surface 22-304 is defined within a volume substantially identical to blend surface 22-302 of FIG. 22-2C.

As shown, upward curvature at locations (0,0) and (1,1) is added to ambient dominant region 22-350, and downward curvature at locations (0,0) and (1,1) is added to strobe dominant region 22-352. As a consequence, a smoother transition may be observed within blended image 22-280 for very bright and very dark regions, where color may be less stable and may diverge between strobe image 22-310 and ambient image 22-320. Upward curvature may be added to ambient dominant region 22-350 along diagonal 22-351 and corresponding downward curvature may be added to strobe dominant region 22-352 along diagonal 22-351.

In certain embodiments, downward curvature may be added to ambient dominant region 22-350 at (1,0), or along a portion of the axis for ambient intensity 22-324. Such downward curvature may have the effect of shifting the weight of mix operation 22-346 to favor ambient pixel 22-322 when a corresponding strobe pixel 22-312 has very low intensity.

In one embodiment, a blend surface, such as blend surface 22-302 or blend surface 22-304, is pre-computed and stored as a texture map that is established as an input to a fragment shader configured to implement blend operation 22-270. A surface function that describes a blend surface having an ambient dominant region 22-350 and a strobe dominant region 22-352 is implemented to generate and store the texture map. The surface function may be implemented on a CPU core 22-170 of FIG. 22-1A or a GPU core 22-172, or a combination thereof. The fragment shader executing on a GPU core may use the texture map as a lookup table implementation of blend value function 22-342. In alternative embodiments, the fragment shader implements the surface function and computes a blend value 22-344 as needed for each combination of a strobe intensity 22-314 and an ambient intensity 22-324. One exemplary surface function that may be used to compute a blend value 22-344 (blendValue) given an ambient intensity 22-324 (ambient) and a strobe intensity 22-314 (strobe) is illustrated below as pseudo-code in Table 22-1. A constant "e" is set to a value that is relatively small, such as a fraction of a quantization step for ambient or strobe intensity, to avoid dividing by zero. Height 22-355 corresponds to constant 0.125 divided by 3.0.

TABLE 22-1

```
fDivA = strobe/(ambient + e);
fDivB = (1.0 − ambient) / ((1.0 − strobe) + (1.0 − ambient) + e)
temp = (fDivA >= 1.0) ? 1.0 : 0.125;
blendValue = (temp + 2.0 * fDivB) / 3.0;
```

In certain embodiments, the blend surface is dynamically configured based on image properties associated with a given strobe image 22-310 and corresponding ambient image 22-320. Dynamic configuration of the blend surface may include, without limitation, altering one or more of heights 22-354 through 359, altering curvature associated with one or more of heights 22-354 through 359, altering curvature along diagonal 22-351 for ambient dominant region 22-350, altering curvature along diagonal 22-351 for strobe dominant region 22-352, or any combination thereof.

One embodiment of dynamic configuration of a blend surface involves adjusting heights associated with the surface discontinuity along diagonal 22-351. Certain images disproportionately include gradient regions having strobe pixels 22-312 and ambient pixels 22-322 of similar or identical intensity. Regions comprising such pixels may generally appear more natural as the surface discontinuity along diagonal 22-351 is reduced. Such images may be detected using a heat-map of ambient intensity 22-324 and strobe intensity 22-314 pairs within a surface defined by ambient intensity 22-324 and strobe intensity 22-314. Clustering along diagonal 22-351 within the heat-map indicates a large incidence of strobe pixels 22-312 and ambient pixels 22-322 having similar intensity within an associated scene. In one embodiment, clustering along diagonal 22-351 within the heat-map indicates that the blend surface should be dynamically configured to reduce the height of the discontinuity along diagonal 22-351. Reducing the height of the discontinuity along diagonal 22-351 may be implemented via adding downward curvature to strobe dominant region 22-352 along diagonal 22-351, adding upward curvature to ambient dominant region 22-350 along diagonal 22-351, reducing height 22-358, reducing height 22-356, or any combination thereof. Any technically feasible technique may be implemented to adjust curvature and height values without departing the scope and spirit of the present invention. Furthermore, any region of blend surfaces 22-302, 22-304 may be dynamically adjusted in response to image characteristics without departing the scope of the present invention.

In one embodiment, dynamic configuration of the blend surface comprises mixing blend values from two or more pre-computed lookup tables implemented as texture maps. For example, a first blend surface may reflect a relatively large discontinuity and relatively large values for heights 22-356 and 22-358, while a second blend surface may reflect a relatively small discontinuity and relatively small values for height 22-356 and 22-358. Here, blend surface 22-304 may be dynamically configured as a weighted sum of blend values from the first blend surface and the second blend surface. Weighting may be determined based on certain image characteristics, such as clustering of strobe intensity 22-314 and ambient intensity 22-324 pairs in certain regions within the surface defined by strobe intensity 22-314 and ambient intensity 22-324, or certain histogram attributes for strobe image 22-210 and ambient image 22-220. In one embodiment, dynamic configuration of one or more aspects of the blend surface, such as discontinuity height, may be adjusted according to direct user input, such as via a UI tool.

Figures 2E, 22:
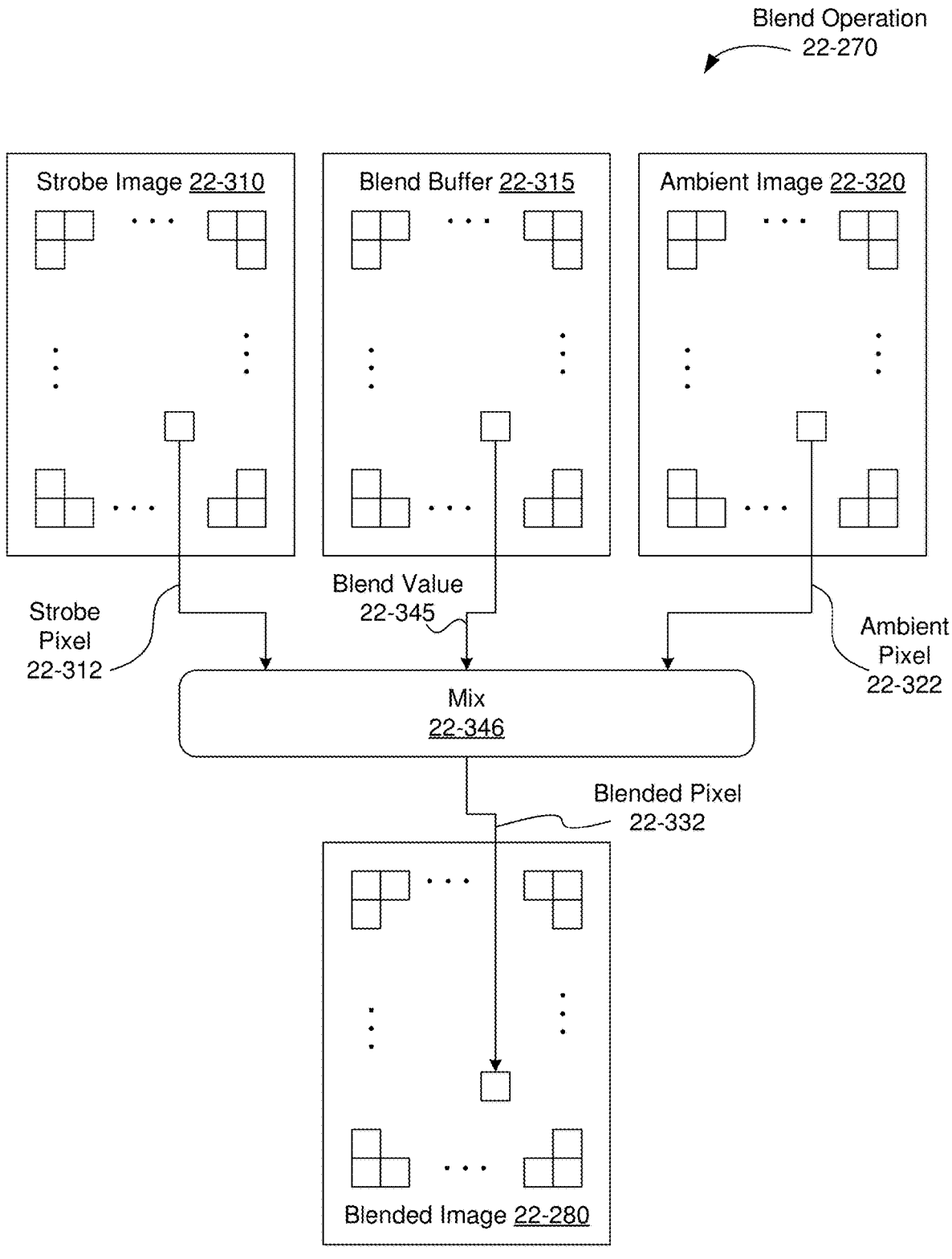
Figures 3A, 22:
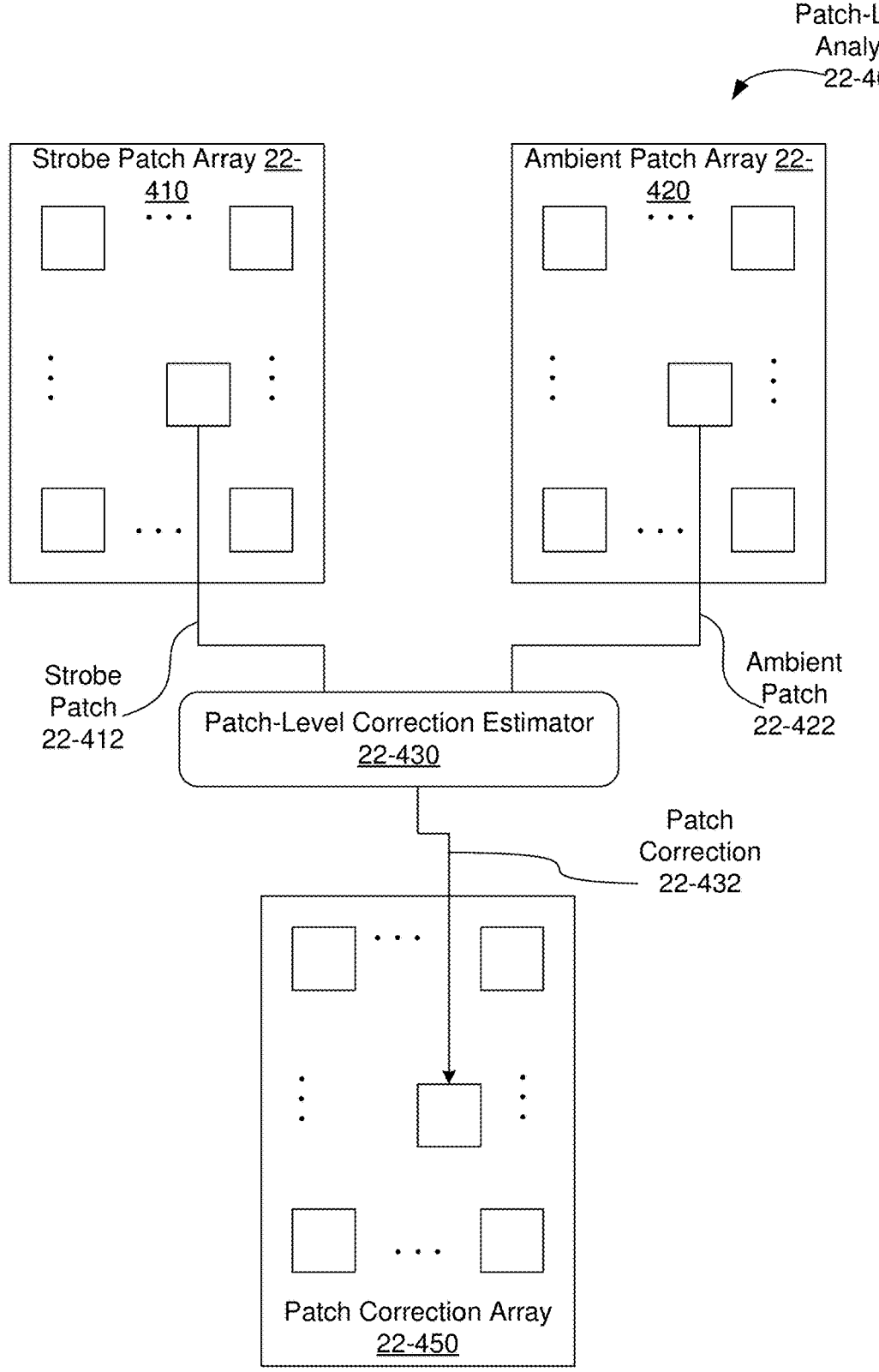
Figures 3B, 22:
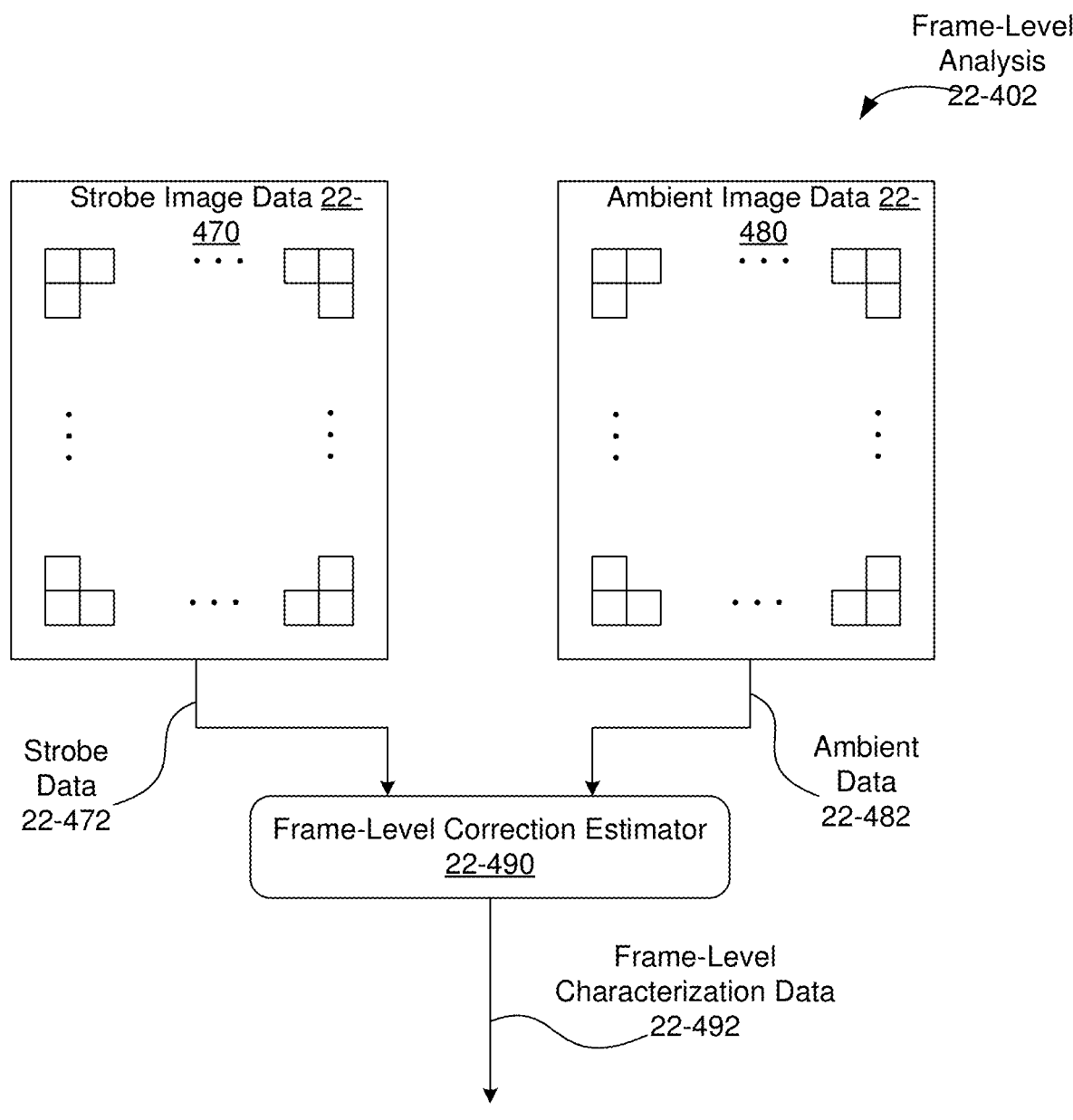
Figures 4A, 22:
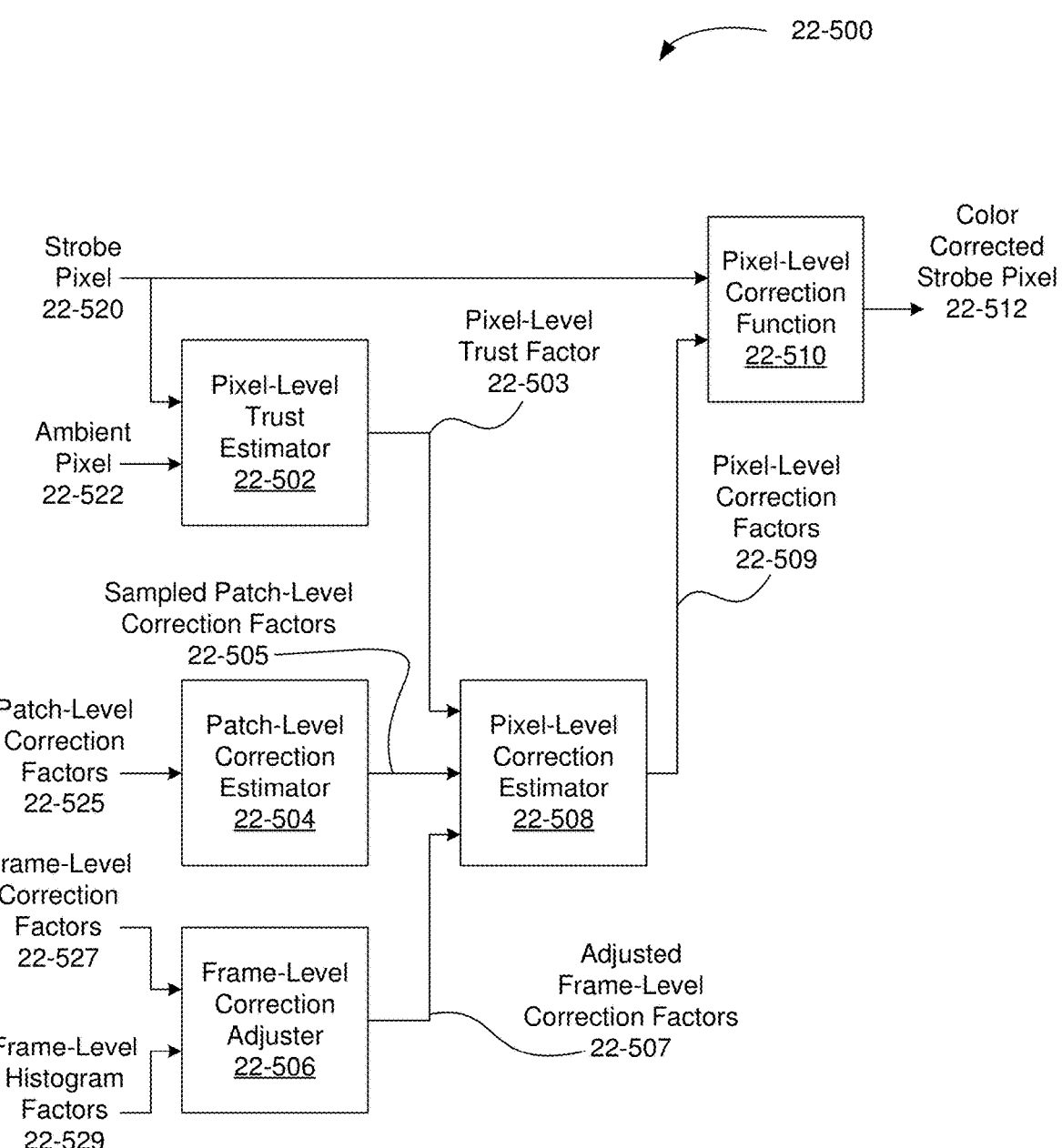
Figures 4B, 22:
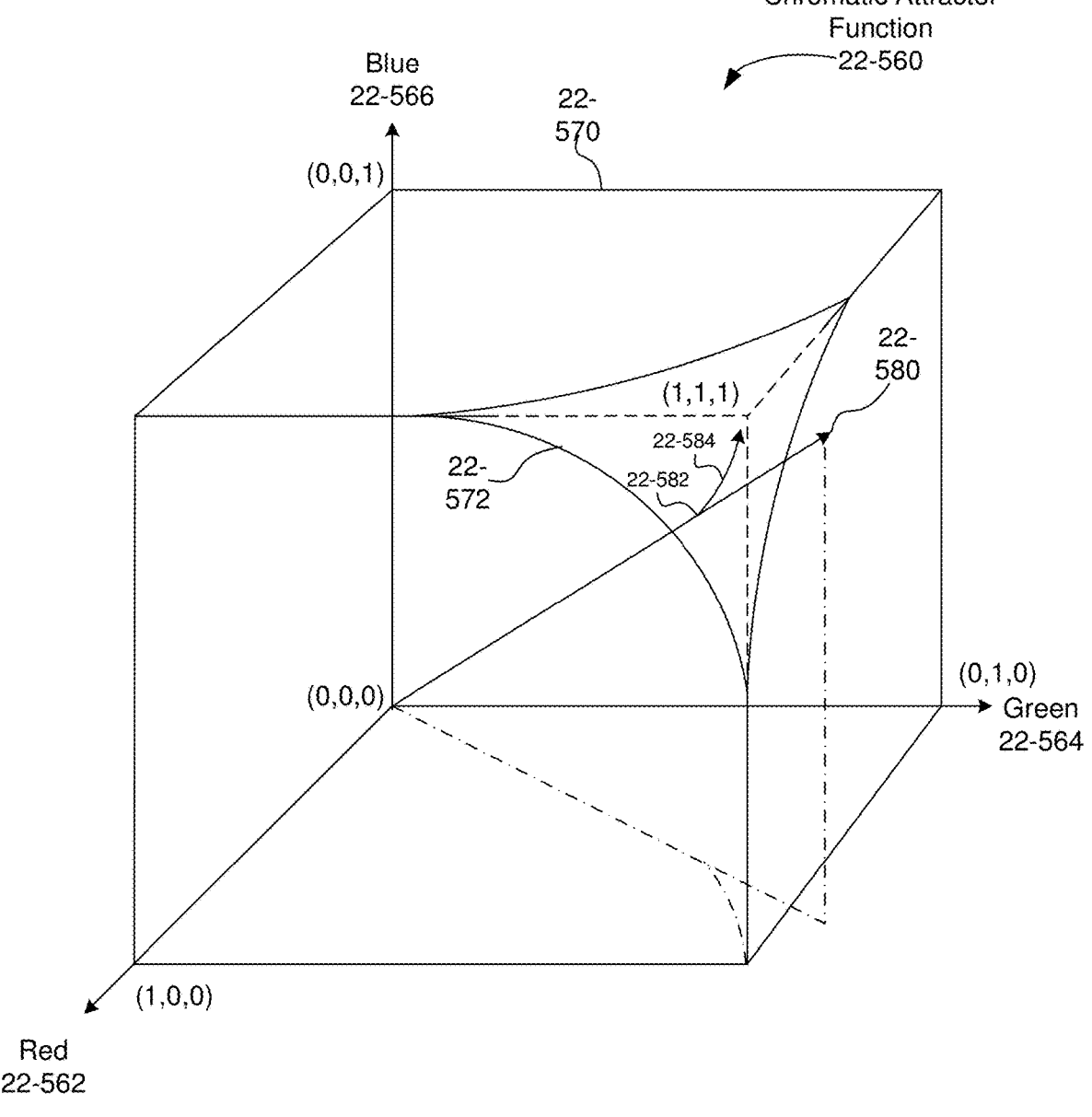
Figures 5, 22:
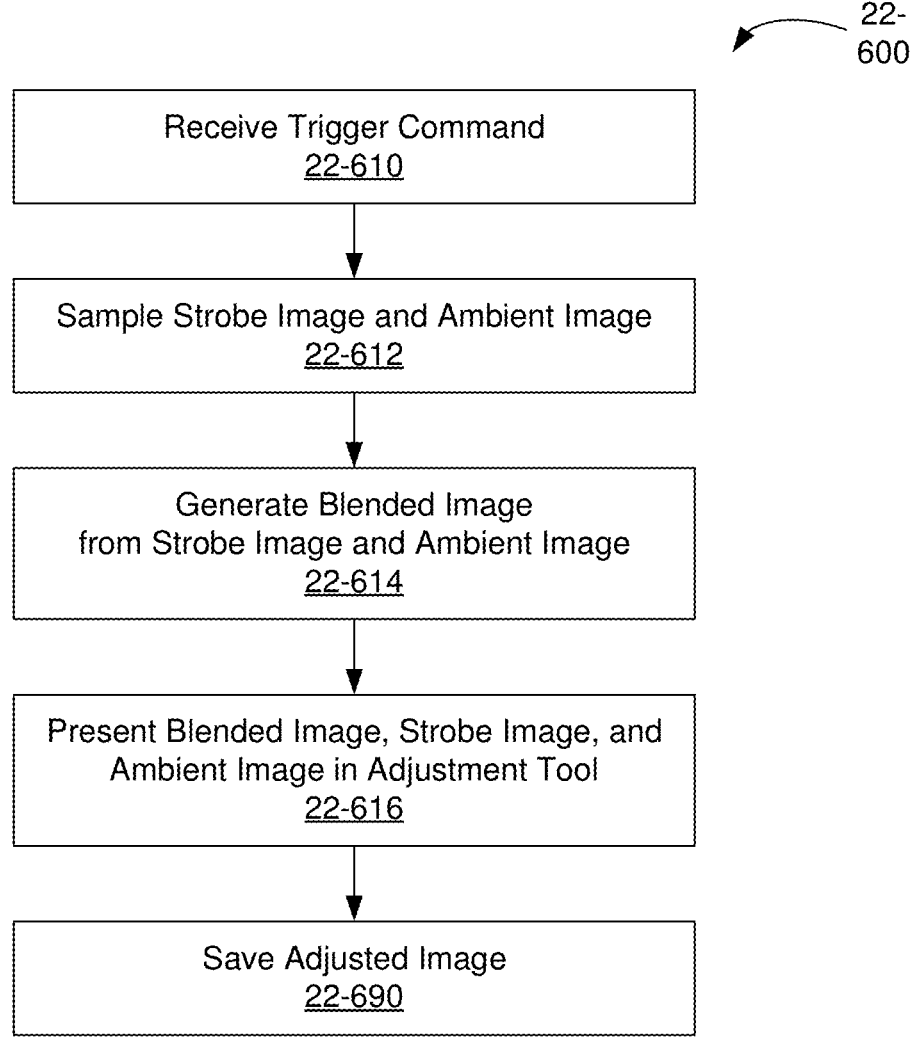

FIG. 22-2E illustrates an image blend operation for blending a strobe image with an ambient image to generate a blended image, according to one embodiment of the present invention. A strobe image 22-310 and an ambient image 22-320 of the same horizontal resolution and vertical resolution are combined via mix operation 22-346 to generate blended image 22-280 having the same resolution horizontal resolution and vertical resolution. In alternative embodiments, strobe image 22-310 or ambient image 22-320, or both images may be scaled to an arbitrary resolution defined by blended image 22-280 for processing by mix operation 22-346.

In certain settings, strobe image 22-310 and ambient image 22-320 include a region of pixels having similar intensity per pixel but different color per pixel. Differences in color may be attributed to differences in white balance for each image and different illumination contribution for each image. Because the intensity among adjacent pixels is similar, pixels within the region will cluster along diagonal 22-351 of FIGS. 22-2D and 22-2C, resulting in a distinctly unnatural speckling effect as adjacent pixels are weighted according to either strobe dominant region 22-352 or ambient dominant region 22-350. To soften this speckling effect and produce a natural appearance within these regions, blend values may be blurred, effectively reducing the discontinuity between strobe dominant region 22-352 and ambient dominant region 22-350. As is well-known in the art, blurring may be implemented by combining two or more individual samples.

In one embodiment, a blend buffer 22-315 comprises blend values 22-345, which are computed from a set of two or more blend samples. Each blend sample is computed according to blend function 22-330, described previously in FIGS. 22-2B-22-2D. In one embodiment, blend buffer 22-315 is first populated with blend samples, computed according to blend function 22-330. The blend samples are then blurred to compute each blend value 22-345, which is stored to blend buffer 22-315. In other embodiments, a first blend buffer is populated with blend samples computed according to blend function 22-330, and two or more blend samples from the first blend buffer are blurred together to generate blend each value 22-345, which is stored in blend buffer 22-315. In yet other embodiments, two or more blend samples from the first blend buffer are blurred together to generate each blend value 22-345 as needed. In still another embodiment, two or more pairs of strobe pixels 22-312 and ambient pixels 22-322 are combined to generate each blend value 22-345 as needed. Therefore, in certain embodiments, blend buffer 22-315 comprises an allocated buffer in memory, while in other embodiments blend buffer 22-315 comprises an illustrative abstraction with no corresponding allocation in memory.

As shown, strobe pixel 22-312 and ambient pixel 22-322 are mixed based on blend value 22-345 to generate blended pixel 22-332, stored in blended image 22-280. Strobe pixel 22-312, ambient pixel 22-322, and blended pixel 22-332 are located in substantially identical locations in each respective image.

In one embodiment, strobe image 22-310 corresponds to strobe image 22-210 and ambient image 22-320 corresponds to ambient image 22-220. In other embodiments, strobe image 22-310 corresponds to aligned strobe image 22-232 and ambient image 22-320 corresponds to aligned ambient image 22-234. In one embodiment, mix operation 22-346 is associated with a fragment shader, configured to execute within one or more GPU cores 22-172.

As discussed previously in FIGS. 22-1B and 22-1D, strobe image 22-210 may need to be processed to correct color that is divergent from color in corresponding ambient image 22-220. Strobe image 22-210 may include frame-level divergence, spatially localized divergence, or a combination thereof. FIGS. 22-3A and 22-3B describe techniques implemented in frame analysis operation 22-240 for computing color correction data 22-242. In certain embodiments, color correction data 22-242 comprises frame-level characterization data for correcting overall color divergence, and patch-level correction data for correcting localized color divergence. FIGS. 22-4A and 22-4B discuss techniques for implementing color correction operation 22-250, based on color correction data 22-242.

FIG. 22-3A illustrates a patch-level analysis process 22-400 for generating a patch correction array 22-450, according to one embodiment of the present invention. Patch-level analysis provides local color correction information for correcting a region of a source strobe image to be consistent in overall color balance with an associated region of a source ambient image. A patch corresponds to a region of one or more pixels within an associated source image. A strobe patch 22-412 comprises representative color information for a region of one or more pixels within strobe patch array 22-410, and an associated ambient patch 22-422 comprises representative color information for a region of one or more pixels at a corresponding location within ambient patch array 22-420.

In one embodiment, strobe patch array 22-410 and ambient patch array 22-420 are processed on a per patch basis by patch-level correction estimator 22-430 to generate patch correction array 22-450. Strobe patch array 22-410 and ambient patch array 22-420 each comprise a two-dimensional array of patches, each having the same horizontal patch resolution and the same vertical patch resolution. In alternative embodiments, strobe patch array 22-410 and ambient patch array 22-420 may each have an arbitrary resolution and each may be sampled according to a horizontal and vertical resolution for patch correction array 22-450.

In one embodiment, patch data associated with strobe patch array 22-410 and ambient patch array 22-420 may be pre-computed and stored for substantially entire corresponding source images. Alternatively, patch data associated with strobe patch array 22-410 and ambient patch array 22-420 may be computed as needed, without allocating buffer space for strobe patch array 22-410 or ambient patch array 22-420.

In data flow process 22-202 of FIG. 22-1B, the source strobe image comprises strobe image 22-210, while in data flow process 22-206 of FIG. 22-1D, the source strobe image comprises aligned strobe image 22-232. Similarly, ambient patch array 22-420 comprises a set of patches generated from a source ambient image. In data flow process 22-202, the source ambient image comprises ambient image 22-220, while in data flow process 22-206, the source ambient image comprises aligned ambient image 22-234.

In one embodiment, representative color information for each patch within strobe patch array 22-410 is generated by averaging color for a four-by-four region of pixels from the source strobe image at a corresponding location, and representative color information for each patch within ambient patch array 22-420 is generated by averaging color for a four-by-four region of pixels from the ambient source image at a corresponding location. An average color may comprise red, green and blue components. Each four-by-four region may be non-overlapping or overlapping with respect to other four-by-four regions. In other embodiments, arbitrary regions may be implemented. Patch-level correction estimator 22-430 generates patch correction 22-432 from strobe patch 22-412 and a corresponding ambient patch 22-422. In certain embodiments, patch correction 22-432 is saved to patch correction array 22-450 at a corresponding location. In one embodiment, patch correction 22-432 includes correction factors for red, green, and blue, computed according to the pseudo-code of Table 22-2, below.

TABLE 22-2

```
ratio.r = (ambient.r) / (strobe.r);
ratio.g = (ambient.g) / (strobe.g);
ratio.b = (ambient.b) / (strobe.b);
maxRatio = max(ratio.r, max(ratio.g, ratio.b));
correct.r = (ratio.r / maxRatio);
correct.g = (ratio.g / maxRatio);
correct.b = (ratio.b / maxRatio);
```

Here, "strobe.r" refers to a red component for strobe patch 22-412, "strobe.g" refers to a green component for strobe patch 22-412, and "strobe.b" refers to a blue component for strobe patch 22-412. Similarly, "ambient.r," "ambient.g," and "ambient.b" refer respectively to red, green, and blue components of ambient patch 22-422. A maximum ratio of ambient to strobe components is computed as "maxRatio," which is then used to generate correction factors, including "correct.r" for a red channel, "correct.g" for a green channel, and "correct.b" for a blue channel. Correction factors correct.r, correct.g, and correct.b together comprise patch correction 22-432. These correction factors, when applied fully in color correction operation 22-250, cause pixels associated with strobe patch 22-412 to be corrected to reflect a color balance that is generally consistent with ambient patch 22-422.

In one alternative embodiment, each patch correction 22-432 comprises a slope and an offset factor for each one of at least red, green, and blue components. Here, components of source ambient image pixels bounded by a patch are treated as function input values and corresponding components of source strobe image pixels are treated as function outputs for a curve fitting procedure that estimates slope and offset parameters for the function. For example, red components of source ambient image pixels associated with a given patch may be treated as "X" values and corresponding red pixel components of source strobe image pixels may be treated as "Y" values, to form (X,Y) points that may be processed according to a least-squares linear fit procedure, thereby generating a slope parameter and an offset parameter for the red component of the patch. Slope and offset parameters for green and blue components may be computed similarly. Slope and offset parameters for a component describe a line equation for the component. Each patch correction 22-432 includes slope and offset parameters for at least red, green, and blue components. Conceptually, pixels within an associated strobe patch may be color corrected by evaluating line equations for red, green, and blue components.

In a different alternative embodiment, each patch correction 22-432 comprises three parameters describing a quadratic function for each one of at least red, green, and blue components. Here, components of source strobe image pixels bounded by a patch are fit against corresponding components of source ambient image pixels to generate quadratic parameters for color correction. Conceptually, pixels within an associated strobe patch may be color corrected by evaluating quadratic equations for red, green, and blue components.

FIG. 22-3B illustrates a frame-level analysis process 22-402 for generating frame-level characterization data 22-492, according to one embodiment of the present invention. Frame-level correction estimator 22-490 reads strobe data 22-472 comprising pixels from strobe image data 22-470 and ambient data 22-482 comprising pixels from ambient image data 22-480 to generate frame-level characterization data 22-492.

In certain embodiments, strobe data 22-472 comprises pixels from strobe image 22-210 of FIG. 22-1A and ambient data 22-482 comprises pixels from ambient image 22-220. In other embodiments, strobe data 22-472 comprises pixels from aligned strobe image 22-232 of FIG. 22-1C, and ambient data 22-482 comprises pixels from aligned ambient image 22-234. In yet other embodiments, strobe data 22-472 comprises patches representing average color from strobe patch array 22-410, and ambient data 22-482 comprises patches representing average color from ambient patch array 22-420.

In one embodiment, frame-level characterization data 22-492 includes at least frame-level color correction factors for red correction, green correction, and blue correction. Frame-level color correction factors may be computed according to the pseudo-code of Table 22-3.

TABLE 22-3

```
ratioSum.r = (ambientSum.r) / (strobeSum.r);
ratioSum.g = (ambientSum.g) / (strobeSum.g);
ratioSum.b = (ambientSum.b) / (strobeSum.b);
maxSumRatio = max(ratioSum.r, max(ratioSum.g, ratioSum.b));
correctFrame.r = (ratioSum.r / maxSumRatio);
correctFrame.g = (ratioSum.g / maxSumRatio);
correctFrame.b = (ratioSum.b / maxSumRatio);
```

Here, "strobeSum.r" refers to a sum of red components taken over strobe image data 22-470, "strobeSum.g" refers to a sum of green components taken over strobe image data 22-470, and "strobeSum.b" refers to a sum of blue components taken over strobe image data 22-470. Similarly, "ambientSum.r," "ambientSum.g," and "ambientSum.b" each refer to a sum of components taken over ambient image data 22-480 for respective red, green, and blue components. A maximum ratio of ambient to strobe sums is computed as "maxSumRatio," which is then used to generate frame-level color correction factors, including "correctFrame.r" for a red channel, "correctFrame.g" for a green channel, and "correctFrame.b" for a blue channel. These frame-level color correction factors, when applied fully and exclusively in color correction operation 22-250, cause overall color balance of strobe image 22-210 to be corrected to reflect a color balance that is generally consistent with that of ambient image 22-220.

While overall color balance for strobe image 22-210 may be corrected to reflect overall color balance of ambient image 22-220, a resulting color corrected rendering of strobe image 22-210 based only on frame-level color correction factors may not have a natural appearance and will likely include local regions with divergent color with respect to ambient image 22-220. Therefore, as described below in FIG. 22-4A, patch-level correction may be used in conjunction with frame-level correction to generate a color corrected strobe image.

In one embodiment, frame-level characterization data 22-492 also includes at least a histogram characterization of strobe image data 22-470 and a histogram characterization of ambient image data 22-480. Histogram characterization may include identifying a low threshold intensity associated with a certain low percentile of pixels, a median threshold intensity associated with a fiftieth percentile of pixels, and a high threshold intensity associated with a high threshold percentile of pixels. In one embodiment, the low threshold intensity is associated with an approximately fifteenth percentile of pixels and a high threshold intensity is associated with an approximately eighty-fifth percentile of pixels, so that approximately fifteen percent of pixels within an associated image have a lower intensity than a calculated low threshold intensity and approximately eighty-five percent of pixels have a lower intensity than a calculated high threshold intensity.

In certain embodiments, frame-level characterization data 22-492 also includes at least a heat-map, described previously. The heat-map may be computed using individual pixels or patches representing regions of pixels. In one embodiment, the heat-map is normalized using a logarithm operator, configured to normalize a particular heat-map location against a logarithm of a total number of points contributing to the heat-map. Alternatively, frame-level characterization data 22-492 includes a factor that summarizes at least one characteristic of the heat-map, such as a diagonal clustering factor to quantify clustering along diagonal 22-351 of FIGS. 22-2C and 22-2D. This diagonal clustering factor may be used to dynamically configure a given blend surface.

While frame-level and patch-level correction coefficients have been discussed representing two different spatial extents, persons skilled in the art will recognize that more than two levels of spatial extent may be implemented without departing the scope and spirit of the present invention.

FIG. 22-4A illustrates a data flow process 22-500 for correcting strobe pixel color, according to one embodiment of the present invention. A strobe pixel 22-520 is processed to generate a color corrected strobe pixel 22-512. In one embodiment, strobe pixel 22-520 comprises a pixel associated with strobe image 22-210 of FIG. 22-1B, ambient pixel 22-522 comprises a pixel associated with ambient image 22-220, and color corrected strobe pixel 22-512 comprises a pixel associated with corrected strobe image data 22-252. In an alternative embodiment, strobe pixel 22-520 comprises a pixel associated with aligned strobe image 22-232 of FIG. 22-1D, ambient pixel 22-522 comprises a pixel associated with aligned ambient image 22-234, and color corrected strobe pixel 22-512 comprises a pixel associated with corrected strobe image data 22-252. Color corrected strobe pixel 22-512 may correspond to strobe pixel 22-312 in FIG. 22-2A, and serve as an input to blend function 22-330.

In one embodiment, patch-level correction factors 22-525 comprise one or more sets of correction factors for red, green, and blue associated with patch correction 22-432 of FIG. 22-3A, frame-level correction factors 22-527 comprise frame-level correction factors for red, green, and blue associated with frame-level characterization data 22-492 of FIG. 22-3B, and frame-level histogram factors 22-529 comprise at least a low threshold intensity and a median threshold intensity for both an ambient histogram and a strobe histogram associated with frame-level characterization data 22-492.

A pixel-level trust estimator 22-502 computes a pixel-level trust factor 22-503 from strobe pixel 22-520 and ambient pixel 22-522. In one embodiment, pixel-level trust factor 22-503 is computed according to the pseudo-code of Table 22-4, where strobe pixel 22-520 corresponds to strobePixel, ambient pixel 22-522 corresponds to ambientPixel, and pixel-level trust factor 22-503 corresponds to pixelTrust. Here, ambientPixel and strobePixel may comprise a vector variable, such as a well known vec3 or vec4 vector variable.

TABLE 22-4

```
ambientIntensity = intensity (ambientPixel);
strobeIntensity = intensity (strobePixel);
stepInput = ambientIntensity * strobeIntensity;
pixelTrust = smoothstep (lowEdge, highEdge, stepInput);
```

Here, an intensity function may implement Equation 22-1 to compute ambientIntensity and strobeIntensity, corresponding respectively to an intensity value for ambientPixel and an intensity value for strobePixel. While the same intensity function is shown computing both ambientIntensity and strobeIntensity, certain embodiments may compute each intensity value using a different intensity function. A product operator may be used to compute stepinput, based on ambientIntensity and strobeIntensity. The well-known smoothstep function implements a relatively smoothly transition from 0.0 to 1.0 as stepinput passes through lowEdge and then through highEdge. In one embodiment, lowEge=0.25 and highEdge=0.66.

A patch-level correction estimator 22-504 computes patch-level correction factors 22-505 by sampling patch-level correction factors 22-525. In one embodiment, patch-level correction estimator 22-504 implements bilinear sampling over four sets of patch-level color correction samples to generate sampled patch-level correction factors 22-505. In an alternative embodiment, patch-level correction estimator 22-504 implements distance weighted sampling over four or more sets of patch-level color correction samples to generate sampled patch-level correction factors 22-505. In another alternative embodiment, a set of sampled patch-level correction factors 22-505 is computed using pixels within a region centered about strobe pixel 22-520. Persons skilled in the art will recognize that any technically feasible technique for sampling one or more patch-level correction factors to generate sampled patch-level correction factors 22-505 is within the scope and spirit of the present invention.

In one embodiment, each one of patch-level correction factors 22-525 comprises a red, green, and blue color channel correction factor. In a different embodiment, each one of the patch-level correction factors 22-525 comprises a set of line equation parameters for red, green, and blue color channels. Each set of line equation parameters may include a slope and an offset. In another embodiment, each one of the patch-level correction factors 22-525 comprises a set of quadratic curve parameters for red, green, and blue color channels. Each set of quadratic curve parameters may include a square term coefficient, a linear term coefficient, and a constant.

In one embodiment, frame-level correction adjuster 22-506 computes adjusted frame-level correction factors 22-507 (adjCorrectFrame) from the frame-level correction factors for red, green, and blue according to the pseudo-code of Table 22-5. Here, a mix operator may function according to Equation 22-2, where variable A corresponds to 1.0, variable B corresponds to a correctFrame color value, and frameTrust may be computed according to an embodiment described below in conjunction with the pseudo-code of Table 22-5. As discussed previously, correctFrame comprises frame-level correction factors. Parameter frameTrust quantifies how trustworthy a particular pair of ambient image and strobe image may be for performing frame-level color correction.

TABLE 22-5

```
adjCorrectFrame.r = mix(1.0, correctFrame.r, frameTrust);
adjCorrectFrame.g = mix(1.0, correctFrame.g, frameTrust);
adjCorrectFrame.b = mix(1.0, correctFrame.b, frameTrust);
```

When frameTrust approaches zero (correction factors not trustworthy), the adjusted frame-level correction factors 22-507 converge to 1.0, which yields no frame-level color correction. When frameTrust is 1.0 (completely trustworthy), the adjusted frame-level correction factors 22-507 converge to values calculated previously in Table 22-3. The pseudo-code of Table 22-5 illustrates one technique for calculating frameTrust.

TABLE 22-5

```
strobeExp = (WSL*SL + WSM*SM + WSH*SH) / (WSL +
WSM + WSH);
ambientExp = (WAL*SL + WAM*SM + WAH*SH) / (WAL +
WAM + WAH);
frameTrustStrobe = smoothstep (SLE, SHE, strobeExp);
frameTrustAmbient = smoothstep (ALE, AHE, ambientExp);
frameTrust = frameTrustStrobe * frameTrustAmbient;
```

Here, strobe exposure (strobeExp) and ambient exposure (ambientExp) are each characterized as a weighted sum of corresponding low threshold intensity, median threshold intensity, and high threshold intensity values. Constants WSL, WSM, and WSH correspond to strobe histogram contribution weights for low threshold intensity, median threshold intensity, and high threshold intensity values, respectively. Variables SL, SM, and SH correspond to strobe histogram low threshold intensity, median threshold intensity, and high threshold intensity values, respectively. Similarly, constants WAL, WAM, and WAH correspond to ambient histogram contribution weights for low threshold intensity, median threshold intensity, and high threshold intensity values, respectively; and variables AL, AM, and AH correspond to ambient histogram low threshold intensity, median threshold intensity, and high threshold intensity values, respectively. A strobe frame-level trust value (frameTrustStrobe) is computed for a strobe frame associated with strobe pixel 22-520 to reflect how trustworthy the strobe frame is for the purpose of frame-level color correction. In one embodiment, WSL=WAL=1.0, WSM=WAM=2.0, and WSH=WAH=0.0. In other embodiments, different weights may be applied, for example, to customize the techniques taught herein to a particular camera apparatus. In certain embodiments, other percentile thresholds may be measured, and different combinations of weighted sums may be used to compute frame-level trust values.

In one embodiment, a smoothstep function with a strobe low edge (SLE) and strobe high edge (SHE) is evaluated based on strobeExp. Similarly, a smoothstep function with ambient low edge (ALE) and ambient high edge (AHE) is evaluated to compute an ambient frame-level trust value (frameTrustAmbient) for an ambient frame associated with ambient pixel 22-522 to reflect how trustworthy the ambient frame is for the purpose of frame-level color correction. In one embodiment, SLE=ALE=0.15, and SHE=AHE=0.30. In other embodiments, different low and high edge values may be used.

In one embodiment, a frame-level trust value (frameTrust) for frame-level color correction is computed as the product of frameTrustStrobe and frameTrustAmbient. When both the strobe frame and the ambient frame are sufficiently exposed and therefore trustworthy frame-level color references, as indicated by frameTrustStrobe and frameTrustAmbient, the product of frameTrustStrobe and frameTrustAmbient will reflect a high trust for frame-level color correction. If either the strobe frame or the ambient frame is inadequately exposed to be a trustworthy color reference, then a color correction based on a combination of strobe frame and ambient frame should not be trustworthy, as reflected by a low or zero value for frameTrust.

In an alternative embodiment, the frame-level trust value (frameTrust) is generated according to direct user input, such as via a UI color adjustment tool having a range of control positions that map to a frameTrust value. The UI color adjustment tool may generate a full range of frame-level trust values (0.0 to 1.0) or may generate a value constrained to a computed range. In certain settings, the mapping may be non-linear to provide a more natural user experience. In one embodiment, the control position also influences pixel-level trust factor 22-503 (pixelTrust), such as via a direct bias or a blended bias.

A pixel-level correction estimator 22-508 is configured to generate pixel-level correction factors 22-509 (pixCorrection) from sampled patch-level correction factors 22-505 (correct), adjusted frame-level correction factors 22-507, and pixel-level trust factor 22-503. In one embodiment, pixel-level correction estimator 22-508 comprises a mix function, whereby sampled patch-level correction factors 22-505 is given substantially full mix weight when pixel-level trust factor 22-503 is equal to 1.0 and adjusted frame-level correction factors 22-507 is given substantially full mix weight when pixel-level trust factor 22-503 is equal to 0.0. Pixel-level correction estimator 22-508 may be implemented according to the pseudo-code of Table 22-7.

TABLE 22-7

```
pixCorrection.r = mix(adjCorrectFrame.r, correct.r, pixelTrust);
pixCorrection.g = mix(adjCorrectFrame.g, correct.g, pixelTrust);
pixCorrection.b = mix(adjCorrectFrame.b, correct.b, pixelTrust);
```

In another embodiment, line equation parameters comprising slope and offset define sampled patch-level correction factors 22-505 and adjusted frame-level correction factors 22-507. These line equation parameters are mixed within pixel-level correction estimator 22-508 according to pixelTrust to yield pixel-level correction factors 22-509 comprising line equation parameters for red, green, and blue channels. In yet another embodiment, quadratic parameters define sampled patch-level correction factors 22-505 and adjusted frame-level correction factors 22-507. In one embodiment, the quadratic parameters are mixed within pixel-level correction estimator 22-508 according to pixelTrust to yield pixel-level correction factors 22-509 comprising quadratic parameters for red, green, and blue channels. In another embodiment, quadratic equations are evaluated separately for frame-level correction factors and patch level correction factors for each color channel, and the results of evaluating the quadratic equations are mixed according to pixelTrust.

In certain embodiments, pixelTrust is at least partially computed by image capture information, such as exposure time or exposure ISO index. For example, if an image was captured with a very long exposure at a very high ISO index, then the image may include significant chromatic noise and may not represent a good frame-level color reference for color correction.

Pixel-level correction function 22-510 generates color corrected strobe pixel 22-512 from strobe pixel 22-520 and pixel-level correction factors 22-509. In one embodiment, pixel-level correction factors 22-509 comprise correction factors pixCorrection.r, pixCorrection.g, and pixCorrection.b and color corrected strobe pixel 22-512 is computed according to the pseudo-code of Table 22-8.

TABLE 22-8

```
// scale red, green, blue
vec3 pixCorrection = (pixCorrection.r, pixCorrection.g, pixCorrection.b);
vec3 deNormCorrectedPixel = strobePixel * pixCorrection;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

Here, pixCorrection comprises a vector of three components (vec3) corresponding pixel-level correction factors pixCorrection.r, pixCorrection.g, and pixCorrection.b. A de-normalized, color corrected pixel is computed as deNormCorrectedPixel. A pixel comprising a red, green, and blue component defines a color vector in a three-dimensional space, the color vector having a particular length. The length of a color vector defined by deNormCorrectedPixel may be different with respect to a color vector defined by strobePixel. Altering the length of a color vector changes the intensity of a corresponding pixel. To maintain proper intensity for color corrected strobe pixel 22-512, deNormCorrectedPixel is re-normalized via normalizeFactor, which is computed as a ratio of length for a color vector defined by strobePixel to a length for a color vector defined by deNormCorrectedPixel. Color vector normCorrectedPixel includes pixel-level color correction and re-normalization to maintain proper pixel intensity. A length function may be performed using any technically feasible technique, such as calculating a square root of a sum of squares for individual vector component lengths.

A chromatic attractor function (cAttractor) gradually converges an input color vector to a target color vector as the input color vector increases in length. Below a threshold length, the chromatic attractor function returns the input color vector. Above the threshold length, the chromatic attractor function returns an output color vector that is increasingly convergent on the target color vector. The chromatic attractor function is described in greater detail below in FIG. 22-4B.

In alternative embodiments, pixel-level correction factors comprise a set of line equation parameters per color channel, with color components of strobePixel comprising function inputs for each line equation. In such embodiments, pixel-level correction function 22-510 evaluates the line equation parameters to generate color corrected strobe pixel 22-512. This evaluation process is illustrated in the pseudo-code of Table 22-9.

TABLE 22-9

```
// evaluate line equation based on strobePixel for red, green, blue
vec3 pixSlope = (pixSlope.r, pixSlope.g, pixSlope.b);
vec3 pixOffset = (pixOffset.r, pixOffset.g, pixOffset.b);
vec3 deNormCorrectedPixel = (strobePixel * pixSlope) + pixOffset;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

In other embodiments, pixel level correction factors comprise a set of quadratic parameters per color channel, with color components of strobePixel comprising function inputs for each quadratic equation. In such embodiments, pixel-level correction function 22-510 evaluates the quadratic equation parameters to generate color corrected strobe pixel 22-512.

In certain embodiments chromatic attractor function (cAttractor) implements a target color vector of white (1, 1,1), and causes very bright pixels to converge to white, providing a natural appearance to bright portions of an image. In other embodiments, a target color vector is computed based on spatial color information, such as an average color for a region of pixels surrounding the strobe pixel. In still other embodiments, a target color vector is computed based on an average frame-level color. A threshold length associated with the chromatic attractor function may be defined as a constant, or, without limitation, by a user input, a characteristic of a strobe image or an ambient image or a combination thereof. In an alternative embodiment, pixel-level correction function 22-510 does not implement the chromatic attractor function.

In one embodiment, a trust level is computed for each patch-level correction and applied to generate an adjusted patch-level correction factor comprising sampled patch-level correction factors 22-505. Generating the adjusted patch-level correction may be performed according to the techniques taught herein for generating adjusted frame-level correction factors 22-507.

Other embodiments include two or more levels of spatial color correction for a strobe image based on an ambient image, where each level of spatial color correction may contribute a non-zero weight to a color corrected strobe image comprising one or more color corrected strobe pixels. Such embodiments may include patches of varying size comprising varying shapes of pixel regions without departing the scope of the present invention.

FIG. 22-4B illustrates a chromatic attractor function 22-560, according to one embodiment of the present invention. A color vector space is shown having a red axis 22-562, a green axis 22-564, and a blue axis 22-566. A unit cube 22-570 is bounded by an origin at coordinate (0, 0, 0) and an opposite corner at coordinate (1, 1, 1). A surface 22-572 having a threshold distance from the origin is defined within the unit cube. Color vectors having a length that is shorter than the threshold distance are conserved by the chromatic attractor function 22-560. Color vectors having a length that is longer than the threshold distance are converged towards a target color. For example, an input color vector 22-580 is defined along a particular path that describes the color of the input color vector 22-580, and a length that describes the intensity of the color vector. The distance from the origin to point 22-582 along input color vector 22-580 is equal to the threshold distance. In this example, the target color is pure white (1, 1, 1), therefore any additional length associated with input color vector 22-580 beyond point 22-582 follows path 22-584 towards the target color of pure white.

One implementation of chromatic attractor function 22-560, comprising the cAttractor function of Tables 22-8 and 22-9 is illustrated in the pseudo-code of Table 22-10.

TABLE 22-10

```
extraLength = max(length (inputColor), distMin) ;
mixValue= (extraLength – distMin) / (distMax– distMin);
outputColor = mix (inputColor, targetColor, mixValue);
```

Here, a length value associated with inputColor is compared to distMin, which represents the threshold distance. If the length value is less than distMin, then the "max" operator returns distMin. The mixValue term calculates a parameterization from 0.0 to 1.0 that corresponds to a length value ranging from the threshold distance to a maximum possible length for the color vector, given by the square root of 3.0. If extraLength is equal to distMin, then mixValue is set equal to 0.0 and outputColor is set equal to the input-Color by the mix operator. Otherwise, if the length value is greater than distMin, then mixValue represents the parameterization, enabling the mix operator to appropriately converge inputColor to targetColor as the length of inputColor approaches the square root of 3.0. In one embodiment, distMax is equal to the square root of 3.0 and distMin=1.45. In other embodiments different values may be used for distMax and distMin. For example, if distMin=1.0, then chromatic attractor 22-560 begins to converge to targetColor much sooner, and at lower intensities. If distMax is set to a larger number, then an inputPixel may only partially converge on targetColor, even when inputPixel has a very high intensity. Either of these two effects may be beneficial in certain applications.

While the pseudo-code of Table 22-10 specifies a length function, in other embodiments, computations may be performed in length-squared space using constant squared values with comparable results.

In one embodiment, targetColor is equal to (1,1,1), which represents pure white and is an appropriate color to "burn" to in overexposed regions of an image rather than a color dictated solely by color correction. In another embodiment, targetColor is set to a scene average color, which may be arbitrary. In yet another embodiment, targetColor is set to a color determined to be the color of an illumination source within a given scene.

FIG. 22-5 is a flow diagram of method 22-500 for generating an adjusted digital photograph, according to one embodiment of the present invention. Although the method steps are described in conjunction with the systems disclosed herein, persons skilled in the art will understand that any system configured to perform the method steps, in any order, is within the scope of the present invention.

Method 22-500 begins in step 22-510, where a digital photographic system, such as digital photographic system 300 of FIG. 3A, receives a trigger command to take a digital photograph. The trigger command may comprise a user input event, such as a button press, remote control command related to a button press, completion of a timer count down, an audio indication, or any other technically feasible user input event. In one embodiment, the digital photographic system implements digital camera 302 of FIG. 3C, and the trigger command is generated when shutter release button 315 is pressed. In another embodiment, the digital photographic system implements mobile device 376 of FIG. 3D, and the trigger command is generated when a UI button is pressed.

In step 22-512, the digital photographic system samples a strobe image and an ambient image. In one embodiment, the strobe image is taken before the ambient image. Alternatively, the ambient image is taken before the strobe image. In certain embodiments, a white balance operation is performed on the ambient image. Independently, a white balance operation may be performed on the strobe image. In other embodiments, such as in scenarios involving raw digital photographs, no white balance operation is applied to either the ambient image or the strobe image.

In step 22-514, the digital photographic system generates a blended image from the strobe image and the ambient image. In one embodiment, the digital photographic system generates the blended image according to data flow process 22-200 of FIG. 22-1A. In a second embodiment, the digital photographic system generates the blended image according to data flow process 22-202 of FIG. 22-1B. In a third embodiment, the digital photographic system generates the blended image according to data flow process 22-204 of FIG. 22-1C. In a fourth embodiment, the digital photographic system generates the blended image according to data flow process 22-206 of FIG. 22-1D. In each of these embodiments, the strobe image comprises strobe image 22-210, the ambient image comprises ambient image 22-220, and the blended image comprises blended image 22-280.

In step 22-516, the digital photographic system presents an adjustment tool configured to present at least the blended image, the strobe image, and the ambient image, according to a transparency blend among two or more of the images. The transparency blend may be controlled by a user interface slider. The adjustment tool may be configured to save a particular blend state of the images as an adjusted image. The adjustment tool is described in greater detail hereinabove.

The method terminates in step 22-590, where the digital photographic system saves at least the adjusted image.

Figures 6A, 6B, 22:
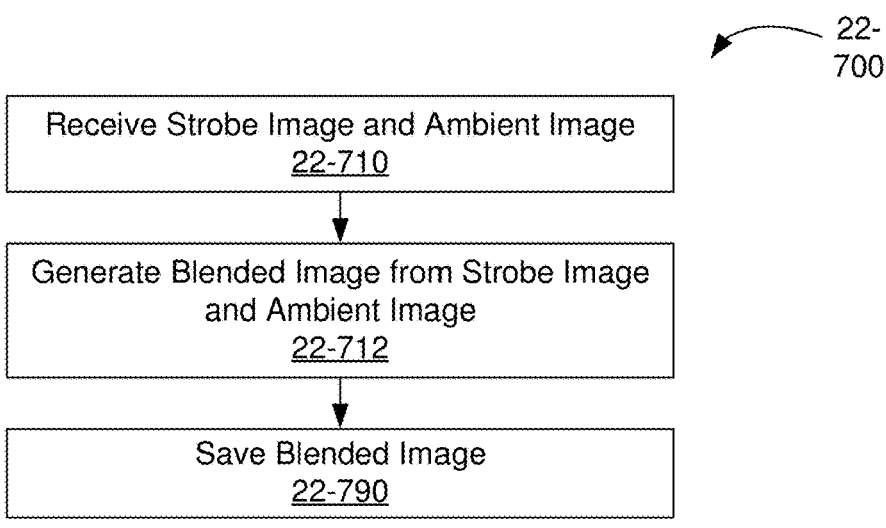

FIG. 22-6A is a flow diagram of method 22-700 for blending a strobe image with an ambient image to generate a blended image, according to a first embodiment of the present invention. Although the method steps are described in conjunction with the systems of FIGS. 3A-3D, persons skilled in the art will understand that any system configured to perform the method steps, in any order, is within the scope of the present invention. In one embodiment, method 22-700 implements data flow 22-200 of FIG. 22-1A. The strobe image and the ambient image each comprise at least one pixel and may each comprise an equal number of pixels.

The method begins in step 22-710, where a processor complex within a digital photographic system, such as processor complex 310 within digital photographic system 300 of FIG. 3A, receives a strobe image and an ambient image, such as strobe image 22-210 and ambient image 22-220, respectively. In step 22-712, the processor complex generates a blended image, such as blended image 22-280, by executing a blend operation 22-270 on the strobe image and the ambient image. The method terminates in step 22-790, where the processor complex saves the blended image, for example to NV memory 316, volatile memory 318, or memory system 362.

FIG. 22-6B is a flow diagram of method 22-702 for blending a strobe image with an ambient image to generate a blended image, according to a second embodiment of the present invention. Although the method steps are described in conjunction with the systems of FIGS. 3A-3D, persons skilled in the art will understand that any system configured to perform the method steps, in any order, is within the scope of the present invention. In one embodiment, method 22-702 implements data flow 22-202 of FIG. 22-1B. The strobe image and the ambient image each comprise at least one pixel and may each comprise an equal number of pixels.

The method begins in step 22-720, where a processor complex within a digital photographic system, such as processor complex 310 within digital photographic system 300 of FIG. 3A, receives a strobe image and an ambient image, such as strobe image 22-210 and ambient image 22-220, respectively. In step 22-722, the processor complex generates a color corrected strobe image, such as corrected strobe image data 22-252, by executing a frame analysis operation 22-240 on the strobe image and the ambient image and executing a color correction operation 22-250 on the strobe image. In step 22-724, the processor complex generates a blended image, such as blended image 22-280, by executing a blend operation 22-270 on the color corrected strobe image and the ambient image. The method terminates in step 22-792, where the processor complex saves the blended image, for example to NV memory 316, volatile memory 318, or memory system 362.

Figures 7A, 22:
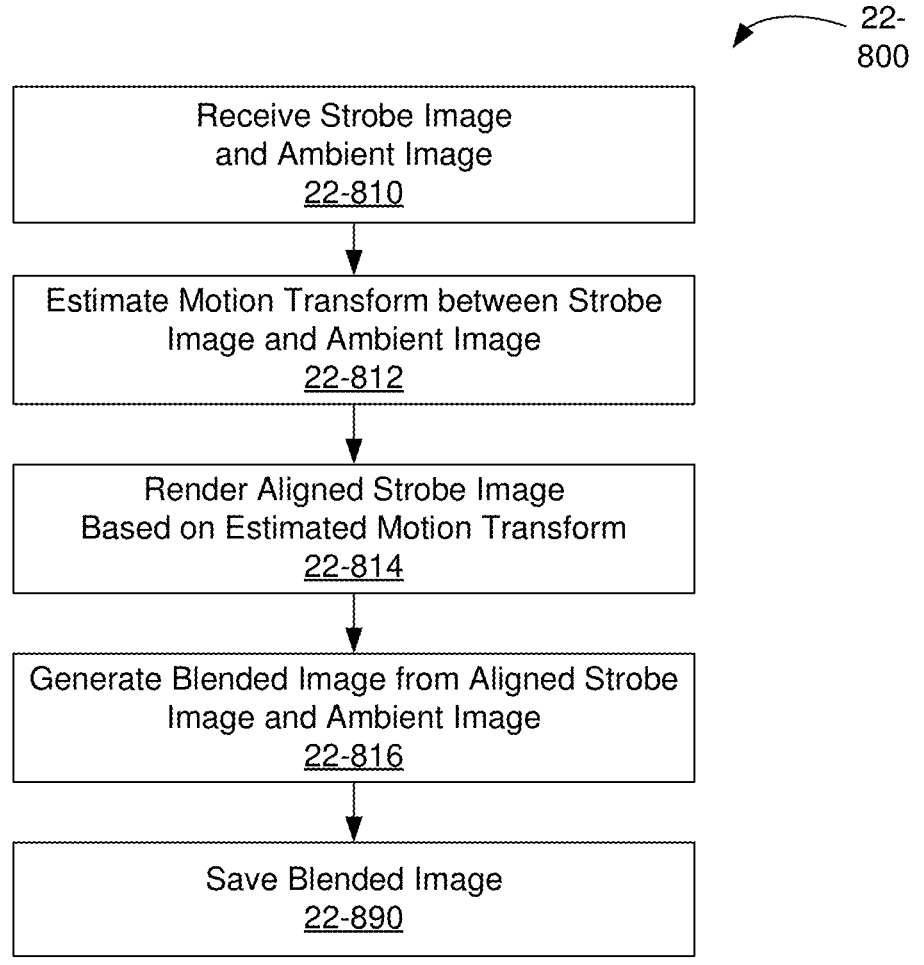

FIG. 22-7A is a flow diagram of method 22-800 for blending a strobe image with an ambient image to generate a blended image, according to a third embodiment of the present invention. Although the method steps are described in conjunction with the systems of FIGS. 3A-3D, persons skilled in the art will understand that any system configured to perform the method steps, in any order, is within the scope of the present invention. In one embodiment, method 22-800 implements data flow 22-204 of FIG. 22-1C. The strobe image and the ambient image each comprise at least one pixel and may each comprise an equal number of pixels.

The method begins in step 22-810, where a processor complex within a digital photographic system, such as processor complex 310 within digital photographic system 300 of FIG. 3A, receives a strobe image and an ambient image, such as strobe image 22-210 and ambient image 22-220, respectively. In step 22-812, the processor complex estimates a motion transform between the strobe image and the ambient image. In step 22-814, the processor complex renders at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 22-812 and 814 together comprise alignment operation 22-230. In step 22-816, the processor complex generates a blended image, such as blended image 22-280, by executing a blend operation 22-270 on the aligned strobe image and the aligned ambient image. The method terminates in step 22-890, where the processor complex saves the blended image, for example to NV memory 316, volatile memory 318, or memory system 362.

Figures 7B, 22:
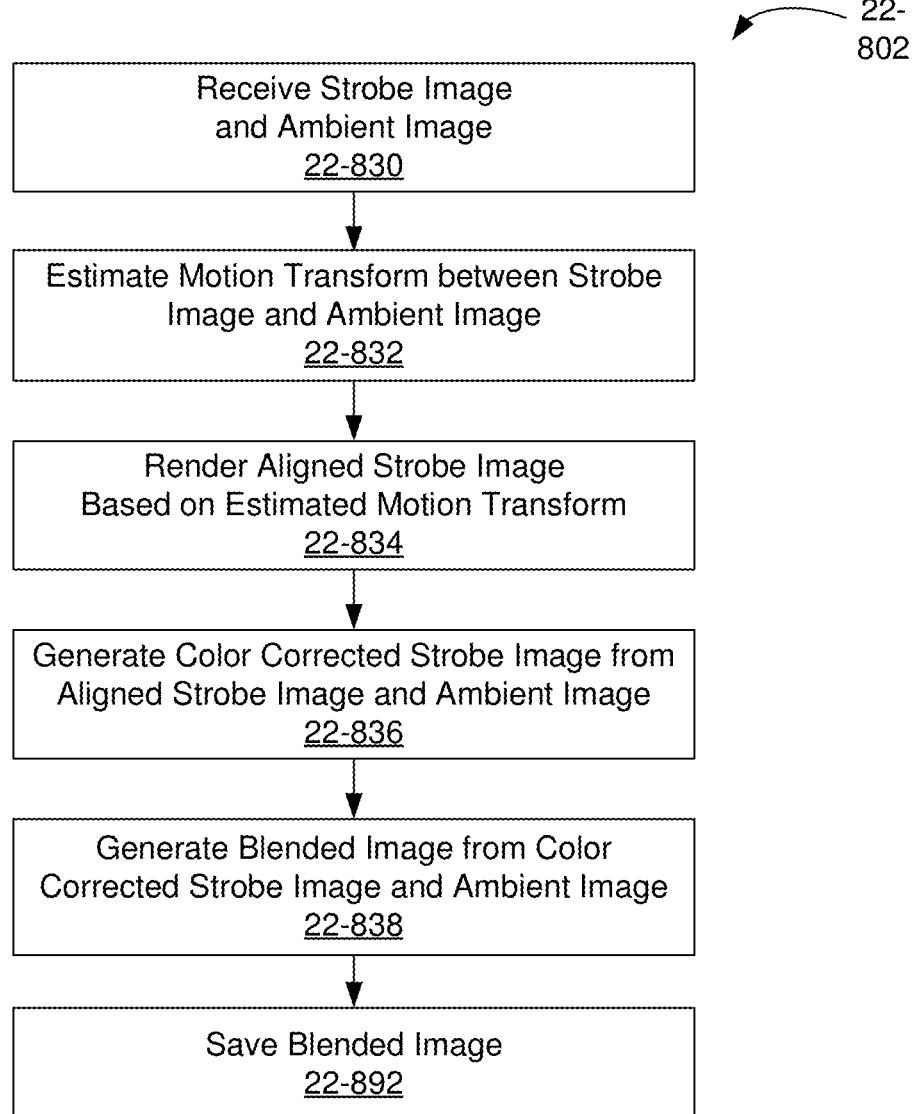

FIG. 22-7B is a flow diagram of method steps for blending a strobe image with an ambient image to generate a blended image, according to a fourth embodiment of the present invention. Although the method steps are described in conjunction with the systems of FIGS. 3A-3D, persons skilled in the art will understand that any system configured to perform the method steps, in any order, is within the scope of the present invention. In one embodiment, method 22-802 implements data flow 22-206 of FIG. 22-1D. The strobe image and the ambient image each comprise at least one pixel and may each comprise an equal number of pixels.

The method begins in step 22-830, where a processor complex within a digital photographic system, such as processor complex 310 within digital photographic system 300 of FIG. 3A, receives a strobe image and an ambient image, such as strobe image 22-10 and ambient image 22-220, respectively. In step 22-832, the processor complex estimates a motion transform between the strobe image and the ambient image. In step 22-834, the processor complex may render at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 22-832 and 834 together comprise alignment operation 22-230.

In step 22-836, the processor complex generates a color corrected strobe image, such as corrected strobe image data 22-252, by executing a frame analysis operation 22-240 on the aligned strobe image and the aligned ambient image and executing a color correction operation 22-250 on the aligned strobe image. In step 22-838, the processor complex generates a blended image, such as blended image 22-280, by executing a blend operation 22-270 on the color corrected strobe image and the aligned ambient image. The method terminates in step 22-892, where the processor complex saves the blended image, for example to NV memory 316, volatile memory 318, or memory system 362.

While the techniques taught herein are discussed above in the context of generating a digital photograph having a natural appearance from an underlying strobe image and ambient image with potentially discordant color, these techniques may be applied in other usage models as well.

For example, when compositing individual images to form a panoramic image, color inconsistency between two adjacent images can create a visible seam, which detracts from overall image quality. Persons skilled in the art will recognize that frame analysis operation 22-240 may be used in conjunction with color correction operation 22-250 to generated panoramic images with color-consistent seams, which serve to improve overall image quality. In another example, frame analysis operation 22-240 may be used in conjunction with color correction operation 22-250 to improve color consistency within high dynamic range (HDR) images.

In yet another example, multispectral imaging may be improved by enabling the addition of a strobe illuminator, while maintaining spectral consistency. Multispectral imaging refers to imaging of multiple, arbitrary wavelength ranges, rather than just conventional red, green, and blue ranges. By applying the above techniques, a multispectral image may be generated by blending two or more multispectral images having different illumination sources.

In still other examples, the techniques taught herein may be applied in an apparatus that is separate from digital photographic system 22-100 of FIG. 22-1A. Here, digital photographic system 22-100 may be used to generate and store a strobe image and an ambient image. The strobe image and ambient image are then combined later within a computer system, disposed locally with a user, or remotely within a cloud-based computer system. In one embodiment, method 22-802 comprises a software module operable with an image processing tool to enable a user to read the strobe image and the ambient image previously stored, and to generate a blended image within a computer system that is distinct from digital photographic system 22-100.

Persons skilled in the art will recognize that while certain intermediate image data may be discussed in terms of a particular image or image data, these images serve as illustrative abstractions. Such buffers may be allocated in certain implementations, while in other implementations intermediate data is only stored as needed. For example, aligned strobe image 22-232 may be rendered to completion in an allocated image buffer during a certain processing step or steps, or alternatively, pixels associated with an abstraction of an aligned image may be rendered as needed without a need to allocate an image buffer to store aligned strobe image 22-232.

While the techniques described above discuss color correction operation 22-250 in conjunction with a strobe image that is being corrected to an ambient reference image, a strobe image may serve as a reference image for correcting an ambient image. In one embodiment ambient image 22-220 is subjected to color correction operation 22-250, and blend operation 22-270 operates as previously discussed for blending an ambient image and a strobe image.

In summary, a technique is disclosed for generating a digital photograph that beneficially blends an ambient image sampled under ambient lighting conditions and a strobe image sampled under strobe lighting conditions. The strobe image is blended with the ambient image based on a function that implements a blend surface. Discordant spatial coloration between the strobe image and the ambient image is corrected via a spatial color correction operation. An adjustment tool implements a user interface technique that enables a user to select and save a digital photograph from a gradation of parameters for combining related images.

On advantage of the present invention is that a digital photograph may be generated having consistent white balance in a scene comprising regions illuminated primarily by a strobe of one color balance and other regions illuminated primarily by ambient illumination of a different color balance.

Figures 1, 23:
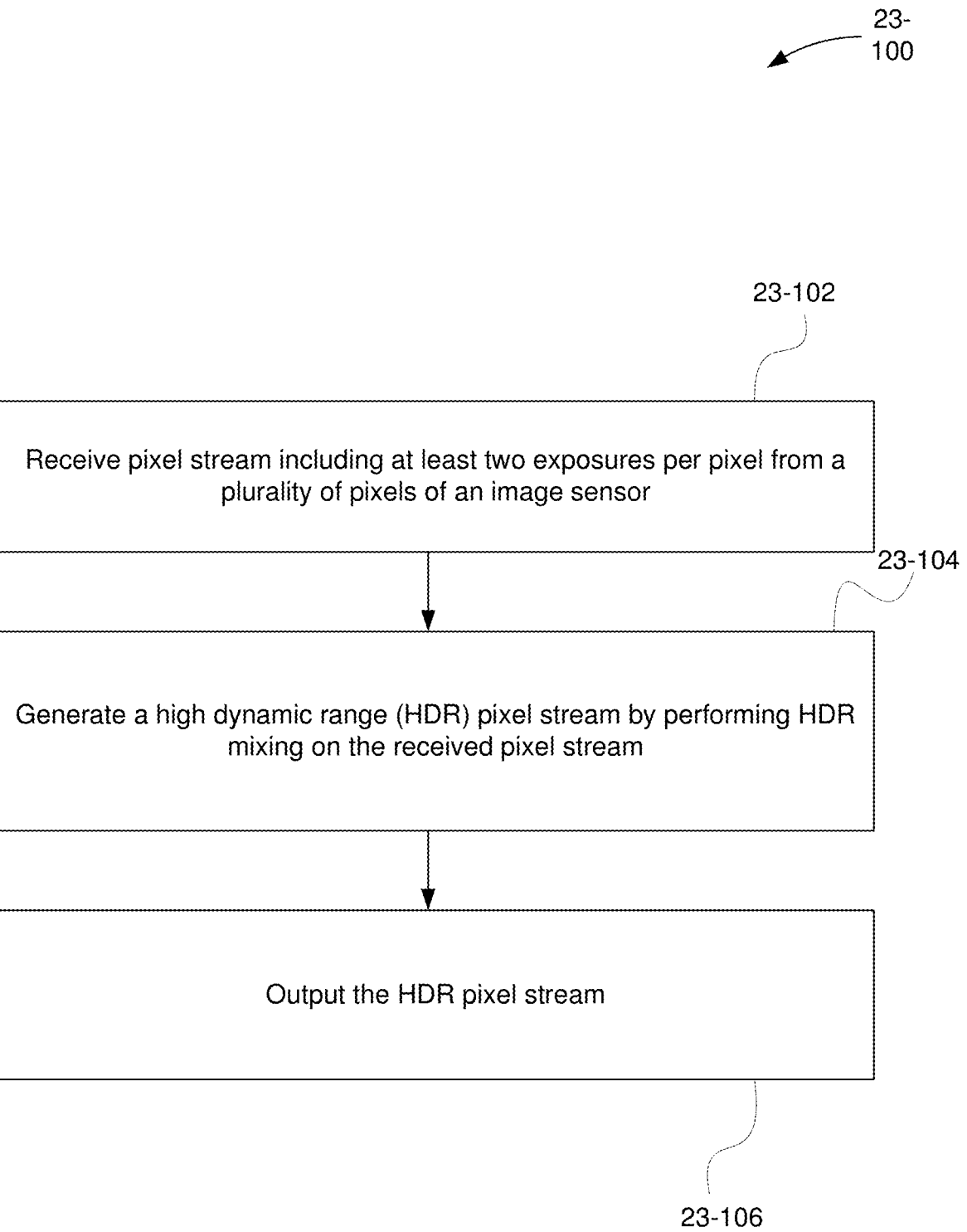
Figures 2, 23:
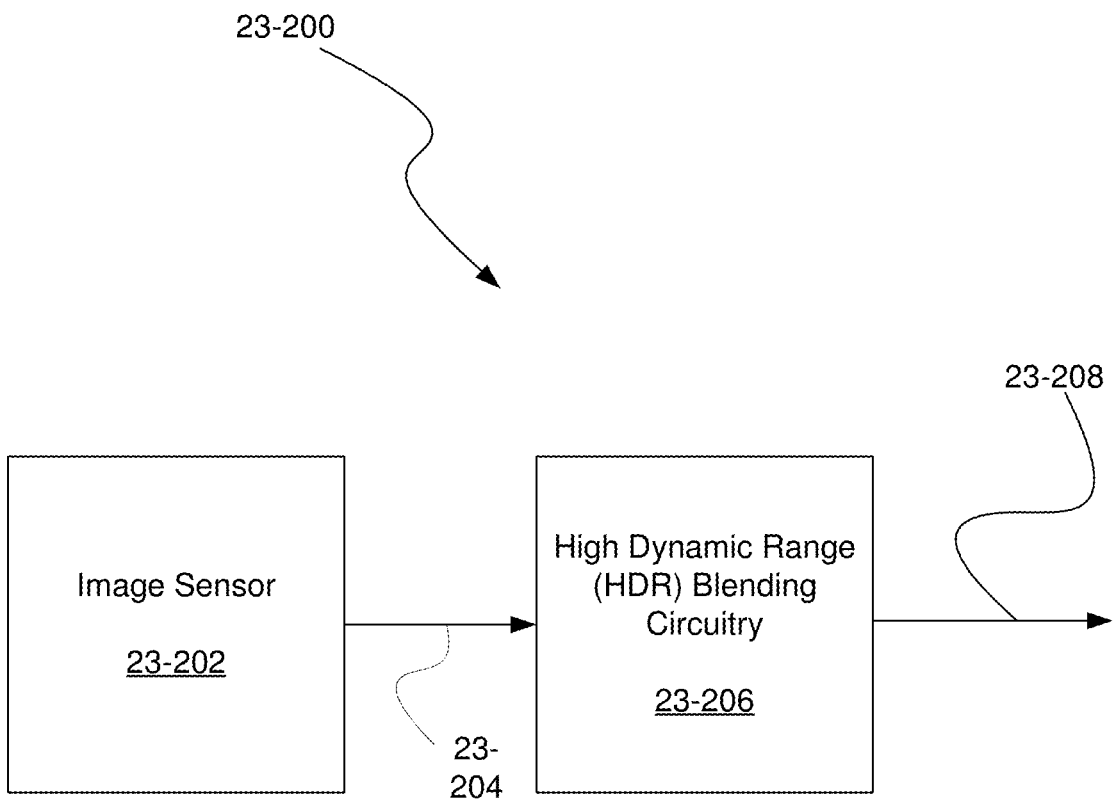
Figures 3, 23:
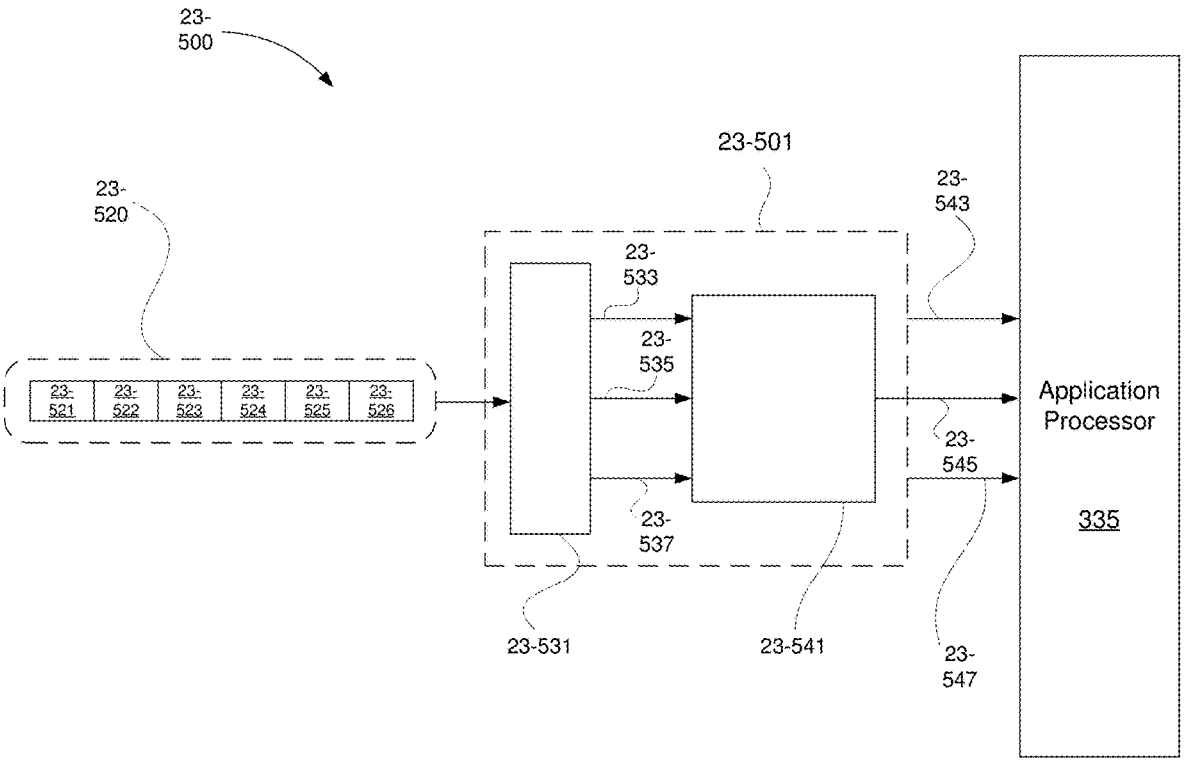

FIG. 23-1 illustrates an exemplary method 23-100 for generating a high dynamic range (HDR) pixel stream, in accordance with one possible embodiment. As an option, the method 23-100 may be carried out in the context of any of the Figures. Of course, however, the method 23-100 may be carried out in any desired environment. Further, the aforementioned definitions may equally apply to the description below.

As shown, at operation 23-102, a pixel stream is received, and the pixel stream includes at least two exposures per pixel of a plurality of pixels of the image sensor. In one embodiment, the pixel stream may be received directly from the image sensor. In another embodiment, the pixel stream may be received from a controller, where the controller first receives the pixel stream from an image sensor. In yet another embodiment, the pixel stream may be received from a camera module, or any other hardware component, which may first receive the pixel stream generated by an image sensor.

The pixel stream includes at least two exposures per pixel of a plurality of pixels of an image sensor. In one embodiment, the pixel stream includes a sequence of digital pixel data associated with the pixels of the image sensor. The sequence of digital pixel data may include, for each of the pixels, values representative of pixel attributes, such as brightness, intensity, color, etc. Each exposure of a given pixel may be associated with a different value for a given attribute, such as brightness, such that each of the exposures may include a unique attribute value. For example, in one embodiment, pixel data for a first exposure of a given pixel may include a first attribute value, pixel data for a third exposure of the pixel may include a third attribute value different than the first value, and pixel data for a second exposure of the pixel may include a second value between the first value and the third value. In one embodiment, each value may include a brightness value.

Further, the pixel stream may include at least two units of digital pixel data for each pixel, where each unit of digital pixel data is associated with a different exposure. Still further, a first unit of the digital pixel data for a pixel may be associated with a first set of digital pixel data, and a second unit of the digital pixel data for the pixel may be associated with a second set of digital pixel data. In such an embodiment, each set of digital pixel data may be associated with at least a portion of a digital image. For example, a first set of digital pixel data may be associated with a first digital image, and a second set of digital pixel data may be associated with a second digital image.

In on embodiment, each set of digital pixel data may be representative of an optical image of a photographic scene focused on an image sensor. For example, a first set of digital pixel data in the pixel stream may be representative of a first exposure of an optical image focused on an image sensor, and a second set of digital pixel data in the pixel stream may be representative of a second exposure of the optical image focused on the image sensor.

To this end, a pixel stream may include two sets of digital pixel data, where each set includes a corresponding unit of digital pixel data for a given pixel of an image sensor at a different exposure, such that the pixel stream includes digital pixel data for two different exposures of a same photographic scene image.

In one embodiment, the pixel stream may include a first set of digital pixel data interleaved with a second set of digital pixel data. For example, the pixel stream may include first digital pixel data for a first line of pixels, then second digital pixel data for the first line of pixels, then first pixel data for a second line of pixels, and then second digital pixel data for the second line of pixels, and so on. Of course, the pixel stream may include two or more sets of digital pixel data interleaved in any fashion. Still yet, the pixel stream may comprise two or more sets of digital pixel data organized in a non-interleaved fashion.

In one embodiment, the at least two exposures may be of the same photographic scene. For example, the at least two exposures may include a brighter exposure and a darker exposure of the same photographic scene. As another example, the at least two exposures may include each of the brighter exposure, the darker exposure, and a median exposure of the same photographic scene. The median exposure may be brighter than the darker exposure, but darker than the brighter exposure. In one embodiment, a brightness of an exposure may be controlled utilizing one or more exposure times. In another embodiment, a brightness of an exposure may be controlled utilizing one or more gains or one or more ISO values. Of course, a brightness of each exposure may be controlled utilizing any technically feasible technique.

In one embodiment, the image sensor may include a plurality of pixels arranged in a two-dimensional grid or array. Further, each of the pixels may include one or more cells, where each cell includes one or more photodiodes. Under the control of one or more control signals, each cell of the image sensor may measure or sample an amount of incident light focused on the photodiode of the cell, and store an analog value representative of the incident light sampled. In one embodiment, the analog values stored in the one or more cells of a pixel may be output in an analog signal, and the analog signal may then be amplified and/or converted to two or more digital signals, where each digital signal may be associated with a different effective exposure. An analog signal may be a set of spatially discrete intensity samples, each represented by continuous analog values. Analog pixel data may be analog signal values associated with one or more given pixels.

In another embodiment, each cell of a pixel may store two or more analog values, where each of the analog values is obtained by sampling an exposure of incident light for a different sample time. The analog values stored in the one or more cells of a pixel may be output in two or more analog signals, and the analog signals may then be amplified and/or converted to two or more digital signals, where each digital signal may be associated with a different effective exposure.

To this end, the one or more digital signals may comprise a pixel stream including at least two exposures per pixel from a plurality of pixels of an image sensor.

Further, at operation 23-104, a high dynamic range (HDR) pixel stream is generated by performing HDR blending on the received pixel stream. In one embodiment, the HDR blending of the received pixel stream may generate a HDR pixel for each pixel of the plurality of pixels of the image sensor, and the HDR pixel may be based on the at least two exposures from the pixel. For example, a HDR blending operation may receive as input the at least two exposures of a pixel of the image sensor, and then blend the at least two exposures of the pixel to generate a HDR pixel. In a specific embodiment, the blending of the at least two exposures of the pixel may include a mix operation. In one embodiment, a generated HDR pixel for a given pixel may be output in a HDR pixel stream, and the HDR pixel stream also includes HDR pixels generated based on exposures received from neighboring pixels of the given pixel. Each HDR pixel may be based on at least two exposures received from an image sensor.

Finally, at operation 23-106, the HDR pixel stream is outputted. In one embodiment, the HDR pixel stream may be outputted as a sequence of individual HDR pixels. In another embodiment, the HDR pixel stream may be output to an application processor, which may then control storage and/or display of the HDR pixel stream. In yet another embodiment, the HDR pixel stream may be stored in associated with the pixel stream utilized to generate the HDR pixel stream. Storing the pixel stream in association with the HDR pixel stream may facilitate later retrieval of the pixel stream.

FIG. 23-2 illustrates a system 23-200 for generating a HDR pixel stream, in accordance with one embodiment. As an option, the system 23-200 may be implemented in the context of any of the Figures. Of course, however, the system 23-200 may be implemented in any desired environment. Further, the aforementioned definitions may equally apply to the description below.

As shown in FIG. 23-2, the system 23-200 includes a high dynamic range (HDR) blending circuitry 23-206 receiving a pixel stream 23-204 from an image sensor 23-202. Still further, the HDR blending circuitry 23-206 is shown to output a HDR pixel stream 23-208.

In one embodiment, the image sensor 23-202 may comprise a complementary metal oxide semiconductor (CMOS) image sensor, or charge-coupled device (CCD) image sensor, or any other technically feasible form of image sensor. In another embodiment, the image sensor 23-202 may include a plurality of pixels arranged in a two-dimensional array or plane on a surface of the image sensor 23-202.

In another embodiment, an optical image focused on the image sensor 23-202 may result in a plurality of analog values being stored and output as an analog signal that includes at least one analog value for each pixel of the image sensor. The analog signal may be amplified to generate two or more amplified analog signals utilizing two or more gains. In such an embodiment, a digital signal may then be generated based on each amplified analog signal, such that two or more digital signals are generated. In various embodiments, the two or more digital signals may comprise the pixel stream 23-204.

In yet another embodiment, a first set of analog values may be output as a first analog signal that includes at least one analog value for each pixel of the image sensor, and a second set of analog values may be output as a second analog signal that includes at least one analog value for each pixel of the image sensor. In such an embodiment, each analog signal may subsequently be processed and converted to one or more digital signals, such that two or more digital signals are generated. In various embodiments, the two or more digital signals may comprise the pixel stream 23-204.

Accordingly, in one embodiment, the pixel stream 23-204 generated by the image sensor 23-202 may include at least two electronic representations of an optical image that has been focused on the image sensor 23-202. Further, each electronic representation of the optical image may include digital pixel data generated utilizing one or more analog signals.

In one embodiment, the HDR blending circuitry 23-206 may include any hardware component or circuitry operable to receive a pixel stream and generate a HDR pixel stream based on the content of the received pixel stream. As noted above, the pixel stream may include multiple instances of digital pixel data. For example, the pixel stream may include first digital pixel data from a first exposure of a photographic scene and second digital pixel data from a second exposure of the photographic scene. The first exposure and the second exposure may vary based on exposure or sample timing, gain application or amplification, or any other exposure parameter that may result in a first exposure of a photographic scene and a second exposure of the photographic scene that is different than the first exposure.

Additionally, the HDR blending circuitry 23-206 may perform any blending operation on the pixel stream 23-204 that is operative to generate HDR pixel stream 23-208. In one embodiment, a blending operation of the HDR blending circuitry 23-206 may include blending two exposures received from a pixel of the image sensor 23-202. In another embodiment, a blending operation of the HDR blending circuitry 23-206 may include blending three or more exposures received from a pixel of the image sensor 23-202. For example, the HDR blending circuitry 23-206 may perform a blending of the exposures received in the pixel stream.

Finally, HDR pixel stream 23-208 is output from the HDR blending circuitry 23-206. In one embodiment, the HDR pixel stream 23-208 output from the HDR blending circuitry 23-206 may include any stream comprising one or more HDR pixels of one or more HDR images. For example, the HDR pixel stream 23-208 may include HDR pixels of a portion of a HDR image, an entirety of a HDR image, or more than one HDR image, such as multiple frames of a HDR video.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 23-3 illustrates a system 23-500 for receiving a pixel stream and outputting an HDR pixel stream, in accordance with an embodiment. As an option, the system 23-500 may be implemented in the context of any of the Figures. Of course, however, the system 23-500 may be implemented in any desired environment. Further, the aforementioned definitions may equally apply to the description below.

As shown, the system 23-500 includes a blending circuitry 23-501 receiving a pixel stream 23-520, and outputting at least one instance of a HDR pixel data 23-545 to an application processor 335. The blending circuitry 23-501 is shown to include a buffer 23-531 and a HDR pixel generator 23-541. In one embodiment, the pixel stream 23-520 may be received from an image sensor, such as the image sensor 332 of FIG. 3G. For example, the pixel stream 23-520 may be received from an interface of the image sensor 332. In another embodiment, the pixel stream 23-520 may be received from a controller, such as the controller 333 of FIG. 3G. For example, the pixel stream 23-520 may be received from an interface of the controller 333. The application processor 335 of FIG. 23-3 may be substantially identical to the application processor 335 of FIG. 3G. Accordingly, the blending circuitry 23-501 may be operative to intercept a signal comprising the pixel data 23-520 as the pixel data 23-520 is being transmitted from an image sensor to the application processor 335.

As illustrated in FIG. 23-3, the pixel stream 23-520 is shown to include digital pixel data units 23-521-526. Each of the digital pixel data units 23-521-23-526 may comprise digital pixel data for one or more pixels of an image sensor. In one embodiment, each of the digital pixel data units 23-521-23-526 may include digital pixel data representative of light measured or sampled at a single pixel of an image sensor. In another embodiment, each of the digital pixel data units 23-521-23-526 may comprise digital pixel data for more than one pixel of an image sensor, such as for a line of pixels of an image sensor. In yet another embodiment, each of the digital pixel data units 23-521-23-526 may comprise digital pixel data for a frame of pixels of an image sensor.

In the various embodiments, the digital pixel data units 23-521-23-526 may be interleaved by pixel, line, or frame from of the image sensor. For example, in one embodiment, the pixel stream 23-520 may be output such that it includes digital pixel data for multiple pixels in a sequence at a first exposure, and then includes digital pixel data for the multiple pixels in the sequence at a second exposure. The multiple pixels in the sequence may comprise at least a portion of a line of pixels of an image sensor. In another embodiment, the pixel stream 23-520 may be output such that it includes digital pixel data comprising a sequence of different exposures of a single pixel, and then a sequence of different exposures of another single pixel.

As an example, in an embodiment where the pixel stream 23-520 includes two exposures per pixel of a plurality of pixels of an image sensor, a digital pixel data unit 23-521 may include first digital pixel data for a first pixel of the image sensor, a digital pixel data unit 23-522 may include second digital pixel data for the first pixel of the image sensor, a digital pixel data unit 23-523 may include first digital pixel data for a second pixel of the image sensor, a digital pixel data unit 23-524 may include second digital pixel data for the second pixel of the image sensor, a digital pixel data unit 23-525 may include first digital pixel data for a third pixel of the image sensor, and a digital pixel data unit 23-526 may include second digital pixel data for the third pixel of the image sensor. In such an example, each set of digital pixel data may be associated with a different exposure, such that each first digital pixel data is associated with a first exposure, and each second digital pixel data is associated with a second exposure different than the first exposure.

As another example, in an embodiment where the pixel stream 23-520 includes three exposures per pixel of a plurality of pixels of an image sensor, a digital pixel data unit 23-521 may include first digital pixel data for a first pixel of the image sensor, a digital pixel data unit 23-522 may include second digital pixel data for the first pixel of the image sensor, a digital pixel data unit 23-523 may include third digital pixel data for the first pixel of the image sensor, a digital pixel data unit 23-524 may include first digital pixel data for a second pixel of the image sensor, a digital pixel data unit 23-525 may include second digital pixel data for second pixel of the image sensor, and a digital pixel data unit 23-526 may include third digital pixel data for the second pixel of the image sensor. In such an example, each set of digital pixel data may be associated with a different exposure, such that each first digital pixel data is associated with a first exposure, each second digital pixel data is associated with a second exposure different than the first exposure, and each third digital pixel data is associated with a third exposure different than the first exposure and the second exposure.

As yet another example, in an embodiment where the pixel stream 23-520 includes two exposures per pixel of a plurality of pixels of an image sensor, and the pixel stream 23-520 is interleaved by groups of pixels, a digital pixel data unit 23-521 may include first digital pixel data for a first plurality of pixels of the image sensor, a digital pixel data unit 23-522 may include second digital pixel data for the first plurality of pixels of the image sensor, a digital pixel data unit 23-523 may include first digital pixel data for a second plurality of pixels of the image sensor, a digital pixel data unit 23-524 may include second digital pixel data for the second plurality of pixels of the image sensor, a digital pixel data unit 23-525 may include first digital pixel data for a third plurality of pixels of the image sensor, and a digital pixel data unit 23-526 may include second digital pixel data for the third plurality of pixels of the image sensor. In such an example, each plurality of pixels may include a line of pixels, such that the first plurality of pixels comprise a first line of pixels, the second plurality of pixels comprises a second line of pixels, and the third plurality of pixels comprises a third line of pixels. Further, each set of digital pixel data may be associated with a different exposure, such that each first digital pixel data is associated with a first exposure, and each second digital pixel data is associated with a second exposure different than the first exposure.

As still another example, in an embodiment where the pixel stream 23-520 includes three exposures per pixel of a plurality of pixels of an image sensor, and the pixel stream 23-520 is interleaved by groups of pixels, a digital pixel data unit 23-521 may include first digital pixel data for a first plurality of pixels of the image sensor, a digital pixel data unit 23-522 may include second digital pixel data for the first plurality of pixels of the image sensor, a digital pixel data unit 23-523 may include third digital pixel data for the first plurality of pixels of the image sensor, a digital pixel data unit 23-524 may include first digital pixel data for a second plurality of pixels of the image sensor, a digital pixel data unit 23-525 may include second digital pixel data for the second plurality of pixels of the image sensor, and digital pixel data unit 23-526 may include third digital pixel data for the second plurality of pixels of the image sensor. In such an example, each plurality of pixels may include a line of pixels, such that the first plurality of pixels comprises a first line of pixels, and the second plurality of pixels comprises a second line of pixels. Further, each set of digital pixel data may be associated with a different exposure, such that each first digital pixel data is associated with a first exposure, each second digital pixel data is associated with a second exposure different than the first exposure, and each third digital pixel data is associated with a third exposure different than the first exposure and the second exposure.

As shown in FIG. 23-3, the buffer 23-531 of the blending circuitry 23-501 is operative to receive the pixel stream 23-520. In one embodiment, the buffer 23-531 is operative to de-interleave the pixel stream. In another embodiment, the buffer 23-531 may be operative to identify each exposure of a particular pixel of the image sensor. For example, for a given pixel of a plurality of pixels of an image sensor, the buffer 23-531 may identify at least two different exposures of the pixel. More specifically, the buffer 23-531 may identify a first exposure of the pixel from a first unit of digital pixel data, and identify a second exposure of the pixel from a second unit of digital pixel data. Similarly, in embodiments including three exposures per pixel, the buffer 23-531 may identify a first exposure of the pixel from a first unit of digital pixel data, identify a second exposure of the pixel from a second unit of digital pixel data, and identify a third exposure of the pixel from a third unit of digital pixel data. To this end, the buffer may identify at least two exposures of a single pixel of a pixel array of an image sensor.

In an embodiment in which lines are interleaved in the pixel stream 23-520, the buffer 23-531 may receive two or more digital pixel data units of a same line, where each digital pixel data unit is associated with a different exposure of the line. Further, the buffer 23-531 may then identify and select pixel data at each exposure for a given pixel in the line. In such an embodiment, pixel data that is not associated with the given pixel may be temporarily stored. Further, pixel data that is temporarily stored may be utilized for identifying and selecting pixel data at each of the exposures for another given pixel in the line. This process of pixel data storage and pixel data retrieval may repeat for each pixel in the line.

As used herein, pixel data for a pixel may describe a set of components of a color space, such as red, green, and blue in RGB color space; or cyan, magenta, yellow, and black, in CMYK color space. Further, an intensity of each of the color components may be variable, and may be described using one or more values for each component. Thus, in one embodiment, pixel data for a given exposure of a pixel may include the one or more values for the color components of the pixel at the given exposure. Further, the one or more values for the color components of a pixel may be utilized to calculate various attributes of the pixel in addition to color, such as, for example, saturation, brightness, hue, luminance, etc.

After identifying at least two exposures of a given pixel, the buffer 23-531 may then output first exposure pixel data 23-533 for the given pixel, second exposure pixel data 23-535 for the given pixel, and third exposure pixel data 23-537 for the given pixel. As shown in FIG. 23-3, each of the first exposure pixel data 23-533, the second exposure pixel data 23-535, and the third exposure pixel data 23-537 are output from the buffer 23-531 to the HDR pixel generator 23-541. Of course, in other embodiments, a buffer 23-531 may output, to a HDR pixel generator 23-541, pixel data for only two exposures of the pixel, or for more than three exposures of the pixel.

The buffer 23-531 may be operative to identify pixel data of the two or more exposures of a given pixel in a line while saving received digital pixel data for remaining pixels of the line, as well as other lines, for subsequent processing. For example, if the buffer 23-531 receives first pixel data for a given line, second pixel data for the given line, and third pixel data for the given line, where each of the units of pixel data corresponds to a different exposure of the given line, the buffer 23-531 may be operative to identify a portion of pixel data associated with a first pixel in each of the received pixel data units. For example, the buffer 23-531 may identify a first exposure of the pixel, a second exposure of the pixel, and a third exposure of the pixel. Further, the buffer 23-531 may be operative to store unselected pixel data received in each unit of pixel data, and subsequently identify pixel data associated with a second pixel in each of the received pixel data units. For example, the buffer 23-531 may identify a first exposure of a second pixel adjacent to the first pixel, a second exposure of the second pixel, and a third exposure of the second pixel. To this end, the buffer 23-531 may be operative to identify each exposure of a plurality of exposures of each of the pixels of a line.

Referring again to FIG. 23-3, the buffer 23-531 is shown to output each of the first exposure pixel data 23-533, the second exposure pixel data 23-535, and the third exposure pixel data 23-537 to the HDR pixel generator 23-541. As noted above, each of the first exposure pixel data 23-533, the second exposure pixel data 23-535, and the third exposure pixel data 23-537 may comprise pixel data for different exposures of the same pixel.

In one embodiment, each exposure of a pixel may be characterized as having an exposure value (EV). In such an embodiment, an exposure of the pixel may be characterized as being obtained at exposure value 0 (EV0), wherein the EV0 exposure is characterized as being captured utilizing a first collection of capture parameters. Such capture parameters may include ISO or light sensitivity, aperture, shutter speed or sampling time, or any other parameter associated with image capture that may be controlled or modulated. The pixel characterized as captured at EV0 may be captured using a particular combination of capture parameters, such as a particular ISO and a particular shutter speed.

Further, an exposure of another capture or sample of the pixel may be selected based on the capture parameters of the EV0 pixel. More specifically, the other capture or sample of the pixel may be selected to have an increased or decreased exposure in comparison to the exposure of the EV0 pixel. For example, an ISO capture parameter of the other sample of the pixel may be selected such that the exposure is increased or decreased with respect to the exposure of the EV0 pixel. Still yet, an exposure time capture parameter of the other sample of the pixel may be selected such that the exposure time is increased or decreased with respect to the exposure time of the EV0 pixel. As a specific example, the other sample of the pixel may be captured at an increased exposure when it is captured using a faster ISO and the same exposure time, or using a greater exposure time at the same ISO, with respect to the EV0 pixel. In such an embodiment, the other capture or exposure of the pixel may be referred to as an EV+ exposure, or an EV+ pixel. Similarly, the other sample of the pixel may be captured at a decreased exposure when it is captured using a slower ISO and the same exposure time, or using a reduced exposure time at the same ISO, with respect to the EV0 pixel. In such an embodiment, the other capture or exposure of the pixel may be referred to as an EV− exposure, or an EV− pixel.

In some embodiments, different exposures of a given pixel may be controlled based on an ISO value associated with the pixel during or following a capture operation, where the ISO value may be mapped to one or more gains that may be applied to an analog signal output from an image sensor during the capture operation.

In yet other embodiments, different exposures of a given pixel may be obtained by controlling exposure times for two or more sampling operations that occur simultaneously or concurrently at the pixel.

In some embodiments, a first exposure pixel data 23-533 may include pixel data for an EV− exposure of a given pixel, a second exposure pixel data 23-535 may include pixel data for an EV0 exposure of the pixel, and a third exposure pixel data 23-537 may include pixel data for an EV+ exposure of the pixel. Of course, any of the pixel data 23-533-537 may include pixel data for any exposure of the pixel. To this end, pixel data for three different exposures of a same pixel are shown provided by the buffer 23-531 to the HDR pixel generator 23-541 in FIG. 23-3.

In other embodiments, an HDR pixel generator 23-541 may receive a different number of exposures of a given pixel. For example, in one embodiment, the HDR pixel generator 23-541 may receive pixel data for two exposures of a given pixel. As options, in such an embodiment, the HDR pixel generator 23-541 may receive data for an EV− exposure and an EV0 exposure of a given pixel, or an EV0 exposure and an EV+ exposure of a given pixel.

After receiving each of the first exposure pixel data 23-533, the second exposure pixel data 23-535, and the third exposure pixel data 23-537, the HDR pixel generator 23-541 may then perform a blend operation on the three instances of pixel data and output HDR pixel data 23-545. As noted previously, in one embodiment the blend operation performed to generate the HDR pixel data 23-545 may be any of the blend operations.

To this end, the HDR pixel generator 23-541 may be operative to generate HDR pixel data 23-545 for an HDR pixel utilizing only pixel data from multiple exposures of a given pixel of an image sensor. Thus, the HDR pixel generator 23-541 does not require pixel data of additional pixels of the image sensor that neighbor the given pixel, and may perform an operation utilizing only two or more exposures of a single pixel. Further, because each of the two or more exposures of a given pixel may be generated in a manner with zero, or near zero, interframe time, the two or more exposures of the pixel may be used to generate the HDR pixel without performing an alignment step. In other words, pixel stream 23-520 may inherently include pre-aligned pixel data, which may be used by the blending circuitry 23-501 to generate HDR pixels.

To this end, using relatively low-power resources, a stream of HDR pixels may be rapidly generated and output based on an input stream of pixel data. For example, the stream of HDR pixels may be generated as the stream of pixel data is in transit from an image sensor. Further, the stream of HDR pixels may be generated without use of a graphics processing unit (GPU), which may allow for disabling at least a portion of the GPU, or for use of the GPU to perform other processing tasks. Such processing tasks may include performing dehazing operations or contrast enhancement on the HDR pixel stream.

Still further, in addition to outputting the HDR pixel data 23-545, the blending circuitry 23-501 may also output a first received pixel data 23-543 and a second received pixel data 23-547. In one embodiment, the first received pixel data 23-543 may comprise one of the first exposure pixel data 23-533, the second exposure pixel data 23-535, and the third exposure pixel data 23-537. In such an embodiment, the second received pixel data 23-547 may comprise another one of the first exposure pixel data 23-533, the second exposure pixel data 23-535, and the third exposure pixel data 23-537.

For example, the first received pixel data 23-543 may comprise the first exposure pixel data 23-533, and the second received pixel data 23-547 may comprise the third exposure pixel data 23-537. As noted previously, the first exposure pixel data 23-533 may include pixel data for an EV− exposure of a given pixel, and the third exposure pixel data 23-537 may include pixel data for an EV+ exposure of the given pixel. Thus, in such an example, the first received pixel data 23-543 may include pixel data for the EV− exposure of the given pixel, and the second received pixel data 23-547 may include pixel data for the EV+ exposure of the given pixel. To this end, in addition to outputting the HDR pixel data 23-545, the blending circuitry 23-501 may also output various instances of the pixel data utilized to generate the HDR pixel data 23-545. For example, the blending circuitry 23-501 may output for a pixel each of an EV+ exposure of the pixel, an EV− exposure of the pixel, and an HDR pixel.

Of course, in other embodiments, the blending circuitry 23-501 may output an EV0 exposure of a pixel as either the first received pixel data 23-543 or the second received pixel data 23-547, such that the EV0 exposure of a pixel is output with the HDR pixel for subsequent processing and/or storage. In one embodiment, any output exposures of the pixel may be stored with the HDR pixel in flash storage. In some embodiments, it may be useful to retain one or more exposures of the pixel that were used to generate the HDR pixel. For example, the one or more exposures of the pixel used to generate the HDR pixel may be used in subsequent HDR processing, for generating a non-HDR image, or in any other technically feasible manner.

Still further, after outputting the HDR pixel data 23-545, which was generated utilizing pixel data for multiple exposures of a first pixel, the blending circuit 23-501 may output second HDR pixel data for a second HDR pixel. The second HDR pixel data may be generated by the HDR pixel generator 23-541 utilizing pixel data for multiple exposures of a second pixel. The second pixel may be a neighboring pixel of the first pixel. For example, the second pixel may be adjacent to the first pixel in a row or line of pixels of an image sensor. Still further, after outputting the second HDR pixel data, the blending circuit 23-501 may output a third HDR pixel. The third HDR pixel may be generated by the HDR pixel generator 23-541 utilizing pixel data for multiple exposures of a third pixel. The third pixel may be a neighboring pixel of the second pixel. For example, the third pixel may be adjacent to the second pixel in the row or line of pixels of the image sensor. Still further, along with each of the second HDR pixel and the third HDR pixel, the blending circuit 23-501 may also output received pixel data utilized to generate, respectively, the second HDR pixel and the third HDR pixel.

The blending circuitry 23-501 may be operative to output a stream of pixel data for HDR pixels of an HDR image, where each of the HDR pixels is generated based on a respective pixel of an image sensor. Further still, with each output HDR pixel, the pixel data from corresponding the two or more exposures of the pixel may also be output. Thus, an HDR pixel may be output with the pixel data utilized to generate the HDR pixel.

Additionally, because the blending circuitry 23-501 may be operative to continuously process the pixel data of the pixel stream 23-520 as the pixel stream 23-520 is received, the pixel stream 23-520 may be received from an image sensor that is capturing and transmitting pixel data at a rate of multiple frames per second. In such an embodiment, digital pixel data units 23-521-23-526 may include pixel data for pixels or lines of a frame of video output by an image sensor. To this end, the blending circuitry 23-501 may be operative to receive pixels for a frame of video at two or more exposures, and generate HDR pixels for the frame of video utilizing the received pixels. Further, the blending circuitry 23-501 may be operative to receive pixels for the frame of video at the two or more exposures and generate HDR pixels for the frame as additional digital pixel data is received in the pixel stream 23-520 for one or more other frames of the video. In one embodiment, one or more pixels of a second frame of video may be buffered by a buffer 23-531 as a HDR pixel generator 23-541 outputs HDR pixels for a first frame of the video.

As shown in FIG. 23-3, the blending circuitry 23-501 may be a discrete component that exists along one or more electrical interconnects between an image sensor and an application processor 335. In one embodiment, the pixel stream 23-520 may be received by the blending circuit 23-501 on a single electrical interconnect. In other embodiments, the pixel stream 23-520 may be received by the blending circuitry 23-501 along two or more electrical interconnects. Such an implementation may allow for concurrent receipt of multiple instances of pixel data at the blending circuitry 23-501. In one embodiment, a first received pixel data 23-543, a second received pixel data 23-547, and a HDR pixel data 23-545 may be output to an application processor 335 along a single electrical interconnect. In other embodiments, a first received pixel data 23-543, a second received pixel data 23-547, and a HDR pixel data 23-545 may be output to an application processor 335 along two or more electrical interconnects. Such an implementation may allow for concurrent receipt of multiple instances of pixel data at the application processor 335.

To this end, the blending circuitry 23-501 may be operative to receive pixels for a frame of video at two or more exposures, and generate HDR pixels for the frame of video utilizing the received pixels. Further, the blending circuitry 23-501 may be operative to receive pixels for the frame of video at the two or more exposures and generate HDR pixels for the frame as additional digital pixel data is received in the pixel stream 23-520 for one or more other frames of the video.

As noted above, blending circuitry 23-501 may be operative to continuously process pixel data of a pixel stream 23-520 as the pixel stream 23-520 is received, such that a stream of HDR pixels is output from the blending circuitry 23-501. In such an embodiment, first received pixel data 23-543 may be included in a stream of pixel data associated with a first exposure, and second received pixel data 23-547 may be included in a stream of pixel data associated with a second exposure. Thus, in one embodiment, in addition to outputting a stream of HDR pixels, the blending circuitry 23-501 may also output at least one stream of pixel data utilized to generate the HDR pixels. For example, the blending circuitry may output a stream of EV0 pixel data utilized to generate the HDR pixels, a stream of EV− pixel data utilized to generate the HDR pixels, and/or a stream of EV+ pixel data utilized to generate the HDR pixels.

In one embodiment, sets of pixel data may be saved separately. For example, a stream of EV0 pixel data may be used to generate a stream of HDR pixels at the blending circuitry 23-501, and then the stream of EV0 pixels may stored separately from the stream of HDR pixels. Similarly, a stream of EV− or EV+ pixels may be stored separately from the HDR pixels. To this end, a stored stream of HDR pixels may comprise a HDR video, a stored stream of EV0 pixels may comprise the same video captured at EV0, and a stored stream of EV+ or EV− pixels may comprise the same video captured at EV+ or EV−, respectively.

In another embodiment, an application processor 335 may generate a residue image utilizing two or more received pixel streams. For example, the application processor 335 may receive a stream of HDR pixels from the blending circuitry 23-501, as well as one or more streams of received pixel data from the blending circuitry 23-501. Each of the one or more streams of received pixel data may include an EV0, EV+, or EV− pixel stream. The application processor 335 may be operative to perform a compare operation that compares the received stream of HDR pixels with one or more of the EV0, EV+, or EV− pixel stream to generate the residue image. For example, the application processor 335 may compare a given pixel within the HDR pixel stream with the given pixel within the EV0 pixel stream to generate a difference or scaling value, and then store the difference or scaling value. The application processor 335 may generate a plurality of difference values or scaling values for a plurality of corresponding pixels between the HDR pixel stream and the EV0 pixel stream. The plurality of difference values or scaling values may then be stored as a residue image. Of course, comparing any of the EV+, EV0, and EV− pixel streams with the HDR pixel stream may work equally well to generate difference values or scaling values.

Further, one or more generated residue images may then be stored in association with the HDR pixel stream. In such an embodiment, one or more of the EV0, EV−, or EV+ pixel streams may be discarded. Storing residue images in lieu of the one or more discarded EV0, EV−, or EV+ pixel streams may utilize less storage space. For example, a discarded EV− pixel stream may be subsequently reconstructed utilizing an associated HDR pixel stream, an associated EV0 pixel stream, and/or an associated EV+ pixel stream in conjunction with residue images previously generated utilizing the discarded EV− pixel stream. In such an embodiment, storage of the residue images may require substantially less storage capacity than storage of the EV− pixel stream.

In another embodiment, blending circuitry may be included in an application processor 335. In certain embodiments, blending circuitry includes histogram accumulation circuitry for implementing level mapping, such as contrast-limited adaptive histogram equalization (CLAHE). In such embodiments, the accumulation circuitry generates a cumulative distribution function (CDF) operative to perform localized level mapping. To this end, localized contrast enhancement may be implemented, for example by the either the blending circuitry or the application processor 335 based on the CDF.

In one embodiment, the non-linear mix function 23-530 may be performed by the blending circuitry 23-501 of FIG. 23-5. For example, the non-linear mix function 23-530 may be performed by an HDR pixel generator 23-501 of FIG. 23-5. In one embodiment, the HDR pixel generator 23-501 may be configured to receive two pixels, identify an attribute of each of the two pixels, select a scalar or mix value based on the attributes of the two pixels, and then perform a mix function on the two pixels using the selected scalar or mix value, where performing the mix function on the two pixels using the selected scalar or mix value generates a HDR pixel. The HDR pixel may then be output in an HDR pixel stream.

As described in the context of FIG. 5, pixel data for one or more exposures from a given pixel may be referred to as a "pixel." For example, pixel data from a first exposure of a pixel may be referred to as a first pixel, pixel data from a second exposure of the pixel may be referred to as a second pixel, and pixel data from a third exposure of the pixel may be referred to as a third pixel. Further, each of the pixel data from the first exposure, the second exposure, and the third exposure may be referred to as a brighter pixel or bright exposure pixel, medium pixel or medium exposure pixel, or darker pixel or dark exposure pixel in comparison to other pixel data sampled from the same pixel of an image sensor. For example, pixel data captured at an EV0 exposure may be referred to as a medium exposure pixel, pixel data captured at an EV− exposure may be referred to as a darker exposure pixel, and pixel data captured at an EV+ exposure may be referred to as a brighter exposure pixel. As an option, an EV0 exposure may be referred to as a brighter pixel or a darker pixel, depending on other exposures of the same pixel. Accordingly, it should be understood that in the context of FIG. 5, any blending or mixing operation of two or more pixels refers to a blending or mixing operation of pixel data obtained from a single pixel of an image sensor sampled at two or more exposures.

As described in the context of FIGS. 6-7, pixel data for one or more exposures from a given pixel may be referred to as a "pixel." For example, pixel data from a first exposure of a pixel may be referred to as a first pixel, pixel data from a second exposure of the pixel may be referred to as a second pixel, and pixel data from a third exposure of the pixel may be referred to as a third pixel. Further, each of the pixel data from the first exposure, the second exposure, and the third exposure may be referred to as a brighter pixel or bright exposure pixel, medium pixel or medium exposure pixel, or darker pixel or dark exposure pixel in comparison to other pixel data sampled from the same pixel of an image sensor. For example, pixel data captured at an EV0 exposure may be referred to as a medium exposure pixel, pixel data captured at an EV− exposure may be referred to as a darker exposure pixel, and pixel data captured at an EV+ exposure may be referred to as a brighter exposure pixel. As an option, an EV0 exposure may be referred to as a brighter pixel or a darker pixel, depending on other exposures of the same pixel. Accordingly, it should be understood that in the context of FIGS. 6-7, any blending or mixing operation of two or more pixels refers to a blending or mixing operation of pixel data obtained from a single pixel of an image sensor sampled at two or more exposures.

With respect to FIG. 7, in one embodiment, the pixel blend operation 731 may be performed by the blending circuitry 23-501 of FIG. 23-5. For example, the pixel blend operation 731 may be performed by an HDR pixel generator 23-501 of FIG. 235. In one embodiment, the HDR pixel generator 501 may be configured to receive three pixels, identify an attribute of each of the three pixels, select mix values based on the attributes of the three pixels, perform mix functions using the selected mix values to obtain two resulting pixels, and then combine the resulting pixels to generate an HDR pixel. The HDR pixel may then be output in an HDR pixel stream.

As described in the context of FIGS. 10A-10B, pixel data for one or more exposures from a given pixel may be referred to as a "pixel." For example, pixel data from a first exposure of a pixel may be referred to as a first pixel, pixel data from a second exposure of the pixel may be referred to as a second pixel, and pixel data from a third exposure of the pixel may be referred to as a third pixel. Further, each of the pixel data from the first exposure, the second exposure, and the third exposure may be referred to as a brighter pixel or bright exposure pixel, medium pixel or medium exposure pixel, or darker pixel or dark exposure pixel in comparison to other pixel data sampled from the same pixel of an image sensor. For example, pixel data captured at an EV0 exposure may be referred to as a medium exposure pixel, pixel data captured at an EV− exposure may be referred to as a darker exposure pixel, and pixel data captured at an EV+ exposure may be referred to as a brighter exposure pixel. As an option, an EV0 exposure may be referred to as a brighter pixel or a darker pixel, depending on other exposures of the same pixel. Accordingly, it should be understood that in the context of FIG. 10A-10B, any blending or mixing operation of two or more pixels refers to a blending or mixing operation of pixel data obtained from a single pixel of an image sensor sampled at two or more exposures.

In one embodiment, the pixel blend operation 1442 may be implemented within blending circuitry, such as blending circuitry 23-501 of FIG. 23-5. For example, the synthetic image 1450 may comprise a plurality of HDR pixels of an HDR pixel stream, which is generated based on a received pixel stream including two or more exposures of an image. In other embodiments, at least two images of images 1410, 1412, 1414 are generated from two or more analog images that are captured or sampled simultaneously.

Still yet, in various embodiments, one or more of the techniques disclosed herein may be applied to a variety of markets and/or products. For example, although the techniques have been disclosed in reference to a still photo capture, they may be applied to televisions, video capture, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

Embodiments of the present disclosure enable a digital photographic system to capture an image stack for a photographic scene. Exemplary digital photographic systems include, without limitation, digital cameras and mobile devices such as smart phones that are configured to include a digital camera module. A given photographic scene is a portion of an overall scene sampled by the digital photographic system. Two or more images are sampled by the digital photographic system to generate an image stack.

A given image stack comprises images of the photographic scene sampled with potentially different exposure, different strobe illumination, or a combination thereof. For example, each image within the image stack may be sampled according to a different exposure time, exposure sensitivity, or a combination thereof. A given image within the image stack may be sampled in conjunction with or without strobe illumination added to the photographic scene. Images comprising an image stack should be sampled over an appropriately short span of time to reduce visible differences or changes in scene content among the images. In one embodiment, images comprising a complete image stack are sampled within one second. In another embodiment, images comprising a complete image stack are sampled within a tenth of a second.

In one embodiment, two or more images are captured according to different exposure levels during overlapping time intervals, thereby reducing potential changes in scene content among the two or more images. In other embodiments, the two or more images are sampled sequentially under control of an image sensor circuit to reduce inter-image time. In certain embodiments, at least one image of the two or more images is sampled in conjunction with a strobe unit being enabled to illuminate a photographic scene. Image sampling may be controlled by the image sensor circuit to reduce inter-image time between an image sampled using only ambient illumination and an image sampled in conjunction with strobe illumination. The strobe unit may comprise a light-emitting diode (LED) configured to illuminate the photographic scene.

In one embodiment, each pixel of an image sensor comprises a set of photo-sensitive cells, each having specific color sensitivity. For example, a pixel may include a photosensitive cell configured to be sensitive to red light, a photo-sensitive cell configured to be sensitive to blue light, and two photo-sensitive cells configured to be sensitive to green light. Each photo-sensitive cell is configured to include two or more analog sampling circuits. A set of analog sampling circuits comprising one analog sampling circuit per photo-sensitive cell within the image sensor may be configured to sample and store a first image. Collectively, one set of analog sampling circuits forms a complete image plane and is referred to herein as an analog storage plane. A second set of substantially identically defined analog sampling circuits within the image sensor may be configured to sample and store a second image. A third set of substantially identically defined storage elements within the image sensor may be configured to sample and store a third image, and so forth. Hence an image sensor may be configured to sample and simultaneously store multiple images within analog storage planes.

Each analog sampling circuit may be independently coupled to a photodiode within the photo-sensitive cell, and independently read. In one embodiment, the first set of analog sampling circuits are coupled to corresponding photodiodes for a first time interval to sample a first image having a first corresponding exposure time. A second set of analog sampling circuits are coupled to the corresponding photodiodes for a second time interval to sample a second image having a second corresponding exposure time. In certain embodiments, the first time duration overlaps the second time duration, so that the first set of analog sampling circuits and the second set of analog sampling circuits are coupled to the photodiode concurrently during an overlap time. In one embodiment, the overlap time is within the first time duration. Current generated by the photodiode is split over the number of analog sampling circuits coupled to the photodiode at any given time. Consequently, exposure sensitivity varies as a function how many analog sampling circuits are coupled to the photodiode at any given time and how much capacitance is associated with each analog sampling circuit. Such variation needs to be accounted for in determining exposure time for each image.

Figures 1A, 24:
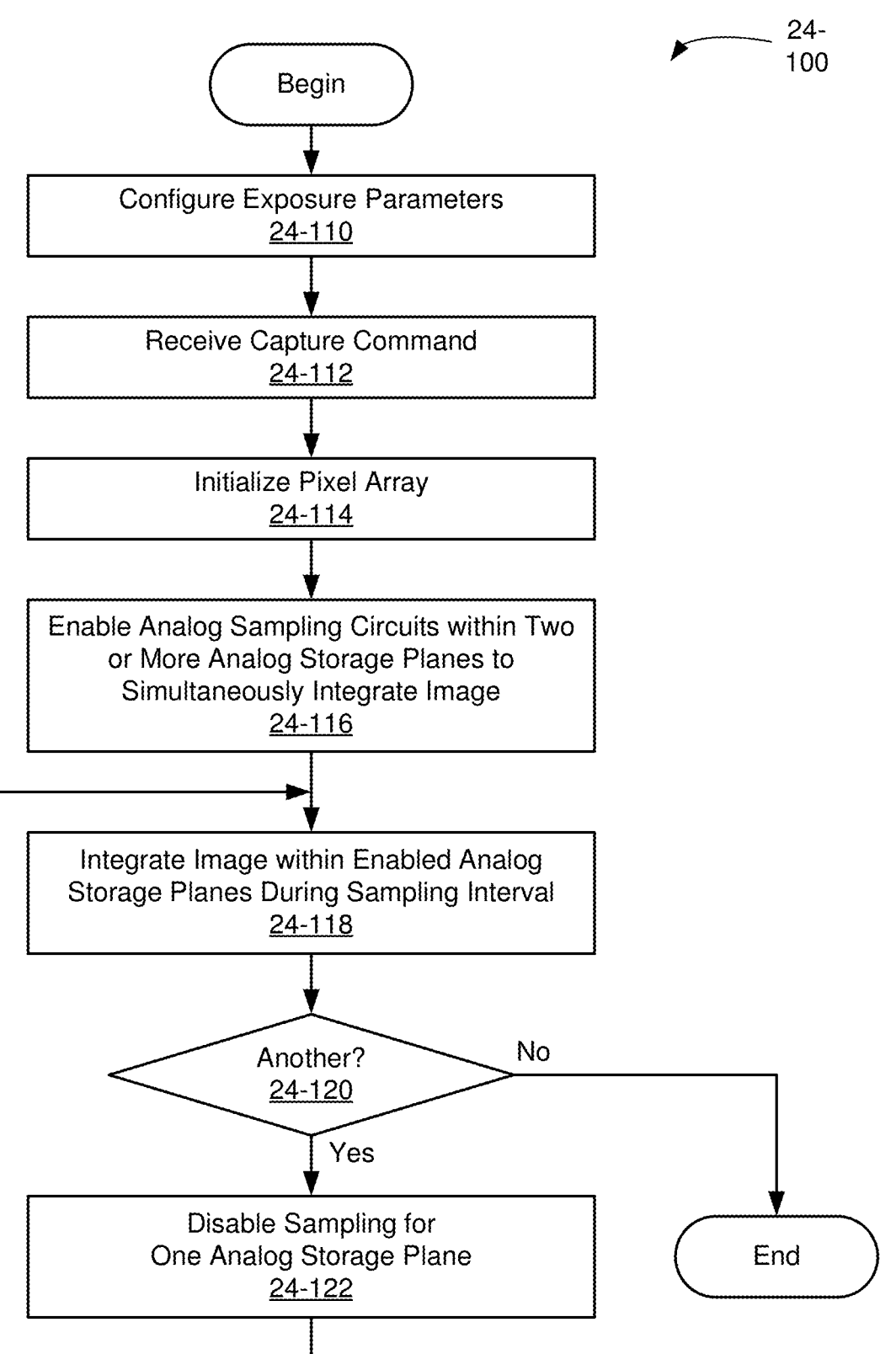
Figures 1B, 24:
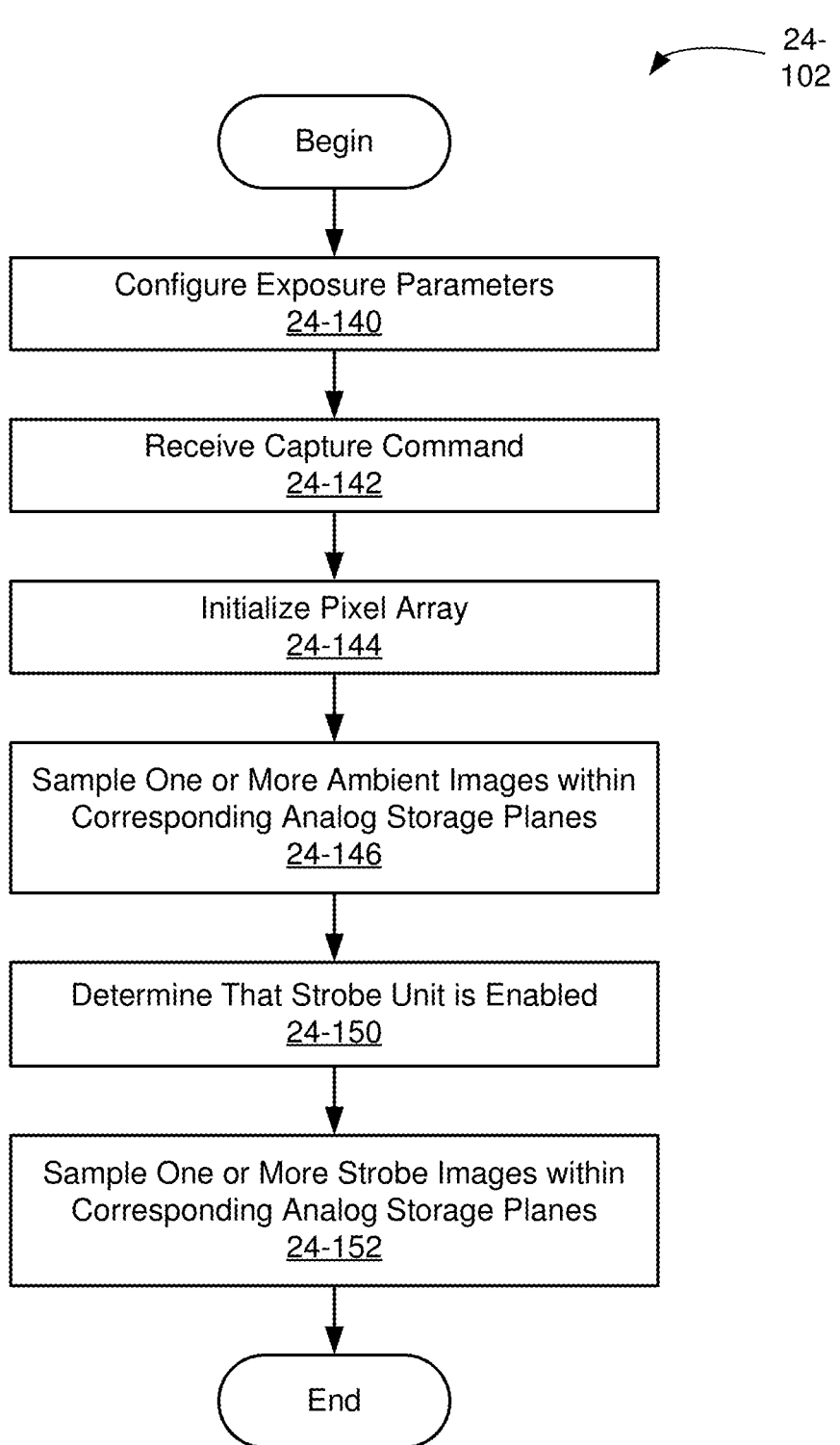
Figures 2, 24:
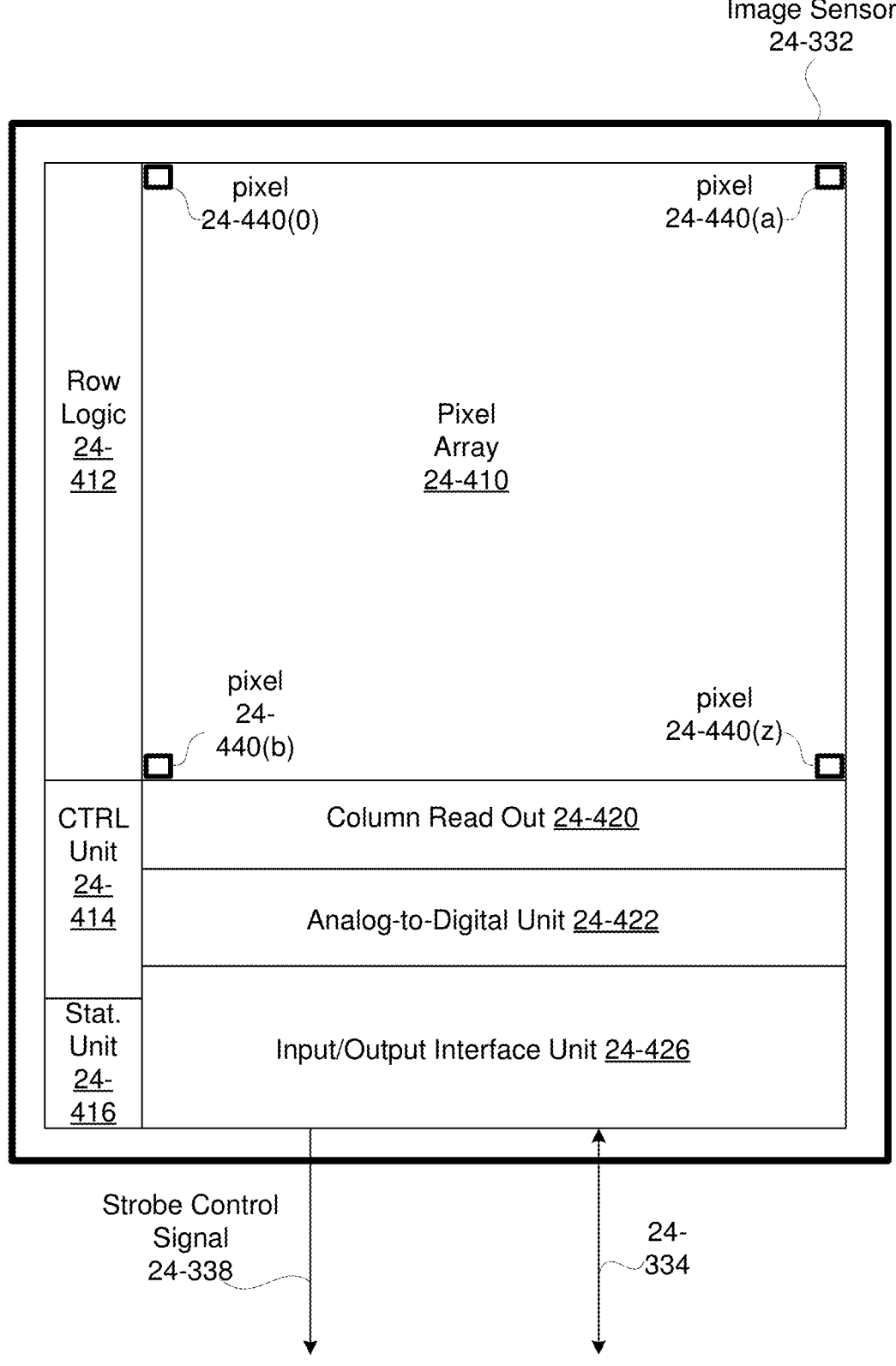
Figures 3, 24:
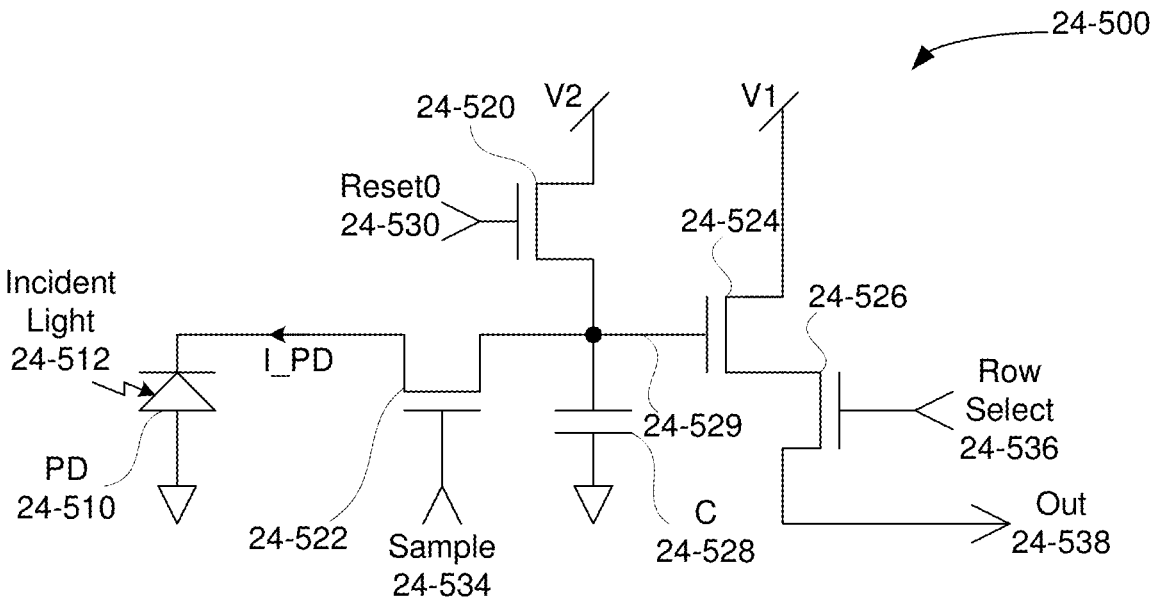
Figures 4A, 24:
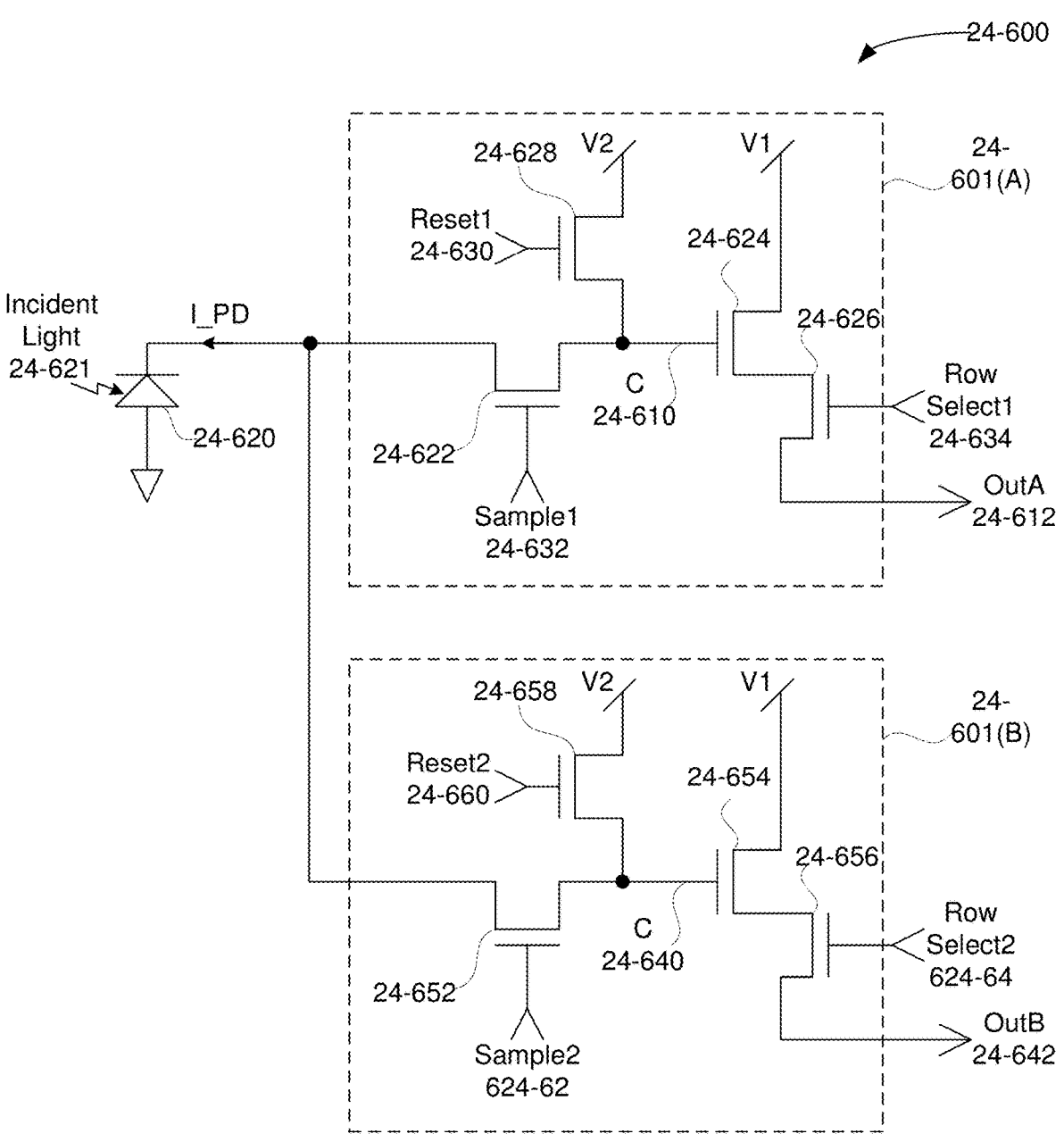
Figures 4B, 24:
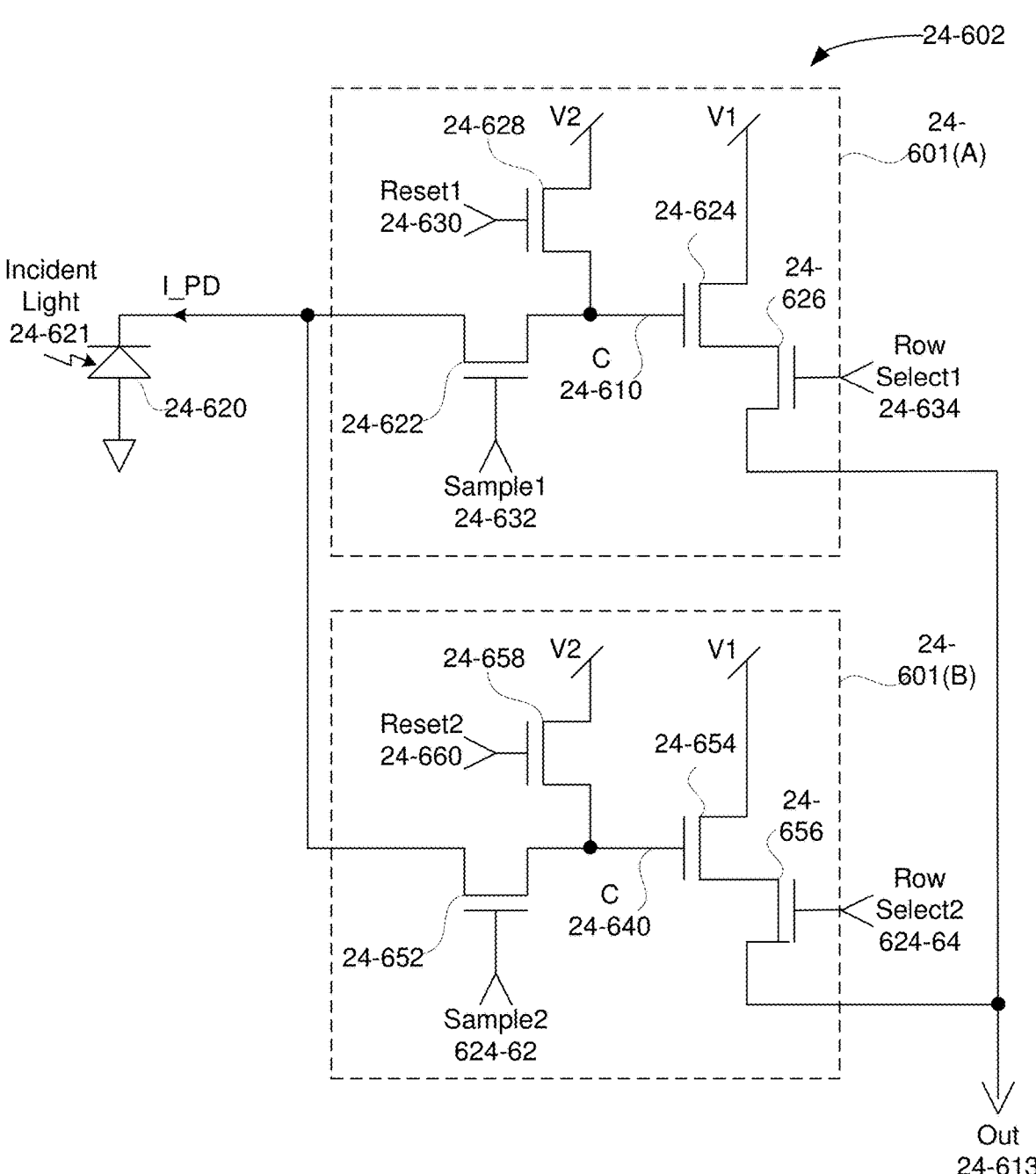
Figures 4C, 24:
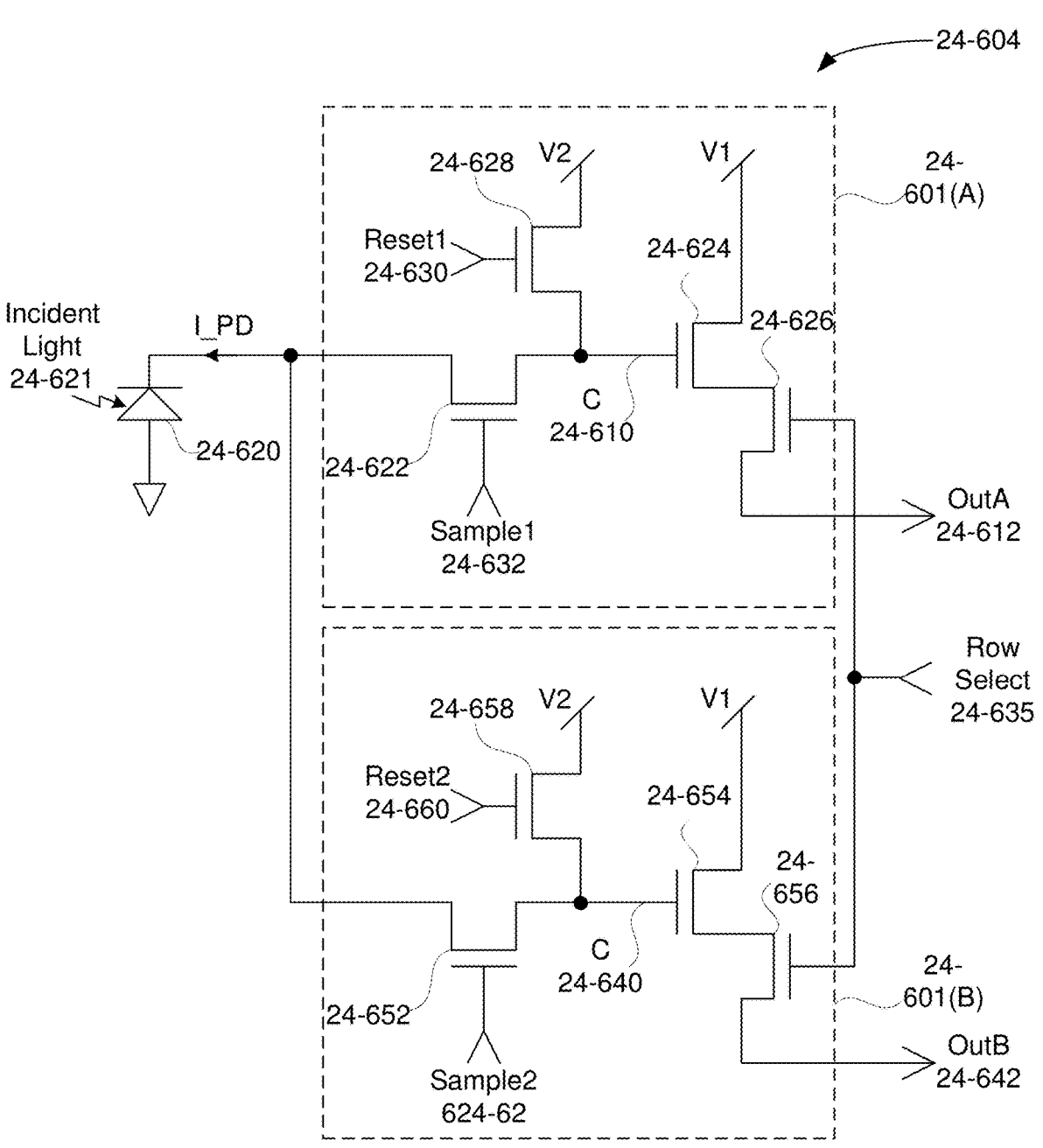

FIG. 24-1A illustrates a flow chart of a method 24-100 for generating an image stack comprising two or more images of a photographic scene, in accordance with one embodiment. Although method 24-100 is described in conjunction with the systems disclosed hereinabove, persons of ordinary skill in the art will understand that any system that performs method 24-100 is within the scope and spirit of embodiments of the present disclosure. In one embodiment, a digital photographic system, such as digital photographic system, is configured to perform method 24-100. The digital photographic system may be implemented within a digital camera, such as digital camera or a mobile device. In certain embodiments, a camera module, such as camera module, is configured to perform method 24-100. Method 24-100 may be performed with or without a strobe unit, such as strobe unit, enabled to contribute illumination to the photographic scene.

Method 24-100 begins in step 24-110, where the camera module configures exposure parameters for an image stack to be sampled by the camera module. Configuring the exposure parameters may include, without limitation, writing registers within an image sensor comprising the camera module that specify exposure time for each participating analog storage plane, exposure sensitivity for one or more analog storage planes, or a combination thereof. Exposure parameters may be determined prior to this step according to any technically feasible technique, such as well-known techniques for estimating exposure based on measuring exposure associated with a sequence of test images sampled using different exposure parameters.

In step 24-112, the camera module receives a capture command. The capture command directs the camera module to sample two or more images comprising the image stack. The capture command may result from a user pressing a shutter release button, such as a physical button or a user interface button. In step 24-114, the camera module initializes a pixel array within the image sensor. In one embodiment, initializing the pixel array comprises driving voltages on internal nodes of photo-sensitive cells within one or more analog storage planes to a reference voltage, such as a supply voltage or a bias voltage. In step 24-116, the camera module enables analog sampling circuits within two or more analog storage planes to simultaneously integrate (accumulate) an image corresponding to a photographic scene. In one embodiment, integrating an image comprises each analog sampling circuit within an analog storage plane integrating a current generated by a corresponding photodiode. In step 24-118, analog sampling circuits within enabled analog storage planes integrate a respective image during a sampling interval. Each sampling interval may comprise a different time duration.

If, in step 24-120, the camera module should sample another image, then the method proceeds to step 24-122, where the camera module disables sampling for one analog storage plane within the image sensor. Upon disabling sampling for a given analog storage plane, an image associated with the analog storage plane has been sampled completely for an appropriate exposure time.

Returning to step 24-120, if the camera module should not sample another image then the method terminates. The camera module should not sample another image after the last sampling interval has lapsed and sampling of the last image has been completed.

Reading an image from a corresponding analog storage plane may proceed using any technically feasible technique.

FIG. 24-1B illustrates a flow chart of a method 24-102 for generating an image stack comprising an ambient image and a strobe image of a photographic scene, in accordance with one embodiment. Although method 24-102 is described in conjunction with the systems of FIGS. 2A-3B, persons of ordinary skill in the art will understand that any system that performs method 24-102 is within the scope and spirit of embodiments of the present disclosure. In one embodiment, a digital photographic system, such as digital photographic system as disclosed herein, is configured to perform method 24-102. The digital photographic system may be implemented within a digital camera, such as digital camera or a mobile device.

Method 24-102 begins in step 24-140, where the camera module configures exposure parameters for an image stack to be sampled by the camera module. Configuring the exposure parameters may include, without limitation, writing registers within an image sensor comprising the camera module that specify exposure time for each participating analog storage plane, exposure sensitivity for one or more analog storage planes, or a combination thereof. Exposure parameters may be determined prior to this step according to any technically feasible technique, such as well-known techniques for estimating exposure based on measuring exposure associated with a sequence of test images sampled using different exposure parameters.

In step 24-142, the camera module receives a capture command. The capture command directs the camera module to sample two or more images comprising the image stack.

The capture command may result from a user pressing a shutter release button, such as a physical button or a user interface button. In step 24-144, the camera module initializes a pixel array within the image sensor. In one embodiment, initializing the pixel array comprises driving voltages on internal nodes of photo-sensitive cells within one or more analog storage planes to a reference voltage, such as a supply voltage or a bias voltage.

In step 24-146, the camera module samples one or more ambient images within corresponding analog storage planes. In one embodiment, step 24-146 implements steps 24-116 through 24-122 of method 24-100 of FIG. 24-1A.

In step 24-150, the camera module determines that a strobe unit, such as strobe unit as disclosed herein, is enabled. In one embodiment, determining that the strobe unit is enabled includes the camera module directly enabling the strobe unit, such by transmitting a strobe control command through strobe control signal as disclosed herein. In another embodiment, determining that the strobe unit is enabled includes the camera module detecting that the strobe unit has been enabled, such as by processor complex as disclosed herein.

In step 24-152, the camera module samples one or more strobe images within corresponding analog storage planes. In one embodiment, step 24-152 implements steps 24-116 through 24-122 of method 24-100 of FIG. 24-1A. In one embodiment, the camera module directly disables the strobe unit after completing step 24-152, such as by transmitting a strobe control command through strobe control signal as disclosed herein. In another embodiment, processor complex as disclosed herein disables the strobe unit after the camera module completes step 24-152.

In certain embodiments, the camera module is configured to store both ambient images and strobe images concurrently within analog storage planes. In other embodiments, the camera module offloads one or more ambient images prior to sampling a strobe image.

FIG. 24-2 illustrates a block diagram of image sensor as disclosed herein, according to one embodiment of the present disclosure. As shown, image sensor as disclosed herein comprises row logic 24-412, a control (CTRL) unit 24-414, a pixel array 24-410, a column read out circuit 24-420, an analog-to-digital unit 24-422, and an input/output interface unit 24-426. The image sensor as disclosed herein may also include a statistics unit 24-416.

Pixel array 24-410 comprises a two-dimensional array of pixels 24-440 configured to sample focused optical image information and generate a corresponding electrical representation. Each pixel 24-440 samples intensity information for locally incident light and stores the intensity information within associated analog sampling circuits. In one embodiment, the intensity information comprises a color intensity value for each of a red, a green, and a blue color channel. Row logic 24-412 includes logic circuits configured to drive row signals associated with each row of pixels. The row signals may include, without limitation, a reset signal, a row select signal, and at least two independent sample control signals. One function of a row select signal is to enable switches associated with analog sampling circuits within a row of pixels to couple analog signal values (e.g., analog current values or analog voltage values) to a corresponding column output signal, which transmits the analog signal value to column read out circuit 24-420. Column read out circuit 24-420 may be configured to multiplex the column output signals to a smaller number of column sample signals, which are transmitted to analog-to-digital unit 24-422. Column read out circuit 24-420 may multiplex an arbitrary ratio of column output signals to column sample signals. Analog-to-digital unit 24-422 quantizes the column sample signals for transmission to interconnect as disclosed herein via input/output interface 24-426.

In one embodiment, the analog signal values comprise analog currents, and the analog-to-digital unit 24-422 is configured to convert an analog current to a corresponding digital value. In other embodiments, column read out circuit 24-420 is configured to convert analog current values to corresponding analog voltage values (e.g. through a transimpedance amplifier or TIA), and the analog-to-digital unit 24-422 is configured to convert the analog voltage values to corresponding digital values. In certain embodiments, column read out circuit 24-420 implements an analog gain function, which may be configured according to a digital gain value.

In one embodiment, control unit 24-414 is configured to generate detailed timing control signals for coordinating operation of row logic 24-412, column read out circuit 24-420, analog-to-digital unit 24-422, input output interface unit 24-426, and statistics unit 24-416.

In one embodiment, statistics unit 24-416 is configured to monitor pixel data generated by analog-to-digital unit 24-422 and, from the monitored pixel data, generate specified image statistics. The image statistics may include, without limitation, histogram arrays for individual pixel color channels for an image, a histogram array for intensity values derived from each pixel intensity value for an image, intensity sum values for each color channel taken over an image, a median intensity value for an image, an exposure value (EV) for an image, and the like. Image statistics may further include, without limitation, a pixel count for pixels meeting certain defined criteria, such as a pixel count for pixels brighter than a high threshold intensity, a pixel count for pixels darker than a low threshold intensity, a weighted pixel sum for pixels brighter than a high threshold intensity, a weighted pixel sum for pixels darker than a low threshold intensity, or any combination thereof. Image statistics may further include, without limitation, curve fitting parameters, such as least squares parameters, for linear fits, quadratic fits, non-quadratic polynomial fits, exponential fits, logarithmic fits, and the like.

Image statistics may further include, without limitation, one or more parameters computed from one or more specified subsets of pixel information sampled from pixel array 24-410. One exemplary parameter defines a subset of pixels to be a two-dimensional contiguous region of pixels associated with a desired exposure point. Here, an exposure parameter may be computed, for example, as a median intensity value for the region, or as a count of pixels exceeding a threshold brightness for the region. For example, a rectangular region corresponding to an exposure point may be defined within an image associated with the pixel array, and a median intensity may be generated for the rectangular region, given certain exposure parameters such as exposure time and ISO sensitivity.

Image statistics may be accumulated and computed as digital samples become available from pixel array 24-410. For example, image statistics may be accumulated as digital samples are generated by the analog-to-digital unit 24-422. In certain embodiments, the samples may be accumulated during transmission through interconnect as disclosed herein. In one embodiment, the image statistics are mapped in a memory-mapped register space, which may be accessed through interconnect as disclosed herein. In other embodiments, the image statistics are transmitted in conjunction with transmitting pixel data for a captured image. For example, the image statistics for a given image may be transmitted as in-line data, following transmission of pixel intensity data for the image.

In one embodiment, image statistics are computed using a fixed-function logic circuit comprising statistics unit 24-416. In other embodiments, image statistics are computed via a programmable processor comprising statistics unit 24-416. In certain embodiments, programming instructions may be transmitted to the programmable processor via interconnect as disclosed herein.

In one embodiment, control unit 24-414 is configured to adjust exposure parameters for pixel array 24-410 based on images statistics for a previous image. In this way, image sensor as disclosed herein may advantageously determine proper exposure parameters per one or more specified exposure points without burdening processor resources within processor complex as disclosed herein, and without incurring concomitant latencies. The proper exposure parameters may be determined by sampling sequential images and adjusting the exposure parameters for each subsequent image based on exposure parameters for a corresponding previous image. The exposure parameters for a given captured image may be read by camera interface unit as disclosed herein and stored as metadata for the image.

In one embodiment, input/output interface unit 24-426 is configured to modify pixel intensity data associated with a captured frame based on certain image statistics. In one implementation, input/output interface unit 24-426 adjusts white balance of an image during transmission of image data through interconnect as disclosed herein. Red, green, and blue components of each pixel may be scaled based on previously computed image statistics. Such image statistics may include a sum of red, green, and blue components. With these sums, input/output interface unit 24-426 may be configured to perform a conventional gray world white balance correction. Alternatively, the image statistics may include quadratic curve fit parameters. With quadratic fit components, input/output interface unit 24-426 may be configured to perform a quadratic white balance mapping. Additional embodiments provide for illuminator identification via selecting for pixels above a lower threshold and below an upper threshold for consideration in determining white balance. Still further embodiments provide for color temperature identification by mapping selected samples to a color temperature snap-point. Mapping color temperature to a snap-point thereby applies an assumption that scene illumination is provided by an illuminator having a standard color temperature. In each example, image statistics may be optionally applied to adjust pixel information prior to transmission via interconnect as disclosed herein.

In an alternative embodiment, statistics unit 24-416, as well as pixel modification functions discussed herein with respect to input/output interface unit 24-426 are instead implemented within sensor interface as disclosed herein, residing within processor complex as disclosed herein. In such an embodiment, power and heat dissipation associated with statistics unit 24-416 and related pixel modification functions is shifted away from pixel array 24-410, which may incorporate circuitry that is sensitive to heat. In another alternative embodiment, statistics unit 24-416, as well as pixel modification functions discussed herein with respect to input/output interface unit 24-426 are instead implemented within a separate die disposed within camera module as disclosed herein. In such an embodiment, related power and heat dissipation is also shifted away from pixel array 24-410. In this embodiment, camera module as disclosed herein is configured to offer statistics and pixel modification functions in conjunction with a conventional processor complex as disclosed herein, which may be configured to include a conventional sensor interface.

FIG. 24-3 is a circuit diagram for a conventional photo-sensitive cell 24-300 within a pixel, implemented using complementary-symmetry metal-oxide semiconductor (CMOS) devices. Photo-sensitive cell 24-300 may be used to implement cells comprising a conventional pixel. A photodiode (PD) 510 is configured to convert incident light 24-312 into a photodiode current (I_PD). Field-effect transistors (FETs) 24-320, 24-322, 24-324, 24-326, and capacitor C 24-328 are configured to integrate the photodiode current over an exposure time, to yield a resulting charge associated with capacitor C 24-328. Capacitor C 24-328 may comprise a distinct capacitor structure, as well as gate capacitance associated with FET 24-324, and diffusion to well capacitance, such as drain capacitance, associated with FETS 24-24-320, 24-322.

FET 24-24-320 is configured to provide a path to charge node 24-329 to a voltage associated with voltage supply V2 when reset0 24-330 is active (e.g., low). FET 24-322 provides a path for the photodiode current to discharge node 24-329 in proportion to an intensity of incident light 24-312, thereby integrating incident light 24-312, when sample 24-334 is active (e.g., high). The resulting charge associated with capacitor C 24-328 is an integrated electrical signal that is proportional to the intensity of incident light 24-312 during the exposure time. The resulting charge provides a voltage potential associated with node 24-329 that is also proportional to the intensity of incident light 24-312 during the exposure time.

When row select 24-336 is active (e.g., high), FET 24-326 provides a path for an output signal current from voltage source V1 through FET 24-324, to out 24-338. FET 24-324 converts a voltage on node 24-329, into a corresponding output current signal through node out 538. During normal operation, incident light sampled for an exposure time corresponding to an active time for sample 24-334 is represented as a charge on capacitor C 24-328. This charge may be coupled to output signal out 24-338 and read as a corresponding current value. This circuit topology facilitates non-destructive reading of charge on node 24-329.

FIG. 24-4A is a circuit diagram for a photo-sensitive cell 24-600, according to one embodiment. An instance of photo-sensitive cell 24-600 may implement one cell of cells 24-442-24-445 comprising a pixel 24-440. As shown, photo-sensitive cell 24-600 comprises two analog sampling circuits 24-601, and photodiode 24-620. Analog sampling circuit 24-601(A) comprises FETs 24-622, 24-624, 24-626, 24-628, and node C 24-610. Analog sampling circuit 24-601(B) comprises FETs 24-652, 24-654, 24-656, 24-658, and node C 24-640.

Node C 24-610 represents one node of a capacitor that includes gate capacitance for FET 24-24-624 and diffusion capacitance for FETs 24-622 and 24-628. Node C 24-610 may also be coupled to additional circuit elements (not shown) such as, without limitation, a distinct capacitive structure, such as a metal-oxide stack, a poly capacitor, a trench capacitor, or any other technically feasible capacitor structures. Node C 24-640 represents one node of a capacitor that includes gate capacitance for FET 24-654 and diffusion capacitance for FETs 24-652 and 24-658. Node C 24-640 may also be coupled to additional circuit elements (not shown) such as, without limitation, a distinct capacitive structure, such as a metal-oxide stack, a poly capacitor, a trench capacitor, or any other technically feasible capacitor structures.

When reset1 24-630 is active (low), FET 24-628 provides a path from voltage source V2 to node C 24-610, causing node C 24-610 to charge to the potential of V2. When sample1 24-632 is active, FET 24-622 provides a path for node C 24-610 to discharge in proportion to a photodiode current (I_PD) generated by photodiode 24-620 in response to incident light 24-621. In this way, photodiode current I_PD is integrated for a first exposure time when sample1 24-632 is active, resulting in a corresponding voltage on node C 24-610. When row select 24-634 is active, FET 24-24-626 provides a path for a first output current from V1 to output outA 24-612. The first output current is generated by FET 24-24-624 in response to the voltage on C 24-610. When row select 24-634 is active, the output current at outA 24-612 is therefore proportional to the integrated intensity of incident light 24-621 during the first exposure time.

When reset2 24-660 is active (low), FET 24-658 provides a path from voltage source V2 to node C 24-640, causing node C 24-640 to charge to the potential of V2. When sample2 24-662 is active, FET 24-652 provides a path for node C 24-640 to discharge according to a photodiode current (I_PD) generated by photodiode 24-620 in response to incident light 24-621. In this way, photodiode current I_PD is integrated for a second exposure time when sample2 24-662 is active, resulting in a corresponding voltage on node C 24-640. When row select 24-664 is active, FET 24-656 provides a path for a second output current from V1 to output outB 24-642. The second output current is generated by FET 24-654 in response to the voltage on C 24-640. When row select 24-664 is active, the output current at outB 24-642 is therefore proportional to the integrated intensity of incident light 24-621 during the second exposure time.

Photo-sensitive cell 24-600 includes independent reset signals reset1 24-630 and reset2 24-660, independent sample signals sample1 24-632 and sample2 24-662, independent row select signals row select1 24-634 and row select2 24-664, and independent output signals outA 24-612 and outB 24-642. In one embodiment, column signals as disclosed herein comprise independent signals outA 24-612 and outB 24-642 for each cell within each pixel 24-440 within a row of pixels. In one embodiment, row control signals 24-430 comprise signals for row select1 24-634 and row select2 24-664, which are shared for a given row of pixels.

A given row of instances of photo-sensitive cell 24-600 may be selected to drive respective outA 24-612 signals through one set of column signals 24-432. The row of instances of photo-sensitive cell 24-600 may also be selected to independently drive respective outB 24-642 signals through a second, parallel set of column signals 24-432. In one embodiment, reset1 24-630 is coupled to reset2 24-660, and both are asserted together.

Summarizing the operation of photo-sensitive cell 24-600, two different samples of incident light 24-621 may be captured and stored independently on node C 24-610 and node C 24-640. An output current signal corresponding to the first sample of the two different samples may be coupled to output outA 24-612 when row select1 24-634 is active. Similarly, an output current signal corresponding to the second of the two different samples may be coupled to output outB 24-642 when row select2 24-664 is active.

FIG. 24-4B is a circuit diagram for a photo-sensitive cell 24-602, according to one embodiment. An instance of photo-sensitive cell 24-602 may implement one cell of cells 24-442-24-445 comprising a pixel 24-440. Photo-sensitive cell 24-602 operates substantially identically to photo-sensitive cell 24-600 of FIG. 24-4A, with the exception of having a combined output signal out 24-613 rather than independent output signals outA 24-612, outB 24-642. During normal operation of photo-sensitive cell 24-602, only one of row select1 24-634 and row select2 24-664 should be driven active at any one time. In certain scenarios, photo-sensitive cell 24-602 may be designed to advantageously implement cells requiring less layout area devoted to column signals 24-432 than photo-sensitive cell 24-600.

FIG. 24-4C is a circuit diagram for a photo-sensitive cell 24-604, according to one embodiment. Photo-sensitive cell 24-604 operates substantially identically to sensitive cell 24-600 of FIG. 24-4A, with the exception of implementing a combined row select 24-635 rather than independent row select signals row select1 24-634 and row select2 24-664. Photo-sensitive cell 24-604 may be used to advantageously implement cells requiring less layout area devoted to row control signals 24-430.

Although photo-sensitive cell 24-600, photo-sensitive cell 24-602, and photo-sensitive cell 24-604 are each shown to include two analog sampling circuits 24-601, persons skilled in the art will recognize that these circuits can be configured to instead include an arbitrary number of analog sampling circuits 24-601, each able to generate an independent sample. Furthermore, layout area for a typical cell is dominated by photodiode 24-620, and therefore adding additional analog sampling circuits 24-601 to a photo-sensitive cell has a relatively modest marginal impact on layout area.

In general, sample1 24-632 and sample2 24-662 may be asserted to an active state independently. In certain embodiments, sample1 24-632 and sample2 24-662 are asserted to an active state sequentially, with only one analog sampling circuit 24-601 sourcing current to the photodiode 24-620 at a time. In other embodiments, sample1 24-632 and sample2 24-662 are asserted to an active state simultaneously to generate images that are sampled substantially concurrently, but with each having a different effective exposure time.

When both sample1 24-632 and sample2 24-662 are asserted simultaneously, photodiode current I_PD will be divided between discharging node C 24-610 and node C 24-640. For example, if sample1 24-632 and sample2 24-662 are both initially asserted, then I_PD is split initially between discharging node C 24-610 and discharging node C 24-640, each at an initial discharge rate. A short time later, if sample2 24-662 is unasserted (set to inactive), then C 24-610 is discharged at a faster rate than the initial discharge rate. In such a scenario, C 24-640 may be used to capture a color component of a pixel within a first image having a less sensitive exposure (shorter effective exposure time), while C 24-610 may be used to capture a corresponding color component of a pixel within a second image having a more sensitive exposure (longer effective exposure time). While both of the above color components were exposed according to different effective and actual exposure times, both color components were also captured substantially coincidentally in time, reducing the likelihood of any content change between the first image and the second image.

In one exemplary system, three substantially identical analog sampling circuits 24-601 are instantiated within a photo-sensitive cell. In a first sampling interval lasting one half of a unit of time, all three analog sampling currents are configured to source current (sample signal active) into the photodiode 24-620, thereby splitting photodiode current I_PD substantially equally three ways. In a second sampling interval, lasting one unit of time, a first of the three analog sampling circuits 24-601 is configured to not continue sampling and therefore not source current into the photodiode 24-620. In a third sampling interval, lasting two units of time, a second of the three analog sampling circuits 24-601 is configured to not continue sampling and therefore not source current into the photodiode 24-620.

In this example, the first analog sampling circuit 24-601 is able to integrate one quarter of the photodiode current multiplied by time as the second analog sampling circuit 24-601, which was able to integrate one quarter of the photodiode current multiplied by time as the third analog sampling circuit 24-601. The second analog sampling circuit 24-601 may be associated with a proper exposure (0 EV), while the first analog sampling circuit 24-601 is therefore associated with a two-stop under exposure (−2 EV), and the third analog sampling circuit 24-601 is therefore associated with a two-stop over exposure (+2 EV). In one embodiment, digital photographic system as disclosed herein determines exposure parameters for proper exposure for a given scene, and subsequently causes the camera module as disclosed herein to sample three images based on the exposure parameters. A first image of the three images is sampled according to half an exposure time specified by the exposure parameters (−2 EV), a second image of three images is sampled according to the exposure time specified by the exposure parameters (0 EV), while a third image of three images is sampled according to twice the exposure time specified by the exposure parameters (2 EV). The first image is sampled concurrently with the second image and third image, while the second image is sample concurrently with the third image. As a consequence of concurrent sampling, content differences among the three images are significantly reduced and advantageously bounded by differences in exposure time between images, such as images comprising an image stack. By contrast, prior art systems sample images sequentially rather than concurrently, thereby introducing greater opportunities for content differences between each image.

These three exposure levels (−2, 0, +2 EV) for images comprising an image stack are suitable candidates for HDR blending techniques, including a variety of conventional and well-known techniques. In certain embodiments, conventional techniques may be implemented to determine exposure parameters, including a mid-range exposure time, for a given scene associated with a proper exposure (0 EV). Continuing the above example, the first sampling interval would implement an exposure time of half the mid-range exposure time. The second sampling interval would implement the mid-range exposure time, and the third sampling interval would implement an exposure time of twice the mid-range exposure time.

In other embodiments, the analog sampling circuits 24-601 are not substantially identical. For example, one of the analog sampling circuits 24-601 may include twice or one half the storage capacitance (such as the capacitance associated with node C 24-610 of FIG. 24-4A) of a different analog sampling circuit 24-601 within the same pixel. Persons skilled in the art will understand that relative sample times for each different analog sampling circuit 24-601 may be computed based on relative capacitance and target exposure ratios among corresponding images.

In one embodiment, image sensor as disclosed herein comprising pixels 24-440 fabricated to include two or more instances of analog sampling circuits 24-601 is configured to sample one or more ambient image and sequentially sample one or more images with strobe illumination.

Figures 4D, 24:
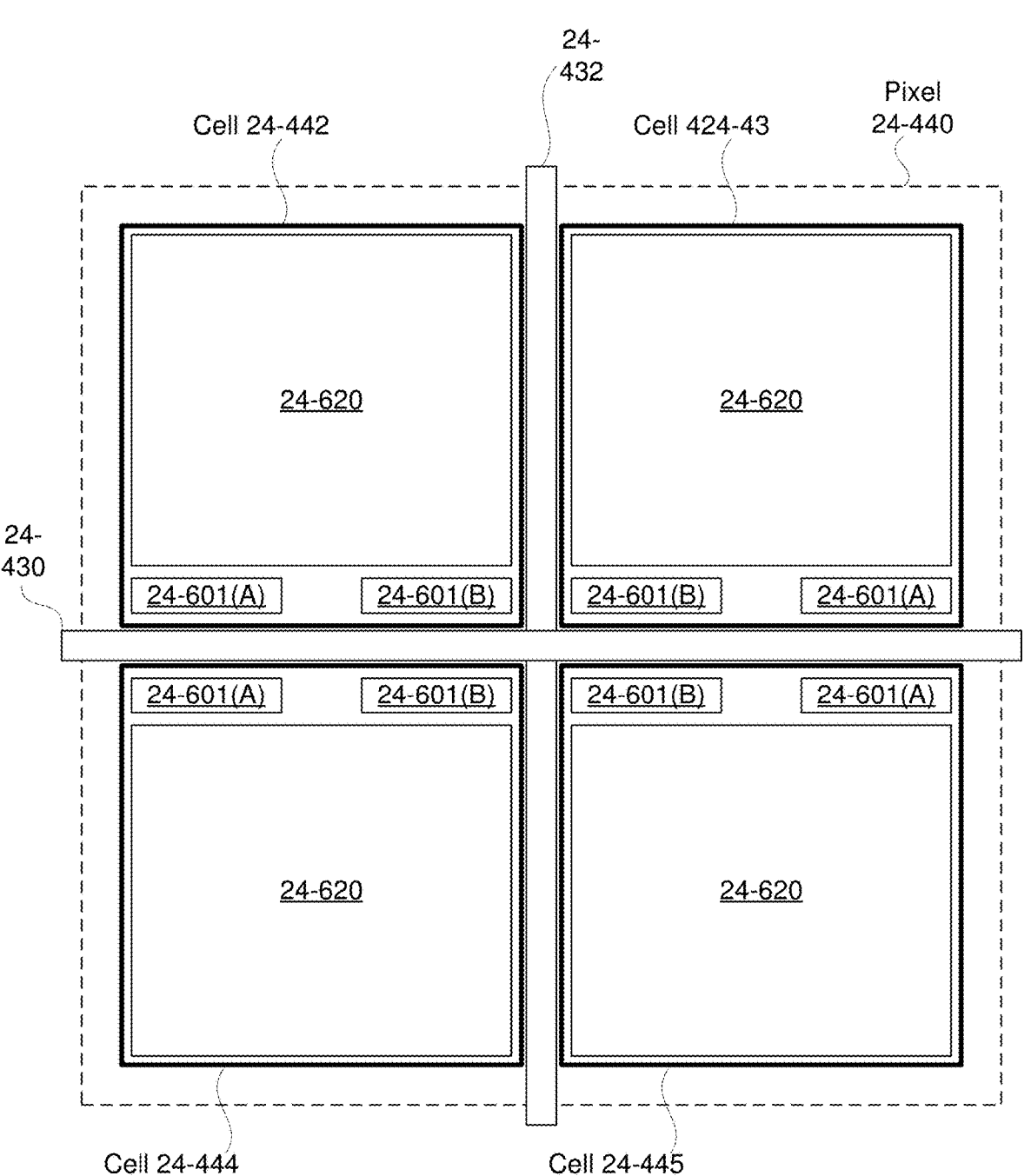

FIG. 24-4D depicts exemplary physical layout for a pixel 24-440 comprising four photo-sensitive cells 24-442, 24-443, 24-444, 24-445, according to one embodiment. As shown, each photo-sensitive cell 24-442, 24-443, 24-444, 24-445 includes a photodiode 24-620 and analog sampling circuits 24-601. Two analog sampling circuits 24-601 are shown herein, however in other embodiments, three, four, or more analog sampling circuits 24-601 are included in each photo-sensitive cell.

In one embodiment, column signals 24-432 are routed vertically between photo-sensitive cells 24-442 and 24-443, and between photo-sensitive cells 24-444 and 24-445. Row control signals 24-430 are shown herein as running between photo-sensitive cells 24-442 and 24-444, and between photo-sensitive cells 24-443 and 24-445. In one embodiment, layout for cells 24-442, 24-443, 24-444, and 24-445 is reflected substantially symmetrically about an area centroid of pixel 24-440. In other embodiments, layout for the cells 24-442, 24-443, 24-444, and 24-445 is instantiated without reflection, or with different reflection than shown here.

Figures 5A, 24:
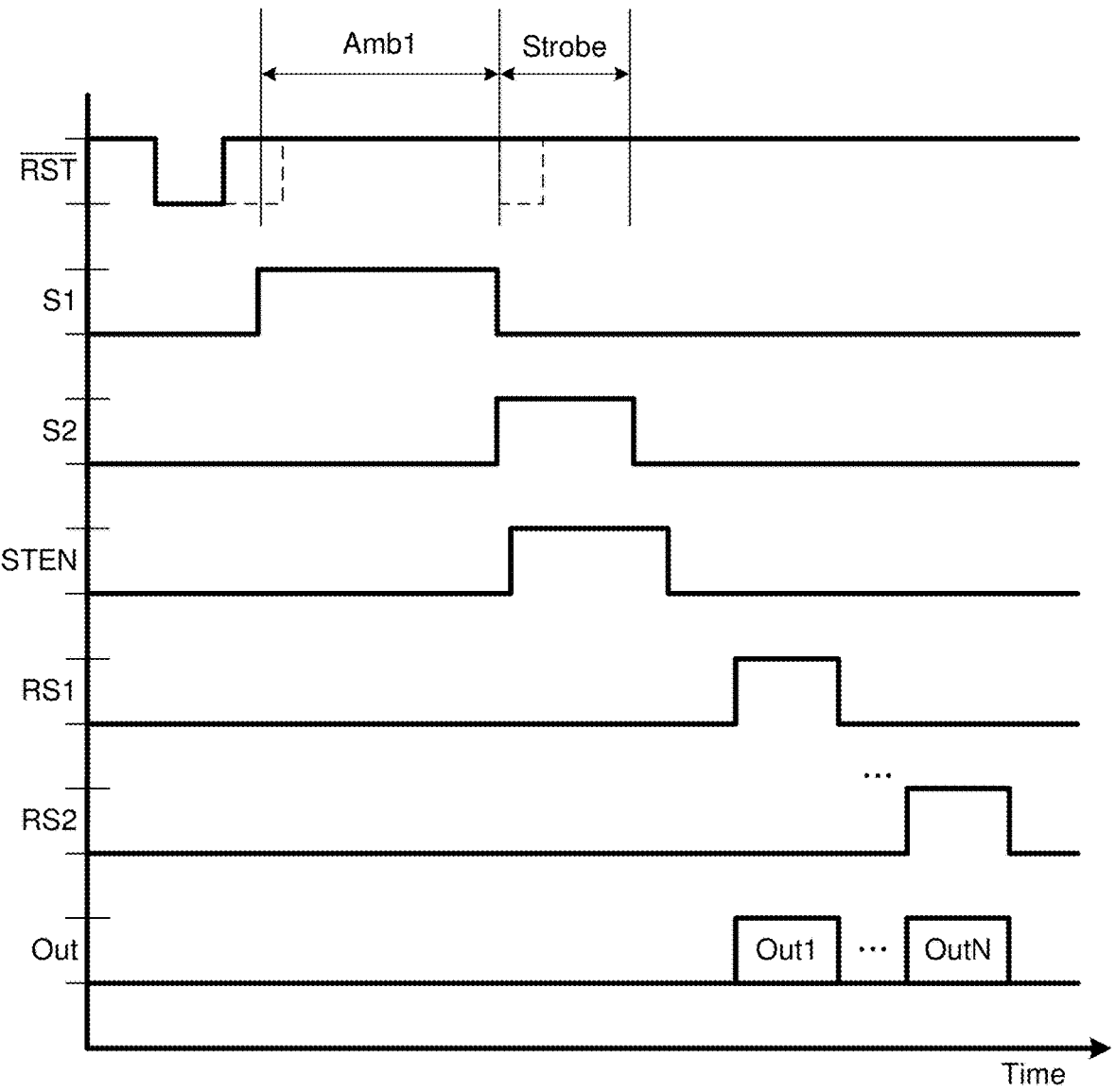

FIG. 24-5A illustrates exemplary timing for controlling cells within a pixel array to sequentially capture an ambient image and a strobe image illuminated by a strobe unit, according to one embodiment of the present disclosure. As shown, an active-low reset signal (RST) is asserted to an active low state to initialize cells within the pixel array. Each cell may implement two or more analog sampling circuits, such as analog sampling circuit 24-601 of FIGS. 6A-6C, coupled to a photodiode, such as photodiode 24-620. In one embodiment, each cell comprises an instance of photo-sensitive cell 24-600. In another embodiment, each cell comprises an instance of photo-sensitive cell 24-602. In yet another embodiment, each cell comprises an instance of photo-sensitive cell 24-604. In still yet another embodiment, each cell comprises an instance of a photo-sensitive cell that includes two or more technically feasible analog sampling circuits, each configured to integrate a signal from a photodiode, store an integrated value, and drive a representation of the integrated value to a sense wire, such as a column signal, such as a column signal 24-432.

A first sample enable signal (S1) enables a first analog sampling circuit comprising a first analog storage plane to integrate a signal from an associated photodiode. A second sample enable signal (S2) enables a second analog sampling circuit comprising a second analog storage place to integrate the signal from the photodiode. In one embodiment, both reset1 24-630 and reset2 24-660 correspond to reset signal RST, sample1 24-632 corresponds to S1, and sample2 24-662 corresponds to S2. Furthermore, row select1 24-634 corresponds to RS1 and row select 24-664 corresponds to RS2. In certain embodiments, RST is asserted briefly during each assertion of S1 and S2 to bias the photodiode prior to sampling the photodiode current. In certain other embodiments, each photodiode is coupled to a FET that is configured to provide a reset bias signal to the photodiode independent of the RST signal. Such biasing may be implemented in FIGS. 24-5B through 24-5F.

An Out signal depicts an analog signal being driven from an analog sampling circuit 24-601. The Out signal may represent outA 24-612, outB 24-642, or Out 24-613, depending on a particular selection of analog sampling circuit 24-601. For example, in an embodiment that implements photo-sensitive cell 24-602, RS1 and RS2 are asserted mutually exclusively and the Out signal corresponds to Out 24-613.

A strobe enable signal (STEN) corresponds in time to when a strobe unit is enabled. In one embodiment, camera module generates STEN to correspond in time with S1 being de-asserted at the conclusion of sampling an ambient image (AmbI).

Figures 5B, 24:
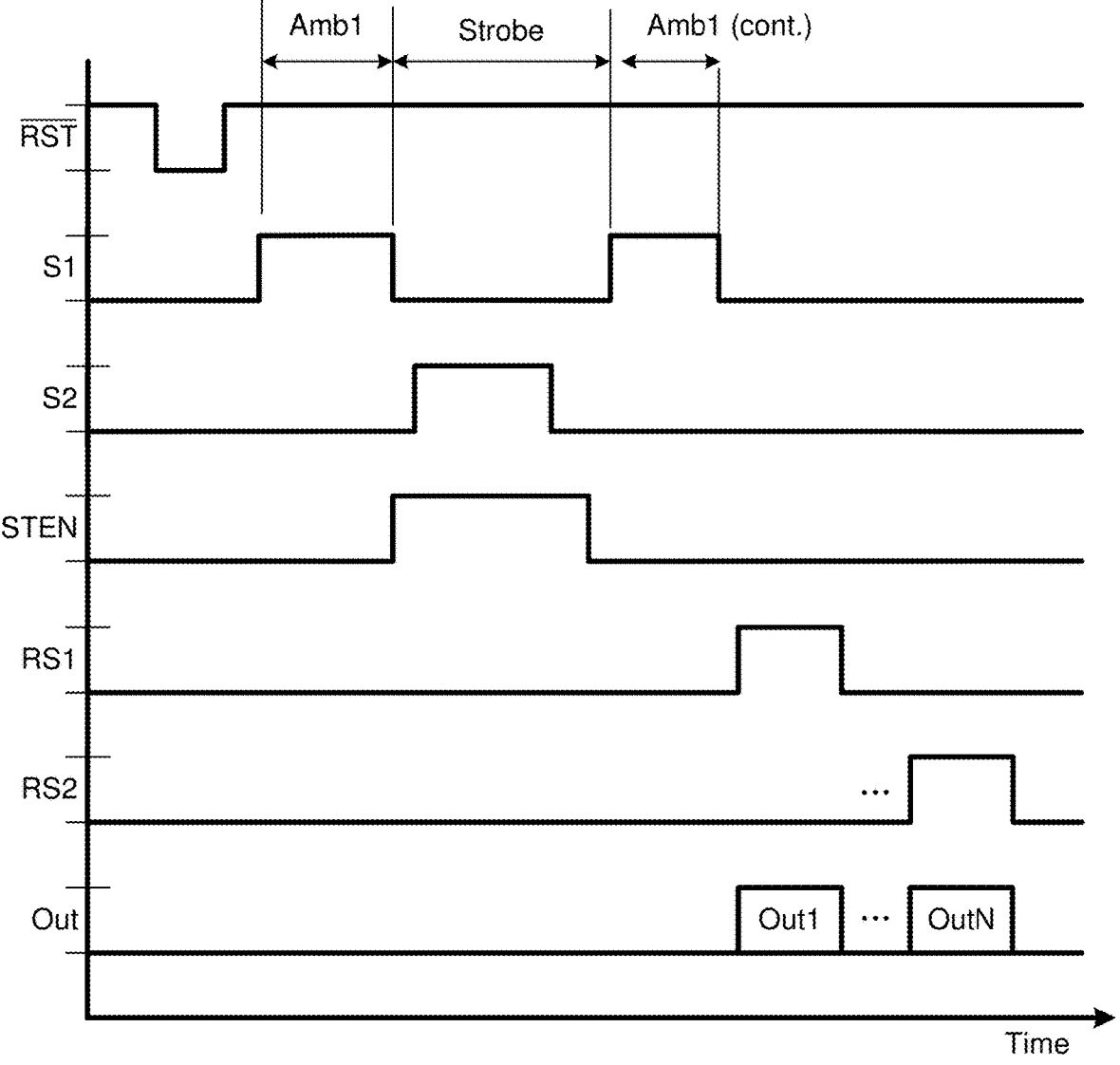

FIG. 24-5B illustrates exemplary timing for controlling cells within a pixel array to concurrently capture an ambient image and an image illuminated by a strobe unit, according to one embodiment of the present disclosure. As shown, the active duration of STEN is shifted in time between two different sampling intervals for the same ambient image. This technique may result in charge sharing between each analog sampling circuit and the photodiode. In this context, charge sharing would manifest as inter-signal interference between a resulting ambient image and a resulting strobe image. Removing the inter-signal interference may attenuated in the ambient image and the strobe image using any technically feasible technique.

Figures 5C, 24:
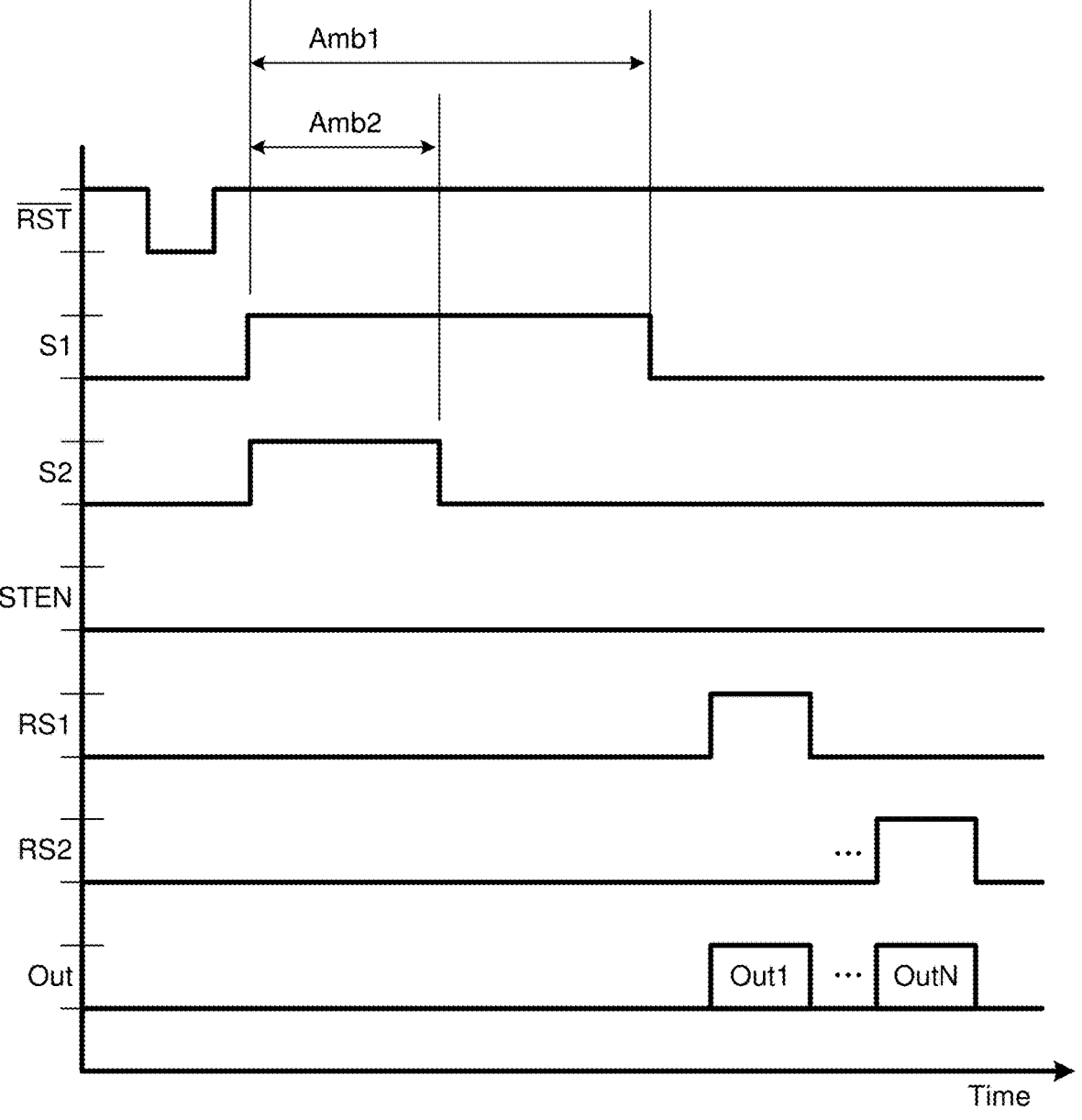

FIG. 24-5C illustrates exemplary timing for controlling cells within a pixel array to concurrently capture two ambient images having different exposures, according to one embodiment of the present disclosure. As shown, S1 and S2 are asserted active at substantially the same time. As a consequence, sampling of the two ambient images is initiated concurrently in time. In other embodiments, the strobe unit is enabled during Amb1 and at least one of the images comprises a strobe image rather than an ambient image.

Figures 5D, 24:
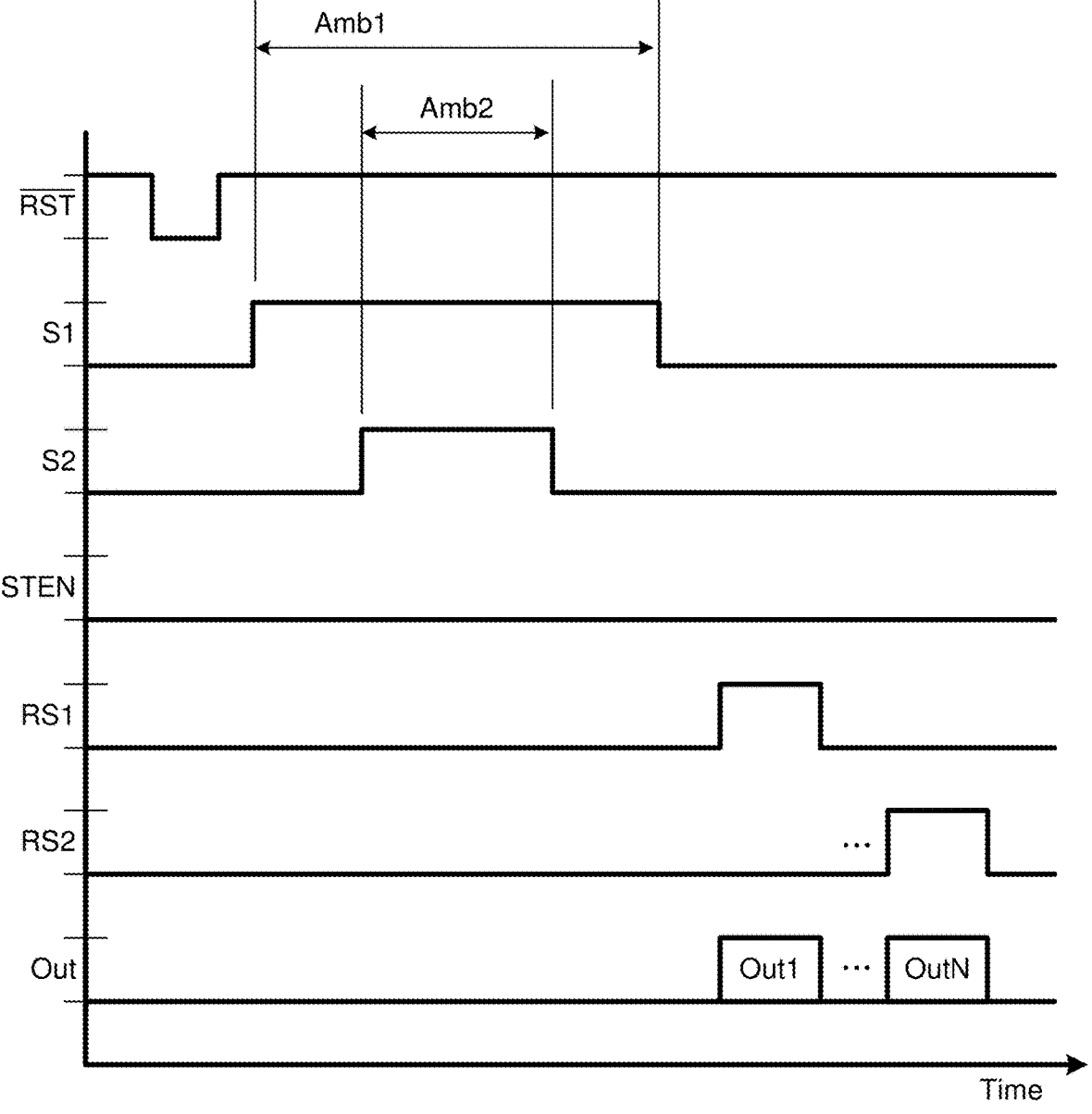

FIG. 24-5D illustrates exemplary timing for controlling cells within a pixel array to concurrently capture two ambient images having different exposures, according to one embodiment of the present disclosure. As shown, S2 is asserted after S1, shifting the sample time of the second image to be centered with that of the first image. In certain scenarios, centering the sample time may reduce content differences between the two images.

Figures 5E, 24:
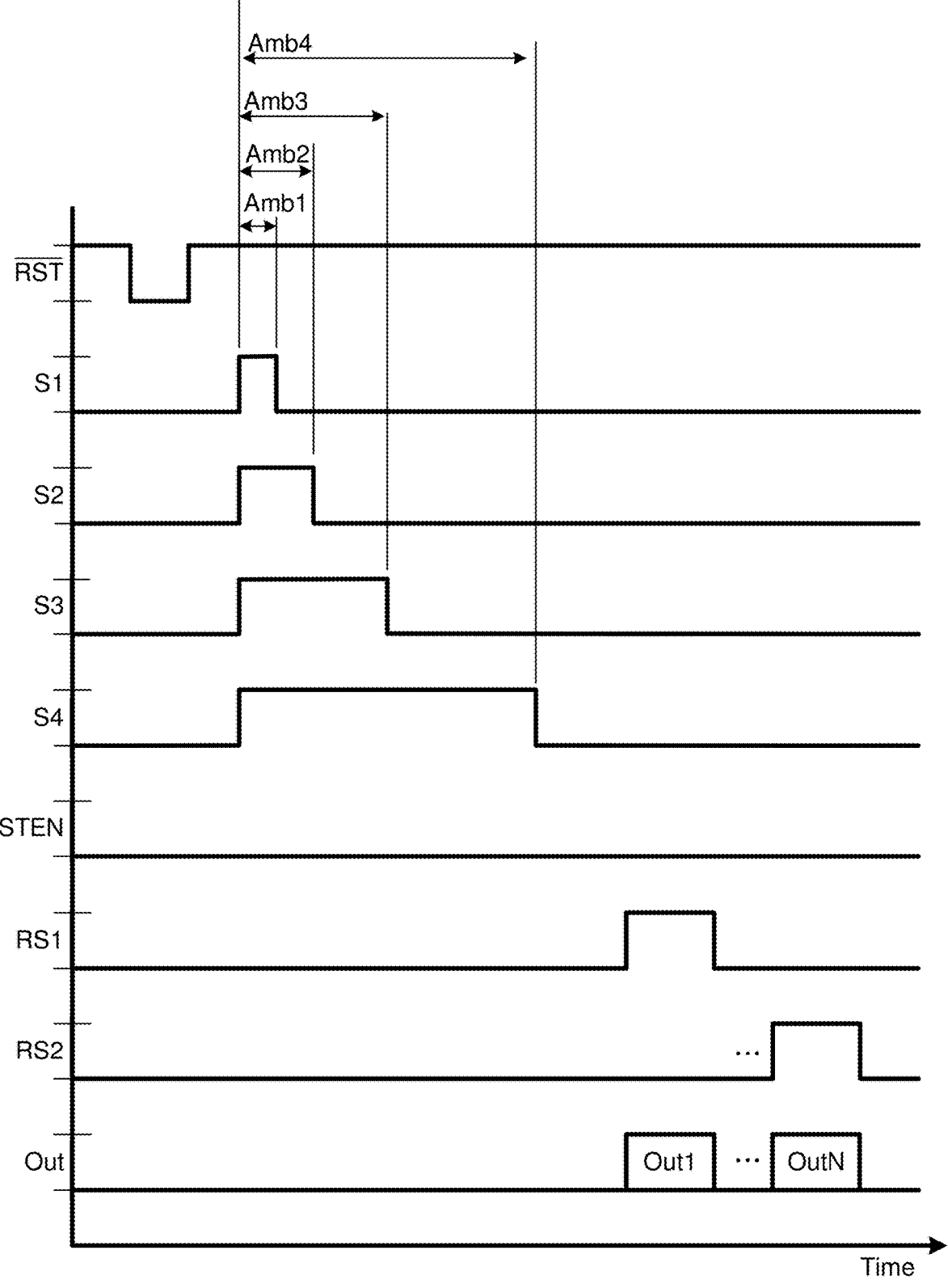

FIG. 24-5E illustrates exemplary timing for controlling cells within a pixel array to concurrently capture four ambient images, each having different exposure times, according to one embodiment of the present disclosure. Each of the four ambient images corresponds to an independent analog storage plane. In certain embodiments, a strobe unit is enabled and strobe images are captured rather than ambient images.

Figures 5F, 24:
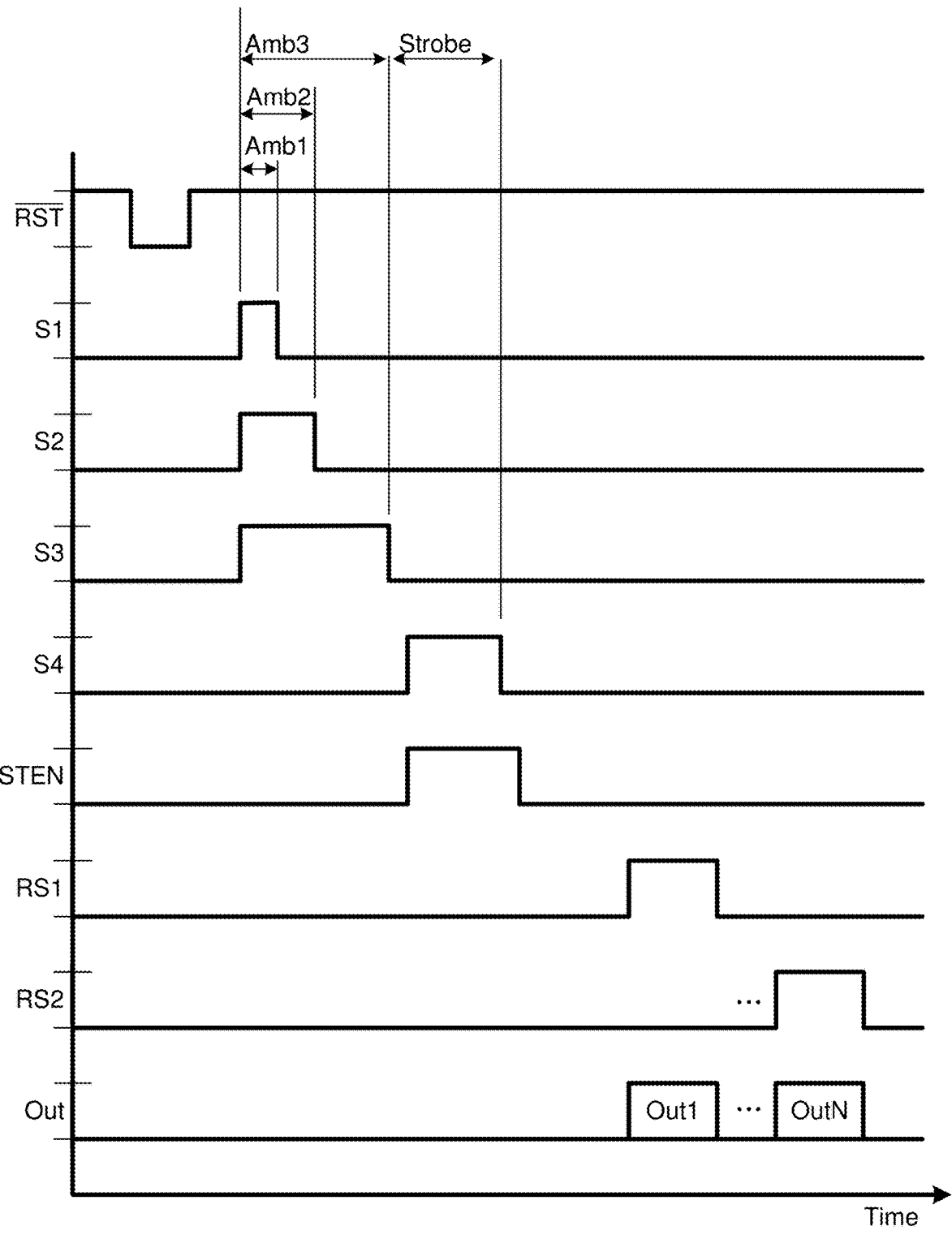

FIG. 24-5F illustrates exemplary timing for controlling cells within a pixel array to concurrently capture three ambient images having different exposures and subsequently capture a strobe image, according to one embodiment of the present disclosure.

While row select signals (RS1, RS2) are shown in FIGS. 7A through 7F, different implementations may require different row selection configurations. Such configurations are within the scope and spirit of different embodiments of the present disclosure.

While various embodiments have been described above with respect to a digital camera and a mobile device, any device configured to perform the method 24-100 of FIG. 24-1A or method 24-102 of FIG. 24-1B is within the scope and spirit of the present disclosure. In certain embodiments, two or more digital photographic systems implemented in respective devices are configured to sample corresponding image stacks in mutual time synchronization.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus is configured such that different adjacent cells of the image sensor correspond with a same color of light, and are subject to:

for a first image, a first sampling for which one or more analog signals generated by each of the different adjacent cells corresponding with the same color of light are sampled and combined before being utilized to generate at least a portion of at least one first line analog signal that corresponds to a line associated with the different adjacent cells of the image sensor, and for a second image, a second sampling for which one or more analog signals generated by at least a subset of the different adjacent cells corresponding with the same color of light is sampled without being combined with any analog signal generated by any other of the different adjacent cells corresponding with the same color of light before being utilized to generate at least a portion of at least one second line analog signal that corresponds to the line associated with the different adjacent cells of the image sensor.

2. The apparatus of claim 1, wherein the apparatus is configured such that:

for the first image, no line analog signals, that are communicated at readout via different column lines in communication with different groups of cells, are combined before analog-to-digital conversion thereof; and for a third image, at least two line analog signals, that are communicated at readout via the different column lines in communication with the different groups of cells, are combined before analog-to-digital conversion thereof.

3. The apparatus of claim 1, wherein the apparatus is configured such that, for a third image, a third sampling is performed for which:

one or more analog signals generated by each of the different adjacent cells and each of additional different adjacent cells also corresponding with the same color of light are sampled and combined to generate at least a portion of at least one third line analog signal that is communicated via at least one source-follower-configured transistor over the line associated with the different adjacent cells, where the line is also associated with the additional different adjacent cells;

one or more analog signals generated by each of other different adjacent cells corresponding with the same color of light are sampled and combined to generate at least a portion of at least one fourth line analog signal that is communicated over another line associated with the other different adjacent cells of the image sensor; and the at least portion of the at least one third line analog signal is combined with the at least portion of the at least one fourth line analog signal, before analog-to-digital conversion.

4. The apparatus of claim 1, wherein the apparatus is configured such that, for a third image:

a third sampling is performed for which one or more analog signals generated by each of the different adjacent cells of a first pixel corresponding with the same color of light is combined with analog signals generated by each of other different adjacent cells of a second pixel corresponding with the same color of light, before digital conversion thereof.

5. The apparatus of claim 1, wherein the apparatus is configured such that, for a third image:

a third sampling is performed for which one or more analog signals that is generated by each of the different adjacent cells of a first pixel corresponding with the same color of light and that is communicated via the line associated with the different adjacent pixels, is combined with one or more analog signals that is generated by each of other different adjacent cells of a second pixel corresponding with the same color of light and that is communicated via the line associated with the different adjacent pixels, before digital conversion thereof.

6. The apparatus of claim 1, wherein the apparatus is configured such that, for a third image:

a third sampling is performed for which one or more analog signals that is generated by each of the different adjacent cells corresponding with the same color of light and that is communicated via the line associated with the different adjacent cells, is combined with one or more analog signals that is generated by each of other different adjacent cells corresponding with the same color of light and that is communicated via another line associated with the other different adjacent cells, before digital conversion thereof.

7. The apparatus of claim 1, wherein the apparatus is configured such that, for a third image:

a third sampling is performed for which one or more analog signals generated by each of the different adjacent cells corresponding with the same color of light are sampled and combined before being utilized to generate at least a portion of at least one third line analog signal that corresponds to the line associated with the different adjacent cells of the image sensor, where the at least portion of the at least one third line analog signal that corresponds to the line associated with the different adjacent cells of the image sensor, is combined with at least a portion of at least one fourth line analog signal that corresponds to another line associated with other cells other than the different adjacent cells, before digital conversion thereof.

8. The apparatus of claim 7, wherein the apparatus is configured such that:

the first image is generated when the image sensor is operating in a first mode, and the first image exhibits a first sensitivity and a first resolution, the second image is generated when the image sensor is operating in a second mode, and the second image exhibits a second sensitivity that is less than the first sensitivity and a second resolution that is greater than the first resolution, and the third image is generated when the image sensor is operating in a third mode, and the third image exhibits a third sensitivity that is greater than the first sensitivity and a third resolution that is less than the first resolution.

9. The apparatus of claim 8, wherein the apparatus is configured such that different combinations of one or more of at least four gains that are available including a first gain, a second gain, a third gain, and a fourth gain are applied for the first mode and the third mode.

10. The apparatus of claim 8, wherein the apparatus is configured such that different combinations of one or more of at least four gains including a first gain, a second gain, a third gain, and a fourth gain are applied for the first mode, the second mode, and the third mode.

11. The apparatus of claim 8, wherein the apparatus is configured such that a first gain and a second gain are capable of being applied via one or more pixel-level amplifiers, and a third gain and a fourth gain are capable of being applied via one or more line-level amplifying circuits.

12. The apparatus of claim 11, wherein the apparatus is configured such that, for the third image:

the first gain is applied to generate a first part of the at least portion of the at least one third line analog signal that corresponds to the line associated with the different adjacent cells of the image sensor;

after the first gain is applied, the second gain is applied to generate a second part of the at least portion of the at least one third line analog signal that corresponds to the line associated with the different adjacent cells of the image sensor; and the circuitry receives the first line digital signal and the second line digital signal for the third image, for high dynamic range (HDR) image generation.

13. The apparatus of claim 12, wherein the apparatus is configured such that at least one of:

the one or more pixel-level amplifiers are pixel-level by including an amplifier that is part of a pixel sampling circuit;

the one or more pixel-level amplifiers are pixel-level by operating at a cell-level;

the one or more pixel-level amplifiers are pixel-level by residing before the at least one analog-to-digital channel;

the one or more pixel-level amplifiers are pixel-level by residing in a column read-out circuit;

the one or more pixel-level amplifiers are pixel-level by operating on analog signals before being read out via the line;

the one or more pixel-level amplifiers are pixel-level by operating on a pixel-sourced analog signal;

the one or more pixel-level amplifiers are pixel-level by operating on a pixel-sourced analog signal before a readout;

the one or more line-level amplifying circuits include amplifiers;

the one or more line-level amplifying circuits include circuits that amplify without constituting an amplifier;

the one or more line-level amplifying circuits are line-level by operating on analog signals after being read out via the line;

the first part of the at least portion of the at least one third line analog signal and the second part of the at least portion of the at least one third line analog signal, include different parts of the at least one third line analog signal;

the first part of the at least portion of the at least one third line analog signal and the second part of the at least portion of the at least one third line analog signal, include different parts of the at least one third line analog signal that includes a single signal;

the first part of the at least portion of the at least one third line analog signal and the second part of the at least portion of the at least one third line analog signal, include different signals of the at least one third line analog signal that includes a plurality of third analog signals;

the first part of the at least portion of the at least one third line analog signal and the second part of the at least portion of the at least one third line analog signal, include different third line analog signals;

the at least one third line analog signal includes a plurality of third analog signals; or the at least one third line analog signal includes a single third analog signal.

14. The apparatus of claim 11, wherein the apparatus is configured such that:

in response to receipt of a user input for a shutter control:

a plurality of the third images are generated, by:

the first gain being applied to generate a first part of the at least portion of the at least one third line analog signal that corresponds to the line associated with the different adjacent cells of the image sensor, and after the first gain is applied, the second gain being applied to generate a second part of the at least portion of the at least one third line analog signal that corresponds to the line associated with the different adjacent cells of the image sensor;

at least a portion of a first one of the plurality of third images, a second one of the plurality of third images, and a third one of the plurality of third images, are combined to generate at least a portion of at least one synthetic image;

the first image is generated; and the at least portion of the at least one synthetic image is combined with at least a portion of the first image, to generate a high dynamic range (HDR) image.

15. The apparatus of claim 8, wherein the apparatus is configured such that at least one of:

the image sensor includes a sensor that generates images based on sensed light;

the image sensor converts optical scene information to an electronic representation of a photographic scene;

the image sensor includes only the plurality of cells;

the image sensor includes the plurality of cells, in addition to other componentry;

the image sensor includes the plurality of cells, in addition to other componentry including the line;

the line in communication with the plurality of cells is one of a plurality of lines each in communication with a corresponding plurality of cells;

the line in communication with the plurality of cells is one of a plurality of columns;

the line in communication with the plurality of cells is one of a plurality of rows;

multiple of the cells correspond with a single pixel;

each cell corresponds with a pixel, by analog signals generated thereby being used to generate pixel data used to display the pixel;

the first analog signal, the second analog signal, the one or more line analog signals, the first line digital signal, and the second line digital signal, are classes or types of signals that are generated for each image;

the first analog signal, the second analog signal, the one or more line analog signals, the first line digital signal, and the second line digital signal, are generated for each of the first image, the second image, and the third image;

the first photodiode generating the first analog signal, by being an only photodiode that generates the first analog signal;

the first photodiode generating the first analog signal, by not being an only photodiode that generates the first analog signal;

the first photodiode generating the first analog signal, by the first photodiode providing at least one signal that is utilized in generating the first analog signal;

the first photodiode generating the first analog signal, by the first photodiode providing at least one signal that is combined with at least one other signal for generating the first analog signal;

the second photodiode generating the second analog signal, by being an only photodiode that generates the second analog signal;

the second photodiode generating the second analog signal, by not being an only photodiode that generates the second analog signal;

the second photodiode generating the second analog signal, by the second photodiode providing at least one signal that is utilized in generating the second analog signal;

the second photodiode generating the second analog signal, by the second photodiode providing at least one signal that is combined with at least one other signal for generating the second analog signal;

the first analog signal is generated by the first photodiode without being generated by any other photodiode;

the first analog signal is generated by the first photodiode and at least one other photodiode;

the second analog signal is generated by the second photodiode without being generated by any other photodiode;

the second analog signal is generated by the second photodiode and at least one other photodiode;

at least one of the first gain or the second gain is applied to the first analog signal;

at least one of a first gain or a second gain is not applied to the first analog signal;

at least one of the first gain or the second gain is applied to the second analog signal;

at least one of the first gain or the second gain is not applied to the second analog signal;

in communication with, includes constant communication;

in communication with, includes intermittent communication;

in communication with, includes fixed communication;

in communication with, includes selective communication;

in communication with, includes in direct communication;

in communication, includes in direct communication, with no intermediate circuit components therebetween;

in communication with, includes in indirect communication;

in communication, includes in indirect communication, with at least one intermediate circuit component therebetween;

in communication, includes in indirect communication, with at least one switch therebetween;

each cell of the plurality of cells includes a site of a corresponding photodiode;

each cell of the plurality of cells includes a photosite;

each cell of the plurality of cells corresponds with a single pixel;

the first cell is used to generate a first pixel and the second cell is used to generate a second pixel;

the first cell and the second cell are used to generate a same pixel;

the first cell is part of a first pixel and the second cell is part of a second pixel;

the first cell and the second cell are part of a same pixel;

the first analog signal is generated before the second analog signal;

the first analog signal is generated after the second analog signal;

the first analog signal is generated at the same time as the second analog signal;

the at least one analog-to-digital channel includes a first analog-to-digital channel or a second analog-to-digital channel;

the at least one analog-to-digital channel includes a single analog-to-digital channel;

the apparatus includes a single package with the image sensor, the line, the first analog-to-digital channel, the first analog-to-digital channel, and the circuitry packaged therein;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions include software instructions;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions include image sensor instructions;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions include operating-system-related instructions;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions do not include software instructions;

the apparatus includes a non-transitory computer-readable media storing instructions that, when executed by one or more circuits of the apparatus, cause the apparatus to operate, where the one or more circuits include at least one processor, and the instructions include firmware instructions;

where the one or more circuits include at least one processor, and the instructions include instructions that are stored in persistent memory;

where the one or more circuits include at least one processor, and the instructions include instructions that are stored in non-volatile memory;

where the one or more circuits include at least one processor, and the instructions include instructions that are read-only;

the apparatus includes a non-transitory computer-readable media storing instructions that, when executed by one or more circuits of the apparatus, cause the apparatus to operate, where the one or more circuits include at least one processor, and the instructions include hardwired instructions;

the apparatus does not include a phone;

the apparatus does not include a fully-completed camera;

the apparatus does not include a fully-operating camera;

the apparatus includes only the image sensor, the line, the first and second analog-to-digital channel and the circuitry;

the at least portion of the one or more line analog signals includes a portion of the one or more line analog signals corresponding to a subset of cells in communication with the line;

the at least portion of the one or more line analog signals includes only a portion of the one or more line analog signals corresponding to a subset of cells in communication with the line;

the at least portion of the one or more line analog signals corresponds to only a subset of cells in communication with the line;

the one or more line analog signals are line analog signals by virtue of being communicated via the line;

the one or more line analog signals are line analog signals by virtue of including cell-specific signals communicated via the line;

the one or more line analog signals are line analog signals by virtue of corresponding to the line of cells;

the one or more line analog signals are line analog signals by virtue of corresponding to at least a subset of the line of cells;

the first line digital signal is a line digital signal by virtue of being communicated via the line;

the first line digital signal is a line digital signal by virtue of corresponding to the line of cells;

the first line digital signal corresponds to at least a subset of the line of cells;

the first line digital signal corresponds to only a subset of the line of cells;

the first line digital signal corresponds to only a subset of cells in communication with the line;

the first line digital signal corresponds to a subset of cells in communication with the line;

the first line digital signal corresponds to the plurality cells;

the first line digital signal is one of a plurality of first line digital signals corresponding to cells in communication with the line;

the first analog-to-digital channel is capable of receiving the at least one of the one or more line analog signals for conversion thereof to the first line digital signal, such that the first line digital signal is capable of being based on the first gain, so as to allow the first analog-to-digital channel to not receive the at least one of the one or more line analog signals;

the first analog-to-digital channel is capable of receiving the at least one of the one or more line analog signals for conversion thereof to the first line digital signal, such that the first line digital signal is capable of being based on the first gain, so as to allow the first analog-to-digital channel to receive the at least one of the one or more line analog signals, but without the conversion thereof;

the first analog-to-digital channel is capable of receiving the at least one of the one or more line analog signals for conversion thereof to the first line digital signal, such that the first line digital signal is capable of being based on the first gain, so as to allow the first analog-to-digital channel to receive the at least one of the one or more line analog signals for the conversion to the first line digital signal without being based on the first gain;

the first analog-to-digital channel is capable of receiving the at least one of the one or more line analog signals for conversion thereof to the first line digital signal, such that the first line digital signal is capable of being based on the first gain, so as to allow the first analog-to-digital channel to receive the at least one of the one or more line analog signals for the conversion to the first line digital signal, without the first line digital signal being used for image generation;

at least one of the first analog signal or the second analog signal is utilized to generate the at least portion of the one or more line analog signals, by being included in the at least portion of the one or more line analog signals;

at least one of the first analog signal or the second analog signal is utilized to generate the at least portion of the one or more line analog signals, by being processed and then included in the at least portion of the one or more line analog signals;

at least one of the first analog signal or the second analog signal is utilized to generate the at least portion of the one or more line analog signals, by being assembled with other analog signals in the at least portion of the one or more line analog signals;

the line is part of the image sensor;

the line is not part of the image sensor;

the first analog-to-digital channel, the second analog-to-digital channel, and the circuitry are part of the image sensor;

the first analog-to-digital channel, the second analog-to-digital channel, and the circuitry are not part of the image sensor;

the line communicates the one or more line analog signals, separately;

the line communicates the one or more line analog signals, together;

the image sensor is integrated with at least one of the line, the first analog-to-digital channel, the second analog-to-digital channel, and the circuitry;

the image sensor is not integrated with at least one of the line, the first analog-to-digital channel, the second analog-to-digital channel, and the circuitry;

the image sensor is integrated, on a same semiconductor platform, with at least one of the line, the first analog-to-digital channel, the second analog-to-digital channel, and the circuitry;

the image sensor is not integrated, on a same semiconductor platform, with at least one of the line, the first analog-to-digital channel, the second analog-to-digital channel, and the circuitry;

the image sensor is packaged with at least one of the line, the first analog-to-digital channel, the second analog-to-digital channel, and the circuitry;

the image sensor is not packaged with at least one of the line, the first analog-to-digital channel, the second analog-to-digital channel, and the circuitry;

the line includes a column line;

the line includes a wire that communicates the one or more line analog signals;

the line includes a wire that communicates the one or more line analog signals that represents pixel data for a column of pixels;

the line includes a row line;

the line includes a wire that communicates the one or more line analog signals;

the line includes a wire that communicates the one or more line analog signals that represents pixel data for a column of pixels;

the first analog-to-digital channel includes an amplifier;

the first analog-to-digital channel includes amplifying circuitry;

the first analog-to-digital channel includes an amplifier for applying the first gain;

the first analog-to-digital channel includes an amplifying circuit for applying the first gain;

the first analog-to-digital channel includes an analog-to-digital converter;

the first analog-to-digital channel includes analog-to-digital converting circuitry;

the first analog-to-digital channel includes distinct amplifying circuitry and analog-to-digital converting circuitry;

the first analog-to-digital channel is capable of receiving the at least one of the one or more line analog signals, via a switch that provides communication between the line and the first analog-to-digital channel;

the first analog-to-digital channel is capable of selectively receiving the at least one of the one or more line analog signals, via a switch that provides communication between the line and the first analog-to-digital channel;

the at least one of the one or more line analog signals that is received by the first analog-to-digital channel, is the same as the at least one of the one or more line analog signals that is received by the second analog-to-digital channel;

the at least one of the one or more line analog signals that is received by the first analog-to-digital channel, is the same as the at least one of the one or more line analog signals that is received by the second analog-to-digital channel, but received at different times;

the at least one of the one or more line analog signals that is received by the first analog-to-digital channel, is different from the at least one of the one or more line analog signals that is received by the second analog-to-digital channel;

the at least one of the one or more line analog signals that is received by the first analog-to-digital channel, is different from the at least one of the one or more line analog signals that is received by the second analog-to-digital channel, and received at different times;

the at least one of the one or more line analog signals capable of being received by the first analog-to-digital channel is capable of being the same as the at least one of the one or more line analog signals capable of being received by the second analog-to-digital channel;

the at least one of the one or more line analog signals capable of being received by the first analog-to-digital channel is capable of being different than the at least one of the one or more line analog signals capable of being received by the second analog-to-digital channel;

the at least one of the one or more line analog signals is capable of being received by the first analog-to-digital channel, as well as being capable of not being received by the first analog-to-digital channel;

the at least one of the one or more line analog signals is capable of being received by the second analog-to-digital channel, as well as being capable of not being received by the second analog-to-digital channel;

the first analog-to-digital channel and the second analog-to-digital channel share a single variable amplifier;

the first analog-to-digital channel and the second analog-to-digital channel each include separate analog-to-digital circuits;

the second analog-to-digital channel includes an amplifier;

the second analog-to-digital channel includes amplifying circuitry;

the second analog-to-digital channel includes an amplifier for applying the second gain;

the second analog-to-digital channel includes an amplifying circuit for applying the second gain;

the second analog-to-digital channel includes an analog-to-digital converter;

the second analog-to-digital channel includes analog-to-digital converting circuitry;

the second analog-to-digital channel includes distinct amplifying circuitry and analog-to-digital converting circuitry;

the first analog-to-digital channel and the second analog-to-digital channel are part of a same circuit;

the first analog-to-digital channel and the second analog-to-digital channel are not part of a same circuit;

the apparatus includes a third analog-to-digital channel;

the circuitry is capable of receiving only one of the first line digital signal or the second line digital signal, before the image generation;

the circuitry is capable of receiving both the first line digital signal and the second line digital signal, before the image generation;

the circuitry is capable of receiving both the first line digital signal and the second line digital signal, in sequence, before the image generation;

the circuitry is capable of receiving both the first line digital signal and the second line digital signal, concurrently, before the image generation;

the at least portion of the first image includes a line of the first image;

the different adjacent cells are laterally adjacent;

the different adjacent cells are diagonally adjacent;

the different adjacent cells are longitudinally adjacent;

the first cell has only the first photodiode;

the first cell has the first photodiode, in addition to at least one other photodiode;

the second cell has only the second photodiode;

the second cell has second first photodiode, in addition to at least one other photodiode;

the first cell and the second cell have a same number of photodiodes;

the first cell and the second cell have a different number of photodiodes;

the first photodiode includes a single photodiode;

the first photodiode is one of a plurality of photodiodes of the first cell;

the first photodiode is utilized to charge a capacitor;

the first photodiode is utilized to charge a capacitive element;

the first photodiode includes a capacitor;

the first photodiode includes a capacitive element;

the first photodiode is not utilized to charge a capacitor;

the first photodiode is not utilized to charge a capacitive element;

the first photodiode does not include a capacitor;

the first photodiode does not include a capacitive element;

the first analog signal and the second analog signal are capable of being amplified with the first gain, the second gain, or both the first gain and the second gain before the image generation;

both the first analog signal and the second analog signal are amplified with the first gain, before the image generation;

only one of the first analog signal or the second analog signal is amplified with the first gain, before the image generation;

both the first analog signal and the second analog signal are amplified with only the first gain, before the image generation;

only one of the first analog signal or the second analog signal is amplified with only the first gain, before the image generation;

both the first analog signal and the second analog signal are amplified with the second gain, before the image generation;

only one of the first analog signal or the second analog signal is amplified with the second gain, before the image generation;

both the first analog signal and the second analog signal are amplified with only the second gain, before the image generation;

only one of the first analog signal or the second analog signal is amplified with only the second gain, before the image generation;

both the first analog signal and the second analog signal are amplified with both the first gain and the second gain, before the image generation;

only one of the first analog signal or the second analog signal is amplified with both the first gain and the second gain, before the image generation;

the first analog signal and the second analog signal are amplified with a same at least one gains;

the first analog signal and the second analog signal are amplified with different gains;

the first line digital signal is converted based on the first gain;

the first line digital signal is converted without being based on the first gain;

the at least portion of the first image is generated based on the first gain, and without being based on the second gain, the first gain, and the second gain;

the at least portion of the first image is generated based on the first gain and the second gain, and without being based on the first gain and the second gain;

the at least portion of the first image is generated based on the first gain, the second gain, and the first gain, and without being based on the second gain;

the at least portion of the first image is generated based on the first gain, the second gain, the first gain, and the second gain;

the at least portion of the first image and at least a portion of a second image are generated based on different gains;

at least one of the first analog signal or the second analog signal is capable of being amplified with at least one of the first gain or the second gain, utilizing a plurality of fixed gain circuits that are selected for the at least one of the first analog signal or the second analog signal;

at least one of the first analog signal or the second analog signal is capable of being amplified with at least one of the first gain or the second gain, utilizing a single variable gain circuit that applies different gains based on receipt of different control signals, for the at least one of the first analog signal or the second analog signal;

at least one of the first analog signal or the second analog signal is capable of being amplified with at least one of the first gain or the second gain, utilizing digital gain values;

at least one of the first analog signal or the second analog signal is capable of being amplified with at least one of the first gain or the second gain, utilizing digital gain values received for control purposes;

at least one of the first analog signal or the second analog signal is capable of being amplified with at least one of the first gain or the second gain, utilizing digital gain values mapped from received ISO values;

at least one of the first analog signal or the second analog signal is capable of being amplified with at least one of the first gain or the second gain, by being capable of: amplifying at least one analog signal in a first scenario with only the first gain, amplifying at least one analog signal in a second scenario with only the second gain, amplifying at least one analog signal in a third scenario with both the first gain and the second gain;

at least one of the first analog signal or the second analog signal is capable of being amplified with at least one of the first gain or the second gain, by both of the first analog signal and the second analog signal being capable of being amplified with at least one of the first gain or the second gain;

at least one of the first analog signal or the second analog signal is capable of being amplified with at least one of the first gain or the second gain, by being capable of: amplifying at least one analog signal with both the first gain and the second gain simultaneously;

at least one of the first analog signal or the second analog signal is capable of being amplified with at least one of the first gain or the second gain, by being capable of: amplifying at least one analog signal with both the first gain and the second gain in parallel;

at least one of the first analog signal or the second analog signal is capable of being amplified with at least one of the first gain or the second gain, by being capable of: amplifying at least one analog signal with both the first gain and the second gain separately;

at least one of the first analog signal or the second analog signal is capable of being amplified with at least one of the first gain or the second gain, by being capable of: amplifying at least one analog signal with both the first gain and the second gain in sequence;

at least one of the first analog signal or the second analog signal is capable of being amplified with at least one of the first gain or the second gain, by the at least one of the first analog signal or the second analog signal being initially amplified with the first gain, and the at least one of the first analog signal or the second analog signal being subsequently amplified with the second gain;

the first gain and the second gain are applied utilizing a single first amplifier, and the first gain and the second gain are applied utilizing a single second amplifier;

the first gain and the second gain are applied utilizing one or more first amplifiers, and the first gain and the second gain are applied utilizing one or more second amplifiers;

the first gain and the second gain are applied utilizing one or more first amplifiers, and the first gain and the second gain are applied utilizing the one or more first amplifiers;

the first gain and the second gain are each a pixel-by-pixel gain;

the first gain and the second gain are each a cell-by-cell gain;

the first gain and the second gain are each applied by a per-cell amplifier;

the first gain and the second gain are each a pixel-by-pixel gain that is applied by a per-cell amplifier;

the first gain and the second gain are each a line-by-line gain;

only one of the first gain or the second gain is a pixel-by-pixel gain;

only one of the first gain or the second gain is a line-by-line gain;

the first gain is a pixel-by-pixel gain, and the second gain is a line-by-line gain;

the different adjacent cells are adjacent to each other;

the line of cells of the image sensor, include a row of the cells;

the line of cells of the image sensor, include a double row of the cells;

the line of cells of the image sensor, include a column of the cells;

the line of cells of the image sensor, include a double column of the cells;

the line of cells of the image sensor include a set of cells capable of communicating via the line;

the line of cells of the image sensor, include a plurality of groups of cells that are capable of communicating via the line;

the line of cells of the image sensor, include a line of a plurality of laterally-spaced cell pairs;

the line of cells of the image sensor, include a line of a plurality of laterally-spaced cell groups;

the line of cells of the image sensor, include a plurality of groups of cells that are capable of communicating via the line, and at least one of the groups includes the plurality of cells;

the line of cells of the image sensor, include a plurality of groups of cells that are capable of communicating via the line, with each group of cells being associated with the same color;

the line of cells of the image sensor, include a plurality of groups of cells that are capable of communicating via the line, with each group of cells being associated with the same color and including a 2×2 cell configuration;

the line of cells of the image sensor, include a plurality of groups of cells that are capable of communicating via the line, with each group of cells being associated with the same color and including a 2×2 cell configuration associated with one or more pixels;

the line of cells of the image sensor, include a plurality of groups of cells that are capable of communicating via the line, with each group of cells being associated with the same color and including a 2×4 cell configuration associated with a single pixel;

the line of cells of the image sensor, include a plurality of groups of cells that are capable of communicating via the line, with each group of cells being associated with the same color and including a 2×2 cell configuration associated with a single pixel;

the line of cells of the image sensor, include a plurality of groups of cells that are capable of communicating via the line, with each group of cells being associated with the same color and including a 2×4 cell configuration associated with one or more pixels;

the line of cells of the image sensor, include a plurality of groups of cells that are capable of communicating via the line, with each group of cells being associated with the same color and including a 1×2 cell configuration;

the line of cells of the image sensor includes the first cell and the second cell;

the line of cells of the image sensor includes the first cell and the second cell, in addition to other cells;

the line of cells of the image sensor includes a row of cells;

the line of cells of the image sensor includes a column of cells;

the line of cells of the image sensor includes cells configured in a same row or column;

the line of cells of the image sensor includes cells configured in a same row or column;

the line of cells of the image sensor includes cells physically positioned in a same row or column;

the line of cells of the image sensor includes cells physically positioned in a same row or column;

the line of cells of the image sensor includes cells physically positioned along a same row or column;

the line of cells of the image sensor includes cells physically positioned along a same row or column;

the line of cells of the image sensor includes a single line of cells physically positioned along a same row or column;

the line of cells of the image sensor includes a line of side-by-side cells physically positioned along a same row or column;

the line of cells of the image sensor includes a line of 4×4 groupings of cells physically positioned along a same row or column;

the line of cells of the image sensor does not include the line in communication with the plurality of cells;

the line in communication with the plurality of cells, includes a physical line;

the line in communication with the plurality of cells, is physical;

the line in communication with the plurality of cells, includes a wire;

the line in communication with the plurality of cells, includes a circuit;

the cells of the line of cells of the image sensor, include the plurality of cells of the line in communication with the plurality of cells;

the cells of the line of cells of the image sensor, does not include the plurality of cells of the line in communication with the plurality of cells;

the plurality of cells of the line in communication with the plurality of cells, include the cells of the line of cells of the image sensor;

the plurality of cells of the line in communication with the plurality of cells, does not include the cells of the line of cells of the image sensor;

the at least portion of one or more line analog signals received by the first analog-to-digital channel is the same as the at least portion of one or more line analog signals received by the second analog-to-digital channel;

the at least portion of one or more line analog signals received by the first analog-to-digital channel is different from the at least portion of one or more line analog signals received by the second analog-to-digital channel;

the at least portion of one or more line analog signals is received by the first analog-to-digital channel and the at least portion of one or more line analog signals is received by the second analog-to-digital channel;

the at least portion of one or more line analog signals is received by the first analog-to-digital channel and the at least portion of one or more line analog signals is not received by the second analog-to-digital channel;

the at least portion of one or more line analog signals is not received by the first analog-to-digital channel and the at least portion of one or more line analog signals is received by the second analog-to-digital channel;

the at least portion of one or more line analog signals is received by the first analog-to-digital channel and the at least portion of one or more line analog signals is received by the second analog-to-digital channel, for a same single exposure;

the at least portion of one or more line analog signals is received by the first analog-to-digital channel and the at least portion of one or more line analog signals is not received by the second analog-to-digital channel, for a same single exposure;

the at least portion of one or more line analog signals is not received by the first analog-to-digital channel and the at least portion of one or more line analog signals is received by the second analog-to-digital channel, for a same single exposure;

the first line digital signal and the second line digital signal, are associated with the line of cells;

the first line digital signal and the second line digital signal, are associated with the same line of cells;

the at least portion of one or more line analog signals, include only part of the one or more line analog signals that correspond to only the plurality of cells;

the plurality of cells include only a subset of the line of cells;

the at least portion of one or more line analog signals correspond to the line of cells of the image sensor, by including a first line analog signal portion generated by at least one of the first analog signal or the second analog signal;

the at least portion of one or more line analog signals correspond to the line of cells of the image sensor, by including a first line analog signal portion generated by at least one of the first analog signal or the second analog signal;

the at least portion of one or more line analog signals correspond to the line of cells of the image sensor, by including a line analog signal portion generated utilizing both the first analog signal and the second analog signal;

the at least portion of one or more line analog signals correspond to the line of cells of the image sensor, by including a line analog signal portion generated utilizing both the first analog signal and the second analog signal, uncombined;

the at least portion of one or more line analog signals correspond to the line of cells of the image sensor, by including a line analog signal portion generated utilizing both the first analog signal and the second analog signal, combined;

the at least portion of one or more line analog signals correspond to the line of cells of the image sensor, by including a first line analog signal portion generated utilizing only the first analog signal, and a second line analog signal portion generated utilizing only the second analog signal;

at least one of the first analog signal or the second analog signal is capable of being amplified with at least one of the first gain or the second gain before being utilized to generate the at least portion of one or more line analog signals that correspond to the line of cells of the image sensor, by the at least one of the first analog signal or the second analog signal being capable of being amplified with at least one of the first gain or the second gain before the at least one of the first analog signal or the second analog signal being communicated via the line to at least one of the first analog-to-digital channel or the second analog-to-digital channel;

the at least portion of one or more line analog signals that correspond to the line of cells of the image sensor are generated by being aggregated for all cells of the line of cells;

the at least portion of one or more line analog signals that correspond to the line of cells of the image sensor are generated by being read out on the line that is in communication with the first analog-to-digital channel and the second analog-to-digital channel;

the at least portion of one or more line analog signals that correspond to the line of cells of the image sensor are generated by being assembled on the line, before being communicated to at least one of the first analog-to-digital channel or the second analog-to-digital channel;

for the image generation, at least one of the first line digital signal or the second line digital signal is combined with other line digital signals that are generated utilizing other line analog signals that, in turn, are generated utilizing other photodiode-generated analog signals;

the image generation includes a combination of the first line digital signal and the second line digital signal;

the image generation includes a combination of at least a portion of the first line digital signal and at least a portion of the second line digital signal;

the image generation includes a last processing step before at least one image is ready for display;

the second mode includes an isolation mode;

the first mode includes a current sharing mode;

the first mode includes a first current sharing mode, and the third mode includes a first current sharing mode;

the at least subset of the different adjacent cells includes all of the different adjacent cells;

the at least subset of the different adjacent cells includes less than all of the different adjacent cells;

the at least one first line signal is associated with a first exposure, and the at least one second line signal is associated with a second exposure;

the at least one first line signal is associated with the first sampling, and the at least one second line signal is associated with the second sampling;

the other of the different adjacent cells includes another subset of the different adjacent cells other than the at least subset thereof;

the at least subset of the different adjacent cells includes a first one of the different adjacent cells, and the other of the different adjacent cells includes a second one of the different adjacent cells, where the different adjacent cells include two cells;

the one or more analog signals generated by each of the different adjacent cells corresponding with the same color of light is sampled, by being received from corresponding photodiodes;

the one or more analog signals generated by each of the different adjacent cells corresponding with the same color of light is sampled, by being received directly from corresponding photodiodes;

the one or more analog signals generated by each of the different adjacent cells corresponding with the same color of light is sampled, by being received indirectly from corresponding photodiodes;

the one or more analog signals generated by each of the different adjacent cells corresponding with the same color of light is sampled via one or more switches associated with the different adjacent cells;

the one or more analog signals generated by each of the different adjacent cells corresponding with the same color of light is sampled via switches each associated with each of the different adjacent cells;

the plurality of cells correspond with the same color of light, by each being capable of detecting the same color of light;

the plurality of cells correspond with the same color of light, by each being capable of detecting the same color of light without a requirement of detecting the same color of light;

the plurality of cells correspond with the same color of light, by each being capable of detecting the same color of light without a requirement of detecting the same color of light;

the first and second cells correspond with the same color of light, always;

the first and second correspond with the same color of light, at least sometimes;

the first and second correspond with the same color of light, in one mode of operation of the image sensor;

the first and second correspond with the same color of light, in one mode of operation of the image sensor, but not another mode;

the plurality of cells correspond with the same color of light, by each including a filter for the same color of light positioned thereon;

the plurality of cells correspond with the same color of light, by each including a configurable filter configured for the same color of light in certain modes while being configured for different colors of light in certain other modes;

the plurality of cells correspond with the same color of light, by each including a lens for the same color of light positioned thereon;

the plurality of cells correspond with the same color of light, by each including a corresponding photodiode that is configured for the detecting the same color of light;

the plurality of cells correspond with the same color of light, in addition to having an ability to detect white light;

the at least portion of the at least one first line analog signal corresponds to the line associated with the different adjacent cells of the image sensor, by the at least portion of the at least one first line analog signal being communicated via the line associated with the different adjacent cells of the image sensor;

the at least portion of the at least one first line analog signal corresponds to the line associated with the different adjacent cells of the image sensor, by the at least portion of the at least one first line analog signal being configured to be communicated via the line associated with the different adjacent cells of the image sensor;

the line associated with the different adjacent cells of the image sensor, is associated with the different adjacent cells, by the line associated with the different adjacent cells communicating line analog signals that are generated from cell analog signals generated by the different adjacent cells;

the line is associated with only the plurality of cells;

the line is associated with the plurality of cells, in addition to other adjacent cells;

the line is associated with the plurality of cells, in addition to other adjacent cells associated with one or more different rows;

the line is associated with the plurality of cells, in addition to other adjacent cells associated with one or more different lines;

the line associated with the different adjacent cells includes the line in communication with the plurality of cells;

the line associated with the different adjacent cells does not include the line in communication with the plurality of cells;

the line associated with the different adjacent cells includes the line of cells of the image sensor;

the line associated with the different adjacent cells does not include the line of cells of the image sensor;

the line associated with the different adjacent cells, includes a physical line;

the line associated with the different adjacent cells, is physical;

the line associated with the different adjacent cells, includes a wire;

the line associated with the different adjacent cells, includes a circuit;

the line associated with the different adjacent cells, includes that which communicates the at least portion of the at least one first line analog signal and the at least portion of the at least one second line analog signal;

the different adjacent cells are a subset of the plurality of cells;

the different adjacent cells are separate from the plurality of cells;

the different adjacent cells include a 1×2 cell configuration;

the different adjacent cells include a 2×1 cell configuration;

the different adjacent cells include a 2×2 cell configuration;

the different adjacent cells include a 4×4 cell configuration;

the different adjacent cells include a 8×8 cell configuration;

the different adjacent cells include a first row of two cells and a second row of two cells;

the different adjacent cells include a first row of two cells and a second row of two cells that are all in communication with the line;

the plurality of cells corresponds with the same color of light, only when operating in the first mode and the third mode;

the plurality of cells corresponds with the same color of light, only when operating in the first mode and the third mode, but still exist for use in the second mode;

the plurality of cells does not correspond with the same color of light, when operating in the second mode, as a result of a processing of an output of the plurality of cells;

the plurality of cells corresponds with the same color of light, only when operating in the first mode and the third mode, but still exist for the use during the second sampling;

the plurality of cells corresponds with the same color of light, when operating both in the first mode and in the third mode;

the image sensor is operates in the first mode for the first image, and the image sensor operates in the second mode for the second image;

the image sensor is operates in the first mode in a first scenario, and the image sensor operates in the second mode in a second scenario;

the image sensor switches between operation in the first mode and in the second mode, automatically;

the image sensor switches between operation in the first mode and in the second mode, in response to user input;

in the event that the image sensor is operating in the first mode, the first analog signal and the second analog signal are not combined before being utilized to generate the at least portion of the one or more line analog signals, by the first analog signal, by itself, being amplified with at least one of the first gain or the second gain before being communicated, via the line, as at least part of the at least portion of the one or more line analog signals;

in the event that the image sensor is operating in the second mode, the first analog signal is combined with the second analog signal before being utilized to generate the at least portion of the one or more line analog signals, by the first analog signal being combined with the second analog signal before being amplified with at least one of the first gain or the second gain before being communicated, via the line, as at least part of the at least portion of the one or more line analog signals;

in the event that the image sensor is operating in the second mode, the first analog signal is combined with the second analog signal before being utilized to generate the at least portion of the one or more line analog signals, by the first analog signal being combined with the second analog signal before being utilized to generate the at least portion of the one or more line analog signals, by a voltage associated with the first analog signal being added to another voltage associated with the second analog signal;

the first sensitivity and the second sensitivity include light sensitivity;

the at least portion of the first image exhibits the second sensitivity that is greater than the first sensitivity, by combining separate voltages that are generated by separate photodiodes receiving separate light;

the at least portion of the first image exhibits the second resolution, by combining separate voltages that are generated by separate photodiodes receiving separate light;

a first high dynamic range (HDR) image is generated that includes an image that is generated utilizing at least two different gains, for different exposures;

a first high dynamic range (HDR) image is generated that includes an image that is generated utilizing at least two different gains, for a same single exposure;

the at least one first line analog signal, the at least one second line analog signal, and the at least one third line analog signal, are all communicated via the line in communication with the plurality of cells;

the at least one first line analog signal, the at least one second line analog signal, and the at least one third line analog signal, are all communicated via the line associated with the different adjacent cells;

the at least one first line analog signal, the at least one second line analog signal, and the at least one third line analog signal, differ with respect to which of the first image, the second image, or the third image they are intended to be used to generate;

the at least one first line analog signal, the at least one second line analog signal, and the at least one third line analog signal, differ only with respect to which of the first image, the second image, or the third image they are intended to be used to generate;

the at least one first line analog signal, the at least one second line analog signal, and the at least one third line analog signal, differ in terms of resolution;

the at least one first line analog signal, the at least one second line analog signal, and the at least one third line analog signal, differ in terms of sensitivity;

the at least portion of the at least one third line analog signal that corresponds to the line associated with the different adjacent cells of the image sensor, is combined with at least the portion of the at least one fourth line analog signal that corresponds with the another line associated with the other cells, by being averaged;

the different adjacent cells include all cells of a pixel;

the different adjacent cells include a subset of cells of a pixel;

the different adjacent cells are of a same pixel;

the different adjacent cells are of different pixels;

the at least portion of the at least one third line analog signal that corresponds to the line associated with the different adjacent cells of the image sensor, is combined with at least the portion of the at least one fourth line analog signal that corresponds with the another line associated with the other cells, after being output via different sampling circuits;

the at least portion of the at least one third line analog signal that corresponds to the line associated with the different adjacent cells of the image sensor, is combined with at least the portion of the at least one fourth line analog signal that corresponds with the another line associated with the other cells, after not being output via different sampling circuits;

the at least portion of the at least one third line analog signal that corresponds to the line associated with the different adjacent cells of the image sensor, is combined with at least the portion of the at least one fourth line analog signal that corresponds with the another line associated with the other cells, before analog-to-digital conversion thereof;

the different adjacent cells are part of a same pixel;

the different adjacent cells are part of different pixels;

at least one of the first resolution, the second resolution, or the third resolution, includes a one-half vertical resolution;

at least one of the first resolution, the second resolution, or the third resolution, includes a one-half horizontal resolution;

at least one of the first resolution, the second resolution, or the third resolution, includes a full resolution may be blended;

the different adjacent cells include green cells of a same pixel;

the different adjacent cells include green cells of adjacent pixels;

the at least portion of the at least one third line analog signal that corresponds to the line associated with the different adjacent cells of the image sensor, is combined with at least a portion of the at least one fourth line analog signal that corresponds to another line associated with other cells of the image sensor corresponding with the same color of light, by being combined before being communicated over respective lines; or the at least portion of the at least one third line analog signal that corresponds to the line associated with the different adjacent cells of the image sensor, is combined with at least a portion of the at least one fourth line analog signal that corresponds to another line associated with other cells of the image sensor corresponding with the same color of light, by being combined after being communicated over respective lines.

16. The apparatus of claim 7, wherein the apparatus is configured such that the at least portion of the at least one third line analog signal is communicated over the line in parallel with the at least portion of the at least one fourth line analog signal being communicated over the another line.

17. The apparatus of claim 7, wherein the apparatus is configured such that the other cells include other adjacent cells that are adjacent to each other and correspond with the same color of light.

18. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus is configured such that the first cell and the second cell of the image sensor correspond with a same color of light, and the apparatus is subject to:

for a first image, a first sampling for which the first analog signal and the second analog signal generated by the first and second cells corresponding with the same color of light are sampled and combined before any gain is applied thereto; and for a second image, a second sampling for which at least one of the first analog signal or the second analog signal is sampled without being combined such that the combining of the first analog signal and the second analog signal does not occur before any gain is applied thereto.

19. The apparatus of claim 18, wherein the apparatus is configured such that:

the first and second cells correspond with a first row and the line includes a first column line;

the plurality of cells further include a third cell having a third photodiode generating a third analog signal, and a fourth cell having a fourth photodiode generating a fourth analog signal, where the third cell and the fourth cell of the image sensor correspond with the same color of light, and the third and fourth cells are part of a second row and are in communication with the first column line;

the plurality of cells further include a fifth cell having a fifth photodiode generating a fifth analog signal, and a sixth cell having a sixth photodiode generating a sixth analog signal, where the fifth cell and the sixth cell of the image sensor correspond with the same color of light, and the fifth and sixth cells are part of the first row and are in communication with a second column line;

the plurality of cells further include a seventh cell having a seventh photodiode generating a seventh analog signal, and an eighth cell having an eighth photodiode generating a eighth analog signal, where the seventh cell and the eighth cell of the image sensor correspond with the same color of light, and the seventh and eighth cells are part of the second row and are in communication with the second column line;

for a third image, a third sampling is performed for which:

the first analog signal and the second analog signal generated by the first and second cells are combined to form a first row/first column combined signal, and the third analog signal and the fourth analog signal generated by the third and fourth cells are combined to form a second row/first column combined signal, such that:

during a first time period:

a first gain is applied to the first row/first column combined signal to generate and communicate to the first column line a first-gain amplified first row/first column signal, and the first gain is applied to the second row/first column combined signal to generate and communicate to the first column line a first-gain amplified second row/first column signal that is combined with the first-gain amplified first row/first column signal, to generate a first-gain amplified combined first column signal;

during a second time period, after the first time period:

a second gain is applied to the first row/first column combined signal to generate and communicate to the first column line a second-gain amplified first row/first column signal, and the second gain is applied to the second row/first column combined signal to generate and communicate to the first column line a second-gain amplified second row/first column signal that is combined with the second-gain amplified first row/first column signal, to generate a second-gain amplified combined first column signal;

the fifth analog signal and the sixth analog signal generated by the fifth and sixth cells are combined to form a first row/second column combined signal, and the seventh analog signal and the eighth analog signal generated by the seventh and eighth cells are combined to form a second row/second column combined signal, such that:

during the first time period:

the first gain is applied to the first row/second column combined signal to generate and communicate to the second column line a first-gain amplified first row/second column signal, and the first gain is applied to the second row/second column combined signal to generate and communicate to the second column line a first-gain amplified second row/second column signal that is combined with the first-gain amplified first row/second column signal, to generate a first-gain amplified combined second column signal that is combined with the first-gain amplified combined first column signal, before analog-to-digital conversion;

during the second time period:

the second gain is applied to the first row/second column combined signal to generate and communicate to the second column line a second-gain amplified first row/second column signal, and the second gain is applied to the second row/second column combined signal to generate and communicate to the second column line a second-gain amplified second row/second column signal that is combined with the second-gain amplified first row/second column signal, to generate a second-gain amplified combined second column signal that is combined with the second-gain amplified combined first column signal, before analog-to-digital conversion.

20. The apparatus of claim 18, wherein the apparatus is configured such that:

for a third image, a third sampling is performed for which the first analog signal and the second analog signal generated by the first and second cells corresponding with the same color of light are sampled and combined before any gain is applied thereto, the third sampling resulting in a combination of analog signals sourced from a number of cells that is larger than that for the first sampling and that involve cells from a plurality of rows and columns;

in response to detecting user input to capture a photographic scene, a plurality of the third images are generated and the first image is generated;

the third images are each generated by applying a first gain and a second gain in serial before a column read out of a first result thereof to at least one of a first analog-to-digital channel or a second analog-to-digital channel of the at least one analog-to-digital channel, where only a subset of the third images are selected based on a content thereof;

the first image is generated by applying the first gain before a column read out of a second result thereof to at least one of the first analog-to-digital channel or the second analog-to-digital channel without applying the second gain, and further by applying a third gain and a fourth gain in parallel after the column read out of the second result to at least one of the first analog-to-digital channel or the second analog-to-digital channel; and at least a portion of the subset of the third images are combined to generate at least one synthetic image, and at least a portion of the at least one synthetic image is combined with at least a portion of the first image, to generate another synthetic image.

21. The apparatus of claim 18, wherein the apparatus is configured such that:

for a third image, a third sampling is performed for which the first analog signal and the second analog signal generated by the first and second cells corresponding with the same color of light are sampled and combined before any gain is applied thereto, the third sampling resulting in a combination of analog signals sourced from a number of cells that is larger than that for the first sampling and that involve cells from a plurality of rows and columns;

in response to detecting user input to capture a photographic scene, a plurality of the third images are generated and the second image is generated;

the third images are each generated by applying a first gain and a second gain in serial before a column read out of a first result thereof to at least one of a first analog-to-digital channel or a second analog-to-digital channel of the at least one analog-to-digital channel, where only a subset of the third images are selected based on a content thereof;

the second image is generated by applying the first gain before a column read out of a second result thereof to at least one of the first analog-to-digital channel or the second analog-to-digital channel without applying the second gain, and further by applying a third gain and a fourth gain in parallel after the column read out of the second result to at least one of the first analog-to-digital channel or the second analog-to-digital channel; and at least a portion of the subset of the third images are combined to generate at least one synthetic image, and at least a portion of the at least one synthetic image is combined with at least a portion of the second image, to generate another synthetic image.

22. The apparatus of claim 18, wherein the apparatus is configured such that:

the first and second cells correspond with a first row and the line includes a first column line;

the plurality of cells further include a third cell having a third photodiode generating a third analog signal, and a fourth cell having a fourth photodiode generating a fourth analog signal, where the third cell and the fourth cell of the image sensor correspond with the same color of light, and the third and fourth cells are part of a second row and are in communication with the first column line;

the plurality of cells further include a fifth cell having a fifth photodiode generating a fifth analog signal, and a sixth cell having a sixth photodiode generating a sixth analog signal, where the fifth cell and the sixth cell of the image sensor correspond with the same color of light, and the fifth and sixth cells are part of the first row and are in communication with a second column line;

the plurality of cells further include a seventh cell having a seventh photodiode generating a seventh analog signal, and an eighth cell having an eighth photodiode generating a eighth analog signal, where the seventh cell and the eighth cell of the image sensor correspond with the same color of light, and the seventh and eighth cells are part of the second row and are in communication with the second column line;

for a third image, a third sampling is performed for which:

the first analog signal and the second analog signal generated by the first and second cells are combined to form a first row/first column combined signal, and the third analog signal and the fourth analog signal generated by the third and fourth cells are combined to form a second row/first column combined signal, such that:

during a first time period:

a first gain is applied to the first row/first column combined signal to generate and communicate to the first column line a first-gain amplified first row/first column signal, and the first gain is applied to the second row/first column combined signal to generate and communicate to the first column line a first-gain amplified second row/first column signal that is combined on the first column line with the first-gain amplified first row/first column signal, to generate a first-gain amplified combined first column signal;

during a second time period, after the first time period:

a second gain is applied to the first row/first column combined signal to generate and communicate to the first column line a second-gain amplified first row/first column signal, and the second gain is applied to the second row/first column combined signal to generate and communicate to the first column line a second-gain amplified second row/first column signal that is combined on the first column line with the second-gain amplified first row/first column signal, to generate a second-gain amplified combined first column signal;

the fifth analog signal and the sixth analog signal generated by the fifth and sixth cells are combined to form a first row/second column combined signal, and the seventh analog signal and the eighth analog signal generated by the seventh and eighth cells are combined to form a second row/second column combined signal, such that:

during the first time period:

the first gain is applied to the first row/second column combined signal to generate and communicate to the second column line a first-gain amplified first row/second column signal, and the first gain is applied to the second row/second column combined signal to generate and communicate to the second column line a first-gain amplified second row/second column signal that is combined on the second column line with the first-gain amplified first row/second column signal, to generate a first-gain amplified combined second column signal that is combined with the first-gain amplified combined first column signal, before analog-to-digital conversion;

during the second time period:

the second gain is applied to the first row/second column combined signal to generate and communicate to the second column line a second-gain amplified first row/second column signal, and the second gain is applied to the second row/second column combined signal to generate and communicate to the second column line a second-gain amplified second row/second column signal that is combined on the second column line with the second-gain amplified first row/second column signal, to generate a second-gain amplified combined second column signal that is combined with the second-gain amplified combined first column signal, before analog-to-digital conversion.

23. The apparatus of claim 18, wherein the apparatus is configured such that at least two different images are generated based on different exposures including a first exposure utilizing a first gain that is based on a first brightness of only a subset of a first one of the at least two different images and a second exposure utilizing a second gain that is based on a second brightness of only a subset of a second one of the at least two different images, where a resulting high dynamic range (HDR) image is generated based on the at least two different images.

24. The apparatus of claim 23, wherein the apparatus is configured such that the subset of the first one of the at least two different images and the subset of the second one of the at least two different images, include different regions included in the at least two different images.

25. The apparatus of claim 23, wherein the apparatus is configured such that the subset of the first one of the at least two different images and the subset of the second one of the at least two different images, include different objects included in the at least two different images.

26. The apparatus of claim 23, wherein the apparatus is configured such that the first one of the at least two different images includes the first image.

27. The apparatus of claim 23, wherein the apparatus is configured such that the at least two different images are simultaneously generated.

28. The apparatus of claim 23, wherein the apparatus is configured such that no inter-frame time exists between the two different images.

29. An apparatus, comprising:
an image sensor including a plurality of cells including: a first cell having a first photodiode generating a first analog signal, and a second cell having a second photodiode generating a second analog signal, for being utilized to generate at least a portion of one or more line analog signals;
a line in communication with the plurality of cells, the line communicating the one or more line analog signals;
at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and
circuitry in communication with the at least one analog-to-digital channel, the circuitry receiving at least one of the first line digital signal or the second line digital signal, for image generation;
wherein the apparatus is configured such that at least three different cells are sampled with at least three different exposure times to generate at least three analog signals for being combined to generate at least a portion of a first image.

30. An apparatus, comprising:
an image sensor including a plurality of cells including: a first cell having a first photodiode generating a first analog signal, and a second cell having a second photodiode generating a second analog signal, for being utilized to generate at least a portion of one or more line analog signals;
a line in communication with the plurality of cells, the line communicating the one or more line analog signals;
at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and
circuitry in communication with the at least one analog-to-digital channel, the circuitry receiving at least one of the first line digital signal or the second line digital signal, for image generation;
wherein the apparatus is configured such that, in response to receiving a user input to capture a photographic scene:
at least a portion of a first image is generated for the photographic scene utilizing a first brightness level at a first time,
at least a portion of a second image is generated for the photographic scene utilizing a second brightness level at a second time, and
the at least portion of the first image is combined with the at least portion of the second image to generate at least a portion of at least one high dynamic range (HDR) image.

31. The apparatus of claim 30, wherein the apparatus is configured such that, for both the first image and the second image, analog signals generated by different cells corresponding with a same color of light are combined into a combined analog signal that is utilized to generate at least a portion of at least one line analog signal communicated over the line that is in communication with the different cells of the image sensor, where the at least portion of the at least one line analog signal is combined with at least a portion of at least one other line analog signal that is communicated over another line that is in communication with other different cells of the image sensor, before digital conversion thereof.

32. The apparatus of claim 30, wherein the apparatus is configured such that, for at least one of the first image or the second image, analog signals generated by different cells of a first line corresponding with a same color of light are combined with analog signals generated by other different cells of a second line corresponding with the same color of light, before digital conversion thereof.

33. The apparatus of claim 30, wherein the apparatus is configured such that, for at least one of the first image or the second image, analog signals generated by different cells of a first pixel corresponding with a same color of light are combined with analog signals generated by other different cells of a second pixel corresponding with the same color of light, before digital conversion thereof.

34. The apparatus of claim 30, wherein the apparatus is configured such that, for at least one of the first image or the second image, analog signals generated by different cells corresponding with a same color of light are combined to generate a combined analog signal that is utilized to generate at least a portion of at least one line analog signal communicated over the line that is in communication with the different cells of the image sensor, where the at least portion of the at least one line analog signal is combined with at least a portion of at least one other line analog signal that is communicated over another line that is in communication with other different cells of the image sensor, before digital conversion of a resulting analog signal that is based on the combination of the at least portion of the at least one line analog signal and the at least portion of the at least one other line analog signal.

35. The apparatus of claim 34, wherein the apparatus is configured such that at least one of:
the combined analog signal and the at least portion of the at least one line analog signal are the same;

the combined analog signal is amplified before generating the at least portion of the at least one line analog signal are the same;

the combined analog signal is amplified to generate the at least portion of the at least one line analog signal;

the at least portion of the at least one line analog signal is generated by communicating the combined analog signal over the line;

the resulting analog signal is based on the combination of the at least portion of the at least one line analog signal and the at least portion of the at least one other line analog signal, by including the combination of the at least portion of the at least one line analog signal and the at least portion of the at least one other line analog signal;

the resulting analog signal is based on the combination of the at least portion of the at least one line analog signal and the at least portion of the at least one other line analog signal, by processing the combination of the at least portion of the at least one line analog signal and the at least portion of the at least one other line analog signal;

the digital conversion of the resulting analog signal occurs after the combination of the at least portion of the at least one line analog signal and the at least portion of the at least one other line analog signal; or the digital conversion of the resulting analog signal occurs after the combination and subsequent processing of the at least portion of the at least one line analog signal and the at least portion of the at least one other line analog signal.

36. The apparatus of claim 34, wherein the apparatus is configured such that the at least portion of the at least one line analog signal is communicated over the line in parallel with the at least portion of the at least one other line analog signal being communicated over the another line.

37. An apparatus, comprising:

an image sensor including a plurality of cells including: a first cell having a first photodiode, and a second cell having a second photodiode, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus is configured such that the plurality of cells are each sampled with at least three different exposure times to generate at least three analog signals for being utilized to generate at least a portion of at least three different images including at least a portion of a first image, at least a portion of a second image, and at least a portion of a third image, based on which at least a portion of at least one high dynamic range (HDR) image is generated.

38. The apparatus of claim 37, wherein the apparatus is configured such that the at least three different images are each generated utilizing a different ISO.

39. The apparatus of claim 37, wherein the apparatus is configured such that the at least three different exposure times includes a first exposure time, a second exposure time, and a third exposure time, that do not overlap.

40. The apparatus of claim 37, wherein the apparatus is configured such that the at least three different exposure times includes a first exposure time, a second exposure time, and a third exposure time; and the first exposure time starts first in order, the second exposure time starts second in order, and the third exposure time starts third in order.

41. The apparatus of claim 40, wherein the apparatus is configured such that the first exposure time is greater than the second exposure time, and the second exposure time is greater than the third exposure time.

42. The apparatus of claim 41, wherein the apparatus is configured such that at least portions of readouts of the at least three analog signals, at least partially occur concurrently.

43. The apparatus of claim 37, wherein the apparatus is configured such that a first gain is applied for the generation of the at least portion of the first image, and a second gain is applied for the generation of the at least portion of the second image.

44. The apparatus of claim 37, wherein the apparatus is configured such that a first gain is applied to at least a part of a first one of the at least three analog signals before the same being read out via at least one source-follower-configured transistor for the at least portion of the first image, and a second gain is applied to at least a second one of the at least three analog signals before the same being read out via the at least one source-follower-configured transistor for the at least portion of the second image.

45. The apparatus of claim 37, wherein the apparatus is configured such that a first gain is applied to at least a part of one or more line analog signals after the same being read out via at least one source-follower-configured transistor for the at least portion of the first image, and a second gain is applied to at least a part of another one or more line analog signals after the same being read out via the at least one source-follower-configured transistor for the at least portion of the second image.

46. The apparatus of claim 37, wherein the apparatus is configured such that a first gain is applied to at least a part of a first one of the at least three analog signals before the same being read out via at least one source-follower-configured transistor for the at least portion of the first image, and a second gain is applied to at least a part of one or more line analog signals after the same being read out via the at least one source-follower-configured transistor for the at least portion of the second image.

47. The apparatus of claim 37, wherein the apparatus is configured such that the at least portion of the at least one HDR image is generated by: combining the at least portion of the first image and the at least portion of the second image to create at least a portion of a resulting image, and combining the at least portion of the resulting image and the at least portion of the third image.

48. The apparatus of claim 47, wherein the circuitry is separate from an application processor, and the apparatus is configured such that the at least portion of the first image and the at least portion of the second image are combined via the circuitry before the at least portion of the resulting image is sent to the application processor.

49. The apparatus of claim 48, wherein the apparatus is configured such that the application processor combines the at least portion of the resulting image and the at least portion of the third image.

50. The apparatus of claim 48, wherein the circuitry and the application processor are embodied in separate integrated circuits that are packaged in a single package.

51. The apparatus of claim 48, wherein the image sensor and the application processor are embodied in separate integrated circuits that are packaged in a single package.

52. The apparatus of claim 37, wherein the circuitry is part of an application processor that generates the at least portion of the at least one HDR image based on the at least portion of the first image, the at least portion of the second image, and the at least portion of the third image.

53. The apparatus of claim 52, wherein the image sensor and the application processor are embodied in separate integrated circuits that are packaged in a single package.

54. The apparatus of claim 37, wherein the apparatus is configured such that the plurality of cells includes different adjacent cells that correspond with a same color of light, and:

in the event that the image sensor is operating in a first mode, a first analog signal generated by the first photodiode and a second analog signal generated by the second photodiode are not combined for a single exposure before being utilized to generate the at least portion of the one or more line analog signals, and in the event that the image sensor is operating in a second mode, the first analog signal is combined with the second analog signal for the single exposure before being utilized to generate the at least portion of the one or more line analog signals.

55. The apparatus of claim 37, wherein the apparatus is configured such that the plurality of cells includes different adjacent cells corresponding with a same color of light, and are subject to:

for the first image, the second image, and the third image: a first sampling for which one or more analog signals generated by each of the different adjacent cells corresponding with the same color of light are combined before a corresponding one of the at least three analog signals is generated, and for a fourth image, a second sampling for which one or more analog signals generated by at least a subset of the different adjacent cells corresponding with the same color of light are sampled without being combined with any analog signal generated by any other of the different adjacent cells corresponding with the same color of light.

56. The apparatus of claim 37, wherein the apparatus is configured such that the plurality of cells includes different adjacent cells that correspond with a same color of light, and are subject to: for the first image, the second image, and the third image: one or more analog signals generated by each of the different adjacent cells corresponding with the same color of light being combined before a corresponding one of the at least three analog signals is generated.

57. The apparatus of claim 56, wherein the apparatus is configured such that the one or more analog signals generated by each of the different adjacent cells corresponding with the same color of light are combined to form a combined signal that is amplified with both a first gain and a second gain to generate a first gain-amplified analog signal and a second gain-amplified analog signal for at least one of the first image, the second image, or the third image.

58. The apparatus of claim 37, wherein the apparatus is configured such that the at least three different exposure times do not overlap and include:

for the at least portion of the first image, a first exposure time that starts first in order and that has a first duration that occurs after a first reset signal corresponding to the at least portion of the first image;

for the at least portion of the second image, a second exposure time that starts second in order and that has a second duration less than the first duration, where the second duration occurs after a second reset signal corresponding to the at least portion of the second image, and for the at least portion of the third image, a third exposure time that starts third in order and that has a third duration less than the second duration, where the third duration occurs after a third reset signal corresponding to the at least portion of the third image.

59. The apparatus of claim 58, wherein the apparatus is configured such that the plurality of cells includes different adjacent cells that correspond with a same color of light, and are subject to: for the first image, the second image, and the third image: a sampling for which one or more analog signals generated by each of the different adjacent cells corresponding with the same color of light are combined before a corresponding one of the at least three analog signals is generated.

60. The apparatus of claim 59, wherein the apparatus is configured such that the one or more analog signals generated by each of the different adjacent cells corresponding with the same color of light are combined to form a combined signal that is amplified with both a first gain and a second gain to generate a first gain-amplified analog signal and a second gain-amplified analog signal for at least one of the first image, the second image, or the third image.

61. The apparatus of claim 59, wherein the apparatus is configured such that, for each of the first image, the second image, and the third image: the one or more analog signals generated by each of the different adjacent cells corresponding with the same color of light are combined to form at least three combined analog signals that are amplified with different combinations of one or more of at least four gains.

62. The apparatus of claim 61, wherein the apparatus is configured such that at least one of:

the at least three analog signals including a first one of the at least three analog signals for being utilized to generate the at least portion of the first image, a second one of the at least three analog signals for being utilized to generate the at least portion of the second image, and a third one of the at least three analog signals for being utilized to generate the at least portion of the third image;

the at least three analog signals including a first one of the at least three analog signals for being utilized to generate the at least portion of the first image by having one or more gains applied thereto before being digitized, a second one of the at least three analog signals for being utilized to generate the at least portion of the second image by having one or more gains applied thereto before being digitized, and a third one of the at least three analog signals for being utilized to generate the at least portion of the third image by having one or more gains applied thereto before being digitized;

the at least portion of the first image includes at least a pixel thereof, the at least portion of the first image includes at least a pixel thereof, and the at least portion of the first image includes at least a pixel thereof;

the at least portion of the first image includes at least multiple pixels thereof, the at least portion of the first image includes at least multiple pixels thereof, and the at least portion of the first image includes at least multiple pixels thereof;

the at least portion of the first image includes at least a portion of a line thereof, the at least portion of the first image includes at least a portion of a line thereof, and the at least portion of the first image includes at least a portion of a line thereof;

the at least portion of the first image includes at least a line thereof, the at least portion of the first image includes at least a line thereof, and the at least portion of the first image includes at least a line thereof;

the at least three analog signals including a first one of the at least three analog signals that is generated based on sampling the plurality of cells for a first exposure time, a second one of the at least three analog signals that is generated based on sampling the plurality of cells for a second exposure time, and a third one of the at least three analog signals that is generated based on sampling the plurality of cells for a third exposure time;

the at least three analog signals including a first one of the at least three analog signals that is generated based on sampling each of the plurality of cells for a first exposure time, a second one of the at least three analog signals that is generated based on sampling each of the plurality of cells for a second exposure time, and a third one of the at least three analog signals that is generated based on sampling each of the plurality of cells for a third exposure time;

the at least three different exposure times are overlapping;

the at least three different exposure times are not overlapping;

the at least three different exposure times are overlapping in duration;

the at least three different exposure times are not overlapping in duration;

at least one HDR image is generated based on the at least portion of the first image, the at least portion of the first image, and the at least portion of the third image; or at least one HDR image is generated based on a combination of the at least portion of the first image, the at least portion of the first image, and the at least portion of the third image.

63. The apparatus of claim 37, wherein the apparatus is configured such that:

the at least portion of the first image is generated utilizing a first analog signal of the at least three analog signals that is generated by sampling with a first exposure time of the at least three different exposure times;

the at least portion of the second image is generated utilizing a second analog signal of the at least three analog signals that is generated by sampling with a second exposure time of the at least three different exposure times;

the at least portion of the third image is generated utilizing a third analog signal of the at least three analog signals that is generated by sampling with a third exposure time of the at least three different exposure times;

at least a portion of a synthetic image is generated based on the at least portion of the second image and the at least portion of the third image; and the at least portion of the at least one high dynamic range (HDR) image is generated based on the at least portion of the first image and the at least portion of the synthetic image.

64. The apparatus of claim 63, wherein the apparatus is configured such that:

the at least portion of the synthetic image is generated by combining the at least portion of the second image and the at least portion of the third image; and the at least portion of the at least one high dynamic range (HDR) image is generated by combining the at least portion of the first image and the at least portion of the synthetic image.

65. The apparatus of claim 64, wherein the apparatus is configured such that:

the at least portion of the synthetic image is generated by combining the at least portion of the third image, and at least portions of a plurality of the second images generated utilizing a plurality of the second analog signals that are different and that are generated by sampling with the second exposure time; and the at least portion of the at least one high dynamic range (HDR) image is generated by combining the at least portion of the first image and the at least portion of the synthetic image, where the first image is the only image for which portions thereof are combined with portions of the synthetic image.

66. The apparatus of claim 64, wherein the apparatus is configured such that:

the first image is one of a plurality of the first images that are captured.

67. The apparatus of claim 64, wherein the apparatus is configured such that:

the first image is one of a plurality of the first images that are captured;

the at least portion of the synthetic image is generated by combining the at least portion of the third image, and at least portions of a plurality of the second images generated utilizing a plurality of the second analog signals that are different and that are generated by sampling with the second exposure time; and the plurality of the first images are captured and processed in an alternatively interleaved order with respect to the plurality of the second images.

68. The apparatus of claim 64, wherein the apparatus is configured such that:

a first weight is utilized for the at least portion of the first image and a second weight, that is different than the first weight, is utilized for the at least portion of the synthetic image.

69. The apparatus of claim 64, wherein the apparatus is configured such that:

a first weight is utilized by being applied for a first pixel attribute for the at least portion of the first image that includes a single pixel of the first image; and a second weight, that is different than the first weight, is utilized by being applied for a second pixel attribute for the at least portion of the synthetic image that includes a single pixel of the synthetic image.

70. The apparatus of claim 69, wherein the apparatus is configured such that:

at least one of the first pixel attribute or the second pixel attribute includes at least one of a tone attribute, a color attribute, or a luminance attribute; and at least one other of the first pixel attribute or the second pixel attribute includes another attribute different than the tone attribute, the color attribute, and the luminance attribute.

71. The apparatus of claim 69, wherein the apparatus is configured such that:

at least one of the first pixel attribute or the second pixel attribute includes at least one of a color attribute, or a luminance attribute; and at least one other of the first pixel attribute or the second pixel attribute includes another attribute.

72. The apparatus of claim 69, wherein the apparatus is configured such that:

at least one of the first pixel attribute or the second pixel attribute includes at least one of a color attribute, or a luminance attribute; and at least one other of the first pixel attribute or the second pixel attribute includes a detail attribute.

73. The apparatus of claim 64, wherein the apparatus is configured such that:

first weights are utilized by being applied for first pixel attributes for the at least portion of the synthetic image and second weights, that are different than the first weights, are utilized by being applied for second pixel attributes for the at least portion of the first image, to generate the at least portion of the at least one high dynamic range (HDR) image.

74. The apparatus of claim 73, wherein the apparatus is configured such that:

a first one of the first weights is applied for a first one of the first pixel attributes that includes a color attribute, and a second one of the first weights is applied for a second one of the first pixel attributes that includes an luminance attribute.

75. The apparatus of claim 64, wherein the apparatus is configured such that:

different gains are applied to the second analog signal and the third analog signal.

76. The apparatus of claim 64, wherein the apparatus is configured such that:

a first gain is applied to the first analog signal;

a second gain, that is different than the first gain, is applied to the second analog signal; and a third gain, that is different than the first gain and the second gain, is applied to the third analog signal.

77. The apparatus of claim 76, wherein the apparatus is configured such that the first gain is greater than the second gain and the third gain, and the second gain is greater than the third gain.

78. The apparatus of claim 76, wherein the apparatus is configured such that the first gain, the second gain, and the third gain are applied to different analog signals before a column read out of the different analog signals.

79. The apparatus of claim 76, wherein the apparatus is configured such that the first gain, the second gain, and the third gain are applied to different analog signals after a column read out of the different analog signals.

80. The apparatus of claim 64, wherein the apparatus is configured such that the at least portion of the third image is generated in response to detection of user shutter control input, and the at least three different exposure times do not overlap.

81. The apparatus of claim 64, wherein the apparatus is configured such that only the third image is generated in response to detection of user shutter control input.

82. The apparatus of claim 64, wherein the apparatus is configured such that the at least portion of the third image is generated in response to detection of user shutter control input, and the at least portion of the first image and the at least portion of the second image, are not generated in response to the detection of user shutter control input.

83. The apparatus of claim 64, wherein the apparatus is configured such that the third exposure time is greater than the first exposure time and the second exposure time, and the second exposure time is greater than the first exposure time.

84. The apparatus of claim 64, wherein the apparatus is configured such that the third exposure time is at least four (4) times greater than the first exposure time.

85. The apparatus of claim 64, wherein the apparatus is configured such that the at least one high dynamic range (HDR) image is generated utilizing a Laplacian technique.

86. The apparatus of claim 64, wherein the apparatus is configured such that different adjacent cells of the image sensor correspond with a same color of light, and are subject to, for the first image, the second image, and the third image: a corresponding sampling for which one or more analog signals generated by each of the different adjacent cells corresponding with the same color of light are sampled and combined before being utilized for line analog signal generation.

87. The apparatus of claim 64, wherein the apparatus is configured such that different adjacent cells of the image sensor correspond with a same color of light, and are subject to, for at least one of: the first image, the second image, or the third image: a corresponding sampling for which one or more analog signals generated by each of the different adjacent cells corresponding with the same color of light are sampled and combined before being utilized for line analog signal generation.

88. The apparatus of claim 64, wherein the apparatus is configured such that, for the first image, the second image, and the third image: corresponding analog signals generated by different cells of a first line corresponding with a same color of light are combined with corresponding analog signals generated by other different cells of a second line corresponding with the same color of light, before digital conversion thereof.

89. The apparatus of claim 64, wherein the apparatus is configured such that, for at least one of: the first image, the second image, or the third image: corresponding analog signals generated by different cells of a first line corresponding with a same color of light are combined with corresponding analog signals generated by other different cells of a second line corresponding with the same color of light, before digital conversion thereof.

90. The apparatus of claim 37, wherein the apparatus is configured such that:

the at least portion of the first image is generated utilizing a first analog signal of the at least three analog signals that is generated by sampling with a first exposure time of the at least three different exposure times;

the at least portion of the second image is generated utilizing a second analog signal of the at least three analog signals that is generated by sampling with a second exposure time of the at least three different exposure times;

the at least portion of the third image is generated utilizing a third analog signal of the at least three analog signals that is generated by sampling with a third exposure time of the at least three different exposure times;

at least a portion of a synthetic image is generated based on the at least portion of the second image and the at least portion of the third image, by combining the at least portion of the second image and the at least portion of the third image;

the at least portion of the at least one high dynamic range (HDR) image is generated based on the at least portion of the first image and the at least portion of the synthetic image, by combining the at least portion of the first image and the at least portion of the synthetic image, such that:

a first weight is utilized by being applied for a first pixel attribute for the at least portion of the first image that includes a pixel of the first image, and a second weight, that is different than the first weight, is utilized by being applied for a second pixel attribute for the at least portion of the synthetic image that includes a pixel of the synthetic image, where:

at least one of the first pixel attribute or the second pixel attribute includes at least one of a color attribute or a luminance attribute; and at least one of the first pixel attribute or the second pixel attribute includes another attribute different than the color attribute and the luminance attribute.

91. The apparatus of claim 90, wherein the apparatus is configured such that the another attribute includes a detail attribute.

92. The apparatus of claim 90, wherein the apparatus is configured such that:

the at least portion of the synthetic image is generated by combining the at least portion of the third image, and at least portions of a plurality of the second images generated utilizing a plurality of the second analog signals that are different and that are generated by sampling with the second exposure time; and the at least portion of the at least one high dynamic range (HDR) image is generated by combining the at least portion of the first image and the at least portion of the synthetic image, such that the first image is the only image for which portions thereof are combined with portions of the synthetic image.

93. The apparatus of claim 90, wherein the apparatus is configured such that:

the first image is one of a plurality of the first images that are captured;

the at least portion of the synthetic image is generated by combining the at least portion of the third image, and at least portions of a plurality of the second images generated utilizing a plurality of the second analog signals that are different and that are generated by sampling with the second exposure time; and the plurality of the first images are captured and processed in an alternatively interleaved order with respect to the plurality of the second images.

94. The apparatus of claim 90, wherein the apparatus is configured such that the at least portion of the third image is generated in response to detection of user shutter control input, the first image and the second image are generated before the third image is generated, and the at least three different exposure times do not overlap.

95. The apparatus of claim 90, wherein the apparatus is configured such that only the at least portion of the third image is generated in response to detection of user shutter control input.

96. The apparatus of claim 90, wherein the apparatus is configured such that the at least portion of the third image is generated in response to detection of user shutter control input, and the at least portion of the first image and the at least portion of the second image, are not generated in response to the detection of user shutter control input.

97. The apparatus of claim 90, wherein the apparatus is configured such that:

a first gain is applied to the first analog signal;

a second gain, that is different than the first gain, is applied to the second analog signal; and a third gain, that is different than the first gain and the second gain, is applied to the third analog signal.

98. The apparatus of claim 97, wherein the apparatus is configured such that the first gain is greater than the second gain and the third gain, and the second gain is greater than the third gain.

99. The apparatus of claim 98, wherein the apparatus is configured such that the first gain, the second gain, and the third gain are applied to different analog signals before a line read out of the different analog signals.

100. The apparatus of claim 98, wherein the apparatus is configured such that the first gain, the second gain, and the third gain are applied to different analog signals after a line read out of the different analog signals.

101. The apparatus of claim 98, wherein the apparatus is configured such that the third exposure time is greater than the first exposure time and the second exposure time, and the second exposure time is greater than the first exposure time.

102. The apparatus of claim 98, wherein the apparatus is configured such that the third exposure time is at least four (4) times greater than the first exposure time.

103. The apparatus of claim 98, wherein the apparatus is configured such that the at least one high dynamic range (HDR) image is generated utilizing a Laplacian technique.

104. The apparatus of claim 90, wherein the apparatus is configured such that:

the at least portion of the synthetic image is generated by combining the at least portion of the third image, and at least portions of a plurality of the second images generated utilizing a plurality of the second analog signals that are different and that are generated by sampling with the second exposure time;

the first image is selected from a plurality of the first images based on an analysis thereof;

a first gain is applied to the first analog signal;

a second gain, that is different than the first gain, is applied to the second analog signal;

a third gain, that is different than the first gain and the second gain, is applied to the third analog signal;

the at least portion of the third image is generated in response to detection of user shutter control input; and the first image and the second image are generated before the third image is generated.

105. The apparatus of claim 104, wherein the apparatus is configured such that the first gain is greater than the second gain and the third gain, and the second gain is greater than the third gain.

106. The apparatus of claim 105, wherein the apparatus is configured such that the first gain, the second gain, and the third gain are applied to different analog signals before a line read out of the different analog signals.

107. The apparatus of claim 105, wherein the apparatus is configured such that the first gain, the second gain, and the third gain are applied to different analog signals after a line read out of the different analog signals.

108. The apparatus of claim 105, wherein the apparatus is configured such that the third exposure time is greater than the first exposure time and the second exposure time, and the second exposure time is greater than the first exposure time.

109. The apparatus of claim 104, wherein the apparatus is configured such that different adjacent cells of the image sensor correspond with a same color of light, and are subject to, for the first image, the second image, and the third image: a corresponding sampling for which one or more analog signals generated by each of the different adjacent cells corresponding with the same color of light are sampled and combined before being utilized to generate at least a portion of at least one first line analog signal.

110. The apparatus of claim 104, wherein the apparatus is configured such that different adjacent cells of the image sensor correspond with a same color of light, and are subject to, for at least one of: the first image, the second image, or the third image: a corresponding sampling for which one or more analog signals generated by each of the different adjacent cells corresponding with the same color of light are sampled and combined before being utilized to generate at least a portion of at least one first line analog signal.

111. The apparatus of claim 104, wherein the apparatus is configured such that, for the first image, the second image, and the third image: corresponding analog signals generated by different cells of a first line corresponding with a same color of light are combined with corresponding analog signals generated by other different cells of a second line corresponding with the same color of light, before digital conversion thereof.

112. The apparatus of claim 104, wherein the apparatus is configured such that, for at least one of: the first image, the second image, or the third image: corresponding analog signals generated by different cells of a first line corresponding with a same color of light are combined with corresponding analog signals generated by other different cells of a second line corresponding with the same color of light, before digital conversion thereof.

113. The apparatus of claim 104, wherein the apparatus is configured such that:

the at least three different exposure times do not overlap;
the at least portion of the first image includes a single pixel of the first image;
the at least portion of the synthetic image includes a single pixel of the synthetic image; and
the at least one high dynamic range (HDR) image is generated based on a pixel-by-pixel analysis.

114. The apparatus of claim 113, wherein the apparatus is configured such that the third exposure time is at least four (4) times greater than the first exposure time, and the at least portion of the at least one high dynamic range (HDR) image is generated by combining the at least portion of the first image and the at least portion of the synthetic image, such that the first image is the only image for which portions thereof are combined with portions of the synthetic image.

115. The apparatus of claim 114, wherein the apparatus is configured such that at least one of:

the plurality of cells each include a single photodiode;
the plurality of cells each include a multiple photodiodes;
the first cell having the first photodiode, and the second cell having the second photodiode, are of different rows;
the first cell having the first photodiode, and the second cell having the second photodiode, are of different columns;
the one or more line analog signals are generated utilizing the first photodiode and the second photodiode;
the one or more line analog signals are generated utilizing only one of the first photodiode or the second photodiode;
the one or more line analog signals are generated utilizing only the first photodiode;
the one or more line analog signals are generated utilizing only the second photodiode;
the one or more line analog signals includes a single line analog signal;
the one or more line analog signals includes a plurality of line analog signals;
the one or more line analog signals includes a first line analog signal generated utilizing only the first photodiode, and a second line analog signal generated utilizing only the second photodiode;
the one or more line analog signals includes a first line analog signal generated utilizing both the first photodiode and the second photodiode, and a second line analog signal generated utilizing both the first photodiode and the second photodiode;
the first analog signal, the second analog signal, and the third analog signal, include line analog signals;
the first analog signal, the second analog signal, and the third analog signal, do not include line analog signals;
the first analog signal, the second analog signal, and the third analog signal, include pixel analog signals;
the first analog signal, the second analog signal, and the third analog signal, do not include pixel analog signals;
the line includes a column line;
the line includes a row line;
the line is one of a plurality of lines that are in communication with the image sensor;
the line is one of a plurality of lines that are in communication with the plurality of cells;
the line is one of a plurality of lines that are in communication with the image sensor and that are each equipped with one or more analog-to-digital channels;
the line is one of a plurality of lines that are in communication with the plurality of cells;
the line being in communication with the plurality of cells by being in communication with the first photodiode and the second photodiode;
the line being in communication with the plurality of cells by being in communication with the first photodiode and the second photodiode thereof;
the at least one analog-to-digital channel outputs the first line digital signal and the second line digital signal for a same photodiode;
the at least one analog-to-digital channel outputs the first line digital signal and the second line digital signal for different photodiodes;
the at least one analog-to-digital channel includes a first analog-to-digital channel that outputs the first line digital signal and a second analog-to-digital channel that outputs the second line digital signal;
the at least one analog-to-digital channel includes a single analog-to-digital channel that outputs the first line digital signal and the second line digital signal;
the at least one analog-to-digital channel includes a same single analog-to-digital channel that outputs the first line digital signal and the second line digital signal;
the circuitry receives only the first line digital signal;
the circuitry receives only the second line digital signal;
the circuitry receives only one of the first line digital signal or the second line digital signal;
the circuitry receives the first line digital signal and the second line digital signal;
the apparatus is configured such that the plurality of cells are each sampled, by the first photodiode and the second photodiode being sampled;
the image generation includes the generation of the at least portion of the at least one high dynamic range (HDR) image;
the image generation does not include the generation of the at least portion of the at least one high dynamic range (HDR) image;
the at least one high dynamic range (HDR) image is directly generated by combining the at least portion of the first image and the at least portion of the synthetic image;

the at least one high dynamic range (HDR) image is indirectly generated by combining the at least portion of the first image and the at least portion of the synthetic image, by being generated by further processing a combination of the at least portion of the first image and the at least portion of the synthetic image;

the at least one high dynamic range (HDR) image is generated based on a global shutter;

the at least one high dynamic range (HDR) image is not generated based on a global shutter;

the at least portion of the first image is generated utilizing the first analog signal, by utilizing a processed version of the first analog signal;

the at least portion of the first image is generated utilizing the first analog signal, by processing the first analog signal, and then utilizing a processed version of the first analog signal;

the at least portion of the second image is generated utilizing the second analog signal, by utilizing a processed version of the second analog signal;

the at least portion of the second image is generated utilizing the second analog signal, by processing the second analog signal, and then utilizing a processed version of the second analog signal;

the at least portion of the third image is generated utilizing the third analog signal, by utilizing a processed version of the third analog signal;

the at least portion of the third image is generated utilizing the third analog signal, by processing the third analog signal, and then utilizing a processed version of the third analog signal;

the first analog signal of the at least three analog signals is generated by sampling at least one of the plurality of cells to generate a plurality of first analog signal components that are combined to generate the first analog signal;

the first analog signal of the at least three analog signals is generated by sampling at least one of the plurality of cells to generate a plurality of first analog signal components that are combined via an interconnect to generate the first analog signal;

the first analog signal of the at least three analog signals is generated by sampling at least one of the plurality of cells to generate a plurality of first analog signal components that are not combined and are communicated as separate serial components of the first analog signal;

the second analog signal of the at least three analog signals is generated by sampling at least one of the plurality of cells to generate a plurality of second analog signal components that are combined to generate the second analog signal;

the second analog signal of the at least three analog signals is generated by sampling at least one of the plurality of cells to generate a plurality of second analog signal components that are combined via an interconnect to generate the second analog signal;

the second analog signal of the at least three analog signals is generated by sampling at least one of the plurality of cells to generate a plurality of second analog signal components that are not combined and are communicated as separate serial components of the second analog signal;

the third analog signal of the at least three analog signals is generated by sampling at least one of the plurality of cells to generate a plurality of third analog signal components that are combined to generate the third analog signal;

the third analog signal of the at least three analog signals is generated by sampling at least one of the plurality of cells to generate a plurality of third analog signal components that are combined via an interconnect to generate the third analog signal;

the third analog signal of the at least three analog signals is generated by sampling at least one of the plurality of cells to generate a plurality of third analog signal components that are not combined and are communicated as separate serial components of the third analog signal;

the at least three different exposure times include at least three different exposure durations;

the at least three different exposure times include at least three different sample times;

the at least three different exposure times include at least three different sample durations;

the at least three different exposure times are at least three different sample times;

the at least three different exposure times are at least three different sample durations;

the plurality of cells are sampled with the first exposure time by sampling at least one of the plurality of cells simultaneously during a signal duration equal to the first exposure time;

the plurality of cells are sampled with the first exposure time by sampling at least one of the plurality of cells serially during serial signal durations each equal to the first exposure time;

the plurality of cells are sampled with the second exposure time by sampling at least one of the plurality of cells simultaneously during a signal duration equal to the second exposure time;

the plurality of cells are sampled with the second exposure time by sampling at least one of the plurality of cells serially during serial signal durations each equal to the second exposure time;

the plurality of cells are sampled with the third exposure time by sampling at least one of the plurality of cells simultaneously during a signal duration equal to the third exposure time;

the plurality of cells are sampled with the third exposure time by sampling at least one of the plurality of cells serially during serial signal durations each equal to the third exposure time;

the synthetic image is generated for display within dynamic range constraints of a display unit;

the synthetic image is generated utilizing an image blend operation;

the synthetic image is generated utilizing a pixel blend operation;

the synthetic image is generated utilizing images in a same position;

the synthetic image is generated utilizing images that are aligned;

the synthetic image is generated utilizing images each with details in a same position;

the synthetic image is generated utilizing images each with details that are aligned;

the synthetic image is generated from an image stack;

the synthetic image includes overall image detail;

the synthetic image includes overall image detail, in addition to first image detail from a high brightness region and second image detail from a low brightness region;

the synthetic image includes pixel stream;

the at least portion of the synthetic image is generated directly based on the at least portion of the second image and the at least portion of the third image, by directly utilizing the combining of the at least portion of the second image and the at least portion of the third image;

the at least portion of the at least one high dynamic range (HDR) image is directly generated based on the at least portion of the first image and the at least portion of the synthetic image, by directly utilizing the combining of the at least portion of the first image and the at least portion of the synthetic image;

the at least portion of the synthetic image is generated indirectly based on the at least portion of the second image and the at least portion of the third image, by indirectly utilizing the combining of the at least portion of the second image and the at least portion of the third image;

the at least portion of the at least one high dynamic range (HDR) image is indirectly generated based on the at least portion of the first image and the at least portion of the synthetic image, by indirectly utilizing the combining of the at least portion of the first image and the at least portion of the synthetic image;

the at least portion of the synthetic image is generated indirectly based on the at least portion of the second image and the at least portion of the third image, by indirectly utilizing a processed version of a result of the combining of the at least portion of the second image and the at least portion of the third image;

the at least portion of the at least one high dynamic range (HDR) image is indirectly generated based on the at least portion of the first image and the at least portion of the synthetic image, by indirectly utilizing a processed version of a result of the combining of the at least portion of the first image and the at least portion of the synthetic image;

the first weight is applied for the first pixel attribute, by being applied to a particular pixel in connection with the first pixel attribute;

the second weight is applied for the second pixel attribute, by being applied to a particular pixel in connection with the second pixel attribute;

the first weight is applied for the first pixel attribute, by being applied to a particular pixel to emphasize the first pixel attribute of the pixel of the first image;

the second weight is applied for the second pixel attribute, by being applied to a particular pixel to emphasize the second pixel attribute of the pixel of the second image;

the first weight is applied for the first pixel attribute, by being applied to the first pixel attribute;

the second weight is applied for the second pixel attribute, by being applied to the second pixel attribute;

the image generation includes digital image generation;

the at least portion of the first image, includes at least a digital image portion;

the at least portion of the first image, includes at least an analog image portion;

the first image and the second image are evaluation images;

the first image and the second image are displayed;

the first image and the second image are not displayed;

the first analog signal is generated by sampling with the first exposure time, by receiving a current from at least one photodiode of the image sensor, for the first exposure time;

the first analog signal is generated by sampling with the first exposure time, by receiving a current from at least one photodiode of the image sensor, for the first exposure time, and subsequently amplifying the first analog signal;

the at least portion of the second image, includes at least a digital image portion;

the at least portion of the second image, includes at least an analog image portion;

the second image and the second image are displayed;

the second image and the second image are not displayed;

the second analog signal is generated by sampling with the second exposure time, by receiving a current from at least one photodiode of the image sensor, for the second exposure time;

the second analog signal is generated by sampling with the second exposure time, by receiving a current from at least one photodiode of the image sensor, for the second exposure time, and subsequently amplifying the second analog signal;

the at least portion of the third image, includes at least a digital image portion;

the at least portion of the third image, includes at least an analog image portion;

the third image and the third image are displayed;

the third image and the third image are not displayed;

the third analog signal is generated by sampling with the third exposure time, by receiving a current from at least one photodiode of the image sensor, for the third exposure time;

the third analog signal is generated by sampling with the third exposure time, by receiving a current from at least one photodiode of the image sensor, for the third exposure time, and subsequently amplifying the third analog signal;

the weights control how one or more portions of one or more images are merged with one or more other portions of one or more other images;

the weights control how one or more portions of one or more images are merged with one or more other portions of one or more other images, in connection with at least one pixel attribute;

only the first pixel attribute includes the color attribute;

only the first pixel attribute includes the luminance attribute;

only the first pixel attribute includes the another attribute;

only the second pixel attribute includes the color attribute;

only the second pixel attribute includes the luminance attribute;

only the second pixel attribute includes the another attribute;

the first pixel attribute includes only the color attribute;

the first pixel attribute includes only the luminance attribute;

the first pixel attribute includes only the another attribute;

the second pixel attribute includes only the color attribute;

the second pixel attribute includes only the luminance attribute;

the second pixel attribute includes only the another attribute;

the first pixel attribute is only for the at least portion of the first image;

the first pixel attribute is not only for the at least portion of the first image;

the second pixel attribute is only for the at least portion of the synthetic image; or the second pixel attribute is not only for the at least portion of the synthetic image.

116. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus is configured such that a first gain and a second gain are capable of being applied before the image generation, and the first analog signal is amplified with a third gain and a fourth gain, and the second analog signal is amplified with the third gain and the fourth gain, so that amplified first analog signals and amplified second analog signals are generated for a same single exposure, and the amplified first analog signals and the amplified second analog signals are utilized to generate the at least portion of the one or more line analog signals for the same single exposure.

117. The apparatus of claim 116, wherein the apparatus is configured such that the third gain and the fourth gain are capable of being applied to one or more analog signals before one or more source-follower-configured transistors is utilized for communication thereof via the line as at least a portion of at least one line analog signal, and the first gain and the second gain are capable of being applied to the at least portion of the at least one line analog signal after the one or more source-follower-configured transistors is utilized for communication thereof via the line.

118. The apparatus of claim 116, wherein the apparatus is configured such that:

in a first mode of the image sensor: the first analog signal, before being amplified with the third gain and the fourth gain, is generated by combining a first set of at least two analog signals generated by the first photodiode and at least one other photodiode which both correspond with a same color, and the second analog signal, before being amplified with the third gain and the fourth gain, is generated by combining a second set of at least two analog signals generated by the second photodiode and at least one still other photodiode which both correspond with the same color, so that:

the amplified first analog signals include: a first one of the amplified first analog signals that is generated by amplification with the third gain and without the fourth gain, and a second one of the amplified first analog signals that is generated after the generation of the first one of the amplified first analog signals and that is generated by amplification with the fourth gain and without the third gain, and the amplified second analog signals include: a first one of the amplified second analog signals that is generated by amplification with the third gain and without the fourth gain, and a second one of the amplified second analog signals that is generated after the generation of the first one of the amplified second analog signals and that is generated by amplification with the fourth gain and without the third gain.

119. The apparatus of claim 116, wherein the apparatus is configured such that:

in a first mode of the image sensor: the first analog signal, before being amplified with the third gain and the fourth gain, is generated by combining a first set of at least two analog signals generated by the first photodiode and at least one other photodiode which both correspond with a same color, and the second analog signal, before being amplified with the third gain and the fourth gain, is generated by combining a second set of at least two analog signals generated by the second photodiode and at least one still other photodiode which both correspond with the same color, so that:

the amplified first analog signals include: a first one of the amplified first analog signals that is generated by amplification with the third gain and without the fourth gain, and a second one of the amplified first analog signals that is generated after the generation of the first one of the amplified first analog signals and that is generated by amplification with the fourth gain and without the third gain, and the amplified second analog signals include: a first one of the amplified second analog signals that is generated by amplification with the third gain and without the fourth gain, and a second one of the amplified second analog signals that is generated after the generation of the first one of the amplified second analog signals and that is generated by amplification with the fourth gain and without the third gain, where:

at least a first part of the at least portion of the one or more line analog signals is generated utilizing the first one of the amplified first analog signals, at least a second part of the at least portion of the one or more line analog signals is generated utilizing the second one of the amplified first analog signals, at least a third part of the at least portion of the one or more line analog signals is generated utilizing the first one of the amplified second analog signals, and at least a fourth part of the at least portion of the one or more line analog signals is generated utilizing the second one of the amplified second analog signals; and in a second mode of the image sensor, at least one of the first gain or the second gain is applied without at least one of the third gain or the fourth gain being applied.

120. The apparatus of claim 119, wherein the apparatus is configured such that at least one of:

the first analog signal is amplified with the third gain and the fourth gain to generate the amplified first analog signals which are each amplified with only one of the third gain or the fourth gain;

the first analog signal is amplified with the third gain and the fourth gain to generate the amplified first analog signals which are each amplified with both the third gain and the fourth gain;

the second analog signal is amplified with the third gain and the fourth gain to generate the amplified first analog signals which are each amplified with only one of the third gain or the fourth gain;

the second analog signal is amplified with the third gain and the fourth gain to generate the amplified first analog signals which are each amplified with both the third gain and the fourth gain;

the amplified first analog signals and the amplified second analog signals are utilized to generate the at least portion of the one or more line analog signals for the same single exposure, by the at least portion of the one or more line analog signals for the same single exposure including the amplified first analog signals and the amplified second analog signals;

the amplified first analog signals and the amplified second analog signals are utilized to generate the at least portion of the one or more line analog signals for the same single exposure, by the at least portion of the one or more line analog signals for the same single exposure being generated via processing of the amplified first analog signals and the amplified second analog signals;

the at least one analog-to-digital channel includes a first analog-to-digital channel or a second analog-to-digital channel;

the at least one analog-to-digital channel includes a single analog-to-digital channel;

the at least portion of the one or more line analog signals for the same single exposure, includes different parts of the one or more line analog signals that are each generated utilizing different ones of the amplified first analog signals and the amplified second analog signals;

the at least portion of the one or more line analog signals for the same single exposure, include different portions of a same line analog signal;

the at least portion of the one or more line analog signals for the same single exposure, include at least portions of different line analog signals;

the first set of the at least two analog signals generated by the first photodiode and the at least one other photodiode, includes a first one of the first set of the at least two analog signals generated by the first photodiode, and a second one of the first set of the at least two analog signals generated by the at least one other photodiode;

the first set of the at least two analog signals generated by the first photodiode and the at least one other photodiode, includes a first one of the first set of the at least two analog signals generated by only the first photodiode, and a second one of the first set of the at least two analog signals generated by only the at least one other photodiode;

the second set of the at least two analog signals generated by the second photodiode and the at least one still other photodiode, includes a first one of the second set of the at least two analog signals generated by the second photodiode, and a second one of the second set of the at least two analog signals generated by the at least one still other photodiode;

the second set of the at least two analog signals generated by the second photodiode and the at least one still other photodiode, includes a first one of the second set of the at least two analog signals generated by only the second photodiode, and a second one of the second set of the at least two analog signals generated by only the at least one still other photodiode;

at least one of the first analog signal or the second analog signal includes a combined signal;

the first analog signal and the second analog signal are each separately amplified with the third gain and the fourth gain;

the first analog signal and the second analog signal are combined before being together amplified with the third gain and the fourth gain;

the first mode and the second mode are binning modes;

the first mode and the second mode are ISO modes;

the at least first, second, third, and fourth parts of the at least portion of the one or more line analog signals, are at least portions of separate line signals;

the at least first, second, third, and fourth parts of the at least portion of the one or more line analog signals, are different portions of a same line signal;

the at least first part of the at least portion of the one or more line analog signals is generated utilizing the first one of the amplified first analog signals, by including the first one of the amplified first analog signals;

the at least first part of the at least portion of the one or more line analog signals is generated utilizing the first one of the amplified first analog signals, by communicating the first one of the amplified first analog signals;

the at least first part of the at least portion of the one or more line analog signals is generated utilizing the first one of the amplified first analog signals, by communicating the first one of the amplified first analog signals via the line;

the at least first part of the at least portion of the one or more line analog signals is generated utilizing the first one of the amplified first analog signals, by instantiating the first one of the amplified first analog signals on the line;

the first line digital signal is a line digital signal by virtue of being communicated via the line;

the first line digital signal is a line digital signal by virtue of corresponding to a line of cells;

the first line digital signal is a line digital signal by virtue of corresponding to one or more lines;

the first line digital signal is a line digital signal by virtue of resulting from a conversion of at least one line analog signal;

the first line digital signal corresponds to at least a subset of the line of cells;

the first line digital signal corresponds to only a subset of the line of cells;

the first line digital signal corresponds to only a subset of cells in communication with the line;

the first line digital signal corresponds to a subset of cells in communication with the line;

the first line digital signal corresponds to the plurality cells; or the first line digital signal is one of a plurality of first line digital signals corresponding to cells in communication with the line.

121. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus is configured such that different adjacent cells of the image sensor correspond with a same color of light, and are subject to:

a first sampling for which a first one or more analog signals generated by each of a first number of the different adjacent cells corresponding with the same color of light are sampled and combined to generate a first result, after the first sampling, a second sampling for which a second one or more analog signals generated by each of a second number of the different adjacent cells corresponding with the same color of light are sampled and combined to generate a second result, and a combining of at least a portion of the first result and at least a portion of the second result.

122. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus includes a mobile device including: a touch screen;

one or more non-transitory memories; and one or more processors in communication with the touch screen, the one or more non-transitory memories, the image sensor, and the circuitry, wherein the one or more processors execute instructions in the one or more non-transitory memories, to cause the apparatus to:

display, utilizing the touch screen, a first image that includes a photographic scene;

receive, utilizing the touch screen, user input in connection with the first image that includes the photographic scene;

based on the user input, identify a point of interest in the photographic scene;

based on the identification of the point of interest in the photographic scene, identify information associated with the point of interest;

based on the information associated with the point of interest, set one or more capture parameters for generating another at least one other analog signal, to generate a first digital image and a second digital image both including the point of interest in the photographic scene, utilizing the at least one analog-to-digital channel; and generate at least a portion of a resulting HDR image based on combining at least a portion of the first digital image and at least a portion of the second digital image.

123. The apparatus of claim 122, wherein the apparatus is configured such that zero-interframe time exists between the generation of the first digital image and the second digital image.

124. The apparatus of claim 122, wherein the apparatus is configured such that the at least portion of the first digital image and the at least portion of the second digital image are combined to generate a second image, and yet another analog signal is generated to generate a third digital image and a fourth digital image both including the point of interest in the photographic scene that are combined to generate a third image, where the resulting HDR image is generated based on a combination of the first image and the second image.

125. The apparatus of claim 122, wherein the apparatus is configured such that the at least portion of the first digital image and the at least portion of the second digital image are each generated by having two gains applied while being generated.

126. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus includes a mobile device including: a touch screen;

one or more non-transitory memories; and one or more processors in communication with the touch screen, the one or more non-transitory memories, the image sensor, and the circuitry, wherein the one or more processors execute instructions in the one or more non-transitory memories, to cause the apparatus to:

display, utilizing the touch screen, a first image that includes a photographic scene;

automatically identify a human face in the photographic scene;

based on the identification of the human face in the photographic scene, identify information associated with the human face;

based on the information associated with the human face, set one or more capture parameters for generating another at least one other analog signal, to generate a first digital image and a second digital image both including the human face in the photographic scene, utilizing the at least one analog-to-digital channel; and generate a resulting HDR image based on combining at least a portion of the first digital image and at least a portion of the second digital image.

127. The apparatus of claim 126, wherein the apparatus is configured such that the one or more capture parameters include an exposure parameter.

128. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus includes a mobile device including:

a touch screen;

one or more non-transitory memories; and one or more processors in communication with the touch screen, the one or more non-transitory memories, the image sensor, and the circuitry, wherein the one or more processors execute instructions in the one or more non-transitory memories, to cause the apparatus to:

display, utilizing the touch screen, a first image that includes a photographic scene;

receive, utilizing the touch screen, user input in connection with the first image that includes the photographic scene;

based on the user input, identify a point of interest in the photographic scene;

generate another at least one other analog signal, to generate a first digital image and a second digital image both including the point of interest in the photographic scene, utilizing the at least one analog-to-digital channel;

based on the identification of the point of interest in the photographic scene, identify information associated with the point of interest;

based on the information associated with the point of interest, identify at least one of: at least a portion of the first digital image or at least a portion of the second digital image; and generate a resulting HDR image based on combining at least part of the first digital image and at least part of the second digital image, utilizing the least one of: the at least portion of the first digital image or the at least portion of the second digital image, that is identified based on the information associated with the point of interest.

129. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus includes a mobile device including:

a touch screen;

one or more non-transitory memories; and one or more processors in communication with the touch screen, the one or more non-transitory memories, the image sensor, and the circuitry, wherein the one or more processors execute instructions in the one or more non-transitory memories, to cause the apparatus to:

display, utilizing the touch screen, a first image that includes a photographic scene;

automatically identify a human face in the photographic scene;

based on the identification of the human face in the photographic scene, identify information associated with the human face;

generate another at least one other analog signal, to generate a first digital image and a second digital image both including the human face in the photographic scene, utilizing the at least one analog-to-digital channel;

based on the identification of the human face in the photographic scene, identify information associated with the human face;

based on the information associated with the human face, identify at least one of: at least a portion of the first digital image or at least a portion of the second digital image; and generate a resulting HDR image based on combining at least part of the first digital image and at least part of the second digital image, utilizing the least one of: the at least portion of the first digital image or the at least portion of the second digital image, that is identified based on the information associated with the human face.

130. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus includes a mobile device including:

a strobe;

a touch screen;

one or more non-transitory memories; and one or more processors in communication with the strobe, the touch screen, the one or more non-transitory memories, the image sensor, and the circuitry, wherein the one or more processors execute instructions in the one or more non-transitory memories, to cause the apparatus to:

emit, utilizing the strobe, illumination during a first time interval based on a first set of strobe parameters including a first strobe intensity;

sample, utilizing the image sensor, a first image of a photographic scene during the first time interval based on a first set of exposure parameters, to generate a first image;

emit, utilizing the strobe, illumination during a second time interval based on a second set of strobe parameters including a second strobe intensity;

sample, utilizing the image sensor, a second image of the photographic scene during the second time interval based on a second set of exposure parameters, to generate a second image;

emit, utilizing the strobe, illumination during a third time interval based on a third set of strobe parameters including a third strobe intensity;

sample, utilizing the image sensor, a third image of the photographic scene during the third time interval based on a third set of exposure parameters, to generate a third image;

generate a resulting HDR image; and store the resulting HDR image.

131. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

at least one analog-to-digital channel in communication with the line, the at least one analog-to-digital channel receiving at least one of the one or more line analog signals for conversion thereof, where the at least one analog-to-digital channel outputs a first line digital signal and a second line digital signal; and circuitry in communication with the at least one analog-to-digital channel, the circuitry receiving at least one of the first line digital signal or the second line digital signal, for image generation;

wherein the apparatus includes a mobile device including:

a strobe;

a touch screen;

one or more non-transitory memories; and one or more processors in communication with the strobe, the touch screen, the one or more non-transitory memories, the image sensor, and the circuitry, wherein the one or more processors execute instructions in the one or more non-transitory memories, to cause the apparatus to:

emit, utilizing the strobe, illumination during a first time interval based on a first strobe intensity;

sample, utilizing the image sensor, a first image of a photographic scene during the first time interval based on a first set of exposure parameters, to generate a first image;

emit, utilizing the strobe, illumination during a second time interval based on a second strobe intensity;

sample, utilizing the image sensor, a second image of the photographic scene during the second time interval based on a second set of exposure parameters, to generate a second image;

emit, utilizing the strobe, illumination during a third time interval based on a third strobe intensity and a third strobe color;

sample, utilizing the image sensor, a third image of the photographic scene during the third time interval based on a third set of exposure parameters, to generate a third image;

sample, utilizing the image sensor, a fourth image of the photographic scene during a fourth time interval based on a fourth set of exposure parameters and without the strobe emitting illumination, to generate a fourth image;

identify a flash image based on at least one of the first image, the second image, or the third image;

generate a resulting HDR image by combining the flash image and an ambient image; and store the resulting HDR image.

132. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

a first analog-to-digital channel in communication with the line, the first analog-to-digital channel receiving at least one of the one or more line analog signals for conversion thereof to a first line digital signal;

a second analog-to-digital channel in communication with the line, the second analog-to-digital channel receiving at least one of the one or more line analog signals for conversion thereof to a second line digital signal;

circuitry in communication with the first analog-to-digital channel and the second analog-to-digital channel, the circuitry receiving at least one of the first line digital signal or the second line digital signal, for image generation;

a third analog-to-digital channel in communication with the line, the third analog-to-digital channel capable of receiving at least one of the one or more line analog signals for conversion thereof to a third line digital signal;

wherein the circuitry is in communication with the third analog-to-digital channel, in addition to the first analog-to-digital channel and the second analog-to-digital channel, and is operable for receiving the third digital signal, to combine at least two of: the first line digital signal, the second line digital signal, and the third line digital signal, resulting in at least portion of a first high dynamic range (HDR) image.

133. An apparatus, comprising:

a plurality of cells having a plurality of photodiodes, including a first cell having a first photodiode and a second cell having a second photodiode, at least one of the plurality of photodiodes generating at least one analog signal for being utilized to generate at least a portion of one or more line analog signals;

a first storage node in communication with the at least one of the plurality of photodiodes, the first storage node storing a first analog signal with a first gain applied thereto, such that the first analog signal is generated for a first exposure and is sampled to generate at least a portion of a first one of the one or more line analog signals;

a second storage node in communication with the at least one of the plurality of photodiodes, the second storage node storing a second analog signal with a second gain applied thereto that is different than the first gain, such that the second analog signal is sampled to generate at least a portion of a second one of the one or more line analog signals;

one or more lines in communication with the first storage node and the second storage node, the one or more lines communicating the at least portion of the one or more line analog signals, including the at least portion of the first one of the one or more line analog signals and the at least portion of the second one of the one or more line analog signals;

at least one analog-to-digital channel in communication with the one or more lines, the at least one analog-to-digital channel receiving the at least portion of at least one of the one or more line analog signals for conversion thereof to at least one digital signal, including a first digital signal corresponding to the at least portion of the first one of the one or more line analog signals and a second digital signal corresponding to the at least portion of the second one of the one or more line analog signals; and circuitry in communication with the at least one analog-to-digital channel, the circuitry receiving the first digital signal and the second digital signal for combining at least a portion of the first digital signal with at least a portion of the second digital signal, for image generation.

134. The apparatus of claim 133, wherein the apparatus is configured such that the first gain is applied by a single amplifier, before the at least portion of the first one of the one or more line analog signals is communicated, as part of a read out thereof, utilizing the one or more lines; and the second gain is applied by the single amplifier, before the at least portion of the second one of the one or more line analog signals is communicated, as part of a read out thereof, utilizing the one or more lines.

135. The apparatus of claim 133, wherein the apparatus is configured such that the first gain is applied by a same single amplifying circuit, before the at least portion of the first one of the one or more line analog signals is communicated, as part of a read out thereof, utilizing the one or more lines; and the second gain is applied by the same single amplifying circuit, before the at least portion of the second one of the one or more line analog signals is communicated, as part of a read out thereof, utilizing the one or more lines.

136. The apparatus of claim 133, wherein the apparatus is configured such that the first gain is applied by a first amplifying circuit, before the at least portion of the first one of the one or more line analog signals is communicated, as part of a read out thereof, utilizing the one or more lines; and the second gain is applied by a second amplifying circuit, before the at least portion of the second one of the one or more line analog signals is communicated, as part of a read out thereof, utilizing the one or more lines.

137. The apparatus of claim 133, wherein the apparatus is configured such that the first gain is greater than one (1) and the second gain is less than one (1).

138. The apparatus of claim 133, wherein the apparatus is configured such that the first gain is less than one (1) and the second gain equals one (1).

139. The apparatus of claim 133, wherein the apparatus is configured such that the first gain and the second gain are greater than one (1).

140. The apparatus of claim 133, wherein the apparatus is configured such that at least one of the first gain or the second gain equals one (1).

141. The apparatus of claim 133, wherein the apparatus is configured such that the first storage node stores the first analog signal without utilizing any capacitance of any of the plurality of photodiodes for the storage of the first analog signal by the first storage node after receiving a photodiode current; and the second storage node stores the second analog signal without utilizing any capacitance of any of the plurality of photodiodes for the storage of the second analog signal by the second storage node after receiving another photodiode current.

142. The apparatus of claim 133, wherein the apparatus is configured such that the first storage node stores the first analog signal without utilizing any capacitance of any of the plurality of photodiodes for the storage of the first analog signal by the first storage node; and the second storage node stores the second analog signal utilizing a capacitance of the at least one of the plurality of photodiodes for the storage of the second analog signal by the second storage node.

143. The apparatus of claim 133, wherein the apparatus is configured such that the first storage node has a first capacitance associated therewith, and the second storage node has a second capacitance associated therewith that is different than the first capacitance.

144. The apparatus of claim 133, wherein the apparatus is configured such that the first storage node is directly electrically coupled to a physical capacitor.

145. The apparatus of claim 144, wherein the apparatus is configured such that the second storage node is directly electrically coupled to another physical capacitor.

146. The apparatus of claim 133, wherein the apparatus is configured such that the first storage node does not store the first analog signal in any photodiode, after receiving current from the at least one of the plurality of photodiodes.

147. The apparatus of claim 146, wherein the apparatus is configured such that the second storage node does not store the second analog signal in any photodiode, after receiving additional current from the at least one of the plurality of photodiodes.

148. The apparatus of claim 133, wherein the apparatus is configured such that the first storage node is directly electrically coupled to a first physical capacitor with a first capacitance associated therewith, and the second storage node is directly electrically coupled to a second physical capacitor with a second capacitance associated therewith that is different than the first capacitance.

149. The apparatus of claim 133, wherein the apparatus is configured such that the first storage node is directly electrically coupled, with no analog electrical processing component therebetween, to a first physical capacitor with a first capacitance associated therewith, and the second storage node is directly electrically coupled, with no analog electrical processing component therebetween, to a second physical capacitor with a second capacitance associated therewith that is different than the first capacitance.

150. The apparatus of claim 133, wherein the apparatus is configured such that the first storage node is directly electrically coupled to a first physical capacitor of the first cell with a first capacitance associated therewith, and the second storage node is directly electrically coupled to a second physical capacitor of the first cell with a second capacitance associated therewith that is different than the first capacitance.

151. The apparatus of claim 133, wherein the apparatus is configured such that the plurality of cells are integrated on a first integrated circuit, and at least one of the first storage node or the second storage node is integrated on a second integrated circuit.

152. The apparatus of claim 133, wherein the apparatus is configured such that the plurality of cells are integrated on a first integrated circuit, and only one of the first storage node or the second storage node is integrated on a second integrated circuit.

153. The apparatus of claim 133, wherein the apparatus is configured such that the plurality of cells are integrated on a first integrated circuit, and both of the first storage node and the second storage node are integrated on a second integrated circuit.

154. The apparatus of claim 133, wherein the apparatus is configured such that only two transistors are in communication between the first storage node, and the one or more lines.

155. The apparatus of claim 133, wherein the apparatus is configured such that one or more corresponding reset analog signals is sampled between the sampling of the first analog signal and the sampling of the second analog signal.

156. The apparatus of claim 133, wherein the apparatus is configured such that no corresponding reset analog signal is sampled between the sampling of the first analog signal and the sampling of the second analog signal.

157. The apparatus of claim 133, wherein the apparatus is configured such that, for each of the first analog signal and the second analog signal, one or more corresponding reset analog signals are stored and sampled to generate one or more corresponding digital signals, at least a portion of which are processed with at least one of: the at least portion of the first digital signal or the at least portion of the second digital signal.

158. The apparatus of claim 133, wherein the apparatus is configured such that, for each of the first analog signal and the second analog signal, one or more corresponding reset analog signals are processed in an analog domain with at least one of: the at least portion of the first analog signal or the at least portion of the second analog signal.

159. The apparatus of claim 133, wherein the apparatus is configured such that the first analog signal and the second analog signal are sampled for different durations.

160. The apparatus of claim 133, wherein the apparatus is configured such that the first analog signal is sampled for a first duration, and the second analog signal is sampled for a second duration that is after and is shorter than the first duration.

161. The apparatus of claim 133, wherein the apparatus is configured such that the first analog signal is sampled for a first duration, and the second analog signal is sampled for a second duration that is after and is longer than the first duration.

162. The apparatus of claim 133, wherein the apparatus is configured such that the first analog signal is sampled for a first duration, and the second analog signal is sampled for a second duration that starts after the first duration has completed.

163. The apparatus of claim 133, wherein the apparatus is configured such that the first analog signal and the second analog signal are generated for the first exposure based on integrations that occur at least in part simultaneously.

164. The apparatus of claim 133, wherein the apparatus is configured such that the first analog signal is generated based on a first integration that occurs at least in part during the first exposure and the second analog signal is generated based on a second integration that occurs at least in part during the first exposure, such that the first integration and the second integration overlap at least in part.

165. The apparatus of claim 133, wherein the apparatus is configured such that the first analog signal is generated based on a first integration that occurs at least in part during the first exposure and the second analog signal is generated based on a second integration that occurs at least in part during the first exposure, such that the first integration and the second integration overlap at least in part, and the second integration is different in duration than the first integration.

166. The apparatus of claim 133, wherein the apparatus is configured such that the first analog signal is generated based on a first integration that occurs at least in part during the first exposure and the second analog signal is generated based on a second integration that occurs at least in part during the first exposure, such that the first integration and the second integration start at a same time, and the second integration is different in duration than the first integration.

167. The apparatus of claim 133, wherein the apparatus is configured such that the first analog signal is generated based on a first integration that occurs at least in part during the first exposure and the second analog signal is generated based on a second integration that occurs at least in part during the first exposure, such that the first integration and the second integration completely overlap.

168. The apparatus of claim 133, wherein the apparatus is configured such that the first analog signal is generated based on a first integration that occurs during a first duration of a first subset of the first exposure and the second analog signal is generated based on a second integration that occurs during a second duration of a second subset of the first exposure, where the first integration and the second integration overlap at least in part, and the first duration of the first subset of the first exposure is different than the second duration of the second subset of the first exposure.

169. The apparatus of claim 133, wherein the apparatus is configured such that:

the first storage node stores a third analog signal, such that the third analog signal is sampled to generate at least a portion of a third one of the one or more line analog signals;

the one or more lines communicates the at least portion of the one or more line analog signals, including the at least portion of the third one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals; and the circuitry receives the third digital signal for combining the at least portion of the first digital signal, the at least portion of the second digital signal, and at least a portion of the third digital signal, for the image generation.

170. The apparatus of claim 169, wherein the apparatus is configured such that the third analog signal has the second gain applied thereto.

171. The apparatus of claim 169, wherein the apparatus is configured such that the third analog signal has a third gain applied thereto that is different than the first gain and the second gain.

172. The apparatus of claim 133, wherein the apparatus is configured such that:

a third storage node stores a third analog signal, such that the third analog signal is sampled to generate at least a portion of a third one of the one or more line analog signals;

the one or more lines communicates the at least portion of the one or more line analog signals, including the at least portion of the third one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals; and the circuitry receives the third digital signal for combining the at least portion of the first digital signal, the at least portion of the second digital signal, and at least a portion of the third digital signal, for the image generation.

173. The apparatus of claim 172, wherein the apparatus is configured such that:

the first analog signal and the second analog signal are generated for the first exposure based on a first current received from the first photodiode; and the third analog signal is generated based on a second current received from another one of the plurality of photodiodes other than the first photodiode.

174. The apparatus of claim 172, wherein the apparatus is configured such that the first analog signal, the second analog signal, and the third analog signal, are sampled for different durations.

175. The apparatus of claim 172, wherein the apparatus is configured such that the first analog signal, the second analog signal, and the third analog signal, are sampled for different durations that do not overlap.

176. The apparatus of claim 172, wherein the apparatus is configured such that at least two of: the first analog signal, the second analog signal, and the third analog signal, are sampled for different durations.

177. The apparatus of claim 172, wherein the apparatus is configured such that at least two of: the first analog signal, the second analog signal, and the third analog signal, are sampled for different durations that do not overlap.

178. The apparatus of claim 172, wherein the apparatus is configured such that:

the first analog signal and the second analog signal are generated based on integrations that occur at least in part simultaneously; and the third analog signal is generated based on another integration.

179. The apparatus of claim 172, wherein the apparatus is configured such that the third analog signal has the second gain applied thereto.

180. The apparatus of claim 172, wherein the apparatus is configured such that the third analog signal has a third gain applied thereto that is different than the first gain and the second gain.

181. The apparatus of claim 172, wherein the apparatus is configured such that the second gain is applied to the second analog signal while the second analog signal is sampled, and the third analog signal has one or more gains applied thereto while the third analog signal is sampled.

182. The apparatus of claim 172, wherein the apparatus is configured such that:

the first storage node stores a fourth analog signal with at least one gain applied thereto that is different than the first gain, such that the fourth analog signal is sampled to generate at least a portion of a fourth one of the one or more line analog signals;

the one or more lines communicates the at least portion of the one or more line analog signals, including the at least portion of the fourth one of the one or more line analog signals;

the at least one analog-to-digital channel receives the at least portion of the at least one of the one or more line analog signals for conversion thereof to the at least one digital signal, including a fourth digital signal corresponding to the at least portion of the fourth one of the one or more line analog signals; and the circuitry receives the fourth digital signal for combining the at least portion of the first digital signal, the at least portion of the second digital signal, the at least portion of the third digital signal, and at least a portion of the fourth digital signal, for the image generation.

183. The apparatus of claim 182, wherein the apparatus is configured such that the at least one gain includes the second gain.

184. The apparatus of claim 182, wherein the apparatus is configured such that the at least one gain includes a third gain that is different than the first gain and the second gain.

185. The apparatus of claim 182, wherein the apparatus is configured such that the second gain is applied to the second analog signal while the second analog signal is sampled, and the at least one gain is applied to the fourth analog signal while the fourth analog signal is sampled.

186. The apparatus of claim 133, wherein the apparatus is configured such that:

the first storage node stores a third analog signal, such that the third analog signal is generated for a second exposure and is sampled to generate at least a portion of a third one of the one or more line analog signals;

the one or more lines communicates the at least portion of the one or more line analog signals, including the at least portion of the third one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals; and the circuitry receives the third digital signal for combining the at least portion of the first digital signal, the at least portion of the second digital signal, and at least a portion of the third digital signal, for the image generation.

187. The apparatus of claim 186, wherein the apparatus is configured such that the second storage node is directly electrically coupled to a physical capacitor.

188. The apparatus of claim 186, wherein the apparatus is configured such that the first gain is applied utilizing at least one amplifying circuit before the at least portion of the first one of the one or more line analog signals is communicated, as part of a read out thereof, utilizing the one or more lines; and the second gain is applied utilizing the at least one amplifying circuit before the at least portion of the second one of the one or more line analog signals is communicated, as part of a read out thereof, utilizing the one or more lines.

189. The apparatus of claim 186, wherein the apparatus is configured such that:

the first analog signal and the second analog signal are generated for the first exposure based on a first current received from the first photodiode and not based on any other current from any other photodiode; and the third analog signal is generated for the second exposure based on a second current received from the first photodiode and not based on any other current from any other photodiode.

190. The apparatus of claim 186, wherein the apparatus is configured such that:

the first analog signal and the second analog signal are generated for the first exposure based on a first current received from both the first photodiode and another one of the plurality of photodiodes other than the first photodiode; and the third analog signal is generated for the second exposure based on a second current received from both the first photodiode and the another one of the plurality of photodiodes.

191. The apparatus of claim 186, wherein the apparatus is configured such that the first storage node and the second storage node have different capacitances that are discharged at least in part together for the sampling of the second analog signal.

192. The apparatus of claim 186, wherein the apparatus is configured such that the third analog signal and at least one of: the first analog signal or the second analog signal, are sampled for different durations.

193. The apparatus of claim 186, wherein the apparatus is configured such that the first analog signal, the second analog signal, and the third analog signal, are sampled for durations that do not overlap.

194. The apparatus of claim 186, wherein the apparatus is configured such that the first analog signal and the second analog signal are generated based integrations that occur entirely simultaneously.

195. The apparatus of claim 186, wherein the apparatus is configured such that the first analog signal and the second analog signal are generated based on integrations that occur at least in part simultaneously.

196. The apparatus of claim 186, wherein the apparatus is configured such that the first analog signal and the second analog signal are generated based on a first integration period, and the second analog signal is generated additionally based on a second integration period that occurs after the first integration period.

197. The apparatus of claim 186, wherein the apparatus is configured such that the first analog signal and the second analog signal are generated based on a first integration period, and the second analog signal is generated additionally based on a second integration period that occurs after the first integration period, where the generation of the first analog signal is not based on the second integration period.

198. The apparatus of claim 186, wherein the apparatus is configured such that the first analog signal and the second analog signal are sampled without a reset operation being performed between the sampling of the first analog signal and the sampling of the second analog signal.

199. The apparatus of claim 186, wherein the apparatus is configured such that:

the first analog signal and the second analog signal are generated based on integrations that occur at least in part simultaneously, during the first exposure; and the third analog signal is generated based on another integration that occurs during the second exposure that occurs after the first exposure has completed.

200. The apparatus of claim 186, wherein the apparatus is configured such that the third analog signal has the first gain applied thereto.

201. The apparatus of claim 186, wherein the apparatus is configured such that the third analog signal has a third gain applied thereto that is different than the first gain and the second gain.

202. The apparatus of claim 186, wherein the apparatus is configured such that the second gain is applied to the second analog signal when the second analog signal is sampled.

203. The apparatus of claim 186, wherein the apparatus is configured such that a third gain, that is different than the first gain and the second gain, is conditionally applied to the at least portion of the first one of the one or more line analog signals after the application of the first gain.

204. The apparatus of claim 186, wherein the apparatus is configured such that a third gain, that is different than the first gain and the second gain, is conditionally applied to the at least portion of the second one of the one or more line analog signals after the application of the second gain.

205. The apparatus of claim 186, wherein the apparatus is configured such that a third gain, that is different than the first gain and the second gain, is conditionally applied to the at least portion of the first one of the one or more line analog signals after the application of the first gain, where a fourth gain is applied to the at least portion of the first one of the one or more line analog signals if the third gain is not applied thereto.

206. The apparatus of claim 186, wherein the apparatus is configured such that a third gain, that is different than the first gain and the second gain, is conditionally applied to the at least portion of the second one of the one or more line analog signals after the application of the first gain, where a fourth gain is applied to the at least portion of the second one of the one or more line analog signals if the third gain is not applied thereto.

207. The apparatus of claim 186, wherein the apparatus is configured such that:

a third gain, that is different than the first gain and the second gain, is applied, in a first scenario, to the at least portion of the first one of the one or more line analog signals after the application of the first gain, where a fourth gain is applied, in a second scenario, to the at least portion of the first one of the one or more line analog signals; and the third gain is applied, in a third scenario, to the at least portion of the second one of the one or more line analog signals after the application of the first gain, where a fifth gain is applied, in a fourth scenario, to the at least portion of the second one of the one or more line analog signals.

208. The apparatus of claim 186, wherein the apparatus is configured such that a third gain, that is different than the first gain and the second gain, is conditionally applied to the at least portion of the first one of the one or more line analog signals, based on a comparison involving a threshold.

209. The apparatus of claim 186, wherein the apparatus is configured such that a third gain, that is different than the first gain and the second gain, is conditionally applied to the at least portion of the second one of the one or more line analog signals, based on a comparison involving a threshold.

210. The apparatus of claim 186, wherein the apparatus is configured such that a third gain, that is different than the first gain and the second gain, is conditionally applied to the at least portion of the first one of the one or more line analog signals, based on a comparison involving a threshold and a result of gain application.

211. The apparatus of claim 186, wherein the apparatus is configured such that a third gain, that is different than the first gain and the second gain, is conditionally applied to the at least portion of the second one of the one or more line analog signals, based on a comparison involving a threshold and a result of gain application.

212. The apparatus of claim 186, wherein the apparatus is configured such that:

a third gain, that is different than the first gain and the second gain, is conditionally applied to the at least portion of the first one of the one or more line analog signals, based on a comparison involving a first threshold; and a fourth gain is conditionally applied to the at least portion of the second one of the one or more line analog signals al based on a comparison involving a second threshold.

213. The apparatus of claim 186, wherein the apparatus is configured such that the first analog signal is sampled with a first sampling circuit and the second analog signal is sampled with a second sampling circuit, where the first sampling circuit includes a first number of transistors and the second sampling circuit includes a second number of transistors that is less than the first number of transistors.

214. The apparatus of claim 186, wherein the apparatus is configured such that the first analog signal and the second analog signal are sampled without a reset operation being performed between the sampling of the first analog signal and the sampling of the second analog signal.

215. The apparatus of claim 186, wherein the apparatus is configured such that the first analog signal is generated utilizing current received from multiple of the plurality of photodiodes that have a same color associated therewith.

216. The apparatus of claim 186, wherein the apparatus is configured such that the second analog signal is generated utilizing current received from multiple of the plurality of photodiodes that have a same color associated therewith.

217. The apparatus of claim 186, wherein the apparatus is configured such that the first analog signal is sampled multiple times to create multiple first analog signals that are averaged in an analog domain.

218. The apparatus of claim 186, wherein the apparatus is configured such that the first analog signal is sampled multiple times to create multiple first analog signals that are converted and averaged in a digital domain.

219. The apparatus of claim 186, wherein the apparatus is configured such that the second analog signal is sampled multiple times to create multiple second analog signals that are averaged in an analog domain.

220. The apparatus of claim 186, wherein the apparatus is configured such that the second analog signal is sampled multiple times to create multiple second analog signals that are converted and averaged in a digital domain.

221. The apparatus of claim 186, wherein the apparatus is configured such that:

after the application of the first gain, a third gain, that is different than the first gain and the second gain, is applied to the first analog signal, to generate at least a portion of a fourth one of the one or more line analog signals;

the one or more lines communicates the at least portion of the one or more line analog signals, including the at least portion of the fourth one of the one or more line analog signals;

the at least one analog-to-digital channel receives the at least portion of the at least one of the one or more line analog signals for conversion thereof to the at least one digital signal, including a fourth digital signal corresponding to the at least portion of the fourth one of the one or more line analog signals; and the circuitry receives the fourth digital signal for combining the at least portion of the first digital signal, the at least portion of the second digital signal, the at least portion of the third digital signal, and at least a portion of the fourth digital signal, for the image generation.

222. The apparatus of claim 221, wherein the apparatus is configured such that the third gain is less than the first gain.

223. The apparatus of claim 221, wherein the apparatus is configured such that the third gain is greater than the second gain.

224. The apparatus of claim 221, wherein the apparatus is configured such that the second gain is applied to the third analog signal.

225. The apparatus of claim 186, wherein the apparatus is configured such that the first analog signal and the second analog signal are generated in a first mode of operation for a first resulting image and, in a second mode of operation for a second resulting image:

at least three analog signals are stored, such that the at least three analog signals are generated for at least three different exposures of at least three different durations, and are sampled to generate at least a portion of each of at least three of the one or more line analog signals;

the one or more lines communicates the at least portion of the one or more line analog signals, including the at least portion of each of the at least three of the one or more line analog signals;

the at least one analog-to-digital channel receives the at least portion of each of the at least three of the one or more line analog signals for conversion thereof to the at least one digital signal, including at least three digital signals corresponding to the at least portion of each of the at least three of the one of the one or more line analog signals; and the circuitry receives the at least three third digital signals for combining at least portions of the at least three digital signals.

226. The apparatus of claim 225, wherein the apparatus is configured such that at least two of the at least three analog signals have different gains applied thereto.

227. The apparatus of claim 225, wherein the apparatus is configured such that at least an initial one of the at least three analog signals has an initial gain applied thereto, and at least two subsequent of the at least three analog signals has at least one subsequent gain applied thereto, where the at least one subsequent gain is less than the initial gain.

228. The apparatus of claim 225, wherein the apparatus is configured such that the at least three different exposures of the at least three different durations, includes a first exposure that starts first with a first duration, a second exposure that starts after the first exposure with a second duration that is less than the first duration, and a third exposure that starts after the second exposure with a third duration that is less than the first duration and the second duration.

229. The apparatus of claim 225, wherein the apparatus is configured such that the first storage node and the second storage node have different capacitances that are discharged at least in part together for the sampling of the second analog signal.

230. The apparatus of claim 225, wherein the apparatus is configured such that the first storage node and the second storage node have different capacitances that are charged at least in part together for the generation of the second analog signal.

231. The apparatus of claim 186, wherein the apparatus is configured such that:

the first analog signal and the second analog signal are generated for the first exposure based on a first current received from the first photodiode and not based on any other current from any other photodiode;

the third analog signal is generated for the second exposure based on a second current received from the first photodiode and not based on any other current from any other photodiode;

the first gain is applied utilizing at least one amplifying circuit before the at least portion of the first one of the one or more line analog signals is communicated, as part of a read out thereof, utilizing the one or more lines;

the second gain is applied utilizing the at least one amplifying circuit before the at least portion of the second one of the one or more line analog signals is communicated, as part of a read out thereof, utilizing the one or more lines;

the first storage node and the second storage node have different capacitances that are discharged at least in part together for the sampling of the second analog signal;

the first analog signal and the second analog signal are generated based on a first integration period, and the second analog signal is generated additionally based on a second integration period that occurs after the first integration period, where the generation of the first analog signal is not based on the second integration period; and the first analog signal and the second analog signal are sampled without a reset operation being performed between the sampling of the first analog signal and the sampling of the second analog signal.

232. The apparatus of claim 231, wherein the apparatus is configured such that a third gain, that is different than the first gain and the second gain, is conditionally applied to the at least portion of the first one of the one or more line analog signals after the application of the first gain.

233. The apparatus of claim 231, wherein the apparatus is configured such that a third gain, that is different than the first gain and the second gain, is conditionally applied to the at least portion of the second one of the one or more line analog signals after the application of the second gain.

234. The apparatus of claim 231, wherein the apparatus is configured such that a third gain, that is different than the first gain and the second gain, is applied, in a first scenario, to the at least portion of the first one of the one or more line analog signals after the application of the first gain, where a fourth gain is applied, in a second scenario, to the at least portion of the first one of the one or more line analog signals.

235. The apparatus of claim 231, wherein the apparatus is configured such that a third gain, that is different than the first gain and the second gain, is applied, in a first scenario, to the at least portion of the second one of the one or more line analog signals after the application of the first gain, where a fourth gain is applied, in a second scenario, to the at least portion of the second one of the one or more line analog signals.

236. The apparatus of claim 231, wherein the apparatus is configured such that:

a third gain, that is different than the first gain and the second gain, is conditionally applied to the at least portion of the first one of the one or more line analog signals after the application of the first gain, where a fourth gain is applied to the at least portion of the first one of the one or more line analog signals if the third gain is not applied thereto; and the third gain is conditionally applied to the at least portion of the second one of the one or more line analog signals after the application of the first gain, where a fifth gain is applied to the at least portion of the second one of the one or more line analog signals if the third gain is not applied thereto.

237. The apparatus of claim 231, wherein the apparatus is configured such that a third gain, that is different than the first gain and the second gain, is conditionally applied to the at least portion of the first one of the one or more line analog signals, based on a comparison involving a threshold.

238. The apparatus of claim 231, wherein the apparatus is configured such that a third gain, that is different than the first gain and the second gain, is conditionally applied to the at least portion of the second one of the one or more line analog signals, based on a comparison involving a threshold.

239. The apparatus of claim 231, wherein the apparatus is configured such that the first analog signal is sampled with a first sampling circuit and the second analog signal is sampled with a second sampling circuit, where the first sampling circuit includes a first number of transistors and the second sampling circuit includes a second number of transistors that is less than the first number of transistors.

240. The apparatus of claim 231, wherein the apparatus is configured such that the first analog signal is capable of being sampled multiple times to create multiple first analog signals that are averaged in an analog domain, the first analog signal is capable of being sampled multiple times to create multiple first analog signals that are converted and averaged in a digital domain; the second analog signal is capable of being sampled multiple times to create multiple second analog signals that are averaged in the analog domain, the second analog signal is capable of being sampled multiple times to create multiple second analog signals that are converted and averaged in the digital domain.

241. The apparatus of claim 231, wherein the apparatus is configured such that:

after the application of the first gain, a third gain, that is different than the first gain and the second gain, is applied to the first analog signal, to generate at least a portion of a fourth one of the one or more line analog signals;

the one or more lines communicates the at least portion of the one or more line analog signals, including the at least portion of the fourth one of the one or more line analog signals;

the at least one analog-to-digital channel receives the at least portion of the at least one of the one or more line analog signals for conversion thereof to the at least one digital signal, including a fourth digital signal corresponding to the at least portion of the fourth one of the one or more line analog signals; and the circuitry receives the fourth digital signal for combining the at least portion of the first digital signal, the at least portion of the second digital signal, the at least portion of the third digital signal, and at least a portion of the fourth digital signal, for the image generation.

242. The apparatus of claim 241, wherein the apparatus is configured such that the third gain is less than the first gain.

243. The apparatus of claim 241, wherein the apparatus is configured such that the third gain is greater than the second gain.

244. The apparatus of claim 241, wherein the apparatus is configured such that the second gain is applied to the third analog signal.

245. The apparatus of claim 133, wherein the apparatus is configured such that:

a third gain, that is different than the first gain and the second gain, is applied to the first analog signal, to generate at least a portion of a third one of the one or more line analog signals;

the one or more lines communicates the at least portion of the one or more line analog signals, including the at least portion of the third one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals; and the circuitry receives the third digital signal for combining the at least portion of the first digital signal, and the at least portion of the second digital signal, and at least a portion of the third digital signal, for the image generation.

246. The apparatus of claim 245, wherein the apparatus is configured such that the third gain is less than the first gain.

247. The apparatus of claim 245, wherein the apparatus is configured such that the first gain and the second gain are the same, and the third gain is less than the first gain and the second gain.

248. The apparatus of claim 245, wherein the apparatus is configured such that the third gain is greater than the second gain.

249. The apparatus of claim 245, wherein the apparatus is configured such that the third gain is applied after the first gain is applied.

250. The apparatus of claim 245, wherein the apparatus is configured such that the third gain is applied before the first gain is applied.

251. The apparatus of claim 245, wherein the apparatus is configured such that the first storage node stores the first analog signal utilizing a capacitance of the at least one of the plurality of photodiodes.

252. The apparatus of claim 133, wherein the apparatus is configured such that the first analog signal and the second analog signal are generated in a first mode of operation for a first resulting image and, in a second mode of operation for a second resulting image:

a third analog signal is generated for a second exposure and is sampled to generate at least a portion of a third one of the one or more line analog signals;

a fourth analog signal is generated for a third exposure and is sampled to generate at least a portion of a fourth one of the one or more line analog signals;

the one or more lines communicates the at least portion of the one or more line analog signals, including the at least portion of the third one of the one or more line analog signals and the at least portion of the fourth one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals and a fourth digital signal corresponding to the at least portion of the fourth one of the one or more line analog signals; and the circuitry receives the third digital signal and the fourth digital signal for combining at least a portion of the third digital signal and at least a portion of the fourth digital signal.

253. The apparatus of claim 252, wherein the apparatus is configured such that, in the second mode of operation, the third analog signal and the fourth analog signal have different gains applied thereto.

254. The apparatus of claim 252, wherein the apparatus is configured such that, in the second mode of operation, the third analog signal is initially generated with a third gain applied thereto, that is different than the first gain and the second gain, during the second exposure which has a first duration, and the fourth analog signal is subsequently generated with a fourth gain applied thereto that is less than the third gain, during the third exposure which has a second duration that is less than the first duration.

255. The apparatus of claim 252, wherein the apparatus is configured such that, in the first mode of operation, the first analog signal is generated based on a first integration that occurs during a first duration of a first subset of the first exposure and the second analog signal is generated based on a second integration that occurs during a second duration of a second subset of the first exposure, where the first integration and the second integration overlap at least in part, and the first duration of the first subset of the first exposure is shorter than the second duration of the second subset of the first exposure.

256. The apparatus of claim 255, wherein the apparatus is configured such that, in the first mode of operation, the first analog signal is generated before the second analog signal, and the first gain is greater than the second gain.

257. The apparatus of claim 255, wherein the apparatus is configured such that the plurality of cells are integrated on a first integrated circuit, and at least one of the first storage node or the second storage node is integrated on a second integrated circuit.

258. The apparatus of claim 255, wherein the apparatus is configured such that, in the first mode of operation, the first analog signal and the second analog signal are sampled without a reset operation being performed between a completion of the sampling of the first analog signal and an initiation of the sampling of the second analog signal.

259. The apparatus of claim 255, wherein the apparatus is configured such that the plurality of cells are integrated on a first integrated circuit, and at least one of the first storage node or the second storage node is integrated on a second integrated circuit; and, in the first mode of operation:

the first analog signal is generated before the second analog signal, the first gain is greater than the second gain, and the first analog signal and the second analog signal are sampled without a reset operation being performed between a completion of the sampling of the first analog signal and an initiation of the sampling of the second analog signal.

260. The apparatus of claim 252, wherein the apparatus is configured such that, in the first mode of operation, the first analog signal is generated before the second analog signal, and the first gain is greater than the second gain.

261. The apparatus of claim 252, wherein the apparatus is configured such that the plurality of cells are integrated on a first integrated circuit, and at least one of the first storage node or the second storage node is integrated on a second integrated circuit.

262. The apparatus of claim 252, wherein the apparatus is configured such that, in the first mode of operation, the first analog signal and the second analog signal are sampled without a reset operation being performed between a completion of the sampling of the first analog signal and an initiation of the sampling of the second analog signal.

263. The apparatus of claim 252, wherein the apparatus is configured such that the plurality of cells are integrated on a first integrated circuit, and at least one of the first storage node or the second storage node is integrated on a second integrated circuit; and, in the first mode of operation:

the first analog signal is generated before the second analog signal, the first gain is greater than the second gain, and the first analog signal and the second analog signal are sampled without a reset operation being performed between a completion of the sampling of the first analog signal and an initiation of the sampling of the second analog signal.

264. The apparatus of claim 133, wherein the apparatus is configured such that the first analog signal is generated before the second analog signal, and the first gain is greater than the second gain.

265. The apparatus of claim 133, wherein the apparatus is configured such that the plurality of cells are integrated on a first integrated circuit, and both of the first storage node and the second storage node are integrated on a second integrated circuit.

266. The apparatus of claim 133, wherein the apparatus is configured such that the first analog signal and the second analog signal are sampled without a reset operation being performed between a completion of the sampling of the first analog signal and an initiation of the sampling of the second analog signal.

267. The apparatus of claim 133, wherein the apparatus is configured such that:

the plurality of cells are integrated on a first integrated circuit, and at least one of the first storage node or the second storage node is integrated on a second integrated circuit;

the first analog signal is generated before the second analog signal;

the first gain is greater than the second gain; and the first analog signal and the second analog signal are sampled without a reset operation being performed between a completion of the sampling of the first analog signal and an initiation of the sampling of the second analog signal.

268. The apparatus of claim 267, wherein the apparatus is configured such that the first analog signal is generated utilizing current received from multiple of the plurality of photodiodes that have a same color associated therewith.

269. The apparatus of claim 267, wherein the apparatus is configured such that the second analog signal is generated utilizing current received from multiple of the plurality of photodiodes that have a same color associated therewith.

270. The apparatus of claim 133, wherein the apparatus is configured such that:

at least two analog signals are generated for at least two additional exposures of at least two different durations, and are sampled to generate at least a portion of each of at least two of the one or more line analog signals;

the one or more lines communicates the at least portion of the one or more line analog signals, including the at least portion of each of the at least two of the one or more line analog signals;

the at least one analog-to-digital channel receives the at least portion of each of the at least two of the one or more line analog signals for conversion thereof to the at least one digital signal, including at least two digital signals corresponding to the at least portion of each of the at least two of the one of the one or more line analog signals; and the circuitry receives the at least two digital signals for combining at least portions of the at least two digital signals with the at least portion of the first digital signal and the at least portion of the second digital signal.

271. The apparatus of claim 270, wherein the apparatus is configured such that the at least two analog signals includes: a first of the at least two analog signal initially generated for a first one of the at least two additional exposures with a first duration, and a second of the at least two analog signal subsequently generated for a second one of the at least two additional exposures with a second duration that is less than the first duration.

272. The apparatus of claim 270, wherein the apparatus is configured such that the first analog signal is generated before the second analog signal, and the first gain is greater than the second gain.

273. The apparatus of claim 270, wherein the apparatus is configured such that the plurality of cells are integrated on a first integrated circuit, and both of the first storage node and the second storage node are integrated on a second integrated circuit.

274. The apparatus of claim 270, wherein the apparatus is configured such that the first analog signal and the second analog signal are sampled without a reset operation being performed between a completion of the sampling of the first analog signal and an initiation of the sampling of the second analog signal.

275. The apparatus of claim 270, wherein the apparatus is configured such that:

the plurality of cells are integrated on a first integrated circuit, and both of the first storage node and the second storage node are integrated on a second integrated circuit;

the first analog signal is generated before the second analog signal;

the first gain is greater than the second gain; and the first analog signal and the second analog signal are sampled without a reset operation being performed between a completion of the sampling of the first analog signal and an initiation of the sampling of the second analog signal.

276. The apparatus of claim 270, wherein the apparatus is configured such that the first analog signal is generated utilizing current received from multiple of the plurality of photodiodes that have a same color associated therewith.

277. The apparatus of claim 270, wherein the apparatus is configured such that the second analog signal is generated utilizing current received from multiple of the plurality of photodiodes that have a same color associated therewith.

278. The apparatus of claim 270, wherein the apparatus is configured such that the at least two analog signals have two different gains applied thereto.

279. The apparatus of claim 270, wherein the apparatus is configured such that the at least two analog signals have two different gains applied thereto, which are each different than the first gain and the second gain.

280. The apparatus of claim 252, wherein the apparatus is configured such that:

in the first mode of operation, the first analog signal and the second analog signal are generated for the first exposure based on a first current received from the first photodiode; and in the second mode of operation, the third analog signal is generated for the second exposure based on a second current received from the first photodiode, and the fourth analog signal is generated for the third exposure based on a third current received from the first photodiode.

281. The apparatus of claim 133, wherein the apparatus is configured such that the first analog signal and the second analog signal are generated in a first mode of operation for a first resulting image and, in a second mode of operation for a second resulting image:

a third analog signal is generated for a second exposure and is sampled with at least two different gains applied thereto to generate at least a portion of a third one of the one or more line analog signals and a fourth one of the one or more line analog signals;

a fourth analog signal is generated for a third exposure and is sampled to generate at least a portion of a fifth one of the one or more line analog signals;

a fifth analog signal is generated for a fourth exposure and is sampled to generate at least a portion of a sixth one of the one or more line analog signals;

the one or more lines communicates the at least portion of the one or more line analog signals, including the at least portion of the third one of the one or more line analog signals, the at least portion of the fourth one of the one or more line analog signals, the at least portion of the fifth one of the one or more line analog signals, and the at least portion of the sixth one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals, a fourth digital signal corresponding to the at least portion of the fourth one of the one or more line analog signals, a fifth digital signal corresponding to the at least portion of the fifth one of the one or more line analog signals, and a sixth digital signal corresponding to the at least portion of the sixth one of the one or more line analog signals; and the circuitry receives the third digital signal, the fourth digital signal, the fifth digital signal, and the sixth digital signal for combining at least a portion of the third digital signal, at least a portion of the fourth digital signal, at least a portion of the fifth digital signal, and at least a portion of the sixth digital signal.

282. The apparatus of claim 281, wherein the apparatus is configured such that, in the second mode of operation, the third analog signal is generated with a first duration of exposure, the fourth analog signal is sampled with a second duration of exposure that is less than the first duration of exposure, and the fifth analog signal is sampled with a third duration of exposure that is less than the second duration of exposure.

283. The apparatus of claim 282, wherein the apparatus is configured such that the third analog signal is sampled with the at least two different gains applied thereto, utilizing only the first storage node.

284. The apparatus of claim 282, wherein the apparatus is configured such that the third analog signal is sampled, utilizing the first storage node and the second storage node.

285. The apparatus of claim 133, wherein the apparatus is configured such that the first analog signal and the second analog signal are sampled without a reset operation being performed between a completion of the sampling of the first analog signal and an initiation of the sampling of the second analog signal.

286. The apparatus of claim 133, wherein the apparatus is configured such that at least one of the first gain or the second gain is dynamically changed over time.

287. The apparatus of claim 133, wherein the apparatus is configured such that the first storage node and the second storage node have a transistor electrically coupled therebetween.

288. The apparatus of claim 133, wherein the apparatus is configured such that a drain terminal of a transistor is in communication with the first storage node and a source terminal of the transistor is in communication with the second storage node.

289. The apparatus of claim 133, wherein the apparatus is configured such that a drain terminal of a transistor is in communication with the first storage node and a source terminal of the transistor is in communication with the second storage node, where the transistor controls a flow of current between the first storage node and the second storage node when at least one of the first analog signal or the second analog signal is sampled.

290. The apparatus of claim 133, wherein the apparatus is configured such that a drain terminal of a transistor is in communication with the first storage node and a source terminal of the transistor is in communication with the second storage node, where the transistor controls a flow of current between the first storage node and the second storage node and operates is in a first mode of operation when the first analog signal is sampled and in a second mode of operation when the second analog signal is sampled.

291. The apparatus of claim 133, wherein the apparatus is configured such that the first storage node and the second storage node have different capacitances that are discharged at least in part together for the sampling of the second analog signal.

292. The apparatus of claim 133, wherein the apparatus is configured such that the first storage node and the second storage node have different capacitances that are charged at least in part together for the generation of the second analog signal.

293. The apparatus of claim 133, wherein the apparatus is configured such that the first gain and the second gain are both applied, at least in part, by an amplifier, before the at least portion of the first one of the one or more line analog signals and the at least portion of the second one of the one or more line analog signals are communicated, as part of a read out thereof, utilizing the one or more lines.

294. The apparatus of claim 133, wherein the apparatus is configured such that the first gain is applied by a first amplifier, before the at least portion of the first one of the one or more line analog signals is communicated, as part of a read out thereof, utilizing the one or more lines; and the second gain is applied by a second amplifier, before the at least portion of the second one of the one or more line analog signals is communicated, as part of a read out thereof, utilizing the one or more lines.

295. The apparatus of claim 133, wherein the apparatus is configured such that the plurality of cells, the first storage node, and the second storage node are integrated on a first integrated circuit; and the at least one analog-to-digital channel is integrated on a second integrated circuit.

296. The apparatus of claim 133, wherein the apparatus is configured such that the plurality of cells, the first storage node, and the second storage node are integrated on a first integrated circuit; and the at least one analog-to-digital channel includes at least two analog-to-digital channels integrated on a second integrated circuit.

297. The apparatus of claim 133, wherein the apparatus is configured such that at least one of:

the image sensor includes the one or more lines;

the image sensor does not include the one or more lines;

the image sensor includes the first storage node and the second storage node;

the image sensor does not include the first storage node and the second storage node;

the image sensor is separate from the one or more lines;

the image sensor is integrated with the one or more lines;

the image sensor is separate from the first storage node and the second storage node;

the image sensor is integrated with the first storage node and the second storage node;

the circuitry includes a processor;

the circuitry includes digital circuitry;

the circuitry includes analog circuitry;

the circuitry is separate from the at least one analog-to-digital channel;

the circuitry is integrated with the at least one analog-to-digital channel;

at least one of the first storage node or the second storage node, includes a charge storing device;

at least one of the first storage node or the second storage node, includes a charge storing device that is circuitry;

at least one of the first storage node or the second storage node, includes circuitry;

at least one of the first storage node or the second storage node, includes a charge storing device that is a capacitor;

at least one of the first storage node or the second storage node, includes a charge storing device that is a transistor;

at least one of the first storage node or the second storage node, includes a terminal node of a capacitor;

at least one of the first storage node or the second storage node, includes a terminal node of a transistor;

at least one of the first storage node or the second storage node, includes a terminal node of a transistor, including at least one of a gate, a drain, or a source;

at least one of the first storage node or the second storage node, includes an analog sampling circuit;

at least one of the first storage node or the second storage node, includes a portion of an analog sampling circuit;

at least one of the first storage node or the second storage node, includes a node of an analog sampling circuit;

at least one of the first storage node or the second storage node, includes a sample storage node;

at least one of the first storage node or the second storage node, includes a node of a terminal of a capacitor;

at least one of the first storage node or the second storage node, includes a node of a terminal of a transistor at least one of the first storage node or the second storage node, includes any device for storing any sample or value that is a function of a light intensity detected at one or more photodiodes;

at least one of the first storage node or the second storage node, stores a charge;

at least one of the first storage node or the second storage node, is controllable via at least one control signal;

at least one of the first storage node or the second storage node, is controllable via at least one control signal including at least one of: a sample signal; a reset signal; or a row select signal;

at least one of the first storage node or the second storage node, is capable of communicating a signal thereof via another one of the first storage node or the second storage node;

at least one of the first storage node or the second storage node, is capable of sharing a charge thereof with another one of the first storage node or the second storage node, before the charge being sampled;

at least one of the first storage node or the second storage node, includes a single analog component;

at least one of the first storage node or the second storage node, includes a single charge storing device that is a portion of a wire;

at least one of the first storage node or the second storage node, includes only a portion of a wire;

at least one of the first storage node or the second storage node, includes only a portion of a wire, where the portion of the wire is in communication with at least one transistor;

at least one of the first storage node or the second storage node, includes a capacitor;

at least one of the first storage node or the second storage node, does not include a capacitor;

at least one of the first storage node or the second storage node, includes a transistor;

at least one of the first storage node or the second storage node, does not include a transistor;

at least one of the first storage node or the second storage node, stores by making an analog signal available for sampling;

at least one of the first storage node or the second storage node, stores by making a voltage available for sampling;

at least one of the first storage node or the second storage node, stores by making available for sampling an analog signal, where the analog signal is stored by another electrical component;

at least one of the first storage node or the second storage node, stores by accumulating an analog signal available for sampling;

at least one of the first storage node or the second storage node, is a node that stores by the node making an analog signal available for sampling;

at least one of the first storage node or the second storage node, is a node that stores by the node making a voltage available for sampling;

at least one of the first storage node or the second storage node, is a node that stores by the node holding an analog signal available for sampling;

at least one of the first storage node or the second storage node, is a node that stores by the node accumulating an analog signal available for sampling;

the first storage node includes a first terminal of a same transistor and the second storage node includes a second terminal of the same transistor;

the first storage node includes a first terminal of a first transistor and the second storage node includes a second terminal of a second transistor;

the first storage node and the storage second node, include different storage nodes of different sampling circuits;

the first storage node and the second storage node, include different storage nodes that are not of different sampling circuits;

the first storage node and the second storage node are embodied on a same integrated circuit as the plurality of photodiodes;

the at least one analog-to-digital channel includes an analog-to-digital converter;

the at least one analog-to-digital channel includes an amplifier;

the at least one analog-to-digital channel does not include an amplifier;

the first storage node stores the first analog signal utilizing a capacitance that is not of any of the plurality of photodiodes;

the first storage node stores the first analog signal utilizing a capacitance that is of one or more of the plurality of photodiodes;

the second storage node stores the second analog signal utilizing a capacitance that is not of any of the plurality of photodiodes;

the second storage node stores the second analog signal utilizing a capacitance that is of one or more of the plurality of photodiodes;

the at least one of the plurality of photodiodes includes a single photodiode;

the first storage node and the second storage node are both in communication with the first photodiode of the at least one of the plurality of photodiodes;

the first storage node and the second storage node are both in communication with the first photodiode of the at least one of the plurality of photodiodes, and only one of the first storage node or the second storage node is in communication with the second photodiode of the at least one of the plurality of photodiodes;

the first storage node stores the first analog signal after the first analog signal is generated by the at least one of the plurality of photodiodes;

the second storage node stores the second analog signal after the second analog signal is generated by the at least one of the plurality of photodiodes;

the first storage node and the second storage node have a single transistor electrically coupled therebetween;

the first storage node and the second storage node have at least one transistor electrically coupled therebetween;

the first gain is applied to the first analog signal before being sampled and the second gain is applied to the second analog signal before being sampled;

the first gain is applied to the first analog signal while being sampled and the second gain is applied to the second analog signal while being sampled;

the first gain is applied to the first analog signal after being sampled and the second gain is applied to the second analog signal after being sampled;

the first gain is applied to the first analog signal before being sampled and the second gain is applied to the second analog signal after being sampled;

the first gain is applied to the first analog signal by a transistor-based amplifier before being sampled and the second gain is applied to the second analog signal before being sampled;

the first gain is applied to the first analog signal while being generated and the second gain is applied to the second analog signal while being generated;

the first gain is applied to the first analog signal after being generated and the second gain is applied to the second analog signal after being generated;

the first gain is applied to the first analog signal while being generated and the second gain is applied to the second analog signal after being generated;

the first gain is applied to the first analog signal by a transistor-based amplifier while being generated and the second gain is applied to the second analog signal after being generated;

the first gain is applied to the first analog signal while being stored and the second gain is applied to the second analog signal while being stored;

the first gain is applied to the first analog signal after being stored and the second gain is applied to the second analog signal after being stored;

the first gain is applied to the first analog signal while being stored and the second gain is applied to the second analog signal after being stored;

the first gain is applied to the first analog signal by a transistor-based amplifier while being stored and the second gain is applied to the second analog signal after being stored;

the at least one analog signal being utilized to generate the at least portion of the one or more line analog signals, by being processed utilizing at least one analog electrical component;

the at least one analog signal being utilized to generate the at least portion of the one or more line analog signals, by being amplified utilizing at least one analog electrical component;

the first analog signal is generated for a first portion of the first exposure and the second analog signal is generated for a second portion of the first exposure;

the first analog signal is generated for a first portion of the first exposure and the second analog signal is generated for a second portion of the first exposure, where the first portion and the second portion at least partially overlap;

the first analog signal is generated for a first portion of the first exposure and the second analog signal is generated for a second portion of the first exposure, where the first portion and the second portion do not overlap;

the first analog signal and the second analog signal are generated for the first exposure, by each utilizing at least a portion of a same charge accumulated by a same current received from the at least one of the plurality of photodiodes;

the first analog signal and the second analog signal are generated for the first exposure, by each utilizing at least a portion of a same charge accumulated by a same current received from the at least one of the plurality of photodiodes, such that the second analog signal is generated for the first exposure by utilizing additional charge accumulated by additional current received from the at least one of the plurality of photodiodes;

the first analog signal and the second analog signal are generated for the first exposure, by each utilizing at least a portion of a same charge accumulated by a same current received from the at least one of the plurality of photodiodes, such that the second analog signal is generated for the first exposure by utilizing additional charge accumulated by additional current received from the at least one of the plurality of photodiodes, and the first analog signal is generated for the first exposure by not utilizing the additional charge accumulated by the additional current received from the at least one of the plurality of photodiodes;

only the first analog signal is sampled to generate the at least portion of the first one of the one or more line analog signals;

only the second analog signal is sampled to generate the at least portion of the first one of the one or more line analog signals;

the first analog signal is only stored at the first storage node;

the second analog signal is only stored at the second storage node;

the second analog signal is stored at the second storage node, in addition to the first storage node;

the first analog signal and the second analog signal are sampled by the stored first analog signal and the stored second analog signal being used to control a gate of a transistor to generate the first one of the one or more line analog signals and the at least portion of the second one of the one or more line analog signals;

the first analog signal is sampled by the stored first analog signal being used to control a gate of a transistor to generate the first one of the one or more line analog signals;

the second analog signal is sampled by the stored second analog signal being used to control a gate of a transistor to generate the second one of the one or more line analog signals;

the second analog signal is sampled by the stored first analog signal and the stored second analog signal both being used to control a gate of a transistor to generate the second one of the one or more line analog signals;

the one or more lines include a first line for communicating the at least portion of the first one of the one or more line analog signals, and a second line for communicating and the at least portion of the second one of the one or more line analog signals;

the one or more lines include a same line for communicating the at least portion of the first one of the one or more line analog signals and the at least portion of the second one of the one or more line analog signals;

the one or more lines include a same set of lines for communicating the at least portion of the first one of the one or more line analog signals and the at least portion of the second one of the one or more line analog signals;

the at least portion of the first digital signal and the at least portion of the second digital signal, that are combined for the image generation, include digital portions thereof; or the at least portion of the first digital signal and the at least portion of the second digital signal, that are combined for the image generation, include aspects thereof.

298. The apparatus of claim 133, wherein the apparatus is configured such that:

a third storage node stores a third analog signal, such that the third analog signal is sampled to generate at least a portion of a third one of the one or more line analog signals;

the one or more lines communicates the at least portion of the one or more line analog signals, including the at least portion of the third one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals; and the circuitry receives the third digital signal for combining the at least portion of the first digital signal, the at least portion of the second digital signal, and at least a portion of the third digital signal, for the image generation.

299. The apparatus of claim 298, wherein the apparatus is configured such that:

the first analog signal and the second analog signal are generated utilizing the first photodiode; and the third analog signal is generated utilizing another one of the plurality of photodiodes other than the first photodiode.

300. The apparatus of claim 298, wherein the apparatus is configured such that, for each of the first analog signal, the second analog signal, and the third analog signal, one or more corresponding reset analog signals are utilized.

301. The apparatus of claim 298, wherein the apparatus is configured such that the first gain is applied by a single amplifier, before the at least portion of the first one of the one or more line analog signals is communicated, as part of a read out thereof, utilizing the one or more lines; and the second gain is applied by the single amplifier, before the at least portion of the second one of the one or more line analog signals is communicated, as part of a read out thereof, utilizing the one or more lines.

302. The apparatus of claim 298, wherein the apparatus is configured such that the third storage node is directly electrically coupled to a physical capacitor and the image generation is performed utilizing a single exposure.

303. The apparatus of claim 298, wherein the apparatus is configured such that the first analog signal, the second analog signal, and the third analog signal, are sampled for durations that do not overlap.

304. The apparatus of claim 298, wherein the apparatus is configured such that:

the first analog signal and the second analog signal are generated utilizing the first photodiode;

the third analog signal and is generated utilizing another one of the plurality of photodiodes other than the first photodiode;

the first gain is applied, before the at least portion of the first one of the one or more line analog signals is communicated, as part of a read out thereof, utilizing the one or more lines;

the third storage node is directly electrically coupled to a physical capacitor; and the first analog signal, the second analog signal, and the third analog signal, are sampled for durations that do not overlap.

305. The apparatus of claim 304, wherein the apparatus is configured such that the image generation is performed utilizing a single exposure.

306. The apparatus of claim 298, wherein the apparatus is configured such that different adjacent cells correspond with a same color of light, and are subject to, for at least one of: the first digital signal, the second digital signal, or the third digital signal: a corresponding sampling for which one or more analog signals generated by each of the different adjacent cells corresponding with the same color of light are sampled and combined before being utilized for line analog signal generation.

307. The apparatus of claim 298, wherein the apparatus is configured such that, for the first digital signal, the second digital signal, and the third digital signal: corresponding analog signals generated by different cells of a first line corresponding with a same color of light are combined with corresponding analog signals generated by other different cells of a second line corresponding with the same color of light, before digital conversion thereof.

308. The apparatus of claim 298, wherein the apparatus is configured such that, for at least one of: the first digital signal, the second digital signal, or the third digital signal:

corresponding analog signals generated by different cells of a first line corresponding with a same color of light are combined with corresponding analog signals generated by other different cells of a second line corresponding with the same color of light, before digital conversion thereof.

309. The apparatus of claim 133, wherein the apparatus is configured such that:

a third storage node stores a third analog signal, such that the third analog signal is sampled to generate at least a portion of a third one of the one or more line analog signals;

a fourth storage node stores a fourth analog signal, such that the fourth analog signal is sampled to generate at least a portion of a fourth one of the one or more line analog signals;

the one or more lines communicates the at least portion of the one or more line analog signals, including the at least portion of the third one of the one or more line analog signals and the at least portion of the fourth one of the one or more line analog signals;

the at least one analog-to-digital channel receives the at least portion of the at least one of the one or more line analog signals for conversion thereof to the at least one digital signal, including a third digital signal corresponding to the at least portion of the third one of the one or more line analog signals and a fourth digital signal corresponding to the at least portion of the fourth one of the one or more line analog signals; and the circuitry receives the third digital signal and the fourth digital signal for combining the at least portion of the first digital signal, the at least portion of the second digital signal, at least a portion of the third digital signal, and at least a portion of the fourth digital signal, for the image generation.

310. The apparatus of claim 309, wherein the apparatus is configured such that:

the first analog signal and the second analog signal are generated utilizing the first photodiode;

the third analog signal and the fourth analog signal are generated utilizing another one of the plurality of photodiodes other than the first photodiode;

the first gain is applied, before the at least portion of the first one of the one or more line analog signals is communicated, as part of a read out thereof, utilizing the one or more lines;

the third analog signal and the fourth analog signal have different gains applied thereto;

the fourth storage node is directly electrically coupled to a physical capacitor; and the first analog signal, the second analog signal, the third analog signal, and the fourth analog signal, are sampled for durations that do not overlap.

311. The apparatus of claim 310, wherein the apparatus is configured such that the image generation is performed utilizing a single exposure.

312. The apparatus of claim 310, wherein the apparatus is configured such that the physical capacitor includes at least a portion of a dynamic random access memory.

313. The apparatus of claim 310, wherein the apparatus is configured such that the first photodiode and the another one of the plurality of photodiodes are situated in a same single cell.

314. The apparatus of claim 310, wherein the apparatus is configured such that:

the first analog signal and the second analog signal are generated based on an integration; and the third analog signal and the fourth analog signal are generated based on another integration.

315. The apparatus of claim 310, wherein the apparatus is configured such that the first analog signal, the second analog signal, the third analog signal, and the fourth analog signal are generated based on at least two integrations that occur at least in part simultaneously.

316. The apparatus of claim 310, wherein the apparatus is configured such that the third analog signal has at least one of the first gain or the second gain applied thereto.

317. The apparatus of claim 310, wherein the apparatus is configured such that the third analog signal has a third gain applied thereto that is different than the first gain and the second gain.

318. The apparatus of claim 309, wherein the apparatus is configured such that:

the first analog signal and the second analog signal are generated utilizing the first photodiode; and the third analog signal and the fourth analog signal are generated utilizing another one of the plurality of photodiodes other than the first photodiode.

319. The apparatus of claim 318, wherein the apparatus is configured such that the first gain is applied by, before the at least portion of the first one of the one or more line analog signals is communicated, as part of a read out thereof, utilizing the one or more lines; and the first photodiode and the another one of the plurality of photodiodes are situated in a same single pixel component.

320. The apparatus of claim 318, wherein the apparatus is configured such that one or more corresponding reset analog signals are utilized between a first sampling involving the first photodiode and a second sampling involving the another one of the plurality of photodiodes.

321. The apparatus of claim 318, wherein the apparatus is configured such that the first photodiode and the another one of the plurality of photodiodes are situated in a same single sub-component of a pixel.

322. The apparatus of claim 309, wherein the apparatus is configured such that the fourth storage node is directly electrically coupled to a physical capacitor, and the third analog signal and the fourth analog signal have different gains applied thereto.

323. The apparatus of claim 309, wherein the apparatus is configured such that the first analog signal, the second analog signal, the third analog signal, and the fourth analog signal, are sampled for durations that do not overlap.

324. The apparatus of claim 309, wherein the apparatus is configured such that the image generation is performed utilizing a single exposure.

325. The apparatus of claim 324, wherein the apparatus is configured such that one or more corresponding reset analog signals are utilized between at least two samplings involving at least two of the first analog signal, the second analog signal, the third analog signal, and the fourth analog signal.

326. The apparatus of claim 309, wherein the apparatus is configured such that one or more corresponding reset analog signals are utilized between at least two samplings involving at least two of the first analog signal, the second analog signal, the third analog signal, and the fourth analog signal.

327. The apparatus of claim 309, wherein the apparatus is configured such that:

the first analog signal and the second analog signal are generated based on an integration; and the third analog signal and the fourth analog signal are generated based on another integration.

328. The apparatus of claim 309, wherein the apparatus is configured such that the first analog signal, the second analog signal, the third analog signal, and the fourth analog signal are generated based on at least two integrations that occur at least in part simultaneously.

329. The apparatus of claim 309, wherein the apparatus is configured such that the third analog signal has at least one of the first gain or the second gain applied thereto.

330. The apparatus of claim 309, wherein the apparatus is configured such that the third analog signal has a third gain applied thereto that is different than the first gain and the second gain.

331. The apparatus of claim 310, wherein the apparatus is configured such that different adjacent cells correspond with a same color of light, and are subject to, for the first digital signal, the second digital signal, the third digital signal, and the fourth digital signal: a corresponding sampling for which one or more analog signals generated by each of the different adjacent cells corresponding with the same color of light are sampled and combined before being utilized for line analog signal generation.

332. The apparatus of claim 310, wherein the apparatus is configured such that different adjacent cells correspond with a same color of light, and are subject to, for at least one of: the first digital signal, the second digital signal, the third digital signal, or the fourth digital signal: a corresponding sampling for which one or more analog signals generated by each of the different adjacent cells corresponding with the same color of light are sampled and combined before being utilized for line analog signal generation.

333. The apparatus of claim 310, wherein the apparatus is configured such that, for the first digital signal, the second digital signal, the third digital signal, and the fourth digital signal: corresponding analog signals generated by different cells of a first line corresponding with a same color of light are combined with corresponding analog signals generated by other different cells of a second line corresponding with the same color of light, before digital conversion thereof.

334. The apparatus of claim 310, wherein the apparatus is configured such that, for at least one of: the first digital signal, the second digital signal, the third digital signal, or the fourth digital signal: corresponding analog signals generated by different cells of a first line corresponding with a same color of light are combined with corresponding analog signals generated by other different cells of a second line corresponding with the same color of light, before digital conversion thereof.

335. The apparatus of claim 133, wherein the apparatus is configured such that at least two different images are simultaneously captured based on different exposures including a first exposure utilizing a first gain that is based on a first brightness of only a subset of a first one of the at least two different images and a second exposure utilizing a second gain that is based on a second brightness of only a subset of a second one of the at least two different images, where a resulting high dynamic range (HDR) image is generated based on the at least two different images.

336. The apparatus of claim 335, wherein the apparatus is configured such that the subset of the first one of the at least two different images and the subset of the second one of the at least two different images, include different regions included in a scene of the at least two different images.

337. The apparatus of claim 335, wherein the apparatus is configured such that the subset of the first one of the at least two different images and the subset of the second one of the at least two different images, include different objects included in a scene of the at least two different images.

\* \* \* \* \*